US010255573B2

(12) United States Patent
Bodnick et al.

(10) Patent No.: US 10,255,573 B2
(45) Date of Patent: Apr. 9, 2019

(54) SYSTEMS, METHODS, AND MEDIA FOR PRESENTING INTERACTIVE CHECKLISTS

(71) Applicants: David Bodnick, New York, NY (US); Marlon Feld, Bronx, NY (US); Rachel J. Gild, Mountain View, CA (US)

(72) Inventors: David Bodnick, New York, NY (US); Marlon Feld, Bronx, NY (US); Rachel J. Gild, Mountain View, CA (US)

(73) Assignee: WebINTENSIVE Software, LLC, New York, NY (US)

( * ) Notice: Subject to any disclaimer, the term of this patent is extended or adjusted under 35 U.S.C. 154(b) by 477 days.

(21) Appl. No.: 14/217,240

(22) Filed: Mar. 17, 2014

(65) Prior Publication Data

US 2014/0281967 A1 Sep. 18, 2014

Related U.S. Application Data

(60) Provisional application No. 61/801,443, filed on Mar. 15, 2013.

(51) Int. Cl.

*G06Q 10/06* (2012.01)
*G06Q 10/10* (2012.01)
*G06F 3/0484* (2013.01)

(52) U.S. Cl.

CPC ..... *G06Q 10/06316* (2013.01); *G06F 3/0484* (2013.01); *G06Q 10/10* (2013.01); *G06Q 10/103* (2013.01)

(58) Field of Classification Search

CPC ............ G06Q 10/06316; G06Q 10/103; G06F 3/04842; G06F 3/0482; G06F 3/0484

See application file for complete search history.

(56) References Cited

U.S. PATENT DOCUMENTS

| | | | | |
|---|---|---|---|---|
| 5,822,123 | A * | 10/1998 | Davis | A63F 13/12 348/569 |
| 6,286,137 | B1 * | 9/2001 | Bleizeffer | G06F 9/44505 715/705 |
| 6,904,565 | B1 * | 6/2005 | Lentz | G06F 9/4446 715/705 |
| 8,386,929 | B2 * | 2/2013 | Zaika | G06F 3/0482 707/805 |
| 8,522,240 | B1 * | 8/2013 | Merwarth | G06Q 10/0631 705/26.82 |
| 2002/0054130 | A1 * | 5/2002 | Abbott, III | G06Q 10/10 715/783 |

(Continued)

*Primary Examiner* — Nicholas Ulrich

(74) *Attorney, Agent, or Firm* — Byrne Poh LLP

(57) ABSTRACT

Mechanisms for presenting interactive checklists comprising: at least one hardware processor that: receives an indication from a first user assigned to a first step that the first step has been completed; presents a description for a second step to users assigned to the second step in response to receiving the indication; receives at least one of: interactive checklist content describing how to perform the second step; and a new description for a new step, after the presenting of the description of the second step; and saves the at least one of the interactive checklist content and the new description, and an indicator that the at least one of the interactive checklist content and the new description is to be available for presentation to users after the receiving of the at least one of the interactive checklist content and the new description.

24 Claims, 249 Drawing Sheets

9202

(56) References Cited

U.S. PATENT DOCUMENTS

| | | | | |
|---|---|---|---|---|
| 2004/0119752 | A1 * | 6/2004 | Beringer | G06Q 10/06313 715/779 |
| 2004/0122853 | A1 * | 6/2004 | Moore | G06Q 10/06316 |
| 2006/0271381 | A1 * | 11/2006 | Pui | G06Q 10/06311 705/7.13 |
| 2006/0271913 | A1 * | 11/2006 | Erf | G06Q 10/10 717/120 |
| 2007/0282658 | A1 * | 12/2007 | Brintle | G06Q 10/06 705/7.15 |
| 2008/0065460 | A1 * | 3/2008 | Raynor | G06Q 10/06 705/7.21 |
| 2008/0091493 | A1 * | 4/2008 | Holmstrom | G06F 19/327 705/7.26 |
| 2008/0294988 | A1 * | 11/2008 | Nicholas | G06Q 10/109 715/710 |
| 2009/0187453 | A1 * | 7/2009 | Dill | G06Q 10/06 705/7.12 |
| 2009/0265629 | A1 * | 10/2009 | Dantwala | H04N 1/00244 715/705 |
| 2010/0306016 | A1 * | 12/2010 | Solaro | G06Q 10/06316 705/7.26 |
| 2011/0016023 | A1 * | 1/2011 | Zakas | G06Q 30/0603 705/27.1 |
| 2013/0061138 | A1 * | 3/2013 | Spector | G06F 17/248 715/256 |
| 2014/0006943 | A1 * | 1/2014 | Robbins | G06F 19/327 715/273 |
| 2014/0129965 | A1 * | 5/2014 | Sorin | G06F 9/4446 715/762 |

* cited by examiner

200

300

500

600

700

800

904

902

908

906

910

912

1000

1100

1202

1206

1208

1400

1700

1800

2002

2002

2002

1902

2000

2002

2004

2102

2104

2106

2112

2114

2116

2118

2200

2400

2402

2500

2600

2604

2606

2608

2610

2612

2702

2704

2706

2710

2712

FIG. 28
Create Guides: Guide Library

2800

3000

3102

3104

3106

3202

3204

3300

3400

3500

3600

3700

3802

3806

3900

4000

4102

4104

4200

4300

4400

4500

4600

4700

4800

4902

4904

5000

5002

5004

5006

5008

5100

5200

5300

FIG. 54
Administration: Reports

5400

5500

5600

5602

5700

5800

5900

6000

6102

6104

6106

6200

6300

6400

6500

6600

6702

6704

FIG. 68
Create Guides: Guide Library

6800

7000

7100

7200

7202

7300

7400

7500

7502

7600

7700

7800

7900

8000

8100

8200

8300

FIG. 84
Configure Tags
Add a new set of tags

8400

8500

8600

8700

8802

8800

8900

9002

9004

9100

9202

9204

9300

9400

9500

9600

9602

9700

9702

9800

9900

10000

10100

10200

10300

10400

10500

10602

10606

10604

10702

10704

10804

10802

10902

10904

11000

11104

11102

11200

11302

11304

11402

11404

11502

11504

11602

11606

11604

11702

11704
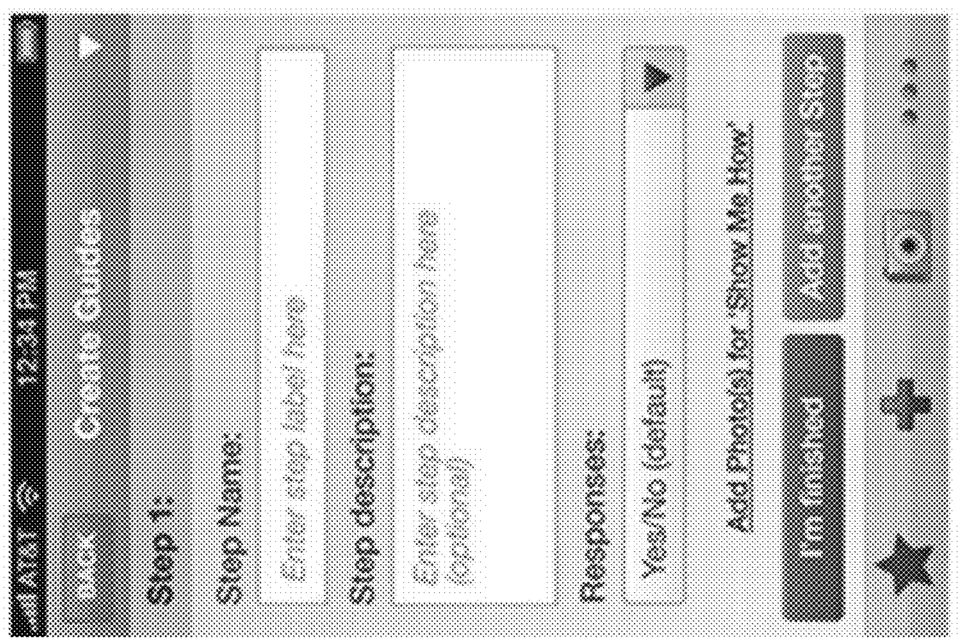
FIG. 1117B

11800

12102

12104

12200

12300

12402

12400

12500

12600

12700

12800

12900

13000

13100

13200

FIG. 145
Administration: Users
Agenda
Guides
Communication
Settings
Administration
Actions

SYSTEMS, METHODS, AND MEDIA FOR PRESENTING INTERACTIVE CHECKLISTS

CROSS-REFERENCE TO RELATED APPLICATIONS

This application claims the benefit of U.S. Provisional Patent Application No. 61/801,443, filed Mar. 15, 2013, which is hereby incorporated by reference herein in its entirety.

TECHNICAL FIELD

The disclosed subject matter relates to systems, methods, and media for presenting interactive checklists.

BACKGROUND

Many complex tasks that are performed for personal or business purposes require a series of often nuanced steps to be performed or considered to complete the tasks. Frequently, there are one or two people who are "experts" at performing such a task because of the complexity of remembering how and when to perform the steps required, and the communication needed to become aware of improvements and changes to these tasks. This limited number of "experts" makes delegating performance of the task or steps therein a difficult matter. Often, even when delegation is possible, expert oversight is still required.

In the past, paper checklists have been used to document the steps that are needed to perform a task and guide a person when performing the task, but such paper checklists are limited in the information that they can convey and are difficult to update. For example, a paper checklist can only show what is recited on the checklist paper, and cannot be automatically linked to other information that may be useful in performing a task. As another example, when updating a paper checklist, prior copies of the paper checklist need to be gathered and thrown away and new copies of the paper checklist generated. And with paper checklists, oversight can be thwarted by delay, failure of coordination, or failure to document interim steps.

Accordingly, it is desirable to provide new systems, methods, and media for presenting interactive checklists.

SUMMARY

Systems, methods, and media for presenting interactive checklists are provided. In some embodiments, methods for presenting interactive checklists are provided, the methods comprising: identifying a plurality of steps to be performed by one or more users in connection with completing a task, wherein each of the plurality of steps is assigned to one or more of the plurality of users and has a description corresponding to the step; presenting the description for a first of the plurality of steps to the one or more of the plurality of users assigned to the first of the plurality of steps; receiving an indication from the one or more of the plurality of users assigned to the first of the plurality of steps that the first of the plurality of steps has been completed; presenting the description for a second of the plurality of steps to the one or more of the plurality of users assigned to the second of the plurality of steps in response to receiving the indication that the first of the plurality of steps has been completed; receiving from at least one of the plurality of users at least one of: interactive checklist content describing how to perform the second of the plurality of steps; and a new description for a new step to be added to the plurality of steps, after the presenting of the description of the second of the plurality of steps; and saving the at least one of the interactive checklist content and the new description for the new step, and an indicator that the at least one of the interactive checklist content and the new description of the new step is to be available for presentation to at least one of the plurality of users after the receiving of the at least one of the interactive checklist content and the new description for the new step.

In some embodiments, systems for presenting interactive checklists are provided, the systems comprising: at least one hardware processor that: identifies a plurality of steps to be performed by one or more users in connection with completing a task, wherein each of the plurality of steps is assigned to one or more of the plurality of users and has a description corresponding to the step; presents the description for a first of the plurality of steps to the one or more of the plurality of users assigned to the first of the plurality of steps; receives an indication from the one or more of the plurality of users assigned to the first of the plurality of steps that the first of the plurality of steps has been completed; presents the description for a second of the plurality of steps to the one or more of the plurality of users assigned to the second of the plurality of steps in response to receiving the indication that the first of the plurality of steps has been completed; receives from at least one of the plurality of users at least one of: interactive checklist content describing how to perform the second of the plurality of steps; and a new description for a new step to be added to the plurality of steps, after the presenting of the description of the second of the plurality of steps; and saves the at least one of the interactive checklist content and the new description for the new step, and an indicator that the at least one of the interactive checklist content and the new description of the new step is to be available for presentation to at least one of the plurality of users after the receiving of the at least one of the interactive checklist content and the new description for the new step.

In some embodiments, non-transitory computer-readable media containing computer-executable instructions that, when executed by a processor, cause the processor to perform a method for presenting interactive checklists s are provided, the method comprising: identifying a plurality of steps to be performed by one or more users in connection with completing a task, wherein each of the plurality of steps is assigned to one or more of the plurality of users and has a description corresponding to the step; presenting the description for a first of the plurality of steps to the one or more of the plurality of users assigned to the first of the plurality of steps; receiving an indication from the one or more of the plurality of users assigned to the first of the plurality of steps that the first of the plurality of steps has been completed; presenting the description for a second of the plurality of steps to the one or more of the plurality of users assigned to the second of the plurality of steps in response to receiving the indication that the first of the plurality of steps has been completed; receiving from at least one of the plurality of users at least one of: interactive checklist content describing how to perform the second of the plurality of steps; and a new description for a new step to be added to the plurality of steps, after the presenting of the description of the second of the plurality of steps; and saving the at least one of the interactive checklist content and the new description for the new step, and an indicator that the at least one of the interactive checklist content and the new description of the new step is to be available for presentation to at least one of the plurality of users after the receiving of the at least one of the interactive checklist content and the new description for the new step.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 117A and 117B show examples of user interfaces displayed on a mobile device for creating an interactive checklist in accordance with some embodiments of the disclosed subject matter.

DETAILED DESCRIPTION OF EMBODIMENTS

In accordance with some embodiments, mechanisms (which can be system, methods, and/or media) for interactive checklists are provided. In some embodiments, using these mechanism, a user can create, complete, assign, and/or perform other actions on interactive checklists. In some embodiments, each interactive checklist can contain one or more steps which can assist a user in completing one or more tasks.

In some embodiments, interactive checklists can offer smart suggestions based on decision points, input fields, task items, and/or any other information associated with the interactive checklist. Interactive checklists can be tailored to one or more situations based on a user's responses (e.g., if the answer to Step 1 is "yes," then do not show user Step 7). Interactive checklists can be reviewed and approved. An electronic paper trail of the user's response can be provided to create accountability in some embodiments.

Turning to FIGS. 1-132 and 134-192, examples of user interfaces that can be generated in connection with these mechanisms in accordance with some embodiments are shown. In some embodiments, these user interfaces can be generated under the control of one or more hardware processor of a computing device and/or a server as described below in connection with FIGS. 133A and 133B.

Figure 1:
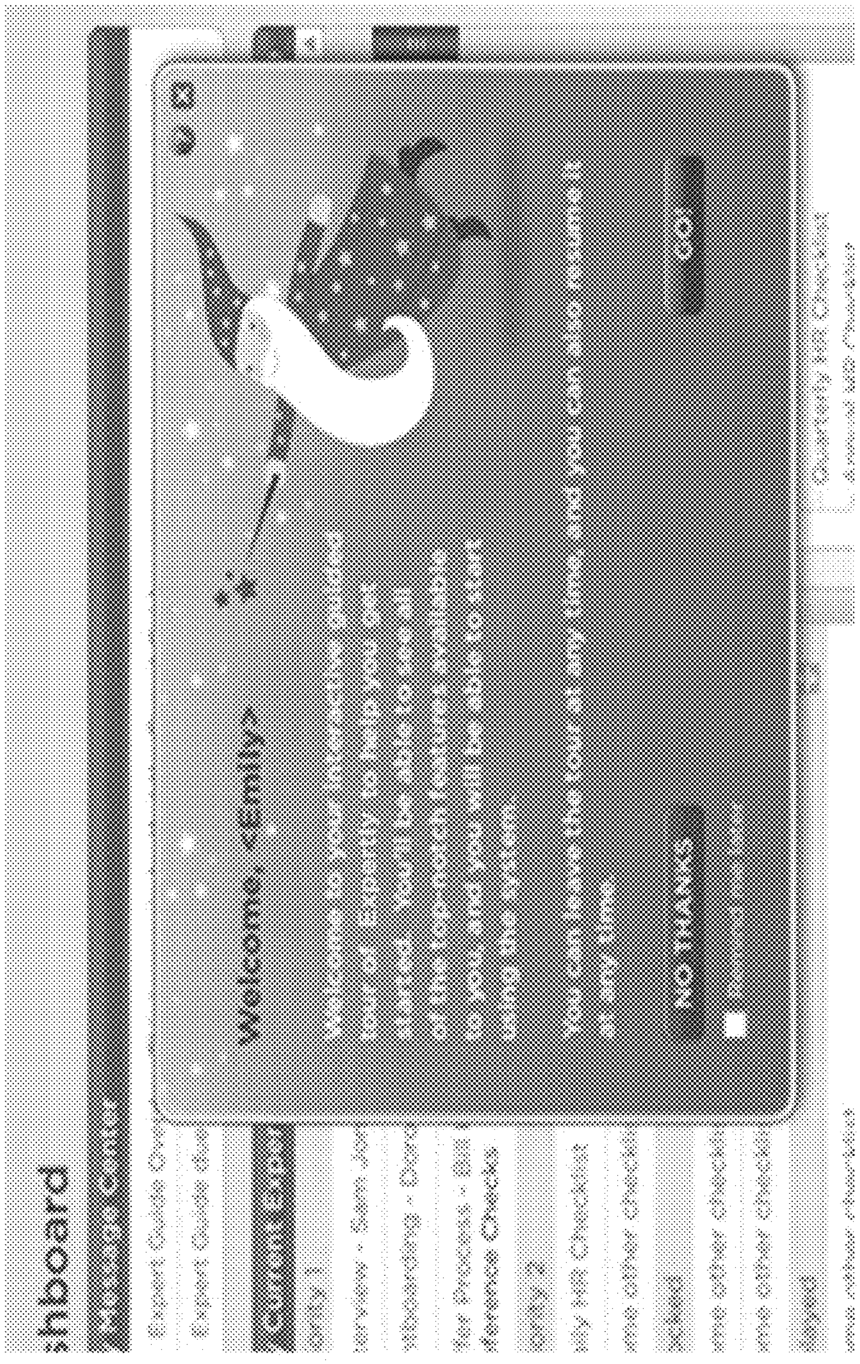
FIG. 1 shows an example of a user interface for presenting a tour wizard in accordance with some embodiments of the disclosed subject matter.

Referring to FIG. 1, an example 100 of a user interface for introducing a user to a tour of user interfaces of the mechanism in accordance with some embodiments of the invention is shown. In some embodiments, using interface 100 may be presented by a hardware processor of a computing device (e.g., as described in connection with FIG. 133). In some embodiment, a tour can be presented by a wizard graphic as shown in FIG. 1. A part of the tour may optionally be presented when the user encounters new functionality for which that part of the tour has not been previously presented. The wizard graphic can appear in a variety of poses and with a number of props.

Figure 2:
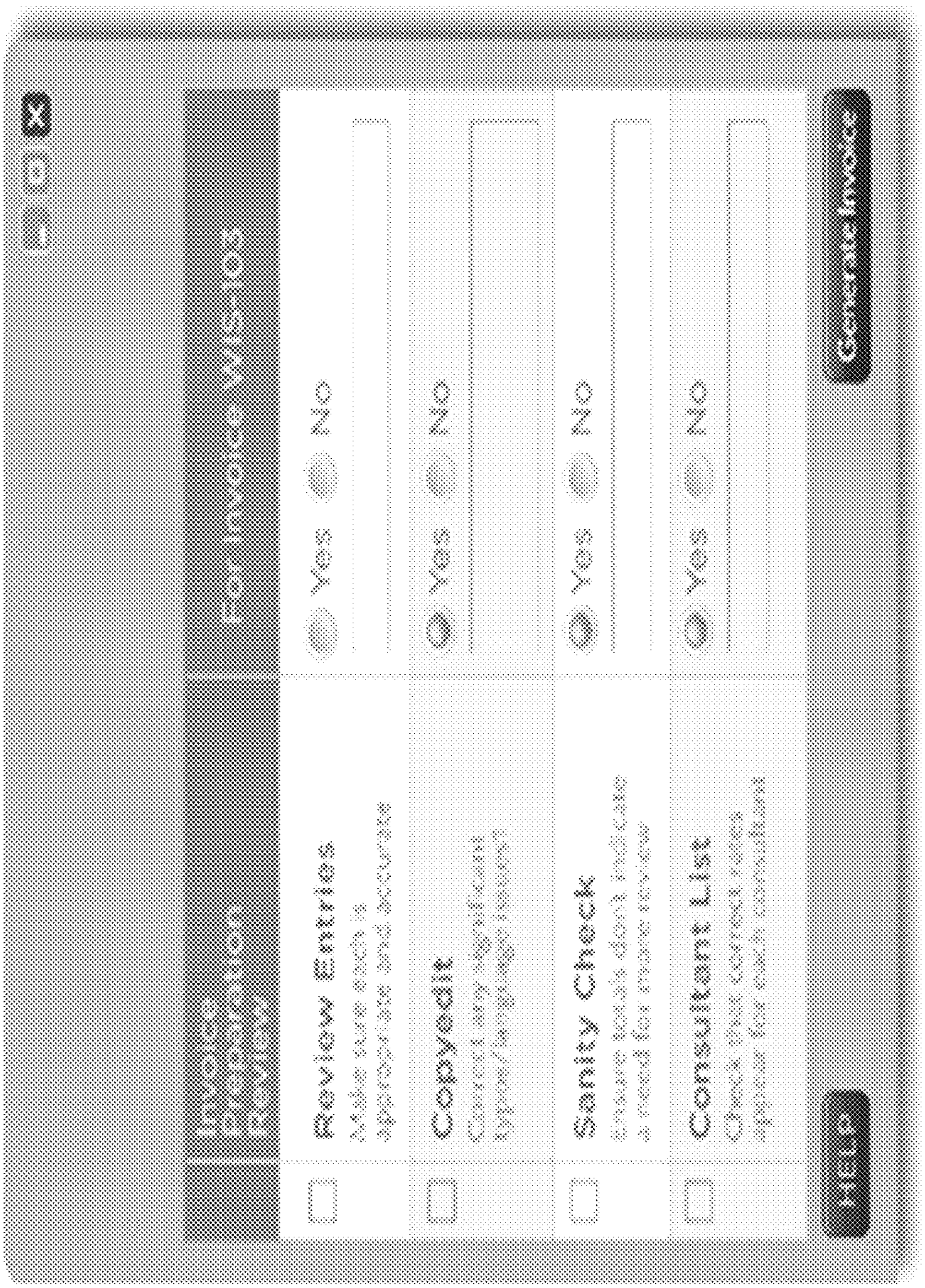
FIGS. 2 and 3 show examples of user interfaces for reviewing interactive checklists in accordance with some embodiments of the disclosed subject matter.
Figure 3:
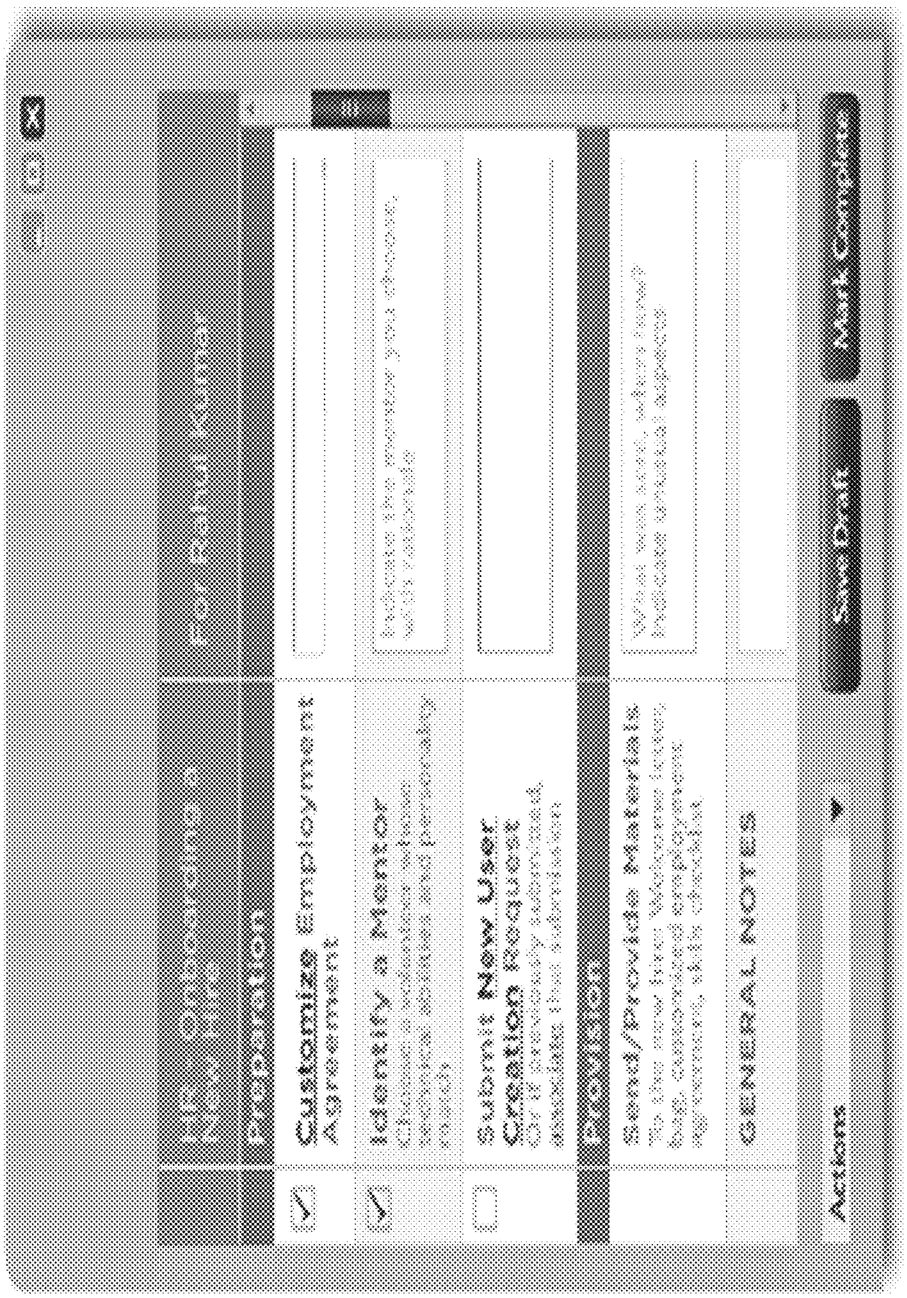

In some embodiments, interfaces 200 and 300 of FIGS. 2 and 3, respectively, are examples of interfaces which can be used in an interactive checklist. As shown in FIG. 2, an example of an interactive checklist can provide a procedure for invoice preparation review, and this procedure can include steps for reviewing entries, copy editing, performing a "sanity" check, and checking rates for consultants. When these steps are done, a user can select to generate an invoice. As shown in FIG. 2, an example of an interactive checklist can provide a procedure for human resources onboarding of a new hire, and this procedure can include steps for customizing an employment agreement, identifying a mentor, submitting a new user creation request, sending/providing materials, taking notes, saving a draft of the checklist, and marking the checklist complete.

Figure 4:
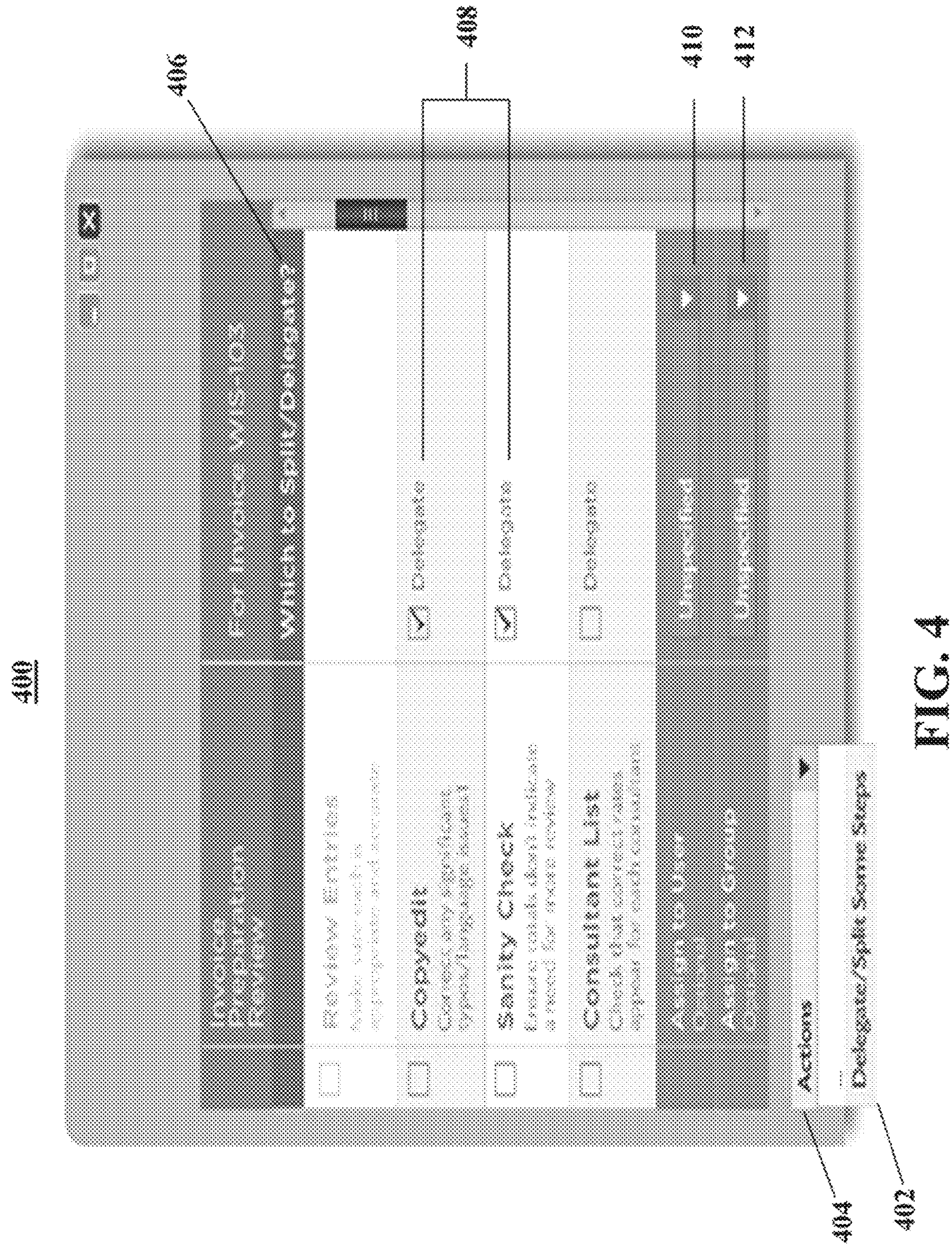
FIG. 4 shows an example of user interface for delegating steps to another user in accordance with some embodiments of the disclosed subject matter.

In accordance with some embodiments, a menu can also be provided with an interactive checklist in some embodiments. As shown in FIG. 4, a menu 404 can include an option 402 for delegating/splitting some steps of the interactive checklist. For example, one or more menu options can be provided to allow a user to select to split an interactive checklist into one or more sections or subsections and/or to reassign sections and/or individual steps to other users.

In some embodiment, after selecting option 403 (e.g., by the hardware processor receiving a user input (e.g., from a keyboard, a mouse, a touchscreen, and/or any other source of user input) of option 402), the hardware processor can receive a selection of which steps to split or delegate to another user as shown in column 406 (labelled "Which to Split/Delegate?") of FIG. 4. In some embodiments, a characteristic of the step can be evaluated to determine whether the step can be split and/or delegated, and the result of that determination can control whether options for splitting and/ or delegating a step are shown (as illustrated, only options to delegate steps are shown in FIG. 4). Next, the hardware processor can receive a selection of one or more of any available incomplete steps using check boxes (e.g., check boxes 408). Upon receiving a selection of one or more of the incomplete steps to delegate (as shown in FIG. 4), the hardware processor can present menus 410 and/or 412 to the user to specify which user (using menu 410) or group of users (using menu 412) are to complete the step or steps selected.

Figure 5:
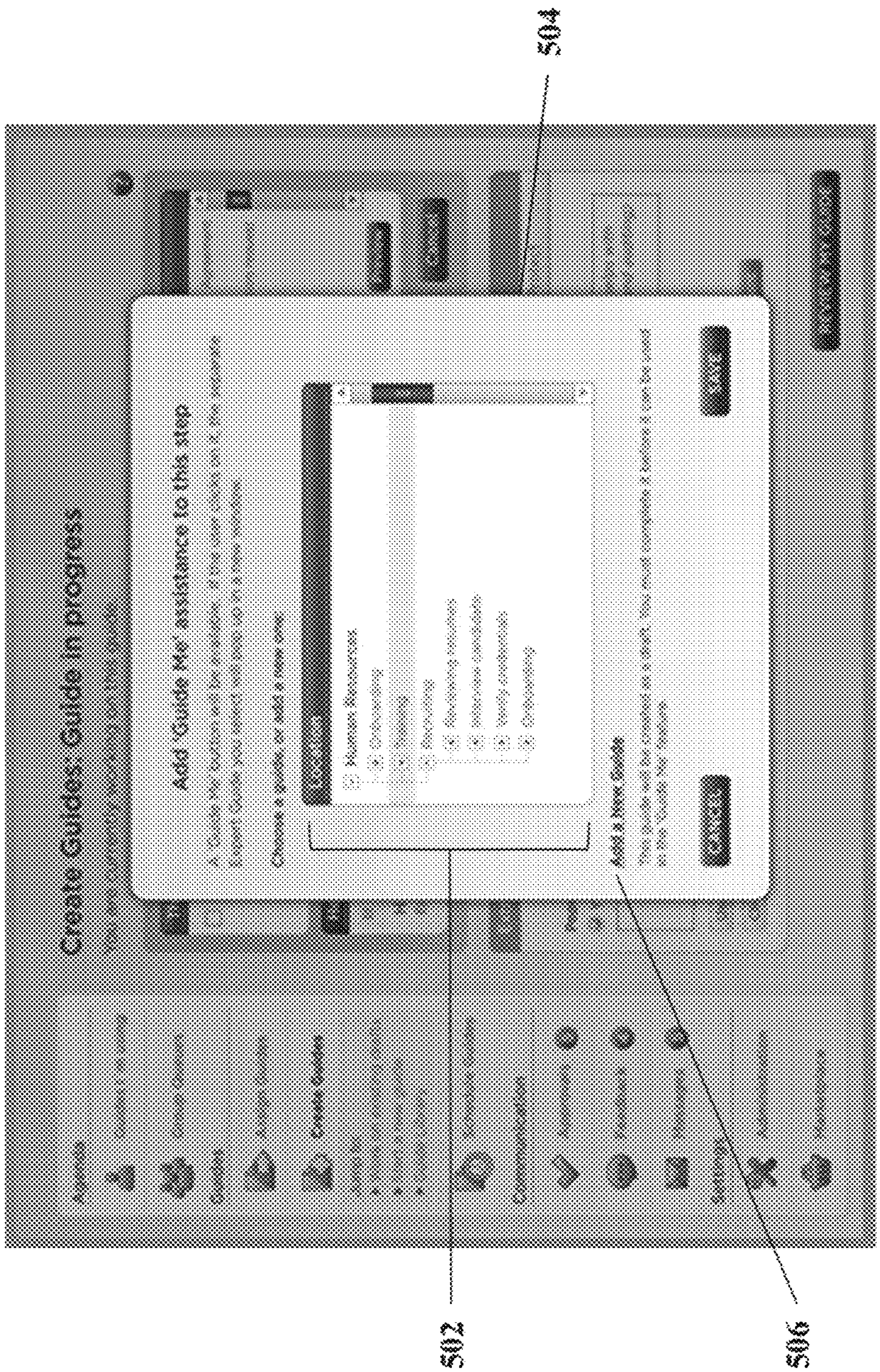
FIGS. 5, 6, and 7 show examples of user interfaces for suggesting interactive checklists to a user in accordance with some embodiments of the disclosed subject matter.

In accordance with some embodiments, an interactive checklist can be enhanced in any suitable manner. For example, as shown in FIG. 5, using an interface 500, a user can add "Guide Me" assistance to an interactive checklist that can guide the performance of one or more steps of the interactive checklist. In some embodiments, The "Guide Me" assistance can be one or more other interactive checklists that are presented. These one or more other interactive checklists can be selected from one or more existing interactive checklists or can be newly created. For example, as shown in interface 500 of FIG. 5, the hardware processor can receive a user selection of an existing interactive checklist using a location tree 502 in a popup window 504. If the user concludes that none of the existing options available cover the right material, the hardware processor can receive a user input to add a new interactive checklist by selecting a link 506 (labelled "Add a New Guide" in the example of FIG. 5). After a user selects link 506, the hardware processor can prompt the user for, and receive, instructions from the user to create a new interactive checklist and to use the new interactive checklist to provide "Guide Me" assistance. In some embodiments, when presenting an interface such as interface 500, the hardware processor can receive a request that another user create a new interactive checklist or update an existing interactive checklist. In such instances, the other user can be prompted by the hardware processor to create a new interactive checklist in response to the request.

Figure 6:
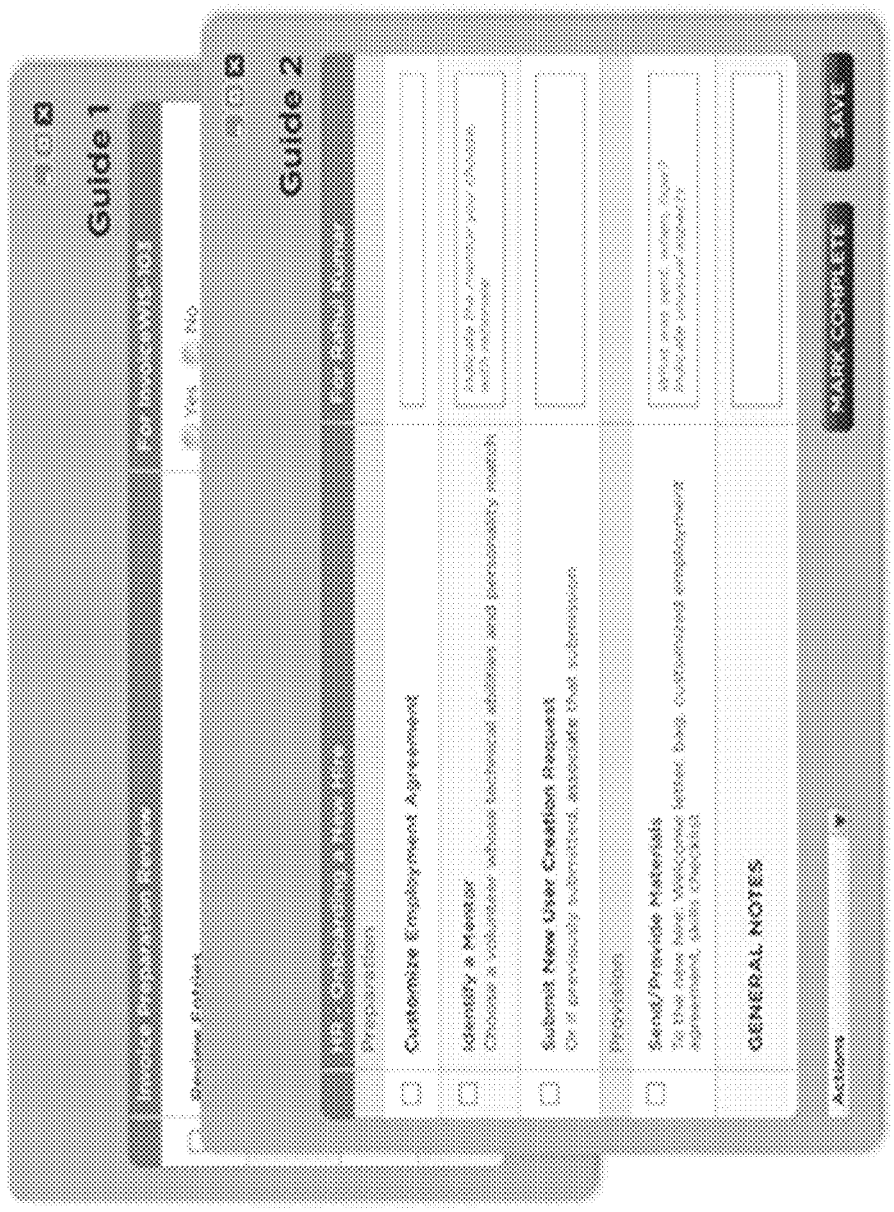
Figure 7:
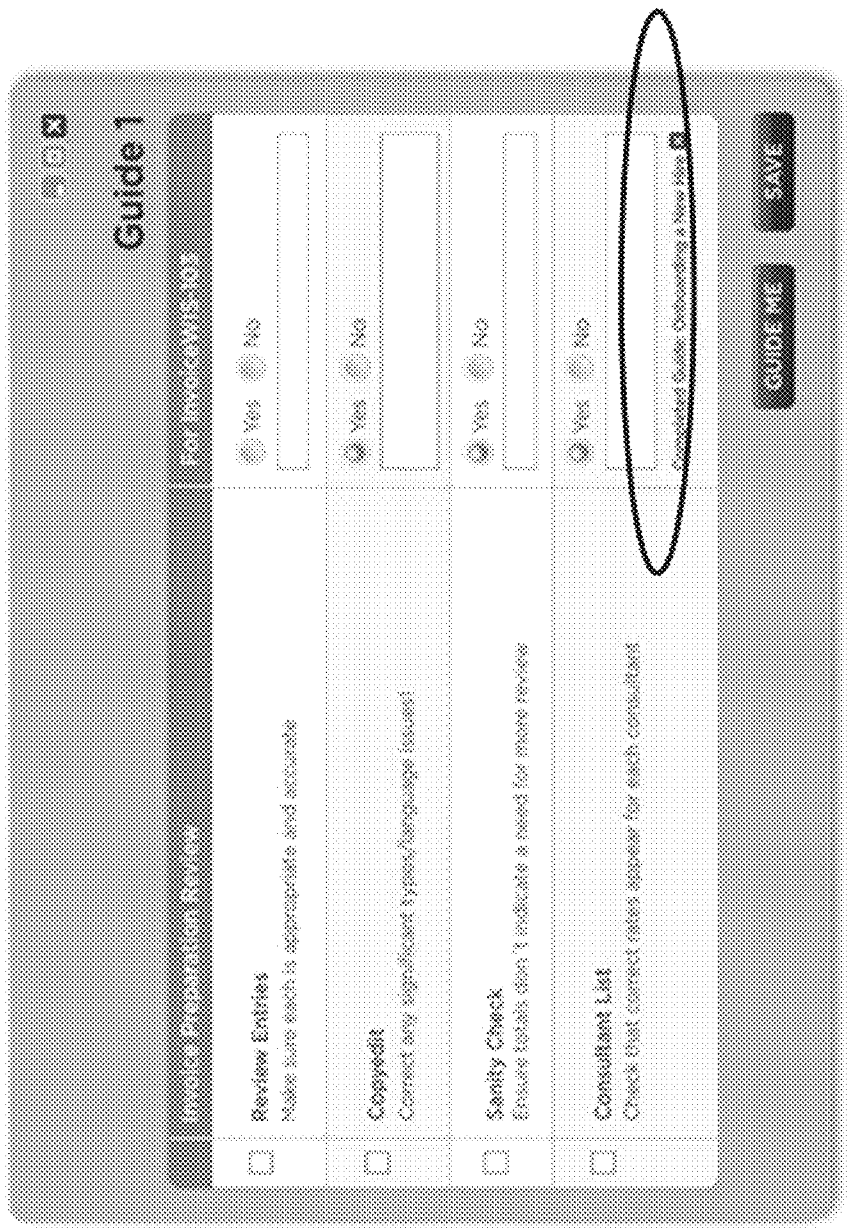

In accordance with some embodiments, as shown in FIG. 7, when using an interactive checklist, a "Guide Me" option can be presented by a hardware processor to a user. In response to a hardware processor receiving a selection of the "Guide Me" option, a second interactive checklist can be opened in a separate interface, for example interface 600 of FIG. 6, for the user to consult. The user can view or complete the interactive checklist. Afterwards, as shown in interface 700 of FIG. 7, the interactive checklist can indicate how the user has utilized the "Guide Me" feature. This can allow for another user, for example, a user auditing the user using the "Guide Me" feature, to see what guidance the user has used. It also can enable the user to return to the "Guide Me" interface.

Figure 8:
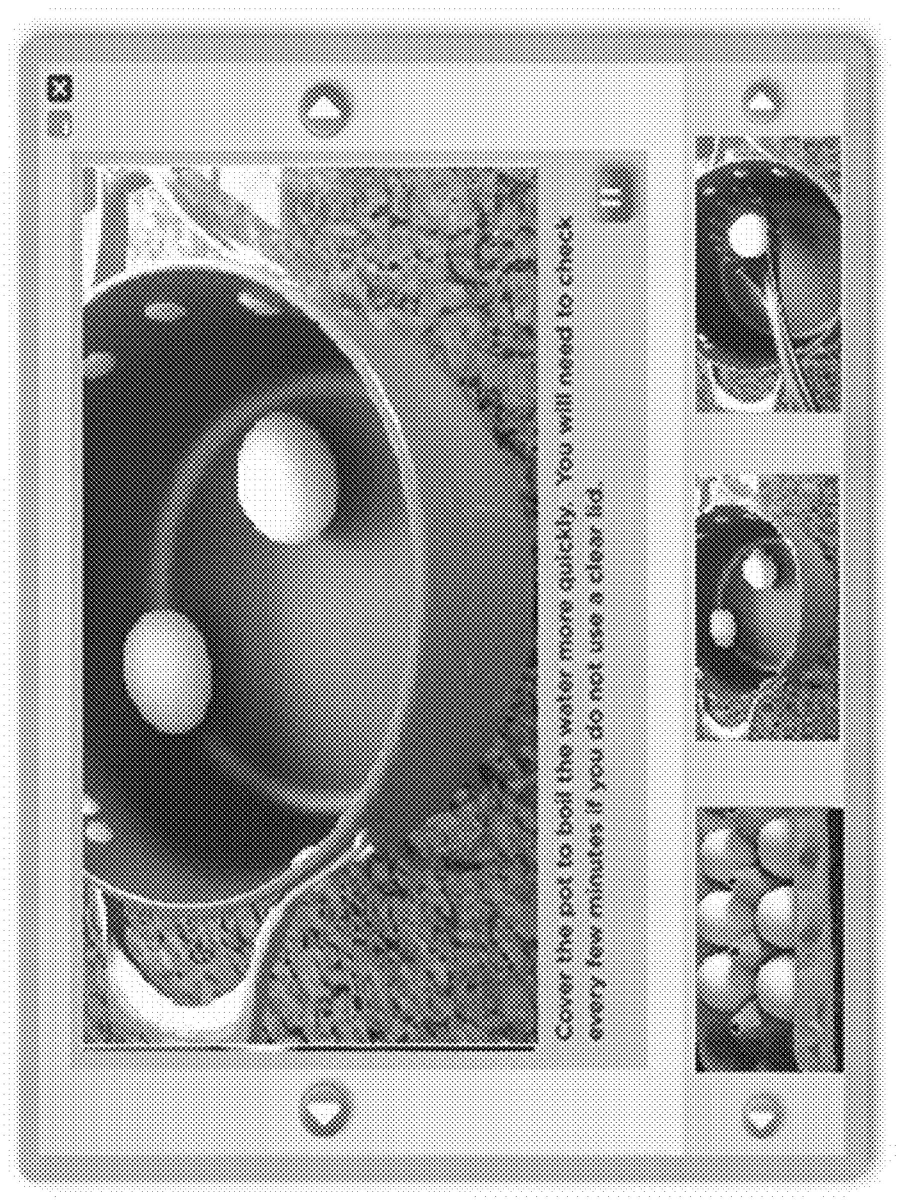
FIGS. 8, 9A, and 9B show examples of user interfaces for presenting a presentation in accordance with some embodiments of the disclosed subject matter.

In some embodiments, using an interface 800 that may be presented by a hardware processor of a computing device, the hardware processor can present a "Show Me" feature that can allow a user to add visual and/or multimedia guidance (e.g., a deck of slides or a video) to a specific step. In response to the hardware processor receiving a user input (e.g., by clicking on a "Show Me" button) in the interactive checklist, the hardware processor can present a video or a presentation of slides in a separate window, for example, the presentation shown in interface 800 of FIG. 8. The hardware processor can present the presentation at a fixed speed allow a user to control playback options (e.g., play, pause, stop, and/or any other suitable playback options), and/or allow a user to navigate to a particular slide in the presentation. Each slide can include one or more elements, for example, text, images, video, downloadable attachments, and/or any other element. The hardware processor can allow a user to add guidance (e.g., slides with texts, images, videos, and/or attachments) as well, that can be available personally, to others (groups, other individuals), and/or to all. Additionally or alternatively, the hardware processor can allow a user to edit existing slides to adjust what the user and/or other users can view depending on permission settings. The user's approval may be required for this to be available to others in some embodiments. For example, the user may choose to accept or not accept the additions and/or changes. In some embodiments, an import feature can retrieve multimedia and text content from a document. Upon importing, the multimedia and text content can be edited or modified.

Figure 9A:
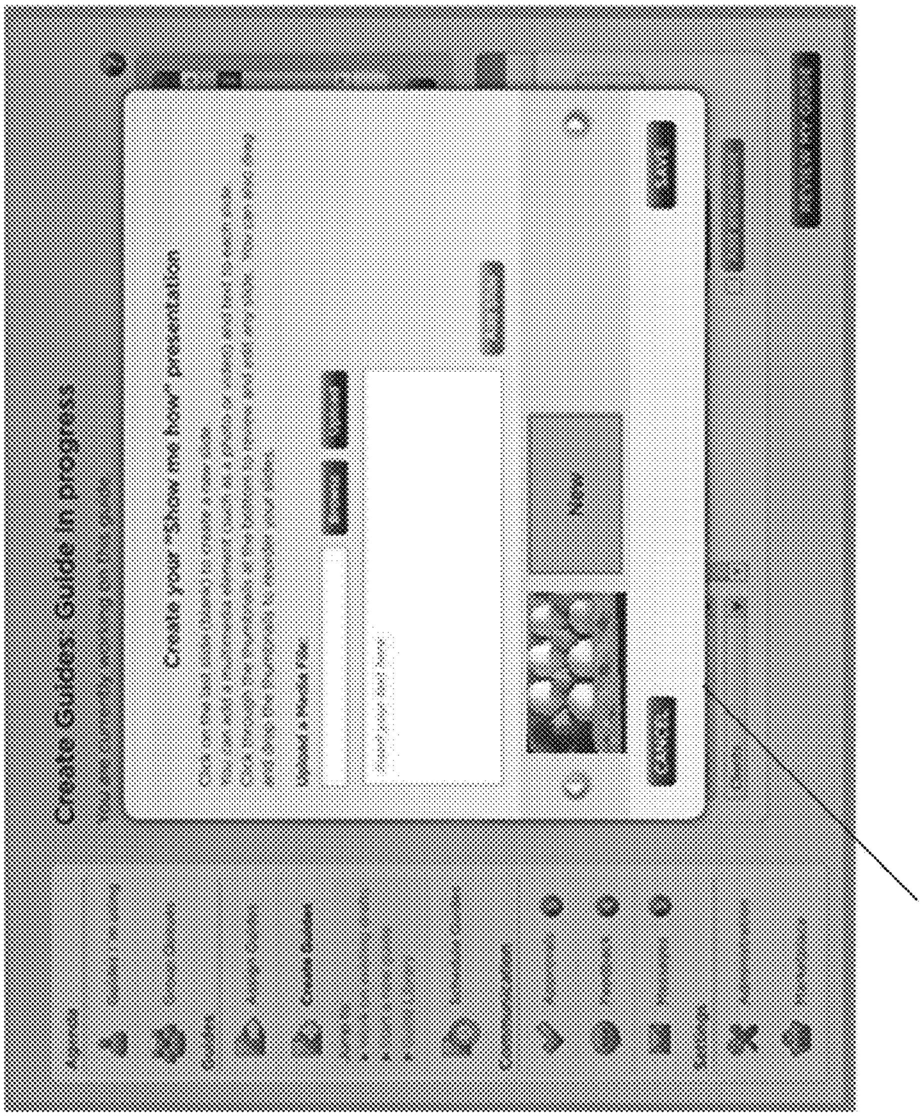
Figure 9B:
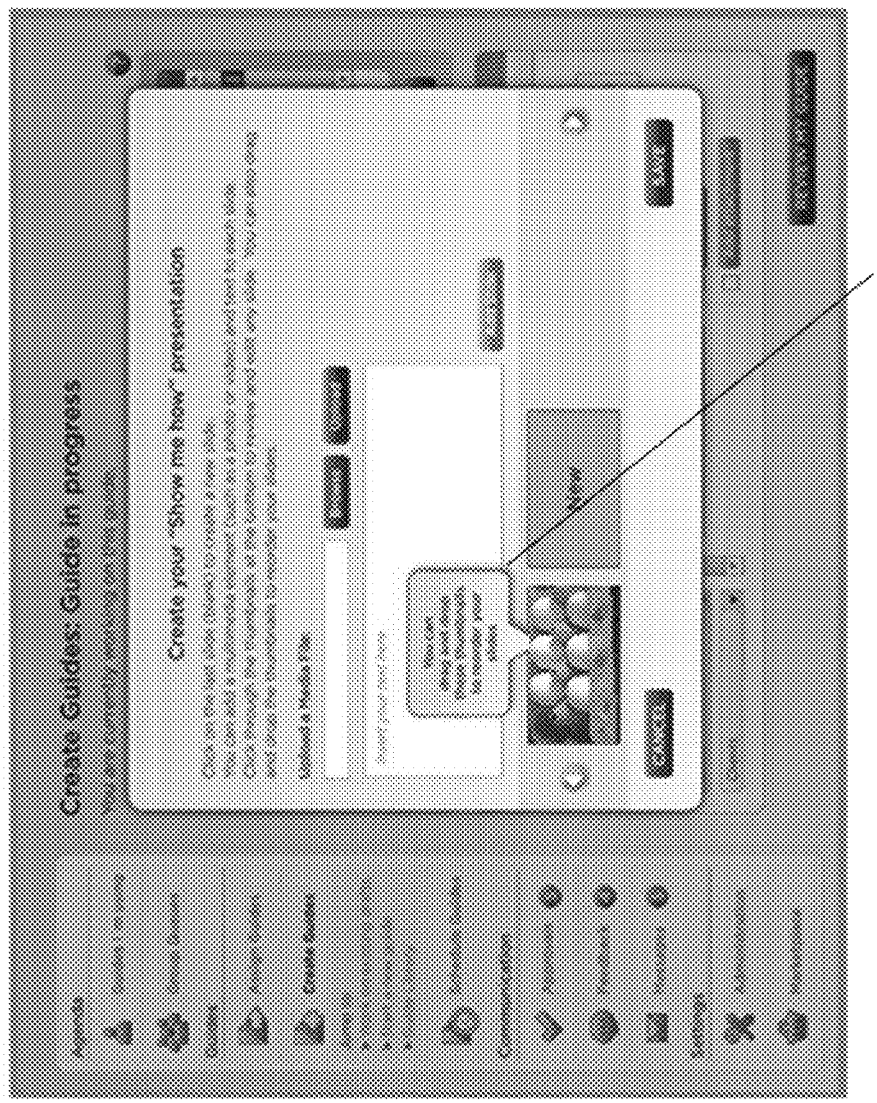

In accordance with some embodiments, when a user opts to include a "Show Me" presentation of slides, using an interface 904 that may be presented by a hardware processor of a computing device, the hardware processor can present a popup window 902, as shown in FIG. 9A. For each slide in the presentation, the hardware processor can receive a multimedia file and/or add text from a user. For example, the hardware processor can receive any suitable screenshot, such as a screenshot of a desktop, a screenshot of a browser window, a screenshot of an application window, and/or any other screenshot. Upon receiving the screenshot, the hardware processor can receive a user input to crop and/or annotate the screenshot (e.g., with text, arrows, and/or highlights) to illustrate an element. The hardware processor can allow the user to add one or more slides in the presentation. In some embodiments, the hardware processor can present a navigational strip having thumbnail previews of the slides at the bottom of popup window 902 that can allow the user to navigate through slides already created. Upon navigating through the thumbnail previews, the hardware processor can present a snippet 906 of entered text when the user hovers over that slide as shown in interface 908 of FIG. 9B. Alternately, the slides can progress automatically, as a slideshow. Optionally, the selection of slides, and optionally the order of slides, may be tailored based on automated determinations that can use any suitable factors, including responses previously given.

Figure 9C:
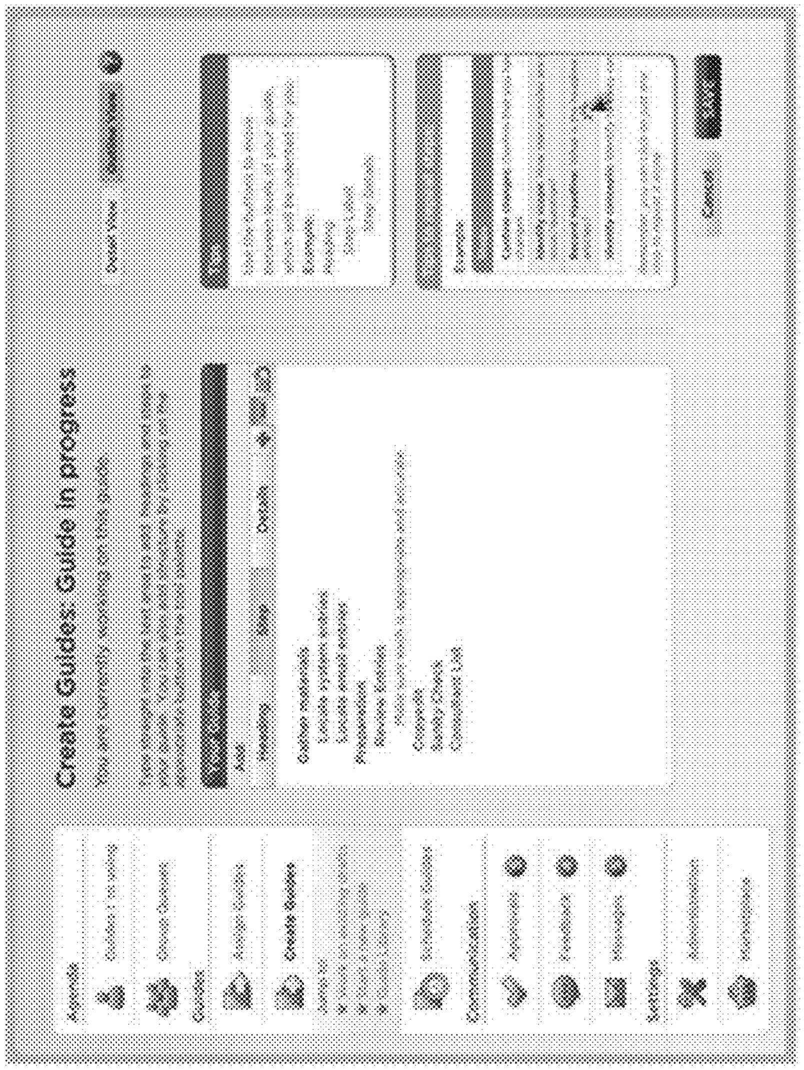
FIGS. 9C and 9D show examples of user interfaces for structuring interactive checklists in accordance with some embodiments of the disclosed subject matter.
Figure 9D:
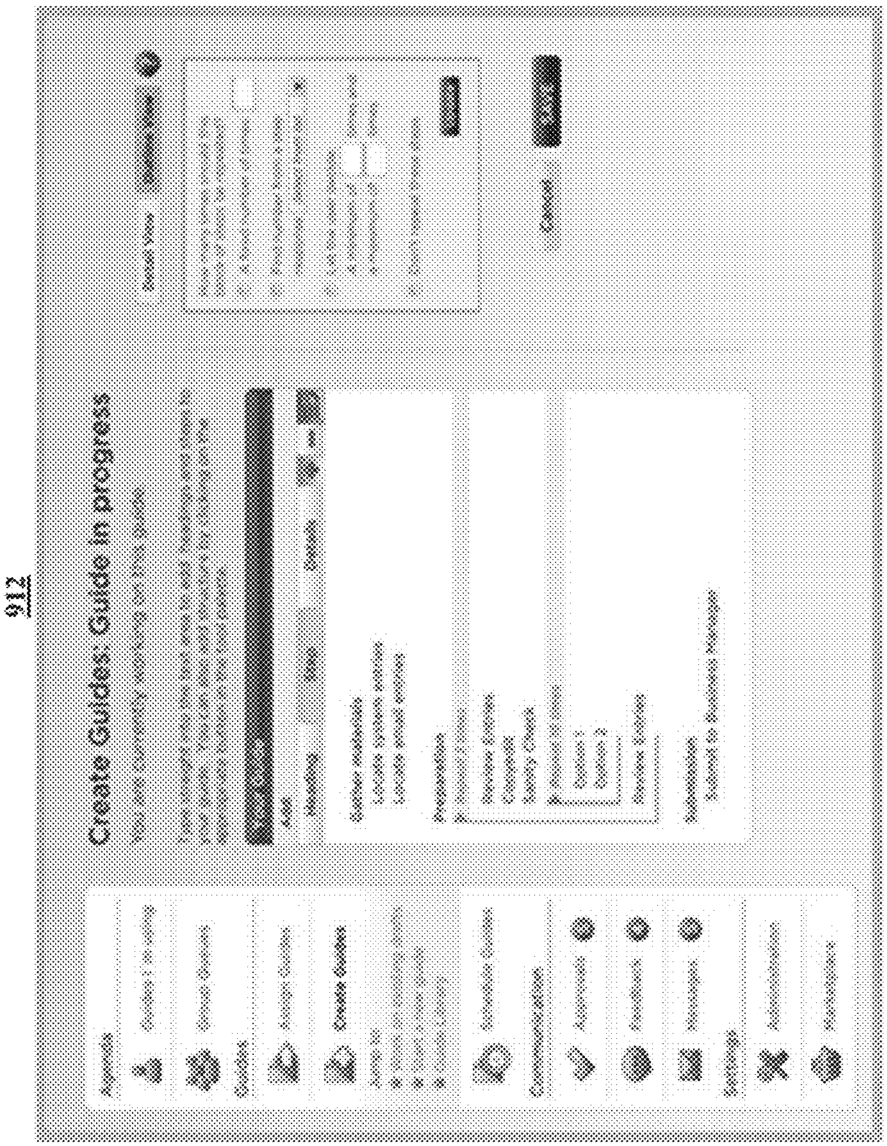

In accordance with some embodiments, the hardware processor can present a guide structure allowing a user to better organize and/or customize an interactive checklist structure, as shown in FIG. 9C. The hardware processor can receive structural elements through a "Create Guide." Additionally or alternatively, the hardware processor can receive structural elements through an outline view. Structural elements can include items such as section (e.g., blocks of steps) and/or as subsections (e.g., nested steps). In some embodiments, other features can be applied to guides structures. For example, the hardware processor can receive a selection of steps and rules to repeat the steps and/or nested set of steps, as shown in interface 912 of FIG. 9D. For example, a Guide can prompt for entry of a number of people, and for each person, the Guide can prompt for entry of a number of phone numbers. The hardware processor can repeat the steps a fixed numbers of time, a number of times based on another response in the guide, a minimum number of times, a maximum numbers of times, as many times as desired by a user, and/or any other suitable numbers of times.

Figure 10:
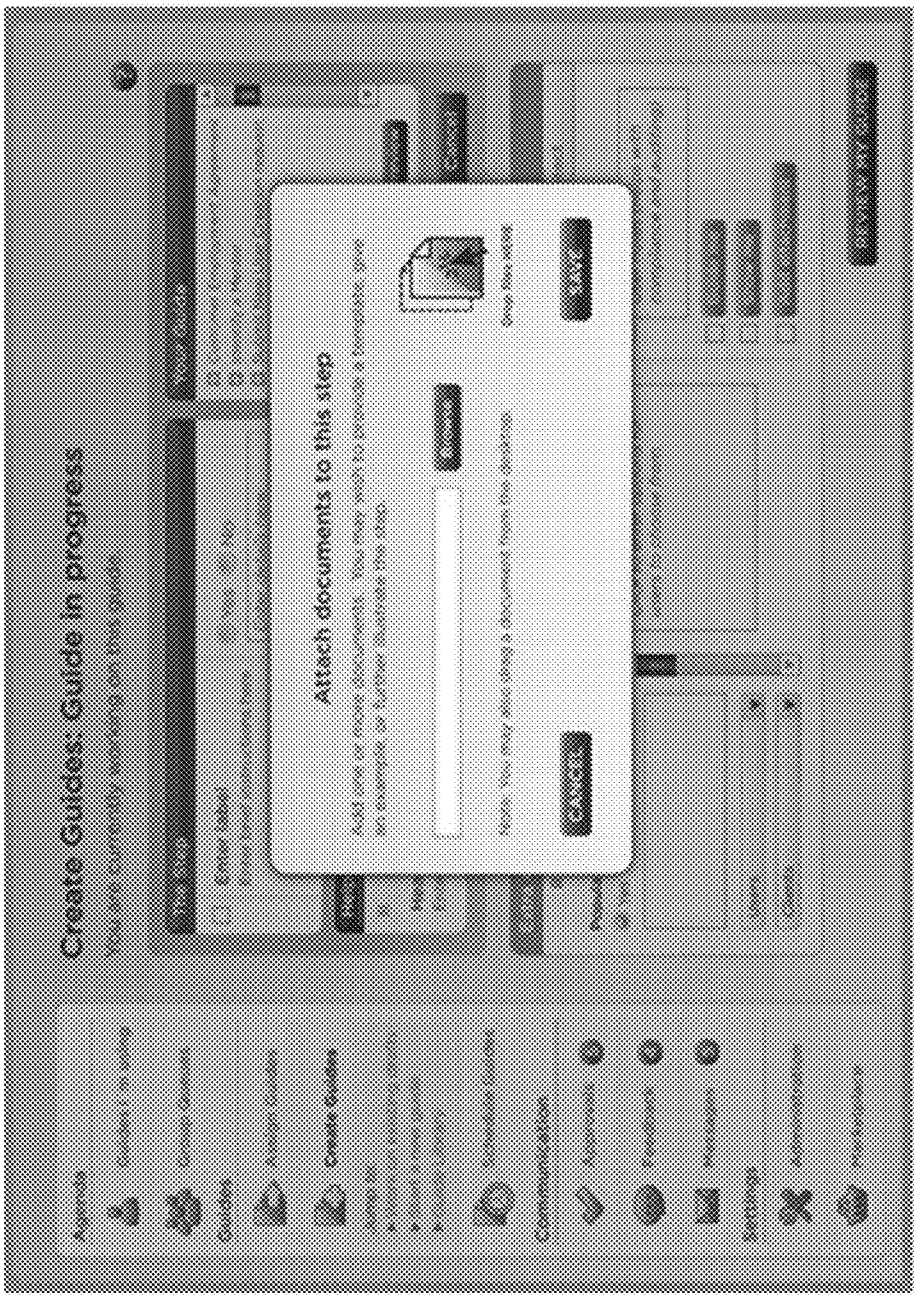
FIGS. 10 and 11 show examples of user interfaces for attaching files to a step in accordance with some embodiments of the disclosed subject matter.
Figure 11:
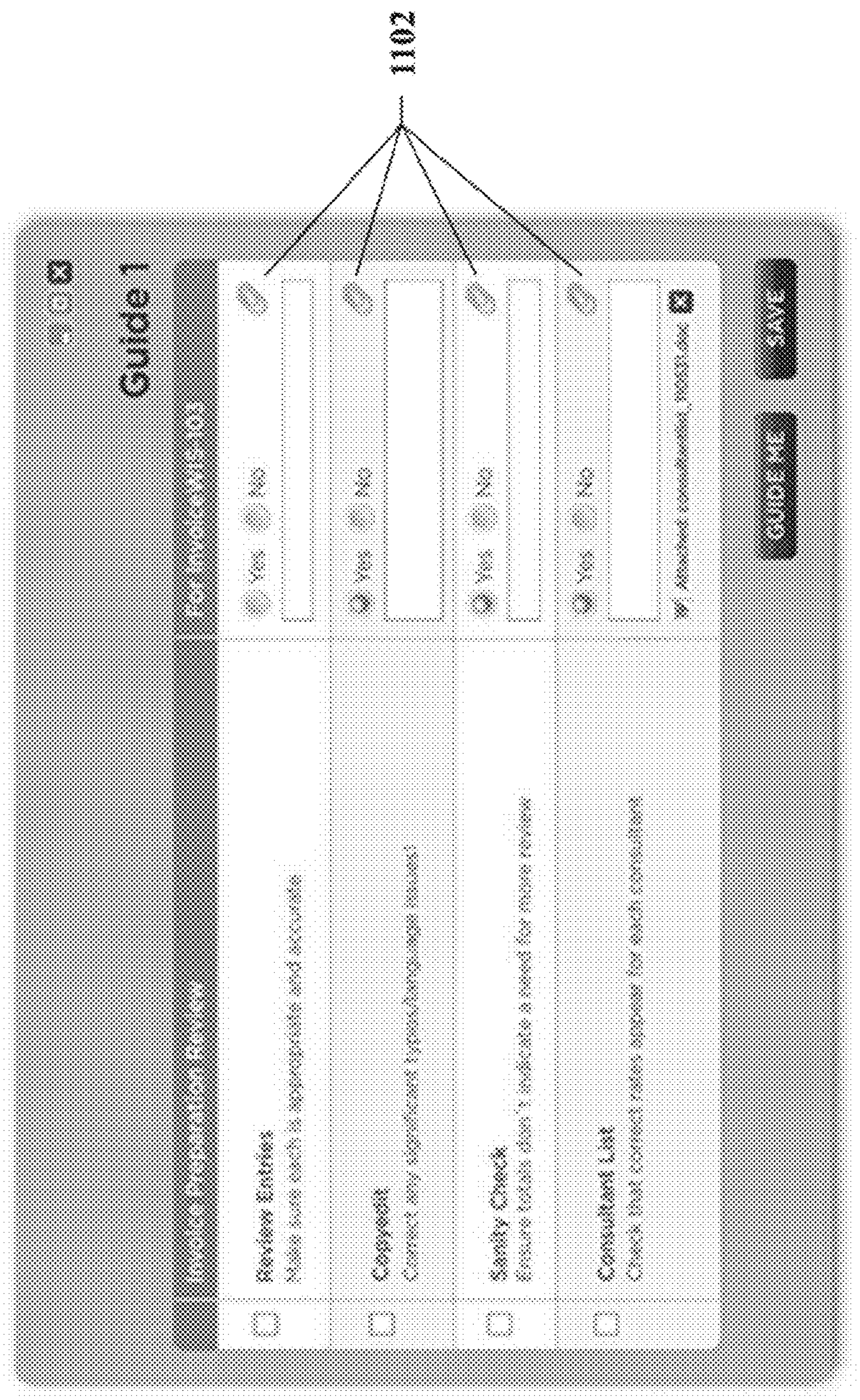

As shown in interface 1000 of FIG. 10, using an interface 1000 that may be presented by a hardware processor of a computing device, the hardware processor can allow a user can attach one or more types of files to a step as an attachment. The attachment can appear in the interactive checklist to benefit the user. For example, in some embodiments, using an interface 1100 that may be presented by a hardware processor of a computing device, the hardware processor can present attachments 1102 as shown in FIG. 11. Attachments can be used as examples to further illustrate how to complete a step. A user may also attach a template for the user to follow.

Figure 12A:
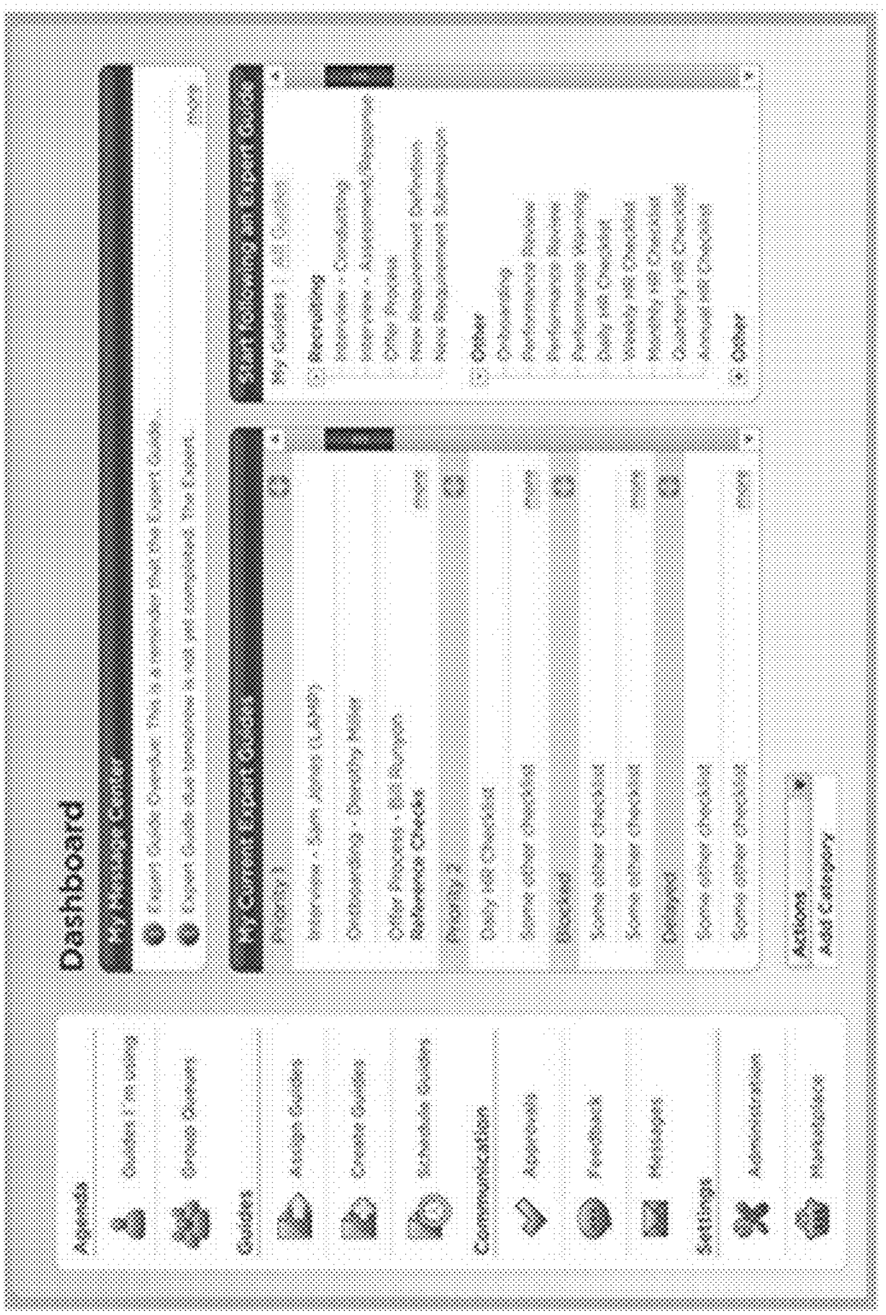
FIGS. 12A and 12B show examples of user interfaces for presenting a dashboard in accordance with some embodiments of the disclosed subject matter.
Figure 12B:
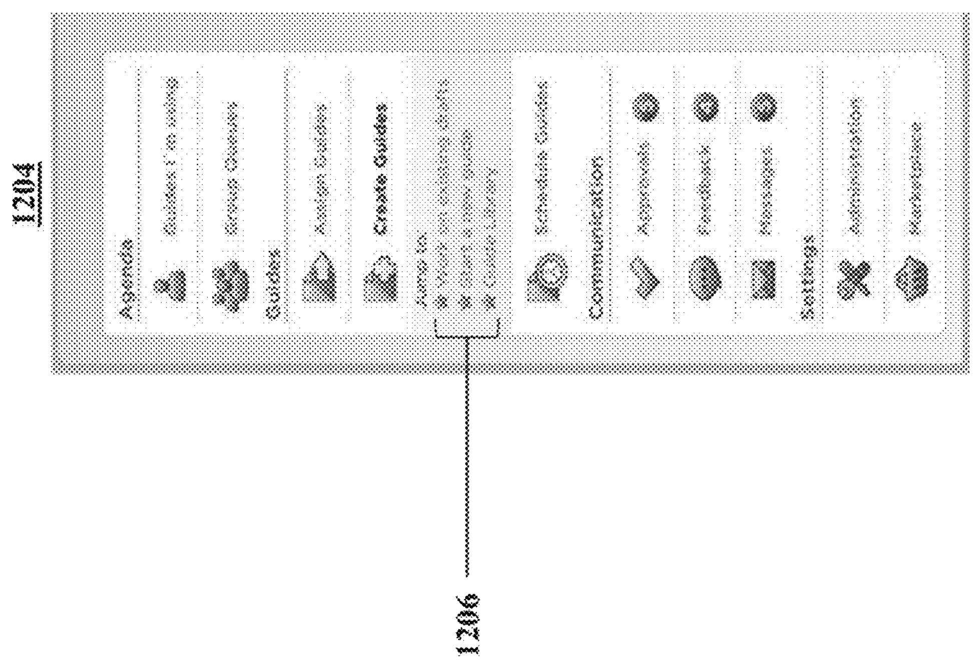

In accordance with some embodiments, using an interface 1202 that may be presented by a hardware processor of a computing device, the hardware processor can receive login information from a user. Upon receiving the login information, the hardware processor can present a dashboard, as shown in interface 1202 of FIG. 12A. The dashboard can contain one or more useful widgets that can help the user resume their work. The hardware processor can allow the user to view new internal messages, work on interactive checklists that have been assigned to them, access new interactive checklists, review alerts, review report summaries, and/or access any other widgets. The hardware processor can present a navigation menu 1204 on the left side of each screen as shown, for example in FIG. 12B. Each tab can allow the user to access a core component of the interactive checklist. Upon the hardware processor receiving a selection at a tab, the hardware processor can present a sub-navigation menu from the selected tab. For example, the hardware processor can present sub-navigation menu 1206 on navigation menu 1204 of FIG. 12B. This can allow the user to access key features on that tab. New communications can be brought to the user's attention with indicators. Alternately these dashboard widgets, or variants, may be used with any suitable third-party dashboard systems such as iGoogle™.

Figure 12C:
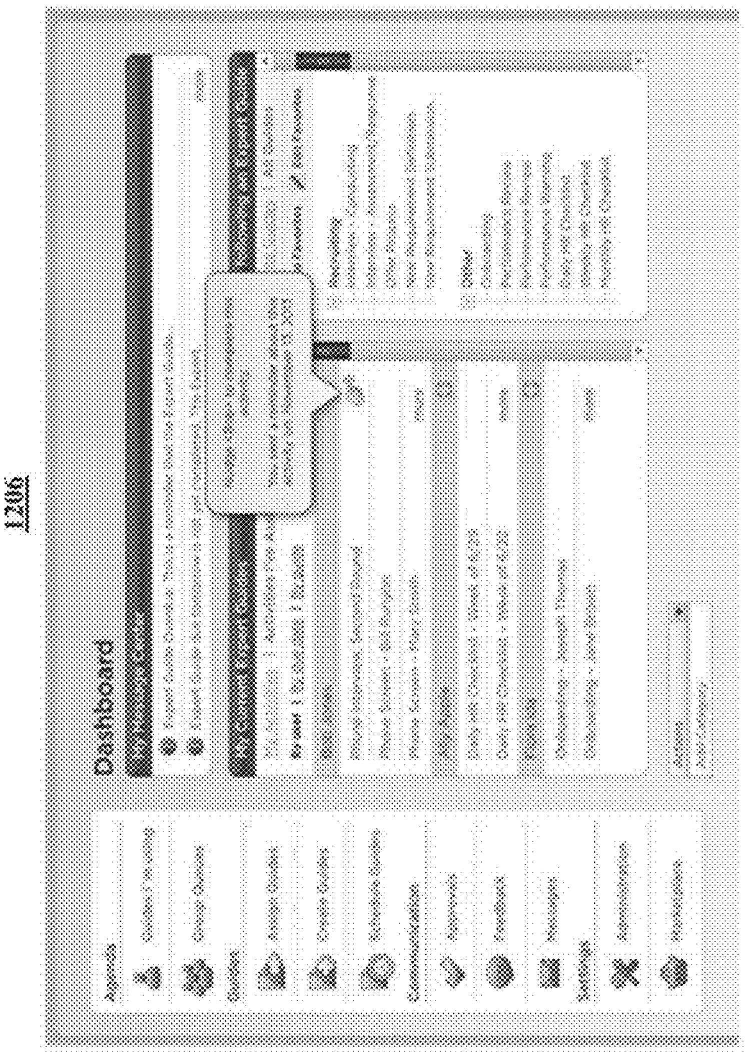
FIGS. 12C and 12D show examples of user interfaces for reminding a user to complete an activity in accordance with some embodiments of the disclosed subject matter.
Figure 12D:
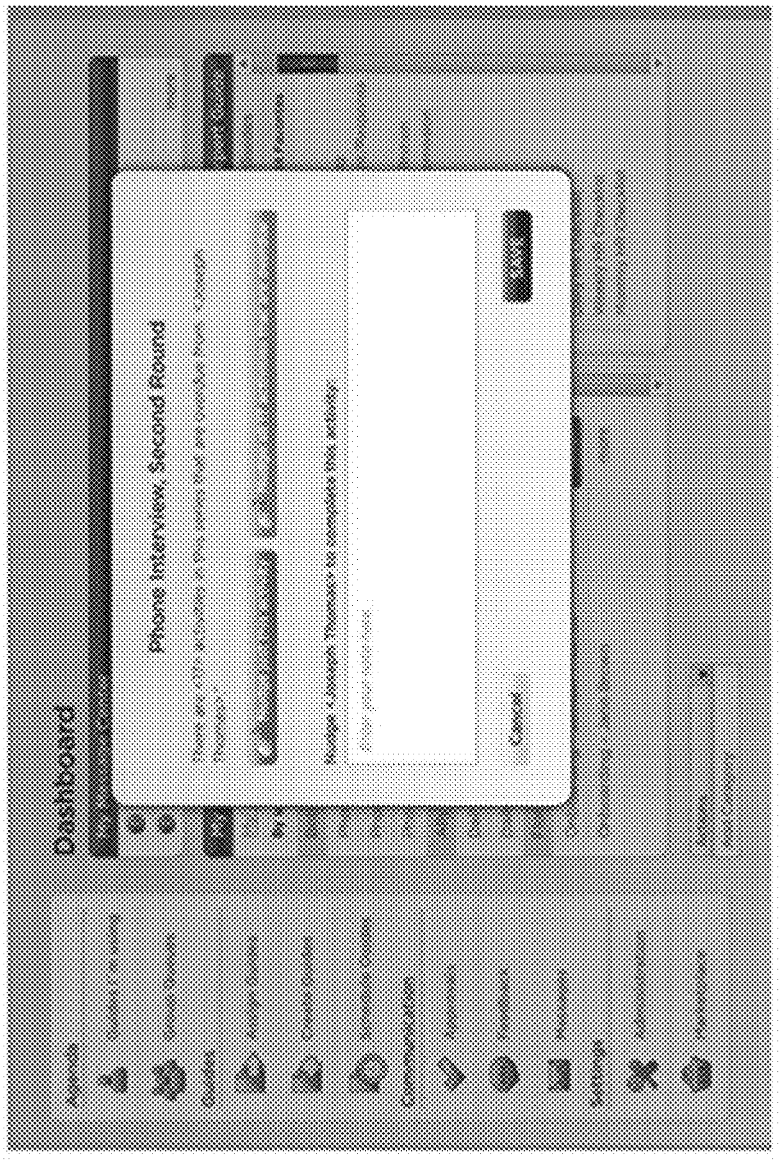

In accordance with some embodiments, the hardware processor can present outstanding assignments to remind users about overdue activities. The hardware processor can receive a user input to send additional reminders to other users about the overdue activities. The reminders can include additional information relevant to each individual situation. In some embodiments, if the overdue activity has not been completed, the hardware processor can present a "Nudge Feature" to remind and encourage completion of the activity, as shown in interface 1206 in FIG. 12C.

In accordance with some embodiments, the hardware processor can present smart suggestion based on a user's situation and selections. For example, if a user wishes to send a manual reminder about an activity in a series of activities (e.g., preparing weekly reports), the hardware processor can suggest sending reminders for other outstanding activities in the series. In such an example, the hardware processor can present a single reminder to be sent to cover a single activity or a series of related activities (e.g., all activities in a series that are overdue).

Figure 13:
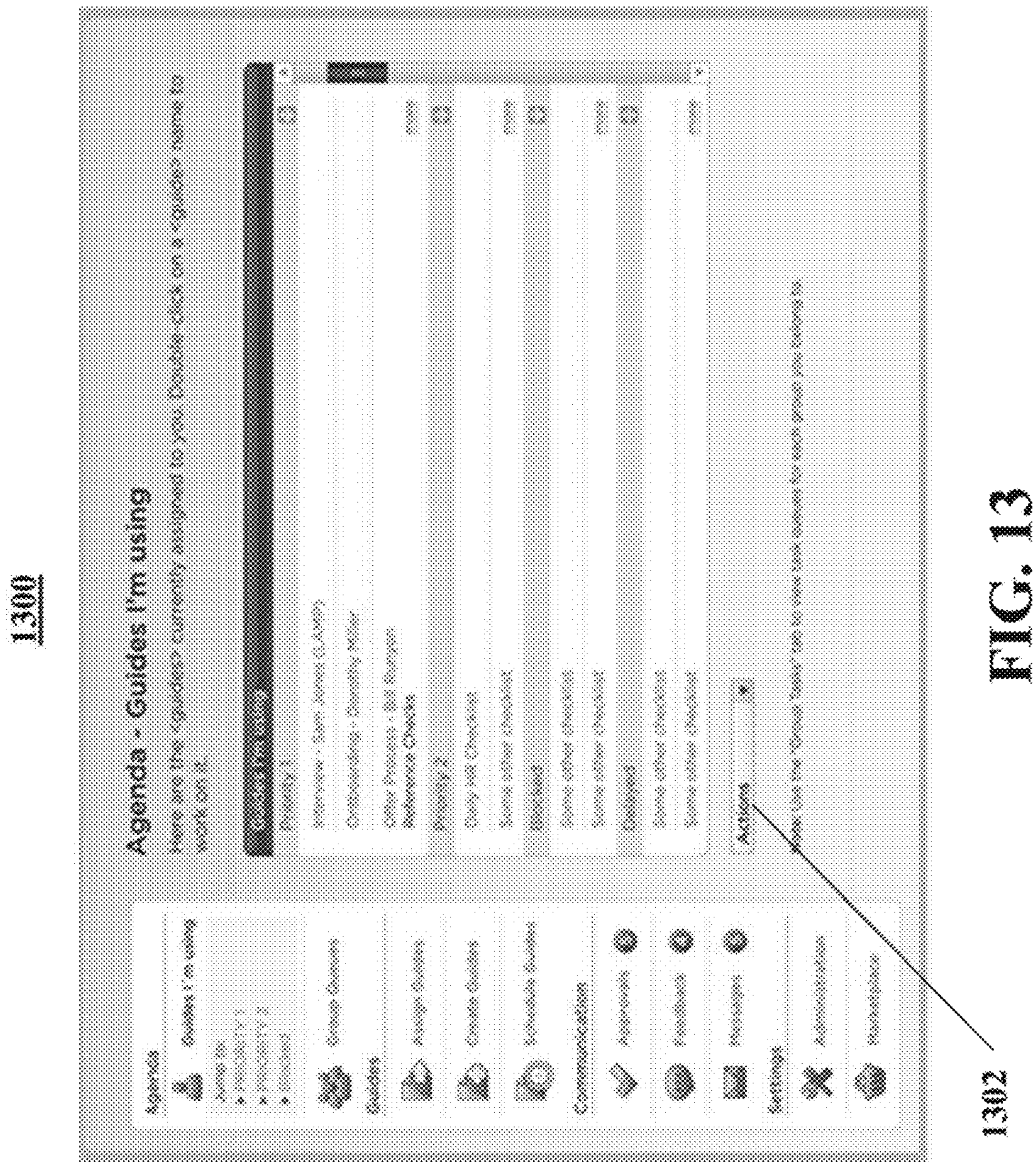
FIGS. 13 and 14 show examples of user interfaces for assigned interactive checklists in accordance with some embodiments of the disclosed subject matter.
Figure 14:
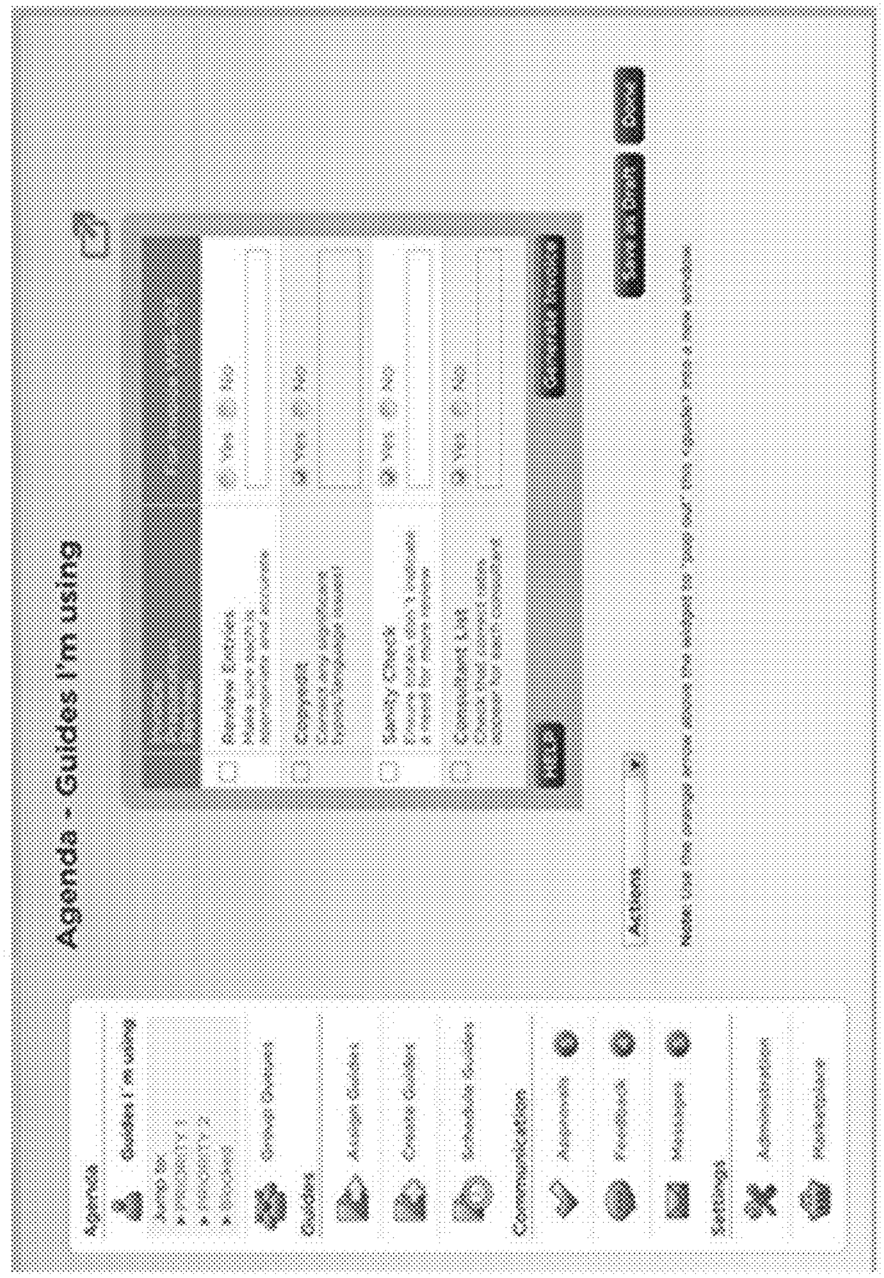

In accordance with some embodiments, using an interface 1300 that may be presented by a hardware processor of a computing device, the hardware processor can present an interactive checklist assigned to a user using a "My Activities" features. Upon selecting "My Activities" tab 1302, the hardware processor can present a list, as shown, for example, in interface 1300 of FIG. 13. In another example, a user can also access this list on a dashboard. The hardware processor can allow the user to organize the interactive checklists into categories of their choosing, such as "Priority 1, Priority 2, Priority" and/or "This Week, Next Week, In Two Weeks." In accordance with some embodiments, nested "child-level" checklists of an Activity that can be viewed at "My Activities" will not be displayed there. In accordance with some embodiments, the hardware processor can allow a user can reorder or move interactive checklists from one category to another using a drag and drop mechanism. Once a particular interactive checklist is selected from the list, the hardware processor can take the user to an interface within the interactive checklist itself. In some embodiments, using an interface 1400 that may be presented by a hardware processor of a computing device, the hardware processor can allow a user to work on the interactive checklist, for example as shown in FIG. 14. Additionally or alternatively, the hardware processor can present the interactive checklist from this interface to a new, second interface. The hardware processor can receive a number of user inputs indicating actions such as including, splitting, unsplitting, delegating and/or undelegating steps.

Figure 15:
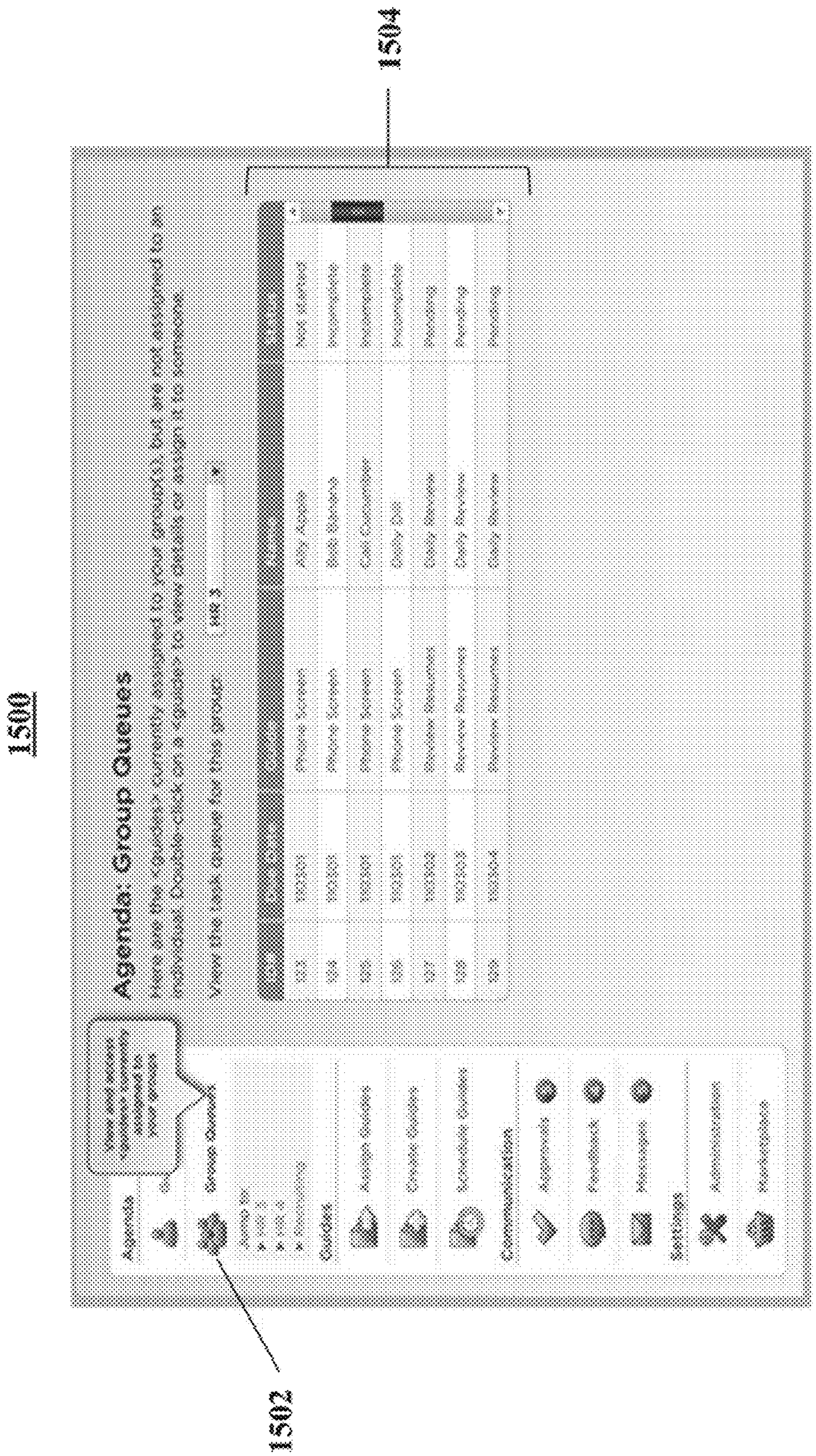
FIGS. 15 and 16 show examples of user interfaces for presenting group queues in accordance with some embodiments of the disclosed subject matter.
Figure 16:
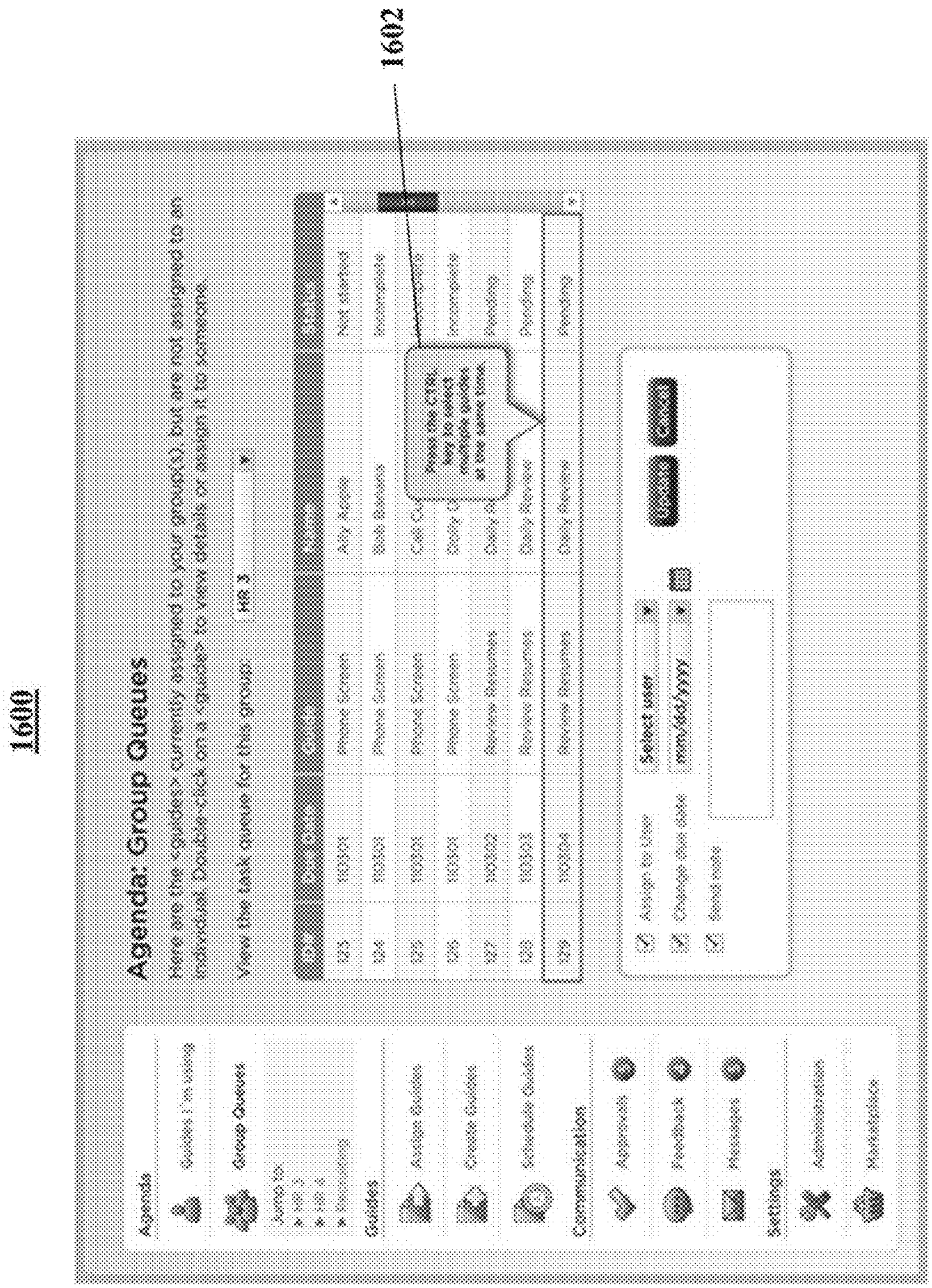

In accordance with some embodiments, as shown in FIG. 15, using an interface 1500 that may be presented by a hardware processor of a computing device, the hardware processor can receive a user input at "Group Queues" tab 1502 (e.g., by clicking). Upon receiving the user input at tab 1502, the hardware processor can display interactive checklists that have been assigned to groups to which they belong, either as specific groups and/or as aggregates of specific groups. For each group, the hardware processor can display the assigned interactive checklists, due dates and/or time, current status, and/or any other available information as shown in table 1504 of interface 1500 of FIG. 15. The hardware processor can receive user actions on the interactive checklists in group queues, either by assigning an interactive checklist to an individual user (e.g., with a note) and/or by changing the due date of the interactive checklist. Such actions can be performed on individual interactive checklists and/or in bulk on multiple interactive checklists at once. For example, snippet 1602 of interface 1600 of FIG. 16 shows that multiple interactive checklists can be selected at the same time. In some embodiments, an assignment may be made as a "suggested assignment", which can be accepted, reassigned or possibly taken by another user, possibly depending on context.

In some embodiments, a user can request that another user create a new interactive checklist or update an existing interactive checklist. For example, a user can assign the creating of an interactive checklist to another user (e.g., someone who has previously done the activity). Additionally and/or alternatively, the user can assign the creating of the interactive checklist to the other user in conjunction with a particular activity that the other user should complete. In such an example, the other user can create the interactive checklist and complete the particular activity at the same time. Upon completion of the interactive checklist, the interactive checklist can be routed to any approvers, who can approve it or send it back for modification. In some embodiments, a user can choose to fill in details of a "Test Activity" while completing the activity to determine how the activity should be completed and identify missing elements.

Figure 17:
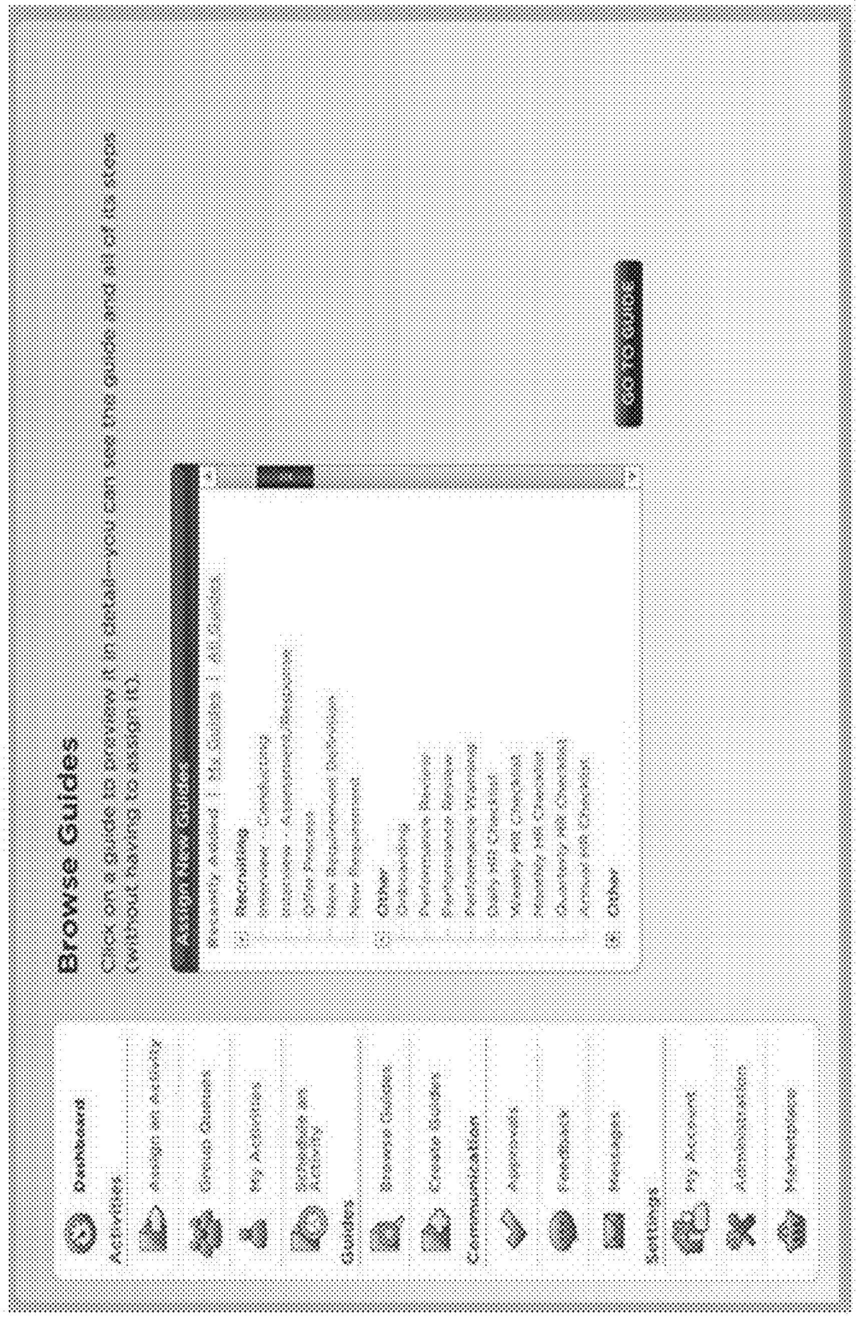
FIGS. 17, 18A, and 18B show examples of user interfaces for navigating an existing library of interactive checklists in accordance with some embodiments of the disclosed subject matter.
Figure 18A:
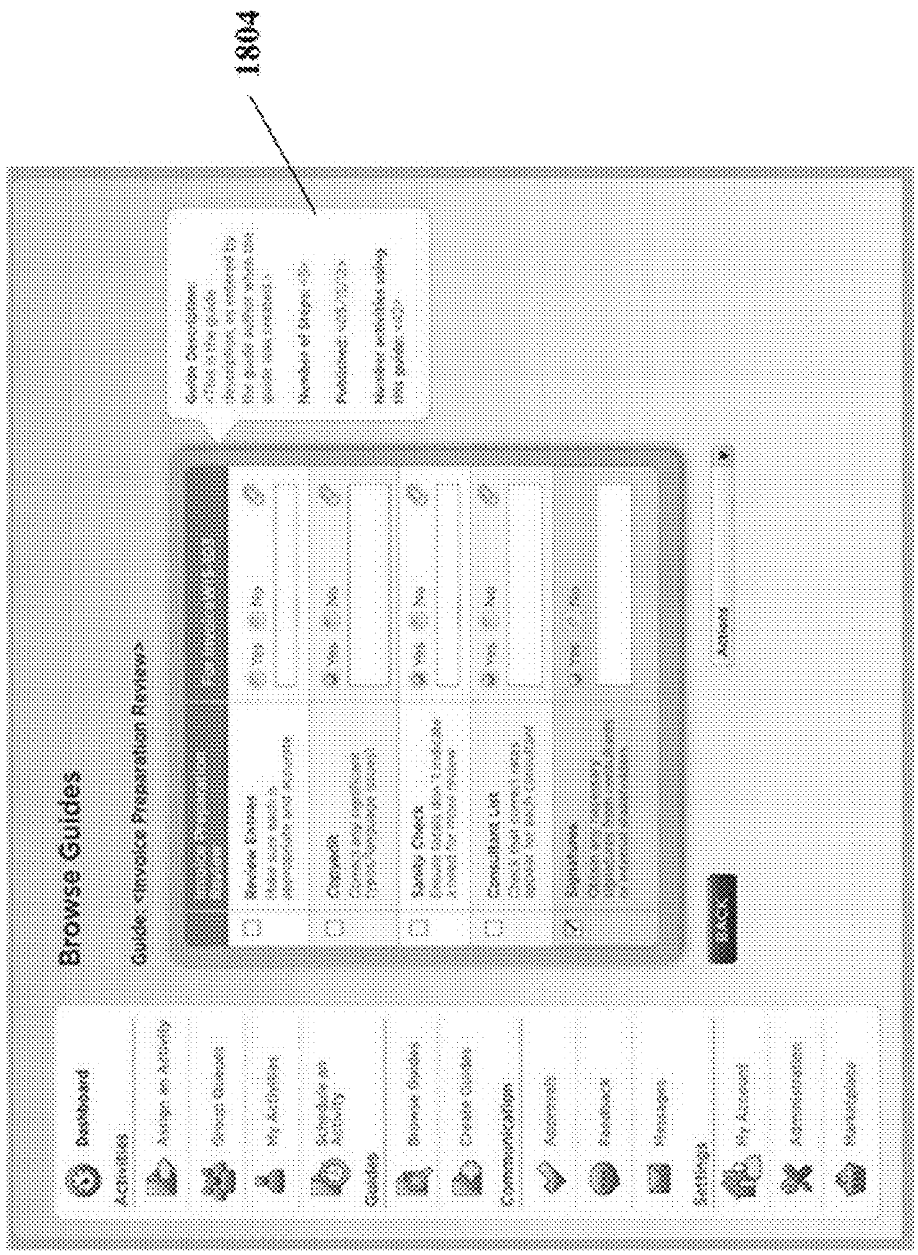

In accordance with some embodiments, using an interface 1700 that may be presented by a hardware processor of a computing device, the hardware processor can allow navigation of an existing library of interactive checklists. The hardware processor can allow the user to view all interactive checklists available to them through a number of filters, as shown, for example, in interface 1700 of FIG. 17. Once an interactive checklist is selected, the hardware processor can display the full interactive checklist in detail. Additional information about the interactive checklist, such as a description, a number of times it has been used, as well as any other additional information can be presented by the hardware processor to help give the user context. For example, as shown, in FIG. 18A, using a user interface 1800 that may be presented by a hardware processor of a computing device, the hardware processor can display for a checklist, a description of the checklist, a number of times it has been used, a publication date, and a number of activities performed using the interactive checklist at area 1804. The user can take actions using the selected interactive checklist, if desired. In some embodiments, the user's track record for completing the interactive checklist successfully and for completing the interactive checklist by the deadline can be shown when an assignment is being created.

Figure 18B:
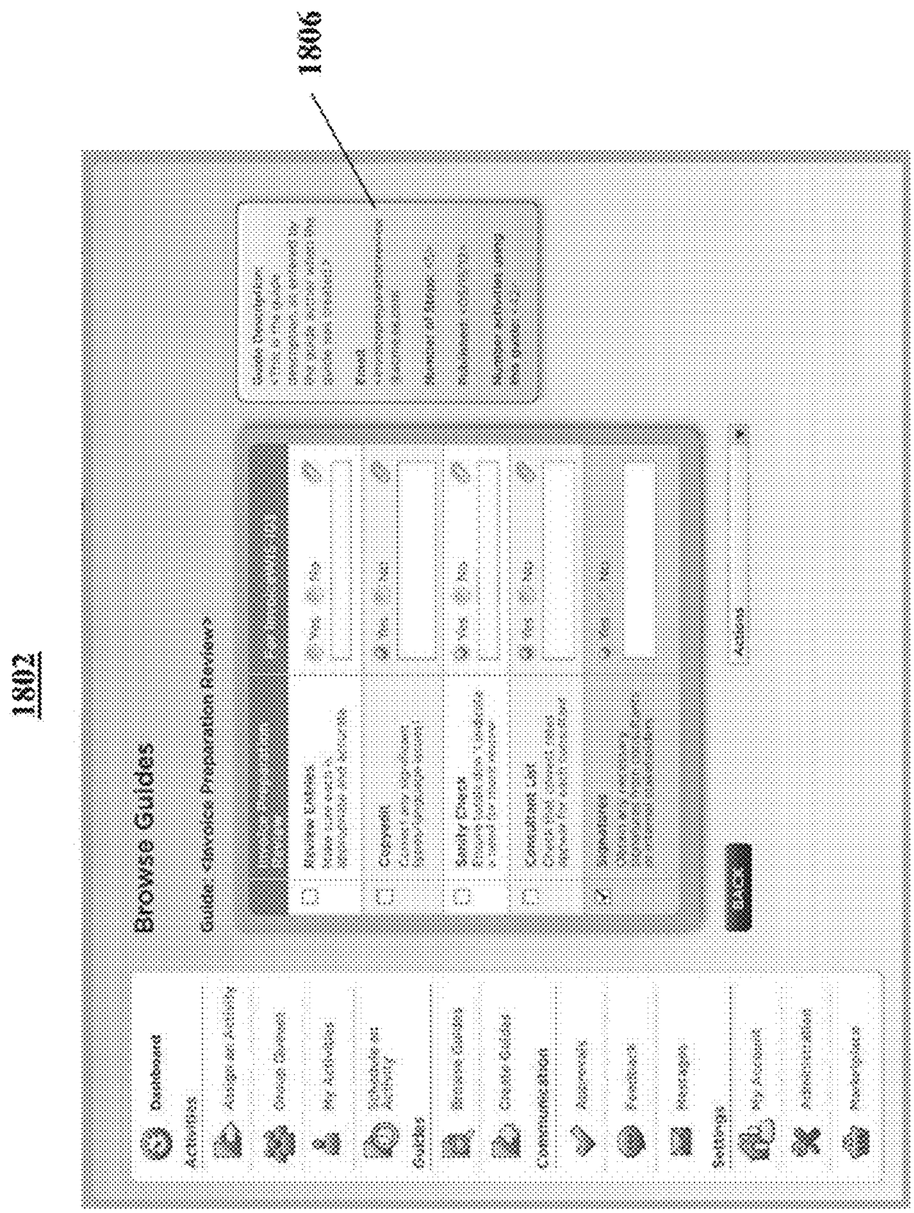

Turning to FIG. 18B, as shown in interface 1804, the interactive checklist is automatically given an email address as shown in 1806. A user can carbon copy or forward an email to any email address of the interactive checklist. Additionally or alternatively, an activity can be automatically created (filled in with details) and sent to all the users in an email confirmation. Any follow-up messages in an email chain may be recorded. Moreover, a user can carbon copy the email address to ensure that the email does not get lost or misplaced (e.g., spam filter).

Figure 18C:
FIGS. 18C, 18D, and 18E show examples of user interfaces for prefilling answers to one or more steps in accordance with some embodiments of the disclosed subject matter.
Figure 18D:
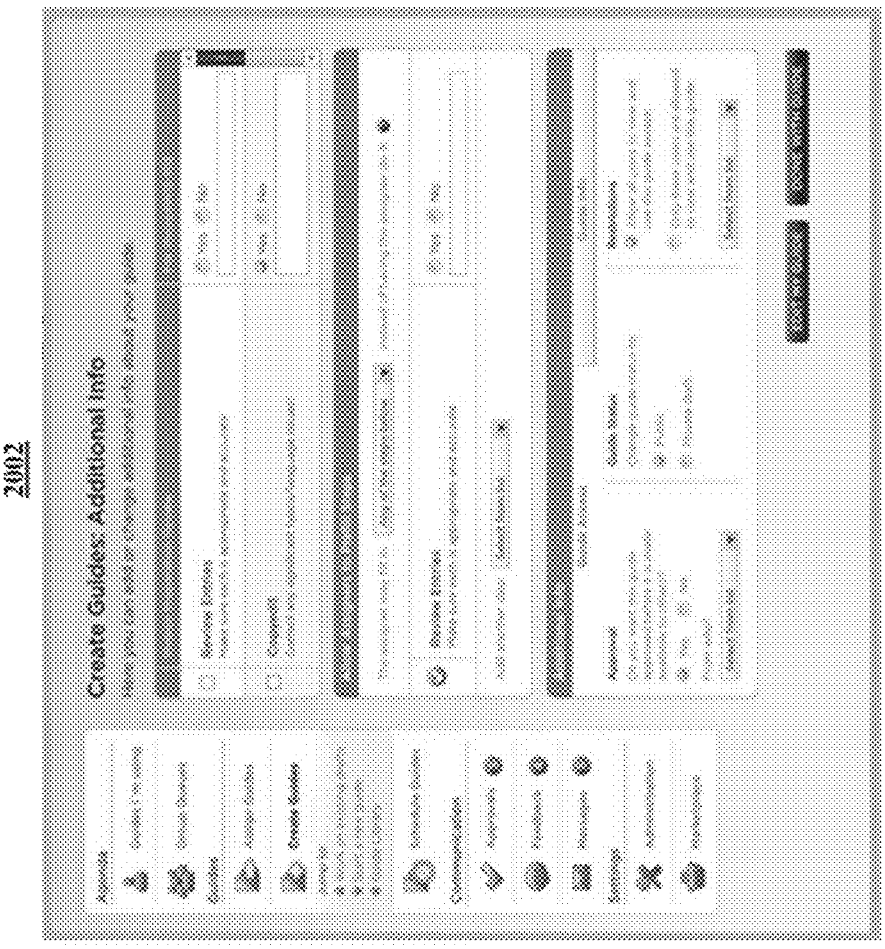
Figure 18E:
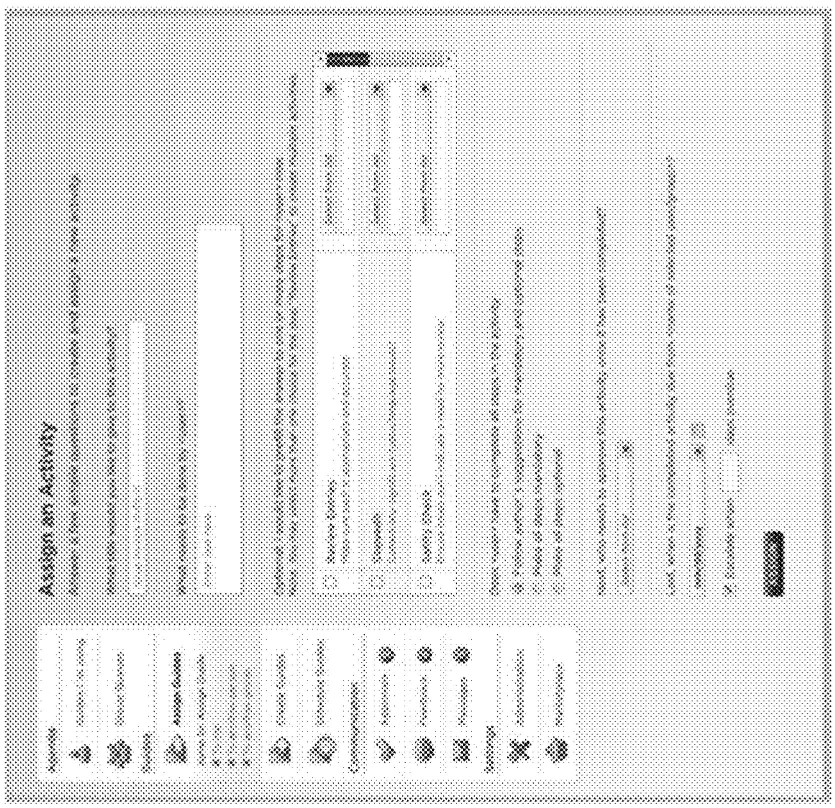

In accordance with some embodiments, the hardware processor can receive a user input indicating that a user has prefilled answers to one or more steps in an activity, as shown in interface 1808 of FIG. 18C. Upon assigning an activity, the hardware processor can receive a user input indicating that a user is prefilling the answers to one or more steps in the activity. In such an instance, a user of the original guide can optionally include requirements or restrictions for prefilling the steps, as shown in interface 1810 of FIG. 18D. In some embodiments, the hardware processor can receive a user input indicating one or more parameters and that the user is assigning multiple activities for each parameters, as shown in interface 1812 of FIG. 18E. For example, assigning multiple activities for each parameter can include assigning the same report to multiple employees, following the same sales process for multiple different prospects, preparing monthly invoices for each of a company's clients, assigning a project update report for multiple projects to a single individual, and/or any other suitable scenario. In some embodiments, the prefilled answers can be retrieved from external sources (e.g., a Web service or a database) or through data stored internally.

Figure 19A:
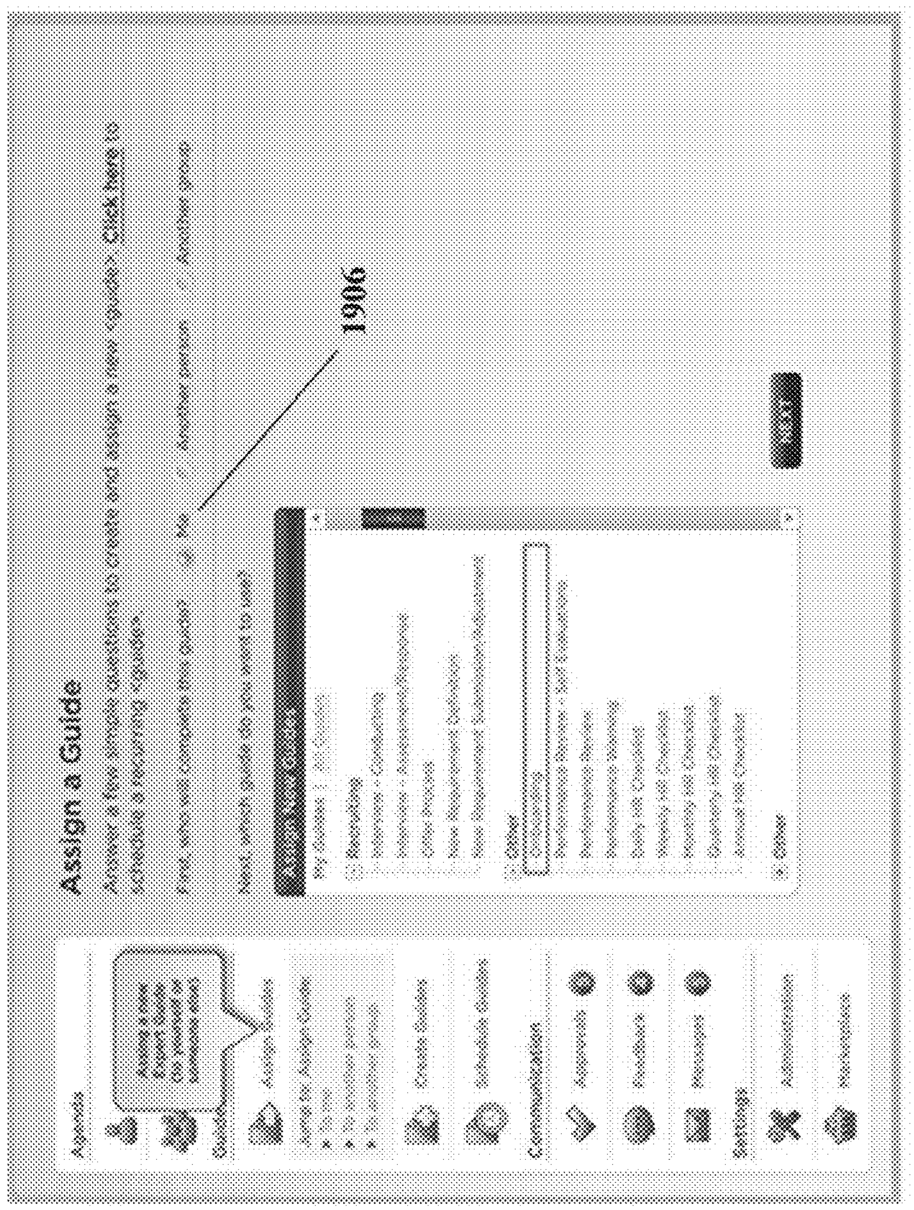
FIGS. 19A, 19B, 20A, 20B, and 20C show examples of user interfaces for assigning interactive checklists in accordance with some embodiments of the disclosed subject matter.
Figure 19B:
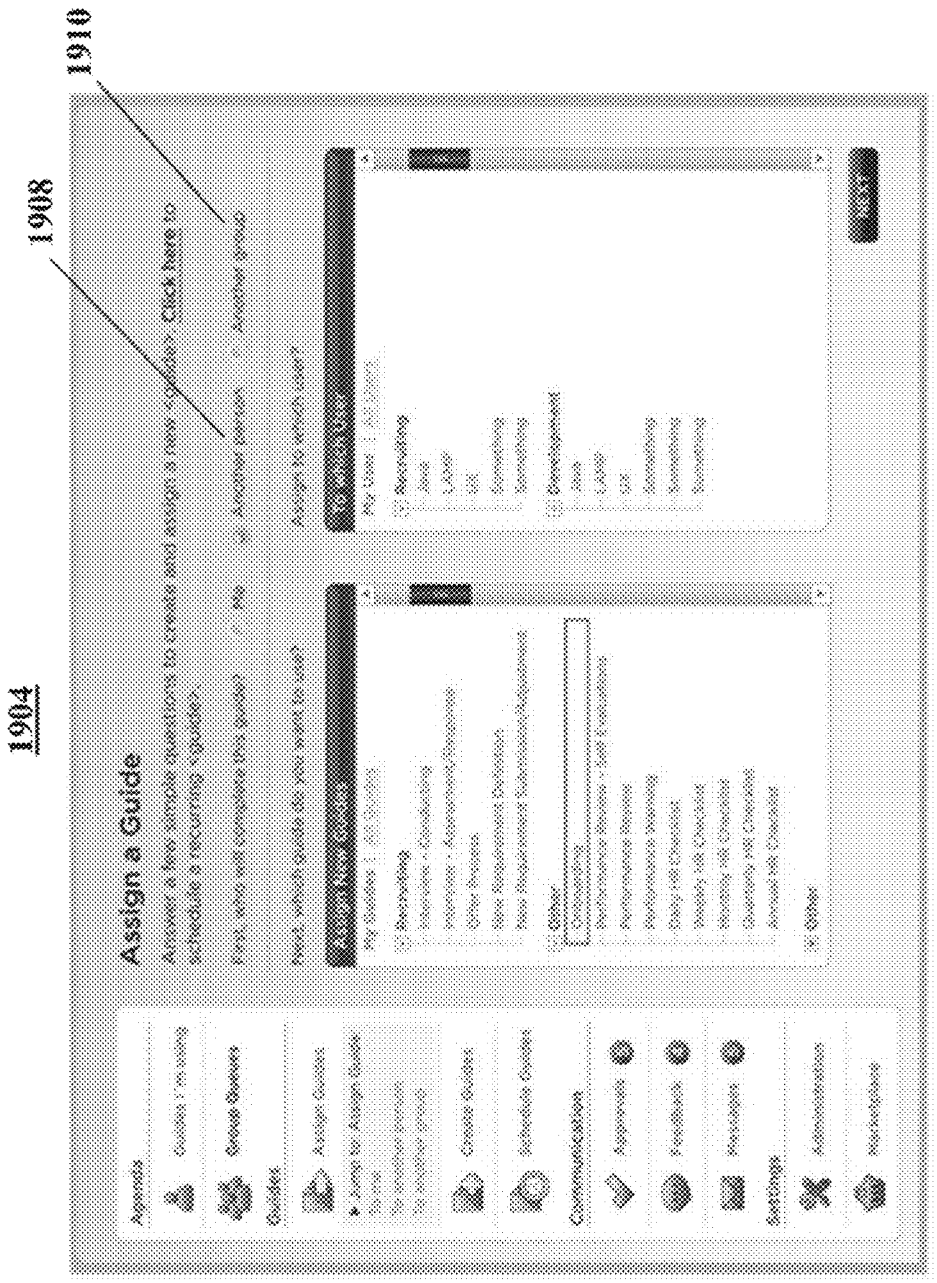

In accordance with some embodiments, using an interface 1902 that may be presented by a hardware processor of a computing device, the hardware processor can display questions for a user to answer. An example is shown in interfaces 1902 and 1904 of FIG. 19A and FIG. 19B. First, the hardware processor can receive a user selection of who can complete the interactive checklist, and receive a user selection of which interactive checklist can be used. If the interactive checklist is assigned to the user, the user can select to which individual user or which group of users to assign the interactive checklist. For example, in interface 1902 of FIG. 19A, the user has selected "Me" 1906, while in interface 1904 of FIG. 19B the user has selected "Another Person" 1908. Alternately multiple assignments can be made at once, to more than one user and/or group of users by selecting "Another Group" 1910.

Figure 20A:
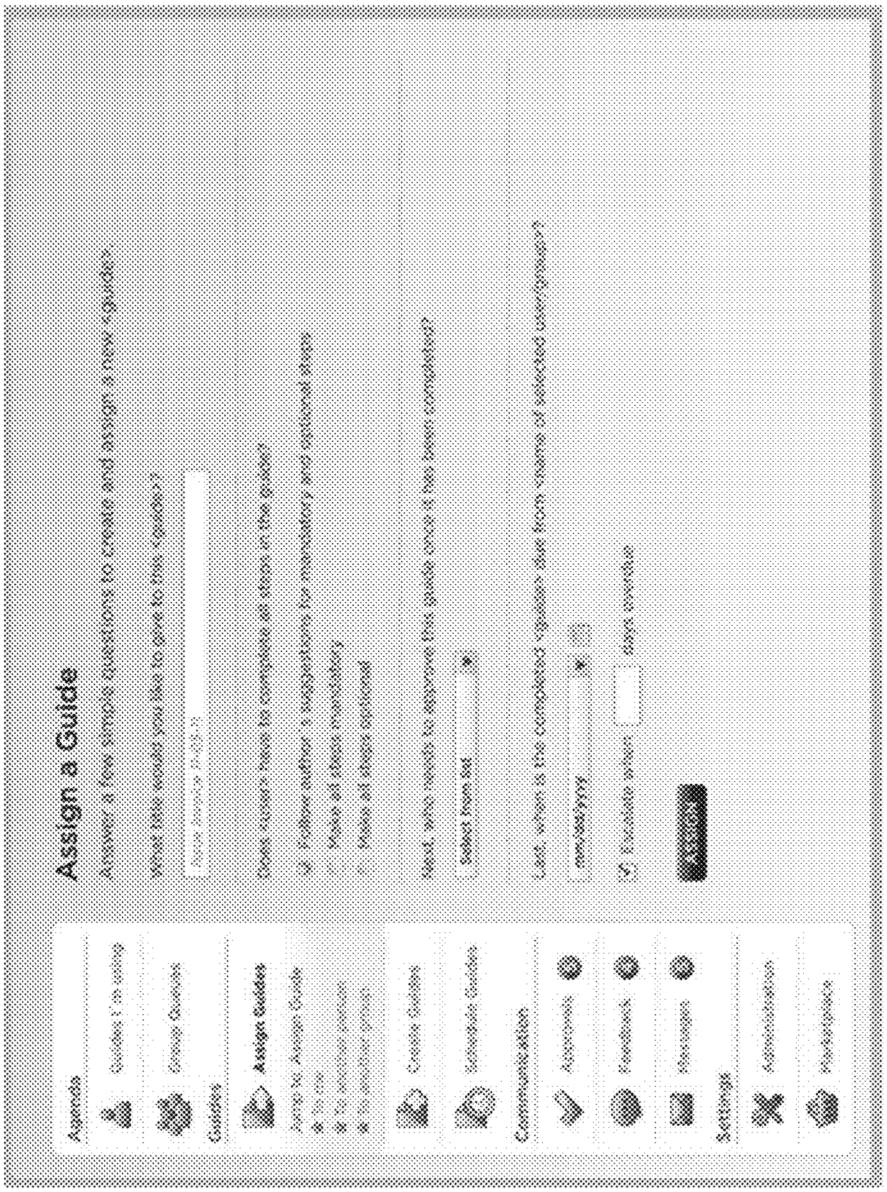
Figure 20B:
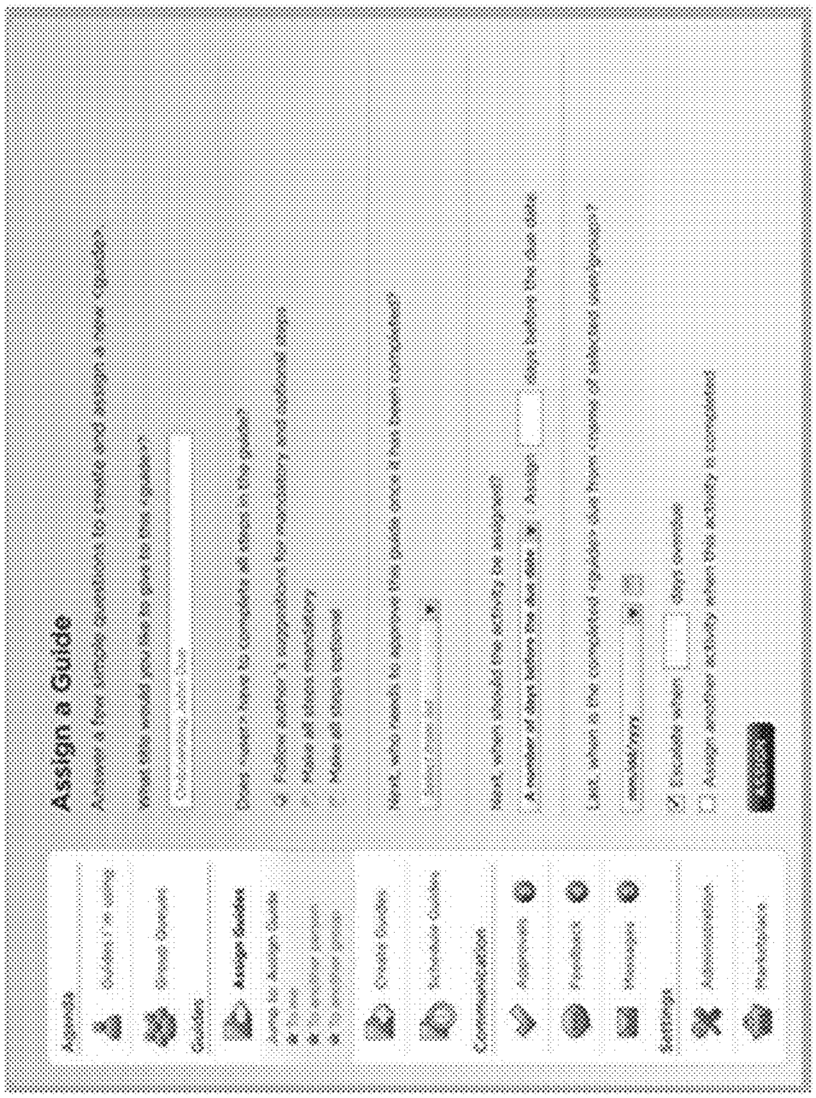
Figure 20C:
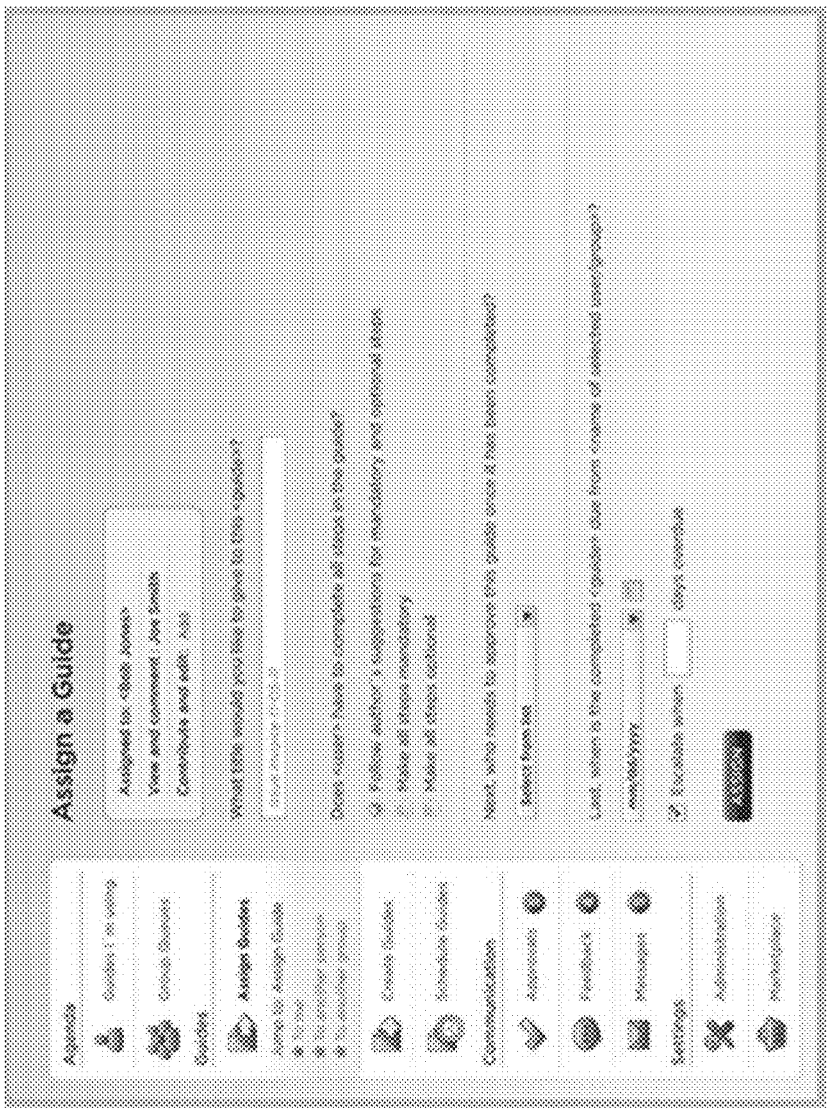

In accordance with some embodiments, as shown in interface 2000 of FIG. 20A, using an interface 2000 that may be presented by a hardware processor of a computing device, the hardware processor can present a prompt to the user for more pieces of information, such as, to give a title or description to an assignment, to provide attachments (possibly including email content), to indicate whether one or more of the steps in the interactive checklist are mandatory or optional, to indicate if a completed interactive checklist needs approval, to indicate a due date, and/or answer any other questions prompted by the interactive checklist. The interactive checklist can then be assigned to a designated user or group of users and can appear in their queue. In some embodiments, the hardware processor can receive a user input to configure a variety of automatic actions among assignments as in interface 2002 of FIG. 20B. For example, a second assignment can start as soon as a first assignment is completed. In some embodiments, the hardware processor can receive a user input to designate one or more associates to assist with an activity, as shown in interface 2004 of FIG. 20C. Additionally, the hardware processor can receive a designation of a level of involvement for each associated assigned.

In accordance with some embodiments, an assignment may not require or possibly even prompt for an assignee, and/or approvers. Alternatively, it may automatically assign to particular users or groups; and/or automatically set the approvers to particular users or groups. In some embodiments, a user can indicate the Assignee or the Approver by virtue of a relationship. For example, the Approver can be set to be "a direct manager of this assignee," "a QA Lead assigned to this project,", or "a system administrator assigned to this user's unit."

In some embodiments, the hardware processor can receive "assignment permissions" that can indicate who may submit a request for a type of interactive checklist to be assigned to a person or a group's queue. Additionally, the "Assignment Permissions" can indicate who may prepopulate certain steps that show details pertaining to the assignment. For example, for a new user creation request, the desired name, email, and role for that user can be viewed. Alternatively, "Assignment Permission" cannot allow a user to view the rest of the interactive checklist, what has been completed, and/or what steps are involved. In some embodiments, the "Assignment Permissions" can be preconfigured. For example, depending on the configuration, the hardware processor can send notifications to the user upon completion of the request with certain details (e.g., what was created) in any suitable manner, such as by email.

Figure 21A:
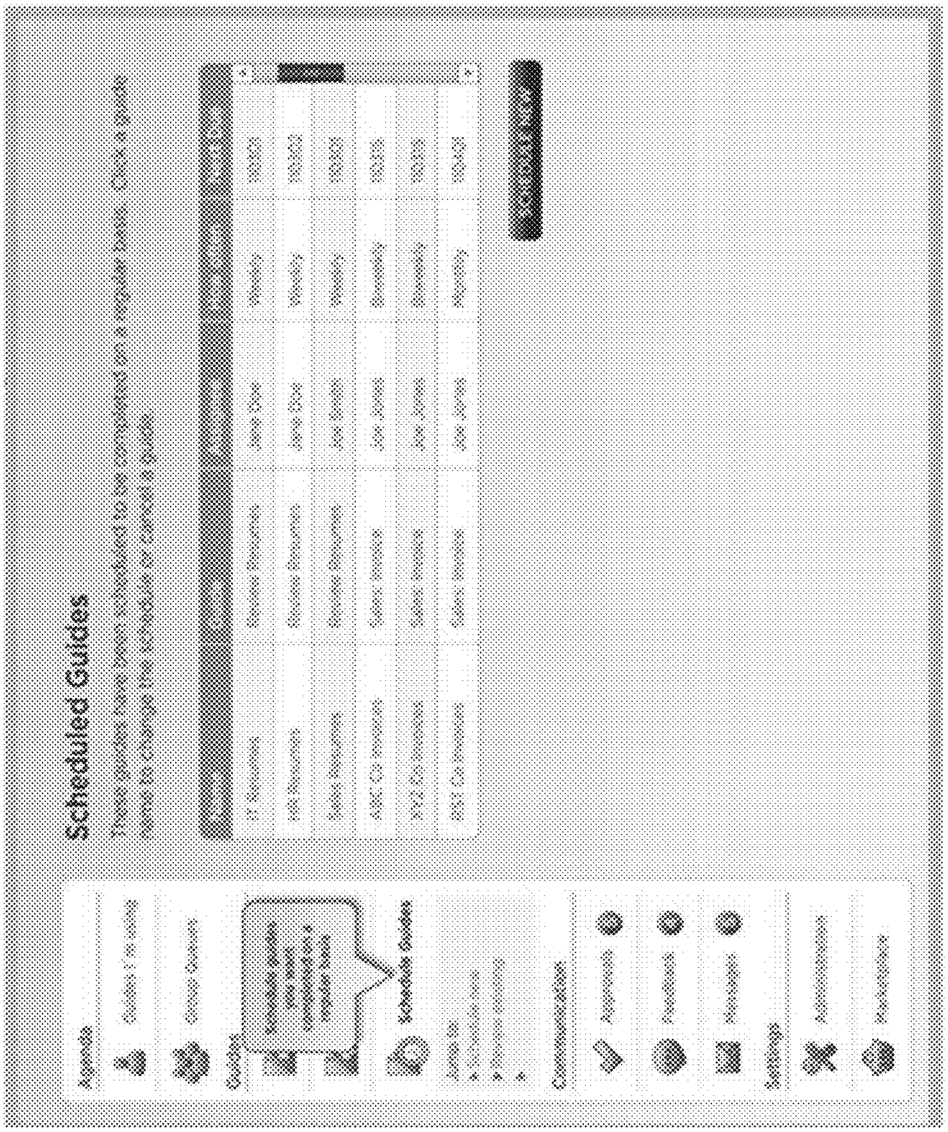
FIGS. 21A, 21B, 21C, 21D, 21E, 21F, 21G, 21H, and 21I show examples of user interfaces for scheduling an interactive checklist in accordance with some embodiments of the disclosed subject matter.
Figure 21B:
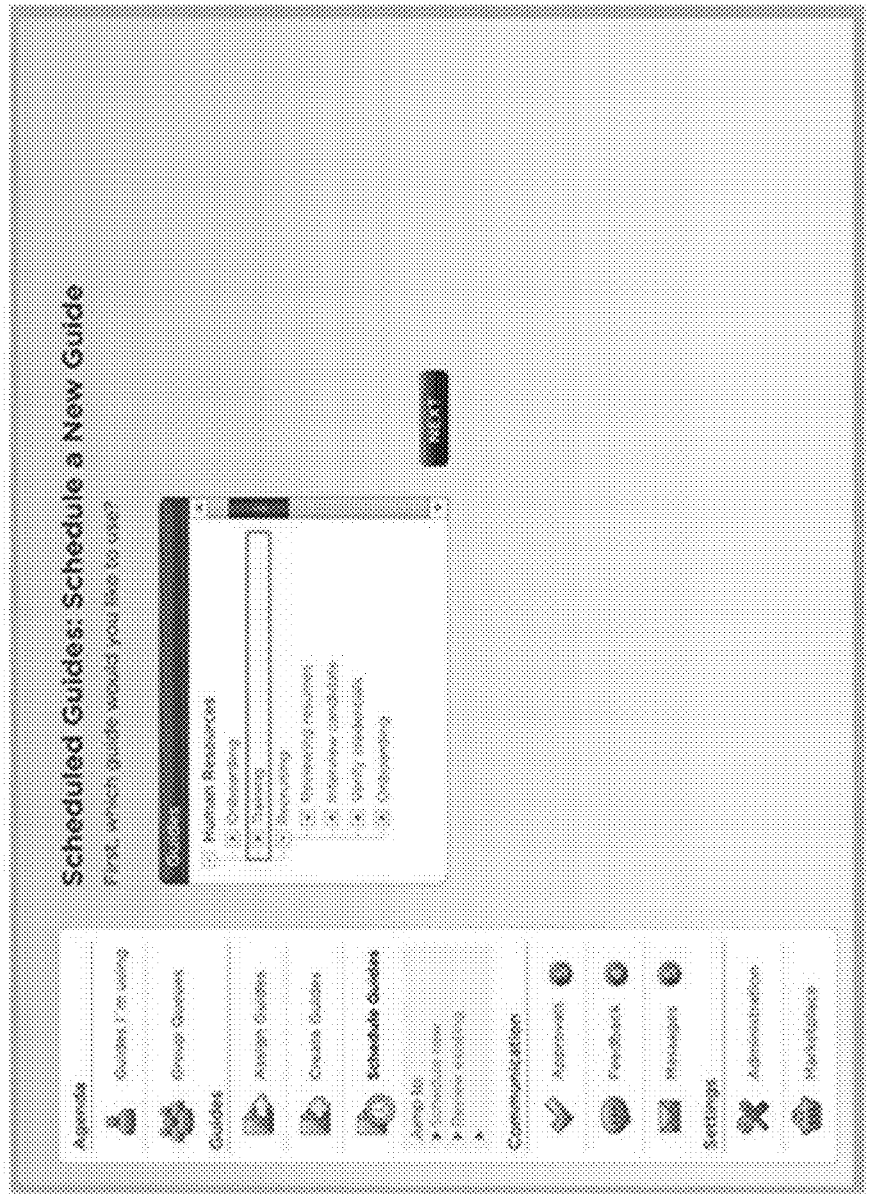

In accordance with some embodiments, a user may want to assign an interactive checklist on a recurring basis either to be completed once a week, every quarter, annually, and/or any other length of time, either indefinitely or until a specified date or for a number of assignments. Rather than manually assigning each interactive checklist, using an interface 2102 that may be presented by a hardware processor of a computing device, the hardware processor can present a "Scheduled Guide," as shown in FIG. 21A, which can enable a user to enter information just once. As with assigning a single interactive checklist, scheduling an interactive checklist can be a simple process. In some embodiments, using a user interface 2104 that may be presented by a hardware processor of a computing device, the hardware processor can receive a user selection to indicate which interactive checklist the user wishes to assign, as shown in FIG. 21B.

Figure 21C:
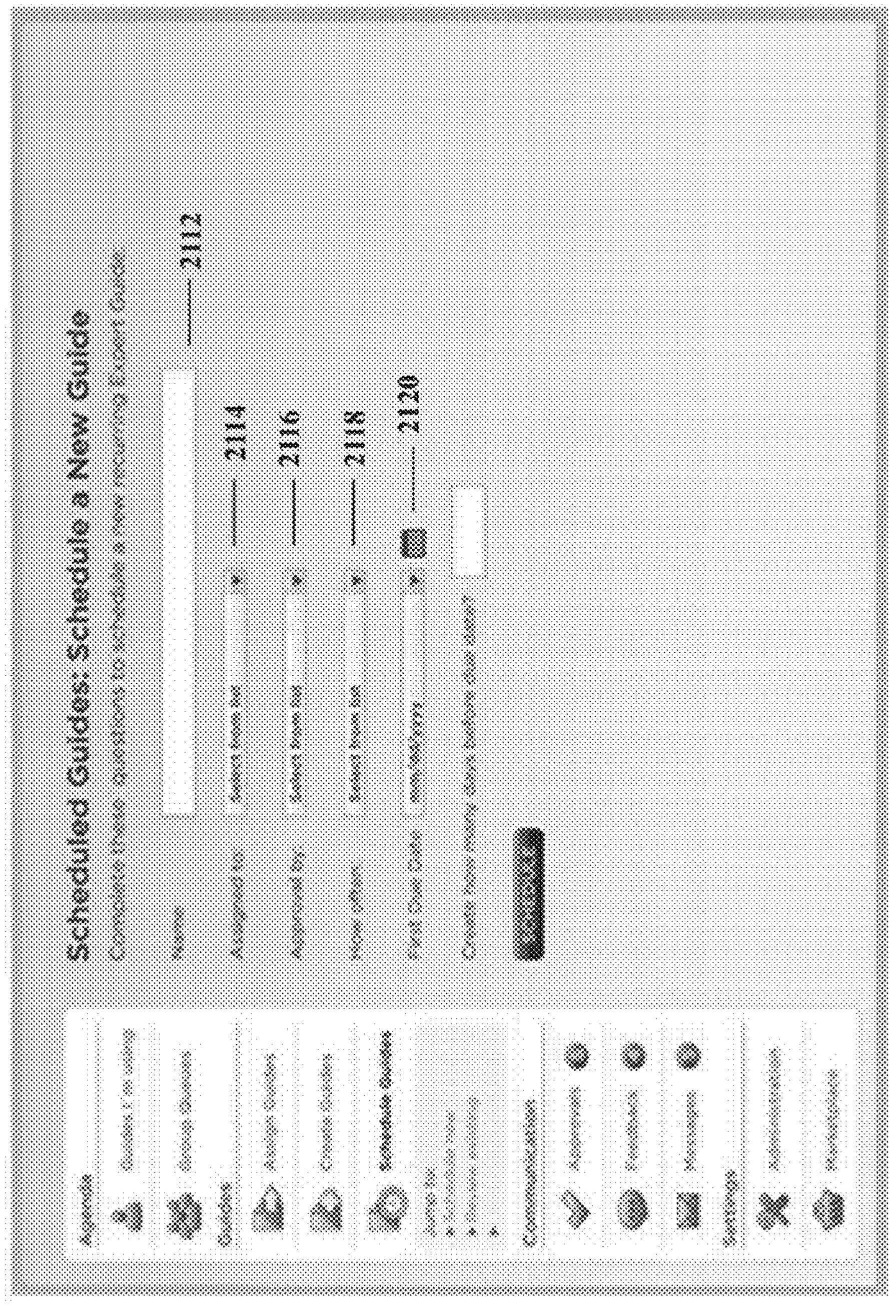

In accordance with some embodiments, as shown in FIG. 21C, using an interface 2106 that may be presented by a hardware processor of a computing device, the hardware processor can receive additional pieces of information, such as the title of the interactive checklist 2112, the user or group who should complete the interactive checklist 2114, the option to assign separately to each member of a group and/or for each element of a set (for example an invoicing assignment could be assigned for each member of a set of active clients), a user to approve the interactive checklist (if needed) 2116, how often the interactive checklist can be assigned (daily, weekly, and/or any other length of time) 2118, when a first interactive checklist may be due 2120, and/or any other suitable information. Once an interactive checklist is scheduled, it can be assigned and completed on a recurring basis until the user decides to cancel it or no longer has an active account. Additionally and/or alternatively, the interactive checklist can be assigned and completed on a recurring basis until the user sets and end date.

Figure 21D:
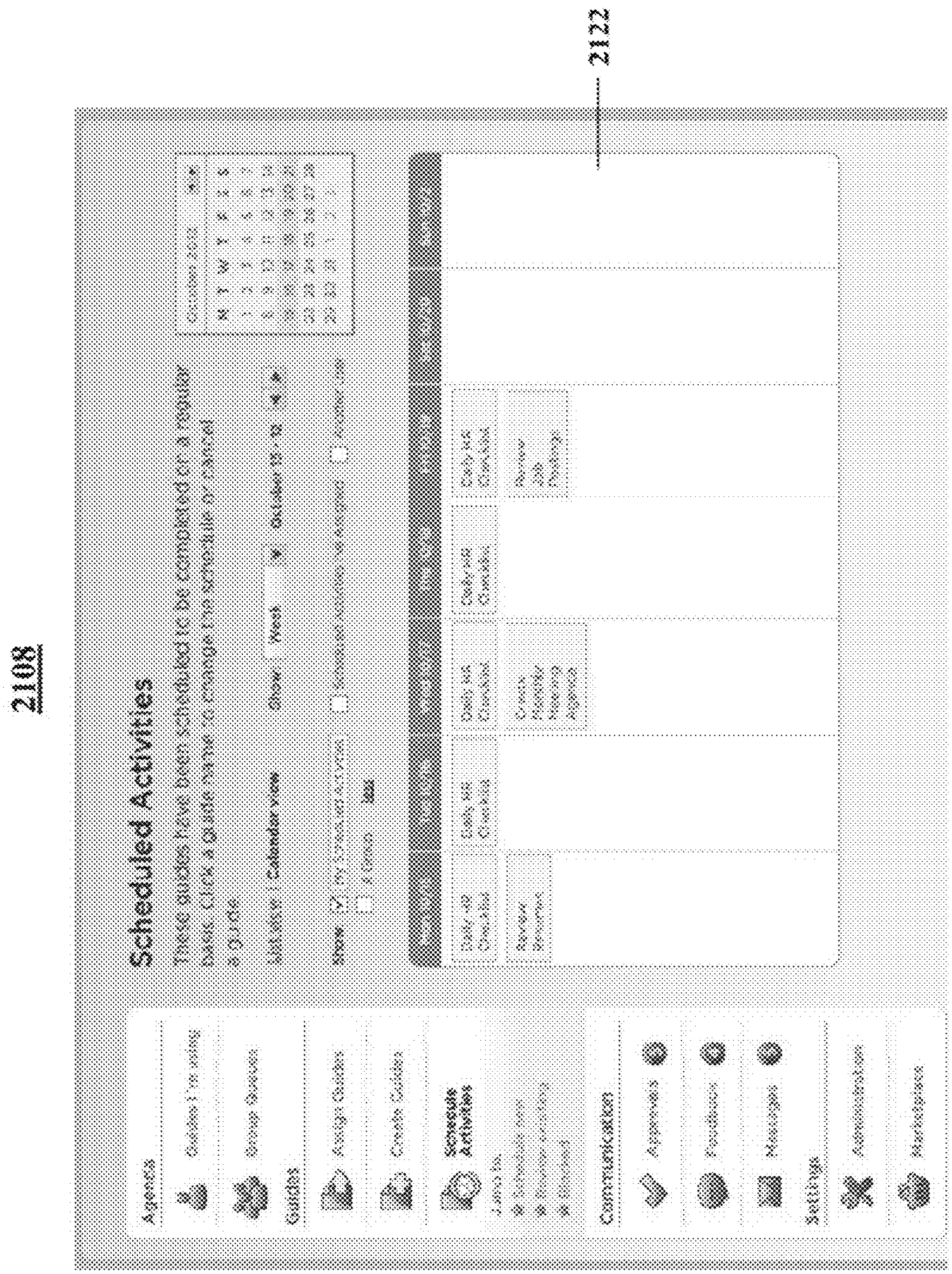

In accordance with some embodiments, as shown in FIG. 21D, using an interface 2000 that may be presented by a hardware processor of a computing device, the hardware processor can present a "Calendar View" feature that may help a user see the user's scheduled (and non-recurring) activities in order to show the user's upcoming workload at a glance. For example, the hardware processor can display the user's upcoming assignments as shown by calendar 2122. Additionally, calendar 2122 can be displayed in a "day," a "week," a "month," or a "multi-month" (e.g., three months, six months, nine months, twelve months) view.

Figure 21E:
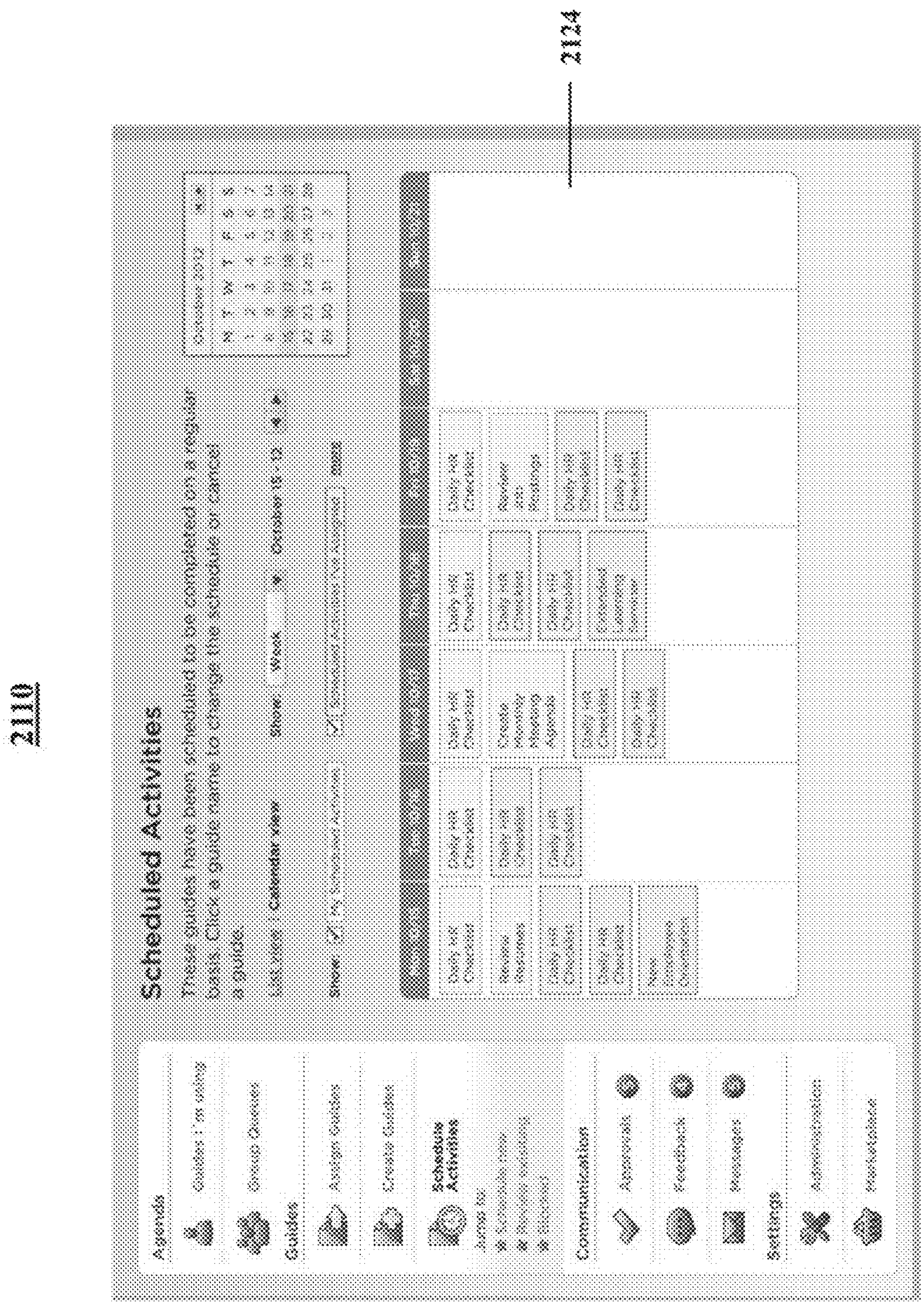

Turning to FIG. 21E, using an interface 2110 that may be presented by a hardware processor of a computing device, the hardware processor can receive user inputs (e.g., from a keyboard, a mouse, a touchscreen, and/or any other source of user input) to customize calendar 2124 with options including: interactive checklists assigned to the user, interactive checklists assigned by the user (for others to complete), interactive checklists assigned to or by other users (can specify user), and interactive checklists assigned to or by other groups of users (can specify groups). The hardware processor can display past assignments on calendar display 2124 (made visually distinct from current assignments). In addition, calendar display 2124 can be printed for ease of use.

Figure 21F:
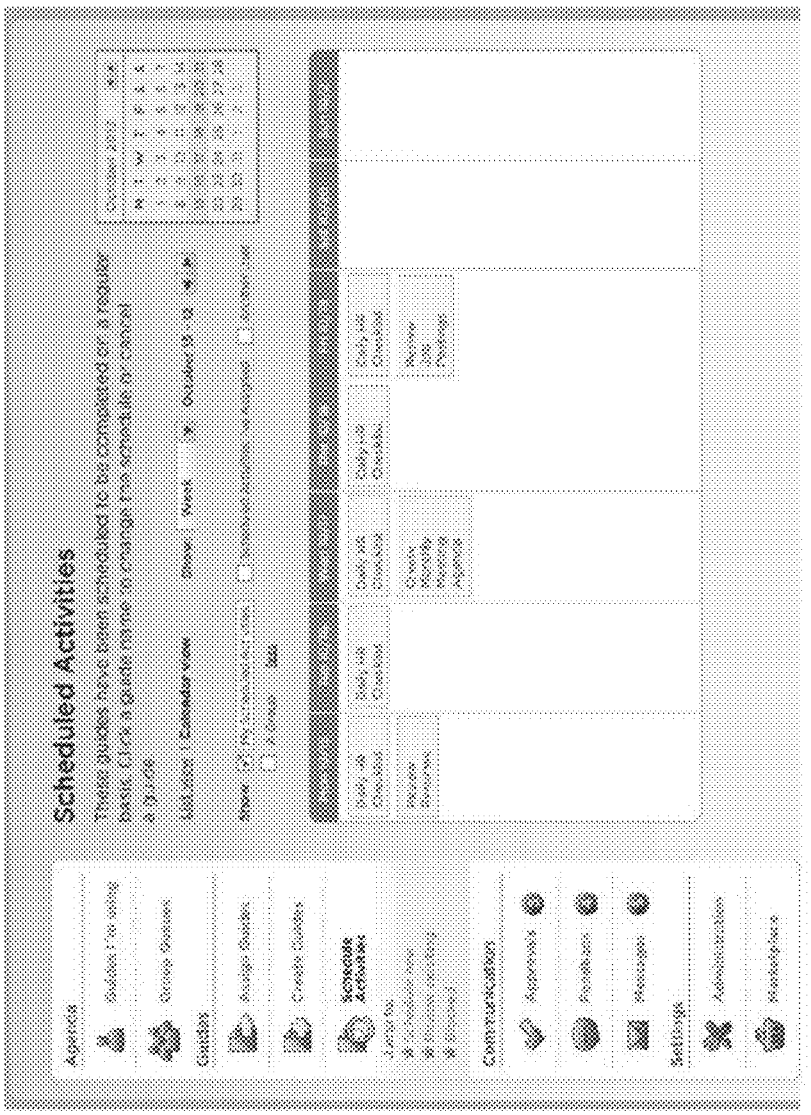
Figure 21G:
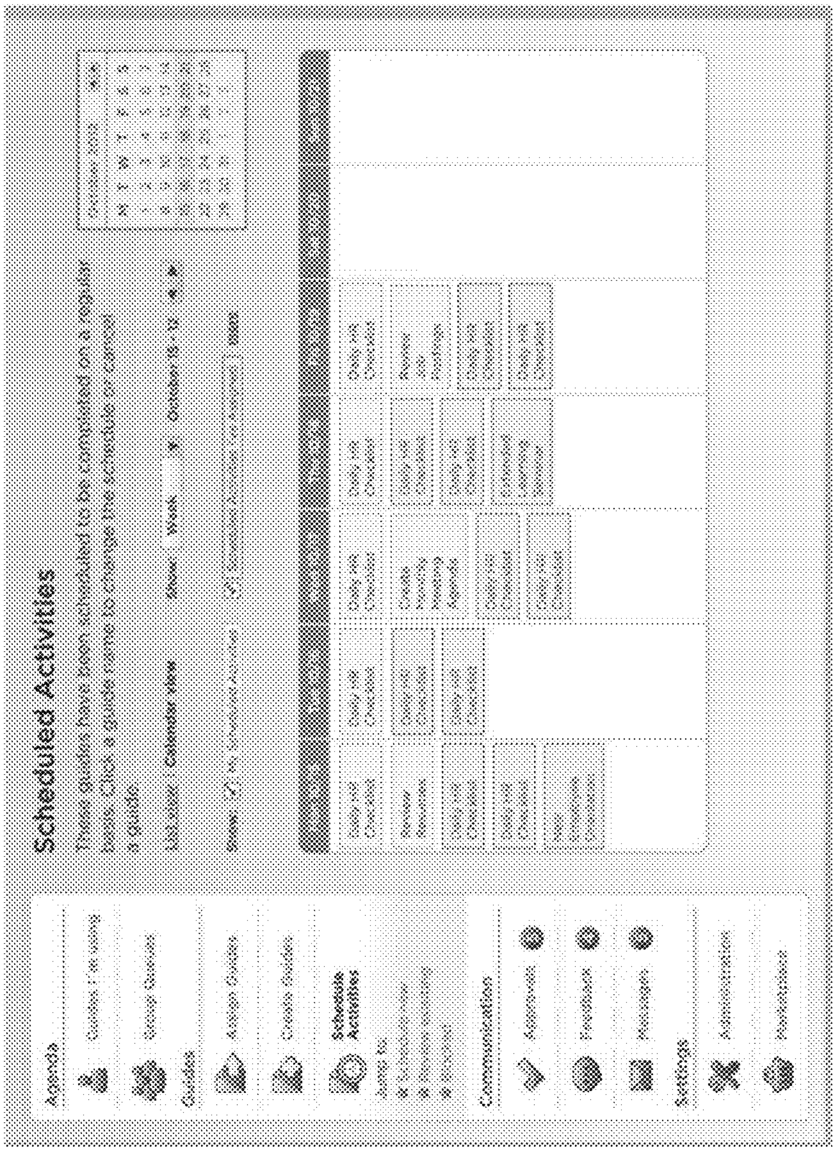
Figure 21H:
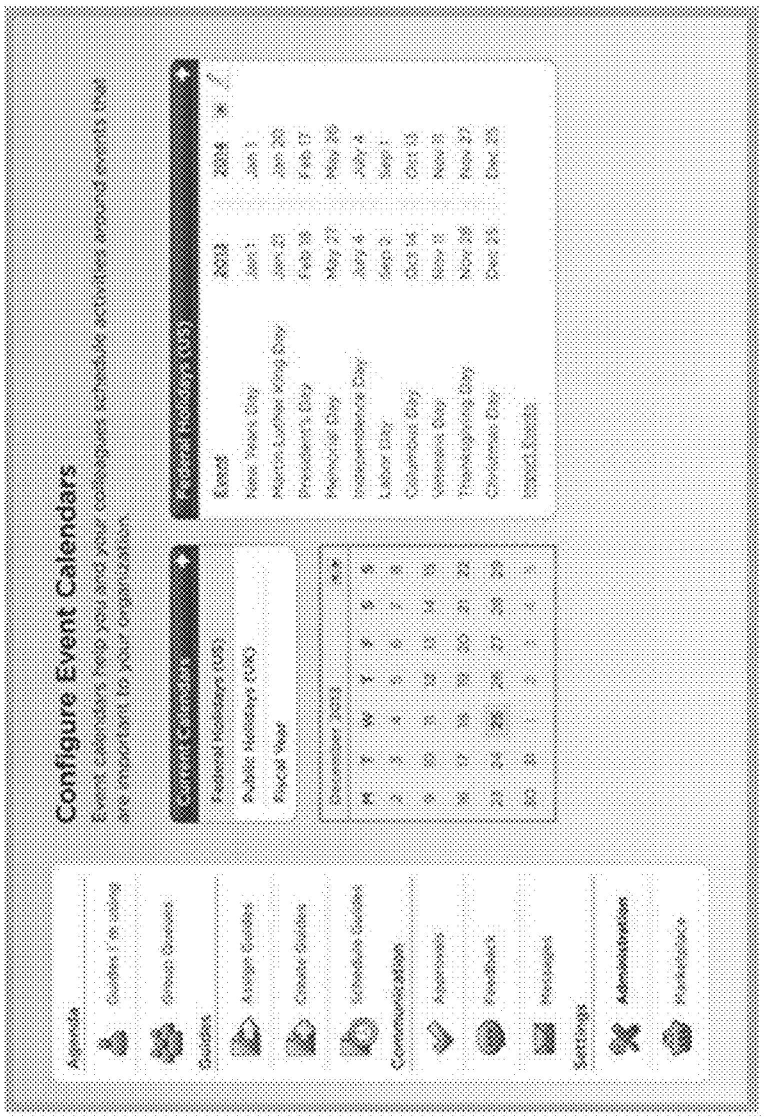
Figure 21I:
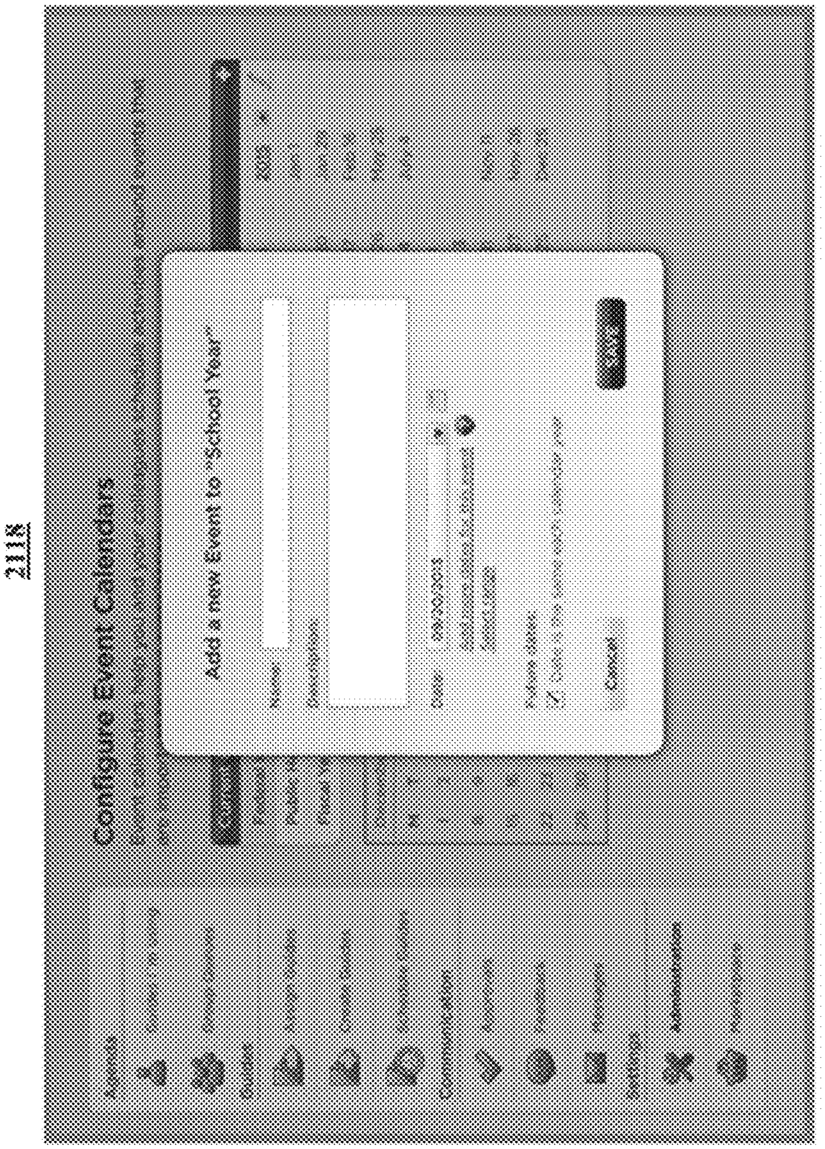

Turning to FIG. 21F, the hardware processor can present a "Calendar View" that includes a user's upcoming workload in a summary format, as shown in interface 2112. For example, the hardware processor can display upcoming assignments on a calendar display. The display can be viewed as a daily view, a weekly view, a monthly view, a yearly view, and/or any other suitable time frame view. In some embodiments, the hardware processor can receive customization options to customize the calendar that is displayed. Customization options can include guides assigned to a user, guides assigned by a user, guides assigned to or by other groups of a user, and/or any other suitable customization options. Additionally, the hardware processor can present past assignments on the calendar. For example, the past assignments can be visually distinct from current assignments, as shown in interface 1214 of FIG. 21G. In some embodiments, the calendar display can be printed.

In accordance with some embodiments, the hardware processor can present event calendars, as shown in interface 1216 of FIG. 12H. For example, the event calendars can be included by default. In another example, the event calendar can be created as a custom event calendar, as shown in interface 1218 of FIG. 12I. In such an example, custom calendars can be created for use by anyone in an organization. In some embodiments, each event on the event calendar can be customized for special cases such as event that last more than one day, events that might have multiple sub-events throughout the calendar year, events that occur on different dates in future calendar years, and/or any other suitable special case.

Figure 22:
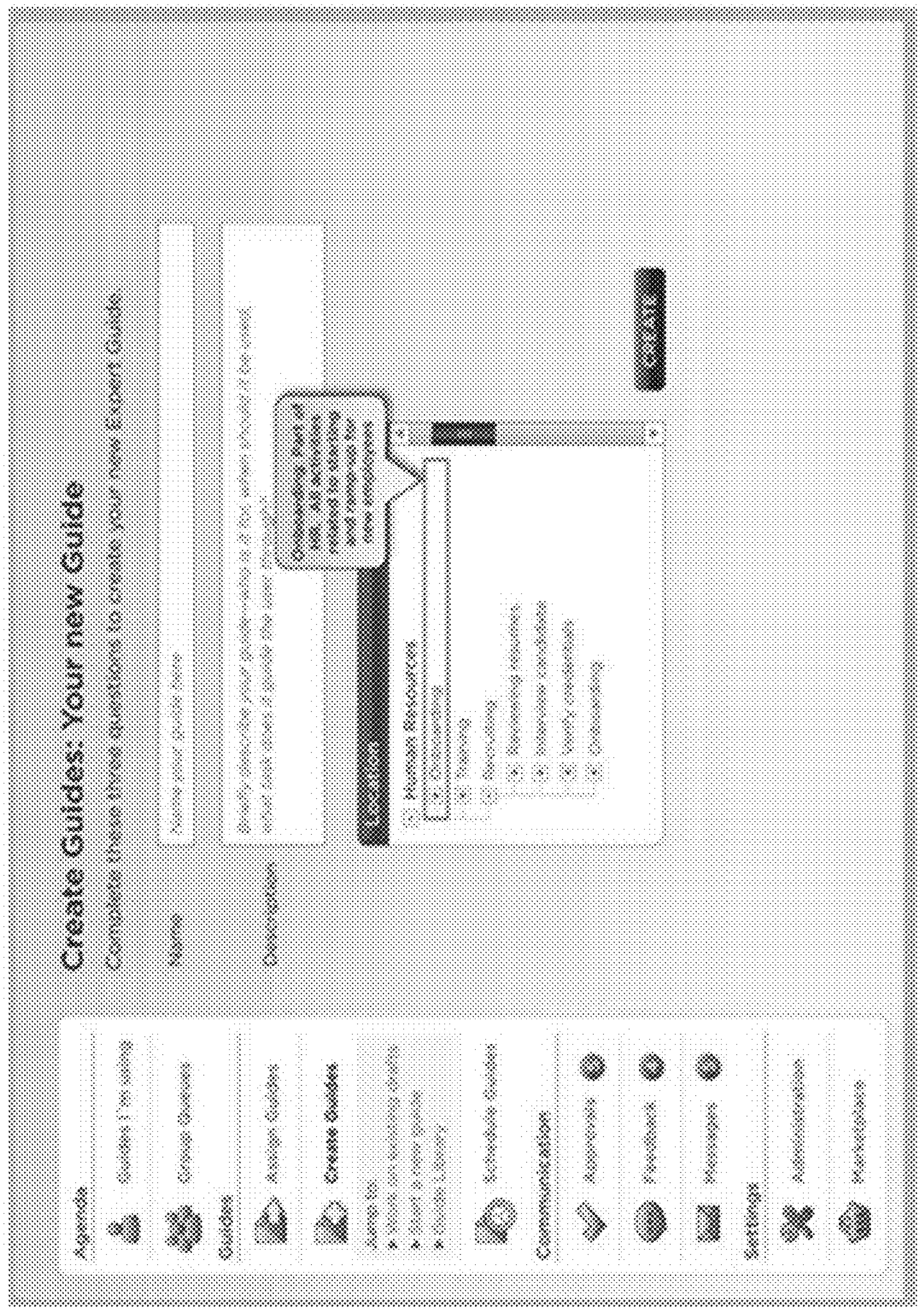
FIGS. 22, 23, 24, 25, 26, 27A, 27B, 27C, and 27D show examples of user interfaces for creating an interactive checklist in accordance with some embodiments of the disclosed subject matter.

Turning to FIG. 22, using an interface 2200 that may be presented by a hardware processor of a computing device, the hardware processor can present an interface 2200 for creating interactive checklists. The hardware processor can receive any suitable information such as a title for the interactive checklist, a text description of the interactive checklist, a location for the interactive checklist (e.g., chosen from a company-wide hierarchy of groups) and/or any other information.

Figure 23:
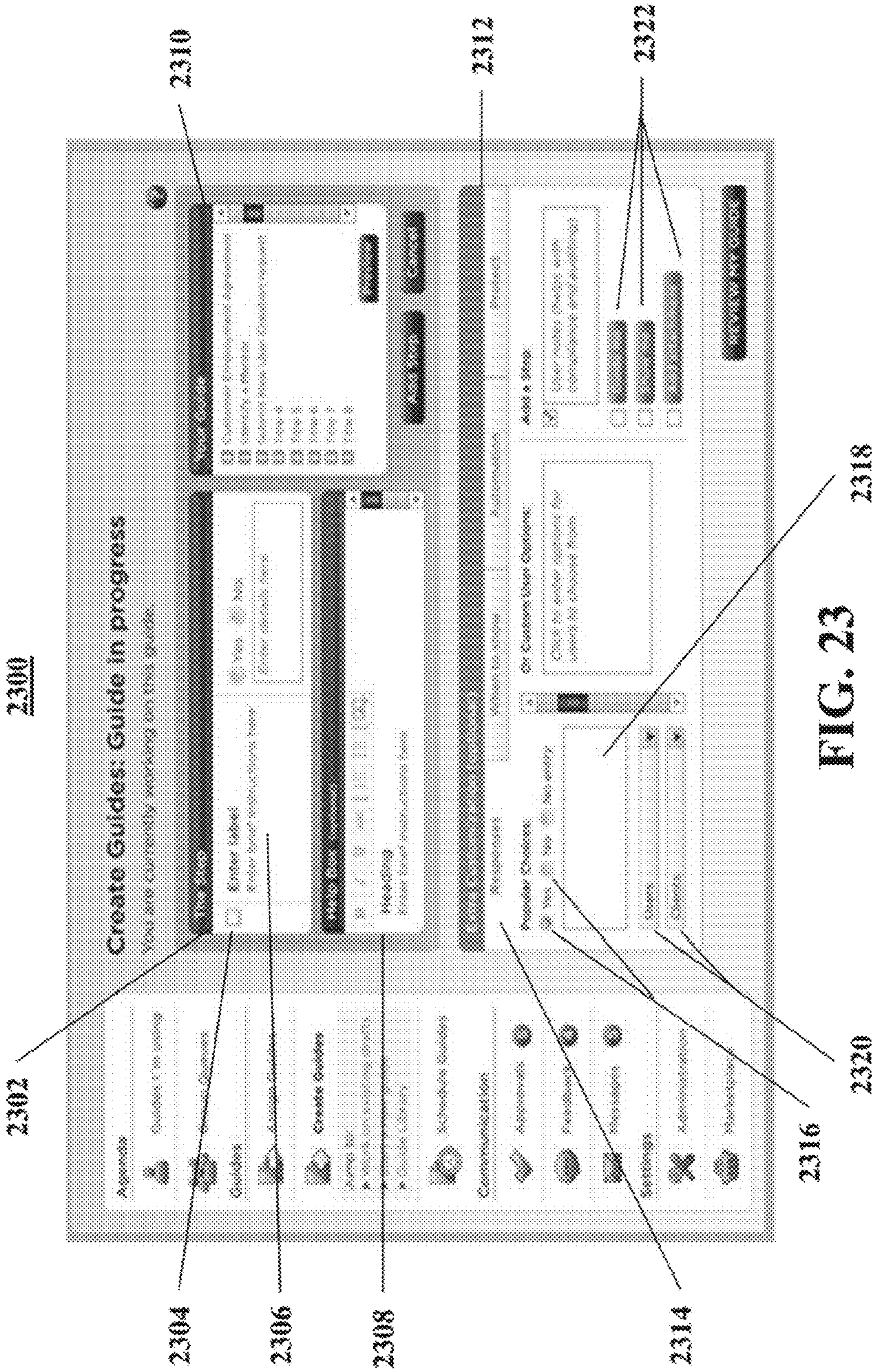

In accordance with some embodiments, using an interface 2300 that may be presented by a hardware processor of a computing device, the hardware processor can receive basic information. Upon receiving the basic information, the hardware processor can present an "Add a Step" interface, shown in FIG. 23. Here, using an interface 2300 that may be presented by a hardware processor of a computing device, the hardware processor can receive a user input to add as many steps as desired to the interactive checklist. The process and options for each step can be the same. Each step can have one or more fields that can be completed as shown, for example, in a "The Step" box 2302. An "Enter Label" box 2304 can be checked and a name of the step can be entered. Additionally, a "Brief Instructions" field 2306 may be available where text that explains how to complete the step can be entered. A "Responses" 2314 space that can be used to describe a format in which the user can complete or respond to the step may also be available. In some embodiments, a user can add a step using a What You See Is What You Get "WYSIWYG" interface. For example, the user can add elements (e.g., images, texts, and/or layouts) in the format the user will see the elements.

In some embodiments, the hardware processor can present a "Help Box" that can be completed by a user for each step (e.g., by entering expanded information as to how to complete the step). An example of a "Help Box" 2308 can be shown, for example, in interface 2300 of FIG. 23. Standard formatting tools can be available to encourage and enable longer, more thoughtful help text and images to be embedded and altered.

In some embodiments, each time a step is added to the interactive checklist, the hardware processor can display the step in a "Your Guide" widget. For example, the interactive checklist may appear in the top-right corner of the interface as shown in interface 2300 of FIG. 23 as "Your Guide" 2310. In some embodiments, the hardware processor can display a list of the steps which have been added to the interactive checklist. In addition, the hardware processor can receive user inputs to easily reorder the steps using the drag and drop mechanisms provided, either individually, several at a time, with or without section dividers/headers, and/or by any other means available. In some embodiments, steps with dependencies, such as those that only show when specific criteria are met may be displayed indented, in an expandable/contractible tree-like widget, and/or any other way that allows it to be distinguished from those entries without dependencies. In some embodiments, section markers, header text, repeating blocks of steps and/or sections or groups of steps that may selectively become active, may also be indicated in the "Your Guide" widget.

There are one or more "extra customizations" available to a user, which can be optional in accordance with some embodiments of the invention. Some of these optional customizations can be, for example, displayed by the hardware processor in an "Extra Customization (optional)" section, shown as "Extra Customization (optional)" 2312 in interface 2300 in FIG. 23. In a "Responses" space 2314, the hardware processor can receive a user input indicating a selection of what response type a step may have. A default setting can provide "yes" and "no" radio buttons, as well as plain or rich text area for notes. In response space 2314, the hardware processor can display "yes" and "no" radio buttons

2316, as well as notes area 2318. Other response options can include drop-down or multi-select menus listing users, groups, other interactive checklists, organization-specific options, any predefined or dynamically generated list of choices, additional custom-text radio buttons and/or any other suitable options. An example of drop-down menus can be displayed by the hardware processor in interface 2300 of FIG. 23 as drop-down menus 2320.

In accordance with some embodiments, the hardware processor can present a "Guide Me" option, a "Show Me How" presentation, downloadable attachments, an extra user notes box, mandatory or optional user uploadable attachments, and/or any other available enhancements to allow a user to add enhancements to a step. For example, the hardware processor can display a "Guide Me", a "Show Me," and an "Add Attachment" enhancements that can be added to a step at enhancements 2322. Input validation can be configured so that user responses can meet regular expression-based criteria and/or other criteria to be accepted with or without a warning. For example, the criteria can require no blank or short entries, a valid phone number, and/or any other information. The hardware processor can receive a user input to disallow or allow custom steps to be added by another user and/or other users on an activity-specific or interactive checklist-wide basis, optionally while completing an activity.

Figure 24:
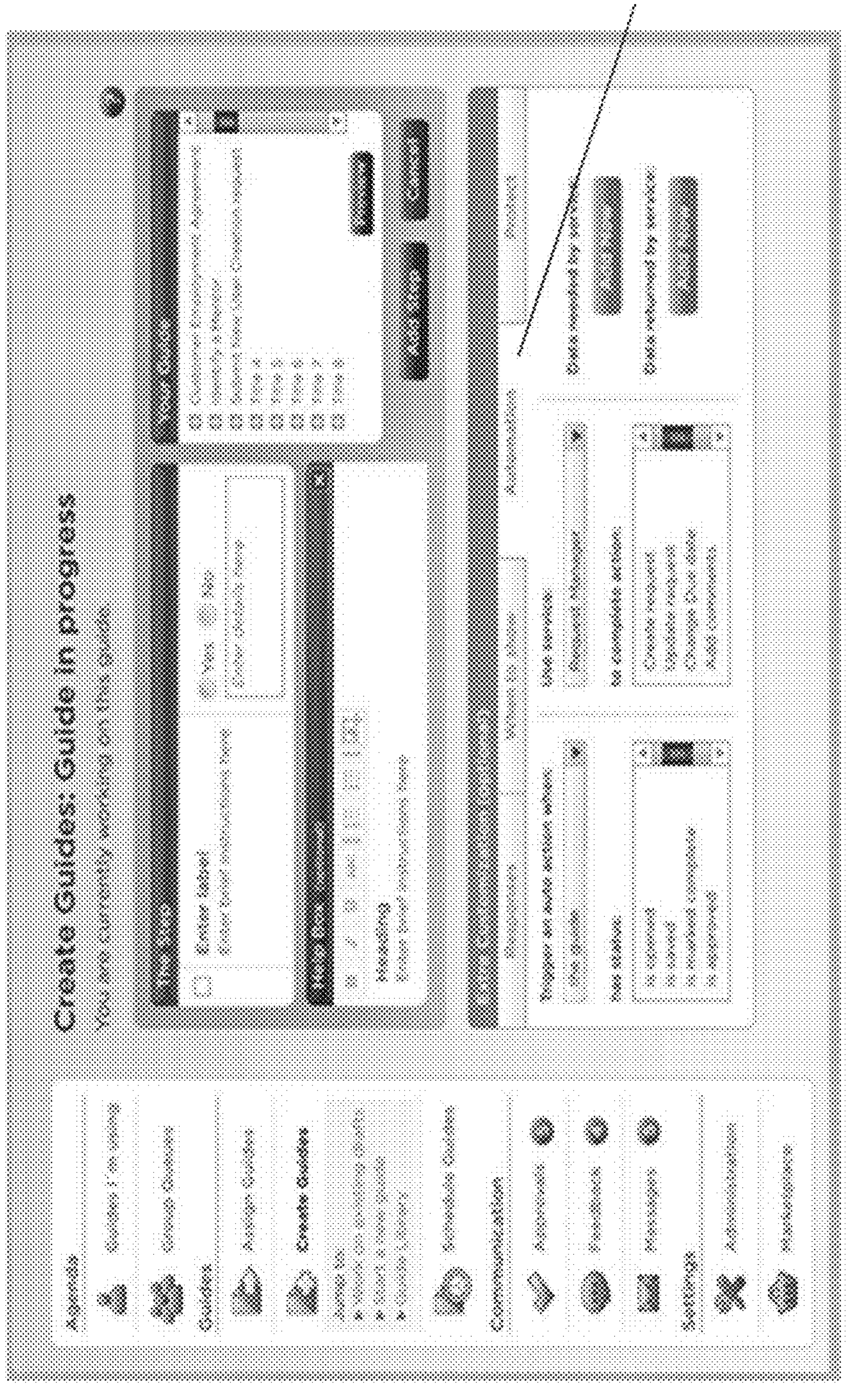

In accordance with some embodiments, using an interface 2400 that may be presented by a hardware processor of a computing device, the hardware processor can present an automation area, such as that shown as automation area 2402 in interface 2400 of FIG. 24. The hardware processor can receive a user input to configure automatic actions. The user input can indicate when an action can be triggered, for example, when the interactive checklist can be opened. Additionally, the user input can indicate which actions can be completed and by which external service. For example, an action can be sending an email using an email service (e.g., Gmail™).

Figure 25:
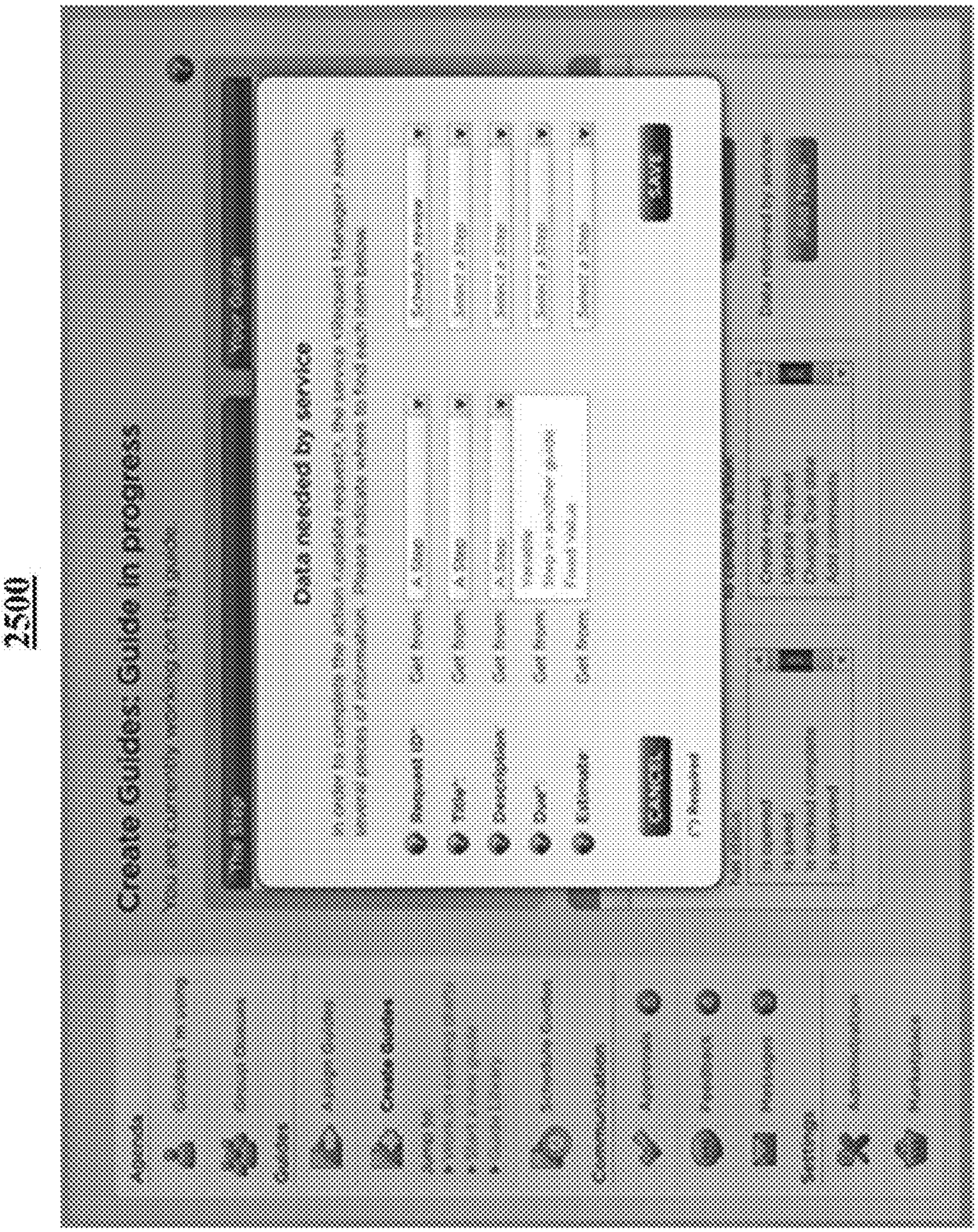

In accordance with some embodiments, using an interface 2500 that may be presented by a hardware processor of a computing device, the hardware processor can receive a user indication where the interactive checklist can find each piece of information to complete an action. For an email, the hardware processor can receive a user indication where the interactive checklist can find a recipient's email address, desired subject line, body copy, and/or any other information as shown in interface 2500 of FIG. 25. This information can come from a specific step in the interactive checklist, a fixed value, a variable, any other source within the interactive checklist, and/or any other source within another interactive checklist associated with this checklist. For example, another interactive checklist associated with this checklist can include a "child" interactive checklist associated with a step, a "parent" interactive checklist associated with this interactive checklist, the most recent interactive checklist of this type for which a particular value is present, and/or any other suitable checklist. The interactive checklist can also indicate what data points will be returned from the action. In some embodiments, functions and routines using any of several programming language syntaxes can also be used to perform calculations, manipulate data input or output, gather and transform data from elsewhere in the interactive checklist, and/or any other action. In some embodiments, the interactive checklist can be automated and not assigned to a user. For example, the interactive checklist can be automated when the interactive checklist can process certain types of items from a queue.

Figure 26A:
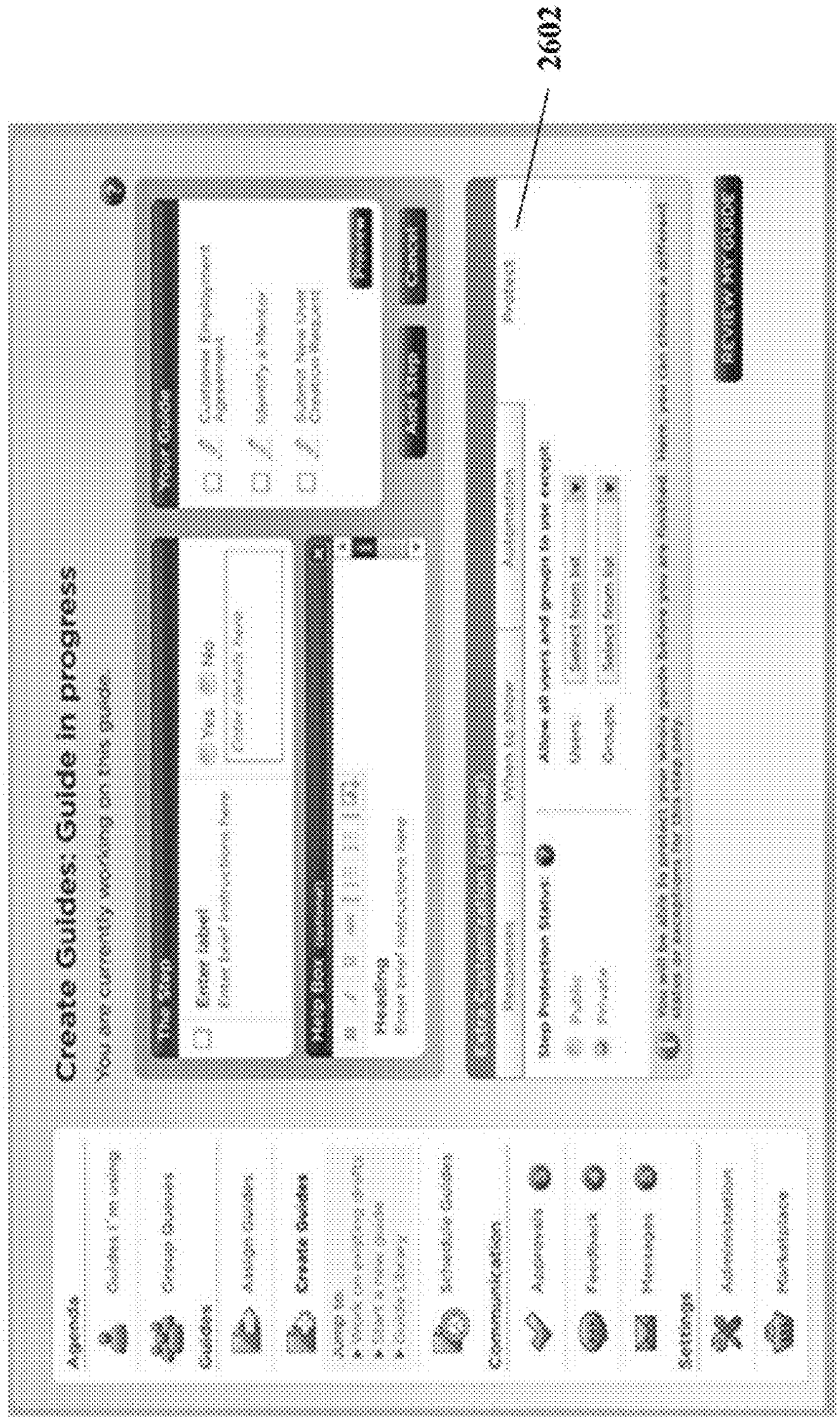
Figure 26B:
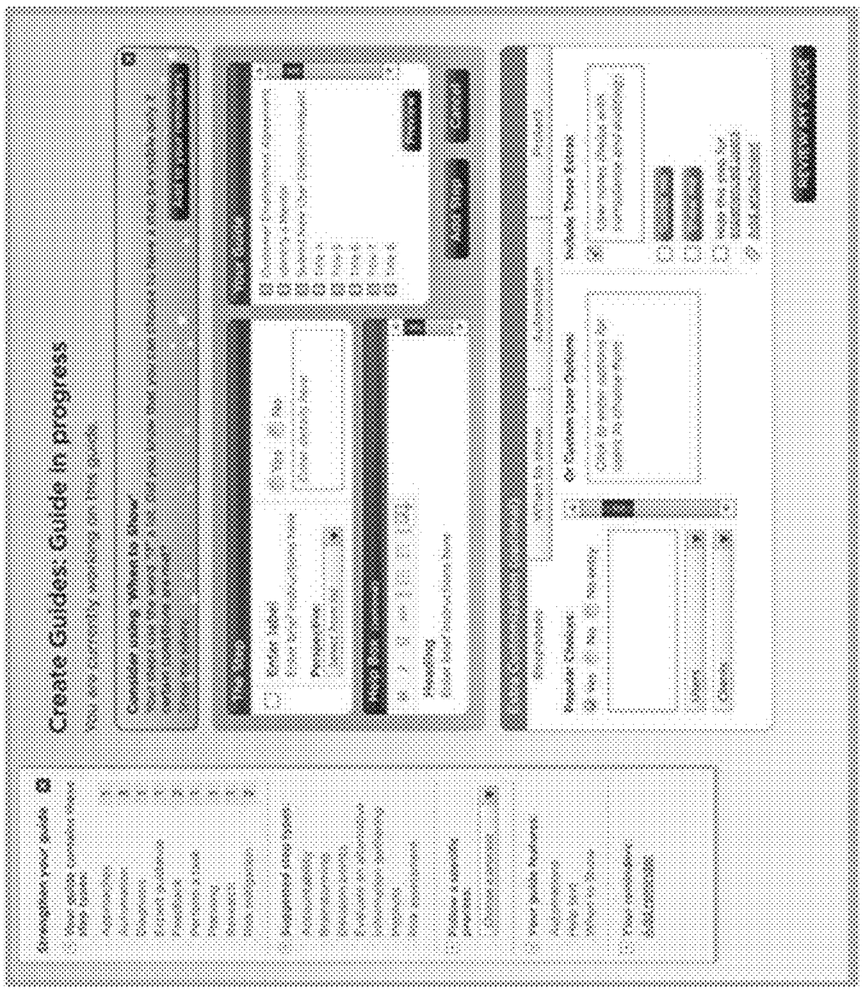

In accordance with some embodiments, using an interface 2600 that may be presented by a hardware processor of a computing device, the hardware processor can present a "Protect" area, shown as "Protect" area 2602 in FIG. 26A. For example, "Protect" area 2602 can let a user control access to a step. The user can choose to make the step public (available to everyone) or private (available only to them, e.g., while they test it out). As a further refinement, in some embodiments, the user can select individual users or groups to access (or prevent from accessing) the step. Access may regulate who can be shown this step when assigned an activity or when browsing an interactive checklist, as well as who may be aware of its existence, for example, when reviewing an activity for approval. In some embodiments, the hardware processor can present relevant suggestions to improve the user's experience and/or work product. For example, the hardware processor can present a "Guidance Box" feature to evaluate the guide in progress, as shown in interface 2604 in FIG. 26B. The "Guidance Box" can be displayed to remind the user of certain features at pertinent times.

Figure 26C:
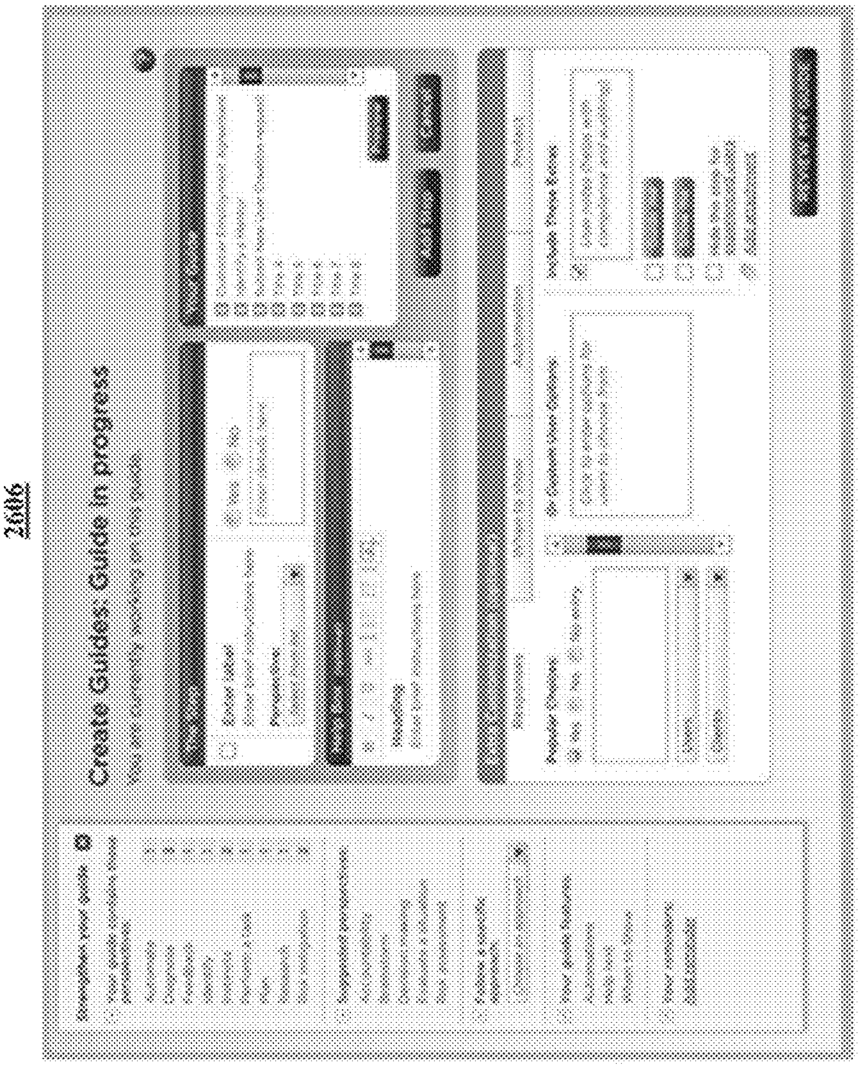
Figure 26D:
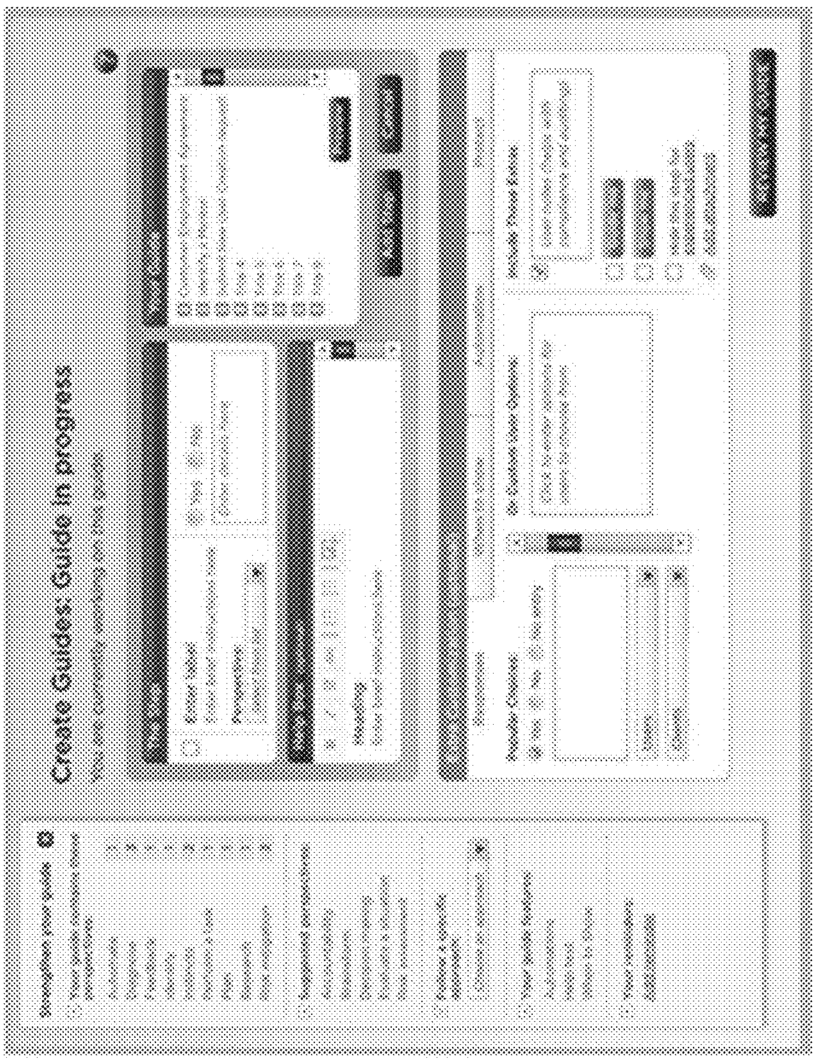
Figure 26E:
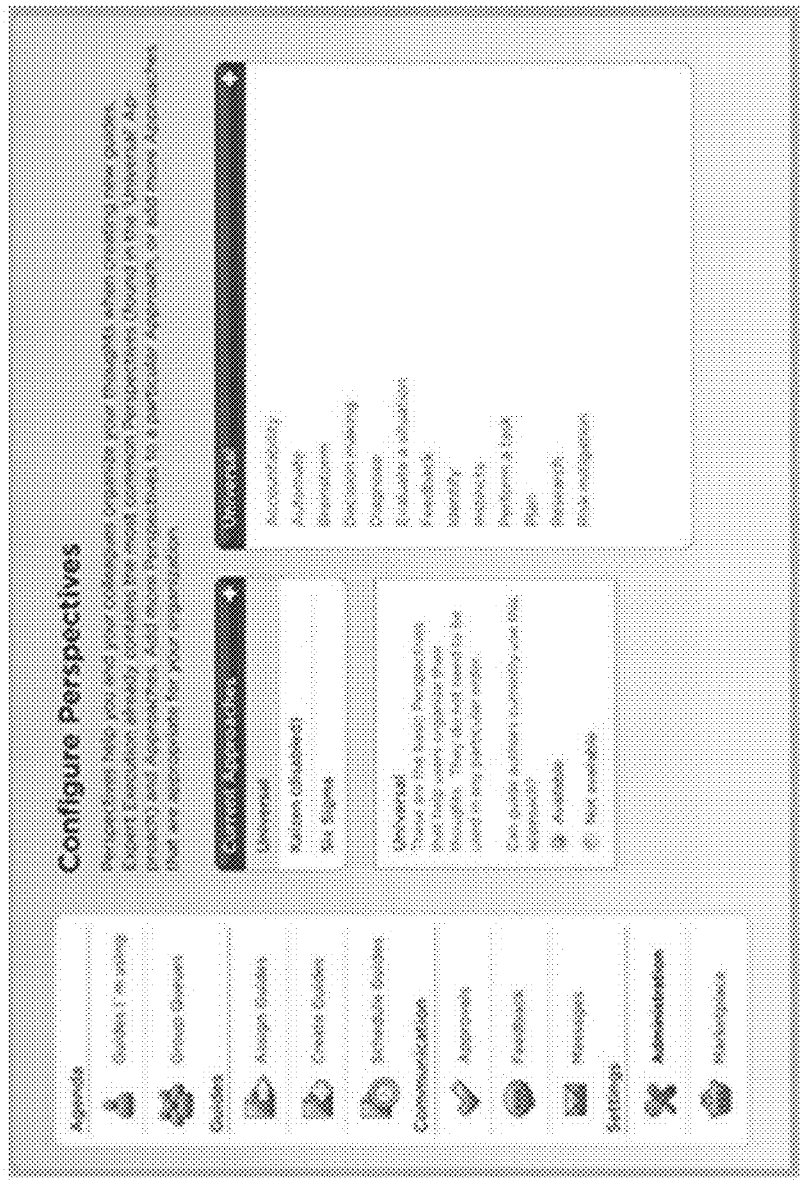
Figure 26F:
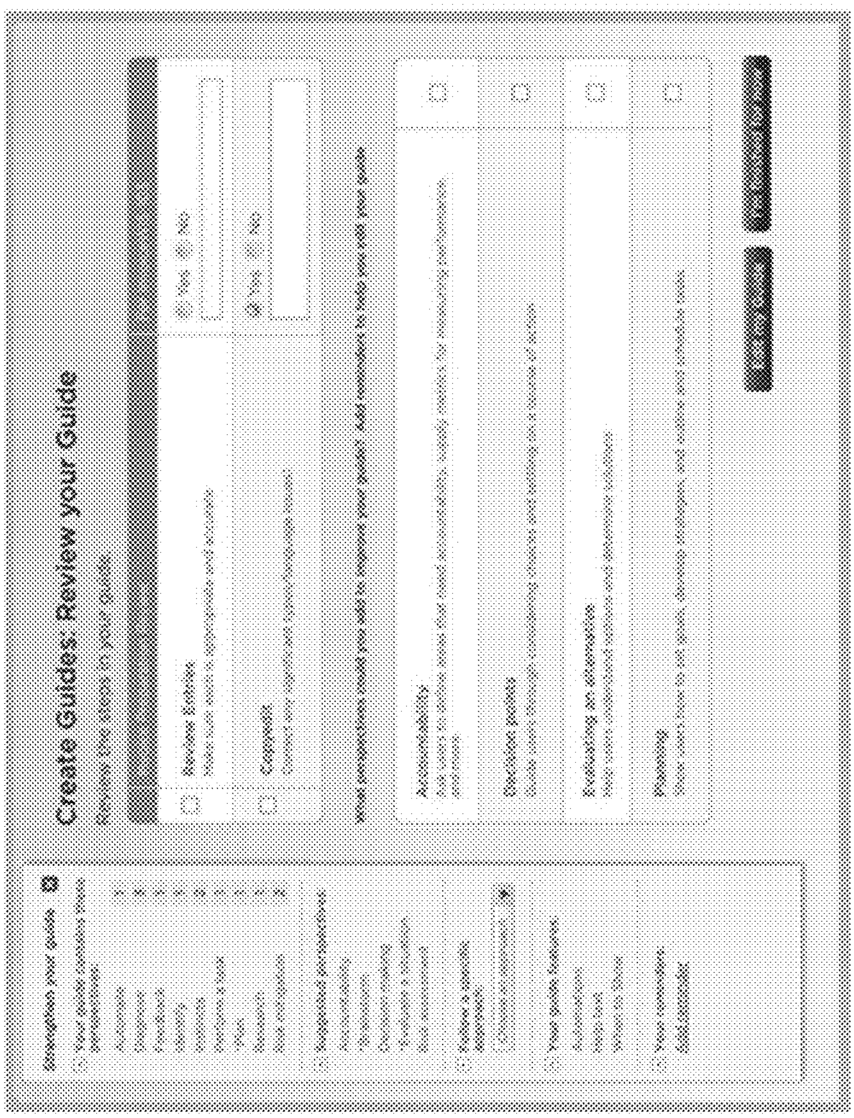

In accordance with some embodiments, the hardware processor can receive an "Approach" (e.g., a predetermined set of characteristics for each step). The "Approach" can be a paradigm for thinking about and working on a type of situation or request. For example, a "Six Sigma DMAIC" approach can ensure quality by thinking separately about a number of factors and/or consideration. The "Approaches" help ensure a complete guide maintains an appropriate and logical order and encourages the interactive checklist to be more effective according to proponents of each "Approach." In some embodiments, the "Approaches" can include a plurality of elements known as "Perspectives." In accordance with some embodiments, the hardware processor can display a "Perspective" feature, as shown in interface 2606 of FIG. 26C. The "Perspective" feature identifies know-how and instincts that made the user an expert in an area. For example, perspectives can include characteristics that define one or more steps, such as define, measure, automate, research, brainstorm, and/or any other suitable characteristic. In a particular example, when creating an interactive checklist and following a "Six Sigma Approach", the "Perspective" feature can help identify useful steps to include, based on the perspectives. In such an example, a "Measure perspective" will help identify an appropriate measurement-related steps to create. In some embodiments, the hardware processor can receive individual characteristics to assign to each step from a user, as shown in interface 2608 of FIG. 26D. In some embodiments, some "Approaches" can be predetermined, as shown in interface 2610 in FIG. 26E. Alternatively, some "Approaches" can be designed by a user or an organization. In some embodiments, the hardware processor can present a review draft to allow a user to review the "Perspectives" used in the guide, as shown in interface 2612 of FIG. 26F. Additionally, the hardware processor can present suggestions to improve the guide allowing the user to act upon the suggestions (e.g., by selecting the suggestion).

Figure 27A:
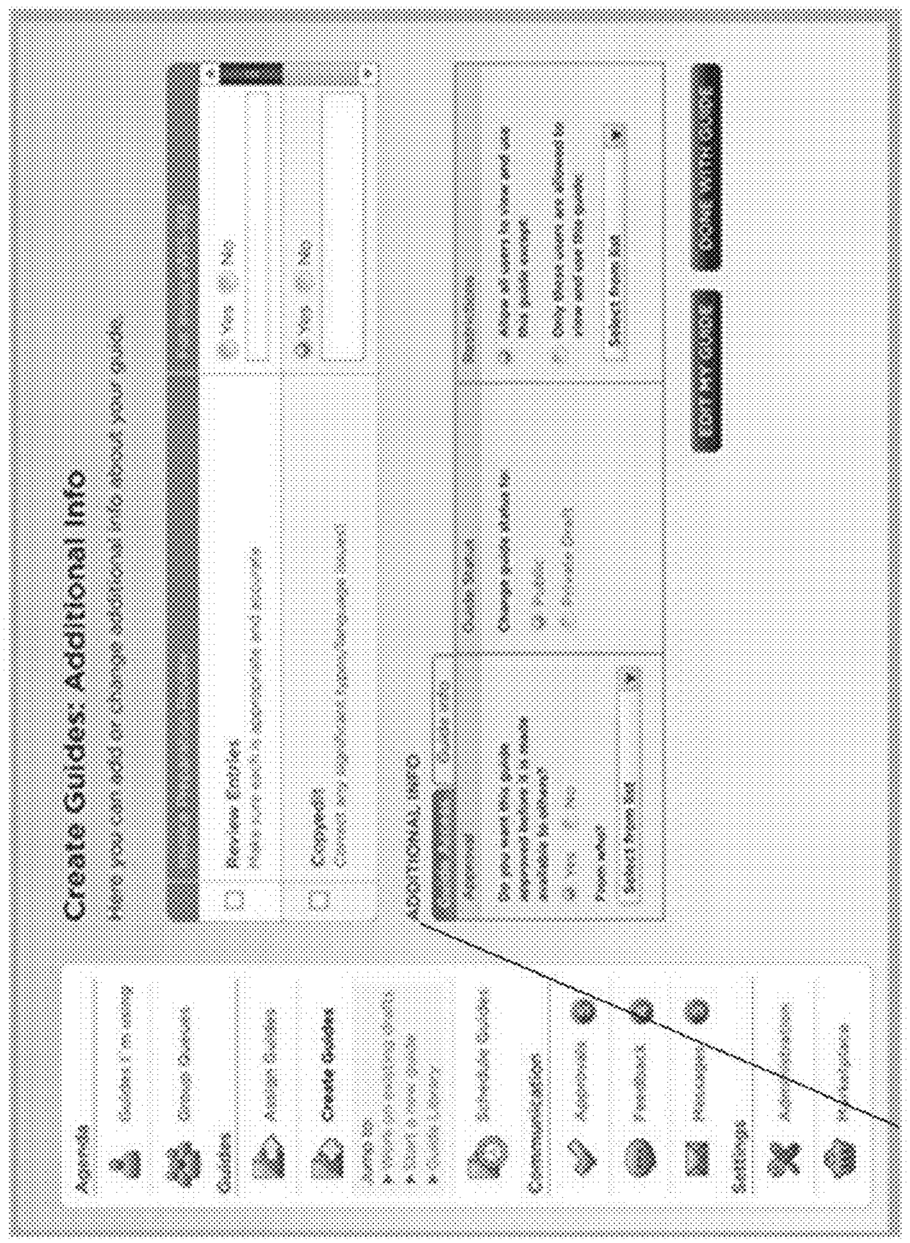
Figure 27B:
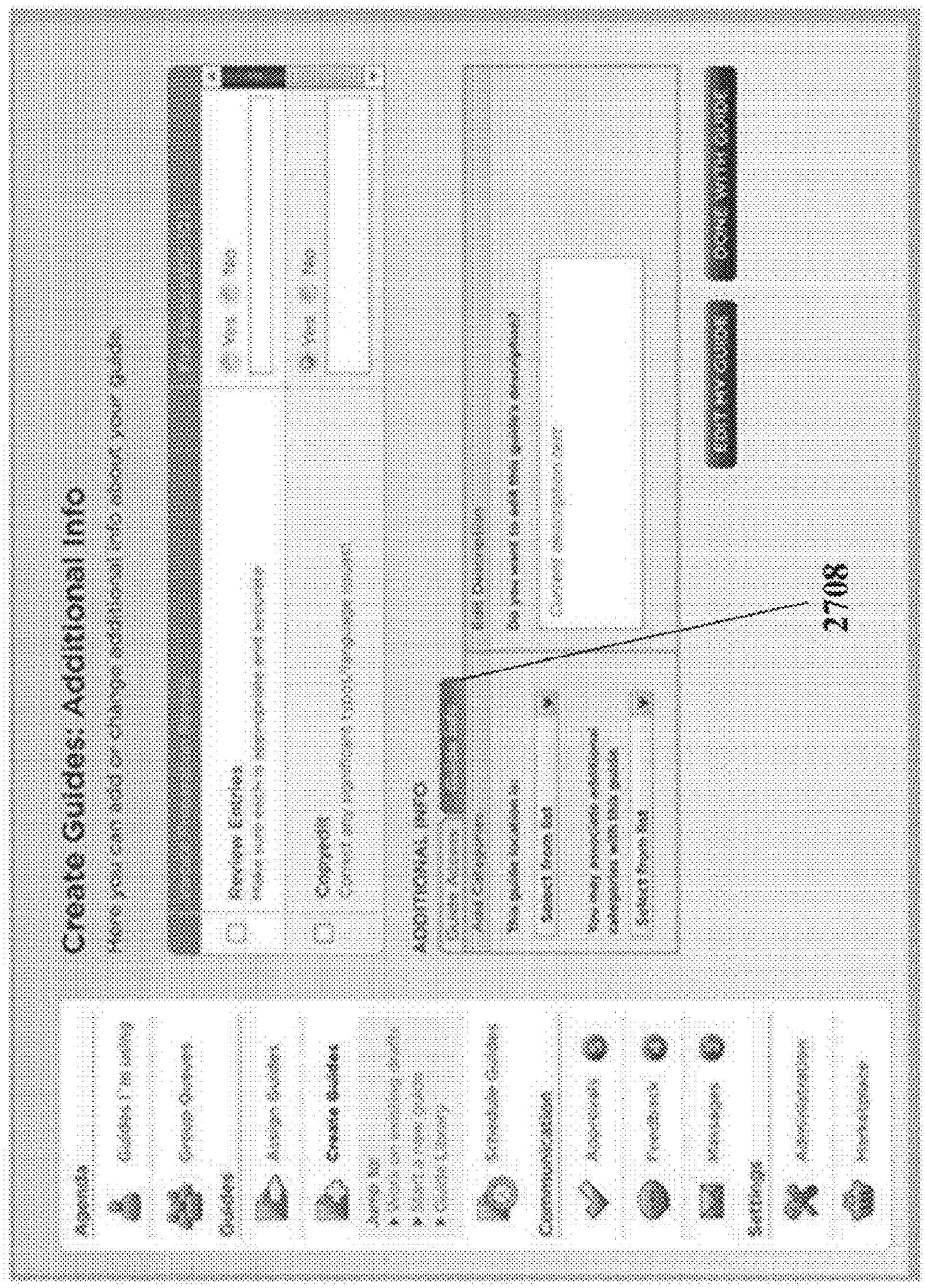

In accordance with some embodiments, once all steps have been added to an interactive checklist (perhaps, for the time being), the user can review them. For example, the user can review the steps using a "Test Mode" that shows the activity as a particular assignee would see it (e.g., steps that are not visible to that particular assignee would be either not displayed or grayed out). As the person conducting the review enters hypothetical inputs, the visibility of certain steps may change. Additionally and/or alternatively, the user conducting the review may specify a particular user or group from whose perspective the interactive checklist should be displayed. In some embodiments, using an interface 2702 that may be presented by a hardware processor of a computing device, the hardware processor can receive a user input to indicate interactive checklist-level access, for example, whether the initial interactive checklist(s) can require approval before subsequent uses can be used by the same user without approval, and the nature of the approval (e.g., by which users or groups, and in sequence or simultaneously), whether it can be made a public interactive checklist (or kept as a private draft), whether only certain users or groups can be allowed to use the interactive checklist, and/or any other indications. The hardware processor can display some of these examples in interface 2702 of FIG. 27A under "Guide Access" section 2704. As part of the review process, the user can also review the title, description, group, and/or any other information for the interactive checklist indicated at the beginning of the process. In some embodiments, using an interface 2706 that may be presented by a hardware processor of a computing device, the hardware processor can receive a user input to change these items at "Guide info" section 2708 in FIG. 27B.

Figure 27C:
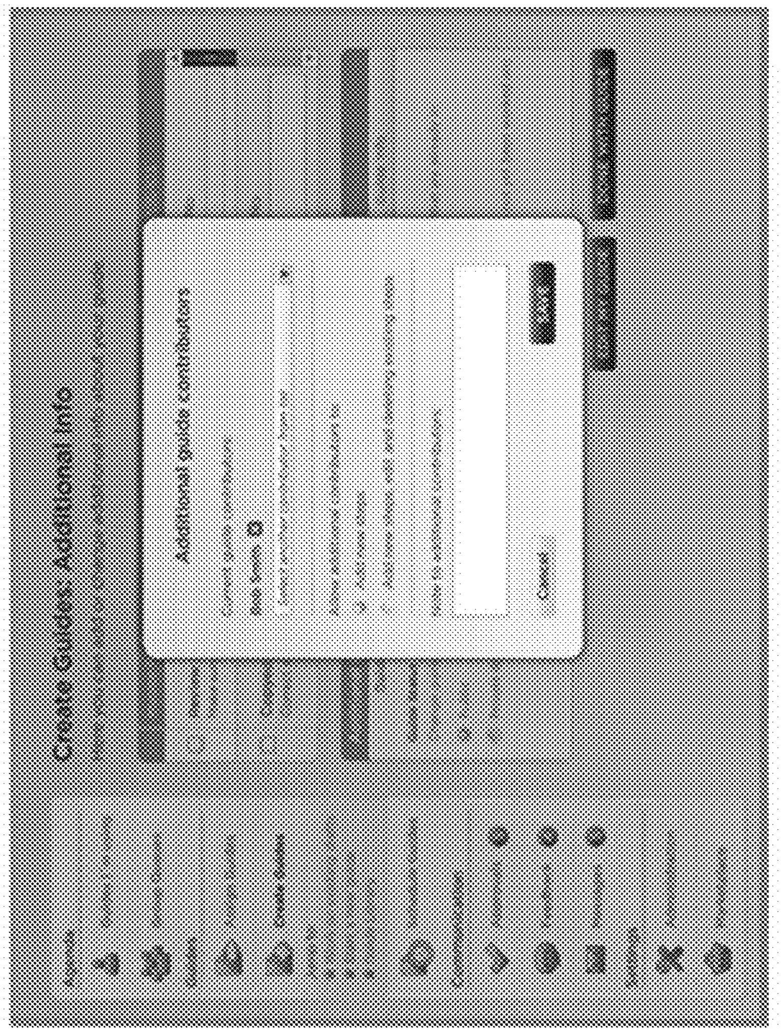
Figure 27D:
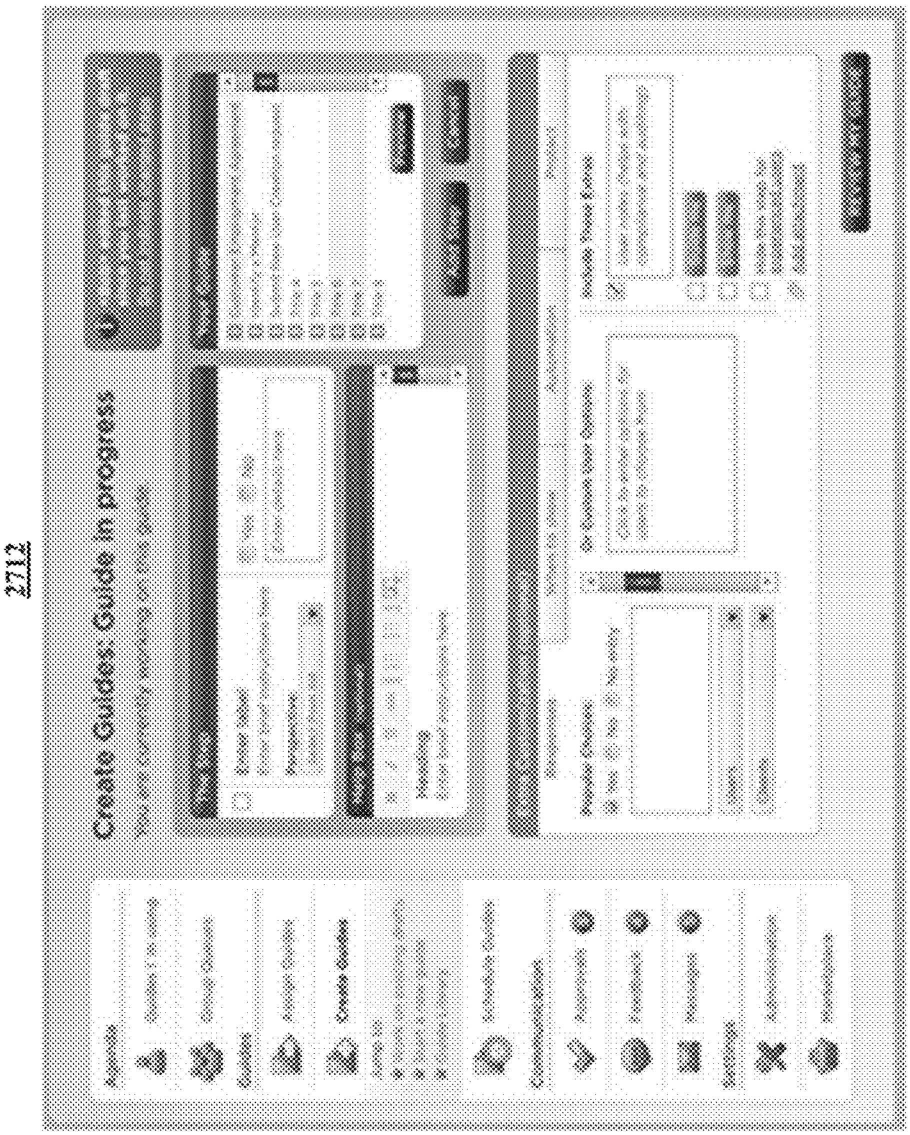

In some embodiments, the hardware processor can receive an additional contributor or multiple additional contributors to assist a user in creating the guide, as shown in interface 2710 of FIG. 27C. Turning to FIG. 27D, as shown in interface 2712, the hardware processor can display when each contributor works on an interactive checklist allowing the user to view and review changes made by each contributor.

Figure 28:
FIG. 28 shows an example of a user interface for presenting published and/or unpublished interactive checklists in accordance with some embodiments of the disclosed subject matter.

In some embodiments, using an interface 2800 that may be presented by a hardware processor of a computing device, the hardware processor can present published and/or unpublished interactive checklists in the "Guide Library," also located on the "Create Guides" tab shown in FIG. 28. In some embodiments, the hardware processor can present the interactive checklists in a merged view. For example, the hardware processor can display a visual indication (e.g., an icon) for each unpublished interactive checklist and a separate visual indication for each published interactive checklist. Additionally and/or alternatively, the hardware processor can display a visual indication for each interactive checklist that may be access-restricted. These checklists can be sorted and filtered.

Figure 29A:
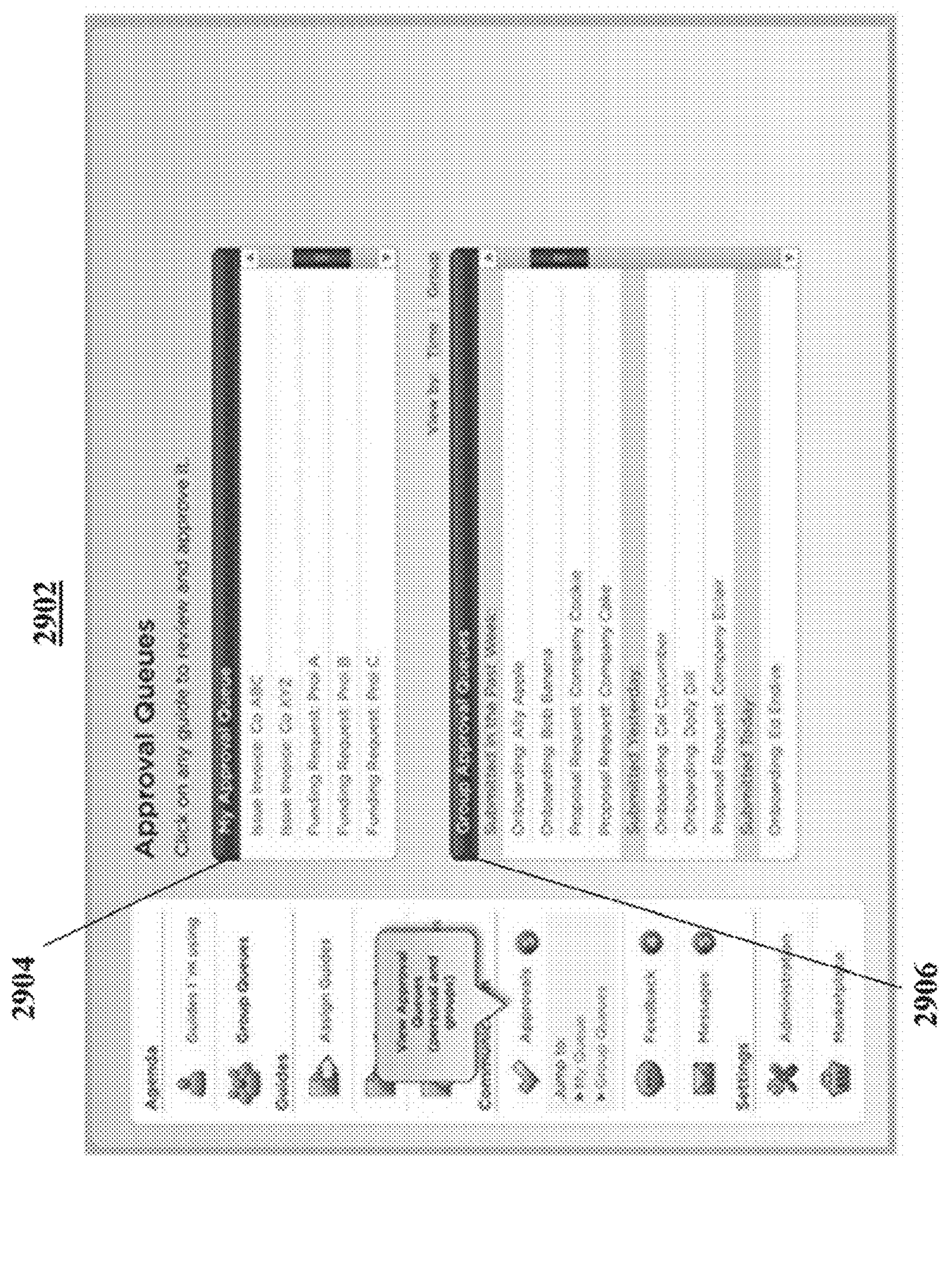
FIGS. 29A and 29B show examples of user interfaces for presenting approval queues in accordance with some embodiments of the disclosed subject matter.
Figure 29B:
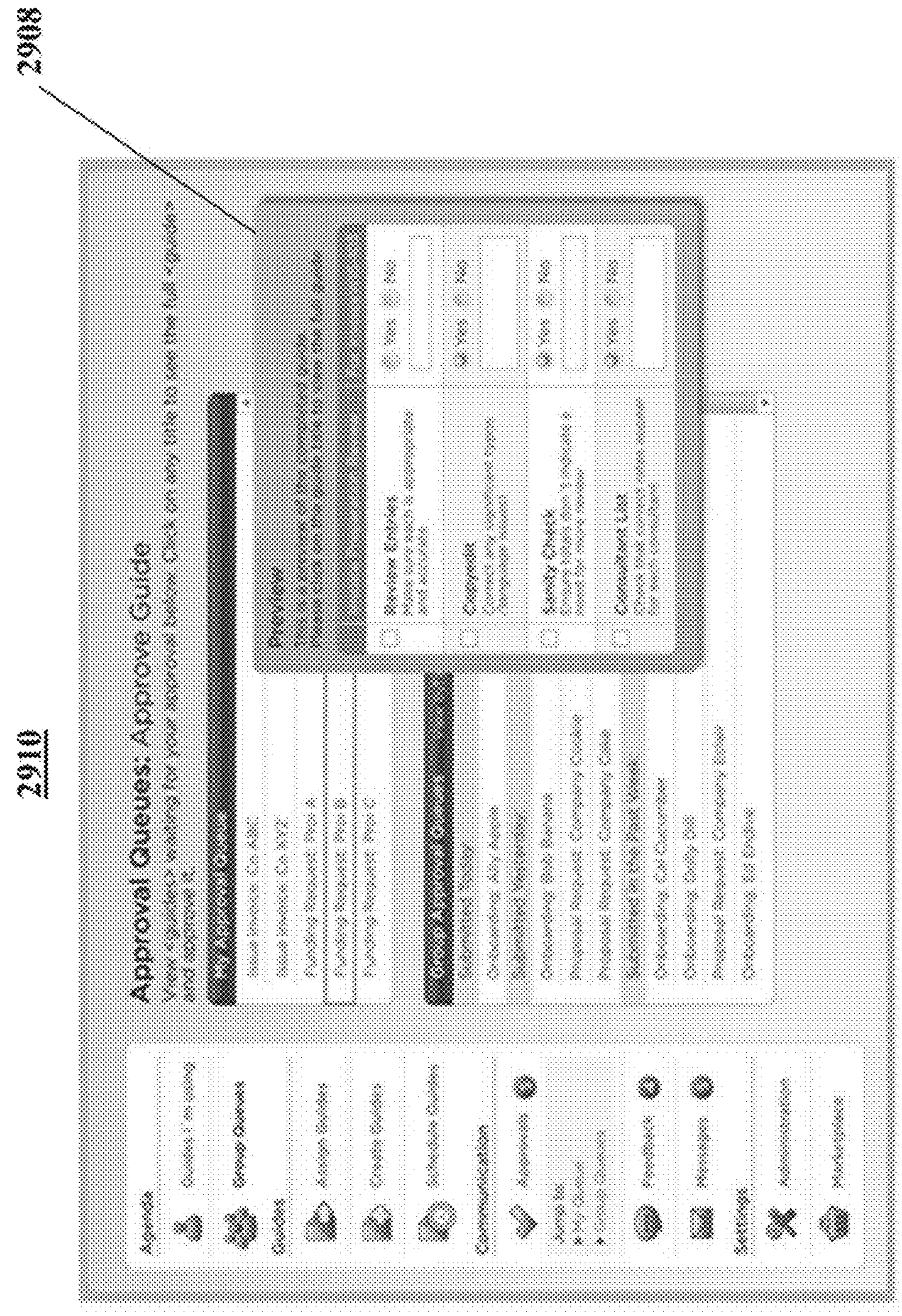
Figure 30:
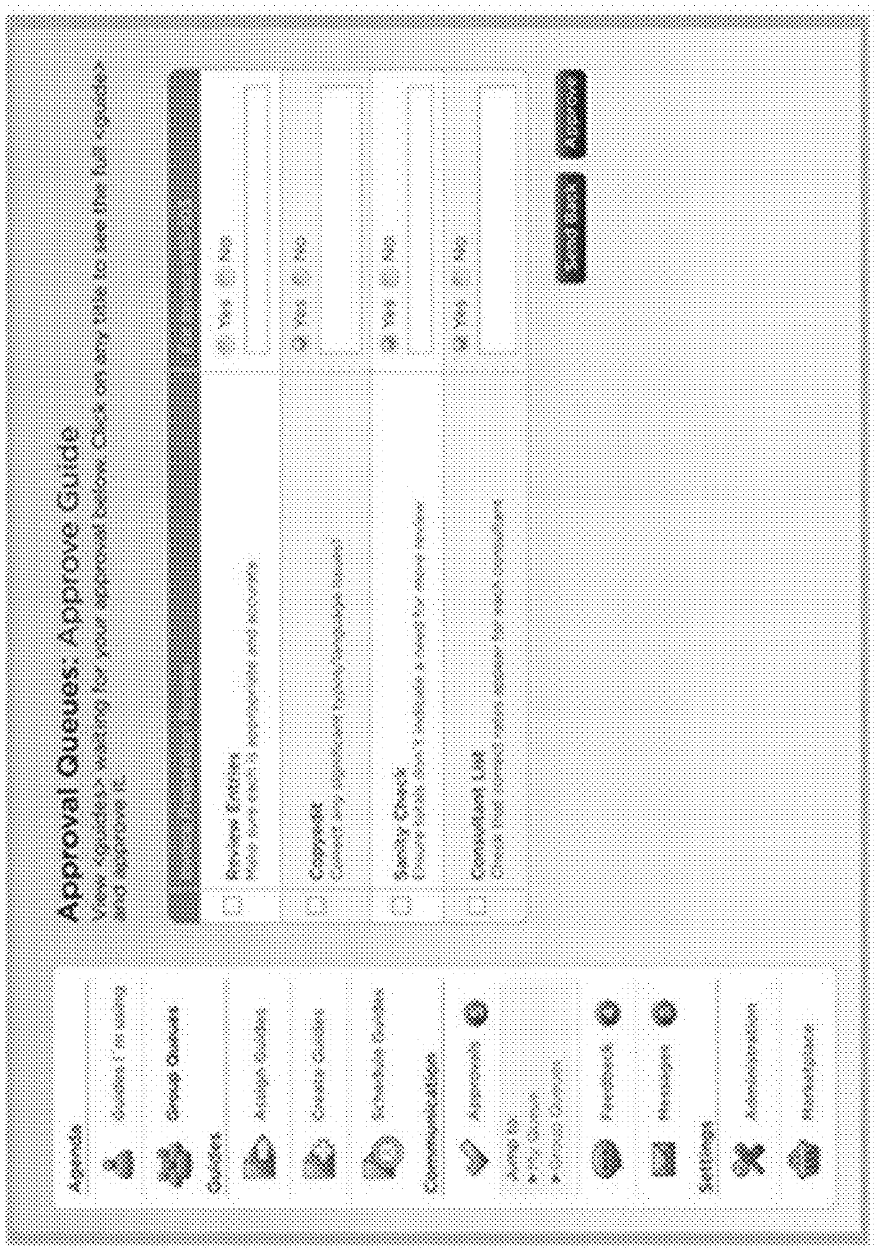
FIGS. 30, 31A, 31B, and 31C show examples of user interfaces for presenting feedback in accordance with some embodiments of the disclosed subject matter.

In accordance with some embodiments, in an "Assign a Guide" process, some complete interactive checklists may require another user's approval. In some embodiments, using an interface 2902 that may be presented by a hardware processor of a computing device, the hardware processor can display two approval queues for each user as shown in FIG. 29A. Additionally, the hardware processor can display a personal queue shown as "My Approval Queue" 2904 and a queue for groups shown as "Group Approval Queues" 2906 to which they belong (as for assigned interactive checklists). If an interactive checklist is completed that may require approval, it can be sent to the appropriate queue by the hardware processor. When a user comes to an approval queue, they can see all interactive checklists awaiting their approval. The user can opt to view a group approval queue either by submission time, by group, and/or by calculated priority which may consider any suitable one or more factors. In some embodiments, using an interface 2910 that may be presented by a hardware processor of a computing device, the hardware processor can display a small preview of the completed interactive checklist shown as "Preview" 2908 in FIG. 29B when a user hovers on an interactive checklist in the queue. In some embodiments, upon the hardware processor receiving a user input (e.g., clicking on an individual interactive checklist awaiting their approval), the hardware processor can present a separate screen, for example, interface 3000 of FIG. 30, where the hardware processor can display the completed interactive checklist. Here, the user can approve it or send it back for revision (with a note, if desired).

Figure 31A:
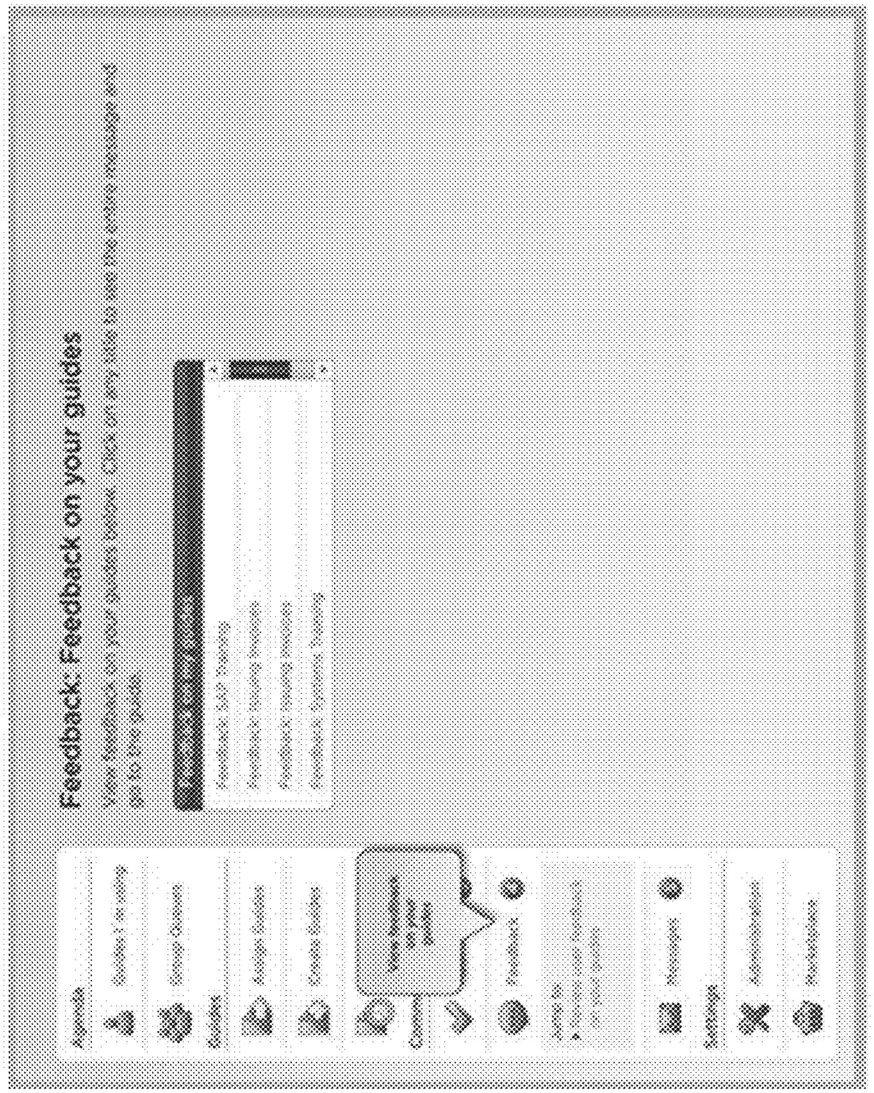
Figure 31B:
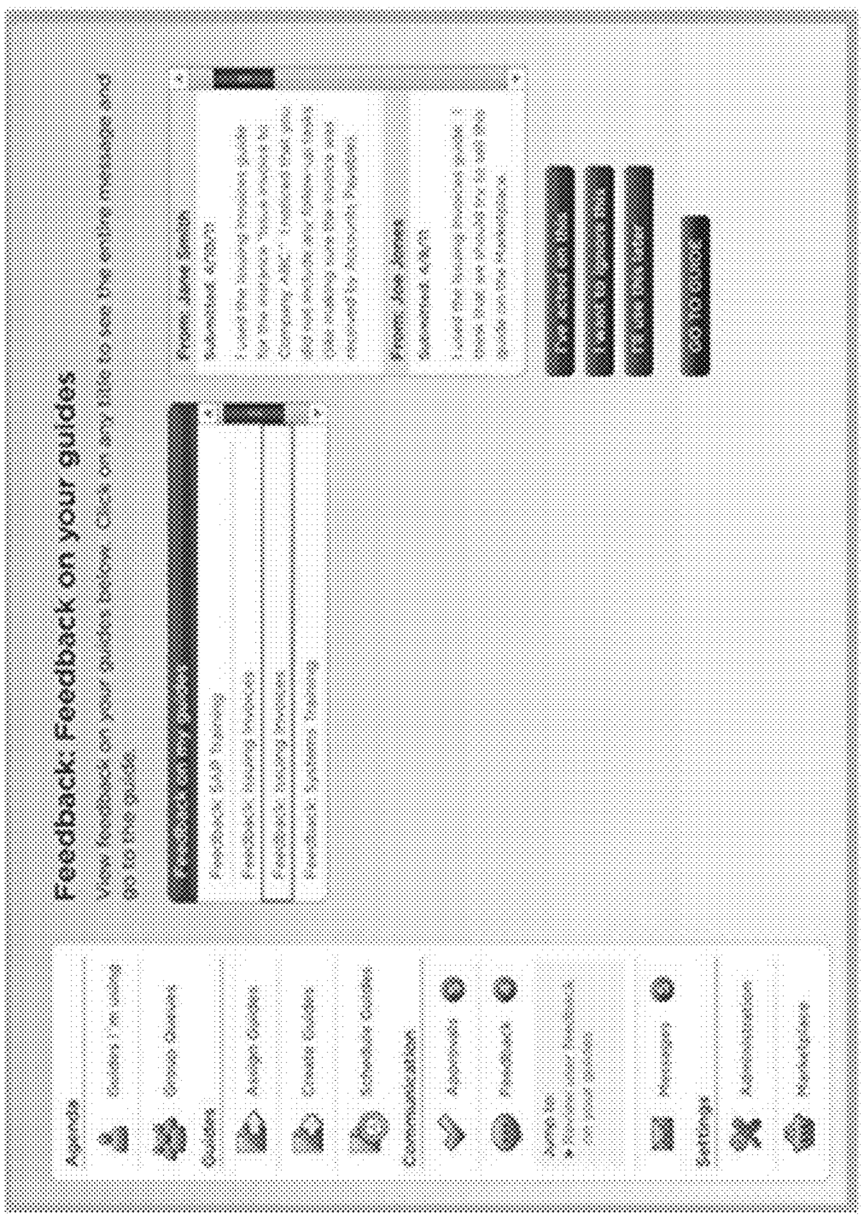
Figure 31C:
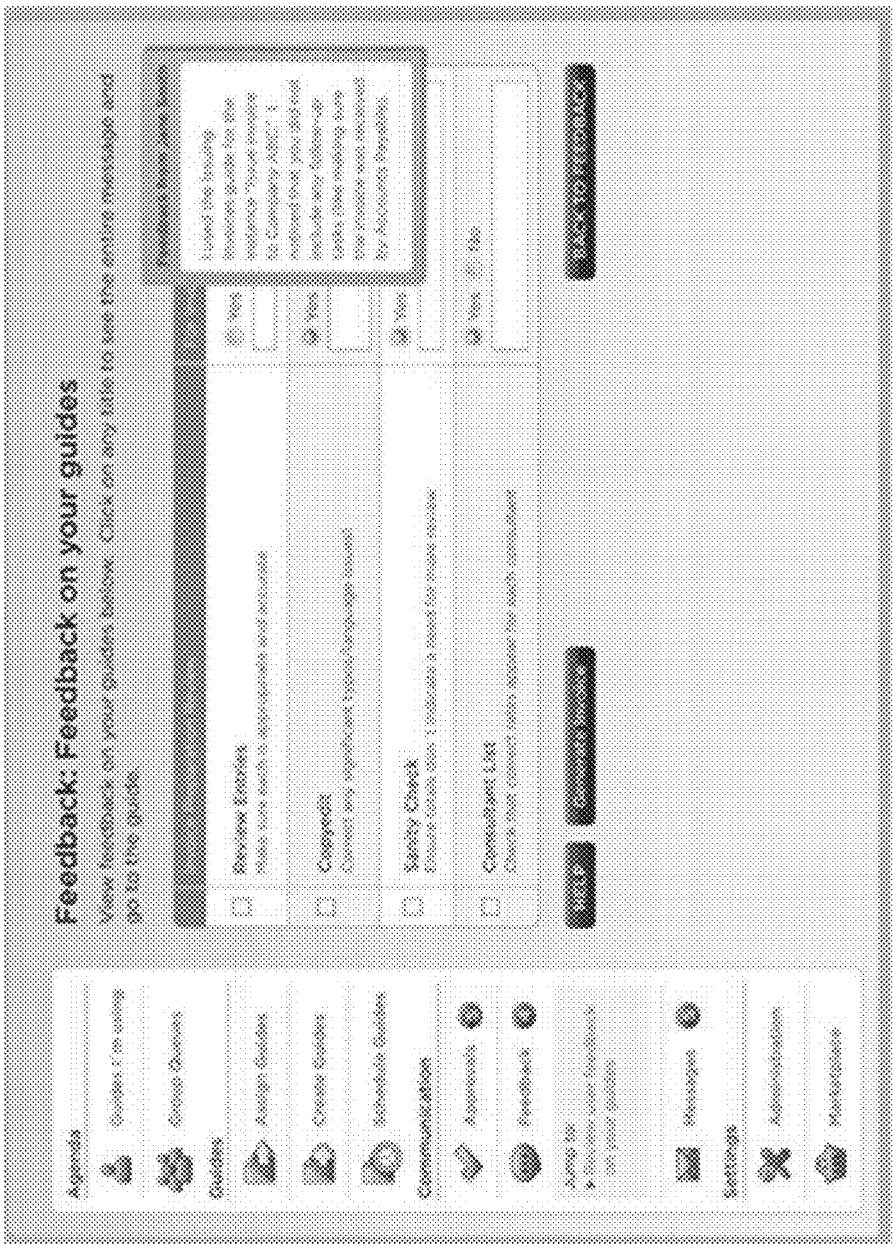

In accordance with some embodiments, using an interface 3102 that may be presented by a hardware processor of a computing device, the hardware processor can receive user feedback as shown in FIG. 31A. The user feedback can include any suitable feedback such as feedback to the interactive checklist, feedback pertaining to the user's experience, and/or any other suitable feedback. This feedback can then be sent to an appropriate feedback queue by the hardware processor. The hardware processor can display interface 3104, as shown in FIG. 31B, upon receiving a user selection of a piece of feedback from the queue. Additionally, the hardware processor can also display any other pieces of feedback for the same interactive checklist and the hardware processor can allow a user to react to feedback by responding to it, dismissing it, keeping it for later, etc. As an alternative, in some embodiments, the hardware processor can display the feedback in the context of the interactive checklist itself. Here, the hardware processor can present a copy of the interactive checklist and the hardware processor can receive user feedback from a separate widget as shown in interface 3106 of FIG. 31C.

Figure 32A:
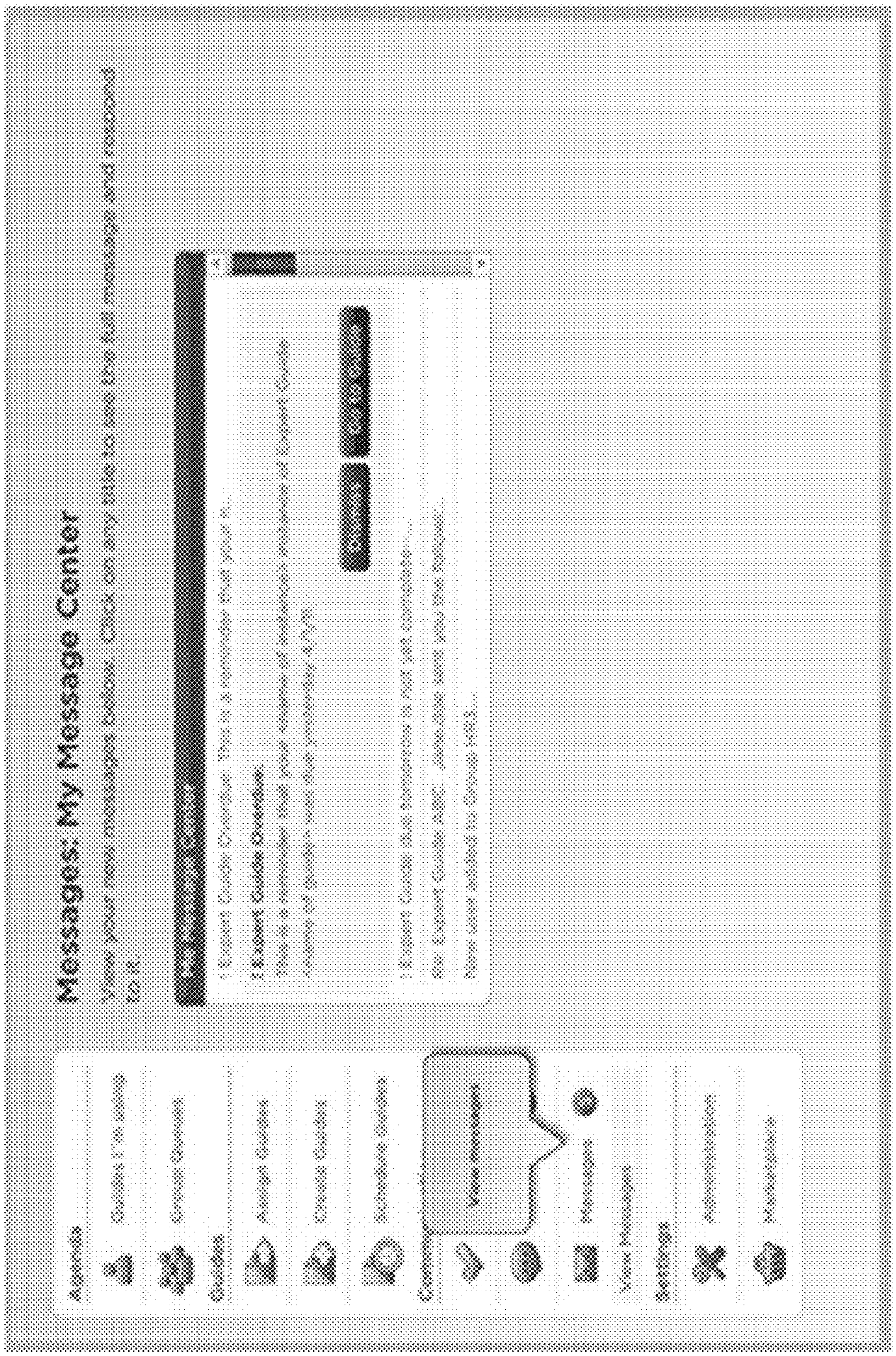
FIGS. 32A and 32B show examples of user interfaces for presenting internal messages in accordance with some embodiments of the disclosed subject matter.
Figure 32B:
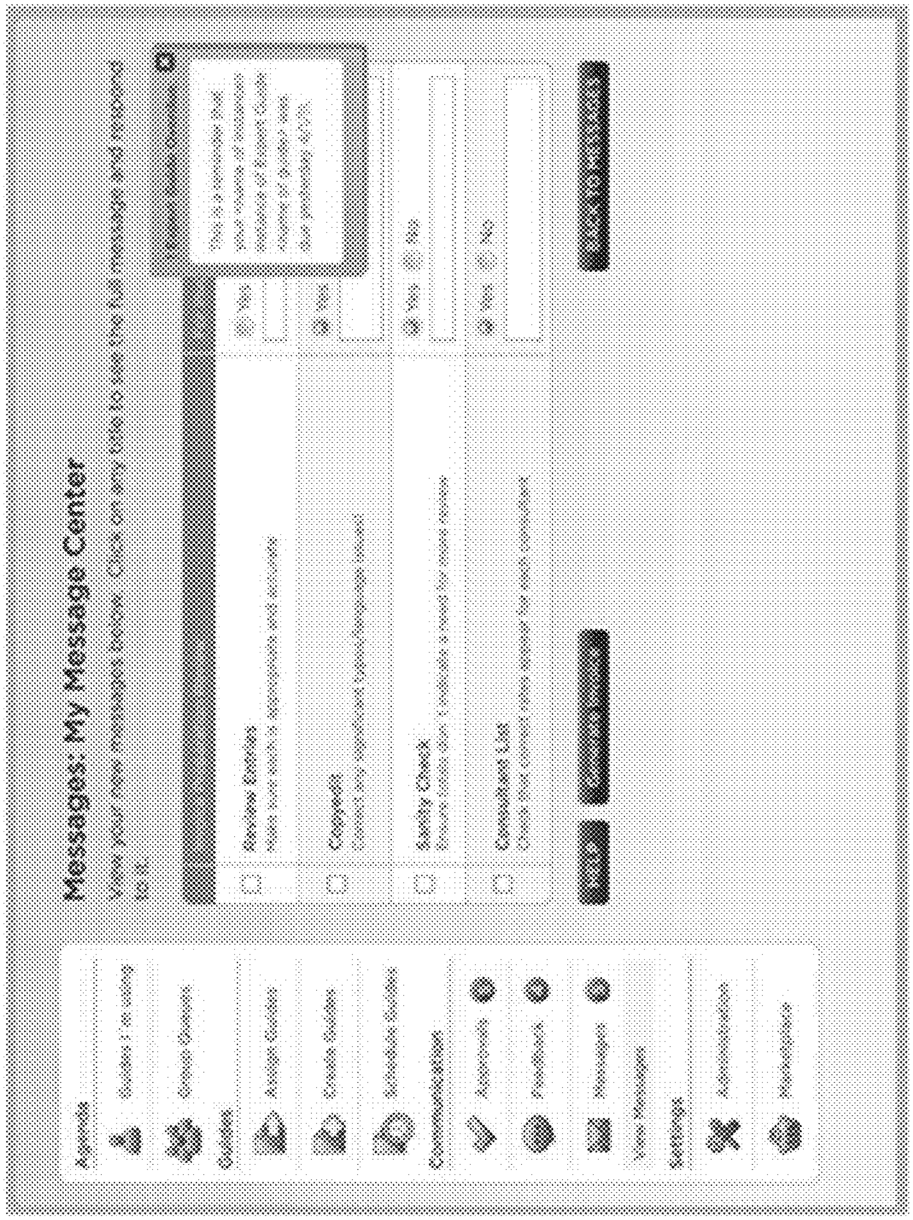

In accordance with some embodiments, using an interface 3202 that may be presented by a hardware processor of a computing device, the hardware processor can route internal messages to a "Message Center." The "Message Center," as shown, for example, in interfaces 3202 and 3204 of FIG. 32A and FIG. 32B, can be used by the hardware processor to send internal messages related to individual interactive checklists or users. Depending on the interactive checklist, organization, group or user configuration, and/or type of priority of message, a message may also be copied or rerouted to external message queues, such as a user's email, SMS, fax, Instant Messaging service, Message Bus, Enterprise Service Bus, or phone through text-to-speech. Messages can be sent by an interactive checklist when triggered by some action in some embodiments. User-to-user messages can also be provided in some embodiments. As with Feedback, the hardware processor can display the Message in context, with the interactive checklist to which it refers.

Figure 33:
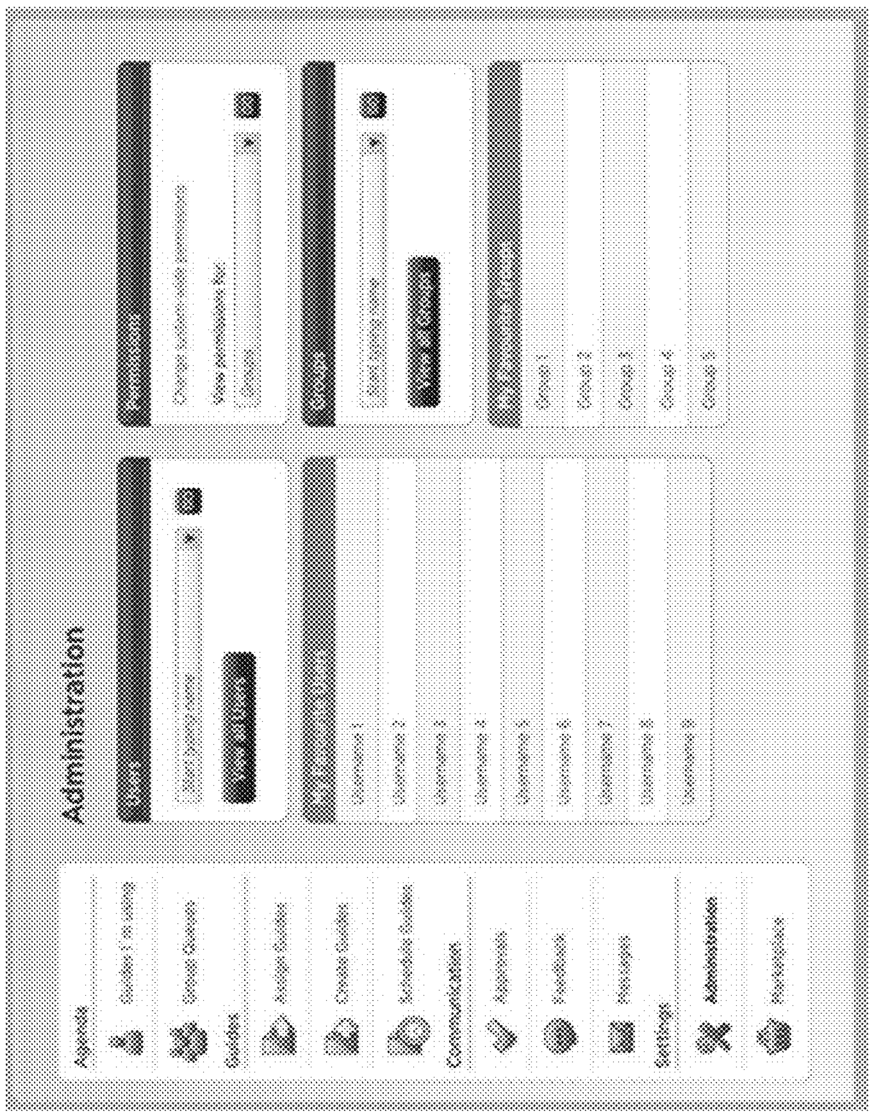
FIGS. 33, 34, 35, 36, 37, 38A, 38B, 38C, 39, 40, 41A, 41B, 42, 43, 44, 45, 46, 47, 48, 49A, 49B, 50A, 50B, 50C, 50D, 50E, 51, 52, 53, 54, and 55 show examples of user interfaces for configuring administration settings in accordance with some embodiments of the disclosed subject matter.

In accordance with some embodiments, one feature of an interactive checklist can be an "Administration Guide." In some embodiments, using an interface 3300 that may be presented by a hardware processor of a computing device, the hardware processor can configure settings and permissions from an organization. An example of such a guide is shown in interface 3300 of FIG. 33. From interface 3300, within an administration tab, the hardware processor can receive a user input to add or remove users from the interactive checklist, modify settings for existing ones, add or remove groups from the interactive checklist, modify settings for existing ones, modify interactive checklist-wide settings, and/or make any other modifications to the interactive checklist.

Figure 34:
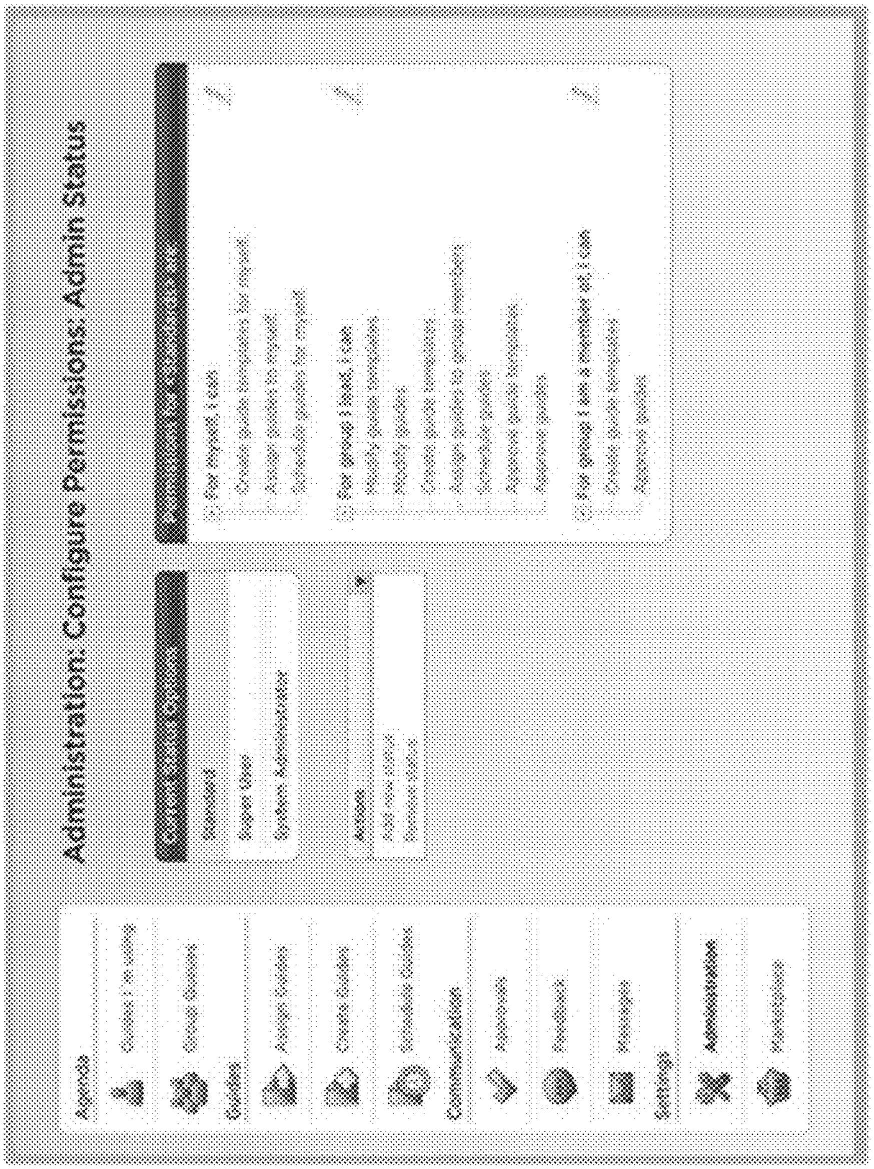

In accordance with some embodiments, there can be a series of interactive checklist-wide permissions that govern how permissions for users and groups can work. An example of such permissions can be presented by a hardware processor of a computing device as illustrated in interface 3400 of FIG. 34. The hardware processor can display an "Admin Status" that allows each user to be assigned an administrative status. As shown, an "Admin Status" option can define permissions the user has, for example, what they can or cannot do, view, and so forth. An interactive checklist can come with a number of default statuses. In some embodiments, the hardware processor can receive additional status options from a user, an administrator, etc. In some embodiments, an "Admin Status" option can be pre-configured and/or can be modified by a user, administrator, etc.

Figure 35:
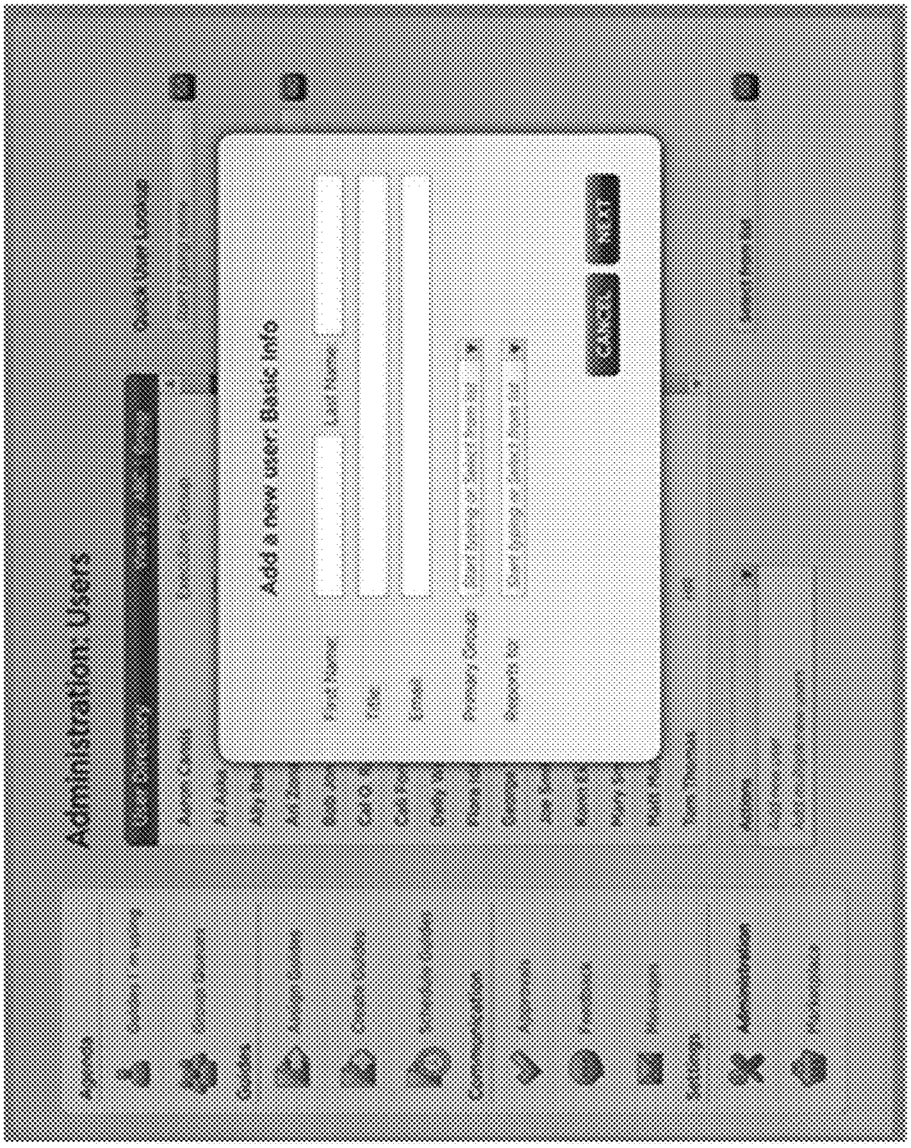

In accordance with some embodiments, when a new user is added to an interactive checklist, some details about the user can be added, such as, first and last names, job title, email address, and/or any other information as shown, for example, in interface 3500 of FIG. 35. A new user can be assigned to a primary group and a manager (another user in the interactive checklist). In some embodiments, the manager can be indicated as an administrative manager for follow up purposes. For example, the administrative manager can have less permissions than the manager in viewing details regarding the interactive checklists. Permissions settings can additionally or alternatively be configured for a new user. For example, a user can be assigned one of the available "Admin Status" choices, to provide a set of permissions. Modifications or exceptions to these permissions can be specified in some embodiments. Permissions can be copied from an existing user in some embodiments.

Figure 36:
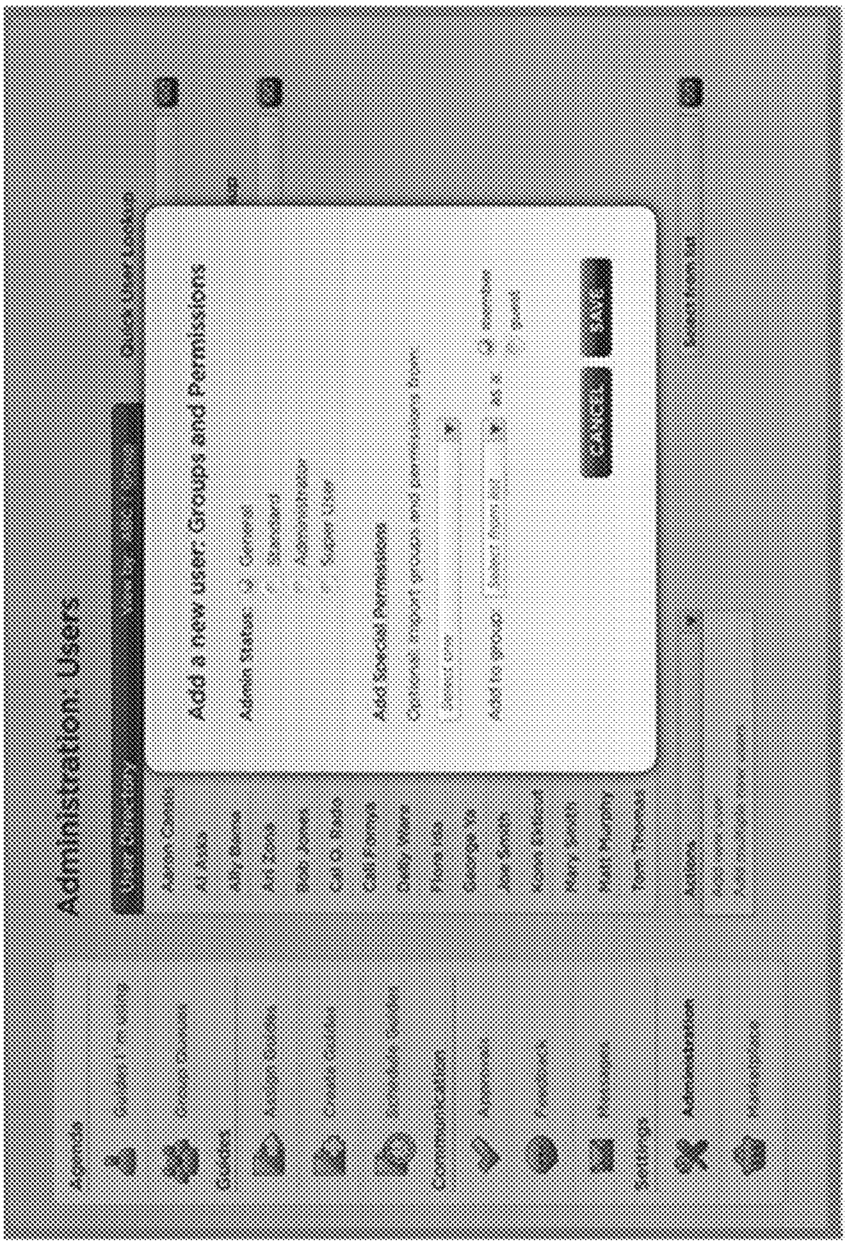

In accordance with some embodiments, multiple users may be added at once, for example, in interface 3600 of FIG. 36. Particular roles and other organizational or permissions settings may be set for all or a group of users at one time in some embodiments.

In some embodiments, upload from a spreadsheet, XML format file, JSON format file, or a CSV format file, can be used to input user information, setting, permission, etc. In some embodiments, an LDAP directory can be used to provision and/or configure user accounts.

Figure 37:
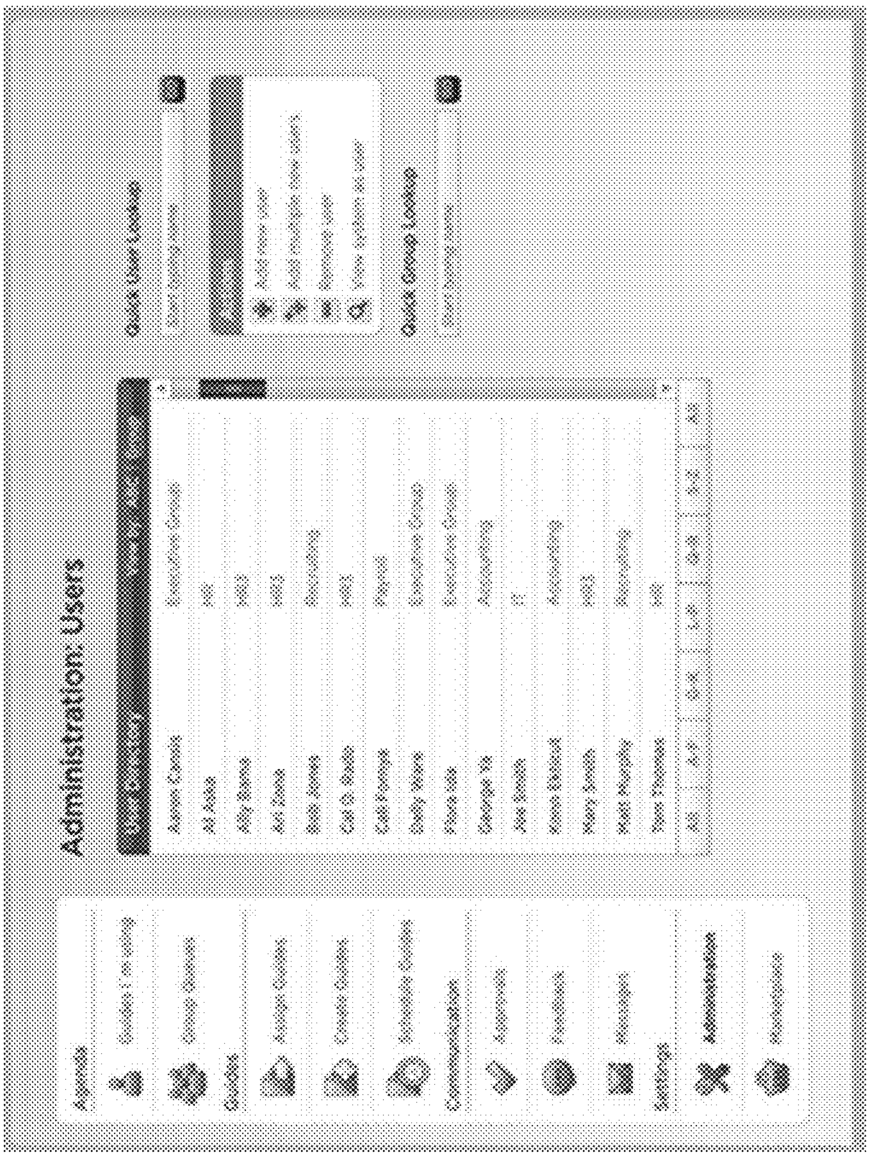
Figure 38A:
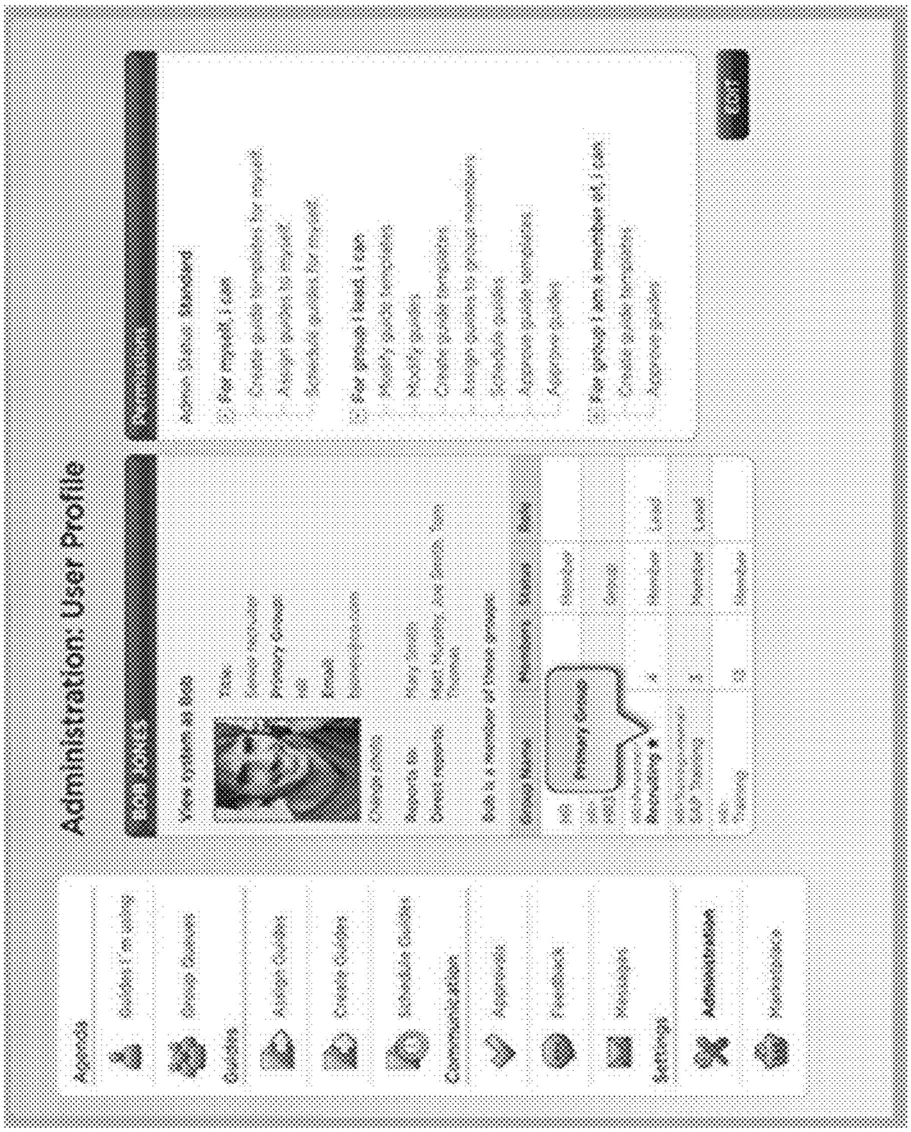

In accordance with some embodiments, using an interface 3700 that may be presented by a hardware processor of a computing device, the hardware processor can present a "User Directory" list, for example as shown in FIG. 37, once a user has been added to a mechanism for providing interactive checklists. The hardware processor can display the list alphabetically (by name) or by primary group affiliation. Access to the directory may be fully or partially allowed or restricted to particular individuals or groups' members. In some embodiments, using an interface 3802 of FIG. 38A (for example) that may be presented by a hardware processor of a computing device, the hardware processor can present a "User Profile" for any user appearing in the directory. As shown in interface 3802, the "User Profile" can display information such as basic information (e.g., name, email, manager, etc.), group memberships, permissions, additional fields configured by the organization, and/or any other suitable information.

In accordance with some embodiments, the hardware processor can receive a user input from an administrator indicating changes to a user's profile. In some embodiments, any element on a page can be modified, for example, basic information, group memberships, admin status, permissions, and/or any other element on the page as shown in interface 3804 of FIG. 38B. In some embodiments, the ability to modify an element on a page can be limited to certain groups of users or may be controlled by an external system or data repository. The hardware processor can receive a user input indicating permissions and/or permissions to grant at any suitable level, such as line by line, by groups (such as shown, for example, in interface 3806 of FIG. 38C), etc.

Figure 39:
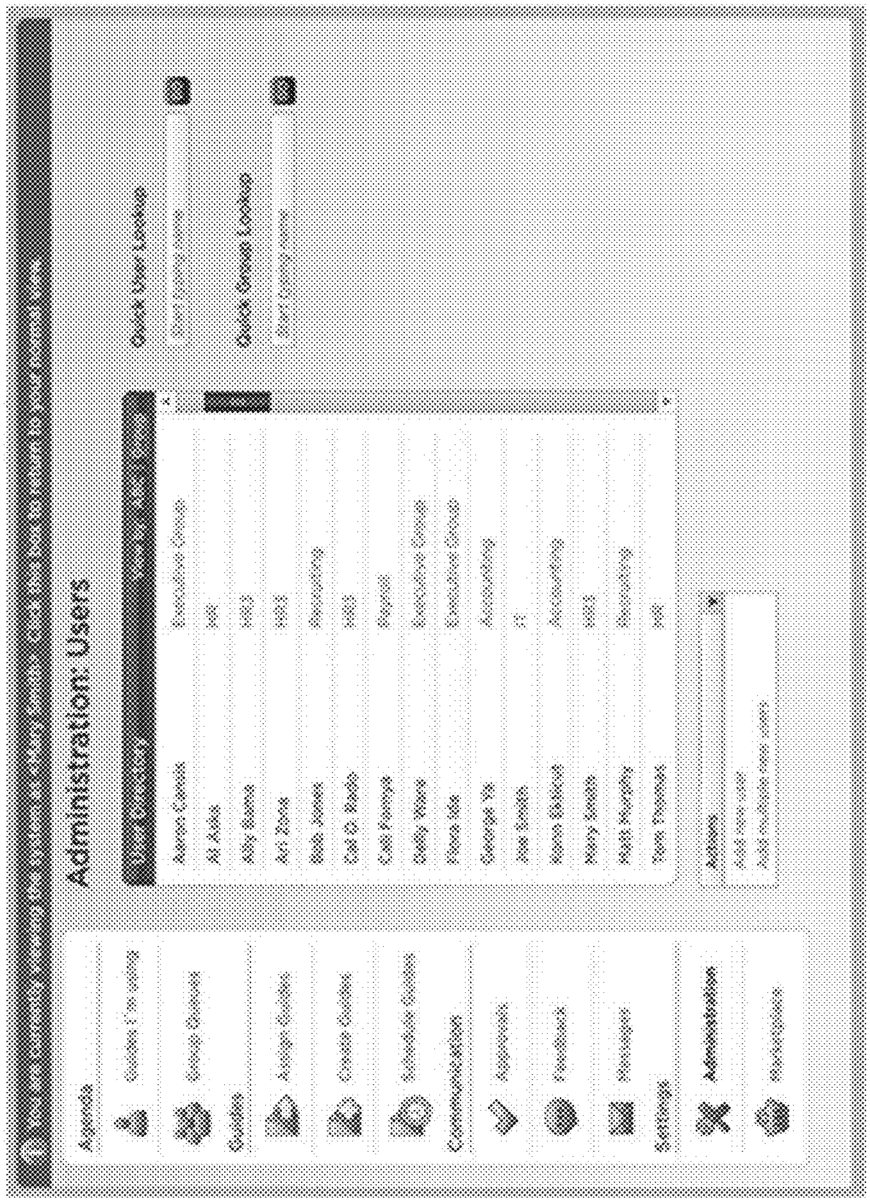

In accordance with some embodiments, another option available from the "User Profile" is the ability to view the interactive checklist as that user. Upon the hardware processor receiving a selection to view the interactive checklist as a second user, a first user can enter a mode in which the hardware processor displays the interactive checklist from the point of view of a second user, for example, as if the first user had logged in as the second user. The user can know that they are still in this mode from a bar that can appear across the top of each page when in this mode, as shown, for example, as presented by hardware processor in interface 3900 of FIG. 39; or from another rendering that indicates which user's perspective is in use. Restrictions on this functionality may be provided by a hardware processor for all or some users, preventing the "Viewer" from taking certain or all actions on behalf of the user, or accessing content restricted from them. Actions and navigation performed through this feature may be logged and displayed in attributions where appropriate.

Figure 38B:
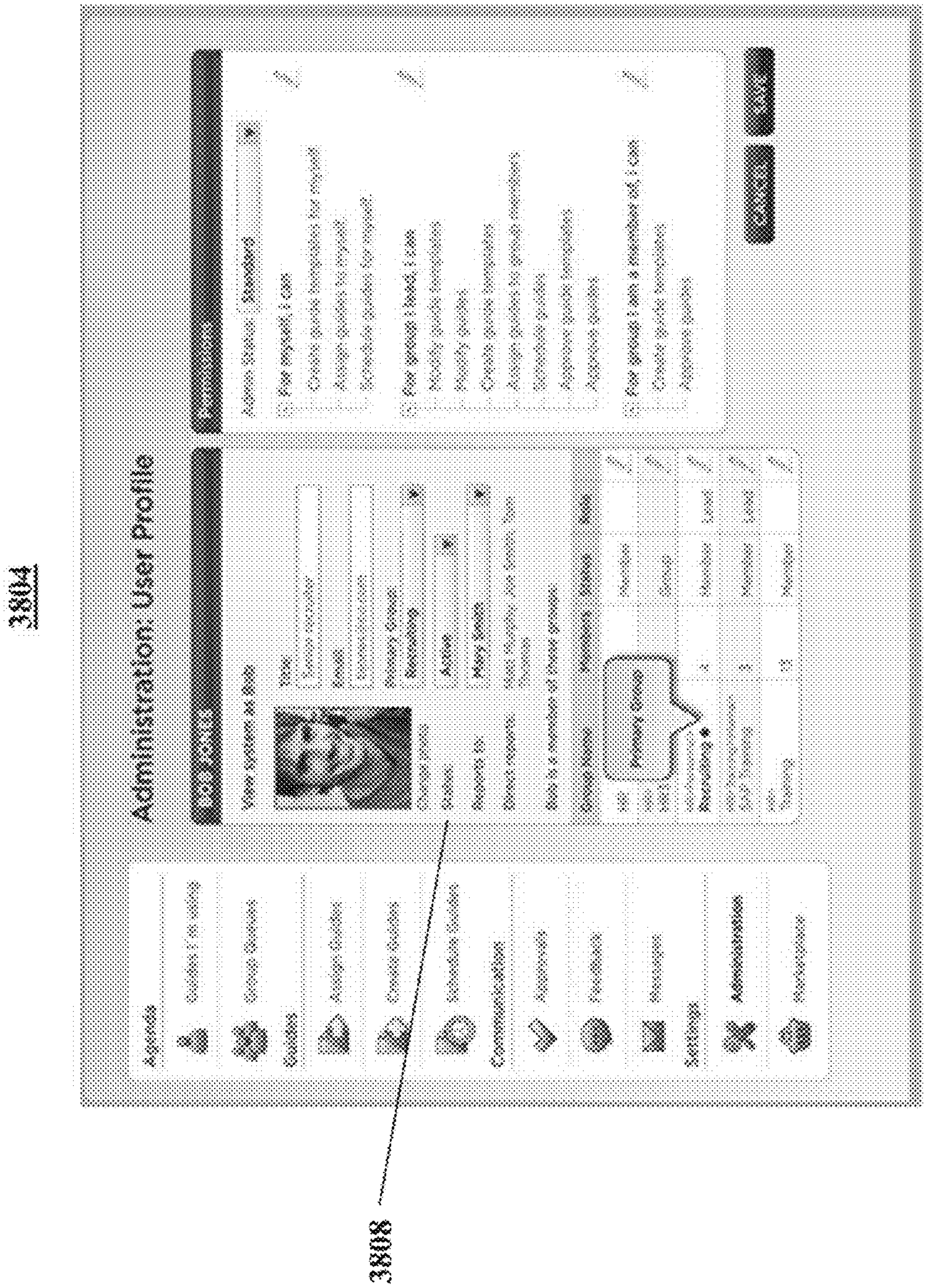
Figure 38C:
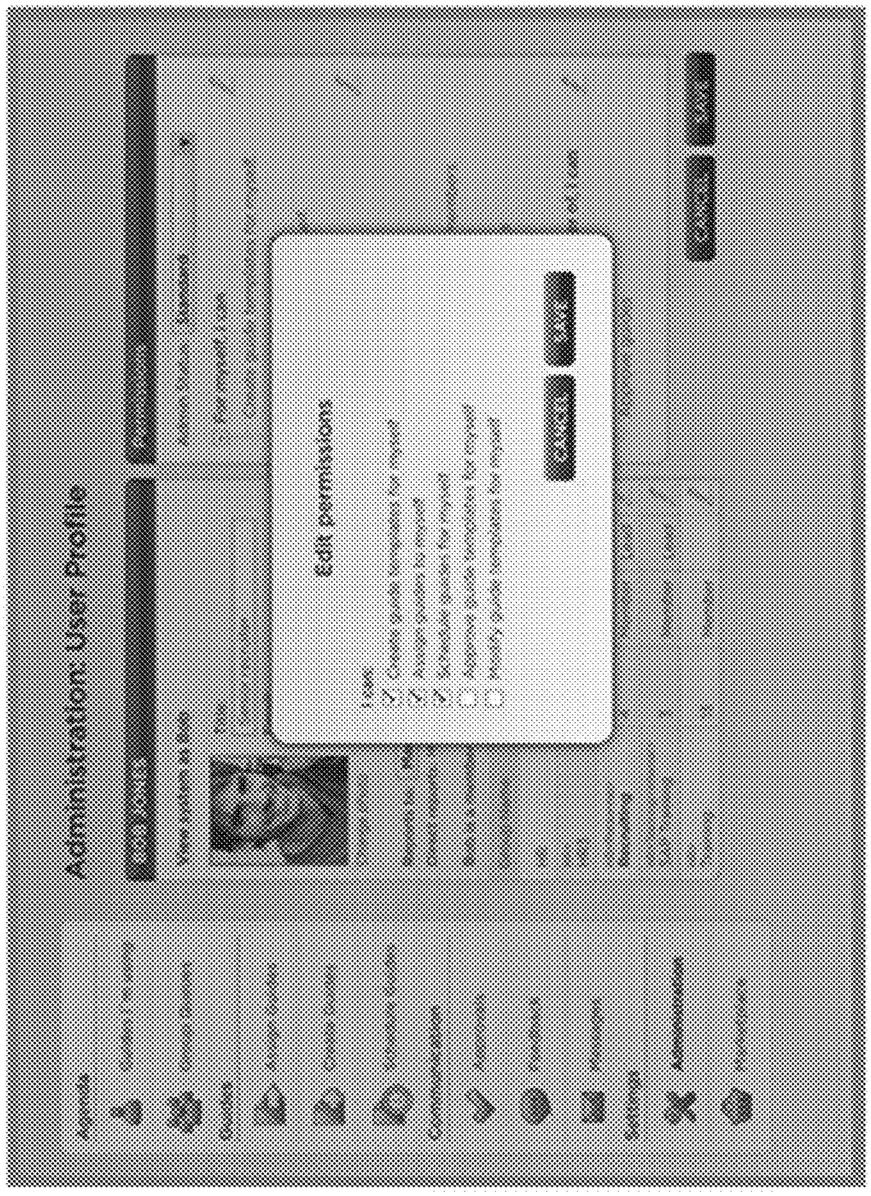
Figure 40:
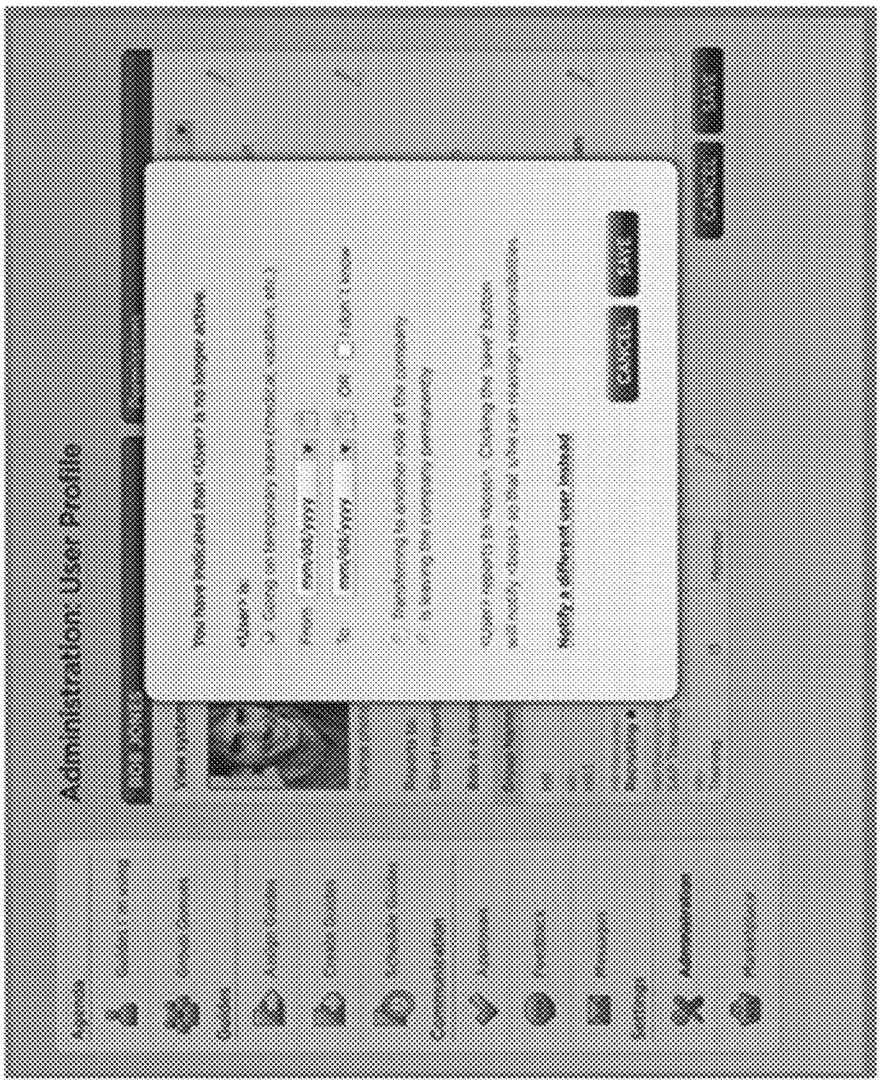
Figure 41A:
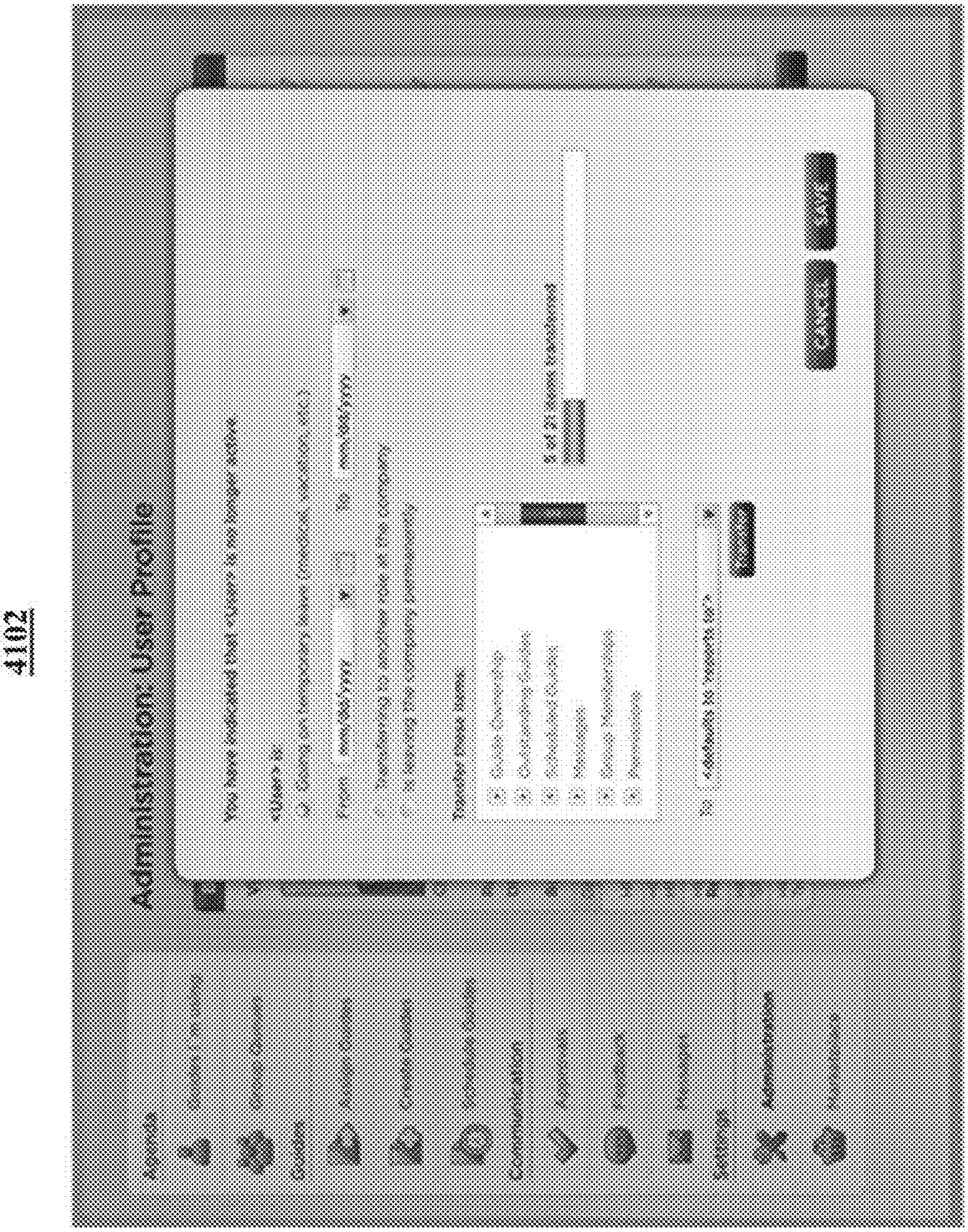
Figure 41B:
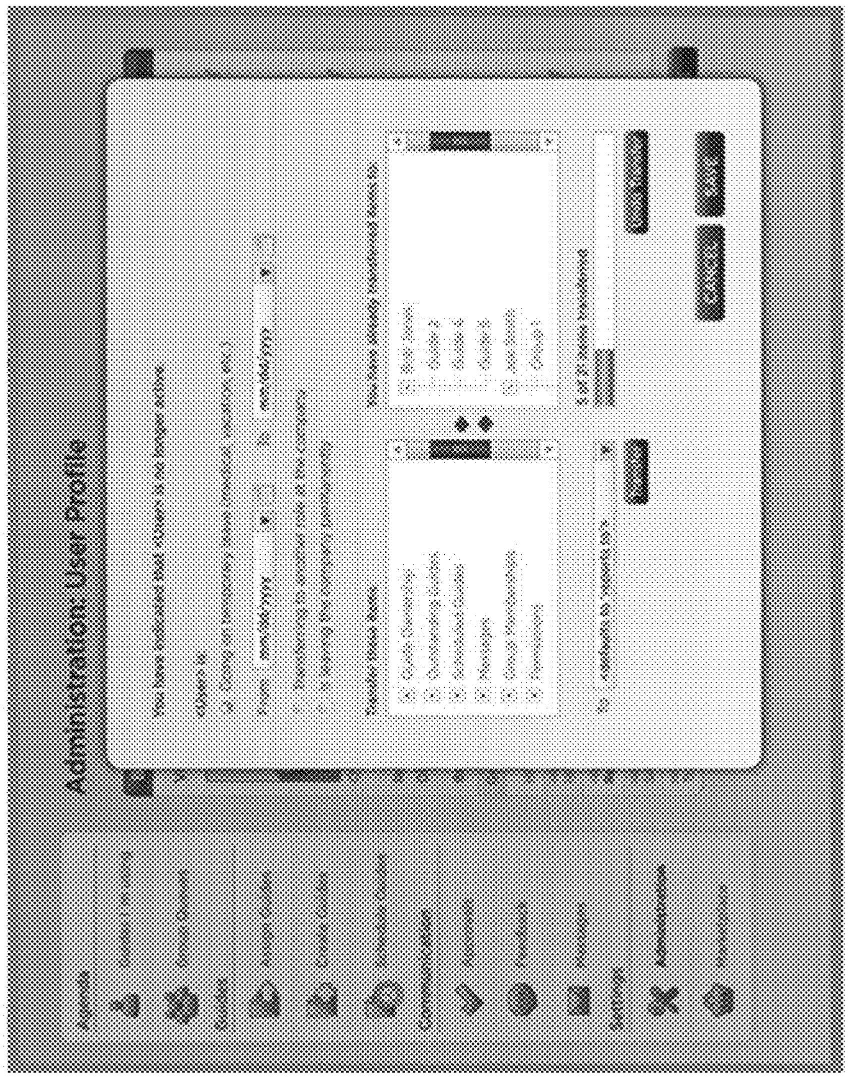

In accordance with some embodiments, from the user profile, using an interface 3804 that may be presented by a hardware processor of a computing device, the hardware processor can receive a user input to change a user's status at an organization as illustrated in FIG. 38B at a "Status" 3808 panel. A user can be considered active by default, but can be changed to be inactive. For example, a user may become inactive when on temporary leave (vacation, medical, etc.), when transferred to another role, when the user leaves the company permanently, and/or any other suitable reason. The interactive checklist can allow the interactive checklist user's work to be transferred to one or more other suitable users permanently or for specified dates as shown in interface 4000 of FIG. 40. If a user is going to become inactive, items can be transferred to other users, starting (and, if applicable, ending on) specified dates, such as interactive checklist ownership, outstanding assignments, scheduled interactive checklists, messages, group memberships, permissions settings, and/or any other transferable items as shown in interface 4102 of FIG. 41A. In some embodiments, each item can be transferred to a different user. If desired, the user can see which items they have already transferred, in addition to items awaiting transfer as shown in interface 4104 of FIG. 41B.

Figure 42:
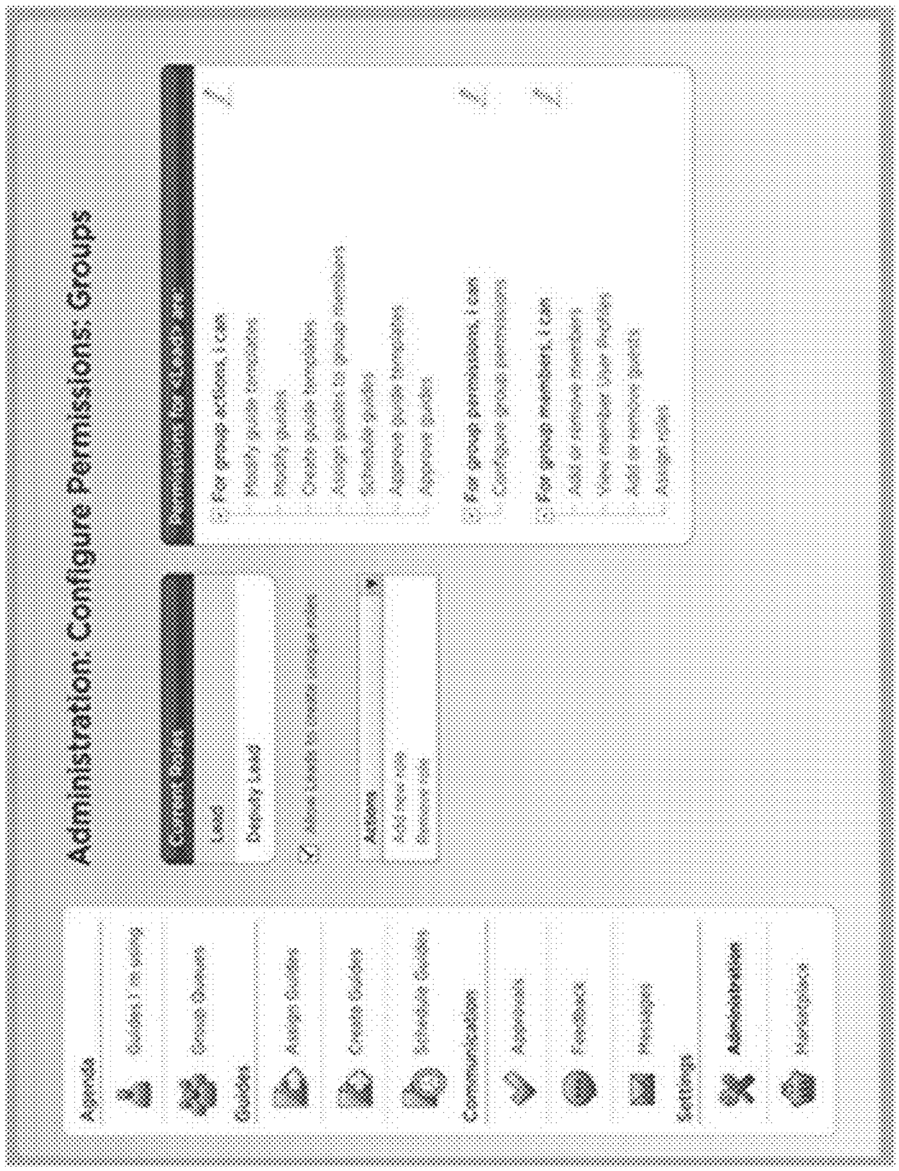

In accordance with some embodiments, an organization can have a hierarchy of "Groups." A group can have any suitable number of subgroups. Users can belong to groups where each can have a primary group with which they are affiliated, but can be members of any suitable number of groups. In some embodiments, interactive checklists can also belong to groups, and, when created, each interactive checklist can be given a location within a group in the group hierarchy. In some embodiments, a series of interactive checklist-wide permissions, e.g., as shown in interface 4200 of FIG. 42, can govern how permissions for users and groups can work. In a group, all users can be classified as members or guests of that group. Each designation can come with a preconfigured set of permissions. In addition, a group can have "Roles." For example, each group can have a role "Group Lead" (which can have a preconfigured set of permissions). This "Group Lead" may be inherited from group parent if not specified. Additional roles can be added, e.g., at the interactive checklist level (e.g., for all groups to optionally use) or at the group level (e.g., for only that group to use). In all cases, the preconfigured permissions can be modified as desired. In some embodiments, members or guests of a group can be set to dynamically inherit from another group. For example, changes to the other group's membership can result in changes to the group's membership.

Figure 43:
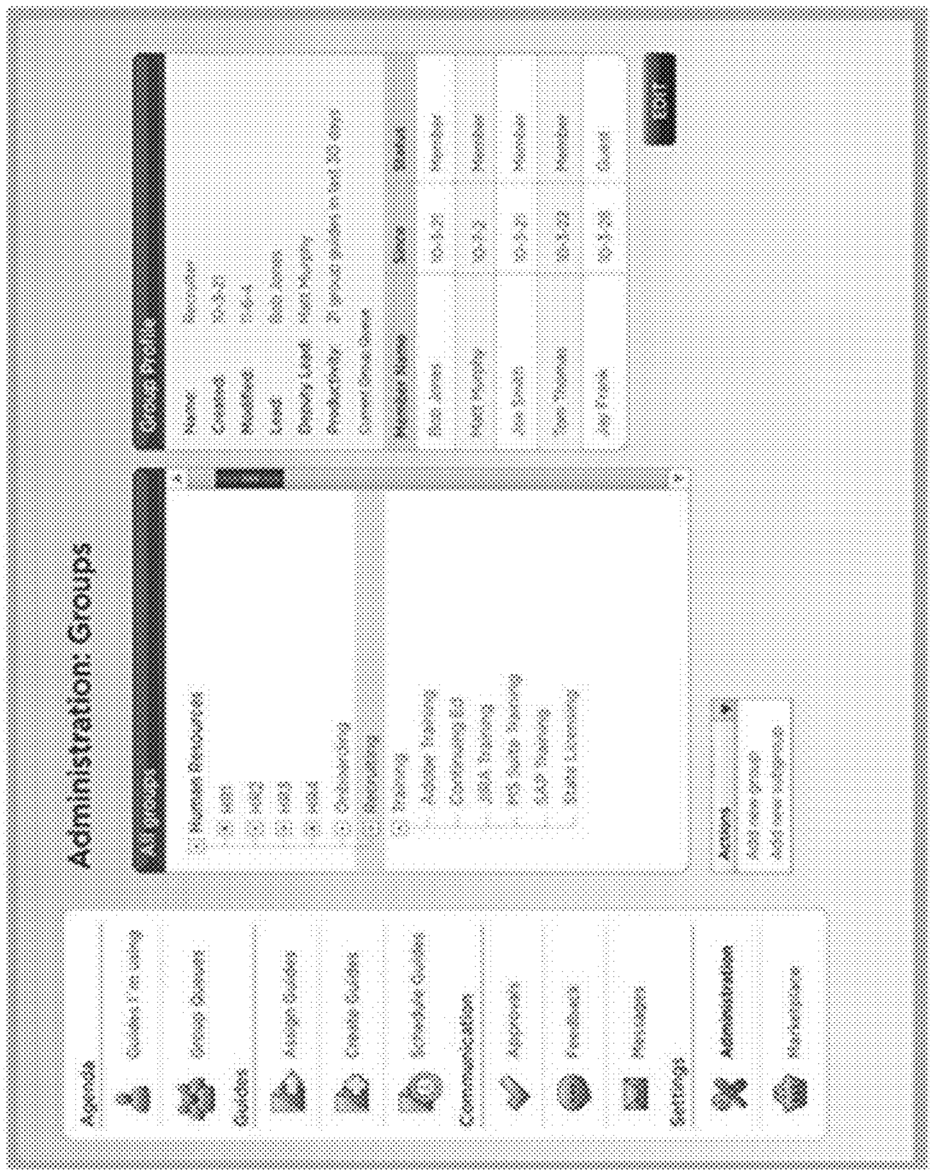
Figure 44:
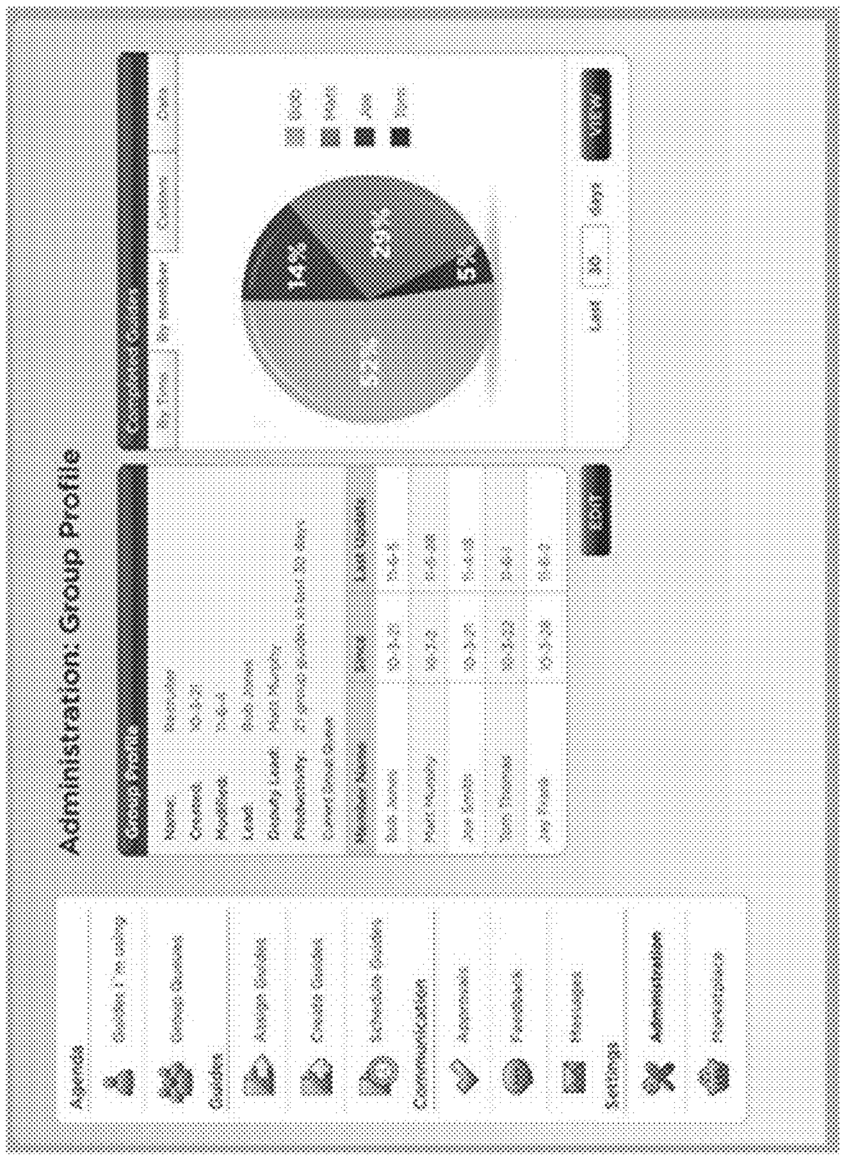
Figure 45:
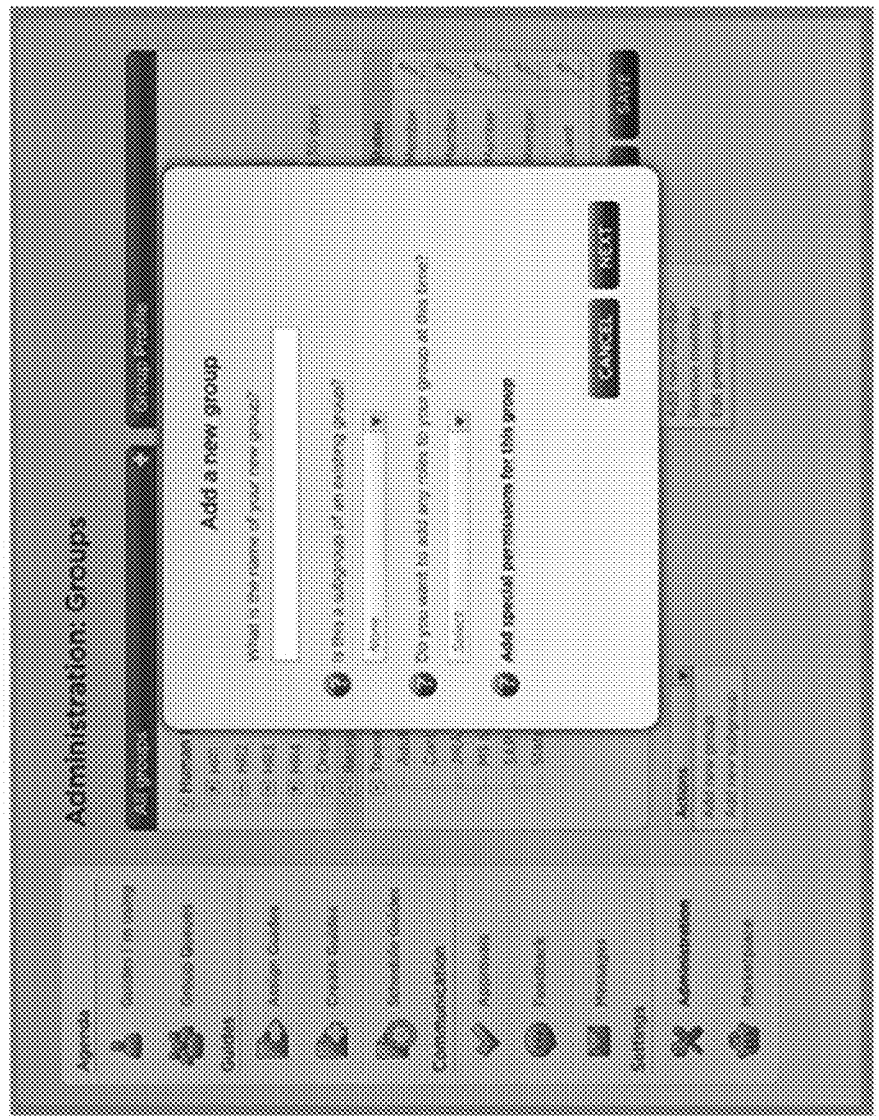

In accordance with some embodiments, all groups can be listed in a group hierarchy and each group can have a profile listing basic information about the group and a membership list as shown in interface 4300 of FIG. 43. When a detailed "Group Profile" is viewed, the same information can be available, as well as detailed productivity information as shown in interface 4400 of FIG. 44, in some embodiments. In some embodiments, using an interface 4500 that may be presented by a hardware processor of a computing device, the hardware processor can receive a new group, as shown in FIG. 45, from a user first providing information about the new group, for example, name of group, place in the group hierarchy (e.g., is it a subgroup of an existing group?), any interactive checklist-wide roles that should be added (e.g., the role "Group Lead" can be added by default), any modifications to default permissions, and/or any other information. In some embodiments, the hardware processor can display only certain groups. For example, the hardware processor can display or not display certain groups based on the groups' permissions settings.

Figure 46:
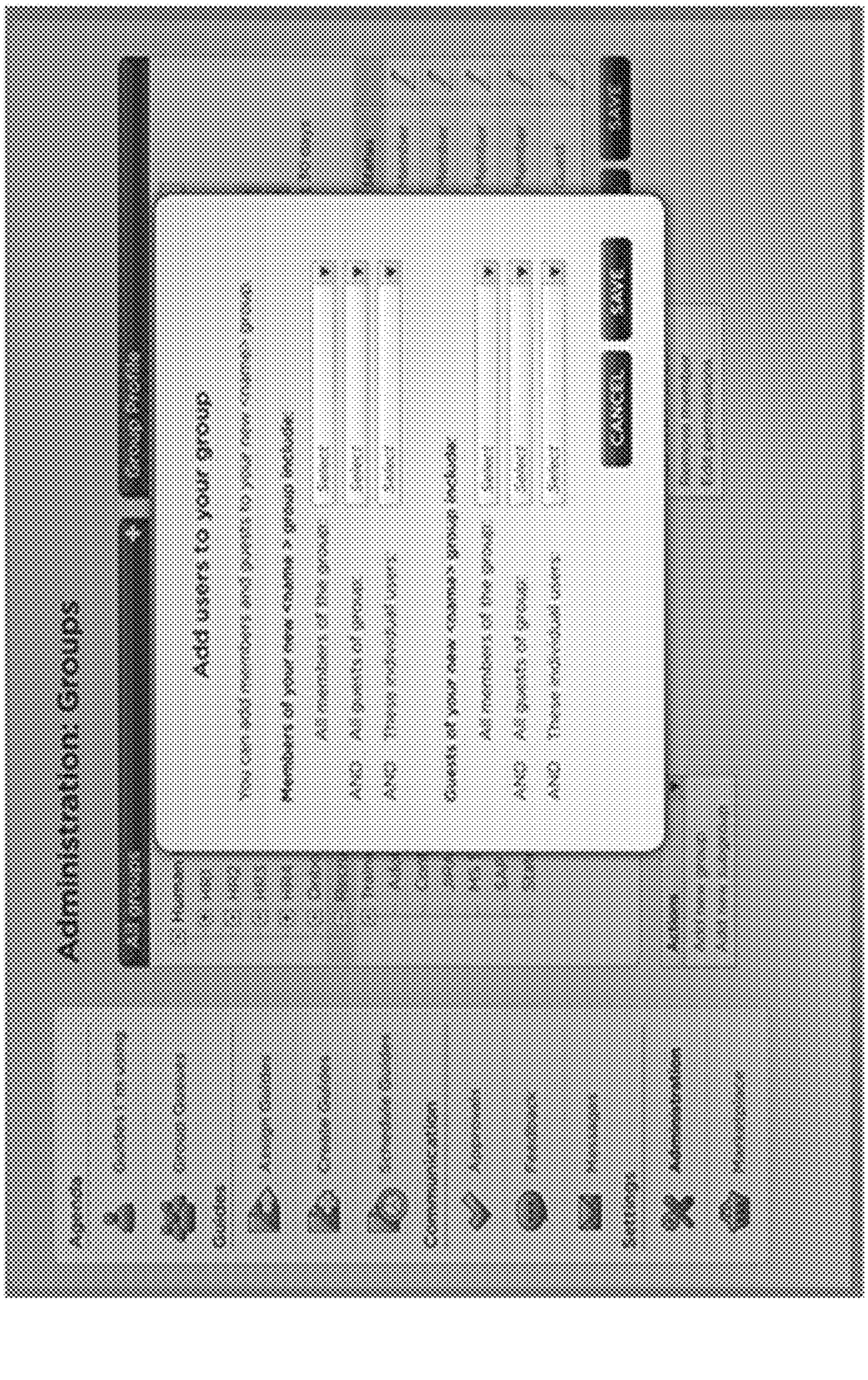
Figure 47:
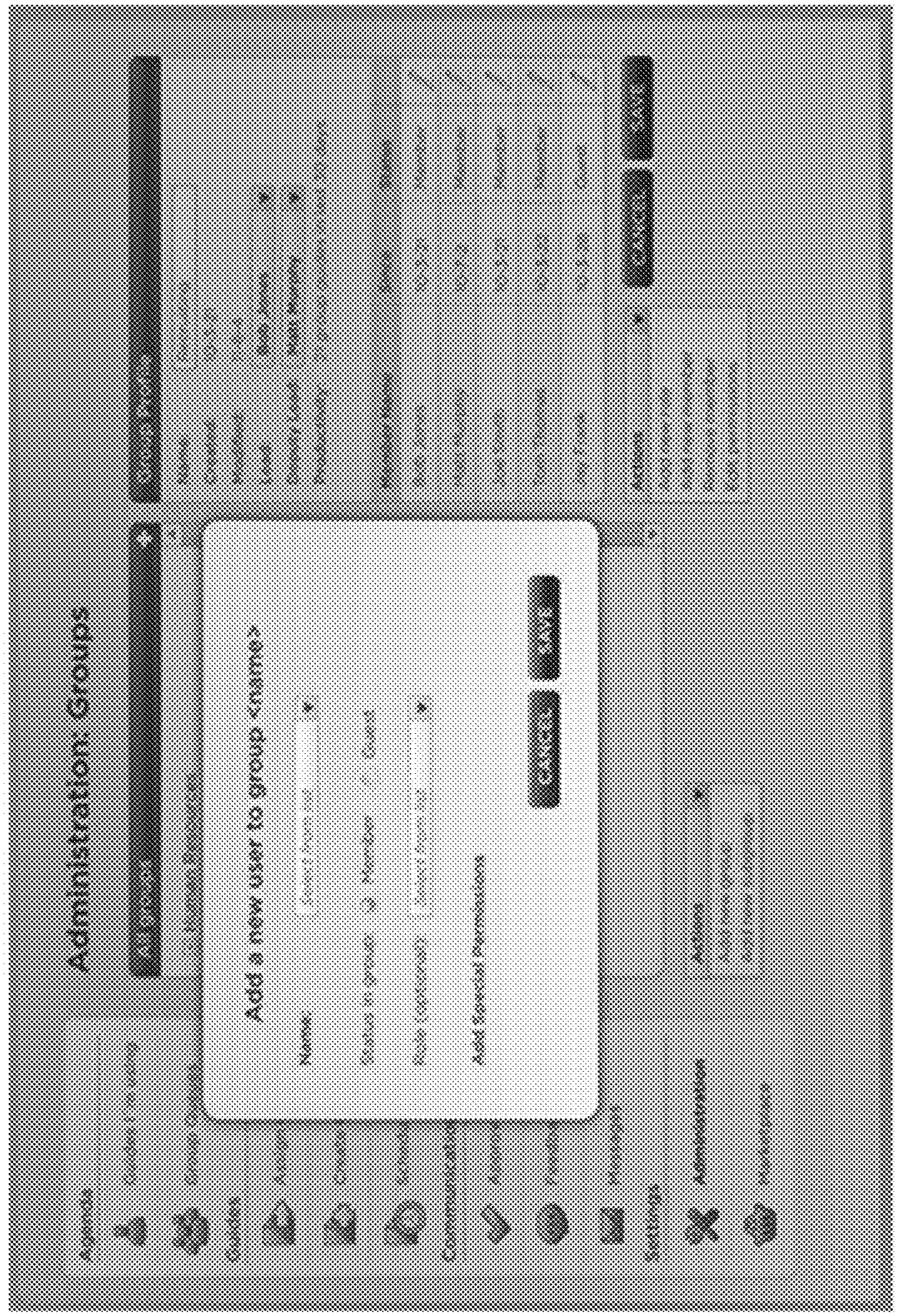

Then, as shown in interface 4600 of FIG. 46, using an interface 4600 that may be presented by a hardware processor of a computing device, the hardware processor can receive users to be added to the new group. New users can be added at any time. In some embodiments, the hardware processor can receive many new users at once by importing them from existing groups. New users can be added as members or guests. In addition, as shown in interface 4700 of FIG. 47, users can be added or removed from a group by indicating a user's name, a user's membership status (member or guest), a user's role (optional), and/or whether a user's permissions within the group should be modified.

Figure 48:
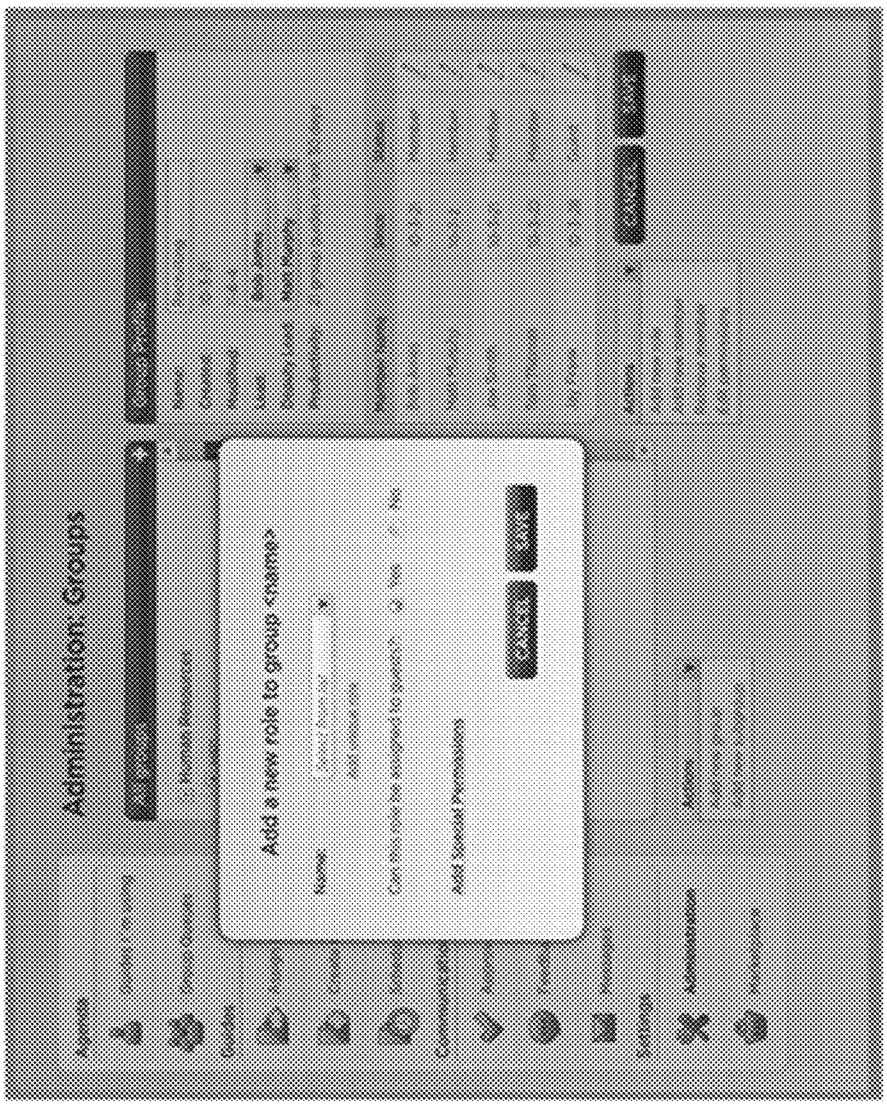
Figure 49A:
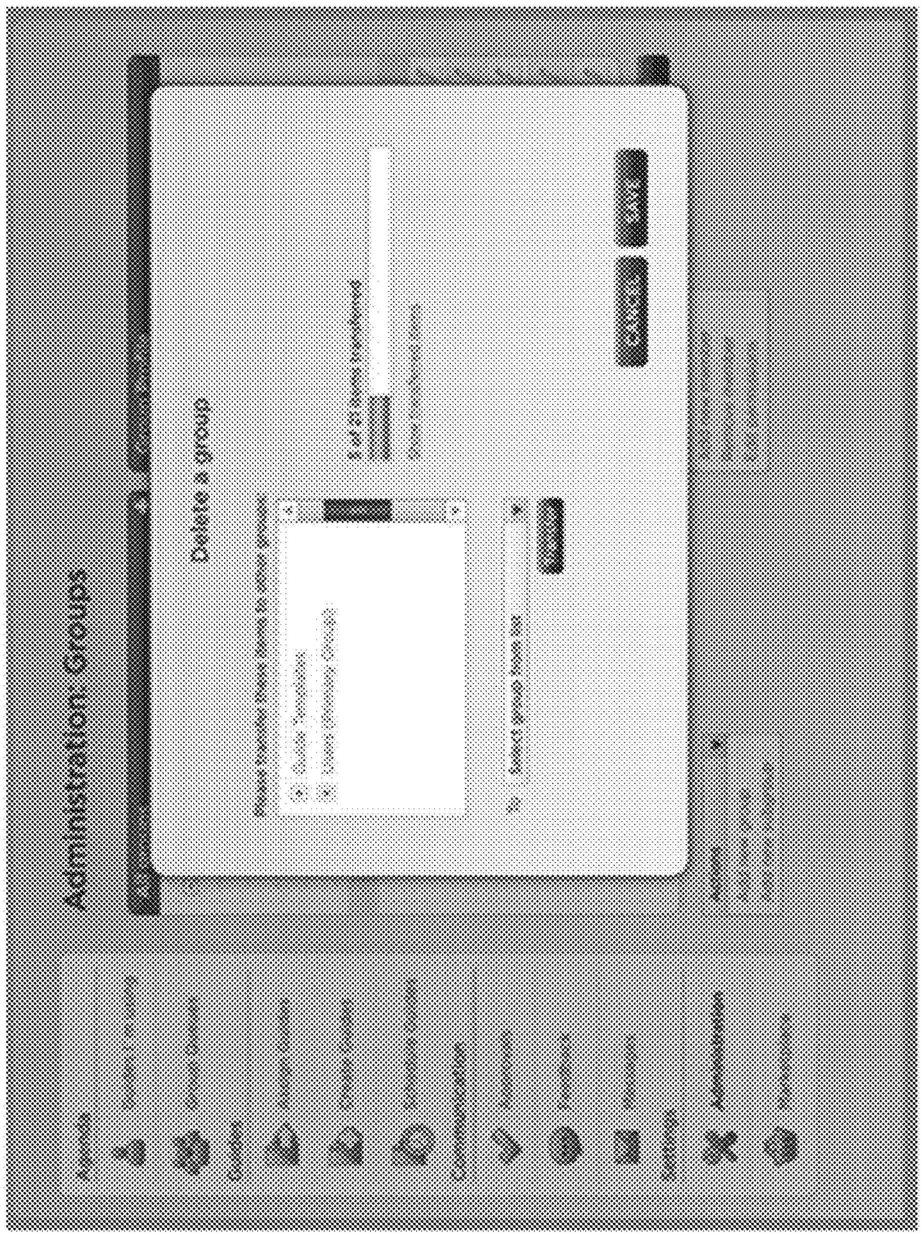
Figure 49B:
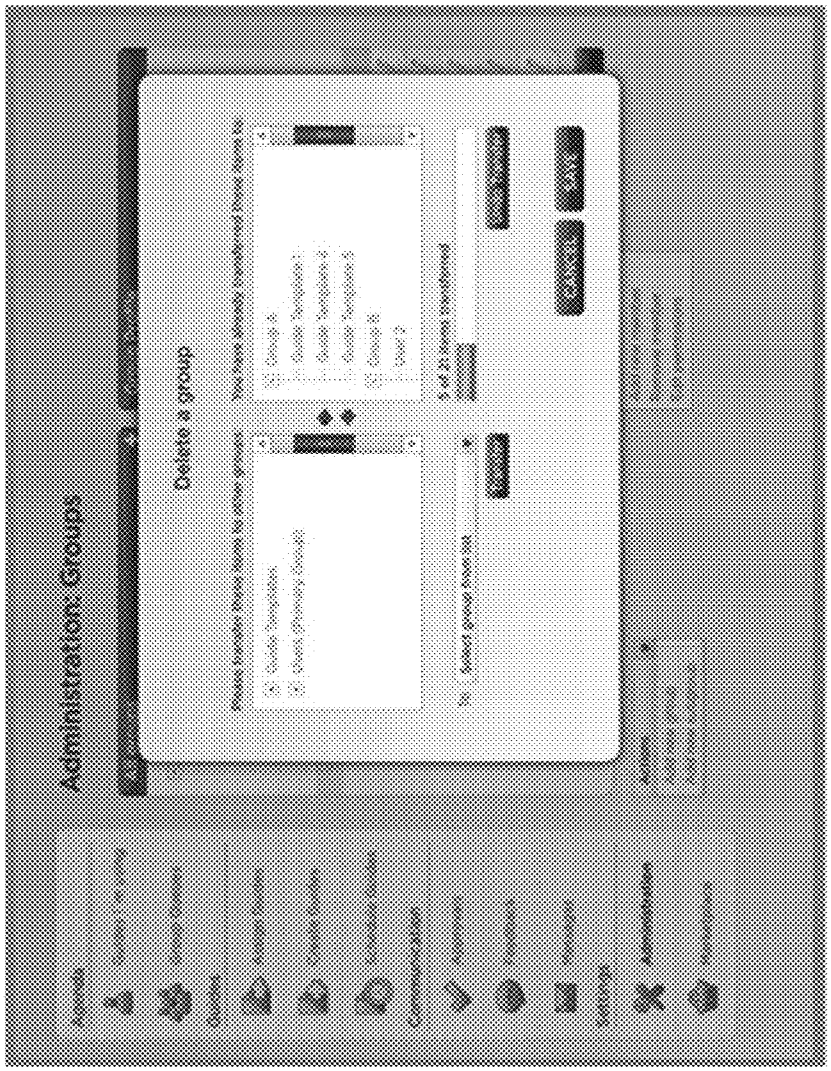

In accordance with some embodiments, using an interface 4800 that may be presented by a hardware processor of a computing device, the hardware processor can receive additional roles that can be added to a group as shown in FIG. 48. An interactive checklist-wide role can be selected from a drop-down menu or a role that is unique to a group can be added. If necessary, a group can be deleted as shown in interfaces 4902 and 4904 of FIG. 49A and FIG. 49B. In some embodiments, permissions can indicate whether this or other functions can be performed by an individual or by members of a group. To do so, items such as, for example, interactive checklists whose location is this group or users for whom this group is their primary group can be transferred to other groups. In some embodiments, using an interface 4904 that may be presented by a hardware processor of a computing device, the hardware processor can display a transfer widget, as shown, for example, in FIG. 49B that can be used to transfer items between users.

Figure 50A:
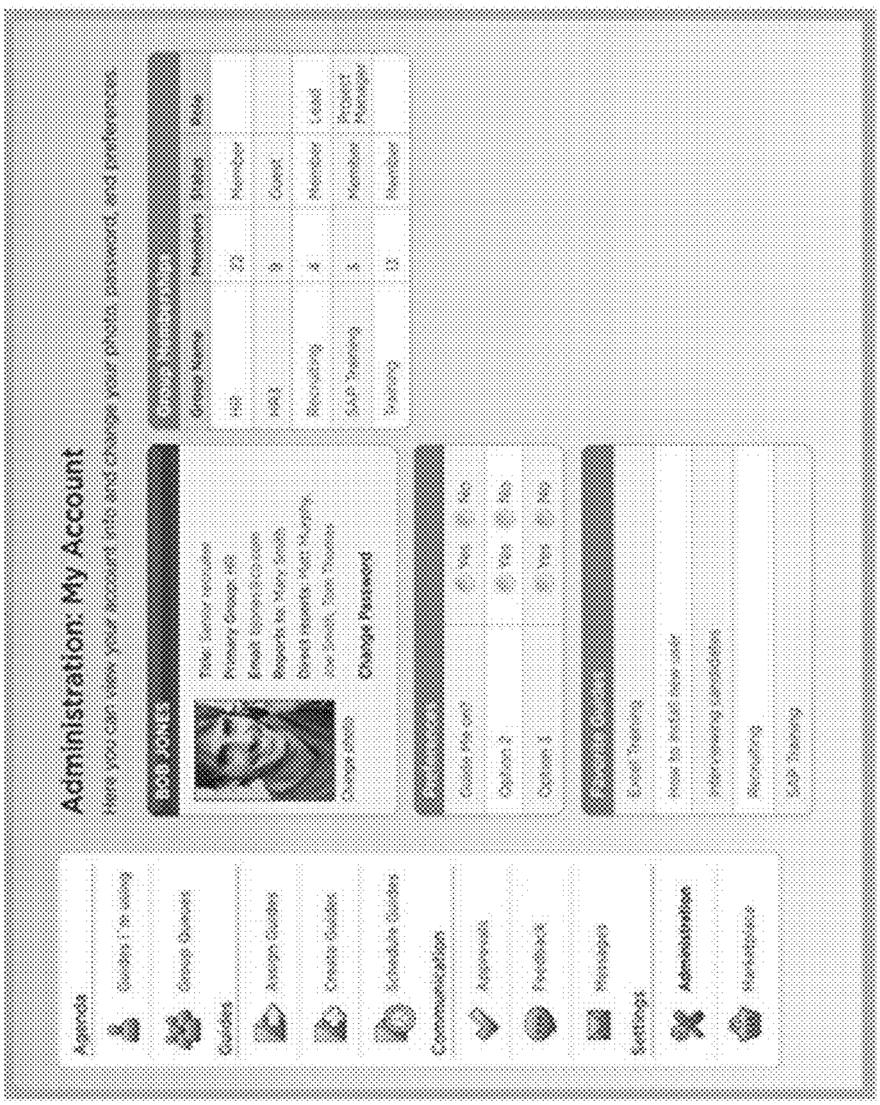

In accordance with some embodiments, using an interface 5000 that may be presented by a hardware processor of a computing device, the hardware processor can present a "My Account" page (e.g., for each user) as shown, for example, in FIG. 50A. Here, the hardware processor can display a user's basic information, the user's group memberships, and/or the user's interactive checklists. The hardware processor can receive a user input to indicate the user's interactive checklist preferences and/or receive a user input to indicate a user would like to change their password.

Figure 50B:
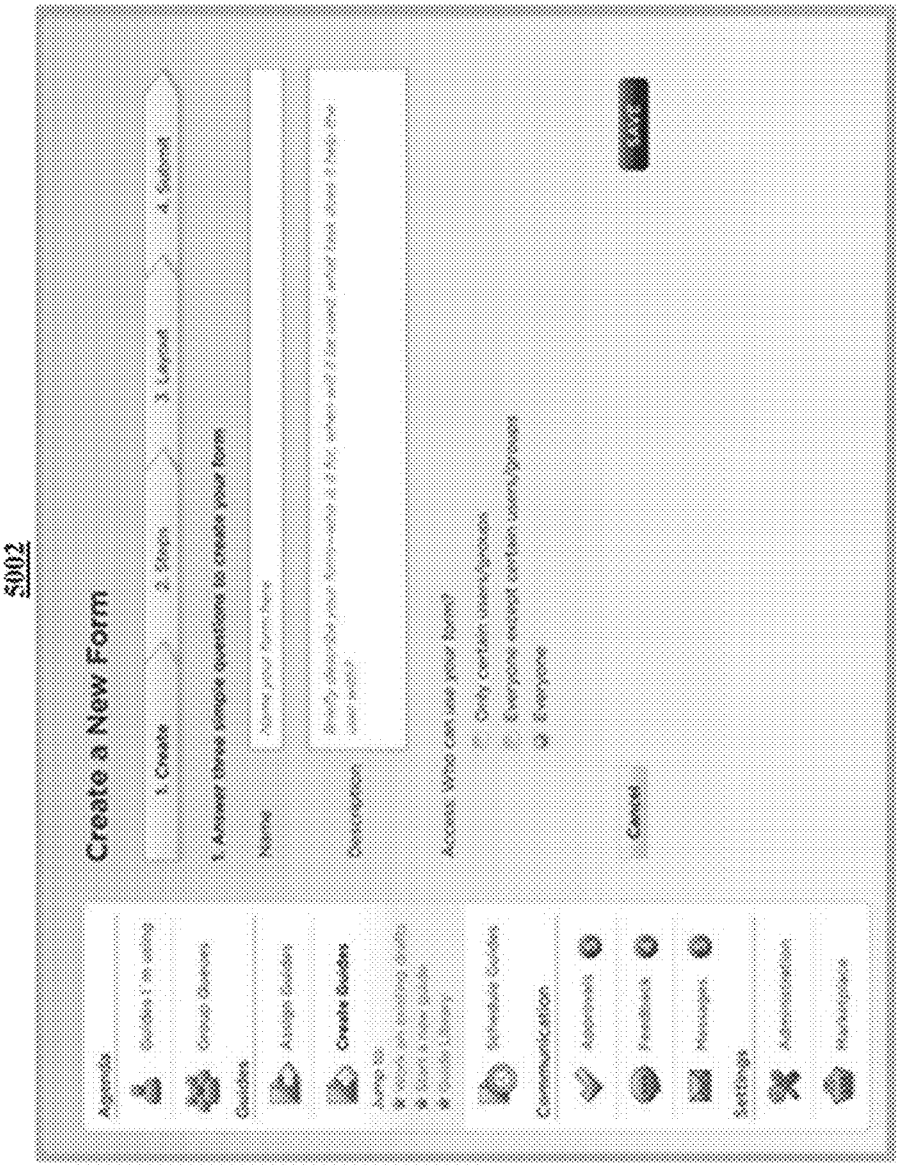
Figure 50C:
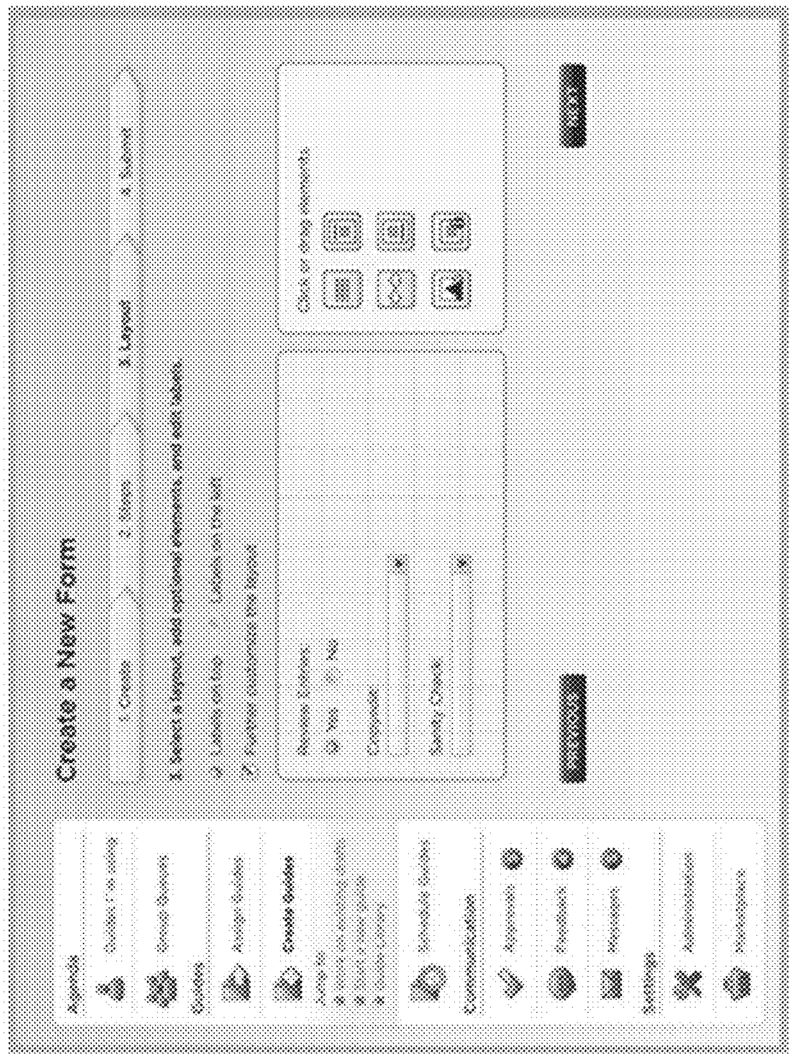
Figure 50D:
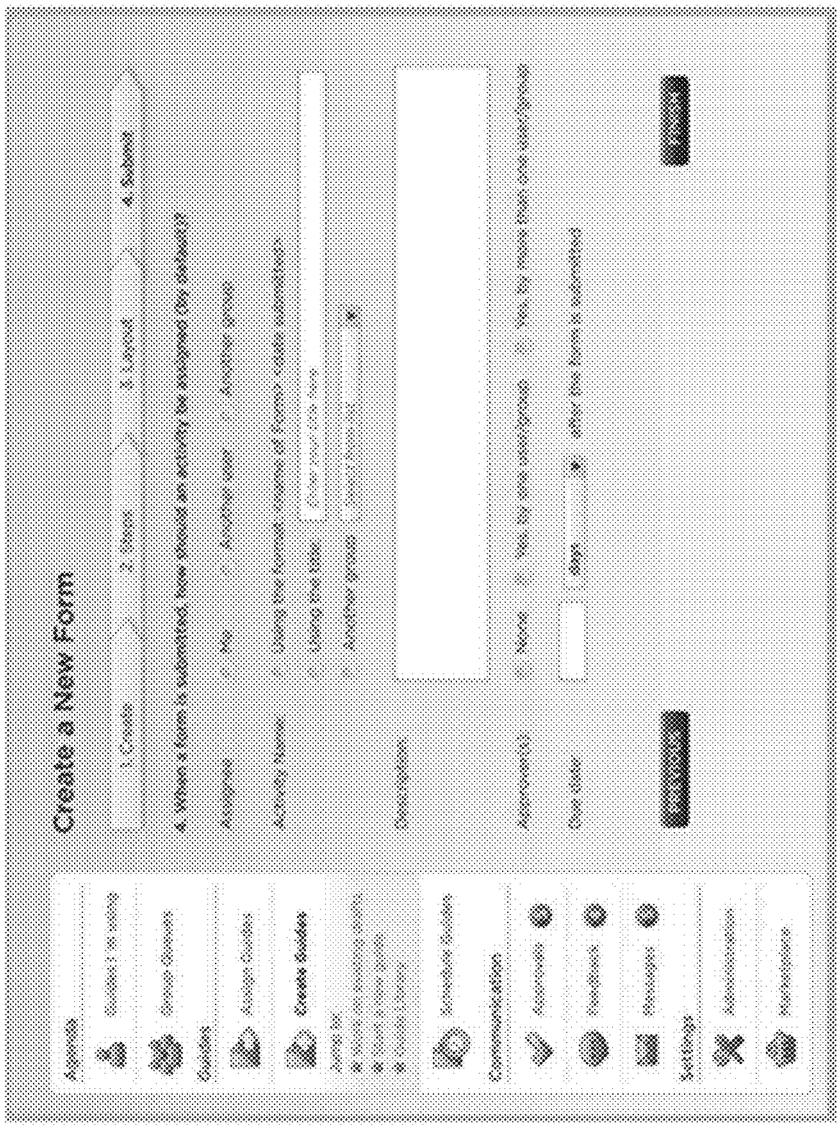
Figure 50E:
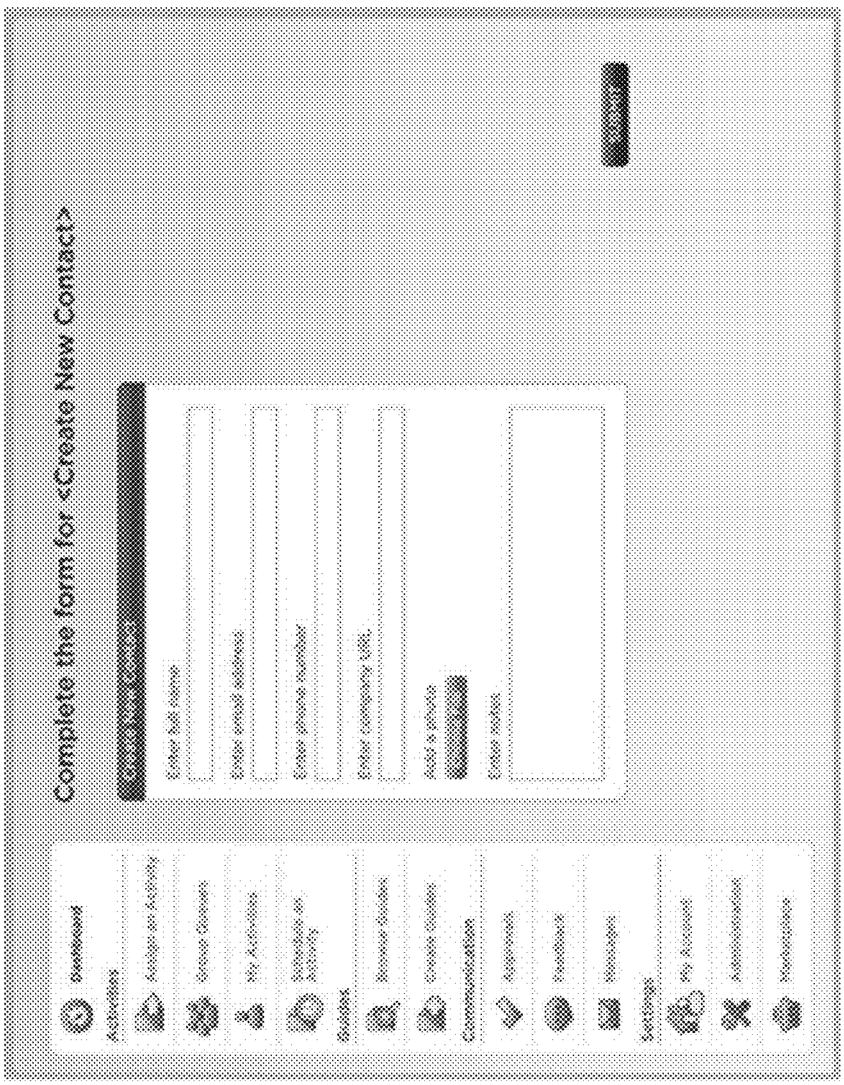

In accordance with some embodiments, the hardware processor can receive a user input indicating a request to create a new interactive checklist, as shown in interface 5002 of FIG. 50B Creating a new interactive checklist provides an alternative approach to enabling a specification and assignment of an interactive checklist. In some embodiments, the new interactive checklist can be used in conjunction with specific guides or as standalone objects. Additionally, the new interactive checklists can be used internally by the hardware processor or can be used on an external website enabling individuals who are not part of an organization to initiate a request. In some embodiments, the hardware processor can receive a user input to customize the new interactive checklist. The new interactive checklist can include any suitable properties such as an ability to restrict access, an ability to map answers to steps in a guide, and/or any other suitable property. In some embodiments, the hardware processor can receive layouts and styles for the new interactive checklist, as shown in interface 5004 of FIG. 50C. For example, the layouts can be default layouts or customized layouts. In such an example, images, headings, and additional text can be included and optionally positioned for each layout. In some embodiments, the hardware processor can receive a user input to configure the new interactive checklist to automatically generate new activities using the interactive checklist input fields, as shown in interface 5006 of FIG. 50D. In some embodiments, for example, the hardware processor can receive a request to create a new contact, as shown in interface 5008 of FIG. 50E. For example, the request can include a name of the contact, an email of the contact, the phone number of the contact, a photo of the contact, and/or any other suitable information of the contact. In some embodiments, a "New User Configuration" interactive checklist can be submitted with a request to create a new user accounts, which can in turn assign a separate Activity to a system administrator. For example, the fields can look consistent with some other systems and the user may not know he or she were indirectly invoking an interactive checklist.

Figure 51:
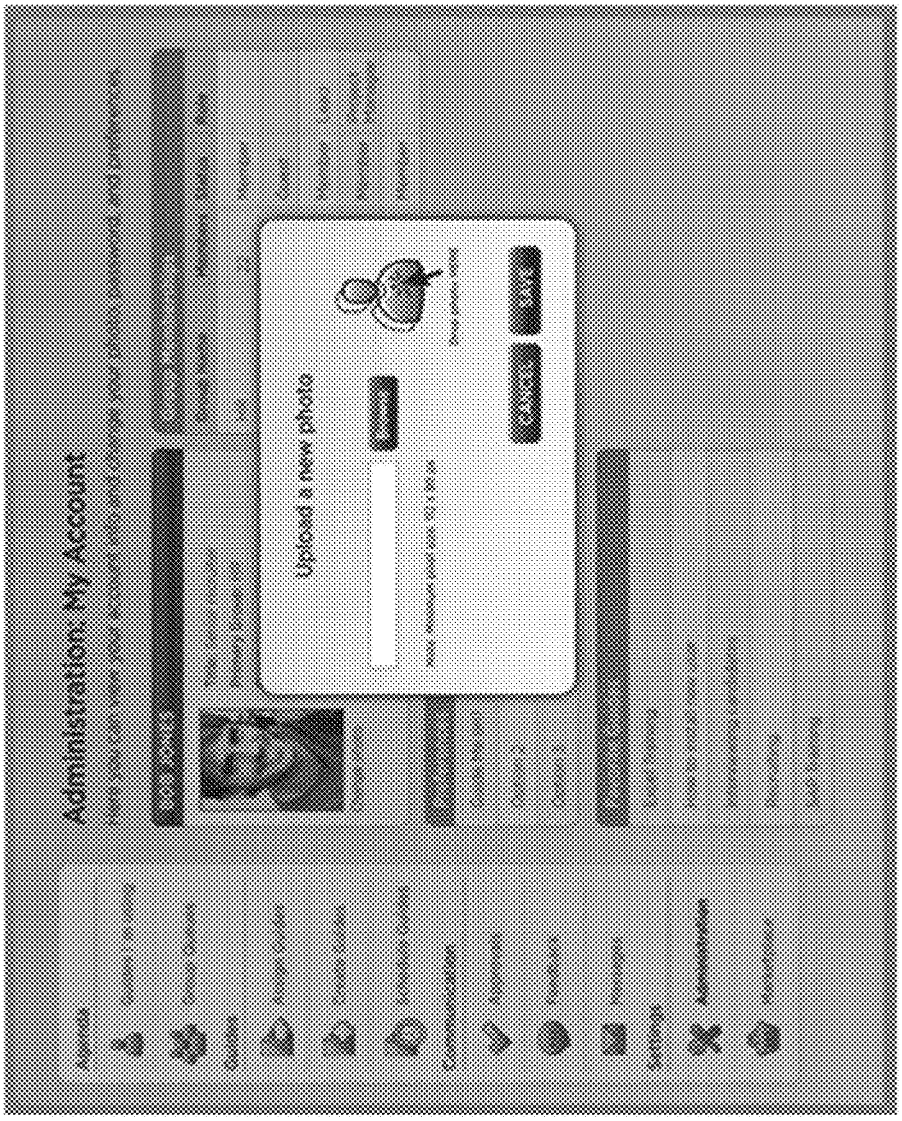

In accordance with some embodiments, the hardware processor can receive user photography and/or video uploads. For example, the hardware processor can receive a file from a user (e.g., drag and drop it into place as shown in interface 5100 of FIG. 51) or receive a file imported from an external service such as a social media website or application (e.g., Facebook™).

Figure 52:
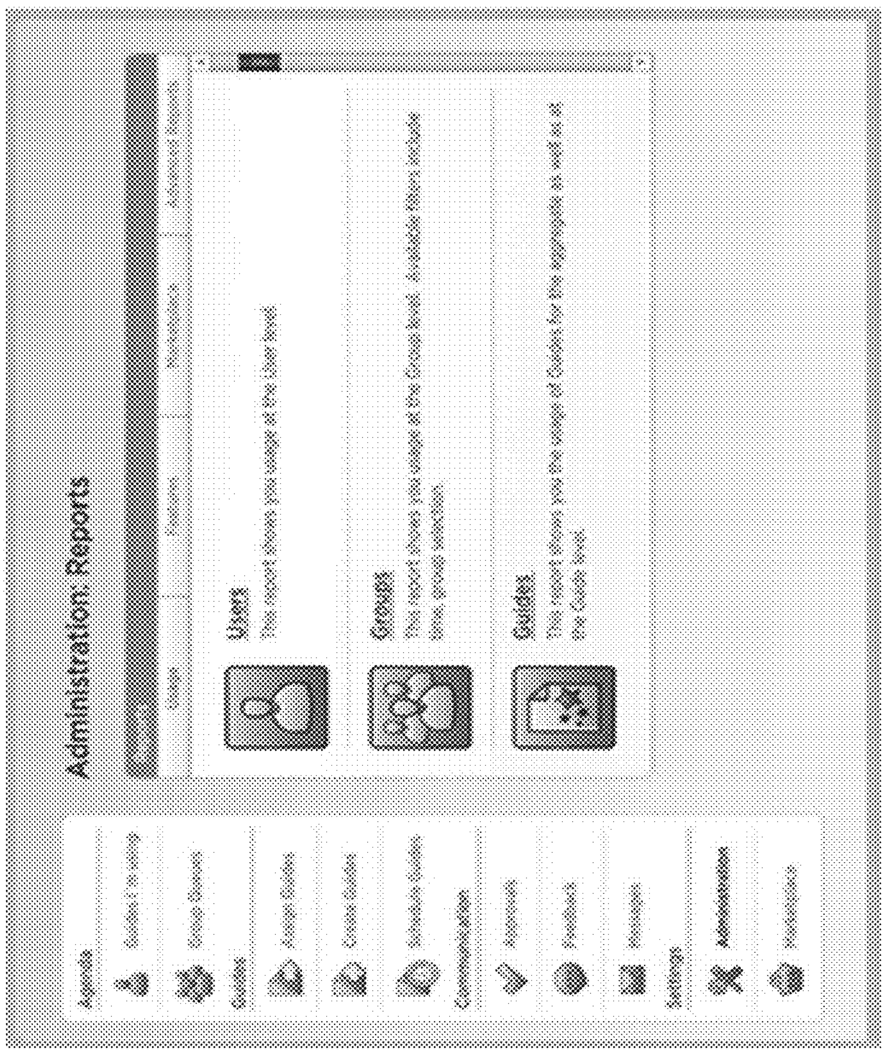
Figure 53:
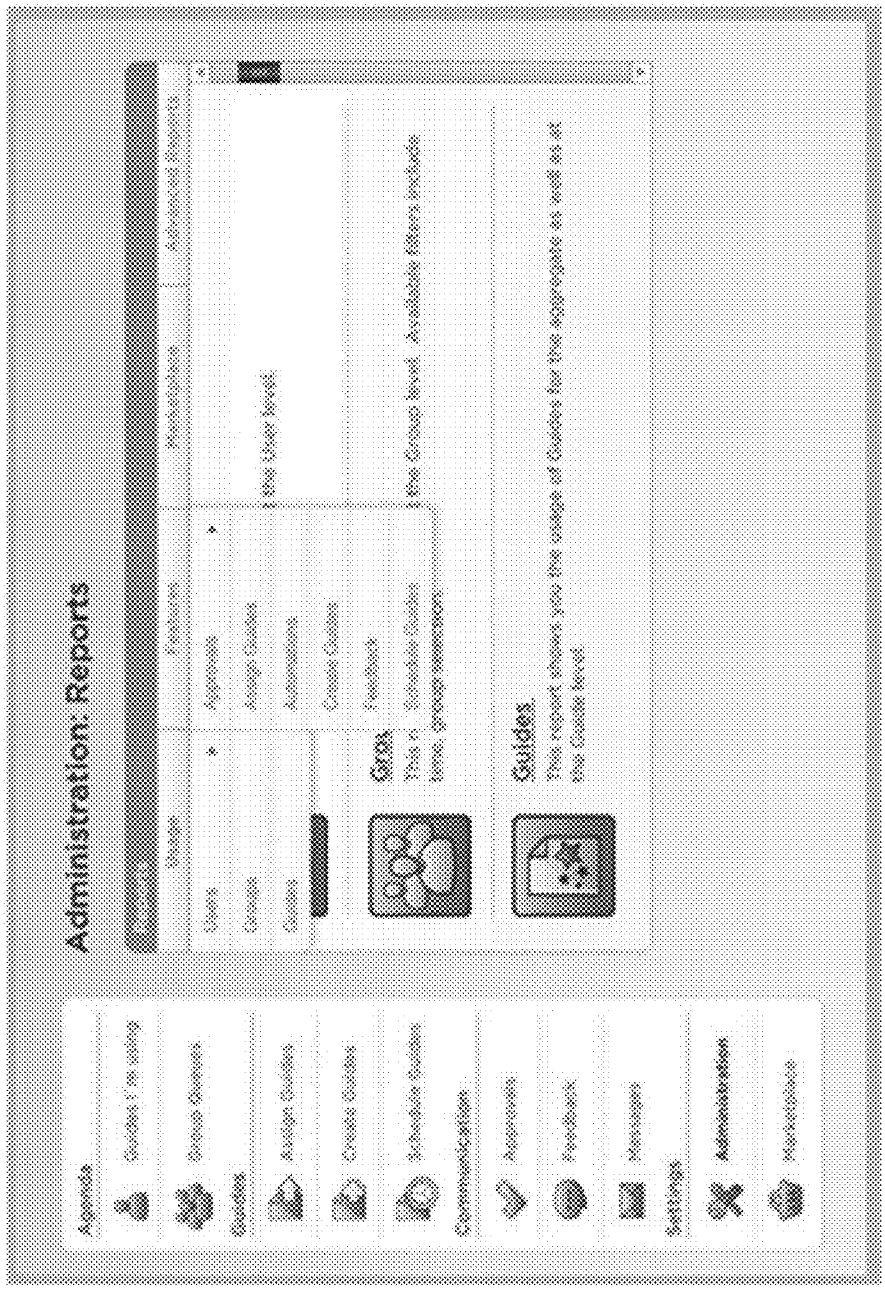
Figure 54:

In accordance with some embodiments, a reporting interactive checklist feature can be provided. In some embodiments, this feature can be available on a "Reports" tab to users with appropriate permissions as shown, for example, in interface 5200 of FIG. 52. Users can navigate through reports using a master list, which in some embodiments may be hierarchical, or they can use navigational tabs offered as shown in interface 5300 of FIG. 53. A report can offer an easy-to-read graphical representation of data, for example, the chart shown, for example, in interface 5400 of FIG. 54; or alternately a tabular structure. A report can also have a custom set of filters to organize the data. Filters set in a previous session can be remembered in some embodiments. Reports can be available in a printer-friendly format or as a convenient downloadable spreadsheet. Any suitable reports can be customized and/or added in some embodiments. In some embodiments, a user's report configuration can be saved, and added to a Dashboard.

Figure 55:
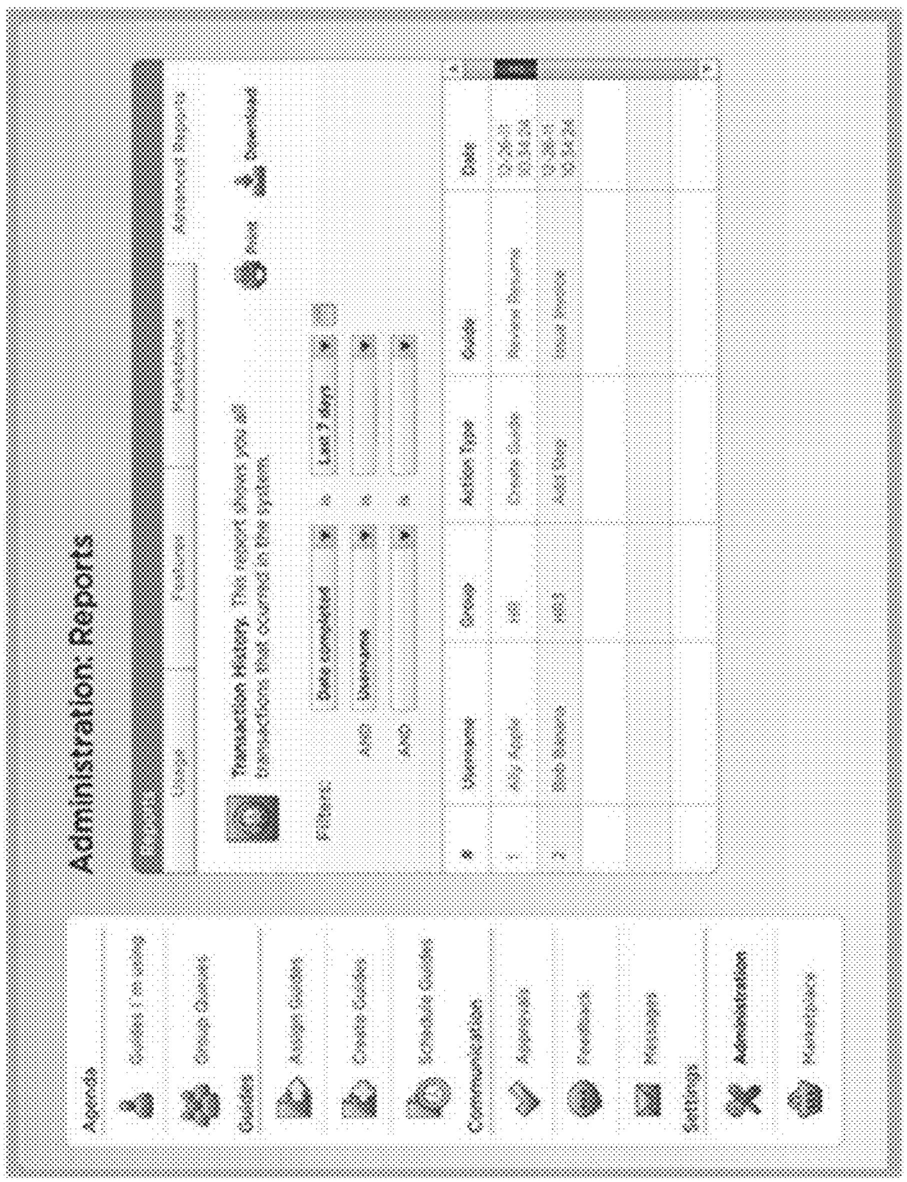

In accordance with some embodiments, using an interface 5500 that may be presented by a hardware processor of a computing device, the hardware processor can present a "Transaction History" report as shown, for example, in FIG. 55. Actions taken in the interactive checklist can be recorded with a timestamp and included in this report. A subset of fields can be displayed by the hardware processor in a summary view, while more or all may be downloaded. A horizontal scrollbar can appear when needed to display the fields.

Figure 56:
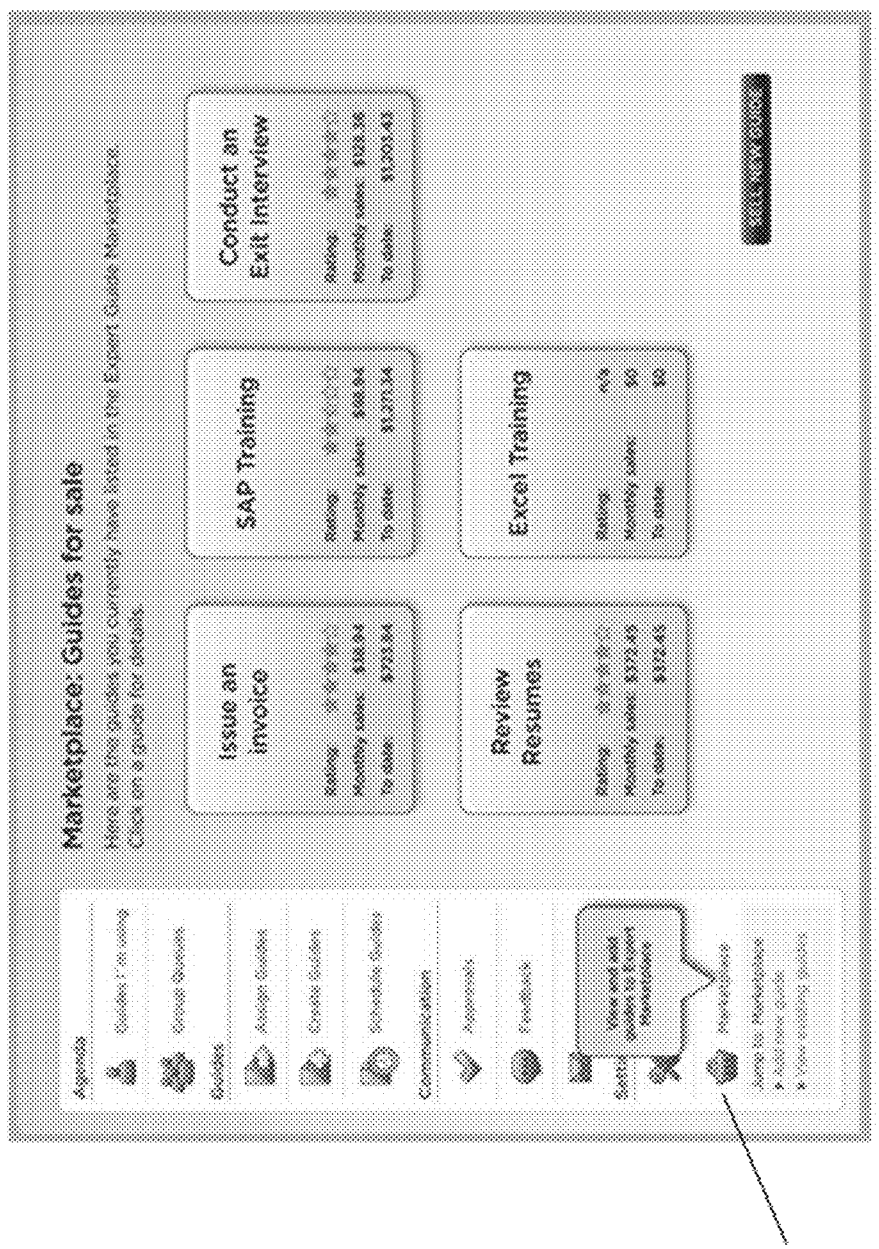
FIGS. 56, 57, 58, 59, 60, 61A, 61B, 61C, 62, 63, and 64 show examples of user interfaces for publishing an interactive checklist on a guide marketplace in accordance with some embodiments of the disclosed subject matter.
Figure 57:
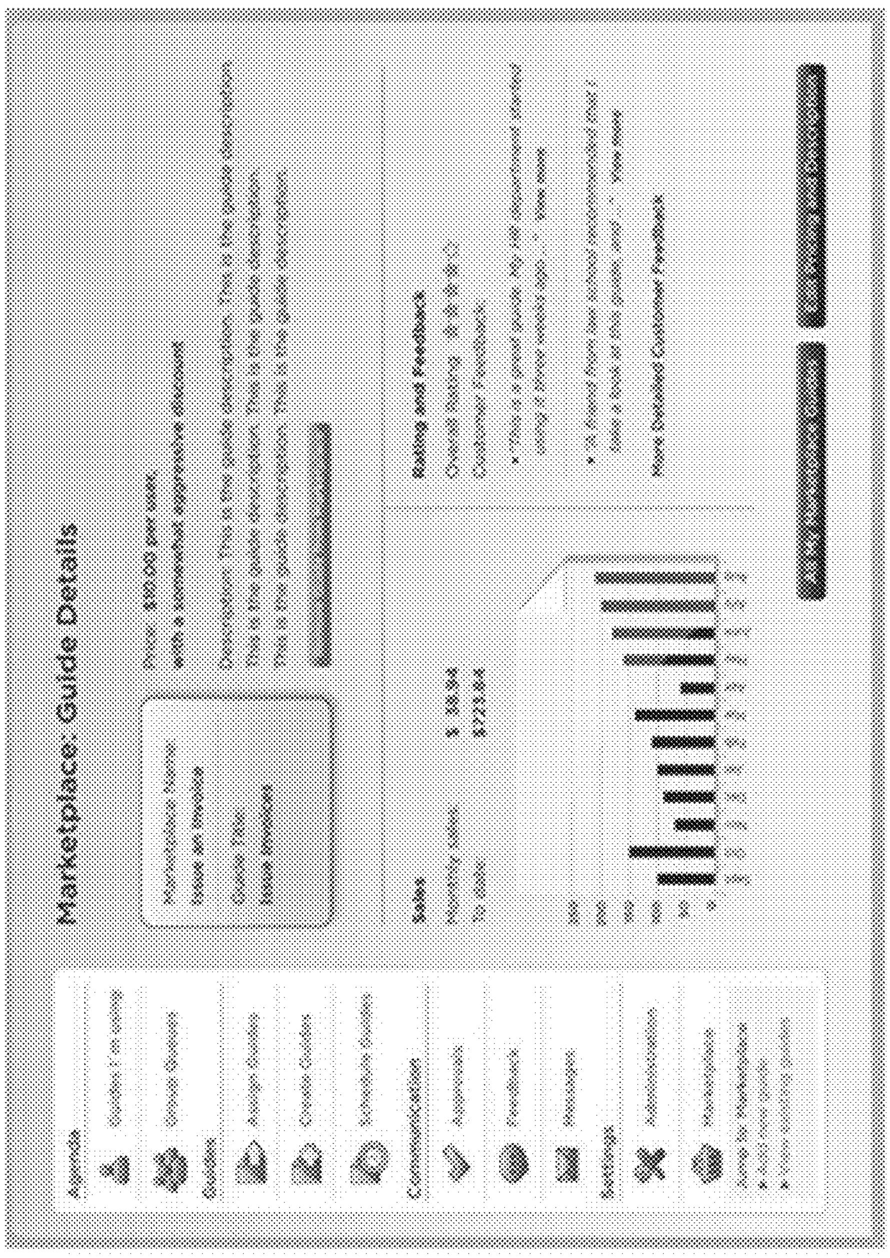

In accordance with some embodiments, using an interface 5600 that may be presented by a hardware processor of a computing device, the hardware processor can receive interactive checklists to be published or sold on a public "Guide Marketplace" as shown, for example, in FIG. 56. Publishing interactive checklists can enable users and/or organizations to 1) spread their brand, 2) create an additional revenue stream, and/or 3) provide a compact, easy way to share expertise and processes with other organizations. On a "Guide Marketplace" tab, shown as "Marketplace" tab 5602 on interface 5600 of FIG. 56, the hardware processor can display the interactive checklists that have already been published on the "Guide Marketplace." In this view, the hardware processor can display which interactive checklists have been published, how buyers have rated them, and the revenue they have generated. If the user clicks on an interactive checklist on an overview page, shown, for example, in interface 5700 of FIG. 57, the hardware processor can display details about a published interactive checklist. Available data can include detailed sales information and customer feedback.

Figure 58:
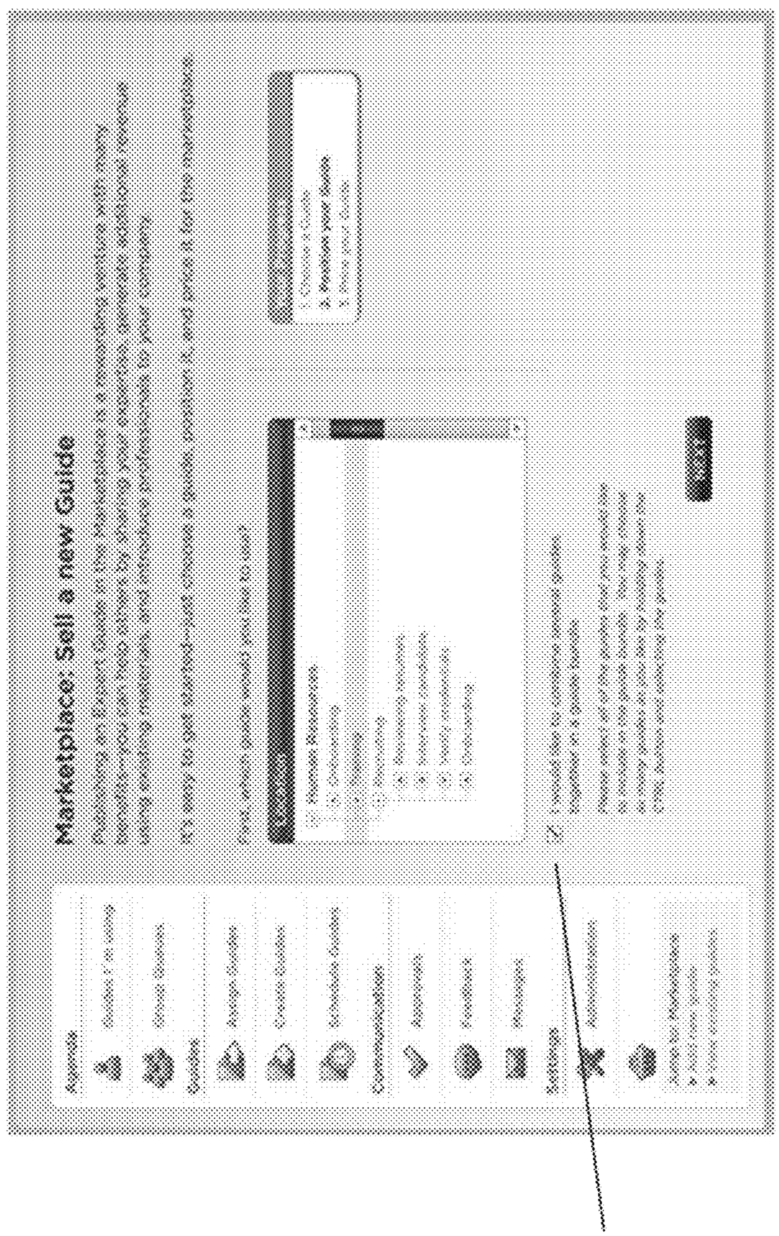

In accordance with some embodiments, to prepare an interactive checklist for sale, as shown, for example, in interface 5800 of FIG. 58, the hardware processor can receive a user selection of an interactive checklist to sell, or receive a user selection indicating that they wish to sell multiple interactive checklists together in a "Guide Bundle" by checking a box 5802 as shown, for example, in interface 5800 of FIG. 58, in which case, the hardware processor can be prompt the user to select multiple interactive checklists to be included in the bundle.

Figure 59:
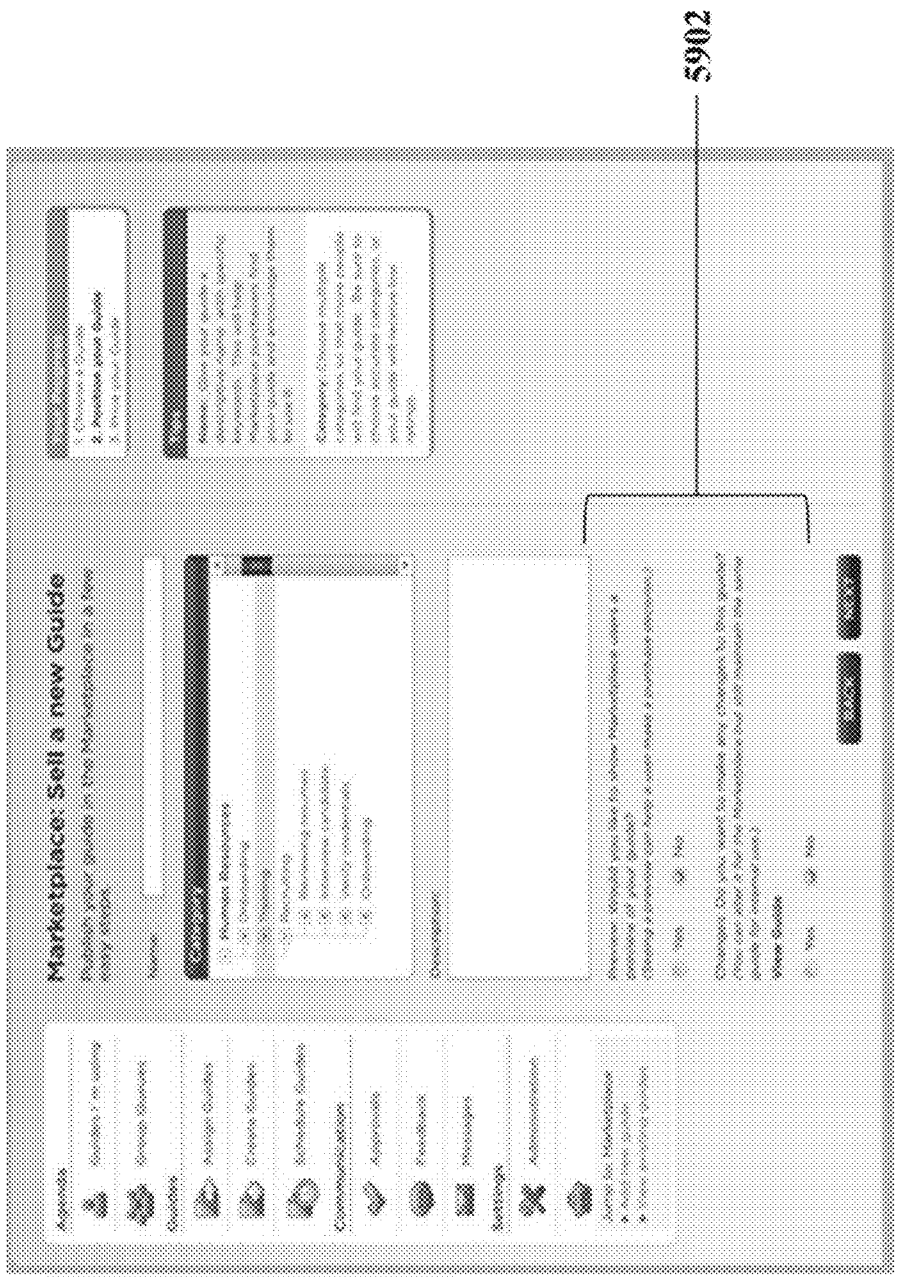
Figure 60:
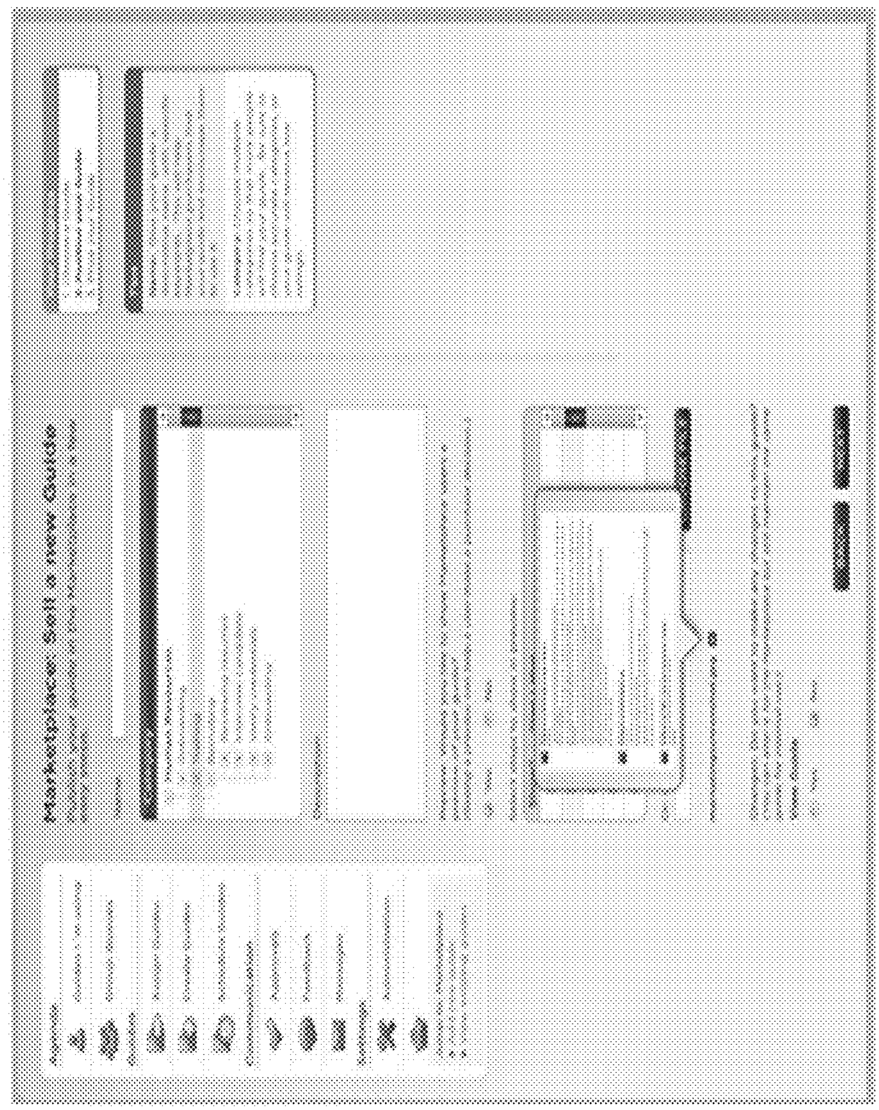

Next, in some embodiments, using an interface 5900 that may be presented by a hardware processor of a computing device, the hardware processor can receive details about the interactive checklist(s), for example, a public title for the interactive checklist, a sales category (or subcategory at any level of depth), a sales description, and/or any other details. The hardware processor can receive a user input to present a preview of the interactive checklist to prospective buyers at section 5902 of interface 5900 of FIG. 59. Additionally, at 5902, the hardware processor can receive a user input to make changes to the interactive checklist to protect any sensitive information. Upon receiving a selection to display a preview, the hardware processor can add it at interface 6000 of FIG. 60. When printing a preview, the hardware processor can present a user selection of one or more steps from the interactive checklist and/or present uploaded attachments, for example, as images of the interactive checklist or a sample completed interactive checklist.

Figure 61A:
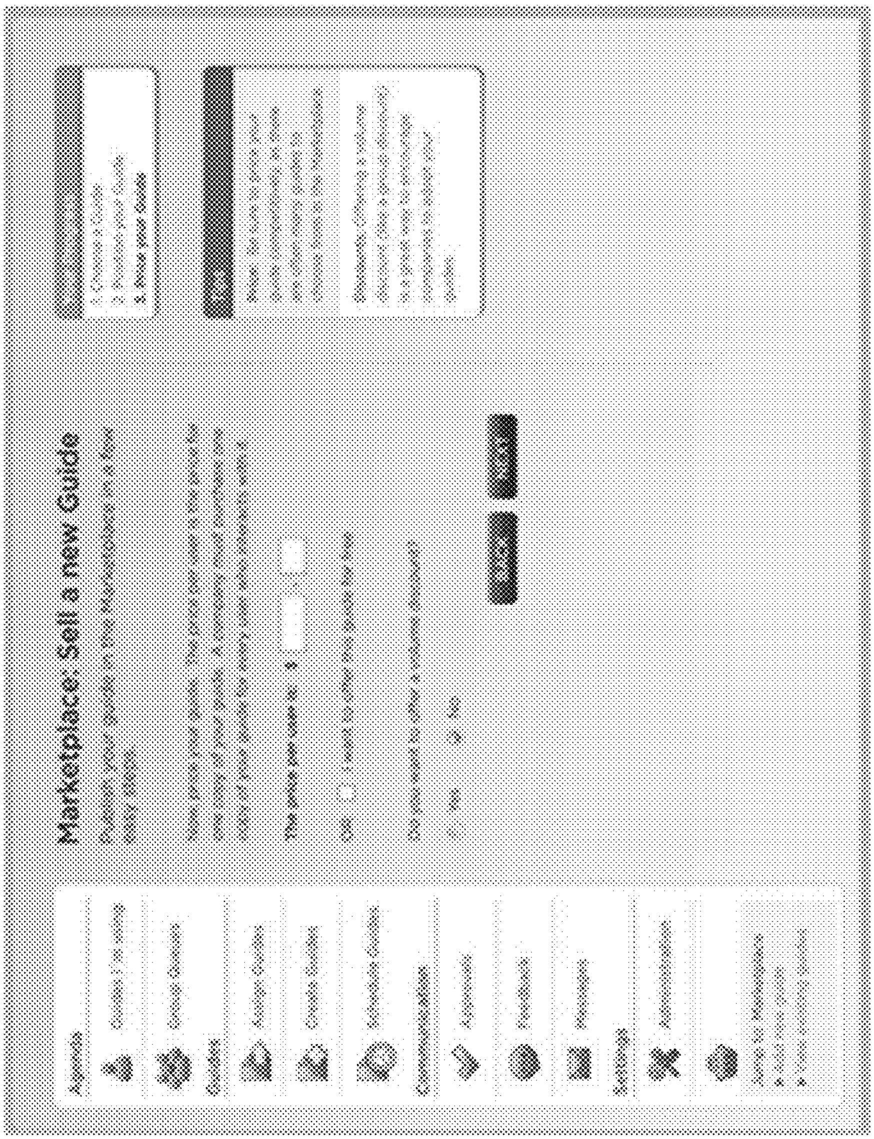
Figure 61B:
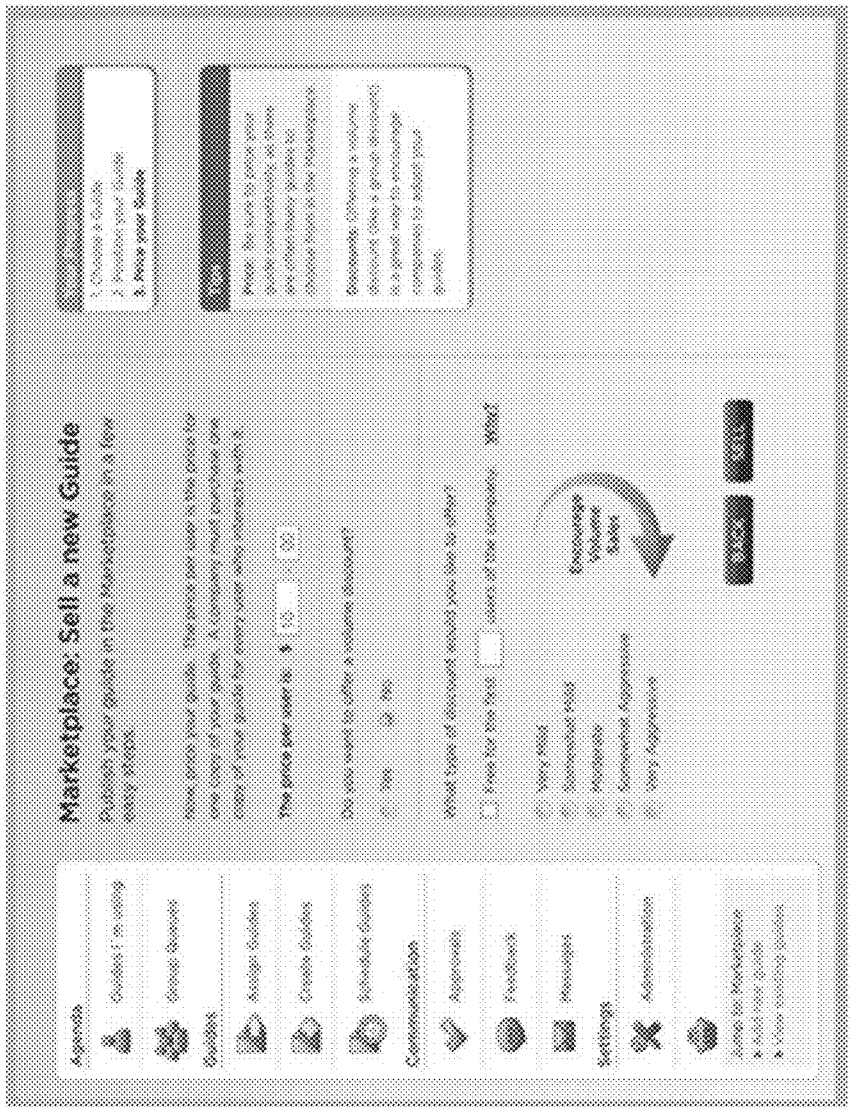

Next, in some embodiments, using an interface 6102 that may be presented by a hardware processor of a computing device, the hardware processor can receive price information for the interactive checklist as shown, for example, in FIG. 61A. Alternatively, a user may offer the interactive checklist free of charge. The user may offer a flat price per user. As a means of encouraging sales, the user can opt to offer a volume discount. As shown in FIG. 61B, using an interface 6104 that may be presented by a hardware processor of a computing device, the hardware processor can display several choices for volume discounts, indicating a level of discount offered. These levels can be predetermined percentages off of the base price (as indicated by the user). For example, the higher the number of copies purchased, the lower the price per copy can be. In addition, the user may offer the first x copies of an interactive checklist to a client for free, to encourage widespread adoption. In some embodiments, the user may also set price points.

Figure 61C:
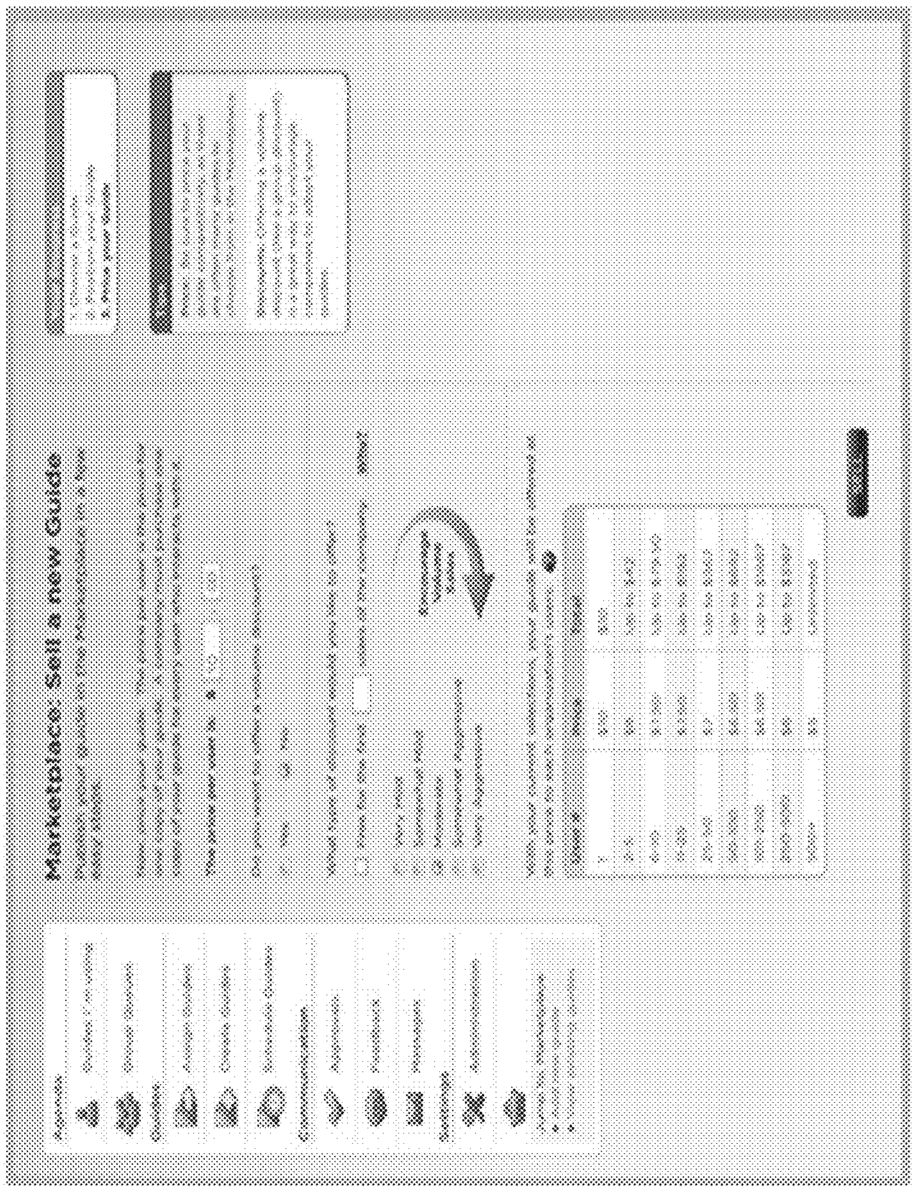
Figure 62:
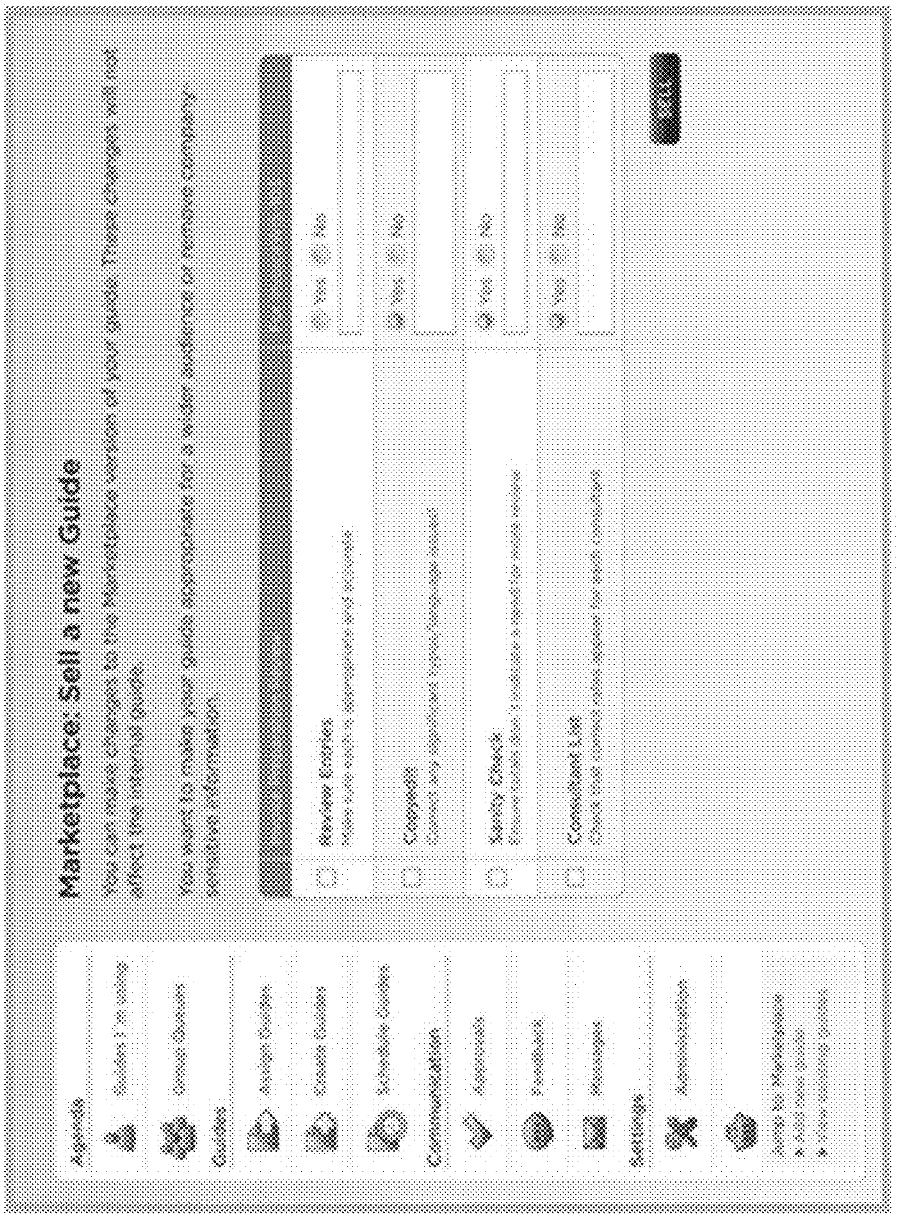
Figure 63:
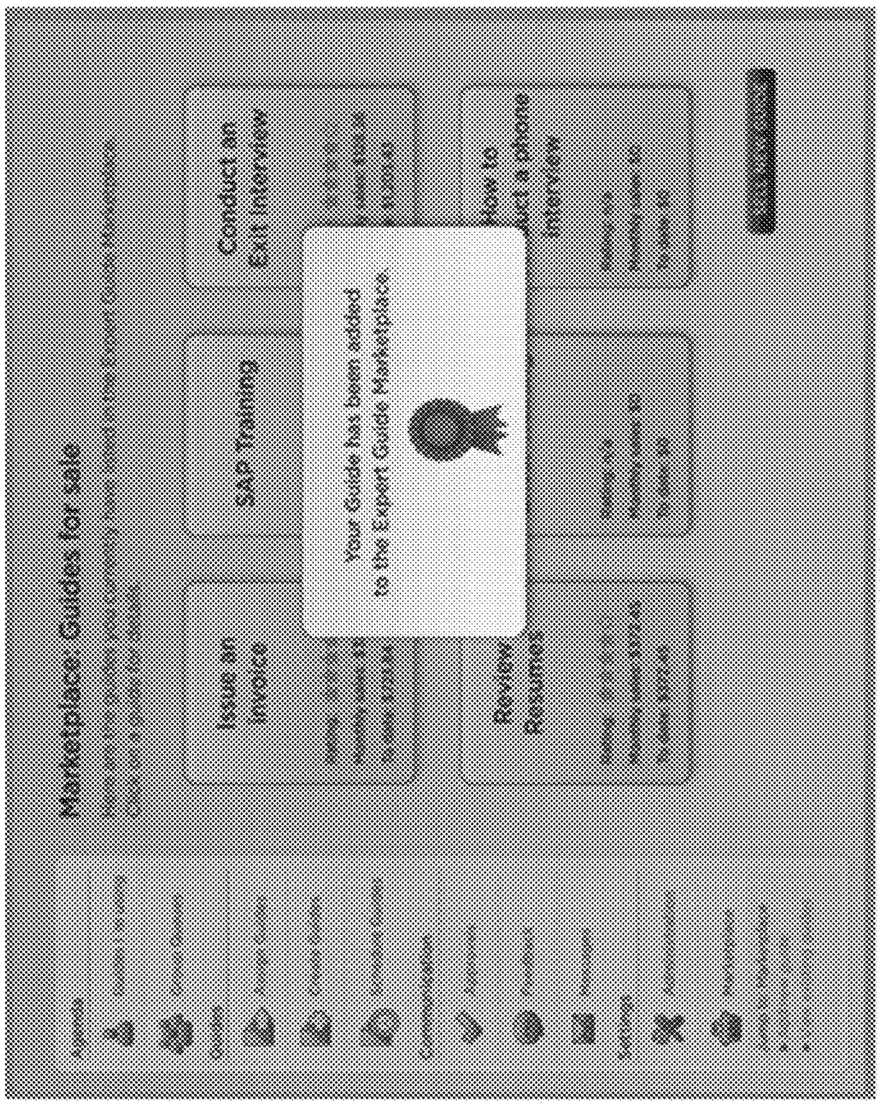
Figure 64:
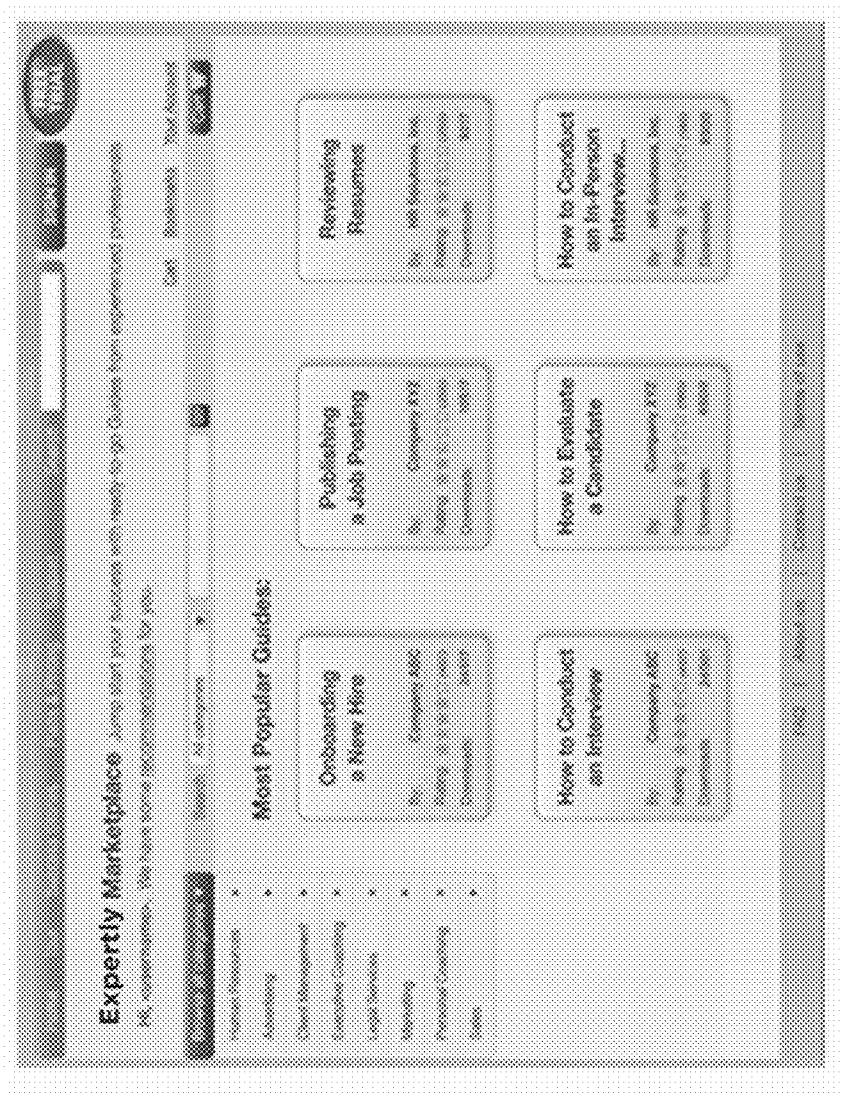

In accordance with some embodiments, once the hardware processor receives a discount level, as shown in interface 6106 of FIG. 61C, the hardware processor can present a table of the discounted prices, at different numbers of copies sold. The level or the base price can be modified until the user is satisfied with the sales table. A user can set their own price points if they prefer, directly or by adjusting from the discount level-determined prices. As shown, for example, in interface 6200 of FIG. 62, the hardware processor can display a review of the interactive checklist and its contents before sending to be put up for sale in the "Guide Marketplace." Once confirmed, the hardware processor can send the interactive checklist to the public marketplace and can be displayed by the hardware processor among the published interactive checklists for the organization as shown in interface 6300 of FIG. 63. The "Guide Marketplace" can be a public website, as shown, for example, in interface 6400 of FIG. 64, where a user of the interactive checklist can buy and sell interactive checklists for use by other individuals. In some embodiments, the "Guide Marketplace" can be a private website (e.g., a website for a professional association) where the interactive checklists are not available to the public. In accordance with some embodiments, subsequent purchases may be entitled to a price based on the cumulative number of that interactive checklist purchased, for that version, since a particular past version, or for all versions. In some embodiments, a user can purchase or can download a "Guide Bundle" that can includes Event Calendar(s) and/or Approach(es). In some embodiments, the "Guide Marketplace" can include a "Plagiarism Detector" that seeks to identify steps that contain substantially similar content (e.g., in language or in meaning) to other Guides in the marketplace. The "Plagiarism Detector" can flag the Guides that include similar content to prevent undesired publication to the marketplace.

Figure 65:
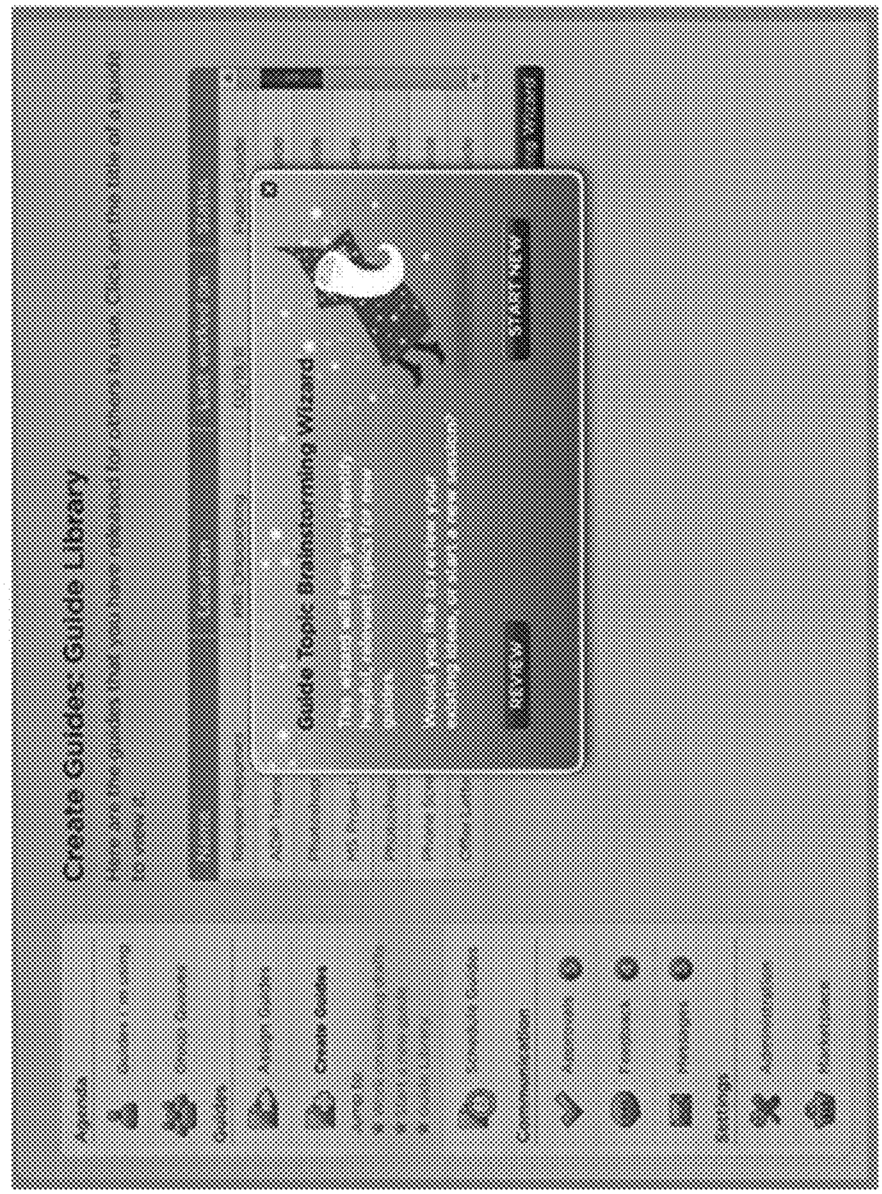
FIGS. 65, 66, 67A, and 67B show examples of user interfaces for presenting a topic brainstorming wizard in accordance with some embodiments of the disclosed subject matter.

In accordance with some embodiments, different users in an organization can create interactive checklists for themselves and for others to use. Sometimes, however, a user needs a little help in thinking of topics that can make for good interactive checklists. When a user needs help thinking of interactive checklist ideas, they can navigate through an interactive checklist using interface 6500 that may be presented by a hardware processor of a computing device. The hardware processor can present a topic brainstorming wizard as shown, for example, in FIG. 65.

Figure 66:
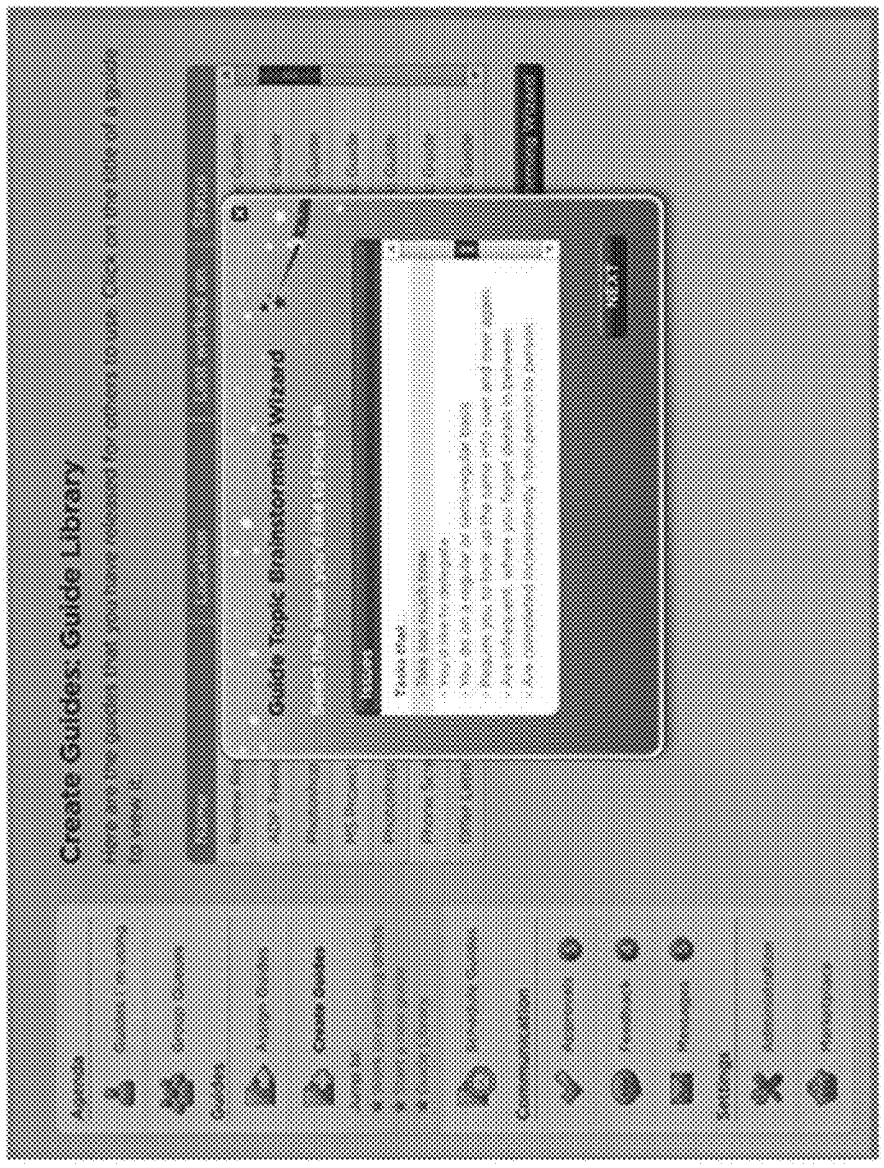
Figure 67A:
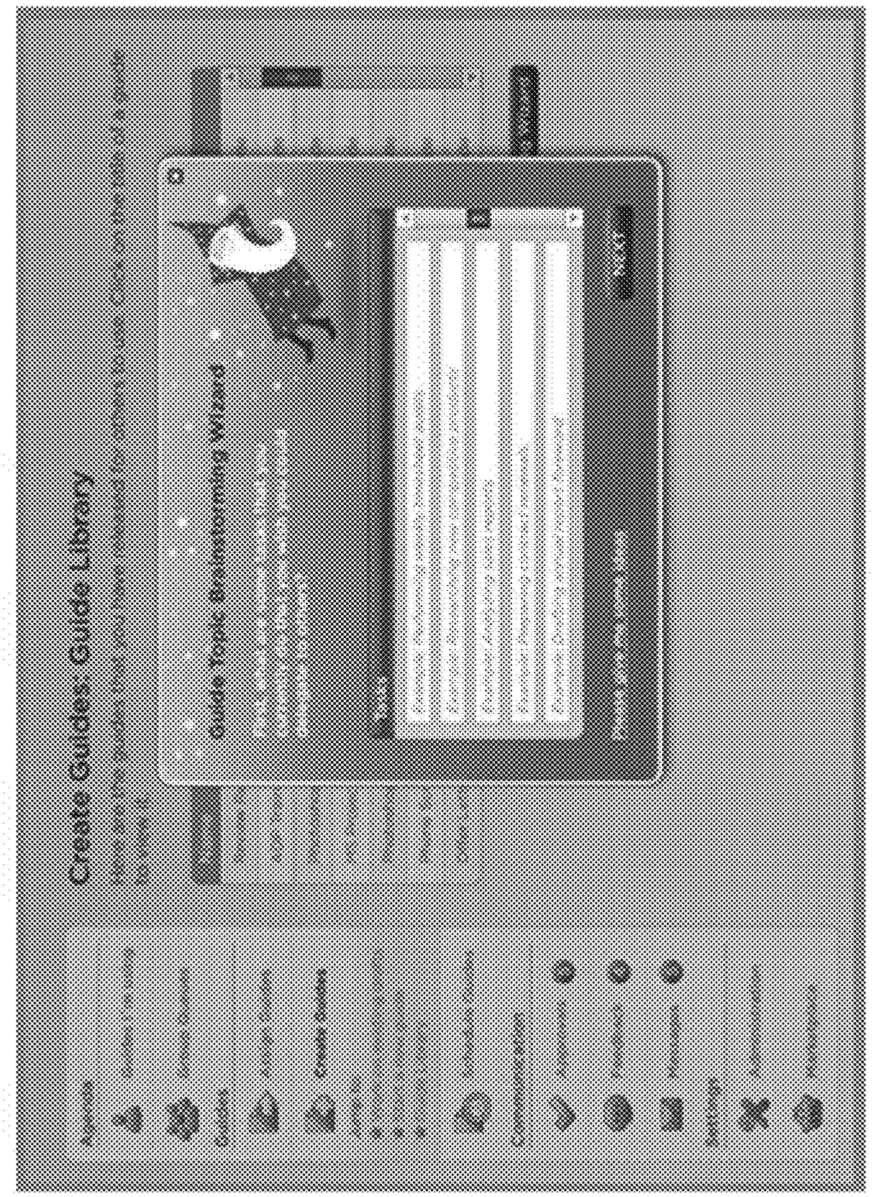
Figure 67B:
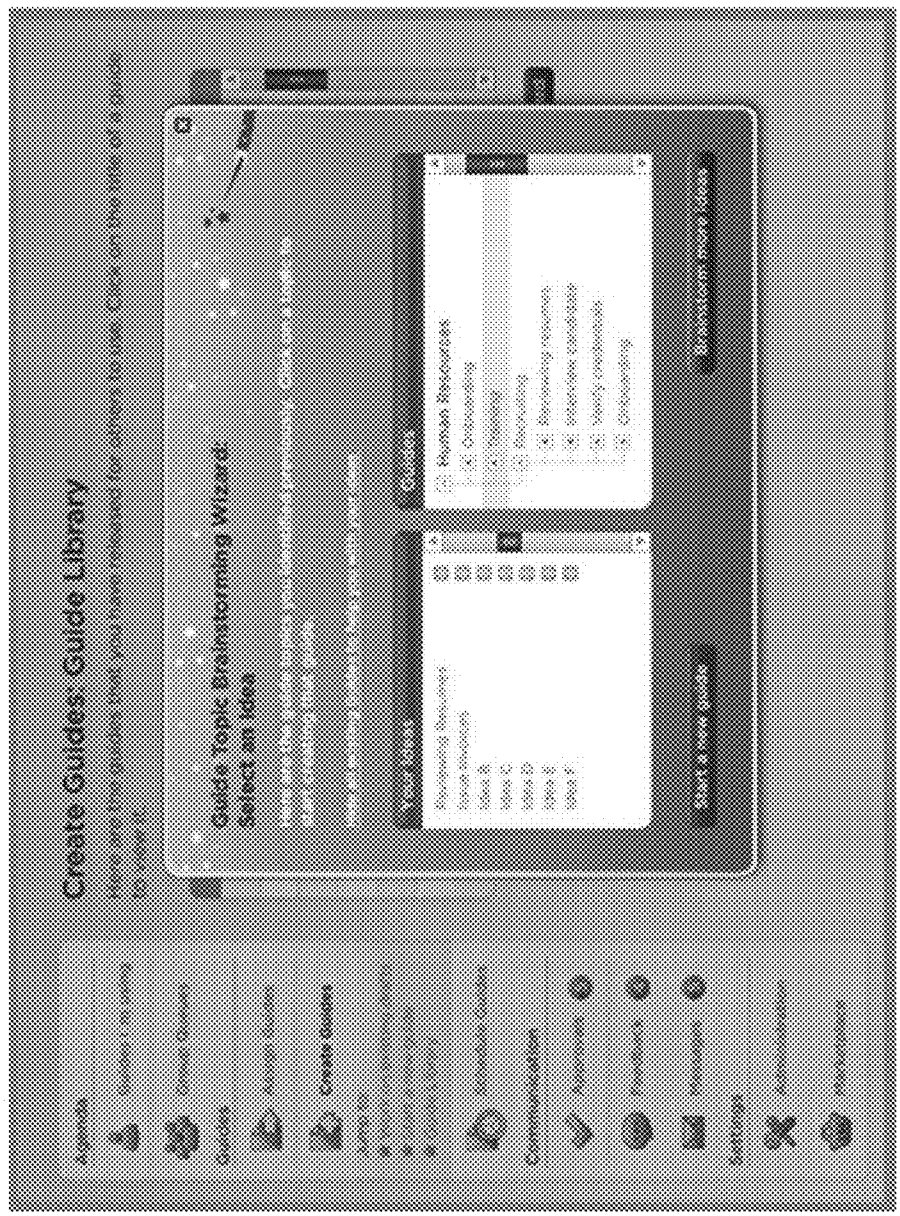

In accordance with some embodiments, using an interface 6600 that may be presented by a hardware processor of a computing device, the hardware processor can display a wizard that can guide a user through a series of questions and exercises. As shown, for example, in interface 6600 of FIG. 66, these can help the user identify tasks that have turned into pain points, for example, tasks that may take too much time, that they would like to delegate to others, that they perform infrequently, and/or any other tasks that have become pain points. In some embodiments, using an interface 6702 that may be presented by a hardware processor of a computing device, the hardware processor can receive user ideas in the wizard as shown, for example, in FIG. 67A. The hardware processor can save ideas from a current brainstorming session that can be reviewed in future sessions. The user can also compare another user's ideas with existing interactive checklists to provide further inspiration and/or prevent duplication as shown in interface 6704 of FIG. 67B.

Figure 68:
FIGS. 68, 69, 70, 71, 72, 73, 74, 75, 76, 77, 78, 79, and 80 show examples of user interfaces for creating an interactive checklist in accordance with some embodiments of the disclosed subject matter.
Figure 69:
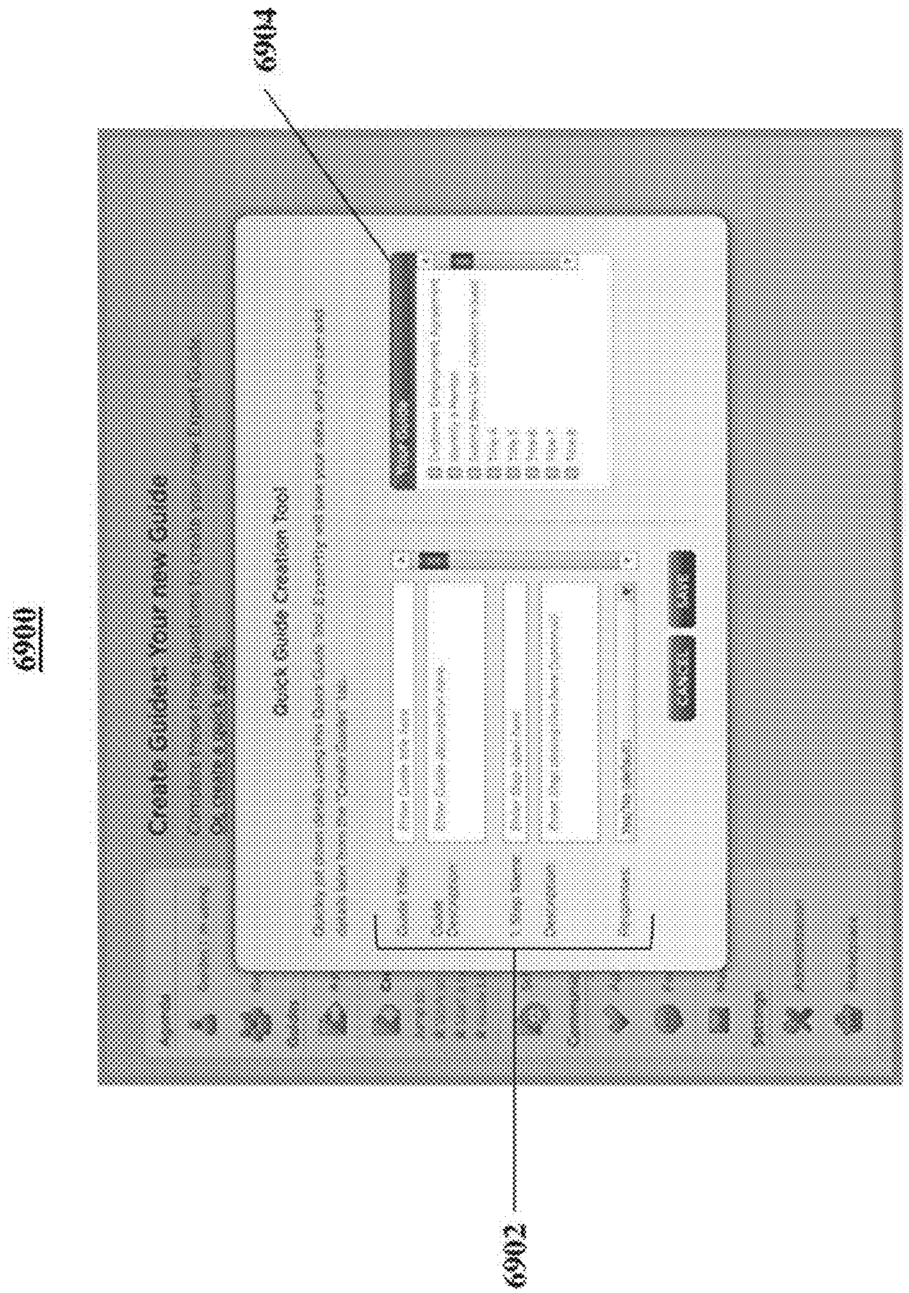

Sometimes, a user might have a great idea for an interactive checklist, but may not have time to create a full interactive checklist. Starting from interface 6800 of FIG. 68, the hardware processor can receive instructions for a new interactive checklist to be created. In some embodiments, using an interface 6900 that may be presented by a hardware processor of a computing device, the hardware processor can receive the user's idea and/or some simple steps at the "Quick Guide Tool" shown in FIG. 69.

In some embodiments, the hardware processor can receive a user input at the "Quick Guide Tool" to start creating an interactive checklist. The hardware processor can receive a new interactive checklist title and/or a description. Then, for each step, the hardware processor can receive a step name and brief instructions. Additionally, the hardware processor can receive a user input to indicate a response format (but can be offered their previous choice by default) or a more likely alternative if sensed from the content. These elements 6902 can be displayed by the hardware processor, for example, on the left side of interface 6900 of FIG. 69. In some embodiments, the hardware processor can present a "Your Guide" preview, shown as "Your Guide" 6904 in interface 6900 of FIG. 69, to allow the user to review the steps that they have added. Later, the user can return to this interactive checklist and refine and/or enhance it when there's more time.

Figure 70:
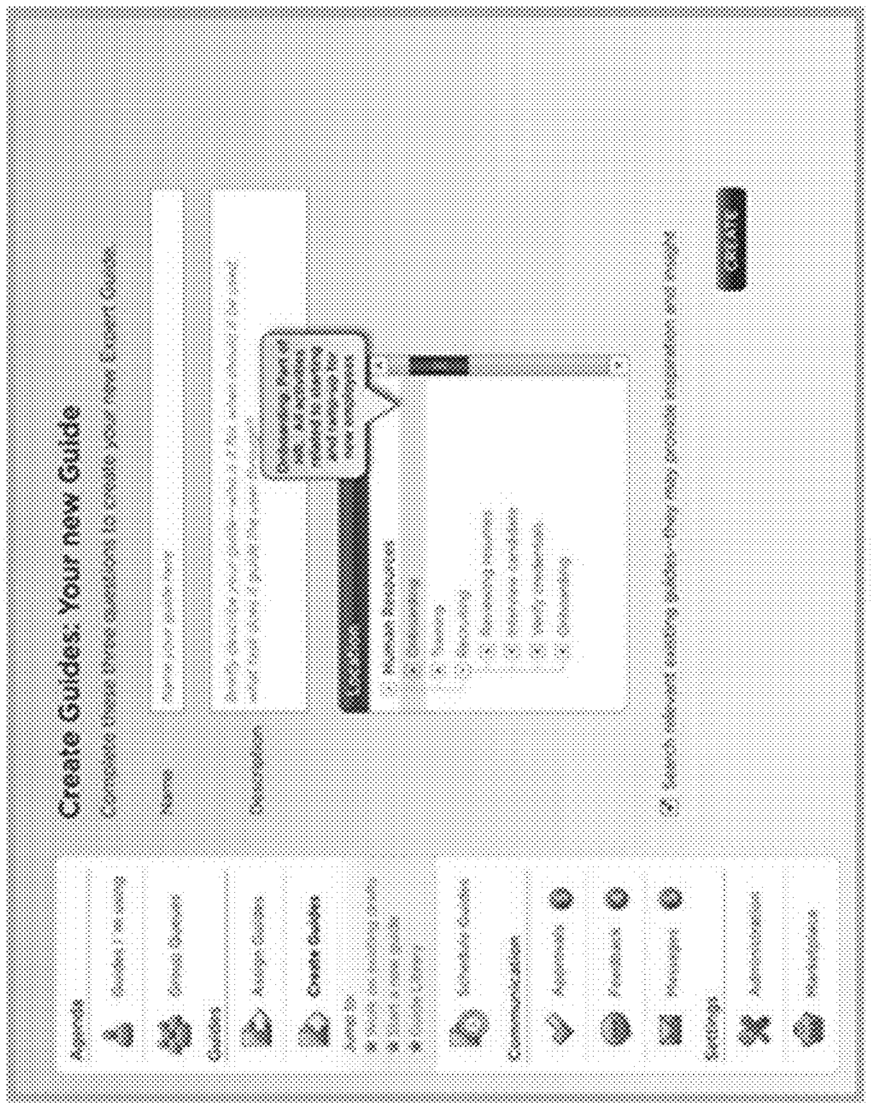
Figure 71:
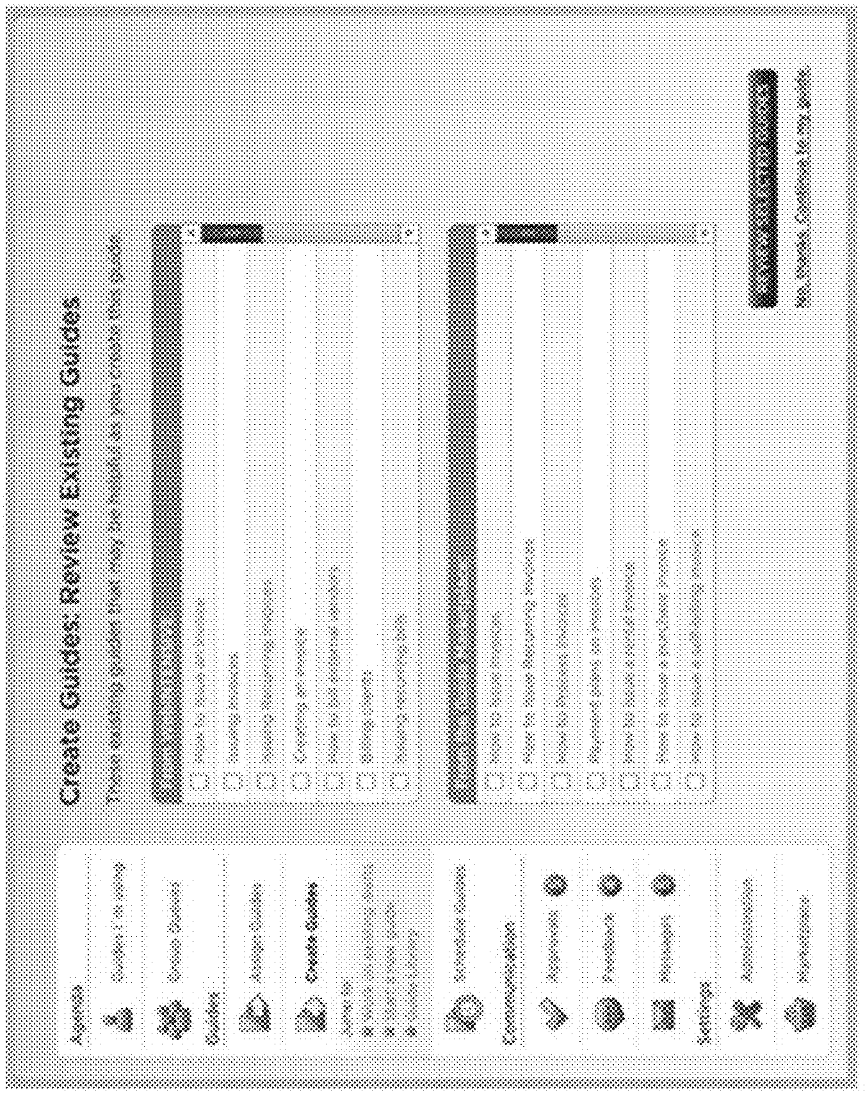
Figure 72:
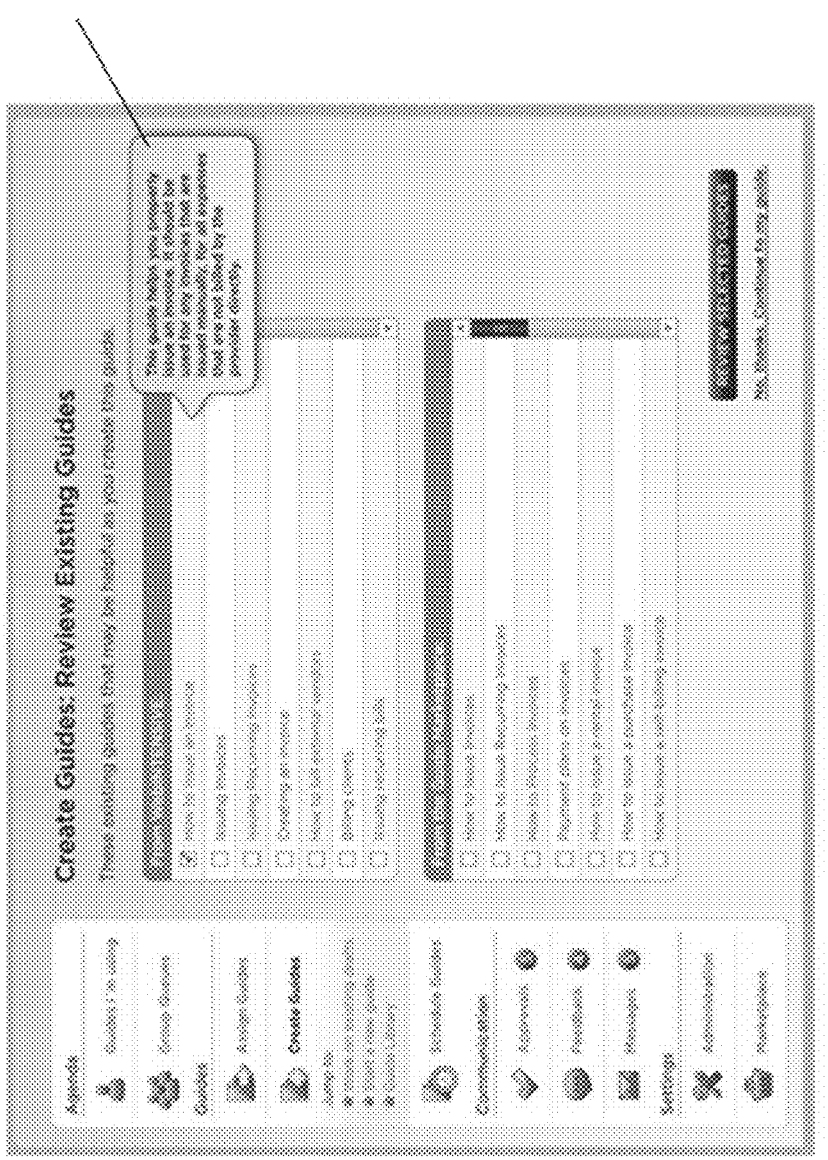

In accordance with some embodiments, a user may have an idea for an interactive checklist, but may want to ensure that they are not duplicating an existing interactive checklist or may need inspiration or ideas for the interactive checklist. At the start of creating the interactive checklist process (e.g., when they have only provided a title and description), they can opt to consult existing interactive checklists as shown, for example, in interface 7000 of FIG. 70. Once the hardware processor has received a title and an optional description, the hardware processor can present the user with similar or related existing interactive checklists from the user's own organization and/or the "Guide Marketplace" as shown, for example, in interface 7100 of FIG. 71. These suggestions may optionally take into account other factors associated with the user's likely need, for example possibly considering the user's industry, role, and/or other interactive checklists the user has used or purchased. The user can review the existing interactive checklists, indicating which ones they would like to review. To help them choose interactive checklists, the user can hover over any title to review a longer description of the interactive checklist as shown, for example, by description 7202 shown, for example, in interface 7200 of FIG. 72.

Figure 73:
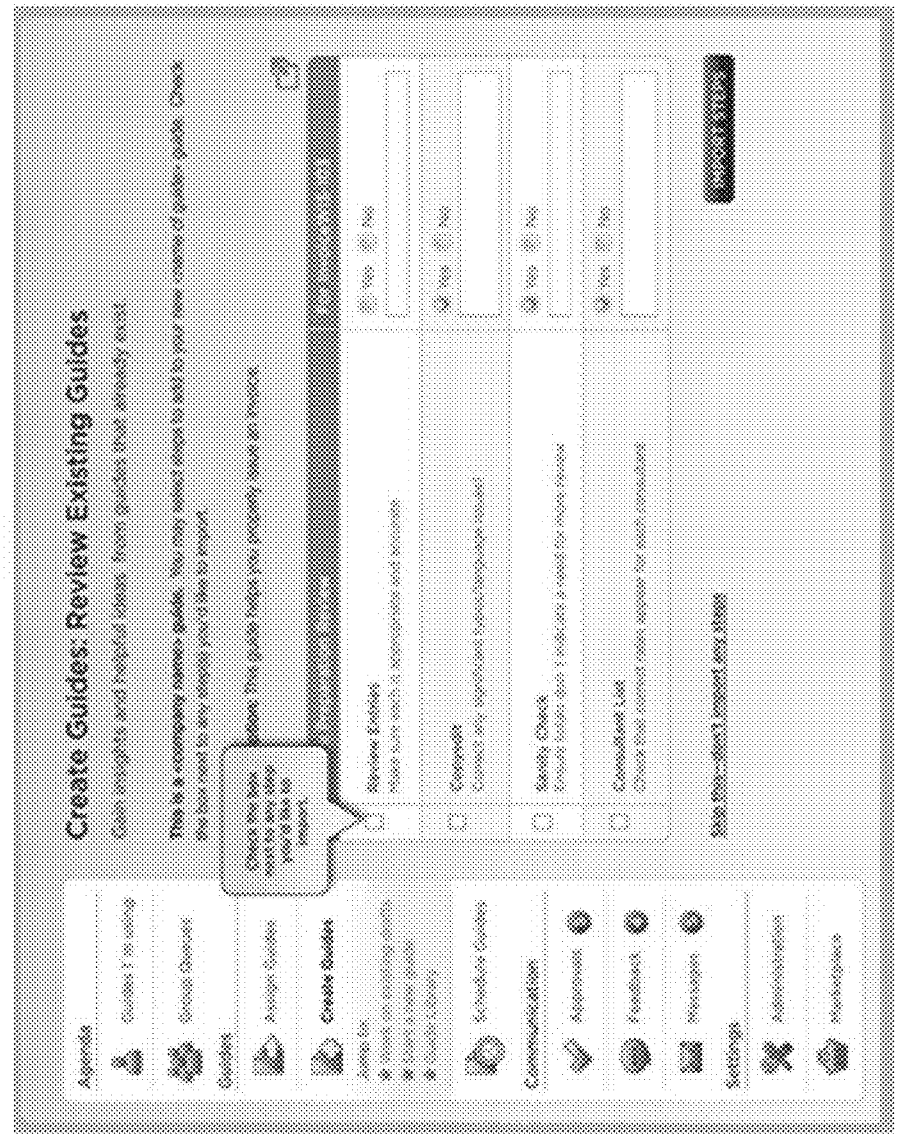
Figure 74:
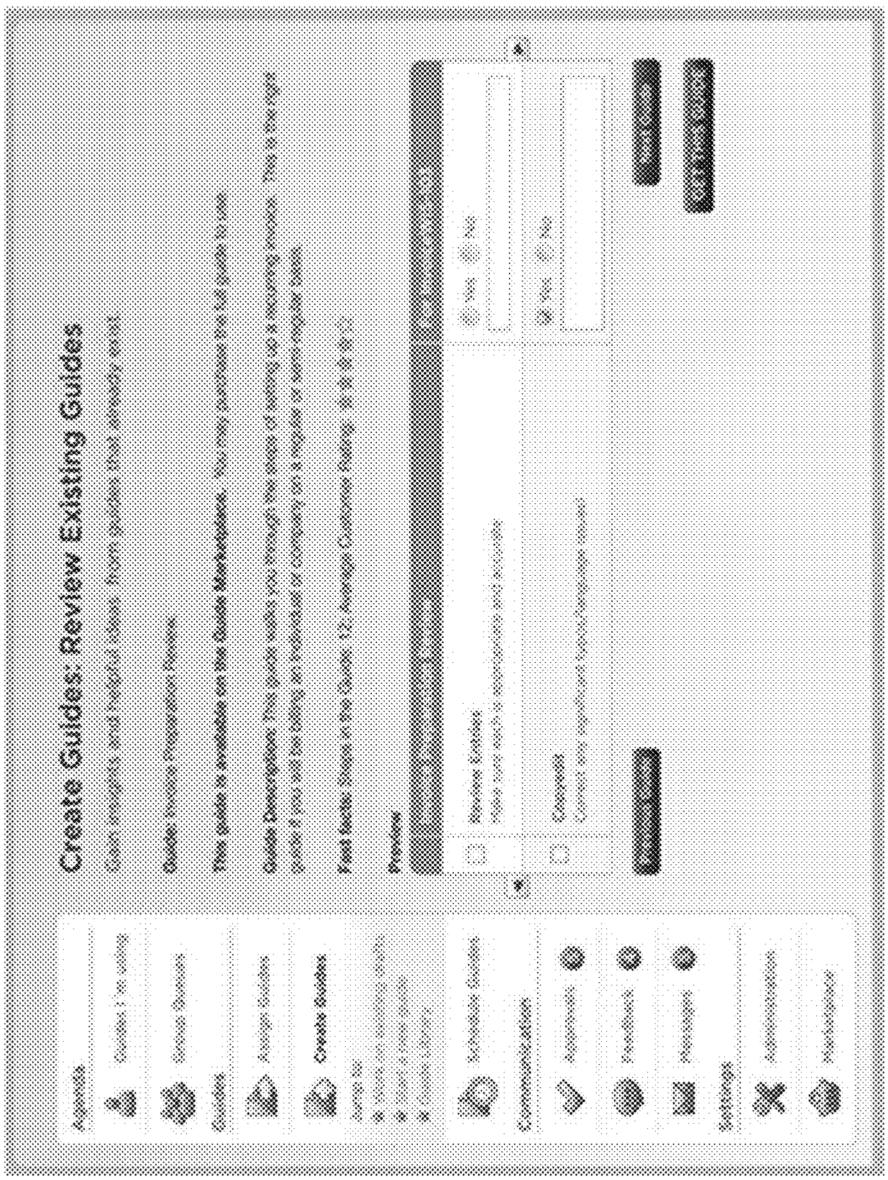

In accordance with some embodiments, as shown, for example, in FIG. 73, using an interface 7300 that may be presented by a hardware processor of a computing device, the hardware processor can present an interactive checklist description and a full interactive checklist. The user can import one or more steps from the existing interactive checklist into the new interactive checklist that they are creating or they can just review the interactive checklist for ideas. In some embodiment, as shown, for example, in interface 7400 of FIG. 74, the hardware processor can present an interactive checklist description, customer rating, and/or an interactive checklist preview for each "Guide Marketplace." The user can opt to purchase the interactive checklist from the "Guide Marketplace" or they can just review a preview for ideas.

Figure 75:
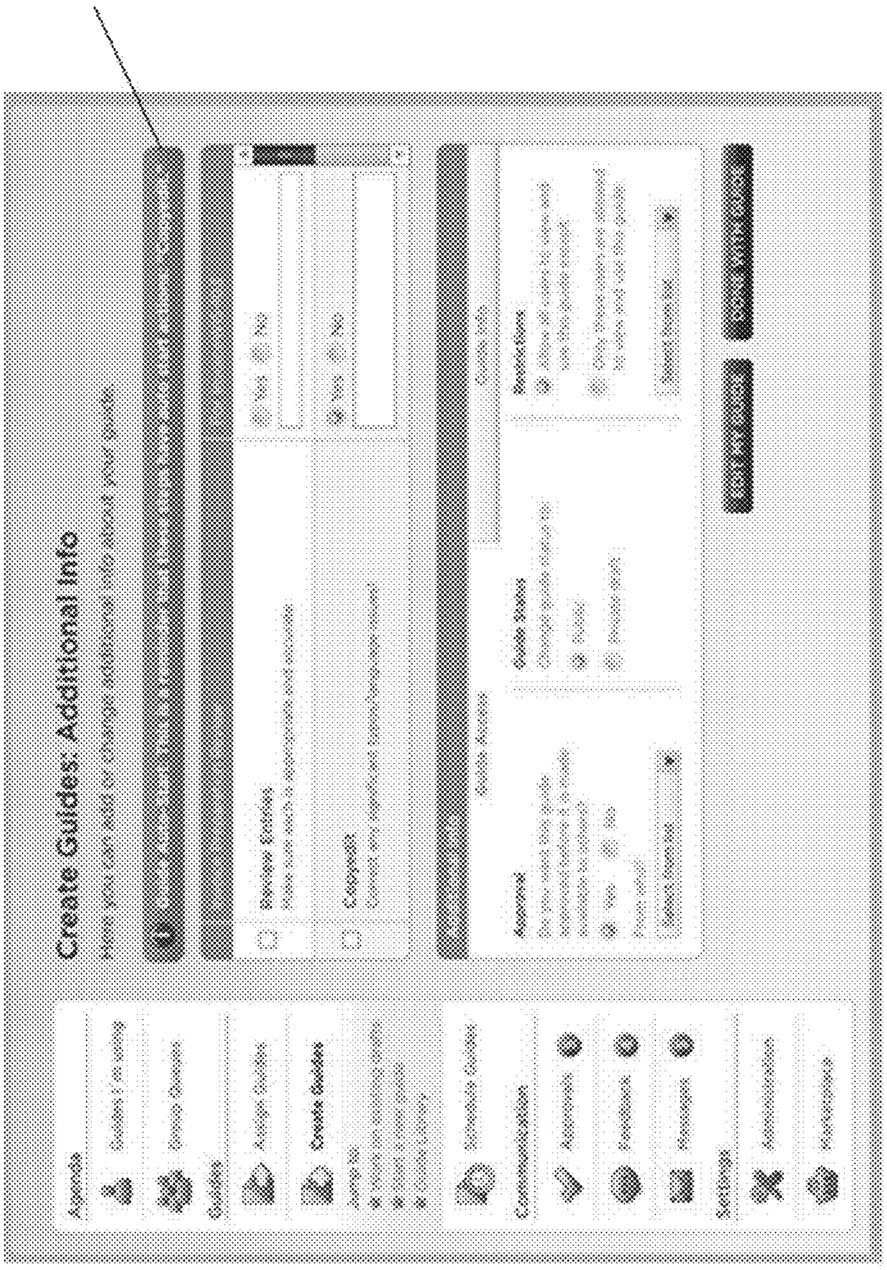

In accordance with some embodiments, interactive checklists can have the ability to launch specific applications, run macros of commands in these applications, open certain webpages, run macros of commands in these pages, etc. In some embodiments, the hardware processor can receive several types of enhancements to the steps to be added in an interactive checklist. One enhancement, automations, can be designed to help users by automatically completing actions. Automations can be configured to occur at certain trigger points, for example, when a specific step is completed, when an interactive checklist is approved, or even when an interactive checklist is assigned even before the user has shown, for example, the interactive checklist. Interactive checklist auto-start messaging as shown, for example, as guide autostart 7502 of interface 7500 of FIG. 75, can remind the user that an interactive checklist has automations that occur before the interactive checklist is opened. In some embodiments, automations can include any action that is automatically taken. For example, automations can include sending an email or an SMS, inserting data into a database, prefilling fields or field suggestions based on past/likely responses, retrieving relevant information from external services, sending relevant information to external services, and/or any other suitable actions.

Figure 76:
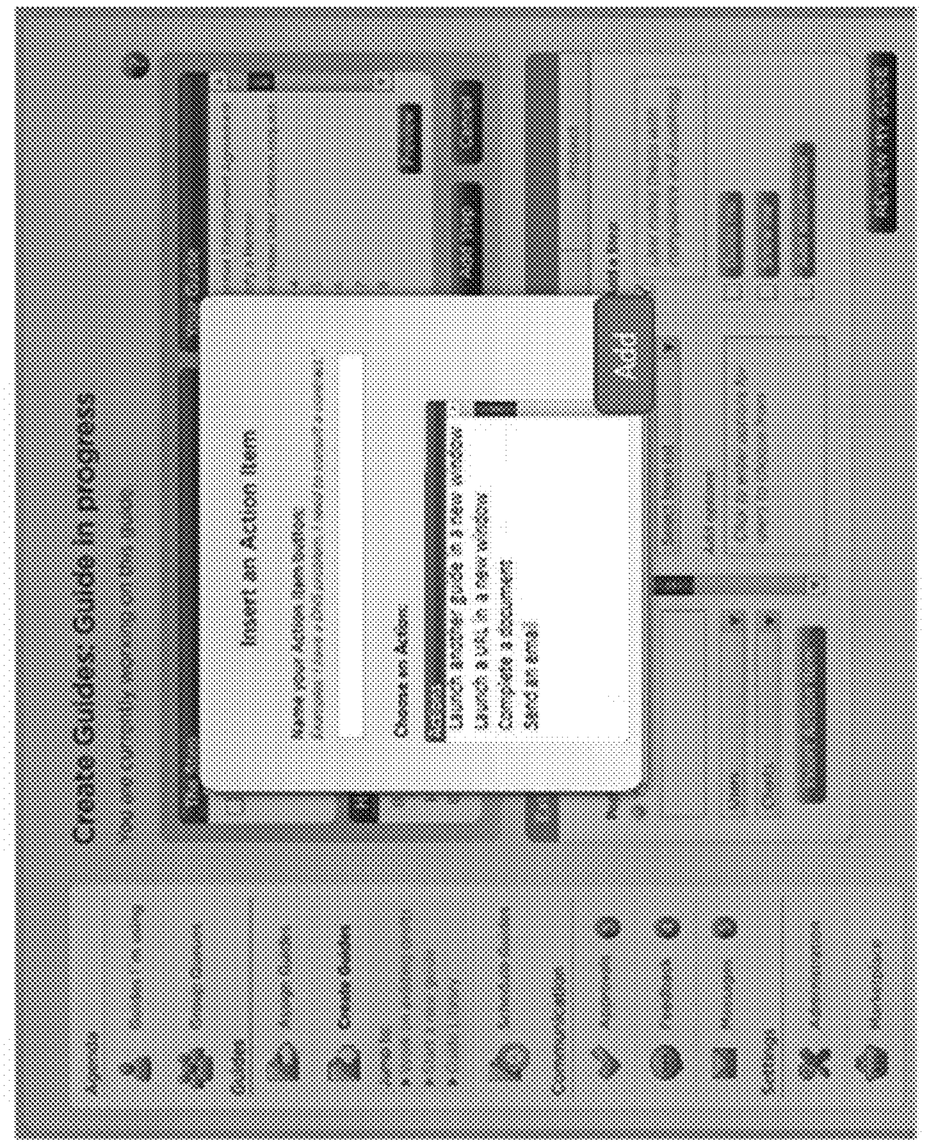

In accordance with some embodiments, another option for interactive checklists can be the ability to add an "Action Item" to any step. The hardware processor can receive action items, such as launching another interactive checklist in a new window, completing a document, or sending an email, to any step. As shown, for example, in FIG. 76, using an interface 7600 may be presented by a hardware processor of a computing device, the hardware processor can display a button that when selected can launch that action item.

Figure 77:
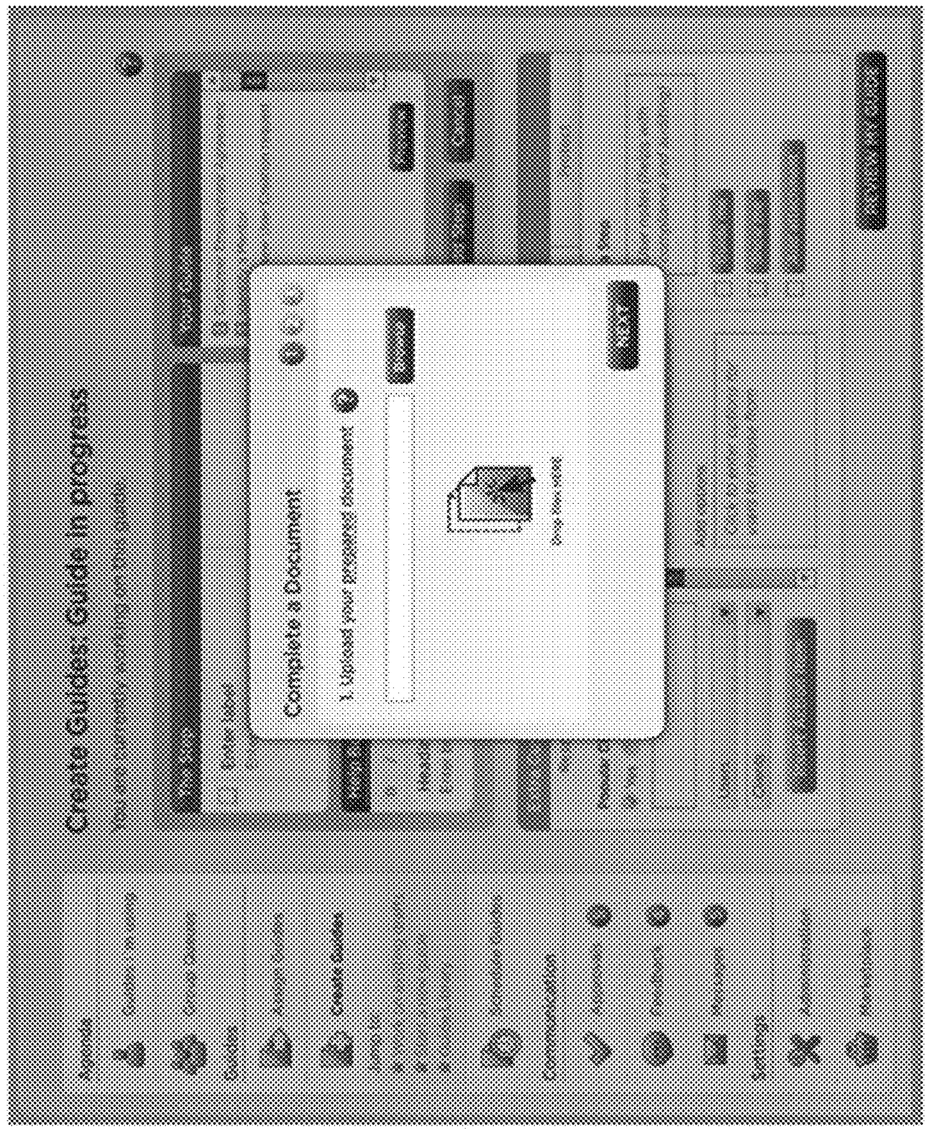

In accordance with some embodiments, one action can be to complete a document. As shown, for example, in FIG. 77, using an interface 7700 that may be presented by a hardware processor of a computing device, the hardware processor can receive a user upload of a template document with dynamic fields. For example, upon the hardware processor receiving a user input (e.g., by clicking a button), the interactive checklist can complete those fields for the user using data from the interactive checklist producing a completed document. Template documents may be of any suitable files types, such as Microsoft Office files, PDF files, Photoshop files, and/or any other types of files.

Figure 78:
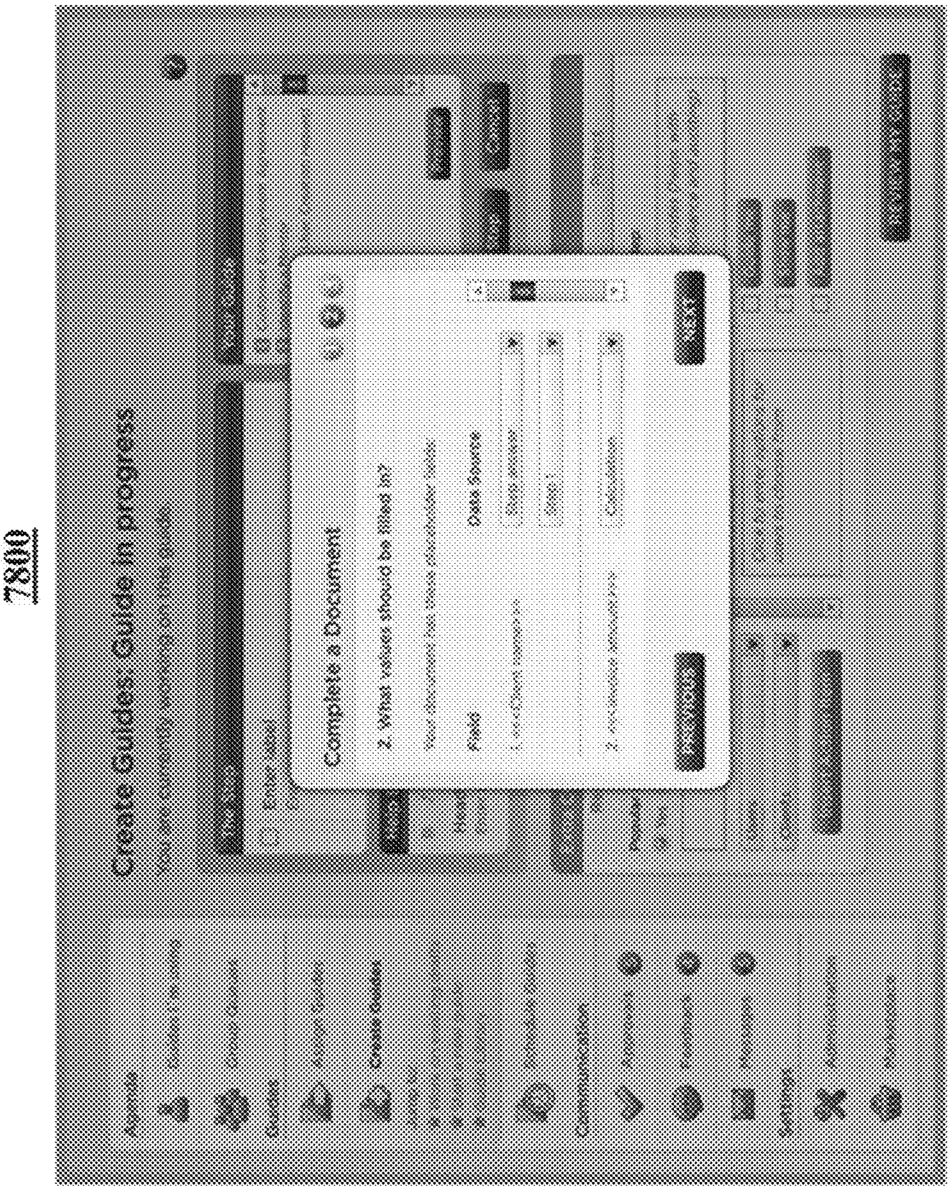
Figure 79:
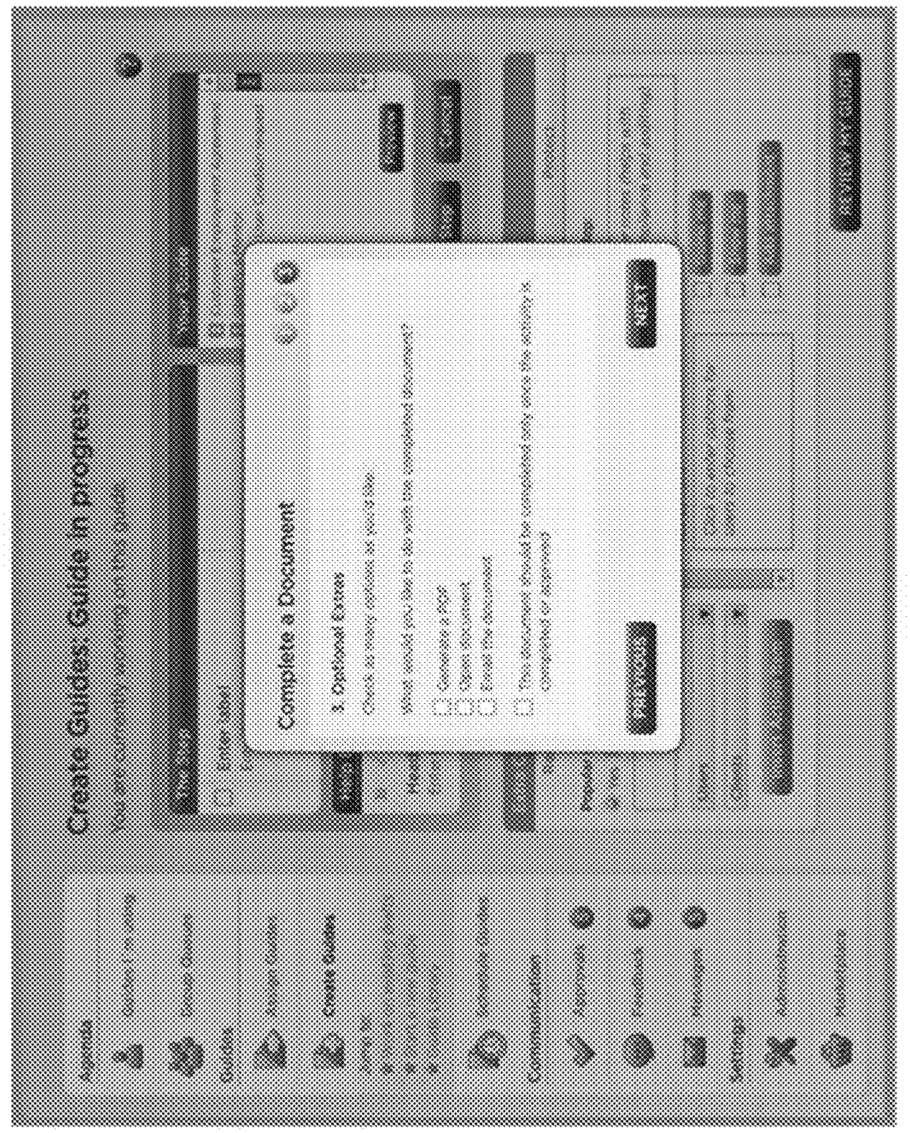

The hardware processor can receive a user upload of a template document, for example, an employment contract. The template contains certain dynamic placeholder fields such as <<Client name>> and <<invoice amount>> as shown, for example, in interface 7800 of FIG. 78. The interactive checklist can identify these fields and the hardware processor can present a prompt to the user to complete the fields. Sources for these fields can be from step answers, in this or related/unrelated interactive checklists, retrieved from a Web service, calculated, and/or a constant value. Additionally or alternatively, the template can also include syntax that indicates conditional inclusion, such as <<if: notblank:Client name>>. Lastly, the hardware processor can receive a user input to indicate what can be done with a completed document (other than automatically attaching it to the interactive checklist). Options can include opening it, emailing it, or generating a PDF of it as shown, for example, in interface 7900 of FIG. 79.

Figure 80:
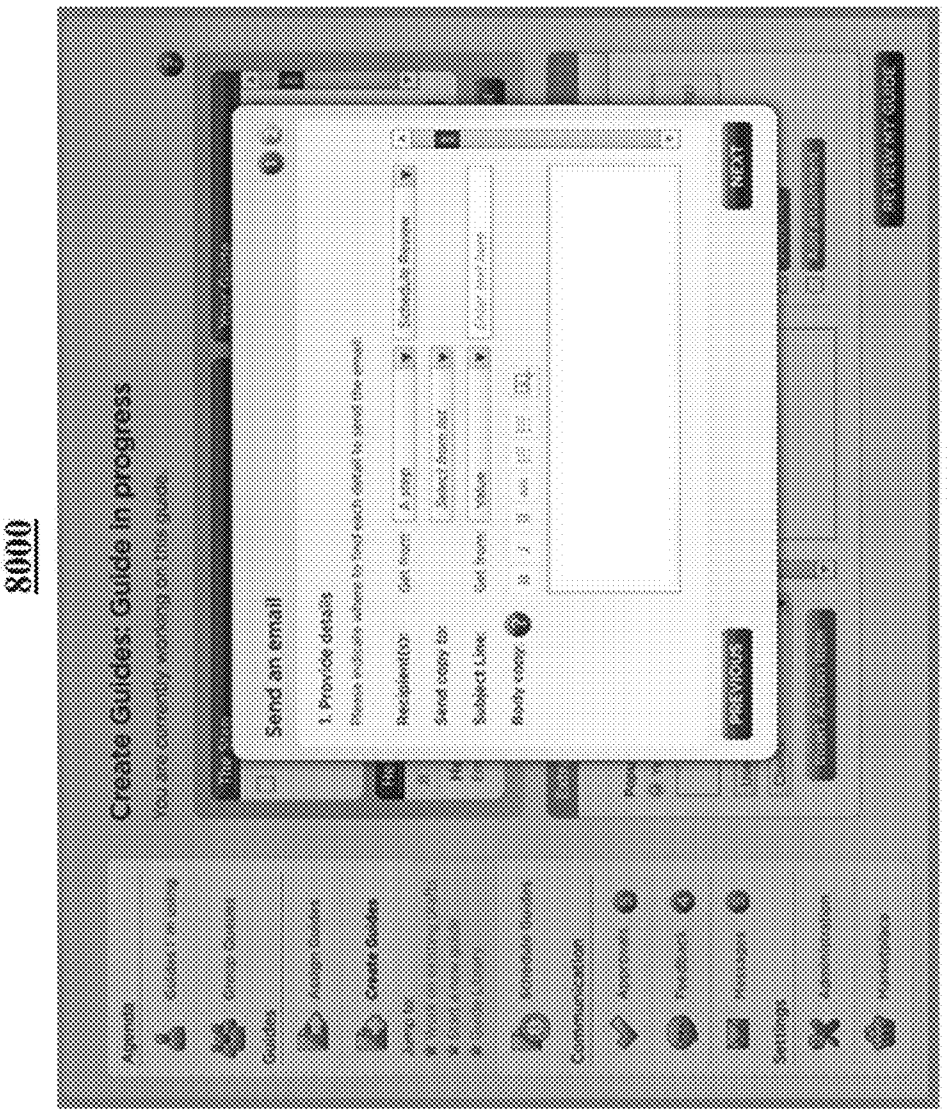

In accordance with some embodiments, another powerful action item can be the ability to send an email. As shown, for example, in FIG. 80, using an interface 8000 that may be presented by a hardware processor of a computing device, the hardware processor can receive a user input to configure the email, for example, such as recipients, subject line, and body copy. Similar to completing a document, the hardware processor can receive a user input to indicate where to get the information from, for example, from a step answer or from a constant value. The email can include dynamic fields in the body copy of the email. In accordance with some embodiments, other action items may include assigning an interactive checklist, or delegating steps.

Figure 81:
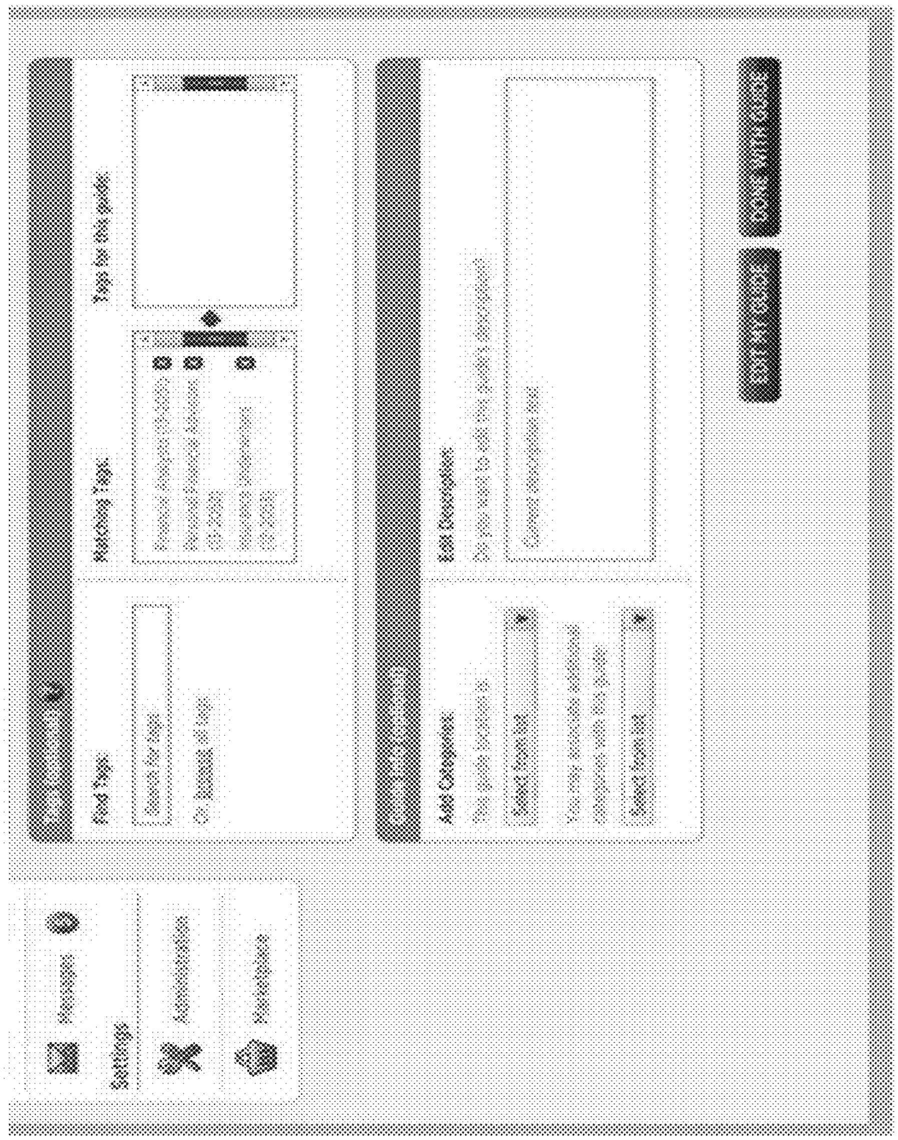
FIGS. 81, 82, 83, 84, and 85 show examples of user interfaces for tagging an interactive checklist in accordance with some embodiments of the disclosed subject matter.
Figure 82:
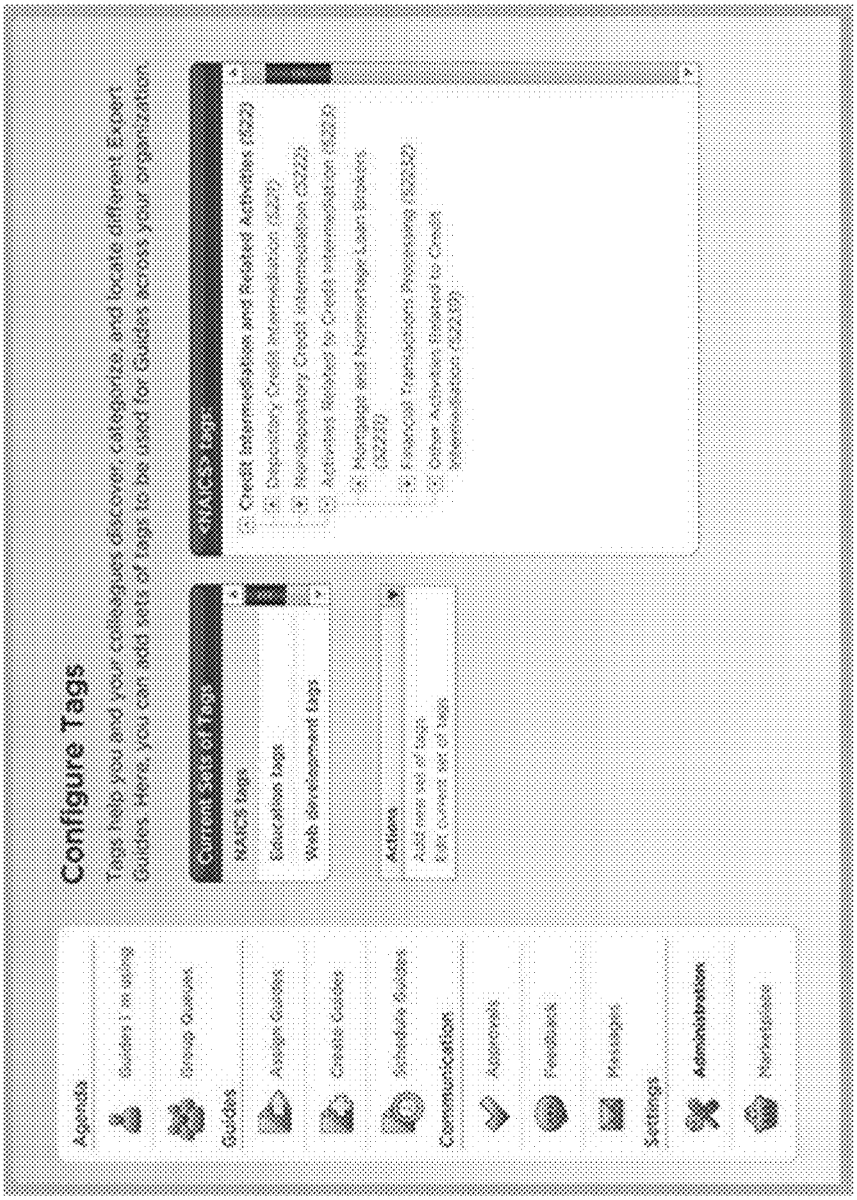
Figure 83:
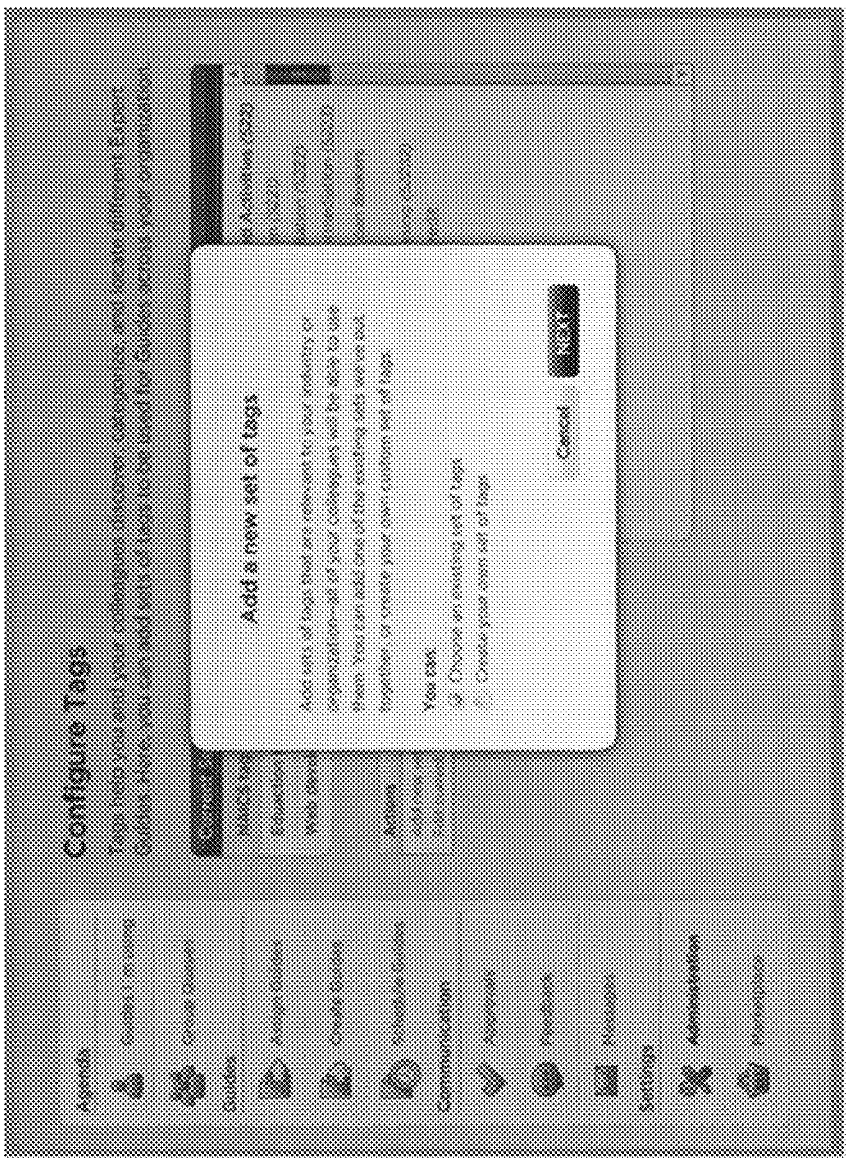

In accordance with some embodiments, a later part of creating an interactive checklist can be reviewing interactive checklist steps, as well as information about the interactive checklist, such as a title and a description. In addition, using an interface 8100 that may be presented by a hardware processor of a computing device, the hardware processor can receive a user input to tag the interactive checklist as shown, for example, in FIG. 81. The interactive checklist can offer the user matching tags or they can search interactive checklist tags using their own keywords. Any suitable sets of tags can be available to the user. The hardware processor can receive a user input to add one or more sets of tags to be used by users in an organization as shown, for example, in interface 8200 of FIG. 82. Two types of sets can be added, either default sets (e.g., that come with or without interactive checklists or optionally with a single interactive checklist) or custom sets (e.g., created by the organization), as shown, for example, in interface 8300 of FIG. 83.

Figure 84:
Figure 85:
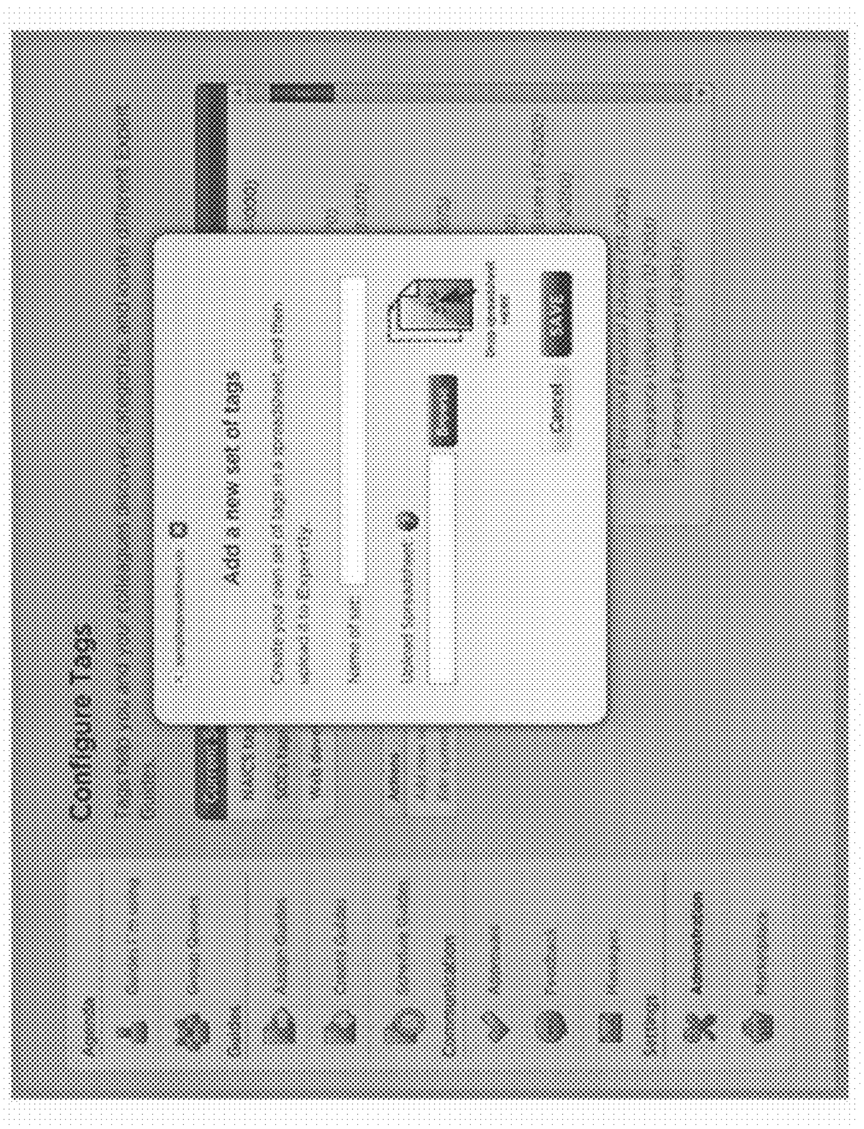

In accordance with some embodiments, an interactive checklist can come with many sets of tags as shown, for example, in interface 8400 of FIG. 84. Tag sets can be based on widely used classification systems, such as SOC and NAICS and/or industry-specific terms and ideas in some embodiments. The hardware processor can receive a unique set of tags from an organization as shown, for example, in interface 8500 of FIG. 85. A user can be provided with a set format, and can upload or enter and manage their own hierarchical set of tags.

Figure 86:
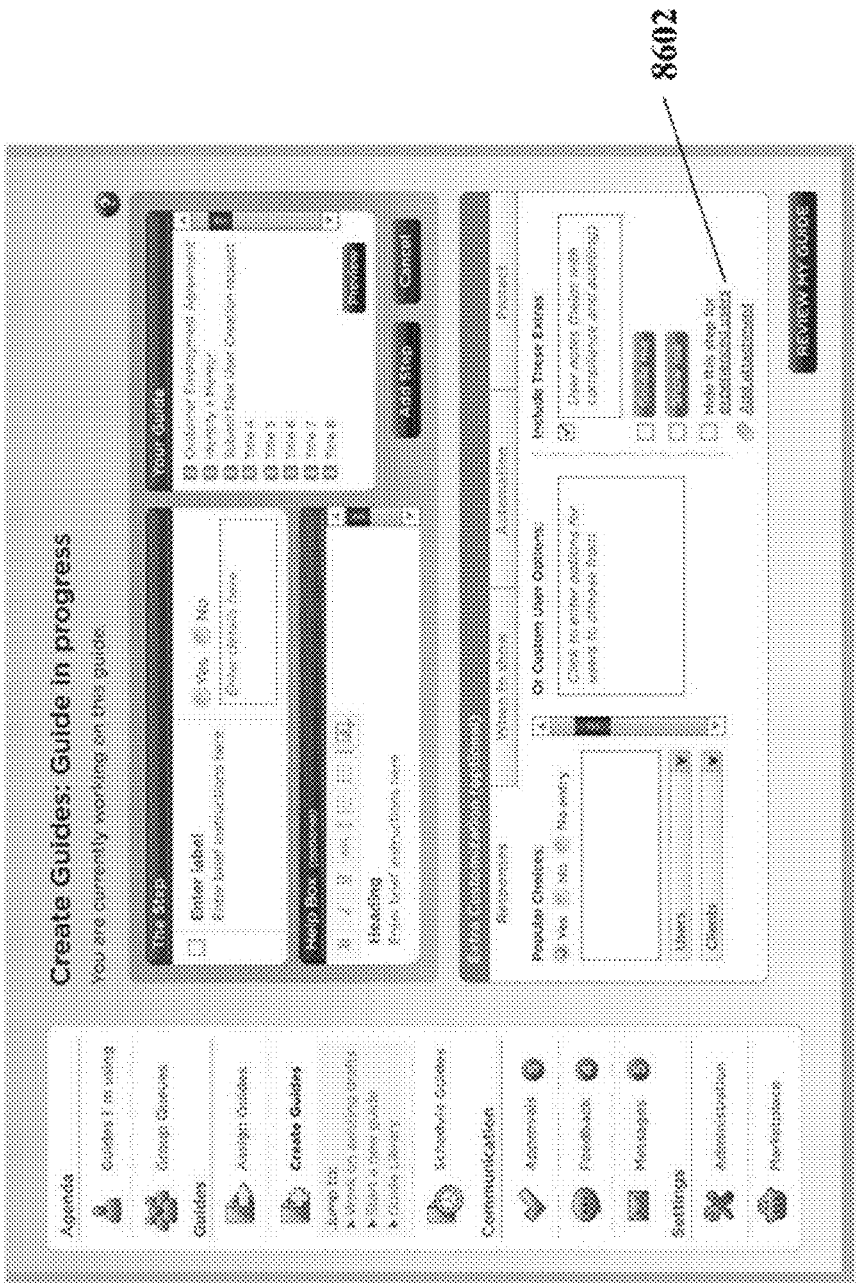
FIGS. 86 and 87 show examples of user interfaces for modifying an interactive checklist in accordance with some embodiments of the disclosed subject matter.
Figure 87:
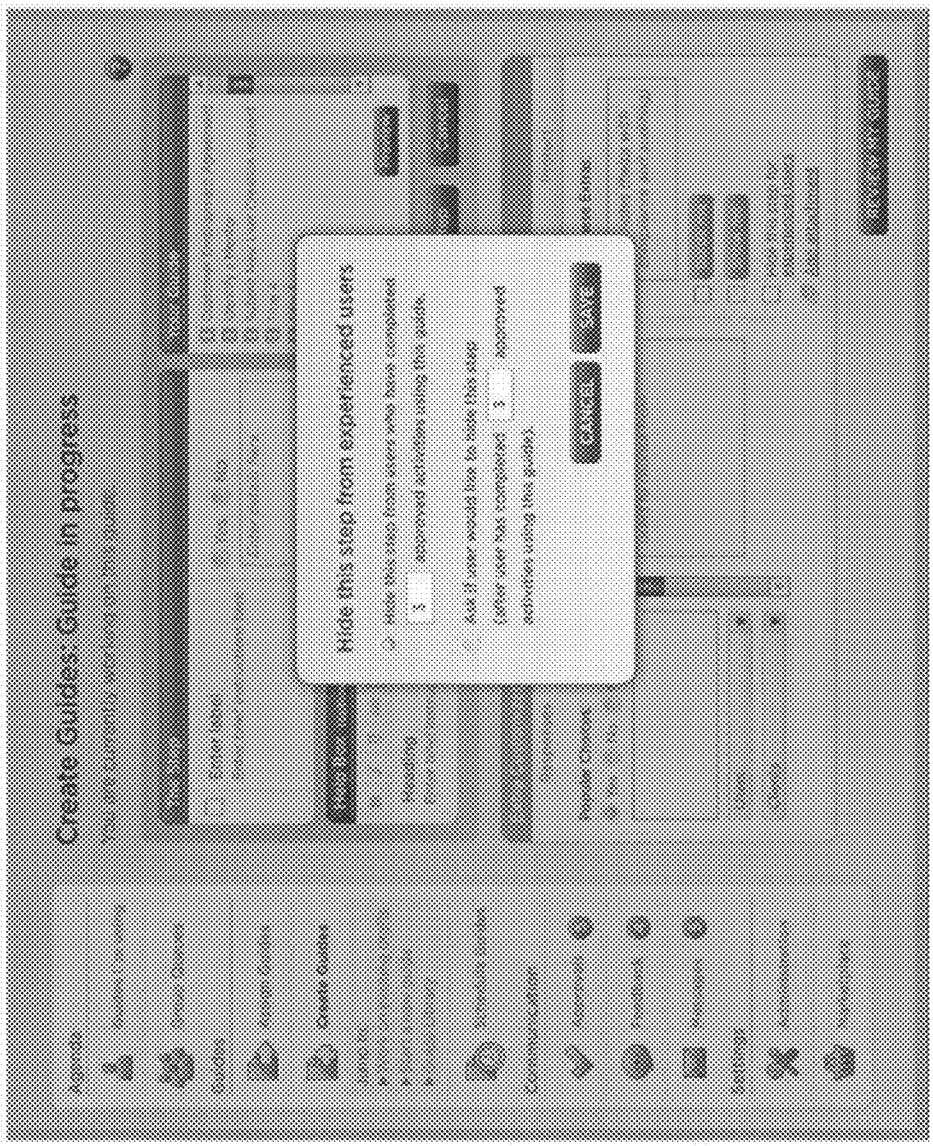

In accordance with some embodiments, once an interactive checklist has been created and has been assigned or used, the hardware processor can receive a user input to modify the interactive checklist. Sometimes, a user may decide that a particular step is no longer needed (e.g., at least for certain users). In that case, the hardware processor can receive a user input at box 8602 of interface 8600 of FIG. 86 to hide the step. When the user decides to hide the step from experienced users, they can have the flexibility to hide the step after a user has completed the interactive checklist a certain number of times or ask the user if they would like the step hidden after the user has completed the interactive checklist a certain number of times as shown, for example, in interface 8700 of FIG. 87.

Figure 88:
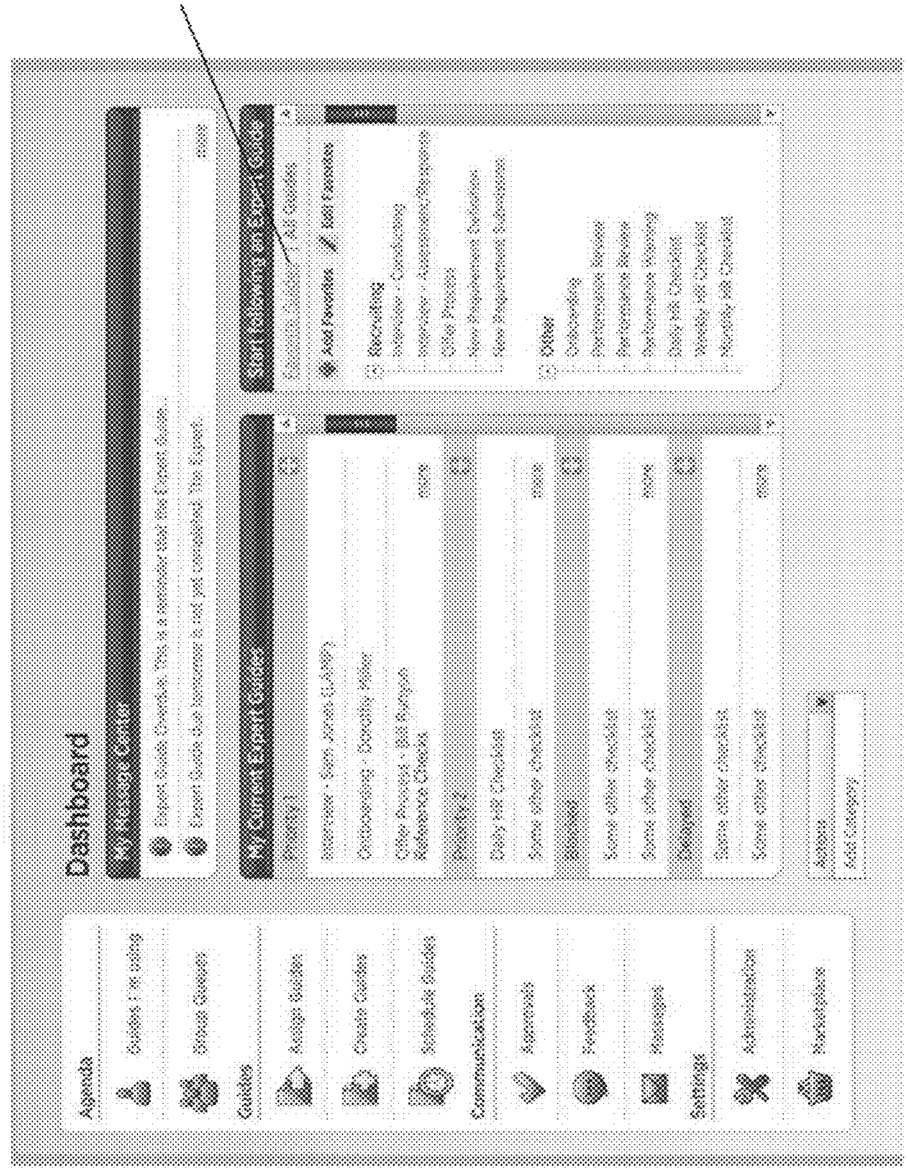
FIGS. 88 and 89 show examples of user interfaces for presenting a list of favorite interactive checklists in accordance with some embodiments of the disclosed subject matter.

In accordance with some embodiments, published user interactive checklists can be used to complete tasks. It can be common for a user to use the same interactive checklists over and over again for tasks that they complete on a regular basis. These interactive checklists (and others) can be presented by the hardware processor on a user dashboard under a "Favorite Guides" menu as shown, for example, in interface 8800 of FIG. 88 as 8802.

Figure 89:
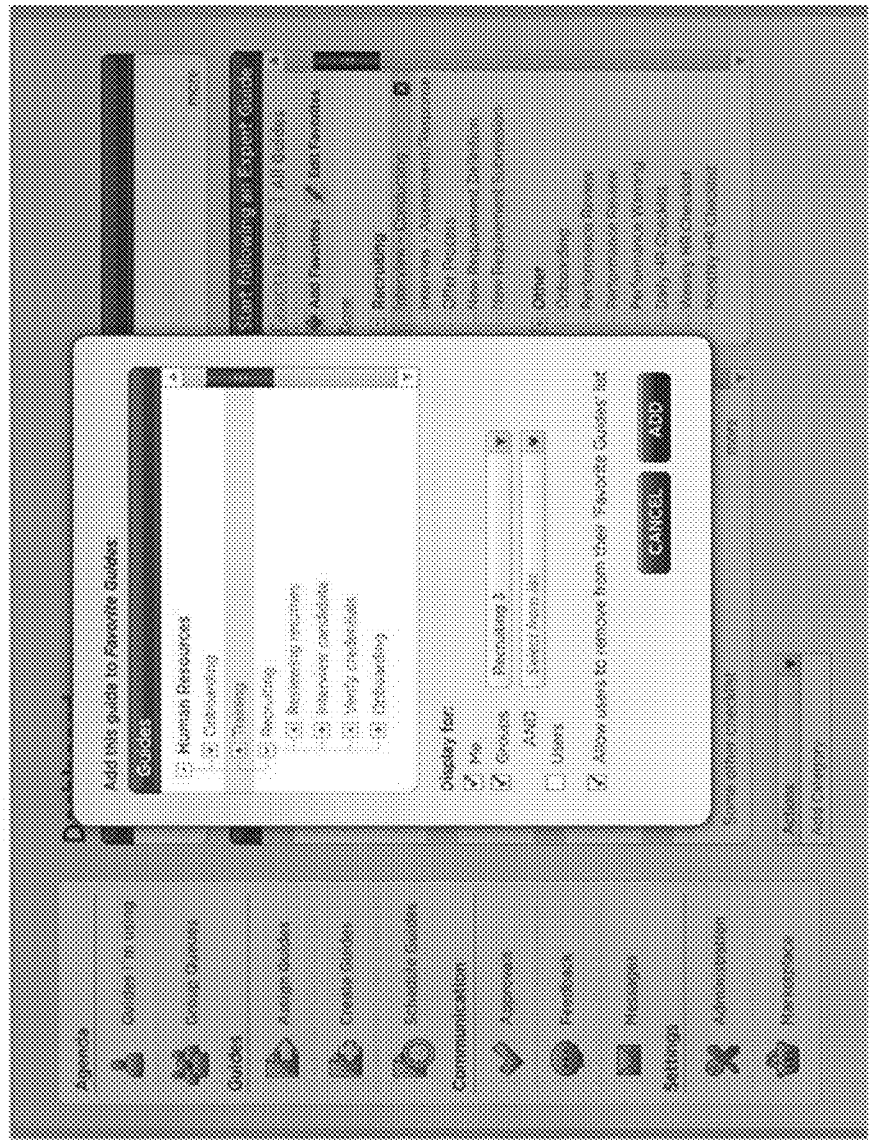

In some embodiments, using an interface 8900 that may be presented by a hardware processor of a computing device, the hardware processor can receive a user input to add an interactive checklist to a user's list of "Favorite Guides" as shown, for example, in interface 8900 of FIG. 89. The user can also choose to add it to a "Favorite Guides" list of another user or group of users in some embodiments. A user may subscribe to the interactive checklists authored by a selected user, group, or organization in some embodiments. Additionally and/or alternatively, the user may be subscribed to the interactive checklists directly or by virtue of the user's member to a Group. This can cause all of the selected user's, groups, or organization's current and future interactive checklists to be favorite and/or, if the user designates, those current or future interactive checklists can be brought to the user's attention upon publication or modification and possibly offered for designation as a favorite.

Figure 90A:
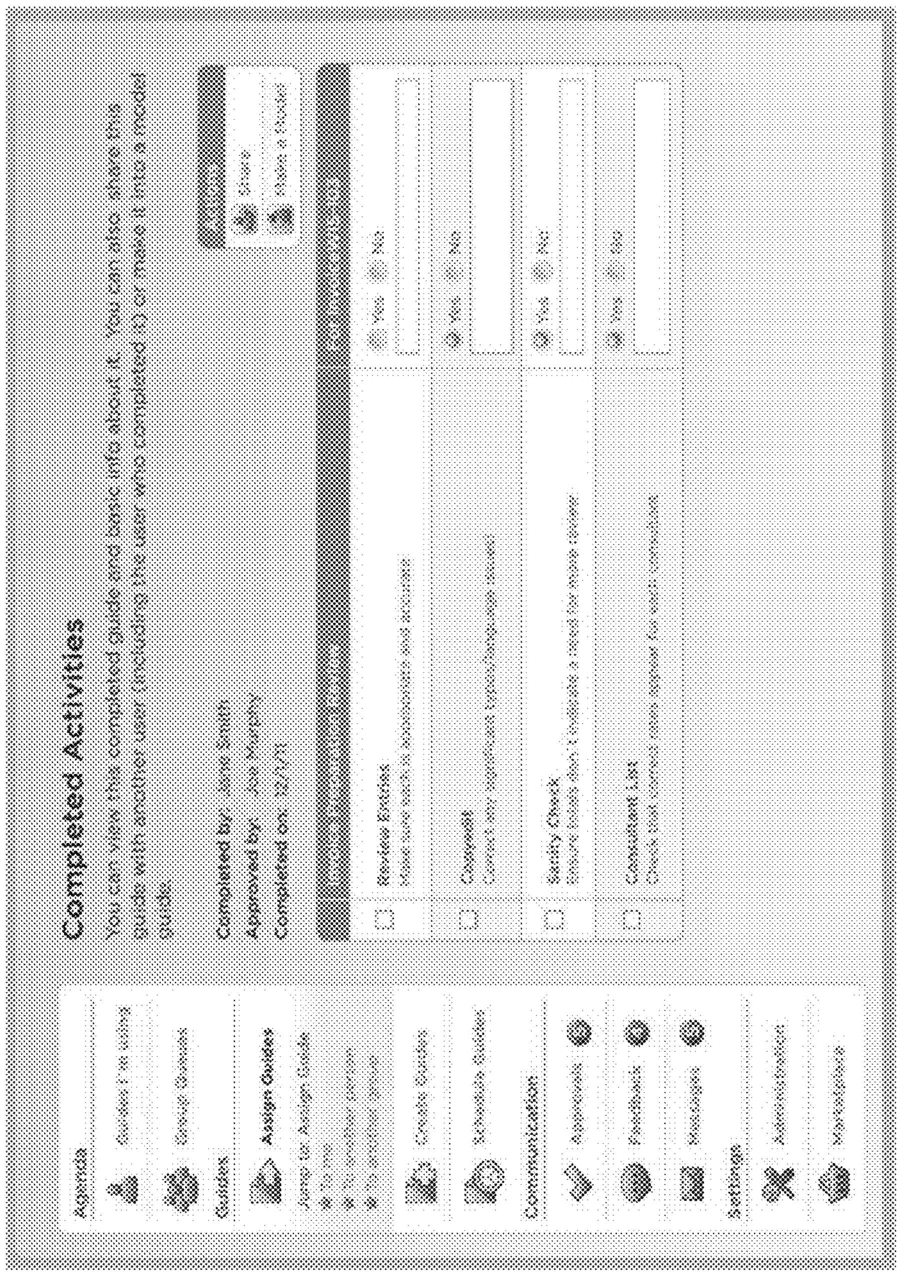
FIGS. 90A and 90B show examples of user interfaces for sharing a complete activity in accordance with some embodiments of the disclosed subject matter.
Figure 90B:
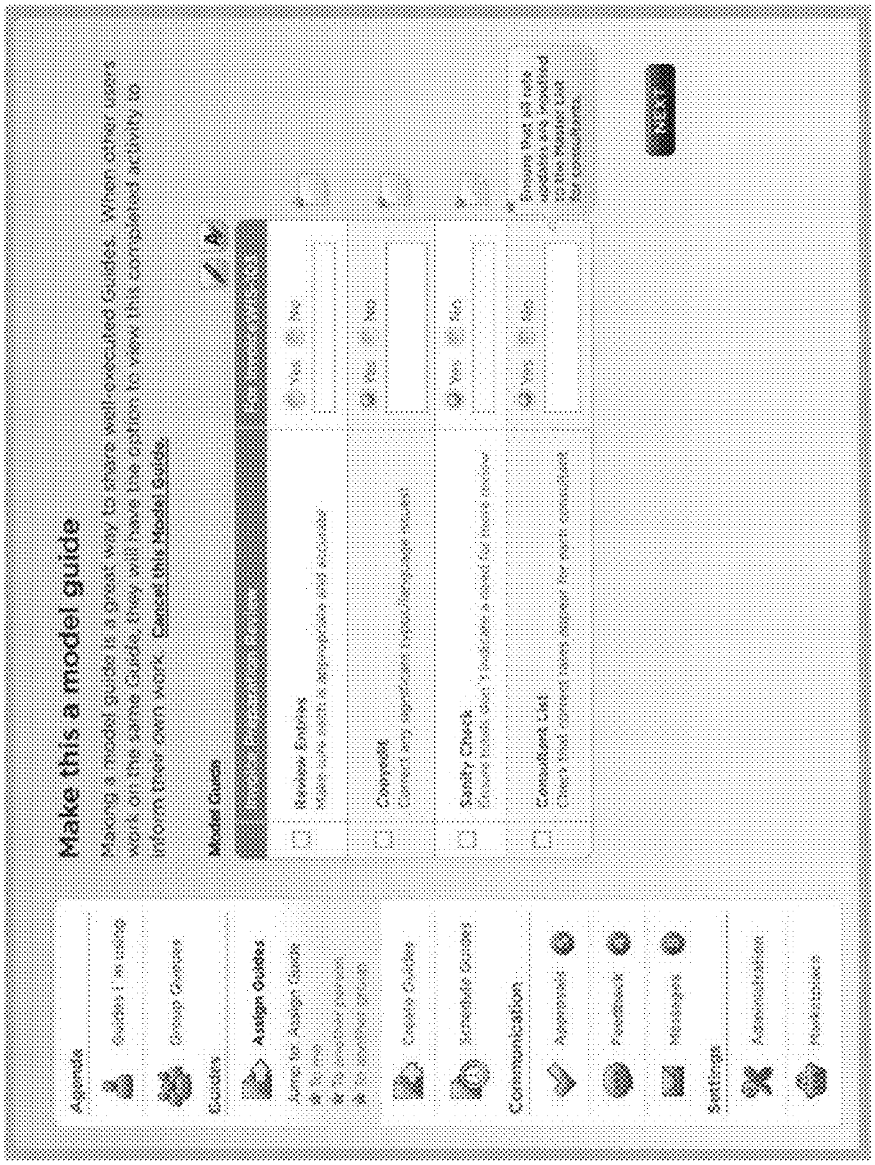

Interactive checklists can be assigned to any number of people, any number of times. A user can view most-completed activities that use the interactive checklist that they created. The user can share a completed activity with another user or the users can opt to turn it into a model interactive checklist as shown, for example, in interfaces 9002 and 9004 of FIG. 90A and FIG. 90B. A model interactive checklist can aid other users who are working on the same interactive checklist. The hardware processor can receive a user input to add notes to a step, highlight text in the interactive checklist, alter text in the interactive checklist (to protect private or sensitive information), and/or make any other additions.

Figure 91:
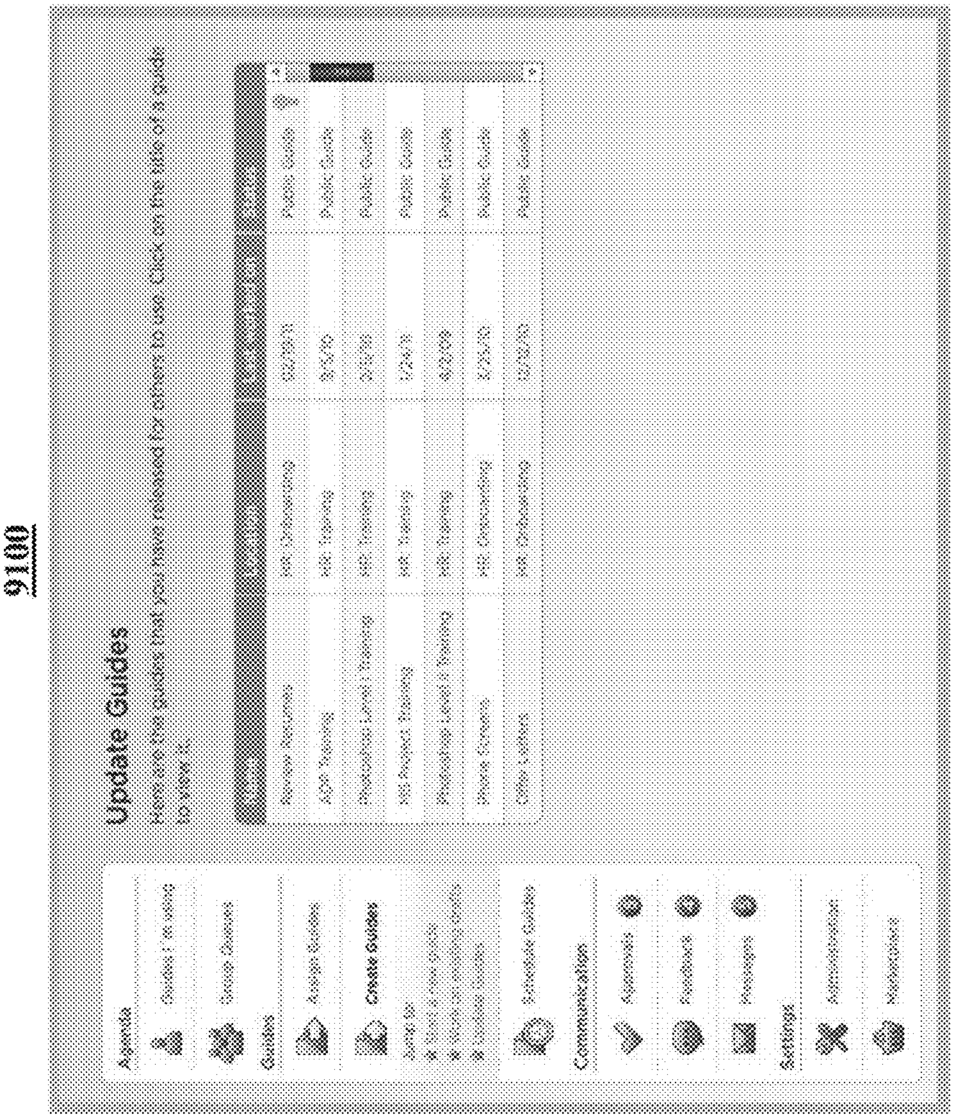
FIGS. 91, 92A, and 92B show examples of user interfaces for promoting steps of an interactive checklist in accordance with some embodiments of the disclosed subject matter.
Figure 92A:
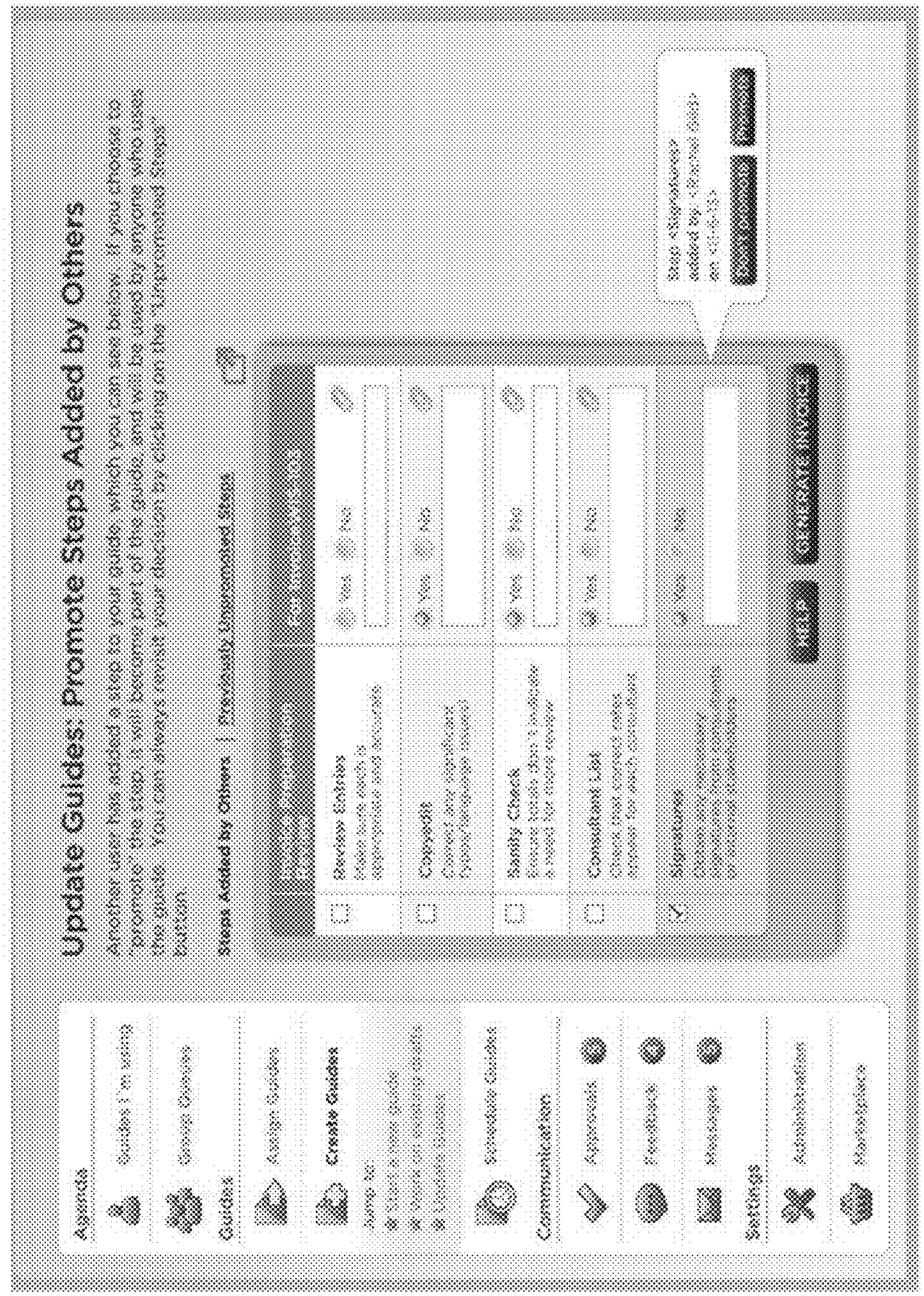
Figure 92B:
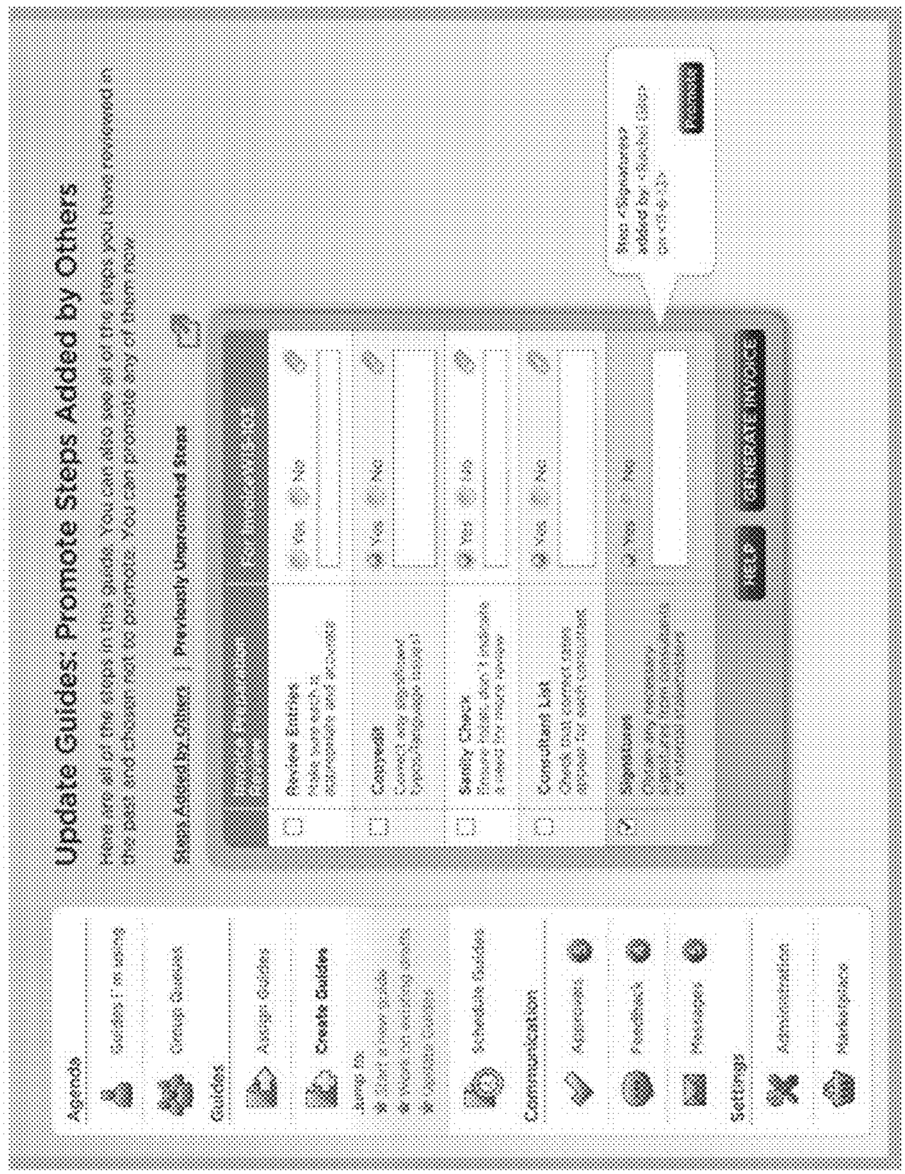

In accordance with some embodiments, another way an interactive checklist user can modify a published interactive checklist can be through a "Step Promotion" feature. In some embodiments, once an interactive checklist is published, using an interface 9100 that may be presented by a hardware processor of a computing device, the hardware processor can receive a user input to modify or add steps for their own use only, as shown, for example, in FIG. 91. Additionally and/or alternatively, modifying or adding steps can be for a limited set of people or groups of people. However, the published interactive checklist owner can review customizations that have been added (provided protections allow this), and can choose to promote some to being part of the published interactive checklist. In accordance with some embodiments, the owner may alter a step in association with the promotion. The owner can review new steps as shown in interface 9202 of FIG. 92A. If the owner chooses to promote, the step can be added to the published interactive checklist and used by everyone. If the owner chooses to not promote, the published interactive checklist can stay the same. This feature can help harness grassroots interactive checklist improvements thought of from throughout an organization. In some embodiments, a user can return to steps they previously had said not to promote. With extra time and perspective, the user may now wish to promote the step that they previously denied as shown, for example, in interface 9204 of FIG. 92B.

Figure 93:
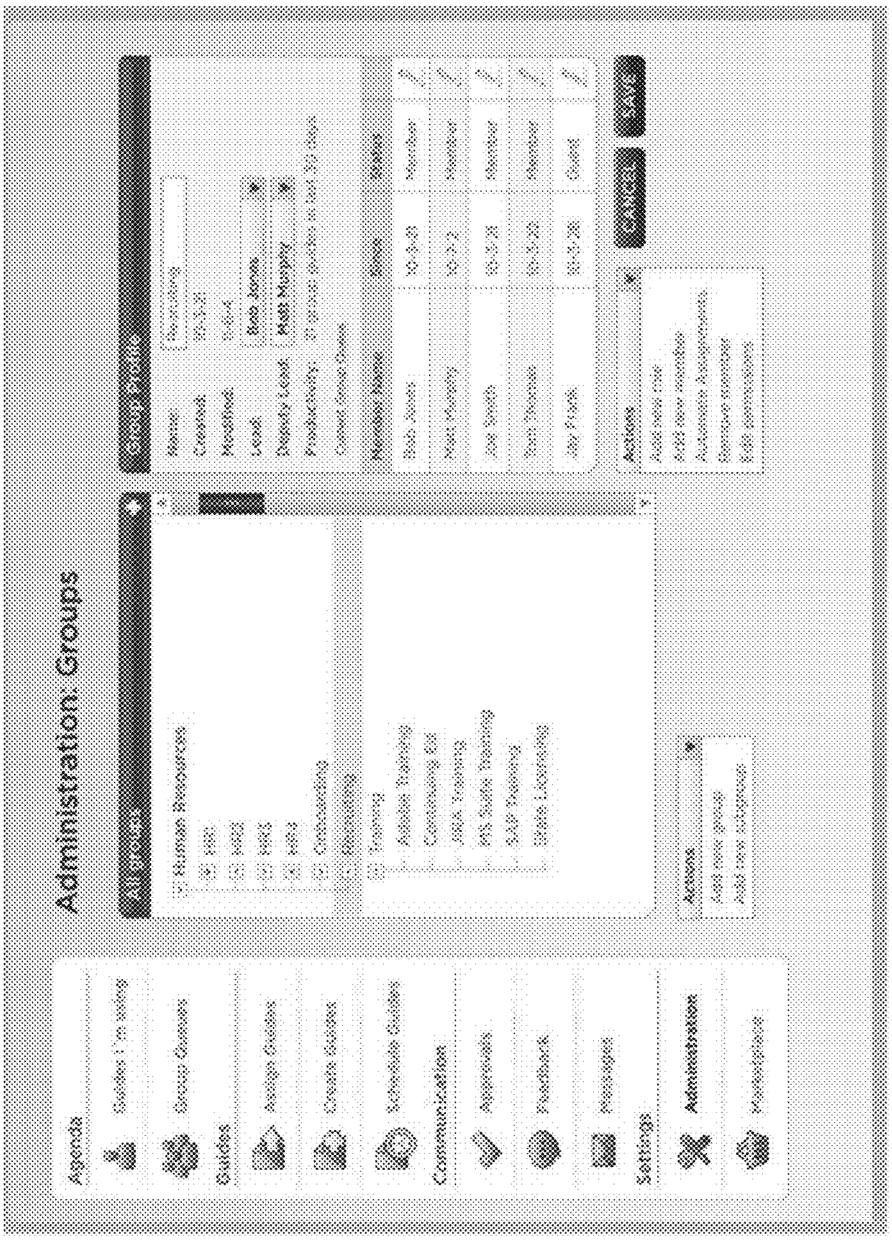
FIGS. 93 and 94 show examples of user interfaces for presenting assigned interactive checklists in accordance with some embodiments of the disclosed subject matter.
Figure 94:
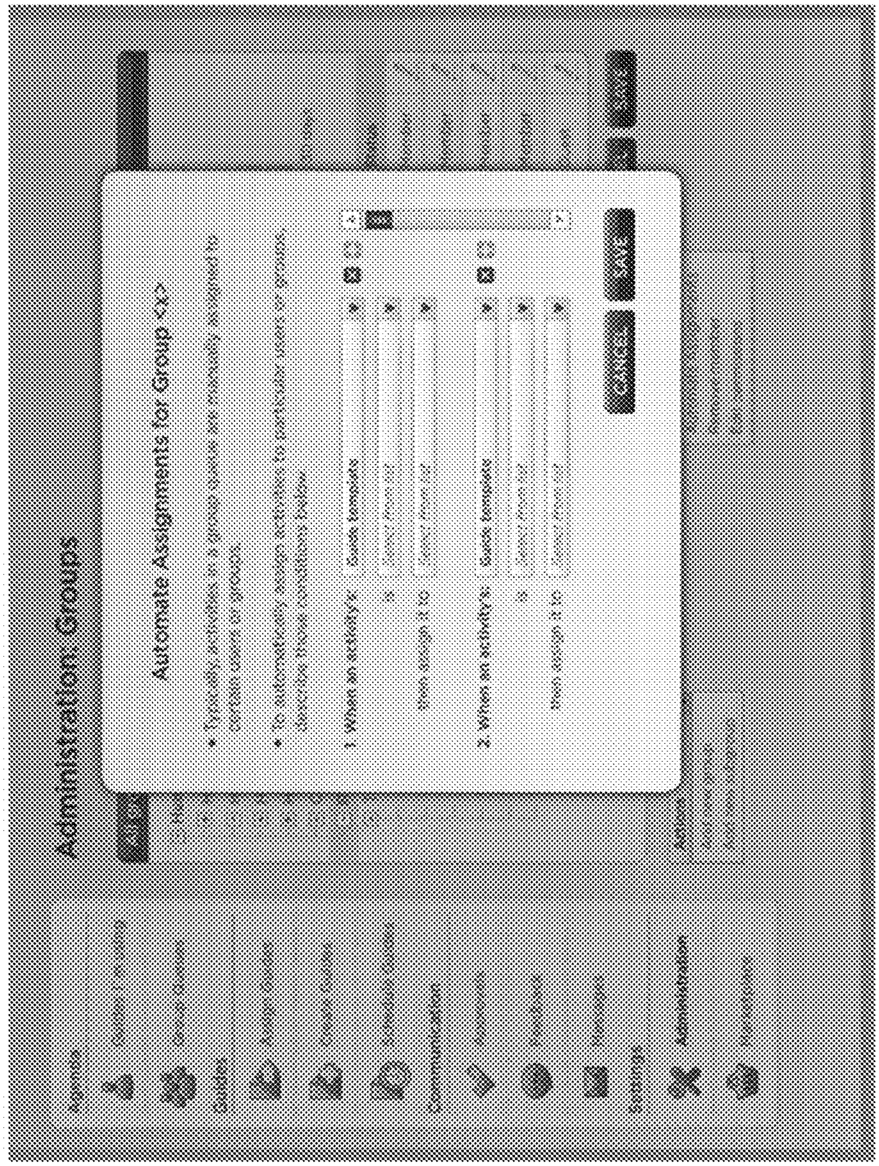

Interactive checklists can be assigned to an individual user or to a particular group as shown, for example, in interface 9300 of FIG. 93. A leader of a group can configure rules so that group assignments can be automatically assigned/reassigned to the correct user(s), subgroup(s) and/or unrelated group(s). As shown, for example, in FIG. 94, using an interface 9400 that may be presented by a hardware processor of a computing device, the hardware processor can present activities that can be reassigned based on the interactive checklist used, an activity's title, the user who is going to approve the activity, the activity's due date, the activity description, the activity assigner, time, seasonality, weekday, the workloads of potential assignment candidates, activity responses that were prefilled, for instance during creation (in full or in part), data from related sources, for example a parent activity, automation queries that may rely on information such as aforementioned elements, and/or any other information.

Figure 95:
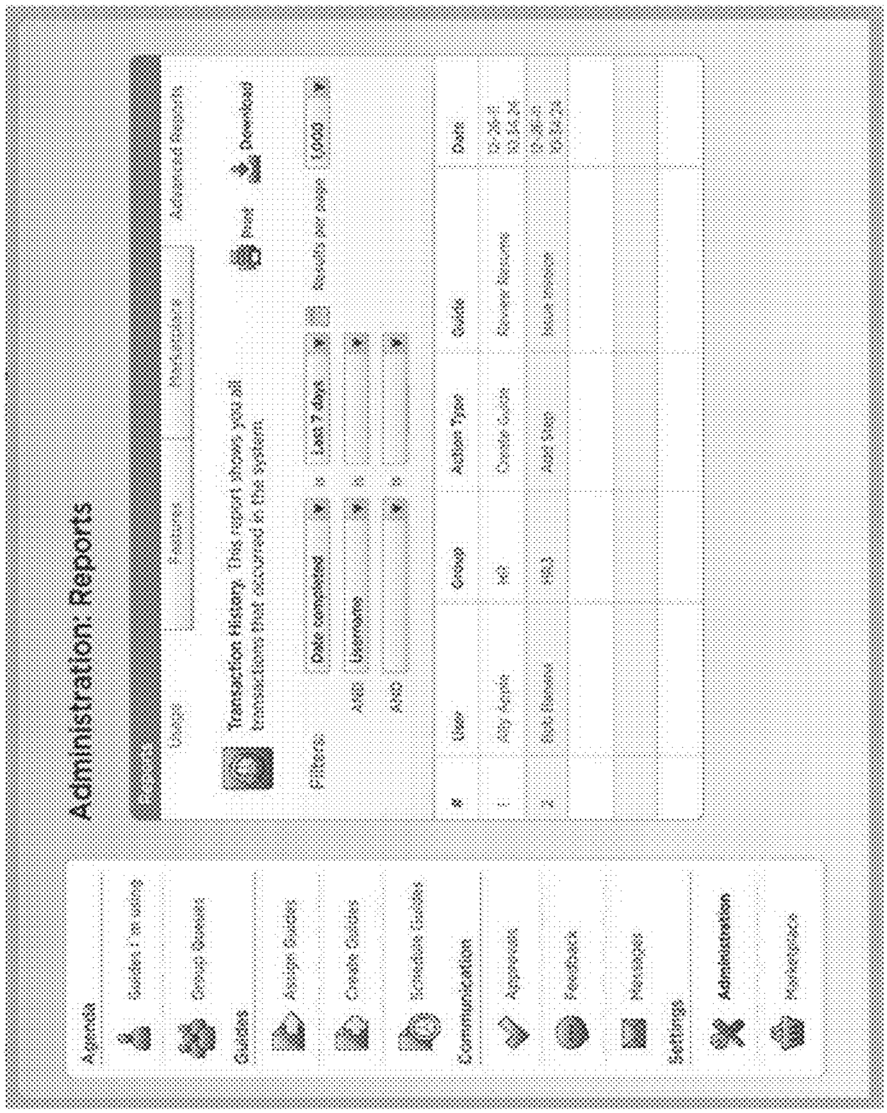
FIG. 95 shows an example of a user interface for presenting a transaction history in accordance with some embodiments of the disclosed subject matter.
Figure 96A:
FIG. 96A shows an example of a user interface for presenting an assignment history in accordance with some embodiments of the disclosed subject matter.

In accordance with some embodiments, the hardware processor can present a "Transaction History" report. The interactive checklist can keep an audit trail of form submissions made in the interactive checklist. As shown, for example, in FIG. 95, using an interface 9500 that may be presented by a hardware processor of a computing device, the hardware processor can present transaction information for a period of time which can filter a list by a variety of parameters. In some embodiments, using an interface 9600 that may be presented by a hardware processor of a computing device, the hardware processor can present an "Assignment History," as shown, for example, as interface 9600 of FIG. 96A, which can be a useful tool that can allow a user to navigate through assigned activities. The hardware processor can receive a user input to locate, browse, and view assigned activities, regardless of status (e.g., not yet completed, completed, approval pending, etc.). Additionally, the hardware processor can receive a user input to filter the list using a variety of parameters.

Figure 96B:
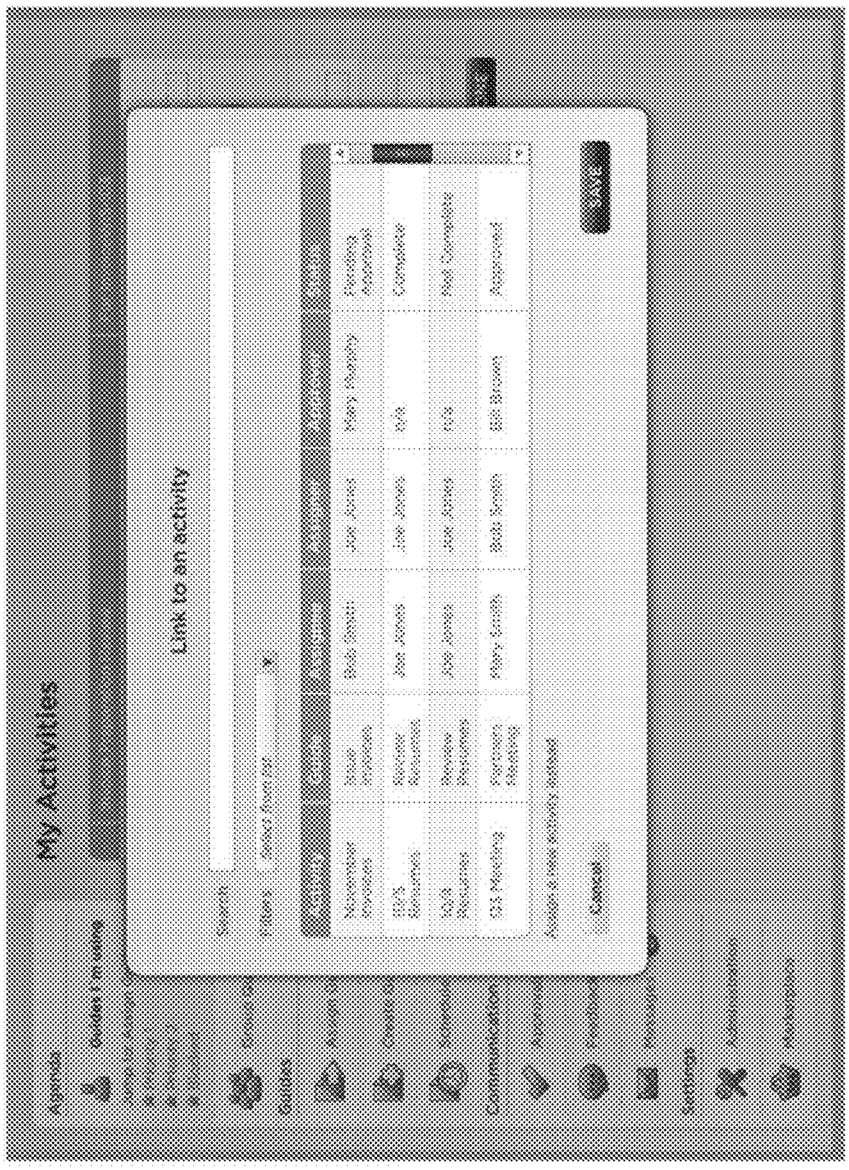
FIG. 96B shows an example of a user interfaces for linking an activity in accordance with some embodiments of the disclosed subject matter.

In some embodiments, the hardware processor can receive a user input to link one activity to another activity, as shown in interface 9602 of FIG. 96B. For example, the activities can be linked regardless of whether or not the activities have been completed or created. Linked activities indicate that the activities are related in some way. Additionally, linked activities can allow users to ensure that separated but related tasks are completed properly. For example, one step can be to ensure that a related activity was completed. In another example, another step can be to identify and assign certain activities associated with related guides. In some embodiments, linked activities can ensure that information needed for multiple activities can be easily accessible and transferred accurately. Additionally and/or alternatively, linked activities can enable an interactive checklist to automatically retrieve or set information in a related interactive checklist. In some embodiments, as shown in FIG. 96B, the hardware processor can present an "Assign a new activity instead" option that allows a user to create and assign an activity that can then be linked.

Figure 97:
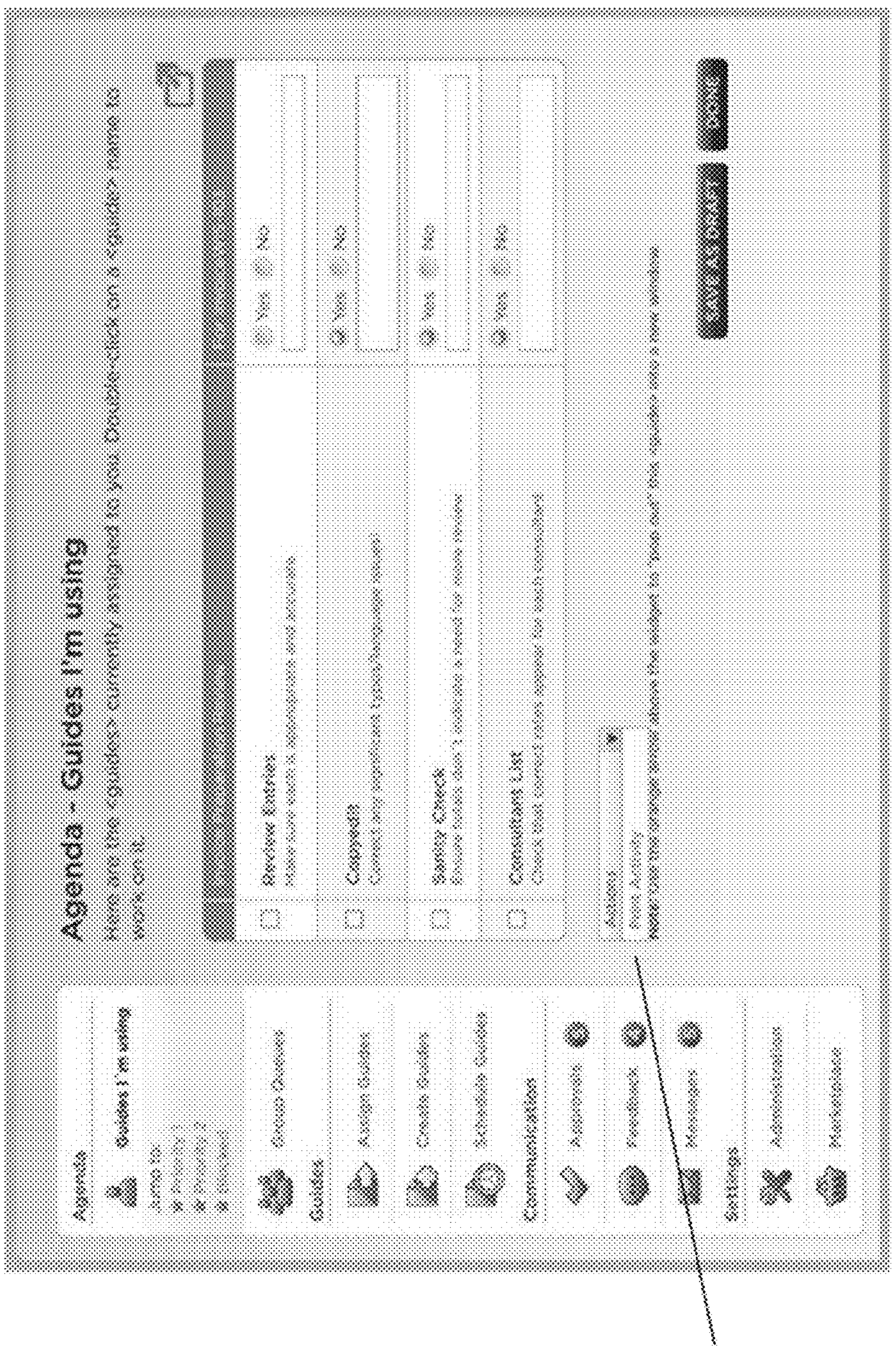
FIGS. 97, 98, 99, 100, 101, 102, 103, 104, and 105 show examples of user interfaces for printing an interactive checklist in accordance with some embodiments of the disclosed subject matter.
Figure 98:
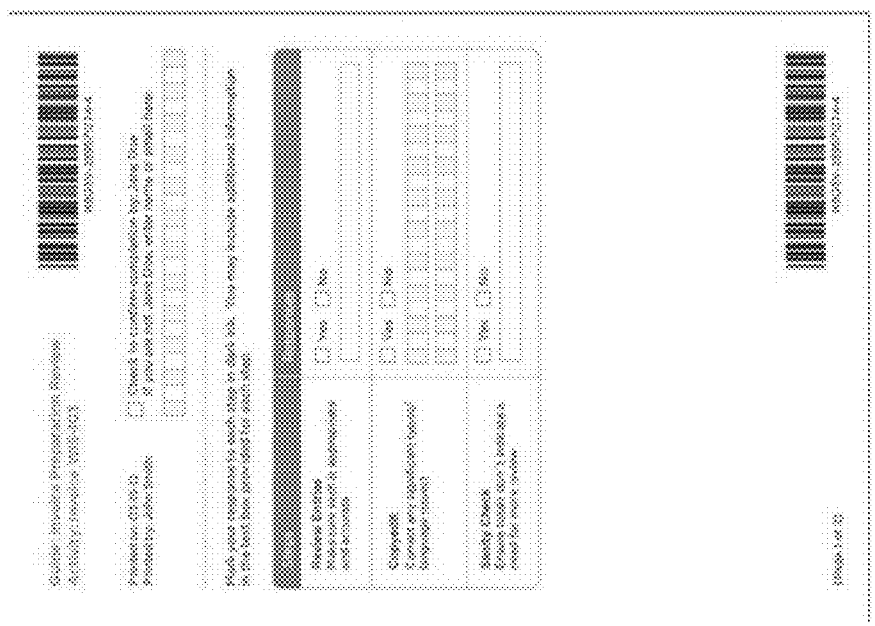
Figure 99:
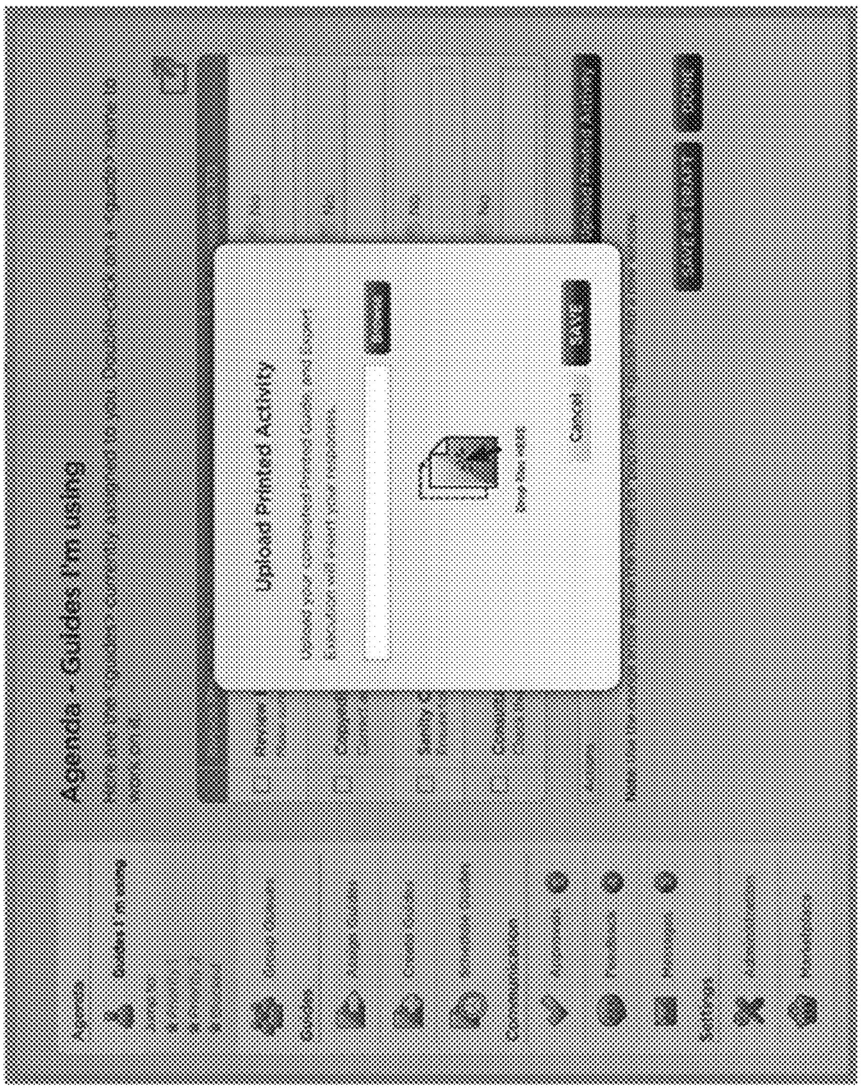

In accordance with some embodiments, when working on a particular activity, using an interface 9700 that may be presented by a hardware processor of a computing device, the hardware processor can receive a user input, via drop-down menu 9702, to print an activity as shown, for example, as shown in FIG. 97. The particular activity can be printed at any point in time. As shown, for example, in interface 9800 of FIG. 98, a printout can include activity information (e.g., activity name, interactive checklist name, print information, etc.), an identifying barcode or QR code, the interactive checklist itself (all steps and response fields), and/or any other activity information. In some embodiments, the hardware processor can display or omit to display, steps that are not currently visible based on criteria such as "When to Show" details with a visual indicator of any steps that are not initially visible. When the printout is completed, the printout can be scanned and the interactive checklist can fill in the appropriate responses in the digital copy of the activity. This upload capability, as shown, for example, in interface 9900 of FIG. 99, can be accessed from a number of points. In some embodiments, because of the unique barcodes, the user can upload multiple activities to the hardware processor at once and the interactive checklist can match up activities.

Figure 100:
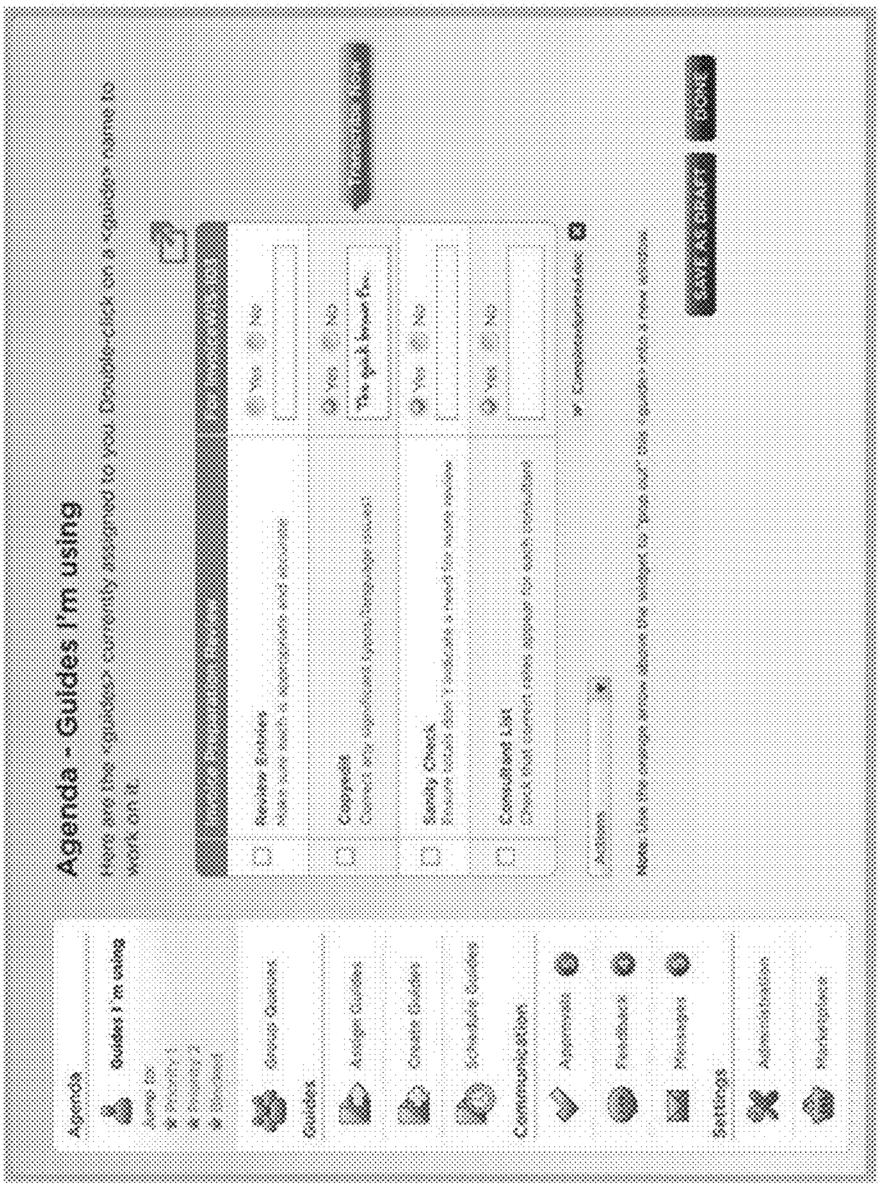
Figure 101:
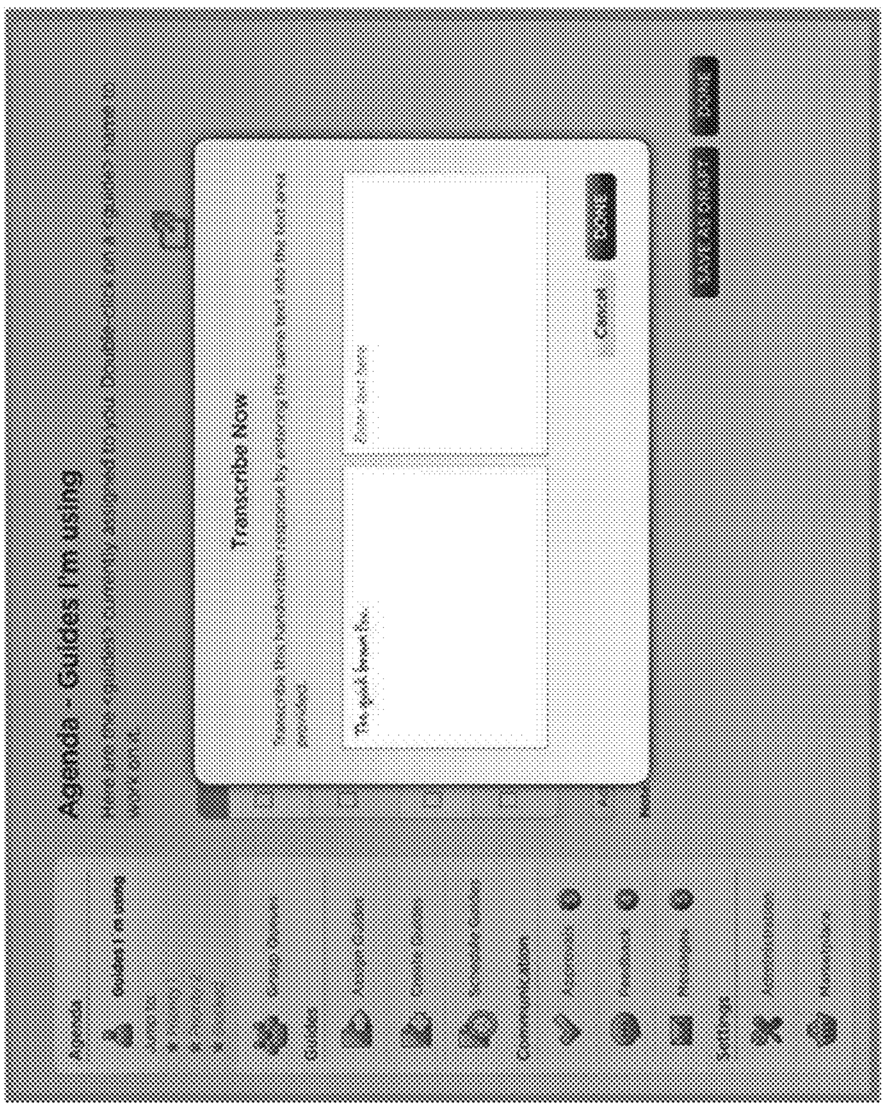

In accordance with some embodiments, an interactive checklist can complete fields in a digital copy of the activity. When possible, the hardware processor can use optical character recognition (OCR) technology to read handwritten text. If the text cannot be accurately determined, however, an image of the text can be used instead. Then, the user can transcribe it themself as shown, for example, in interface 10000 of FIG. 100, or can opt for a transcription service, a colleague, and/or group to do it instead. If the user opts to transcribe text themself, the hardware processor can receive the transcription using a simple entry box or rich text entry, as shown, for example, in interface 10100 of FIG. 101. This text can then replace the image of the text.

Figure 102:
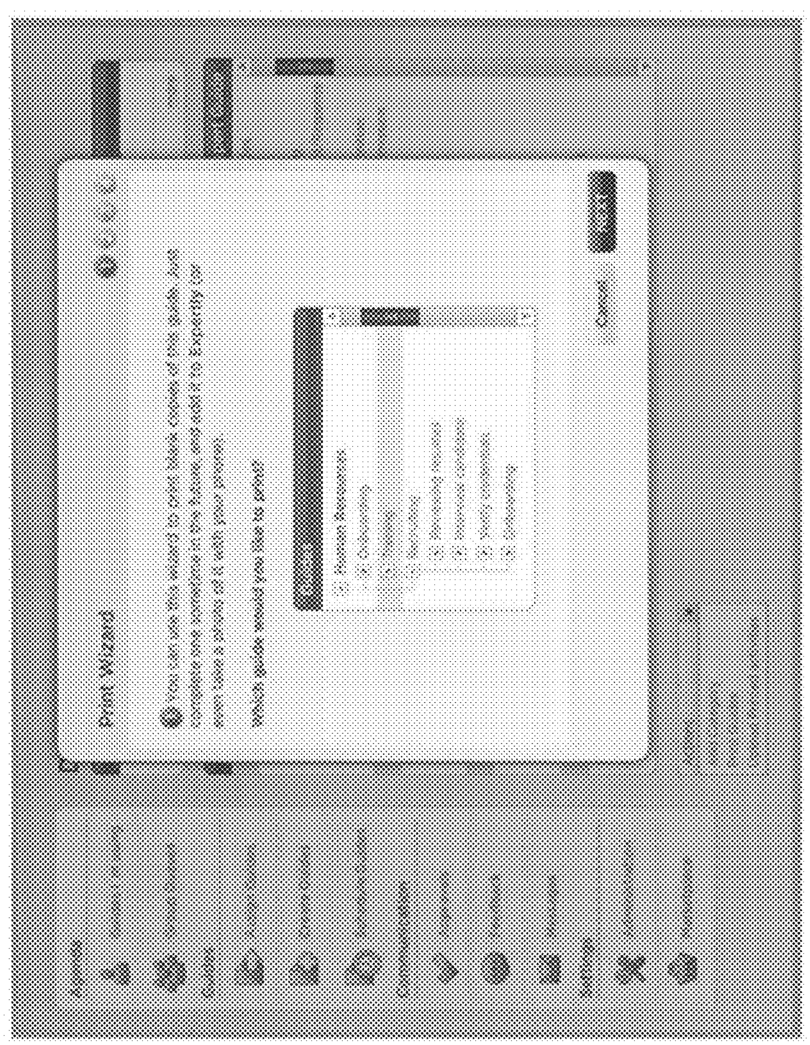
Figure 103:
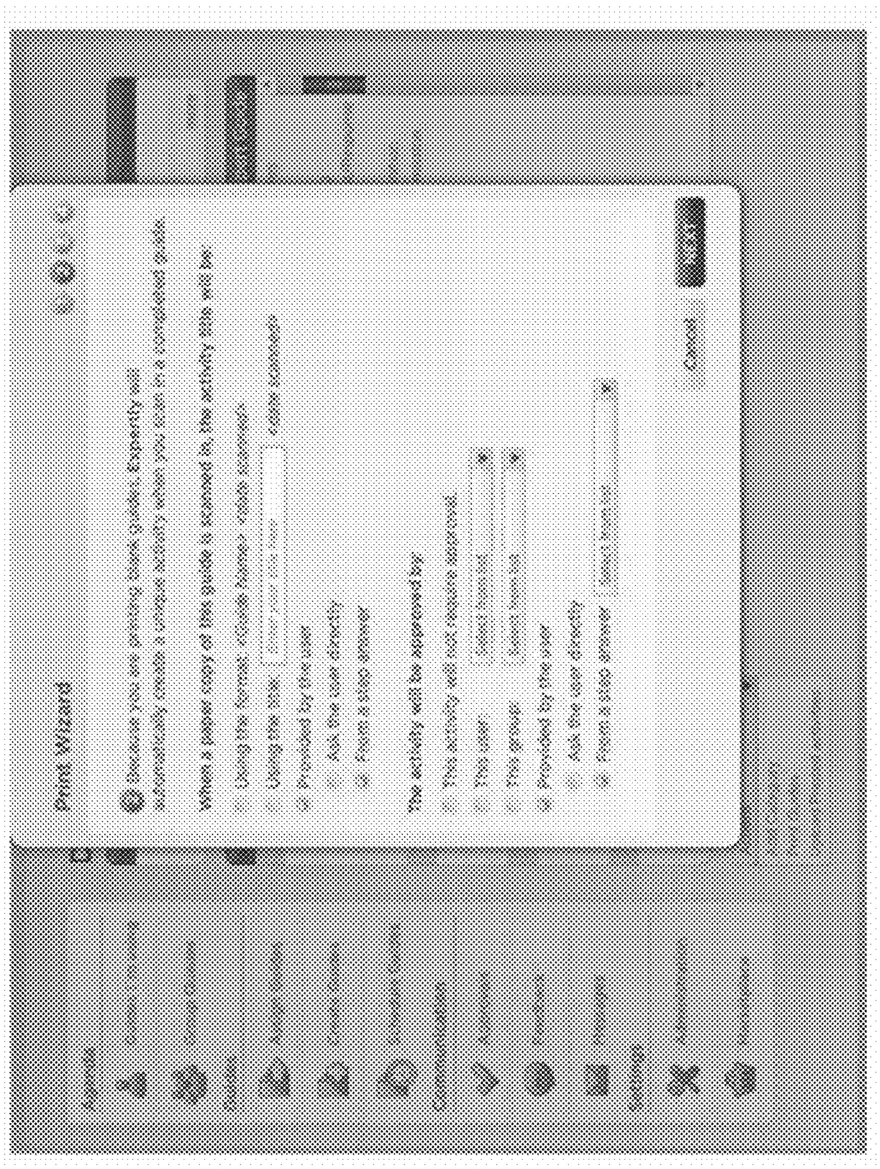
Figure 104:
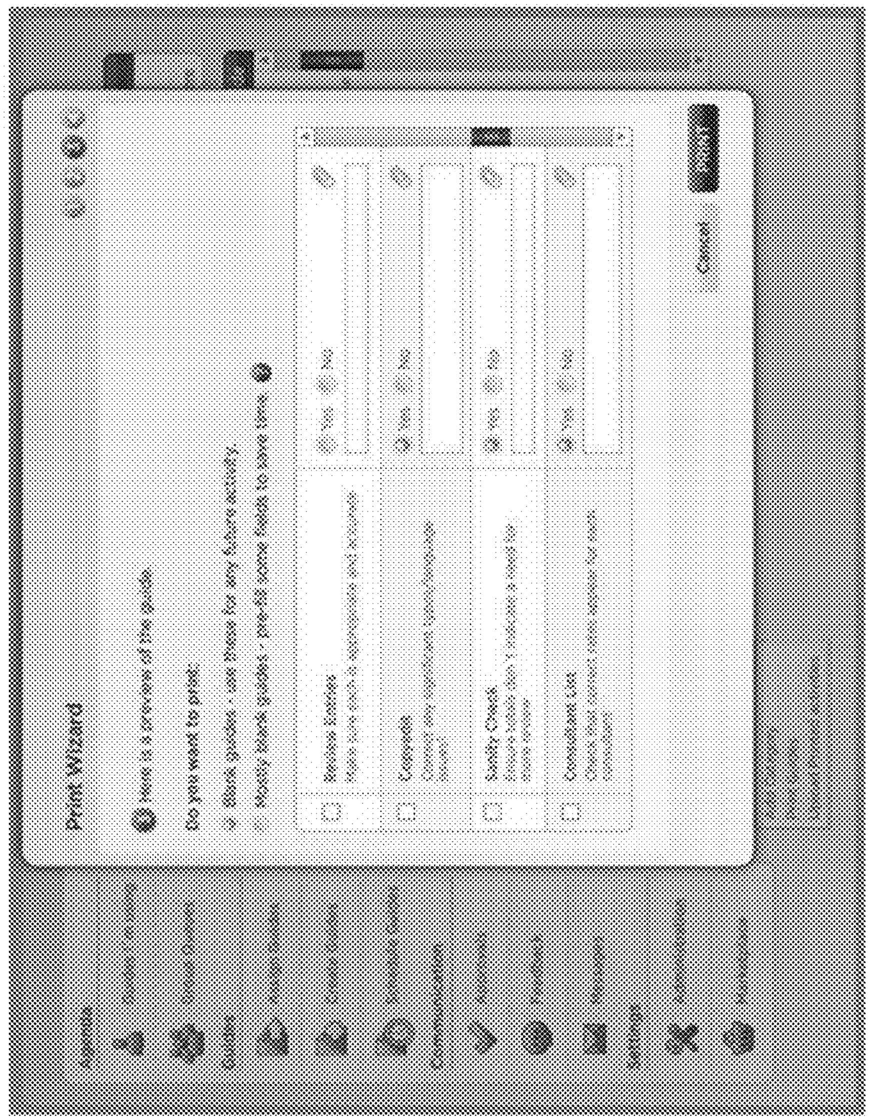
Figure 105:
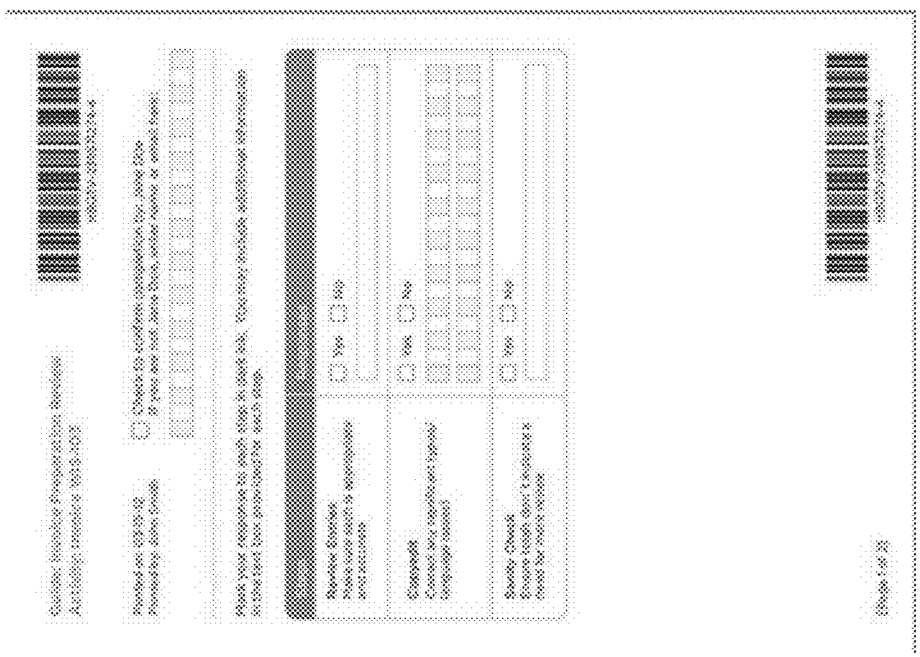

In addition to printing a specifically assigned activity, in some embodiments, blank copies of an interactive checklist can be printed. These interactive checklists can be used at a point in the future. The user can grab a blank printout, fill it out, then upload it to the interactive checklist and the interactive checklist automatically can assign and complete it as a new activity. This process can be facilitated by a print wizard displayed by a hardware processor as shown, for example, in interface 10200 of FIG. 102. The hardware processor can display a "Print Wizard" to prompt the user to complete a few information fields so that a new activity can be accurately created when a blank interactive checklist is uploaded. As shown, for example, in interface 10300 of FIG. 103, requested fields can include a way to name the activity and approval information for the activity. The user can even pre-fill some fields to save time as shown, for example, in interface 10400 of FIG. 104. Any desired number of copies of the interactive checklist can be printed as shown, for example, in interface 10500 of FIG. 105. The hardware processor can present varying information fields at the top of the page, before the steps of the interactive checklist, depending on the print selections the user made in the print wizard and received by the hardware processor. For example, if the user fills out a "weekly progress report" interactive checklist for an in Acme Widgets project every week for the next quarter, the user can pre-fill the Client field to specify "Acme Inc.," a Project field to say "Widgets Project," and a "Is this a high-risk project" field to indicate "Yes".

Figure 122:
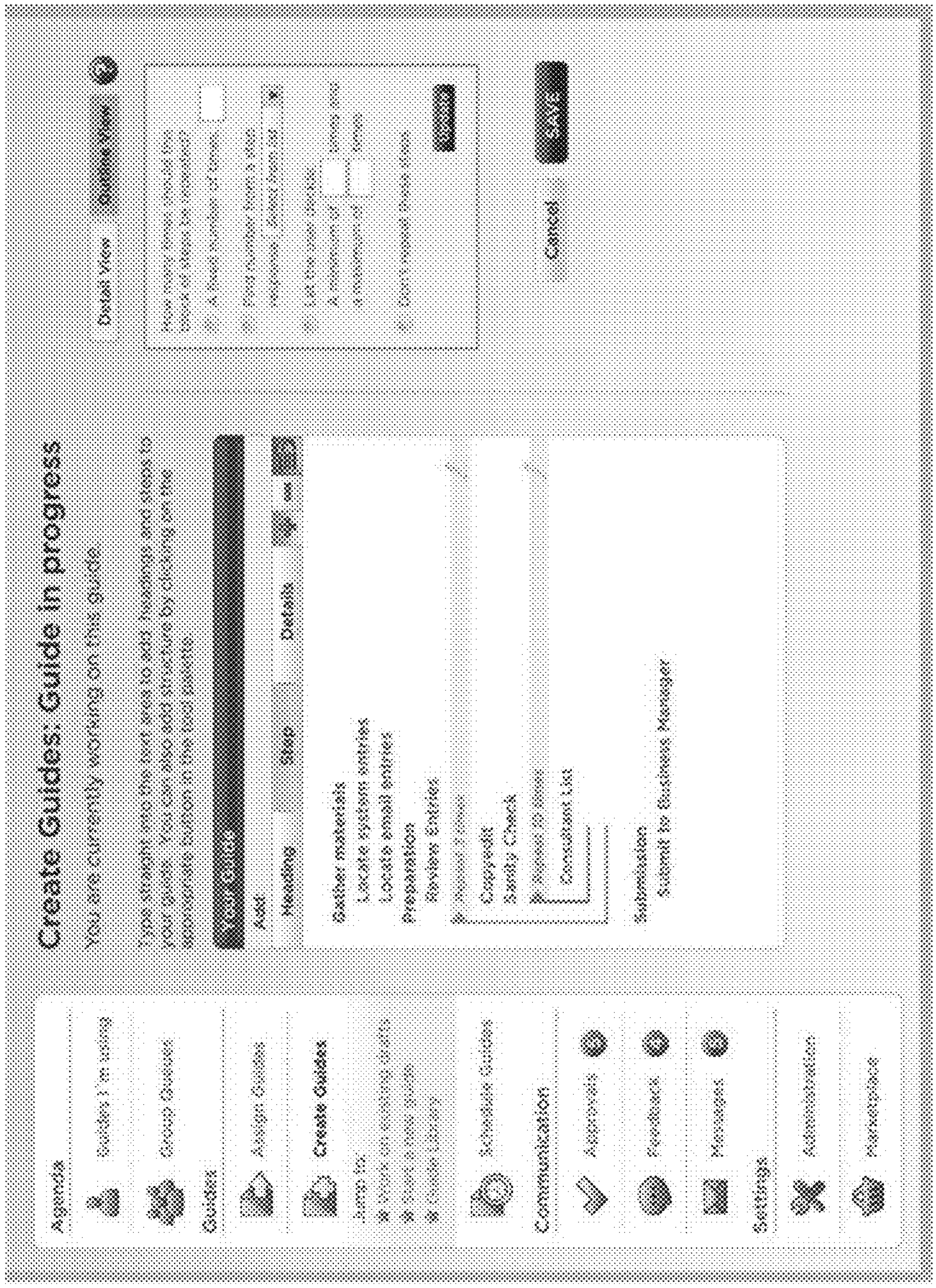
FIGS. 122, 123, and 124 show examples of user interfaces for repeating steps in accordance with some embodiments of the disclosed subject matter.
Figure 123:
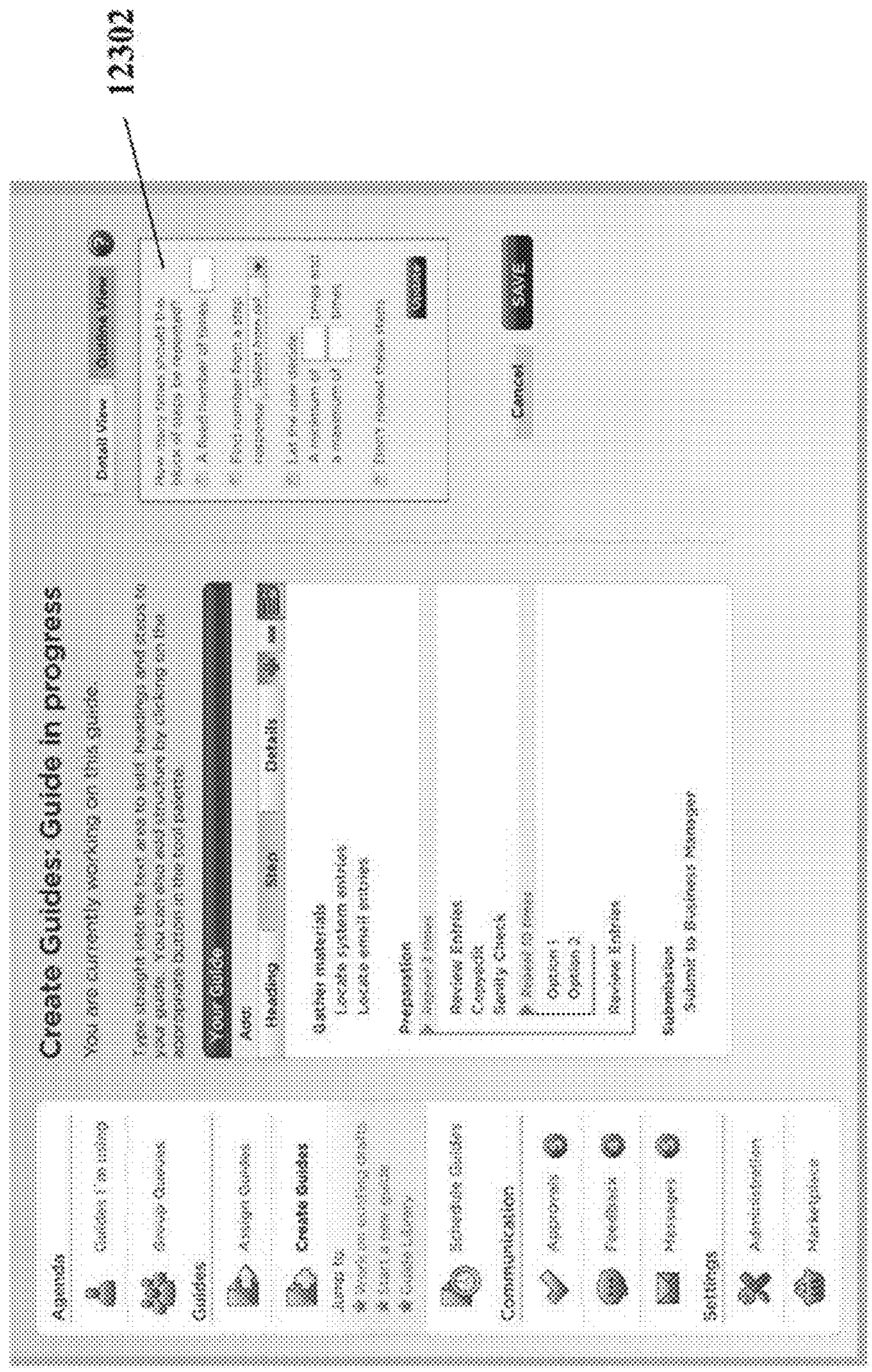
Figure 124:
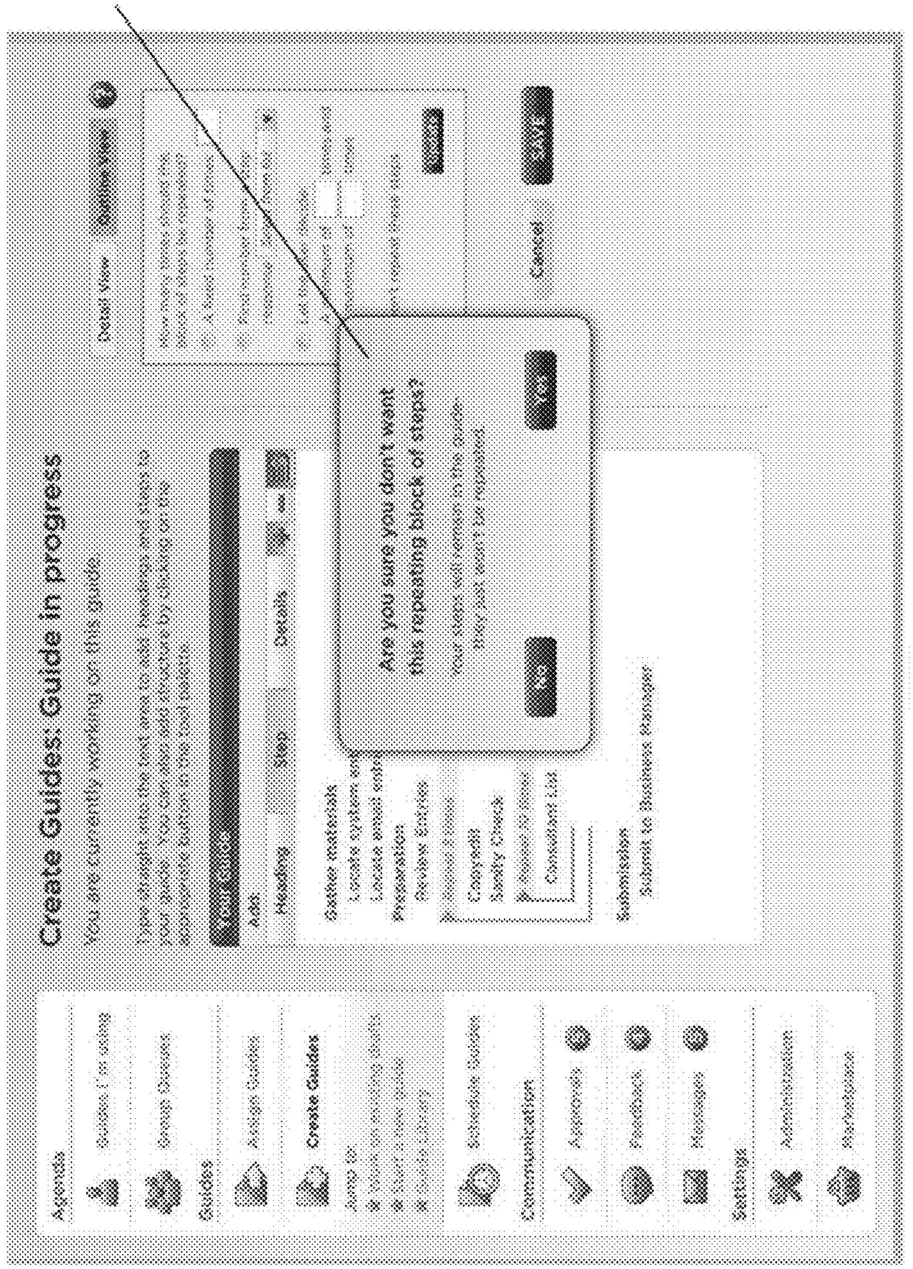

In accordance with some embodiments, a user may want another user to repeat a particular step or block of steps a number of times. The hardware processor can receive a user input indicating that the user may want another user to repeat a particular step or block of steps a number of times. Upon receiving such an indication, the hardware processor can display a "Repeat Steps" feature shown, for example, in interface 12200 of FIG. 122. When the user chooses this feature, the hardware processor can display the steps in the interactive checklist and the hardware processor can receive a user input to select the step(s) that should be repeated. Additionally, the hardware processor can receive a user input indicating how many times the steps are to be repeated as shown, for example, in block 12302 of interface 12300 of FIG. 123. This can be indicated in a number of ways, such as a fixed number, or indicated by the answer to a previous step, for example. In some embodiments, the hardware processor can display a popup window 12402 in interface 12400 of FIG. 124 to allow the user to change how the number of repeats is determined or to not to have these steps repeat at all. The user can also have multiple blocks of nested repeating steps in the same interactive checklist in some embodiments. In accordance with some embodiments, a user can assign "When to Show" conditions and/or Protections to a block of steps.

Figure 125:
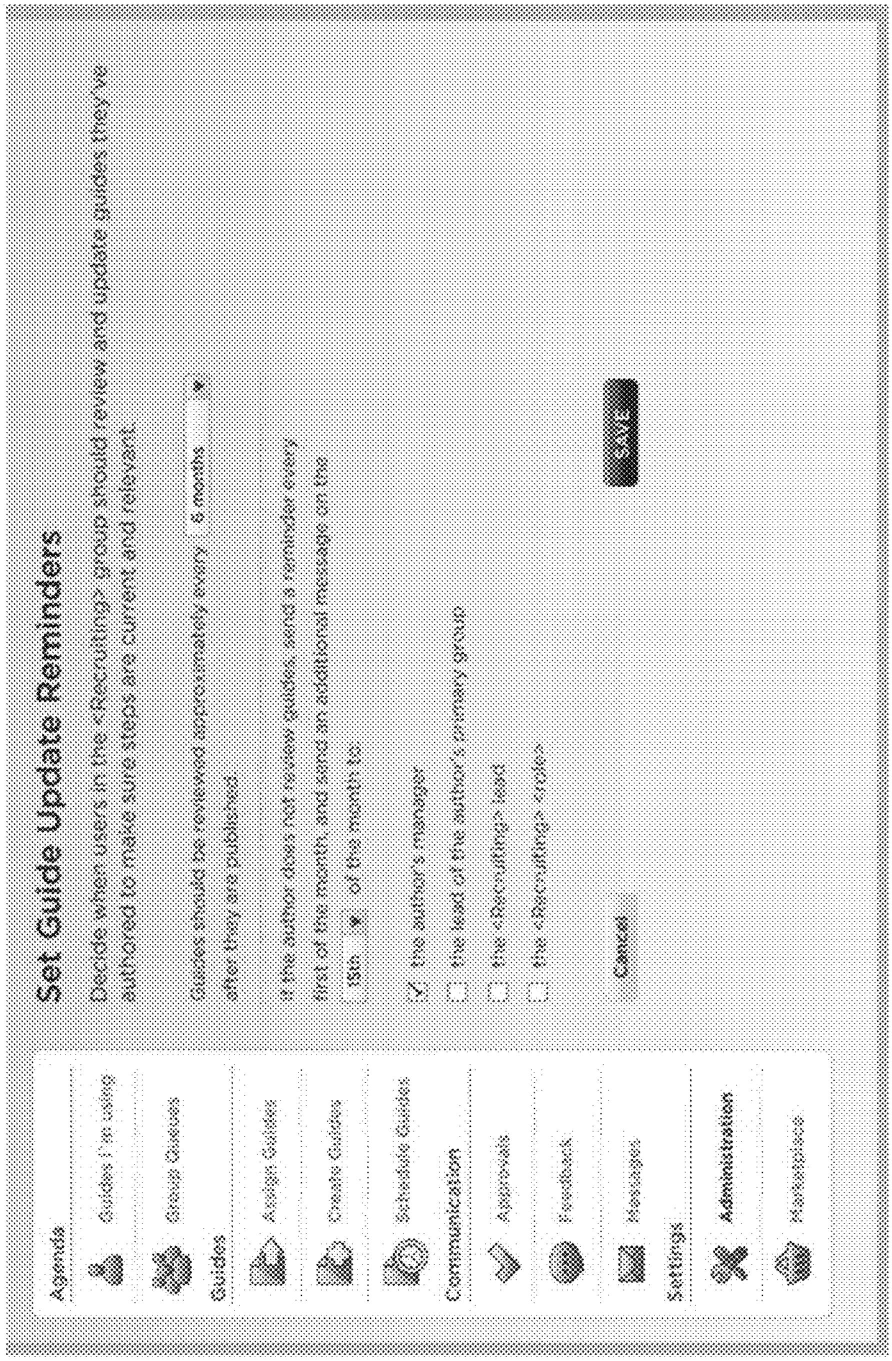
FIG. 125 shows an example of a user interface for presenting an update reminder in accordance with some embodiments of the disclosed subject matter.

In accordance with some embodiments, a hardware processor of a computing device can receive a reminder schedule to alert a user when a particular interactive checklist may require review. This feature can allow a user to automatically receive alerts notifying them self that it is time to review the interactive checklist and potentially update it so that it remains relevant and useful. Updates can be configured at multiple levels, such as across the organization, or for specific groups. An example of an interface with these features can be as shown, for example, in interface 12500 of FIG. 125.

Figure 126:
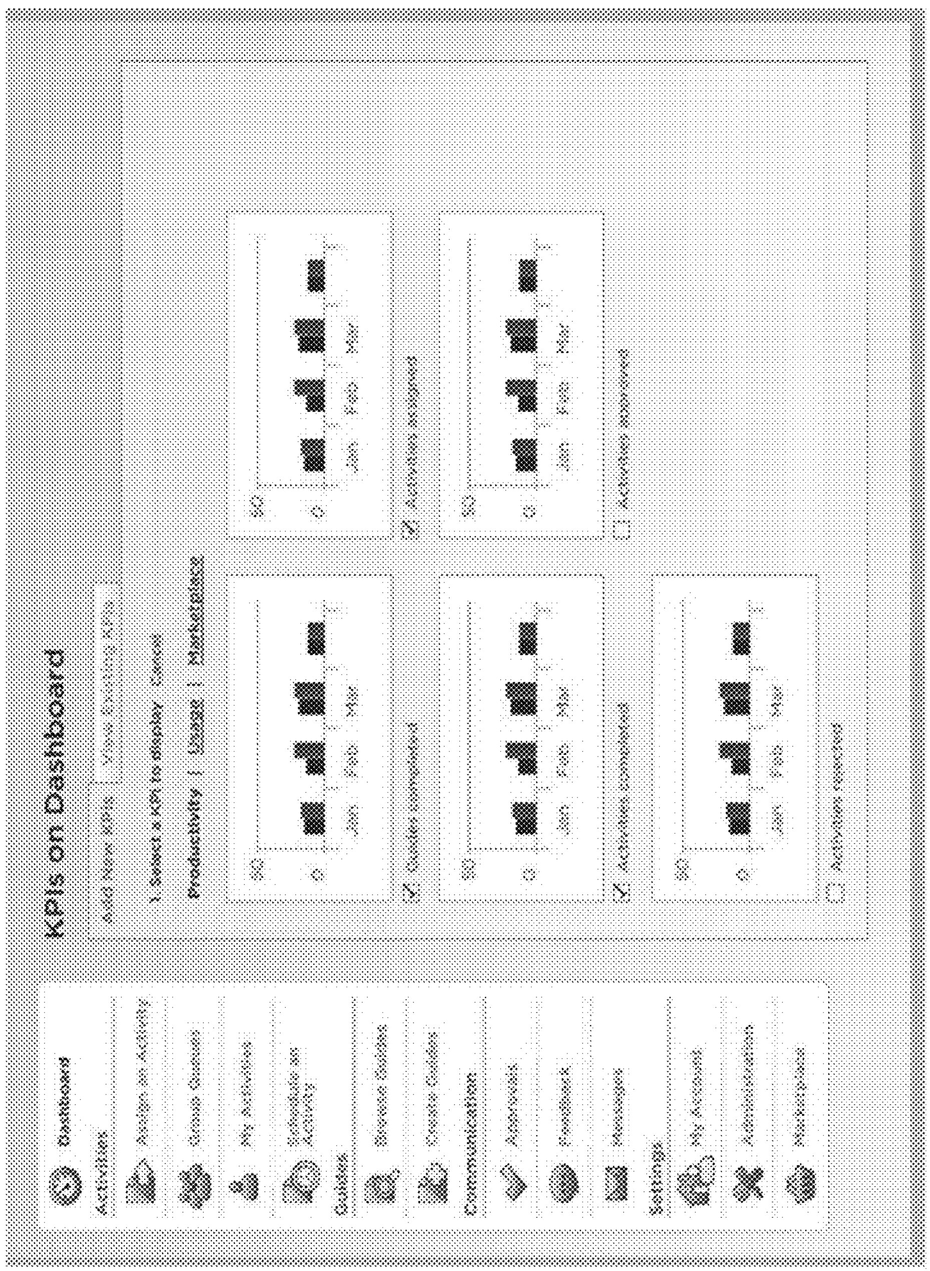
FIGS. 126, 127, 128, 129, and 130 show examples of user interfaces for configuring key performance indicators in accordance with some embodiments of the disclosed subject matter.

In accordance with some embodiments, as shown, for example, in FIG. 126, using an interface 12600 that may be presented by a hardware processor of a computing device, the hardware processor can present dashboard widgets to allow the user to configure key performance indicators (KPIs) and other metrics for display on a dashboard and the dashboards of other users. A user can also configure alert levels to correspond with the changes in these metrics. Alert levels can be set for different circumstances (e.g., for the user, for groups, for an organization, and/or any other circumstance) to trigger a variety of interactive checklist actions. Individual interactive checklist reports can be turned into KPI displays with one click or the user can customize a KPI display. Flow to add a new KPI to the dashboard can begin with selection of a pre-configured KPI provided by the interactive checklist in some embodiments.

Figure 127:
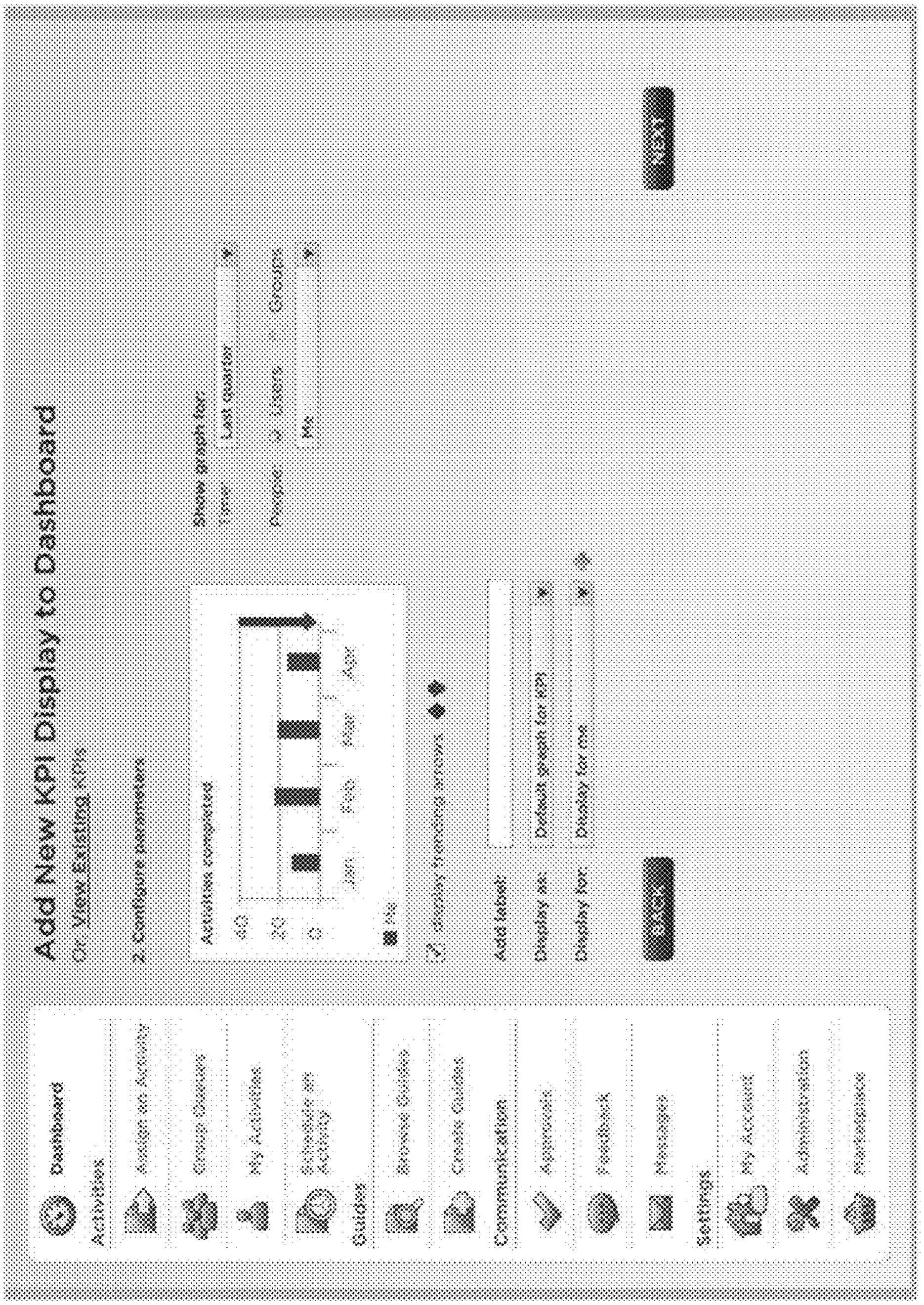
Figure 128:
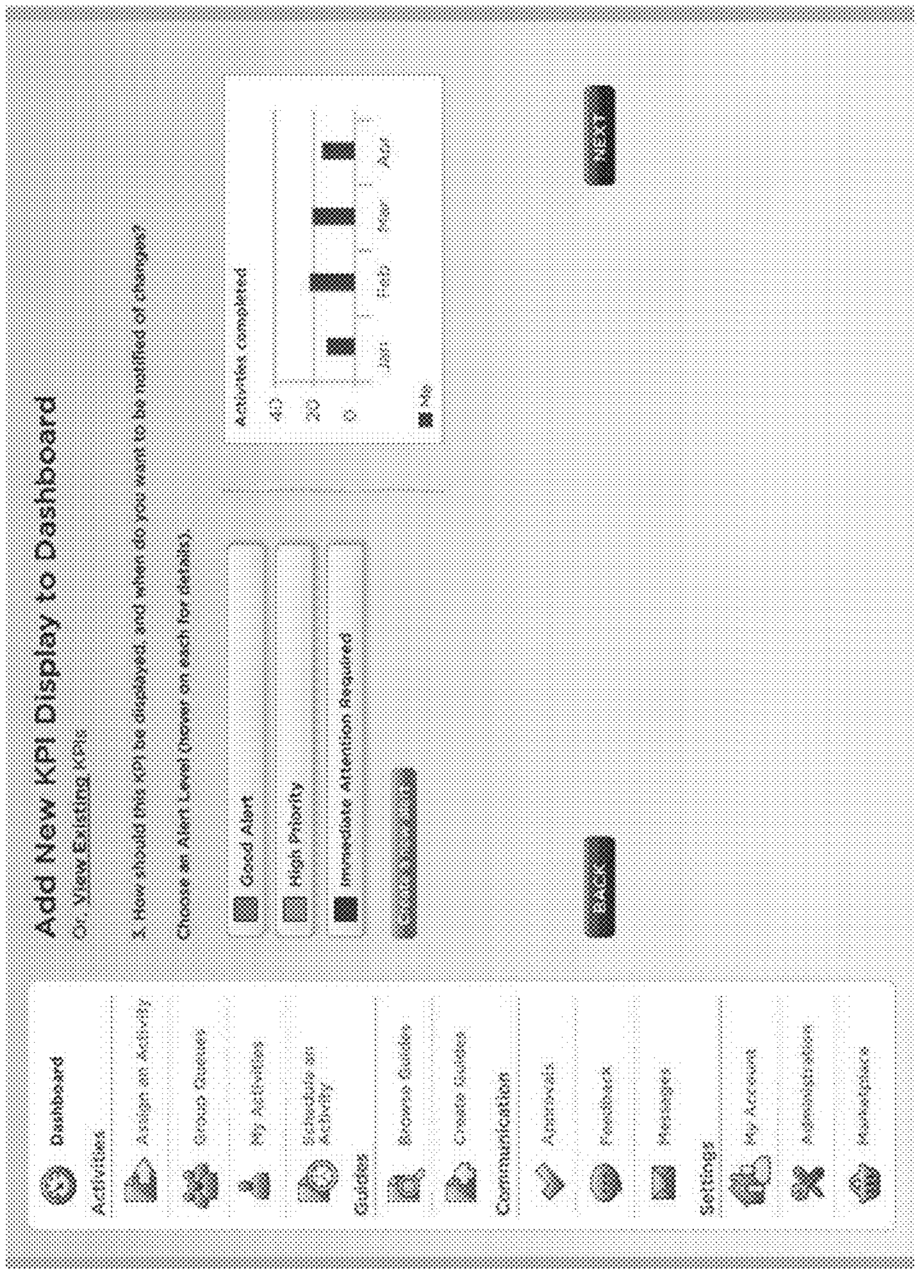

In some embodiments, using an interface 12700 that may be presented by a hardware processor of a computing device, the hardware processor can receive a user input to configure a variety of parameters to customize the KPI to their needs as shown, for example, in FIG. 127 in accordance with some embodiments of the invention. Custom options can include, but are not limited to, the ability to specify a period of time, particular user(s) and/or groups, what type of visual display to utilize, and/or for which users or groups the KPI can appear. The user can decide what alert or alerts should be associated with the KPI display. The hardware processor can receive a variety of alert levels previously created by the organization, a group, and/or themselves. Examples of different alert level options can be as shown, for example, in interface 12800 of FIG. 128.

Figure 129:
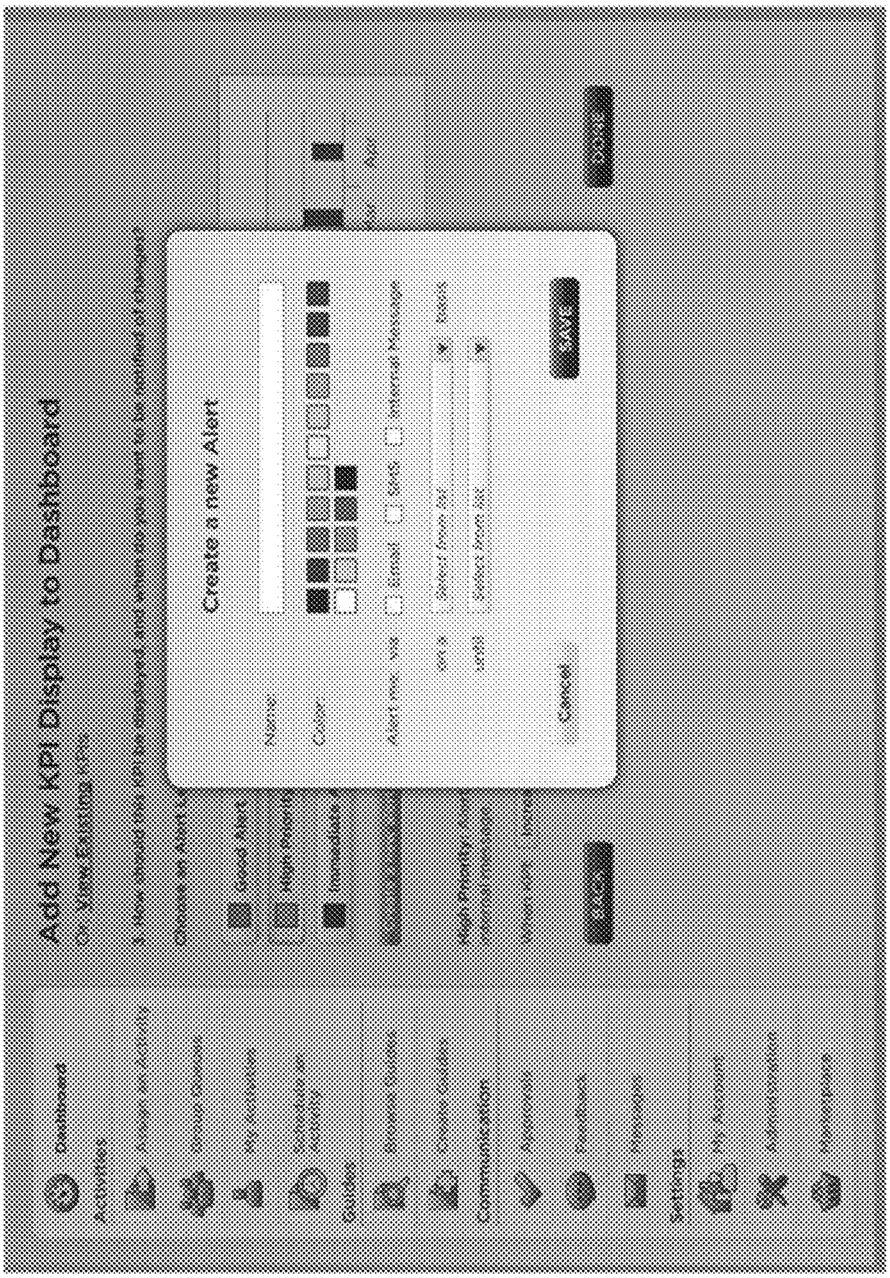
Figure 130:
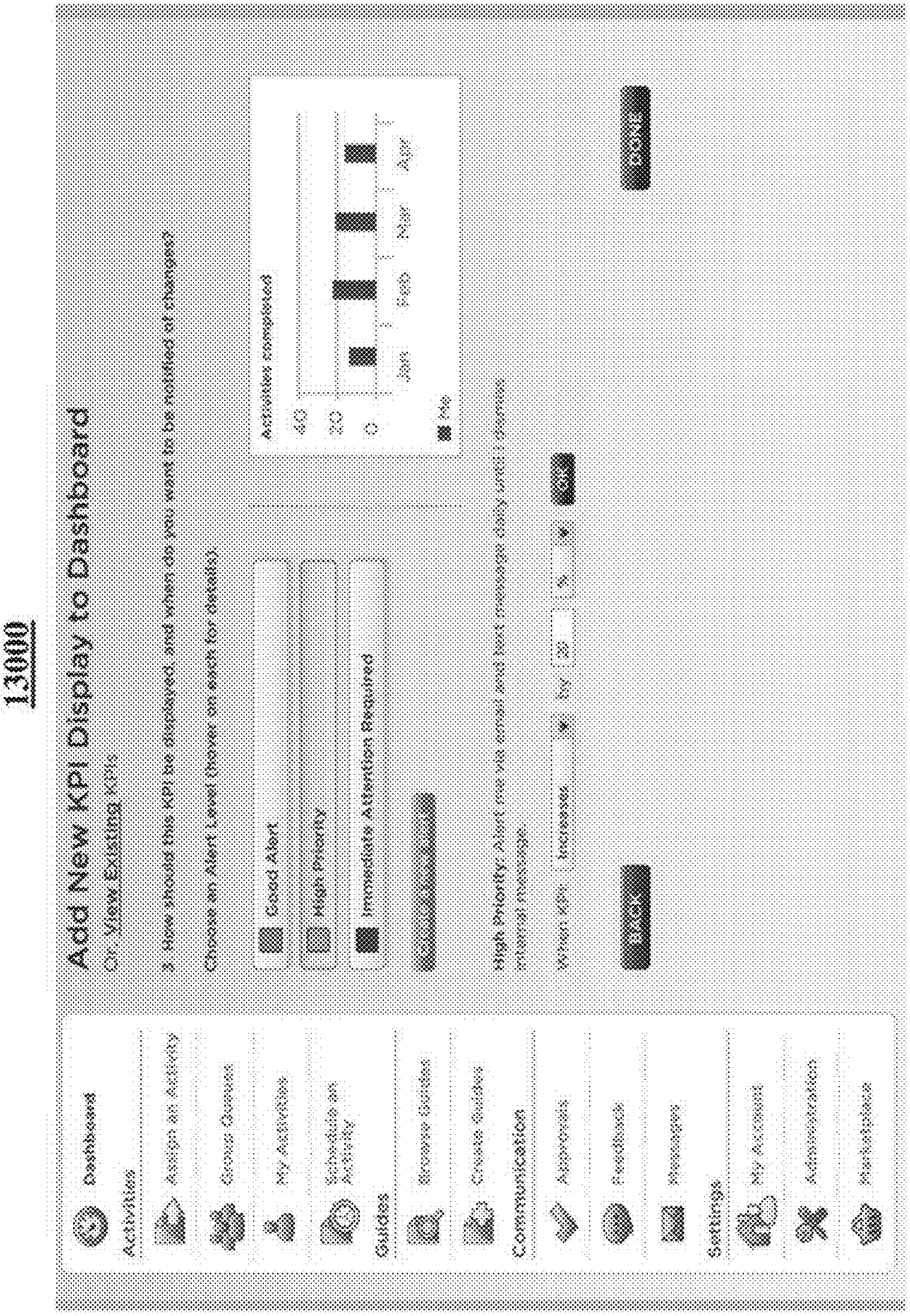

Alternatively, in accordance with some embodiments, the hardware processor can receive a user input to configure a new alert, which can then be used for a given KPI. Alerts can include a common set of features, such as the method(s) and frequency of contact with the user as shown, for example, in interface 12900 of FIG. 129. Once the hardware processor receives an alert level selection, the hardware processor can receive a user input to configure a trigger that can cause the alert to go into effect as shown, for example, in interface 13000 in FIG. 130.

Figure 131:
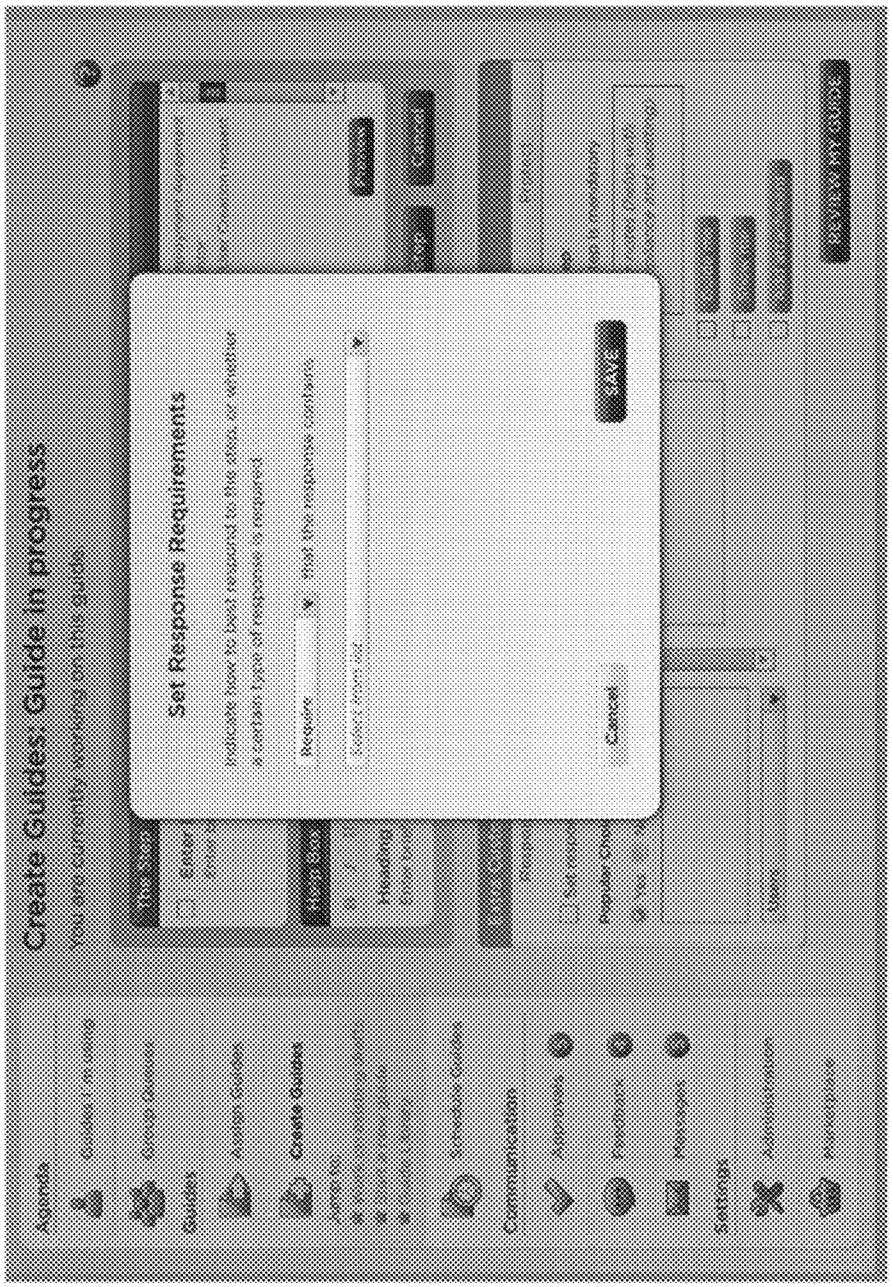
FIGS. 131 and 132 show examples of user interfaces for configuring a response requirement in accordance with some embodiments of the disclosed subject matter.
Figure 132:
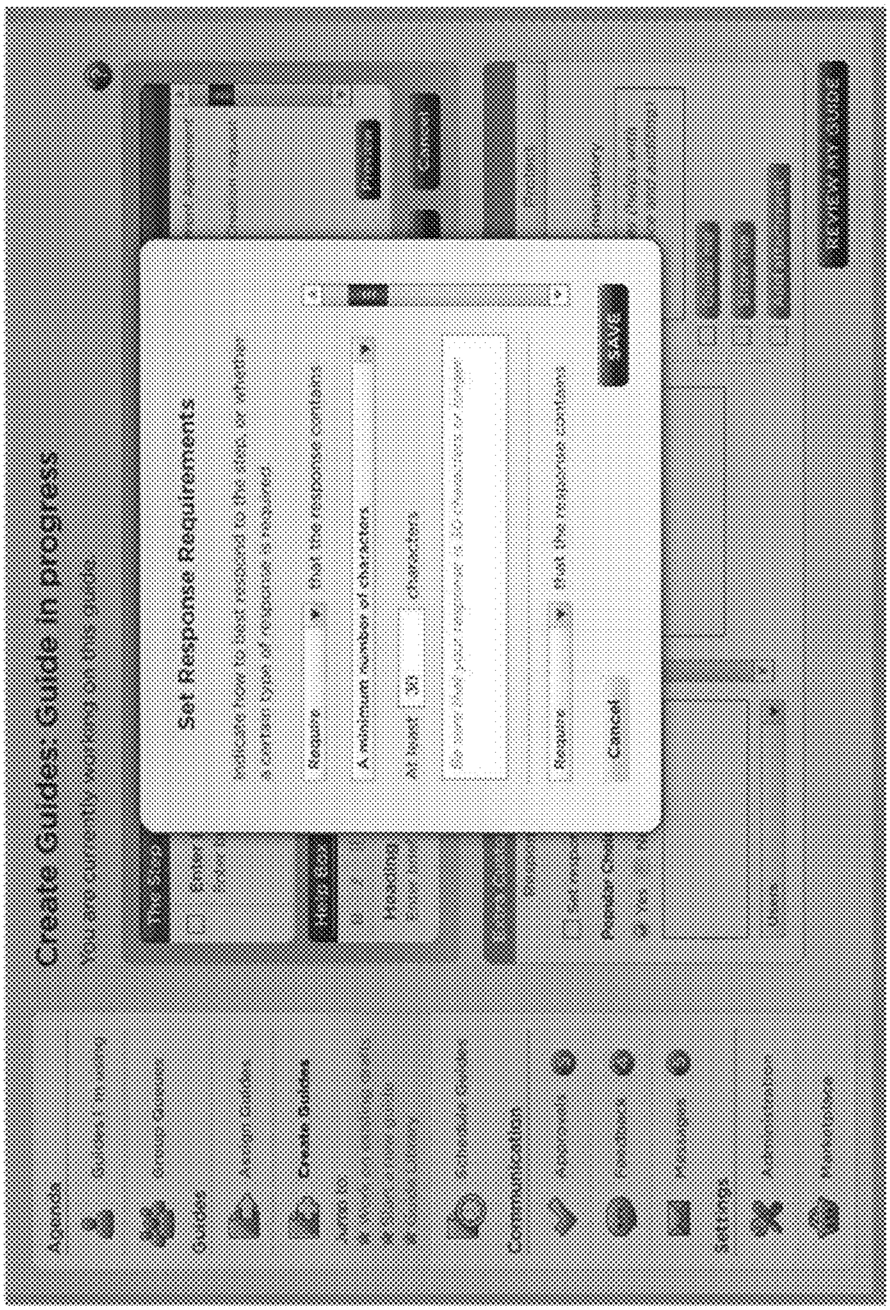

In accordance with some embodiments, as shown, for example, in interface 13100 of FIG. 131, the hardware processor can receive a user input to specify if a certain type of response is required for a step, such as having to include a valid email address or phone number, be of a certain length, and/or any other type of response. Once the hardware processor receives a requirement, the hardware processor can receive a user input to add explanatory details as shown, for example, in interface 13200 of FIG. 132. When the interactive checklist is later used, an assignee can view the explanation, and can receive warning if their responses do not validate against the user's stated requirements for the step.

In some embodiments, using interfaces 10602-12104 that may be presented by a hardware processor of a mobile device, the hardware processor can execute a mobile application. A mobile application (app) can service existing users and can optionally be free to users of the interactive checklist mechanisms in accordance with some embodiments of the invention. The mobile app can be available for a variety of mobile and tablet platforms. In some embodiments, the mobile application can cache certain data. In such an instance, the mobile application can be available for offline use and upon reconnecting to the Internet any updates can be synced. Turning back to FIG. 106A, the hardware processor can receive login information from a user. Upon receiving the login information, the hardware processor can present a dashboard, where the user can view messages, approval notifications, their personal list of activities, and/or a list of activities for their groups as shown, for example, in interface 10602 of FIG. 106A. Primary navigation can be received by the hardware processor through four icons (or any other suitable number) at the bottom of a screen noted as 10604 in interface 10602 of FIG. 106B. For example, the icons can be a star (symbolizing, for example, the Dashboard), a plus sign (which can allow for addition of something new, to create a User Guide, assign an Activity, or schedule an Activity for example), a camera, (which can take or choose photos and video for example), and an ellipses (which include other functions, such as settings and help for example). Pop-up window 1604 of interface 10606 of FIG. 106B shows examples of functions available via the plus sign.

Figure 106A:
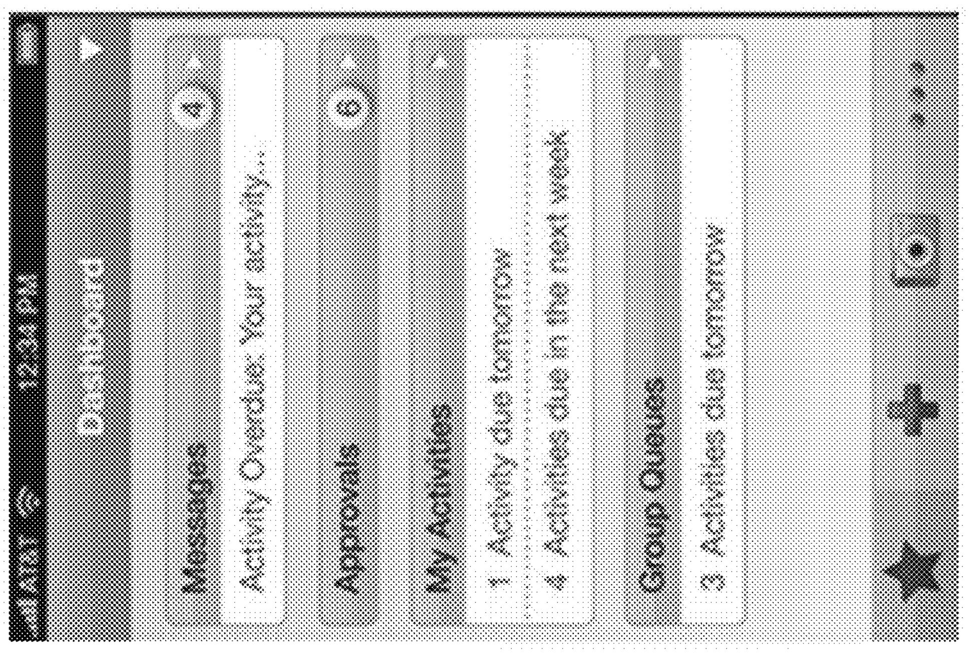
FIGS. 106A and 106B show examples of user interfaces displayed on a mobile device for presenting a dashboard in accordance with some embodiments of the disclosed subject matter.
Figure 106B:
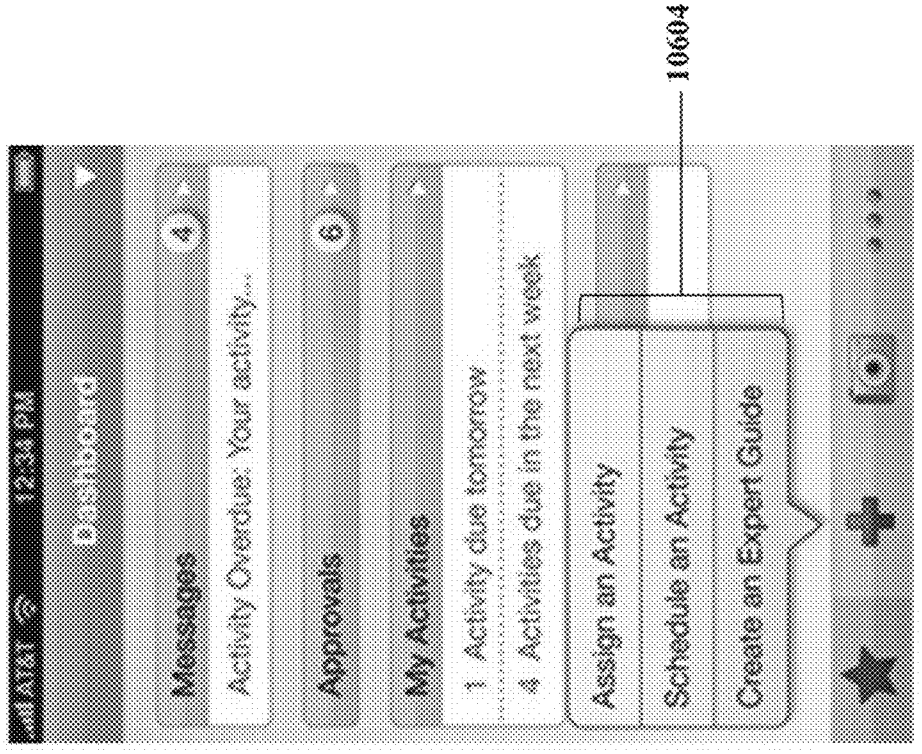

Also, shown, for example, in interfaces 10602 and 10604 of FIG. 106A and FIG. 106B, in some embodiments, the hardware processor can display recent activities by receiving a user input at a quick tool in the upper-right corner of the screen (in the header for example). Header text can help the user orient themselves. A back button can also be available in the upper left corner (in the header).

Figure 107A:
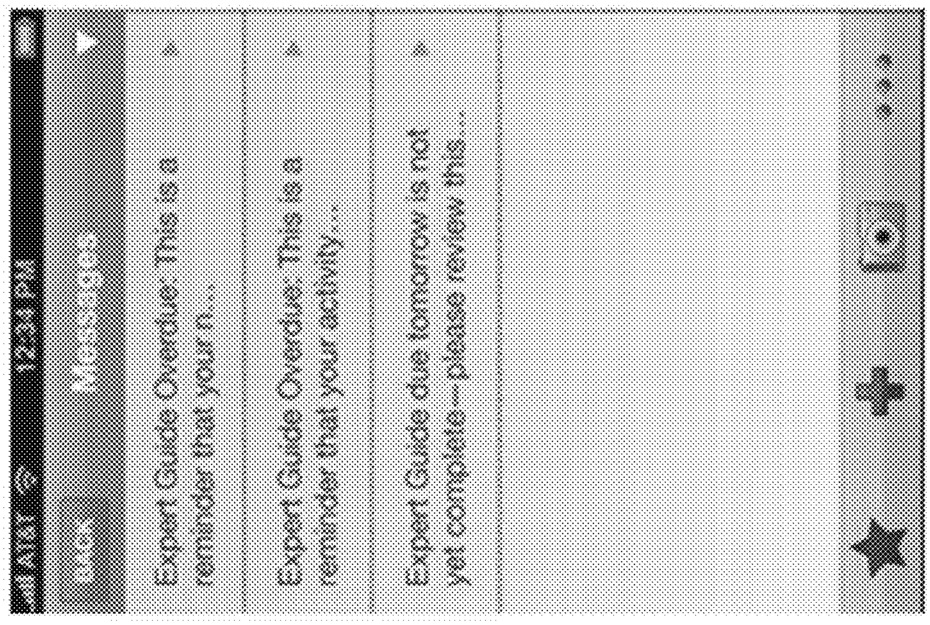
FIGS. 107A, 107B, and 108 show examples of user interfaces displayed on a mobile device for presenting messages in accordance with some embodiments of the disclosed subject matter.
Figure 107B:
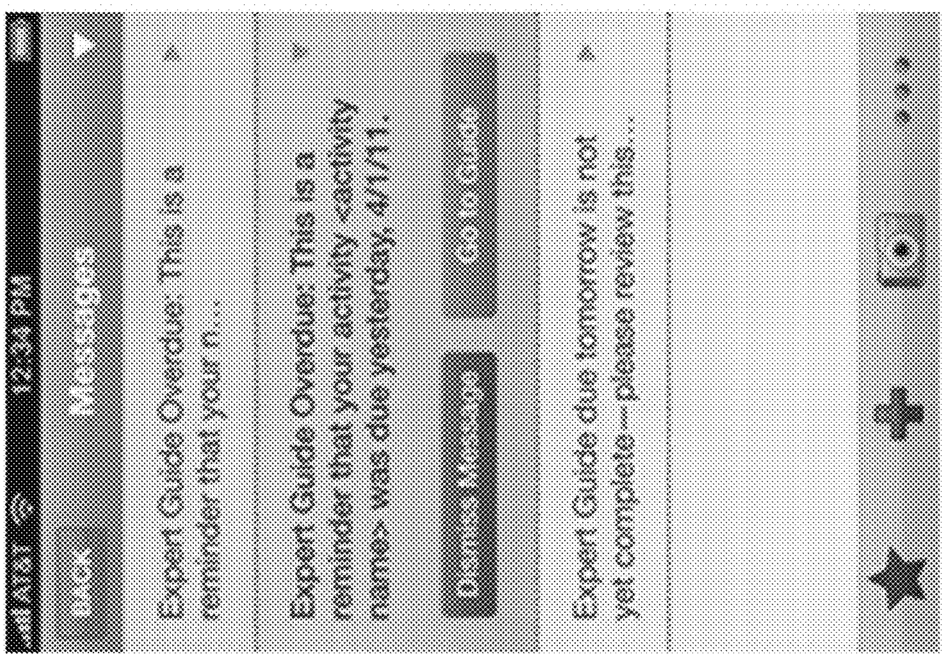
Figure 108:
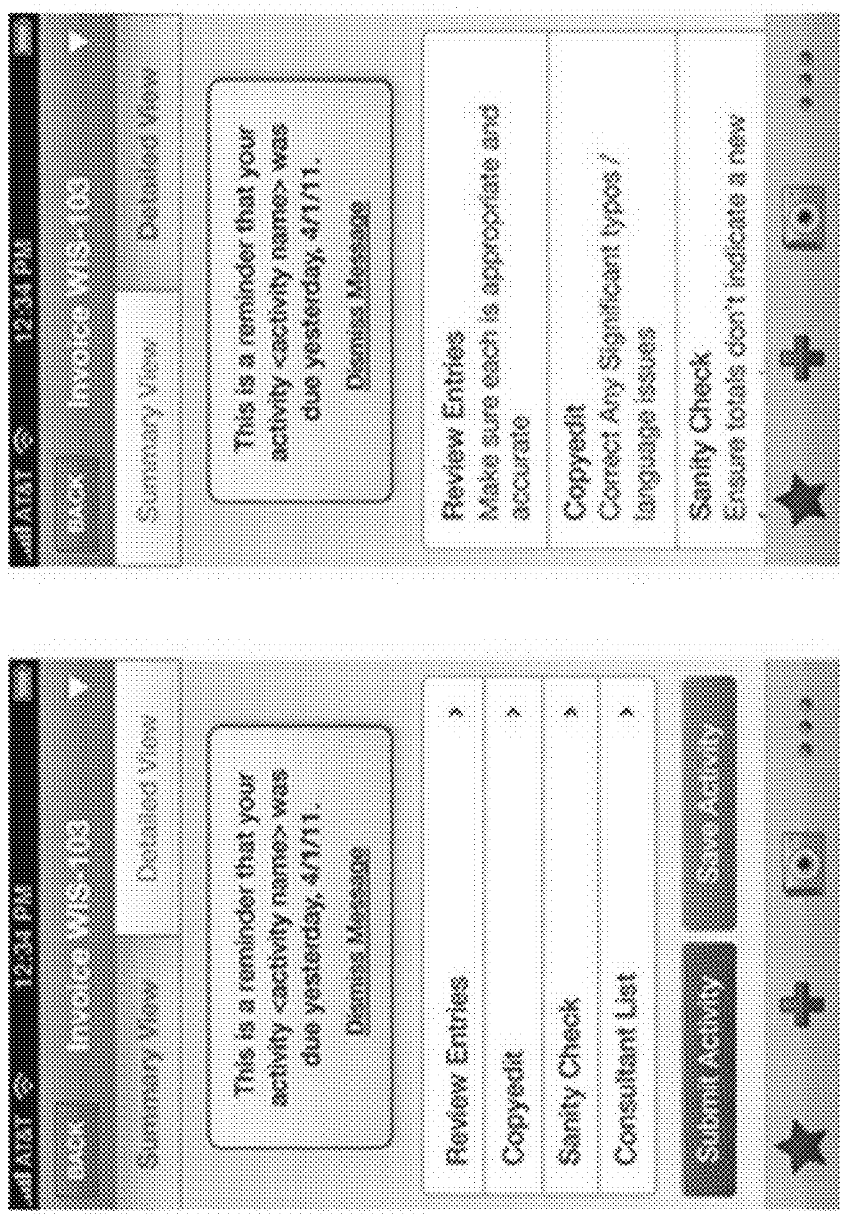

In accordance with some embodiments, messages can function similarly to the message center feature on the desktop version of the interactive checklist. The hardware processor can present all read and unread messages as shown, for example, in interface 10702 of FIG. 107A. For a particular message, the hardware processor can receive a user input to dismiss it or to go to a relevant interactive checklist (if applicable) as shown, for example, in interface 10704 of FIG. 107B. If the user opts to go to the interactive checklist, the hardware processor can display a "Summary View" shown, for example, in interface 10802 of FIG. 108 and can toggle to the "Detailed View" shown, for example, in interface 10802 of FIG. 108. In either view, the user can dismiss the message, view the message alongside the interactive checklist, or continue working on the interactive checklist.

Figure 109A:
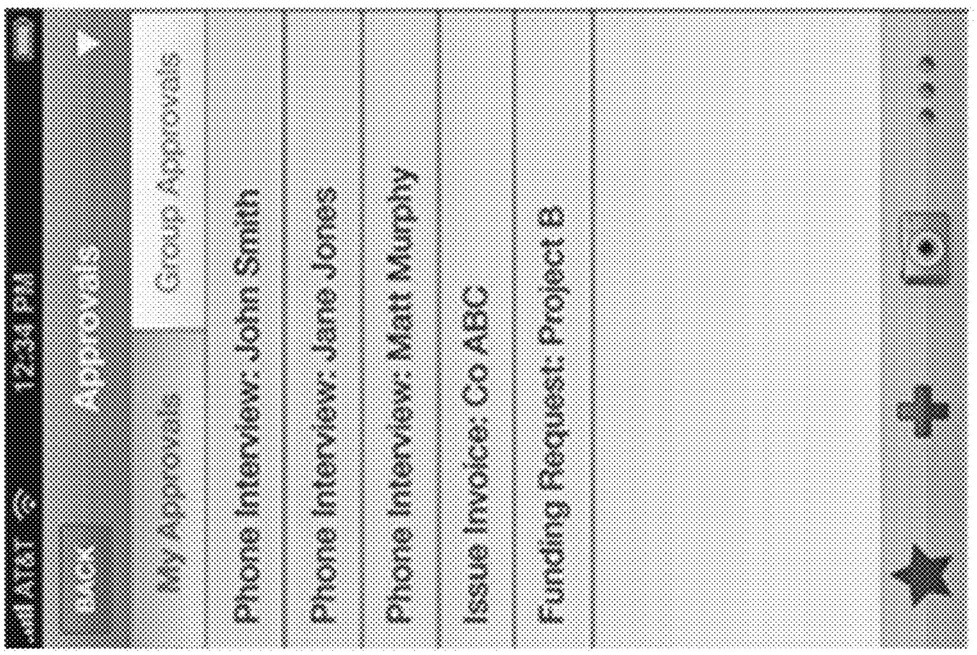
FIGS. 109A and 109B show examples of user interfaces displayed on a mobile device for presenting approval queues in accordance with some embodiments of the disclosed subject matter.
Figure 109B:
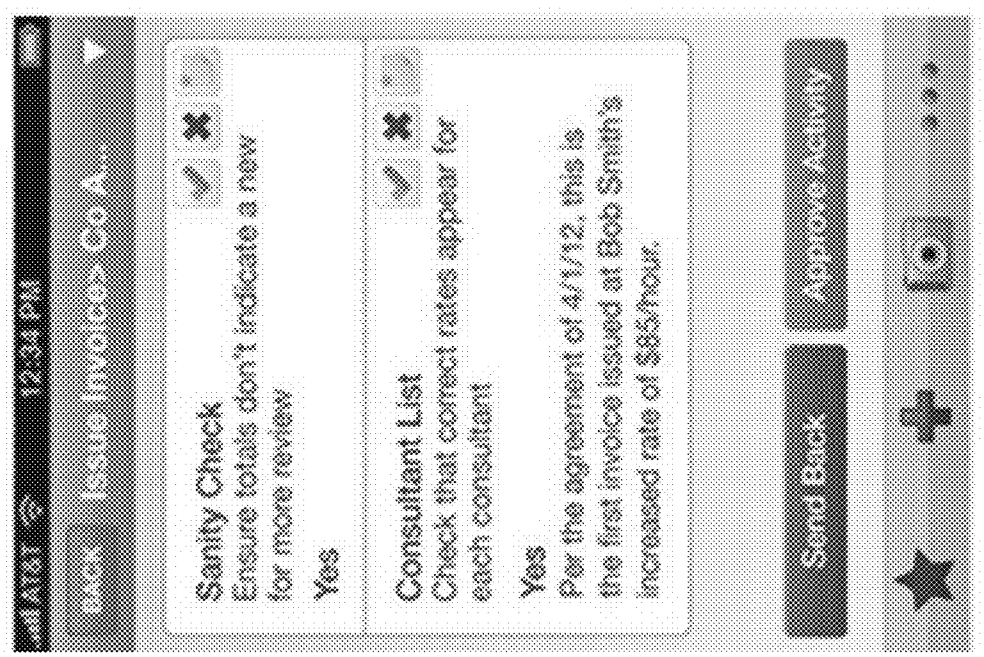

In accordance with some embodiments, approvals can function similarly to the approvals feature on the desktop version (e.g., non-mobile version) of the interactive checklist. The hardware processor can display a user's personal Approvals queues and the queues for their groups as shown, for example, in interface 10902 of FIG. 109A. The hardware processor can receive a user input to select any waiting activity. Additionally, the hardware processor can present a detailed view of the activity to allow a user to approve it or send it back as shown, for example, in interface 10904 of FIG. 109B.

Figure 110:
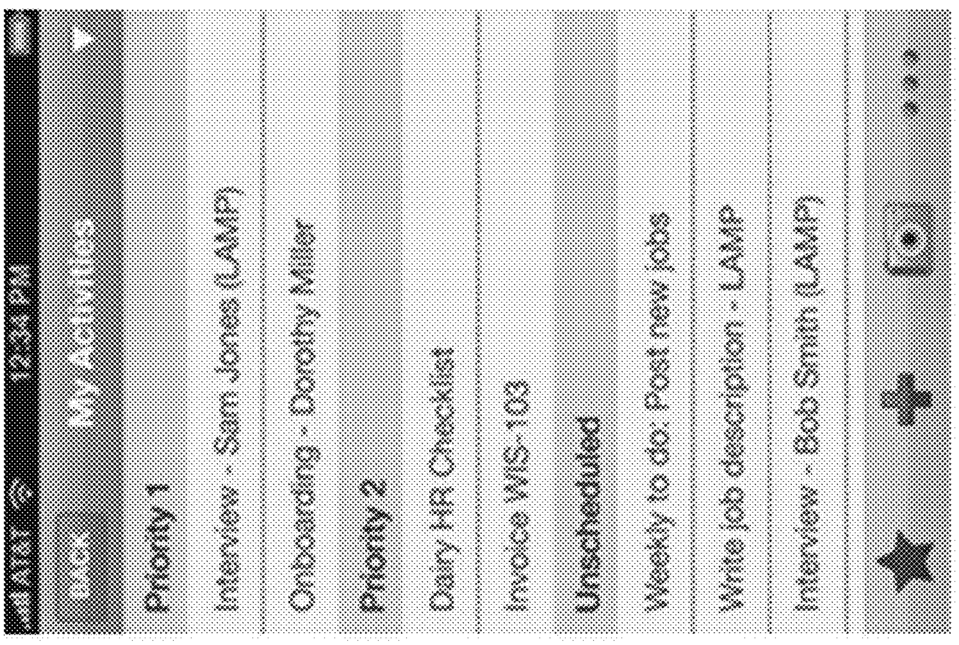
FIGS. 110, 111, and 112 show examples of user interfaces displayed on a mobile device for presenting a list of outstanding activities in accordance with some embodiments of the disclosed subject matter.
Figure 111:
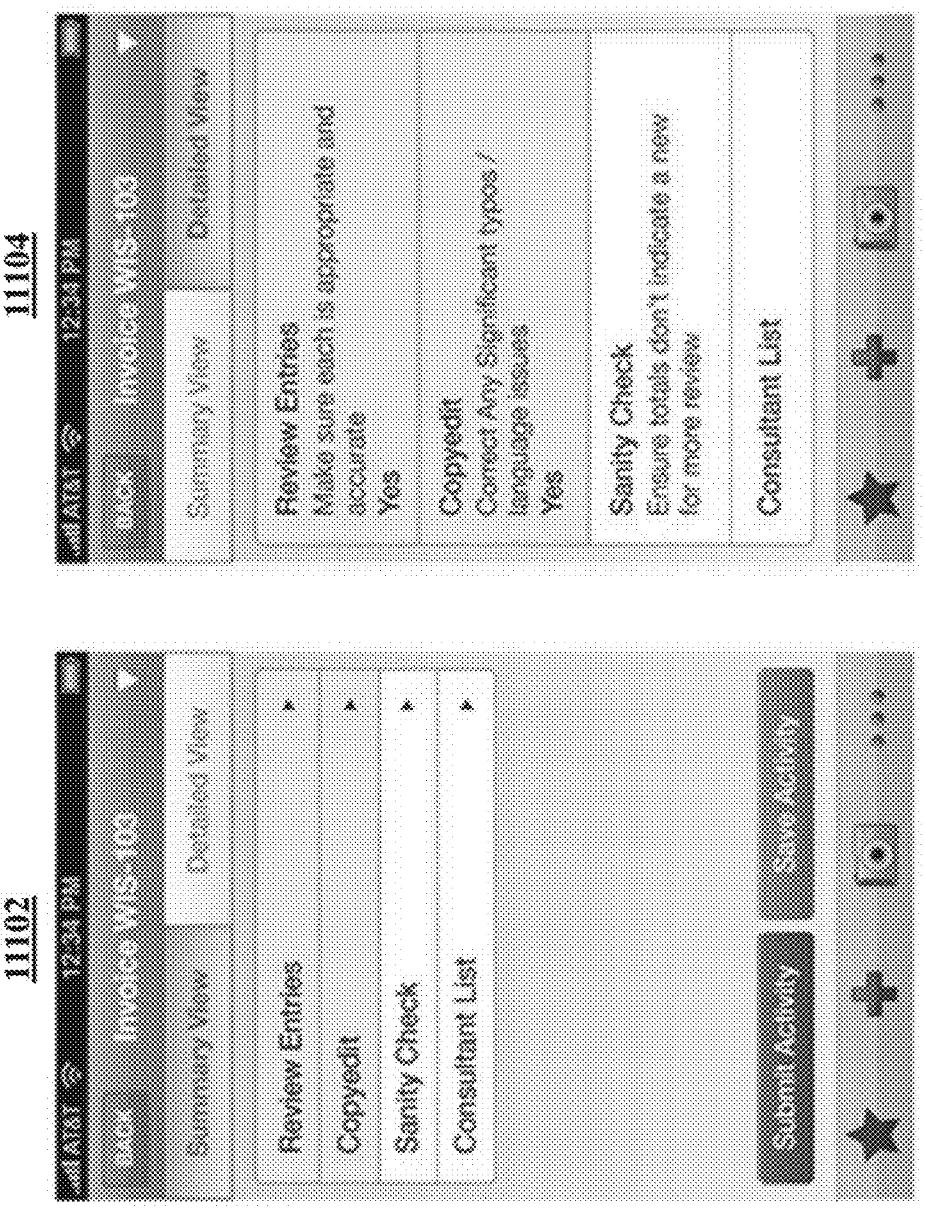
Figure 112:
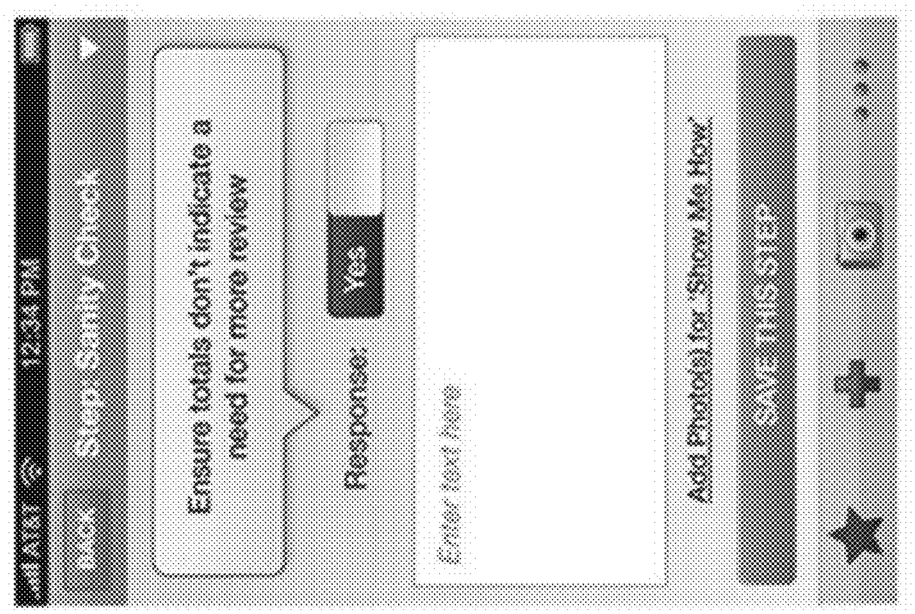

In accordance with some embodiments, a "My Activities" list can function similarly to as on the desktop. As shown, for example, in interface 11000 of FIG. 110, the hardware processor can present a list of all outstanding activities assigned to the user. The user's personal headings carry over from the desktop. The hardware processor can receive a user input (e.g., by clicking on an activity) to work on the activity. As shown, for example, in interfaces 11102 and 11104 of FIG. 111, the user can toggle between two views of the activity a "Summary View" (list of the step labels) and a "Detailed View" (list of the step labels, step instructions, and any completed responses. For both views, there can be visual distinctions between completed and incomplete steps.

The hardware processor can receive a user input (e.g., by clicking on a step) to edit or complete it. Upon receiving the user input at an individual step, the hardware processor can present a step screen shown in interface 11200. Here, the hardware processor can display a step label, step instructions, and response choices. The user can take actions such as respond/edit response, add/edit text details, or add photos or video to the step.

Figure 113A:
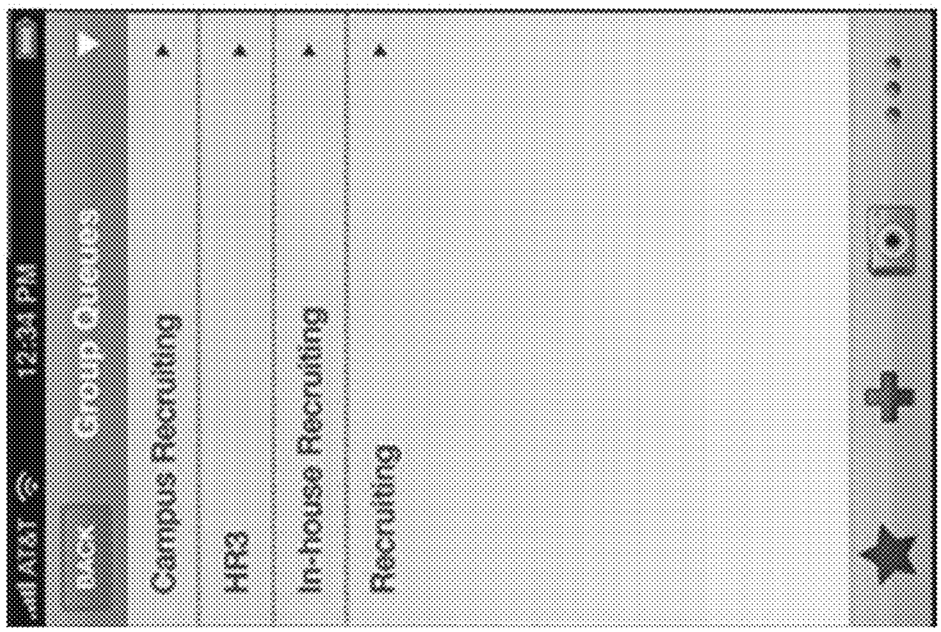
FIGS. 113A and 113B show examples of user interfaces displayed on a mobile device for presenting group queues in accordance with some embodiments of the disclosed subject matter.
Figure 113B:
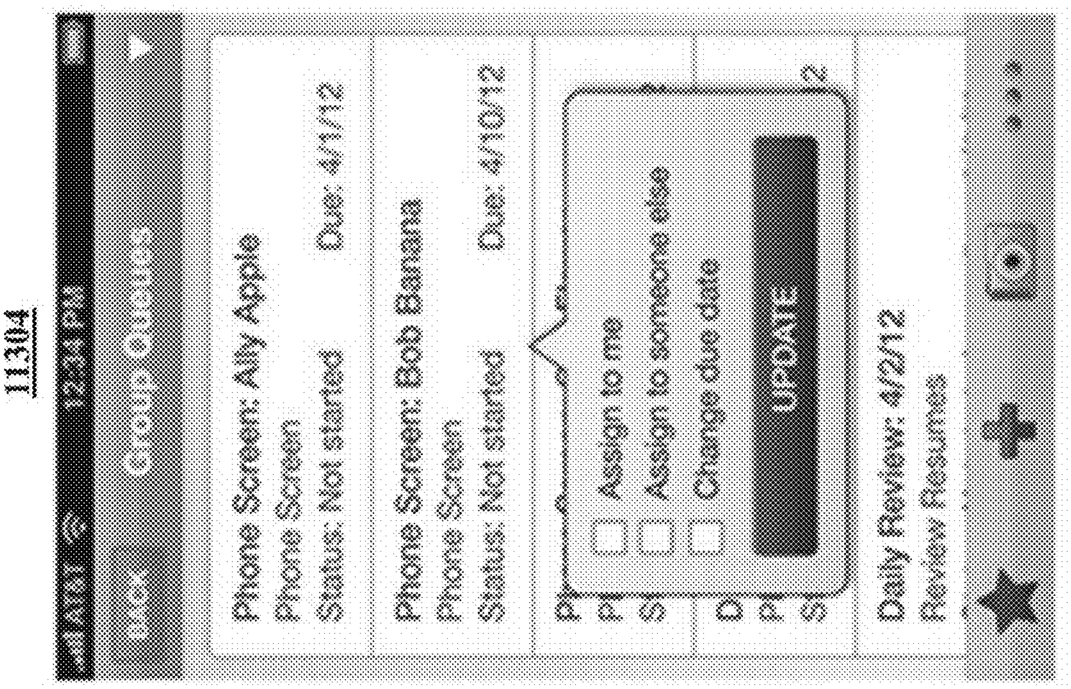

In accordance with some embodiments, a "Group Queues" list can function similarly to as on the desktop. The hardware processor can present a queue for each group to which they belong as shown, for example, in interface 11302 of FIG. 113A. Each queue can list all outstanding activities assigned to that group. The hardware processor can receive a user input at any activity title to assign it to an individual user (including themselves) or to change the due date as shown, for example, in interface 11304 of FIG. 113B.

Figure 114A:
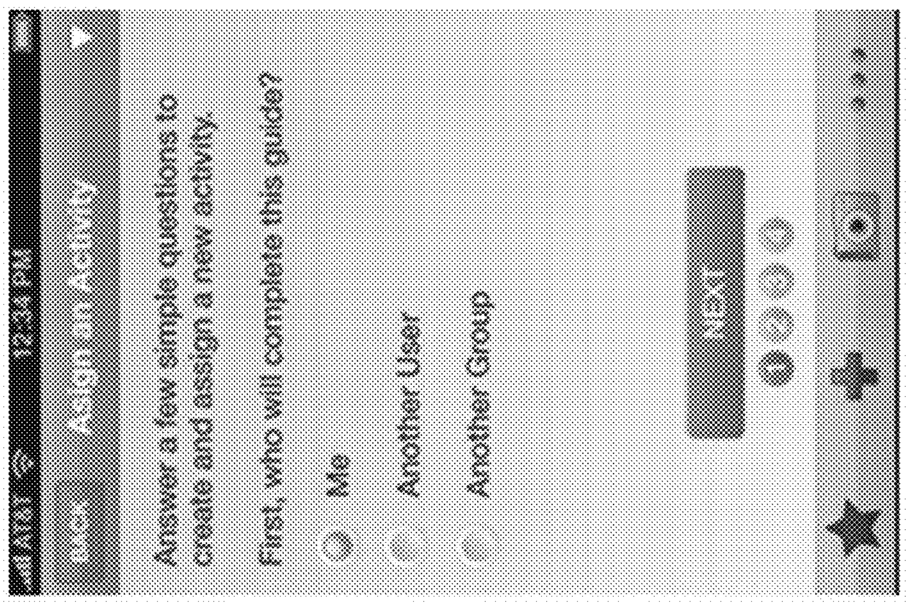
FIGS. 114A, 114B, and 115 show examples of user interfaces displayed on a mobile device for assigning an activity in accordance with some embodiments of the disclosed subject matter.
Figure 114B:
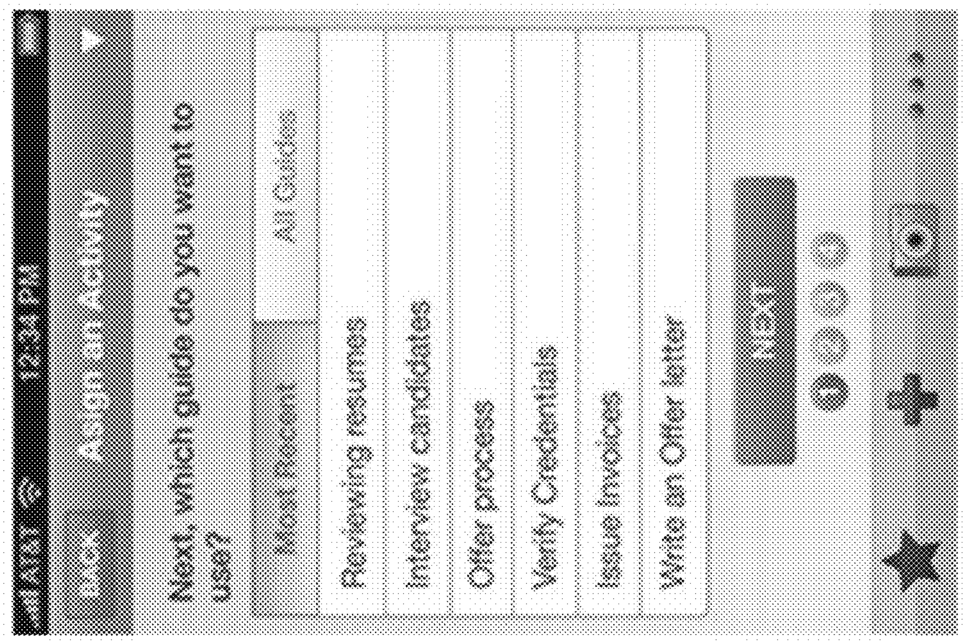
Figure 115:
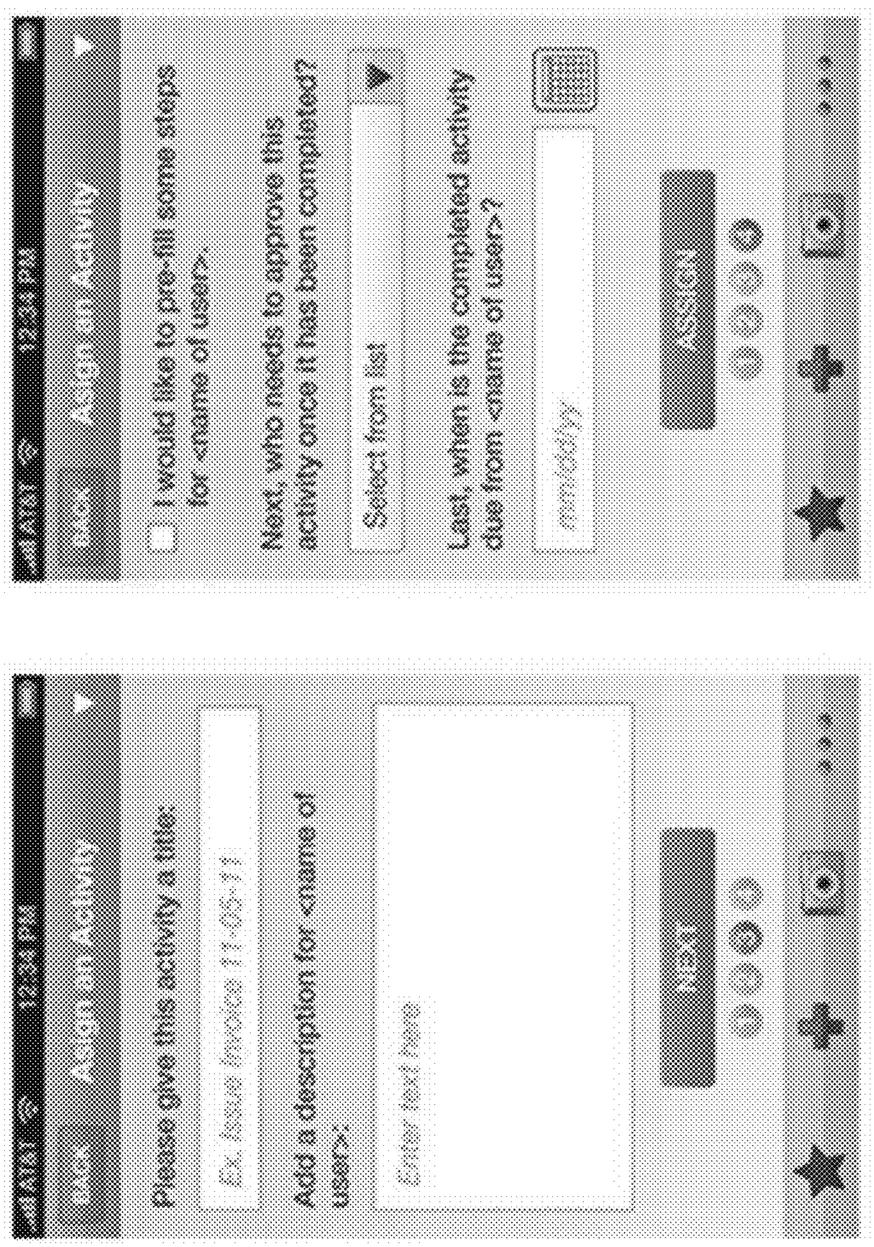

In accordance with some embodiments, an "Assign an Activity" feature can function similarly to the desktop version. Here, the hardware processor can present a wizard-like series of screens to take the user through a process. Fields can be the same as the desktop version. For example, who will be required to complete the activity shown, for example, in interface 11402 of FIG. 114A, and which interactive checklist will be use (e.g., toggle between lists of recent interactive checklists, and all interactive checklists) as shown, for example in interface 11404 of FIG. 114B, can be the same as in the desktop version. As another example, a title for the activity and a description for the activity as shown, for example, in interface 11502 of FIG. 115, and the option to pre-fill steps, an approver for the activity, or a due date and/or time for the activity as shown in interface 11504 of FIG. 115, can be the same as in the desktop version.

Figure 116A:
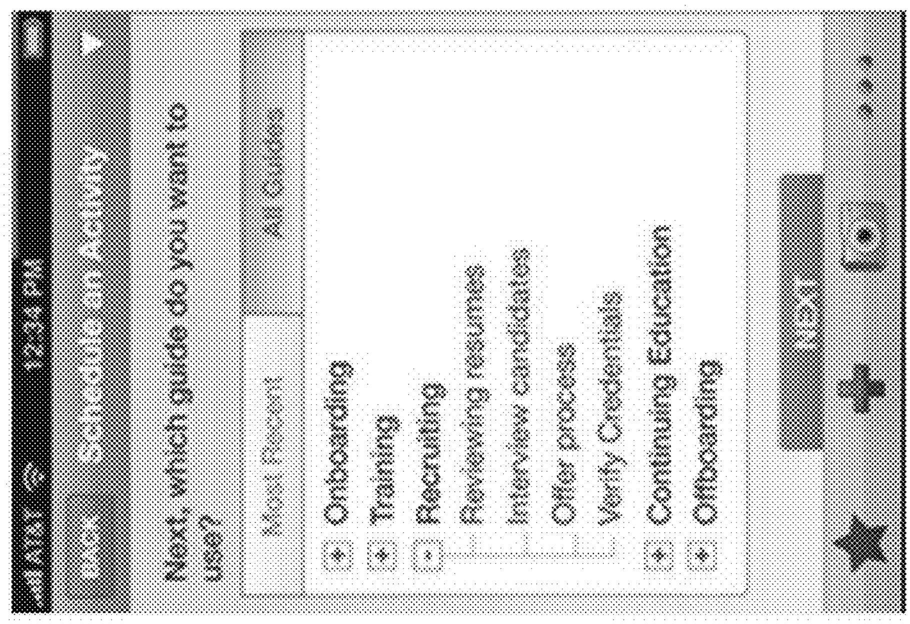
FIGS. 116A and 116B show examples of user interfaces displayed on a mobile device for scheduling an activity in accordance with some embodiments of the disclosed subject matter.
Figure 116B:
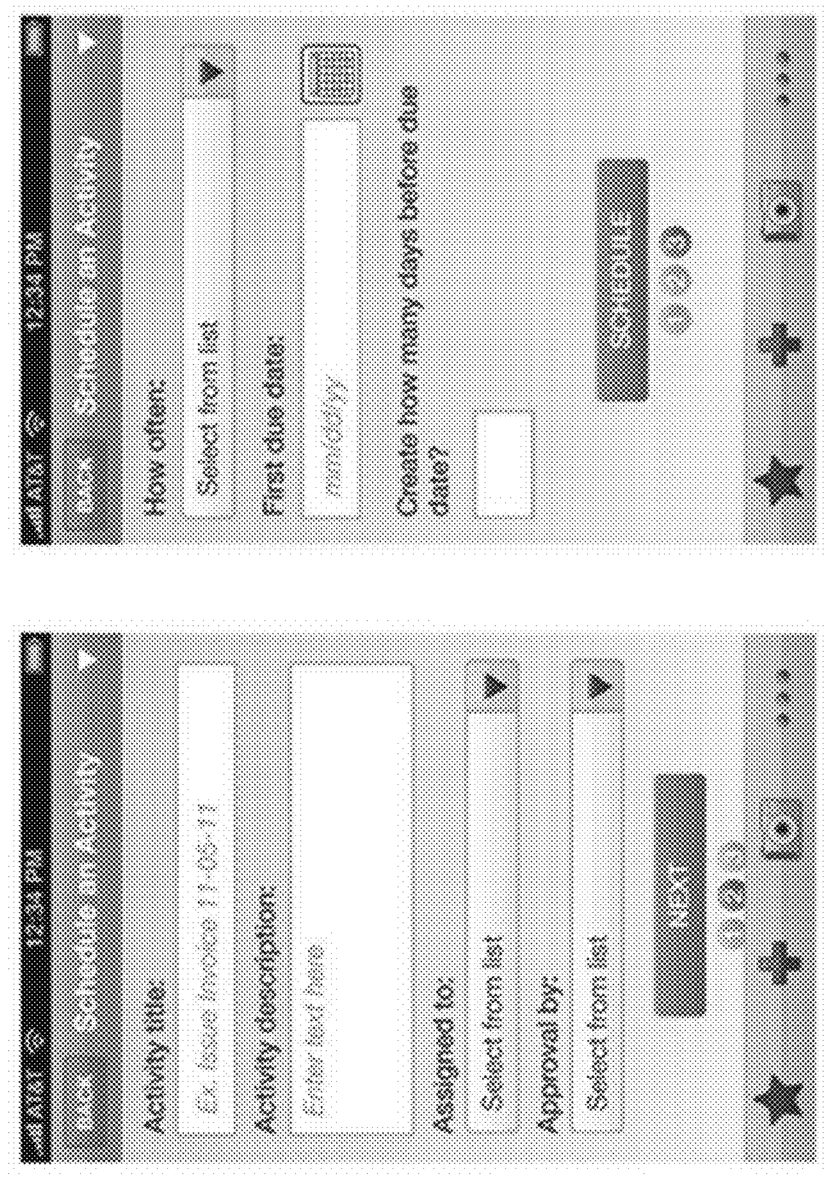

In accordance with some embodiments, a "Schedule an Activity" feature can function similarly to the desktop version. Here, the hardware processor can present wizard-like series of screens to take the user through the process. Fields can be the same as the desktop version. The user can indicate, for example, as shown, for example, in interface 11602 of FIG. 116A, which interactive checklist they would like to use, as shown, for example, in interface 11604 of FIG. 116B, an activity title, an activity description, an assignee, and an approver, and as shown, for example, in interface 11606 of FIG. 116B, frequency, first due date and/or time, and when each activity should be created.

Figure 117A:
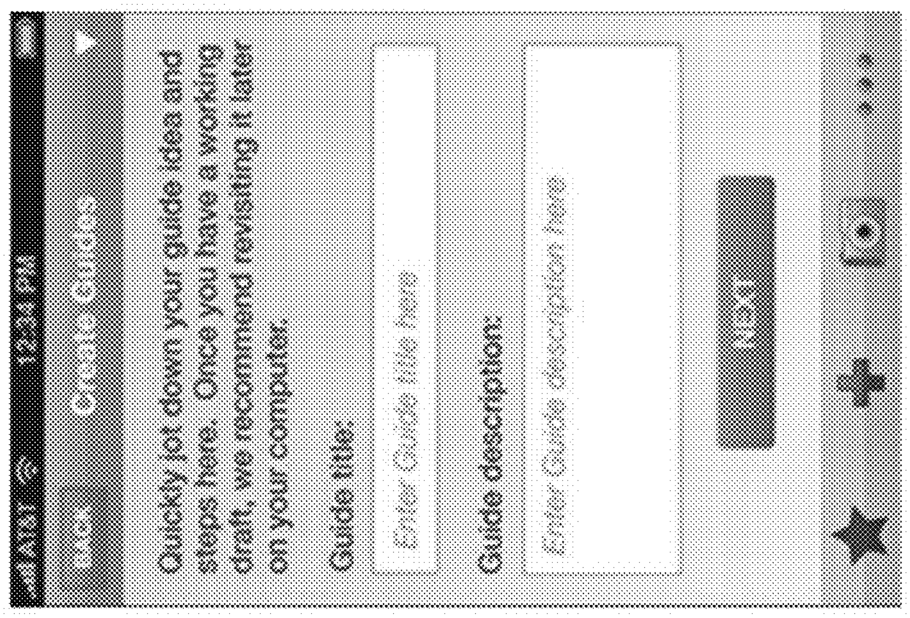

In accordance with some embodiments, the mobile app can offer the ability to create a new interactive checklist using the "Quick Guide Tool." The tool can function similarly to the one offered on the desktop version. The user can quickly jot down their ideas into a basic framework of an interactive checklist. For the interactive checklist, as shown, for example, in interface 11702 of FIG. 117A, the hardware processor can receive an interactive checklist title and an interactive checklist description. Additionally, in interface 11704 of FIG. 117B, the hardware processor can receive a step name (step label) and a step description (instructions). The user can also enhance the step by adding photos or "Show Me How" guidance. The user can later flesh out the full interactive checklist using the normal "Add a Step" interface on the desktop version of the interactive checklist.

Figure 118:
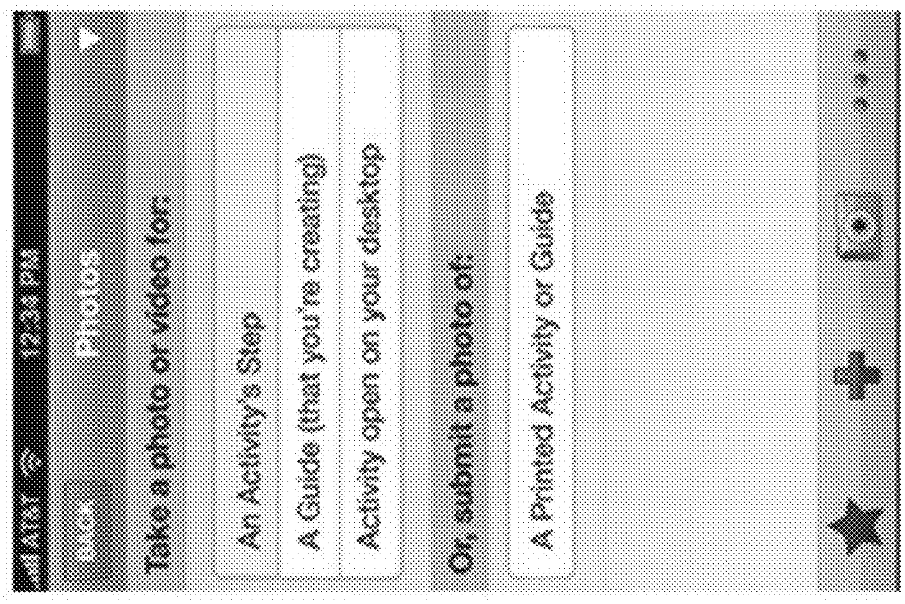
FIGS. 118, 119, 120, 121A, and 121B show examples of user interfaces displayed on a mobile device for adding photos or video to a step in accordance with some embodiments of the disclosed subject matter.
Figure 119:
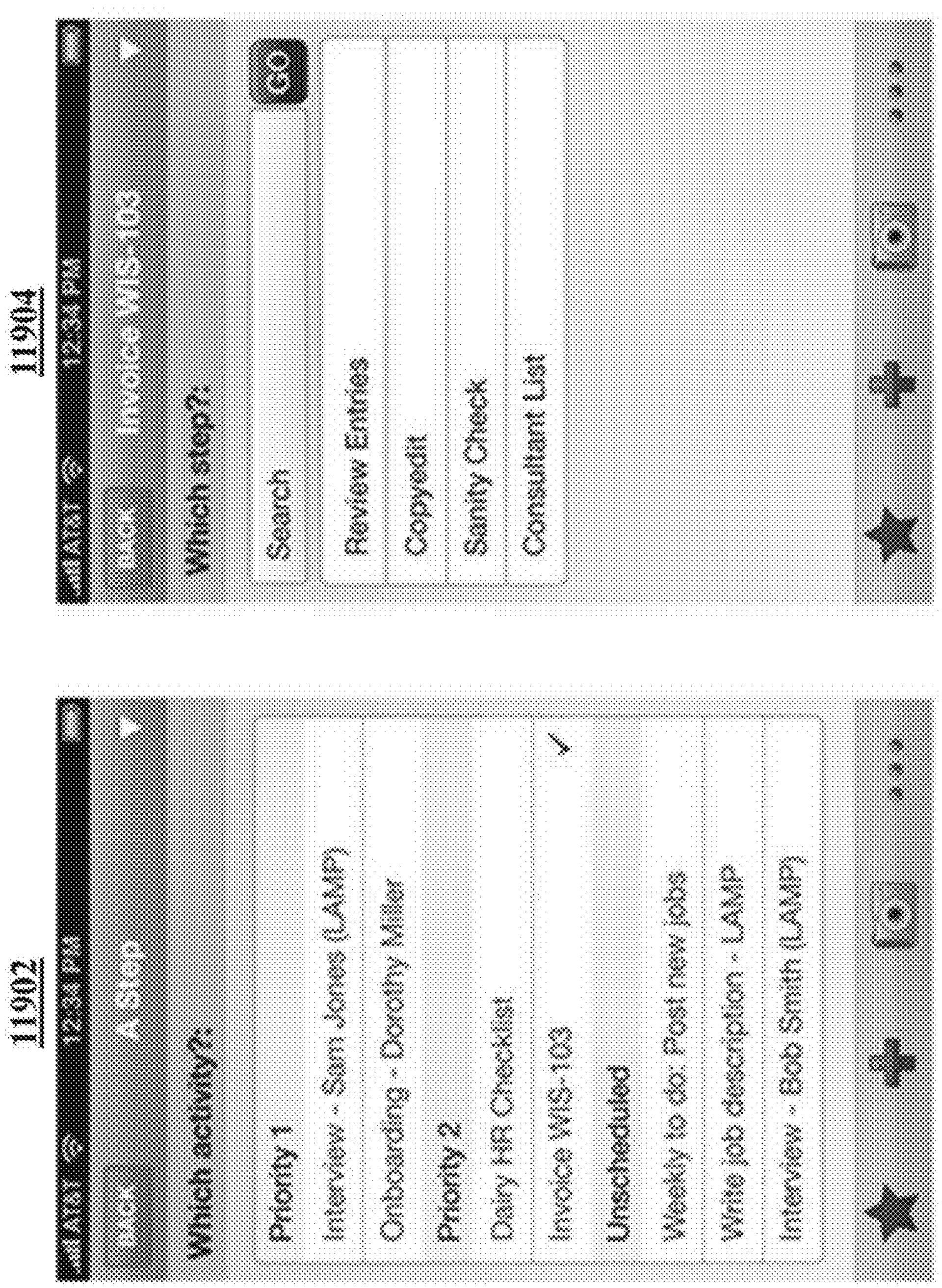
Figure 120:
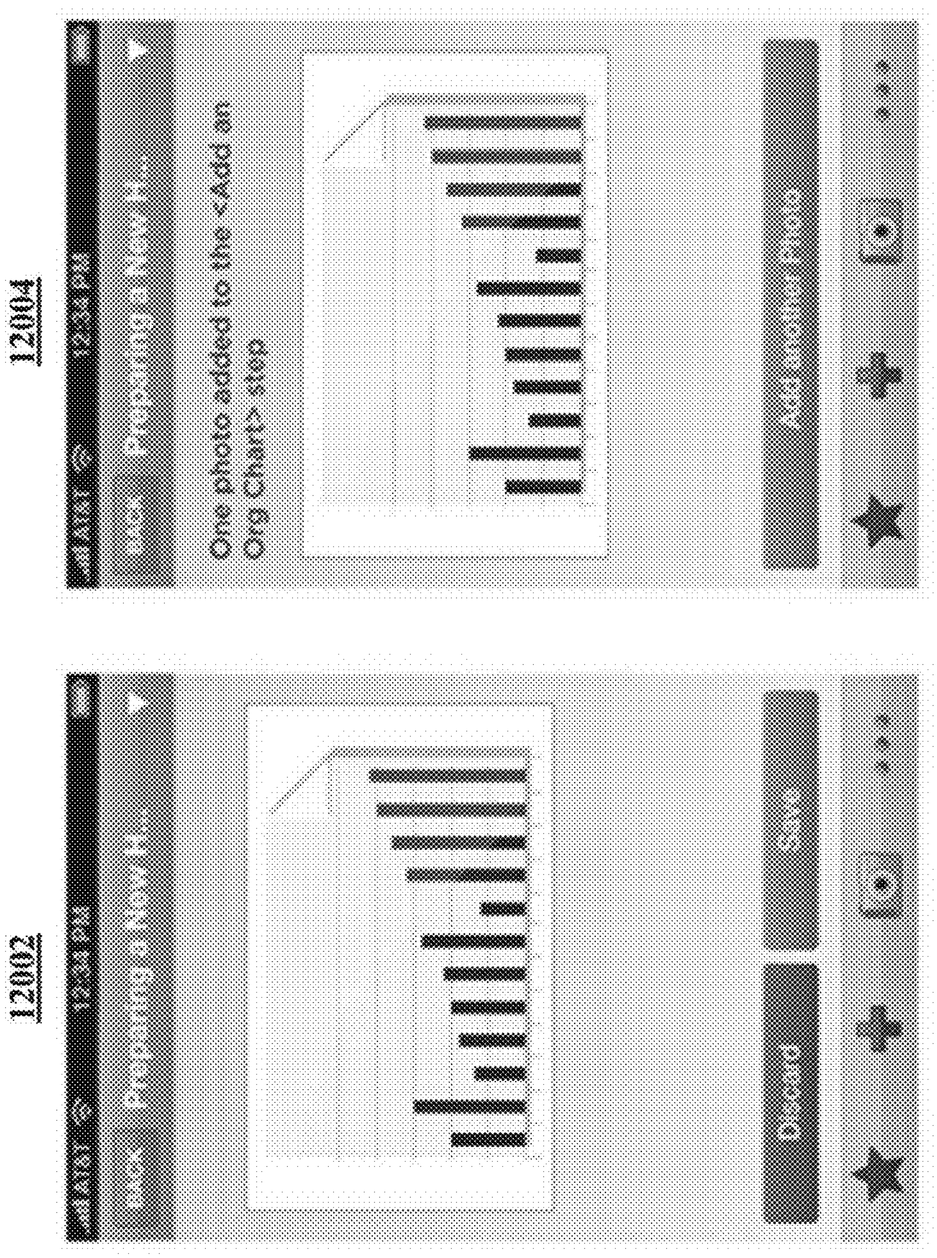
Figure 121A:
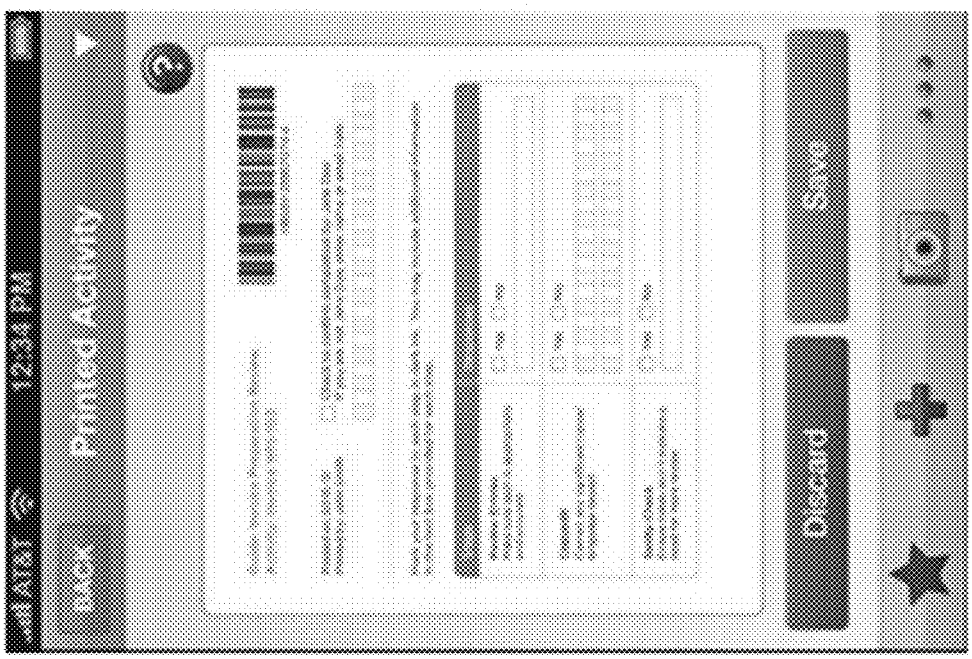
Figure 121B:
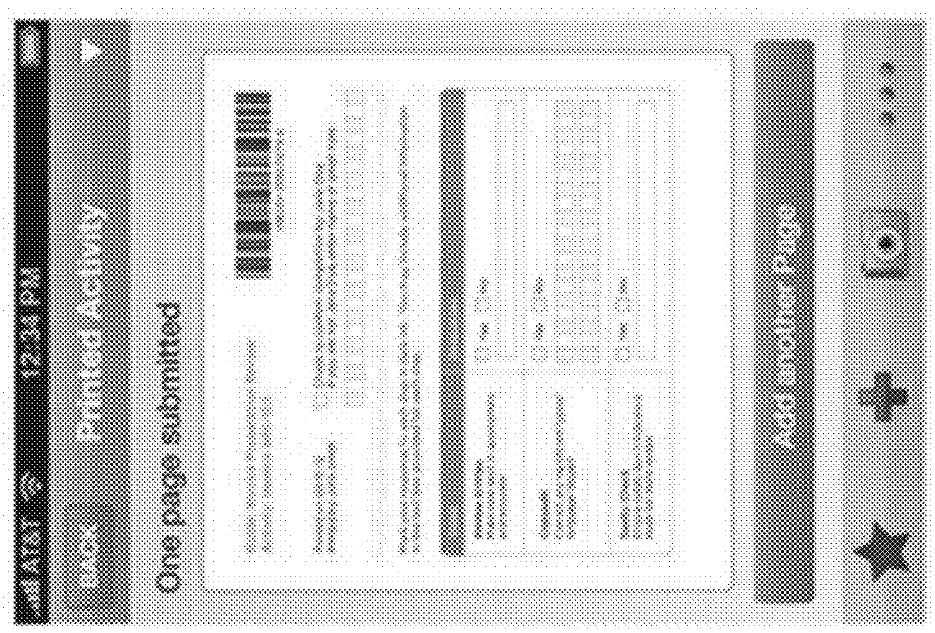

In accordance with some embodiments, the user can take advantage of their smartphone camera by adding photos or video to a step in an existing interactive checklist or a new interactive checklist, as shown, for example, in interface 11800 of FIG. 118. They can also take photos of printed activities to submit printouts. The user can drill down and select a particular step in a particular activity as shown, for example, in interface 11902 of FIG. 119. The hardware processor can receive a new photo to add to the step from a user's camera roll as shown, for example, in interface 11904 of FIG. 119. Even if the user is not on the go, their smartphone camera may be the quickest and easiest way to upload a photo. The desktop and mobile versions of the interactive checklist can sync in some embodiments. The user can work on the desktop and can indicate that they want to add a photo from the mobile app. Then, the user can take a photo, and the mobile app can know to add it to the activity open on the desktop as shown, for example, in interfaces 12002 and 1204 of FIG. 120. The user can even submit printed activities in some embodiments. They can take a photo of the completed printout(s) as shown, for example, in interface 12102 of FIG. 121A. The photo can then be submitted and the interactive checklist can transcribe the responses to the activity as shown, for example, in interface 12104 of FIG. 121B.

In some embodiments, the hardware processor can present a list of available "Step Types." For example, the hardware processor can receive a user input from an author to tag a step with a "Step Type" to indicate the nature of its purpose and/or its characteristic(s). In a more particular example, a step can be tagged using a taxonomy that may be customized by the organization. In some embodiments, tagging a step with a "Step Type" may cause a label, icon, display element and/or guidance/resource(s) to appear near the step when a user observes it. In some embodiments, tagging a step with a "Step Type" may offer guidance to the step author about how to compose a step of this nature. In some embodiments, tagging a step with a "Step Type" may influence the display of the step to more appropriately present it. In some embodiments, tagging a step with a "Step Type" may influence the behavior associated with the step or its interface.

In some embodiments, interface element(s) may also assist a user, such as the author of an Interactive Checklist, in composing an effective Interactive Checklist. For example, the interface element(s) may indicate the number of steps associated with a particular Step Type, so that inattention to that aspect of the Interactive Checklist can be addressed. In some embodiments, the interface element(s) may provide guidance for identifying/composing a step of that nature.

In some embodiments, a Step Type can be of any suitable nature. For example, a Step Type may reflect a type of action. More particularly, for example, the type of action could include "Diagnose/Decide," "Evaluate an alternative," "Feedback" (e.g., Gathering feedback, giving feedback, possibly to help people learn or to enhance the process), "Gather information/inputs" (e.g., indicating information the user should gather from elsewhere), "Option creation" (e.g., indicating identification of additional option(s) that are available, and/or an expansion of the user's available options), "Perform a task," (e.g., Entering data into an external system; tell someone something; mail a letter), "Plan" (e.g., a planning step), "Situational awareness/assessment," (e.g., Assess aspect(s) of the situation and/or information), "Teach/Train," or any labels that have similar or other suitable meanings.

In some embodiments, a Step Type may refer to aspects that are not actions as well. For example, a Step Type can include "Accountability" (e.g., indicating an action geared toward verifying that a needed action has taken place, properly), "Instinct" (e.g., communicating the reaction that an expert should want to have when presented with a relevant fact pattern), "Risk," (e.g., highlighting or identifying risk(s)), "Suggestion," (e.g., communicating a suggestion based on previous inputs and other circumstances), etc.

In some embodiments, Step Types may reflect paradigms as well. For example, the Six Sigma methodology can utilize the "DMAIC" paradigm, i.e., Define, Measure, Analyze, Improve, Control. In some embodiments, each element of such paradigm can be used as a Step Type.

In some embodiments, only one Step Type could be assigned to a single step. In some embodiments, multiple Step Types could be assigned to a single step. In some embodiments, the nature of the specific Step Types may influence what may be combined and/or whether more tags can be added.

In some embodiments, an administrator may configure the permissible Step Types. More particularly, for example, the administrator can configure the permissible Step Types by enabling/disabling Step Types, importing bundles of Step Types offered by other parties (e.g., whether the Administrator's organization or a third party), and/or configuring Step Types through an interface. In some embodiments, the administrator may adjust/customize aspects of the display and behavior of a particular Step Type.

Figure 133A:
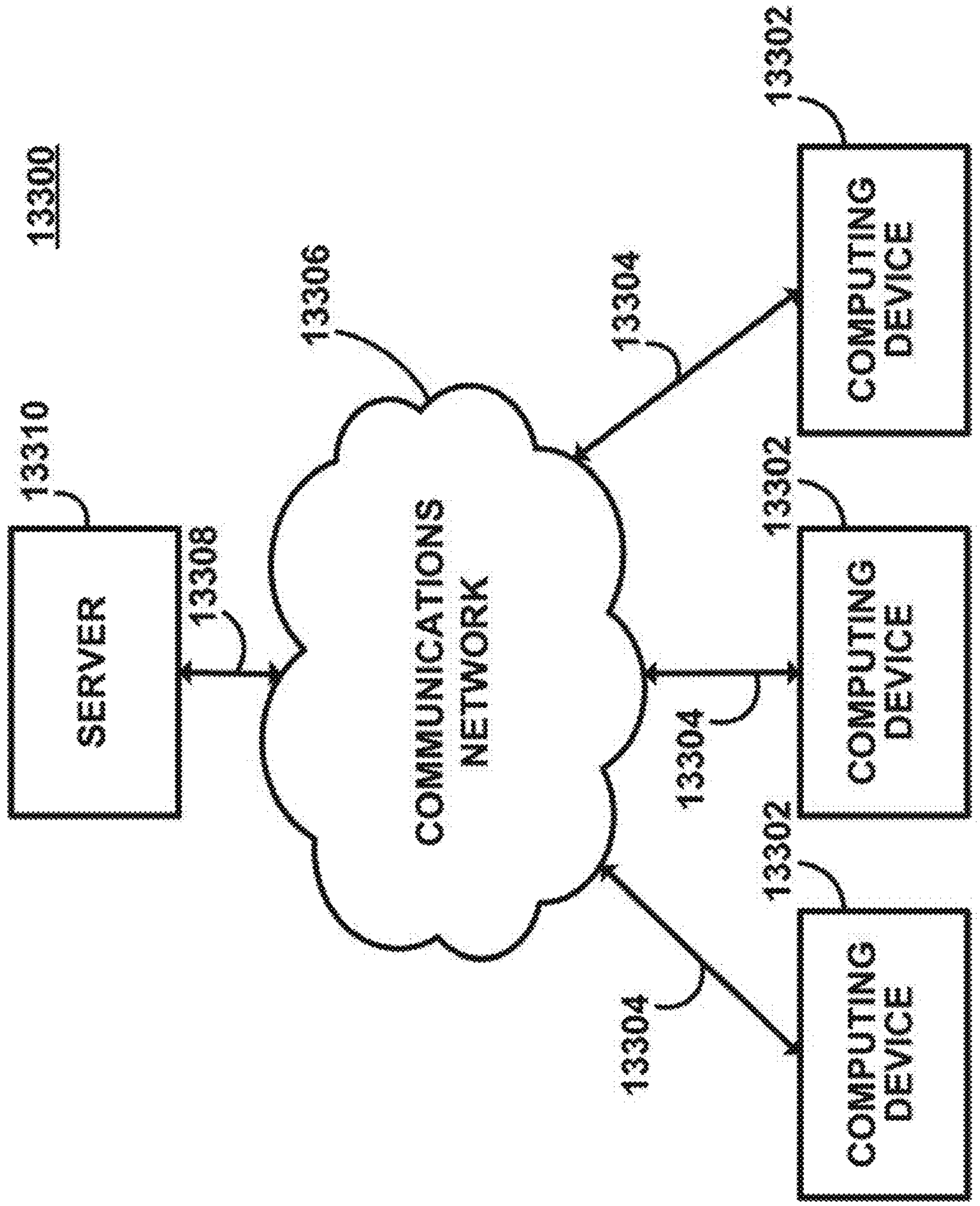
FIG. 133A shows a schematic diagram of an example of a system for presenting an interactive checklist in accordance with some embodiments of the disclosed subject matter.

Turning to FIG. 133A, an example of a generalized schematic diagram of a system 13300 in which the mechanisms described herein can be implemented in accordance with some implementations of the disclosed subject matter is shown. As illustrated, system 13300 can include one or more computing devices 13302, such as a computing device for presenting an interactive checklist, a sever 13310, a communications network 13306, and communications links 13304 and 13308.

Computing devices 13302 can be any suitable device for performing one or more of the functions described herein, such as a personal computer, a tablet device, a mobile device, a personal data assistant (PDA), a portable email device, a mobile telephone, a gaming device, a set-top box, a television, and/or any other suitable user device. Computing devices 13302 can be connected by one or more communications links 13304 to a communications network 13306 that can be linked via a communications link 13308 to a server 13310.

Server 13310 can be any suitable device for performing one or more of the functions described herein, such as a processor, a computer, a data processing device, or a combination of such devices.

In some embodiments, the functions described herein can be distributed into multiple backend components and multiple frontend components or interfaces. In a more particular example, backend components, such as data storage, can be performed on one or more servers 13310. As another more particular example, graphical user interfaces can be generated and distributed by one or more servers 13310 to computing devices 13302.

Each of the computing devices 13302 and server 13310 can be any of a general purpose device such as a computer or a special purpose device such as a client, a server, and/or any other suitable device for performing the functions described herein. Any of these general or special purpose devices can include any suitable components such as a hardware processor (which can be a microprocessor, digital signal processor, a controller, and/or any other suitable device for executing instructions and/or performing the functions described herein), memory, communication interfaces, display controllers, input devices, and/or any other suitable device for performing the functions described herein. For example, computing device 13302 can be implemented as a personal computer, a tablet device, a mobile device, a personal data assistant (PDA), a portable email device, a multimedia terminal, a mobile telephone, a gaming device, a set-top box, a television, and/or any other suitable device.

Communications network 13306 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 13304 and 13308 may be any communications links suitable for communicating data between computing devices 13302 and server 13310, such as network links, dial-up links, wireless links, hard-wired links, any other suitable communications links, or a combination of such links.

Computing devices 13302 and server 133010 may be located at any suitable location(s). Computing devices 13302 can be local to each other or remote from each other. In some implementations, computing devices 13302 and server 13310 may be located within an organization. Alternatively, computing devices 13302 and server 13310 may be distributed between multiple organizations.

Figure 133B:
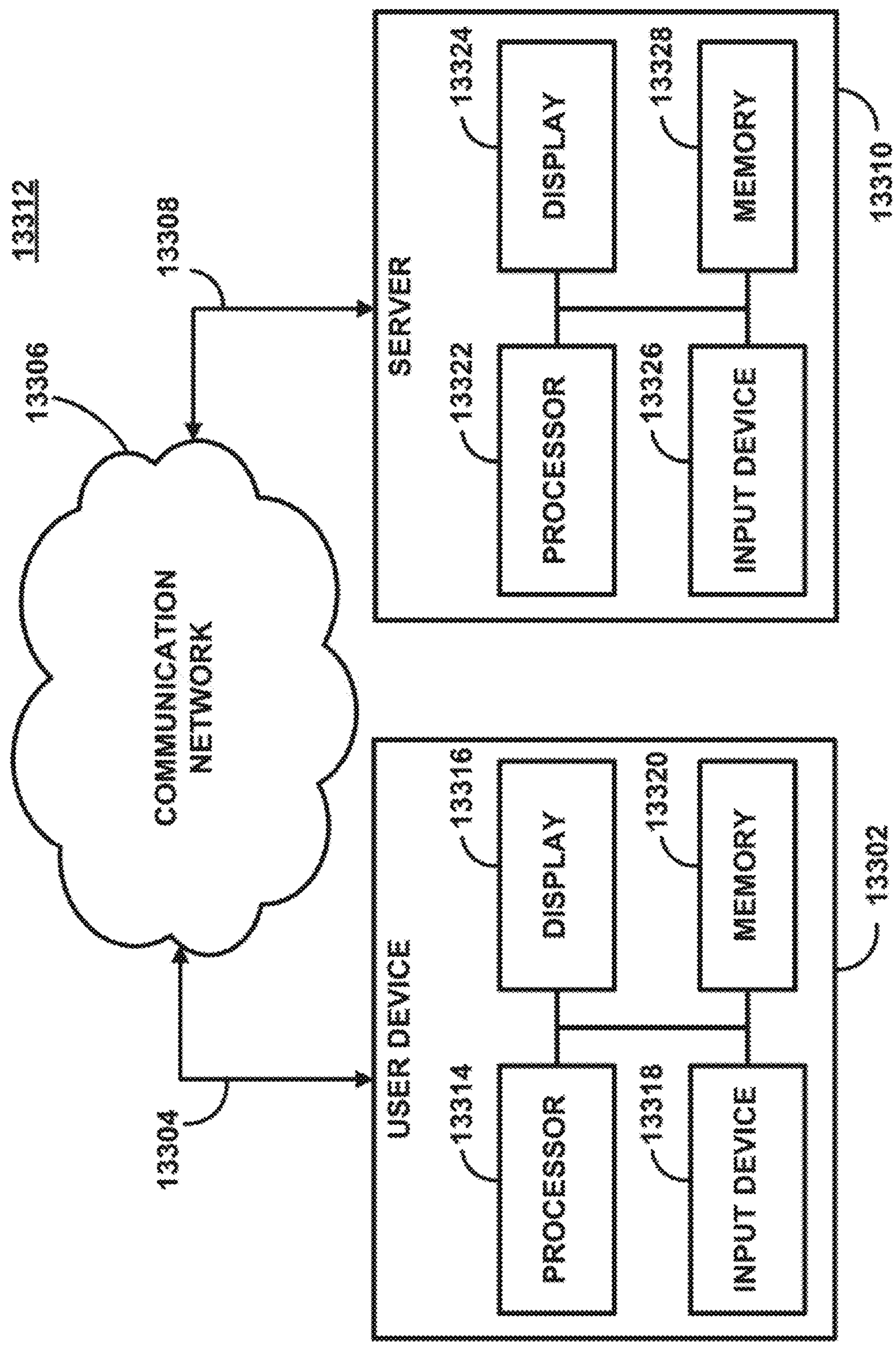
FIG. 133B shows an example of hardware that can be used in a server and/or a computing device in accordance with some embodiments of the disclosed subject matter.
Figure 134:
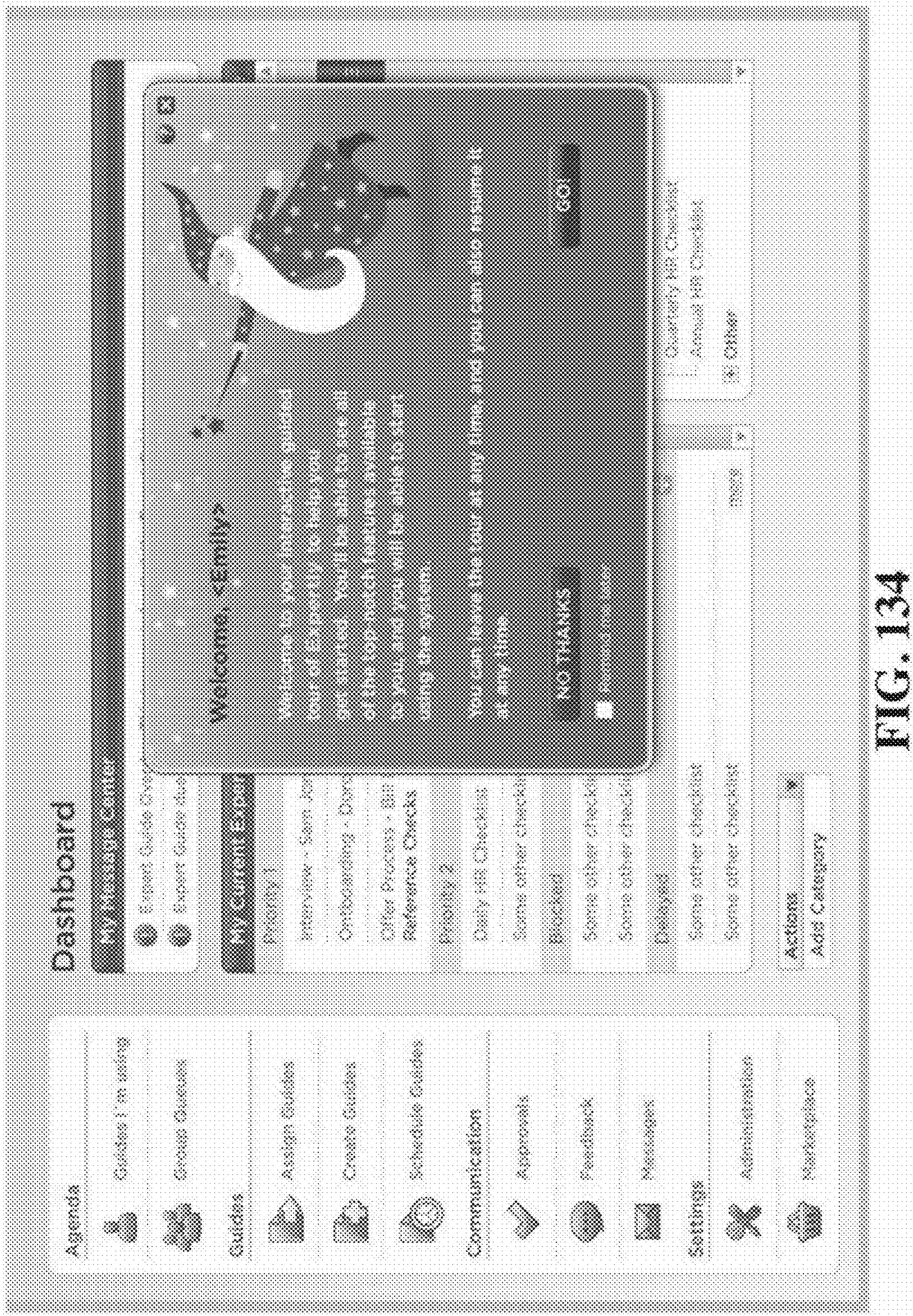
FIGS. 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, and 180 show examples of tour interfaces for presenting an interactive checklist in accordance with some embodiments of the disclosed subject matter.
Figure 135:
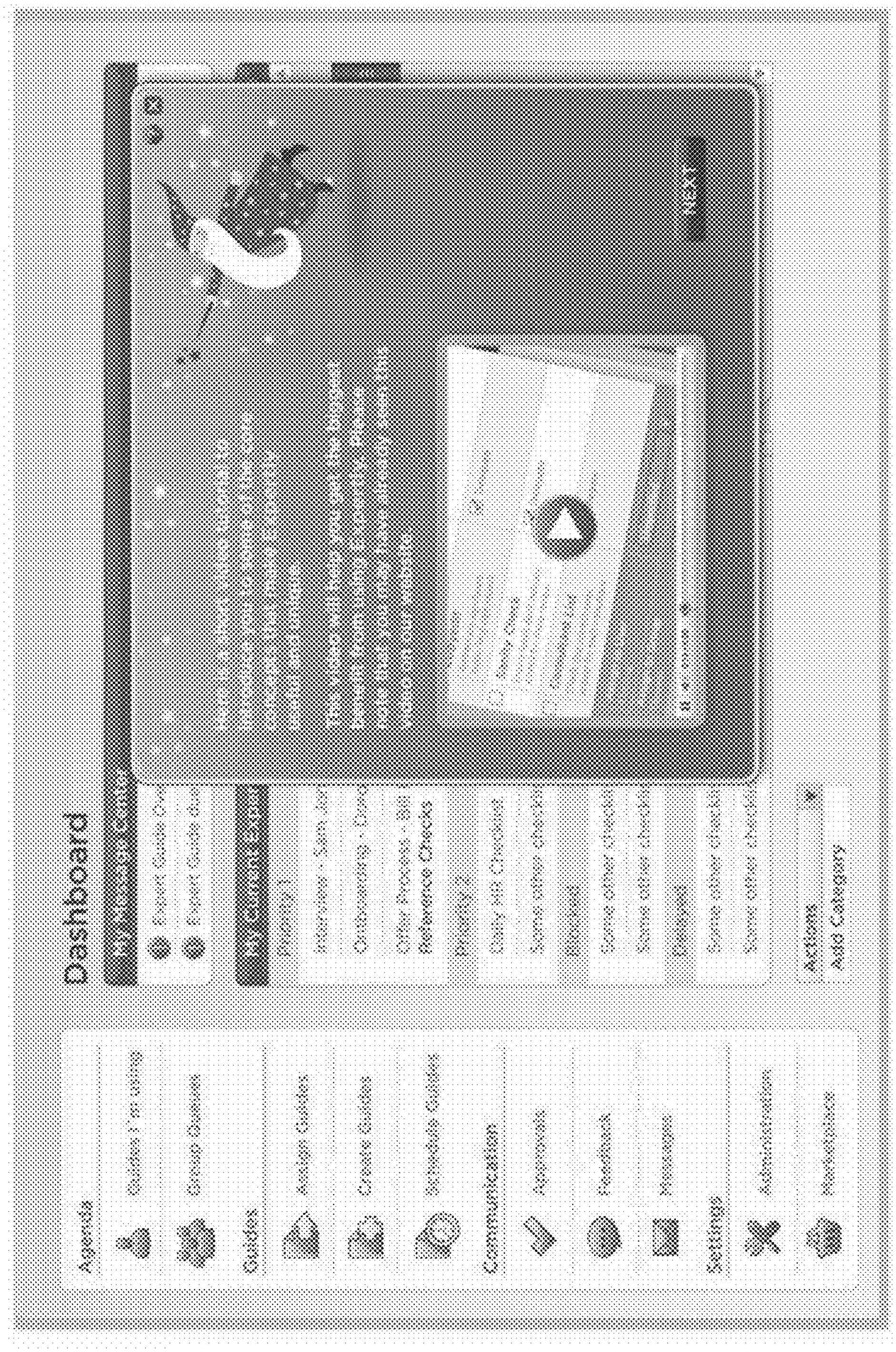
Figure 136:
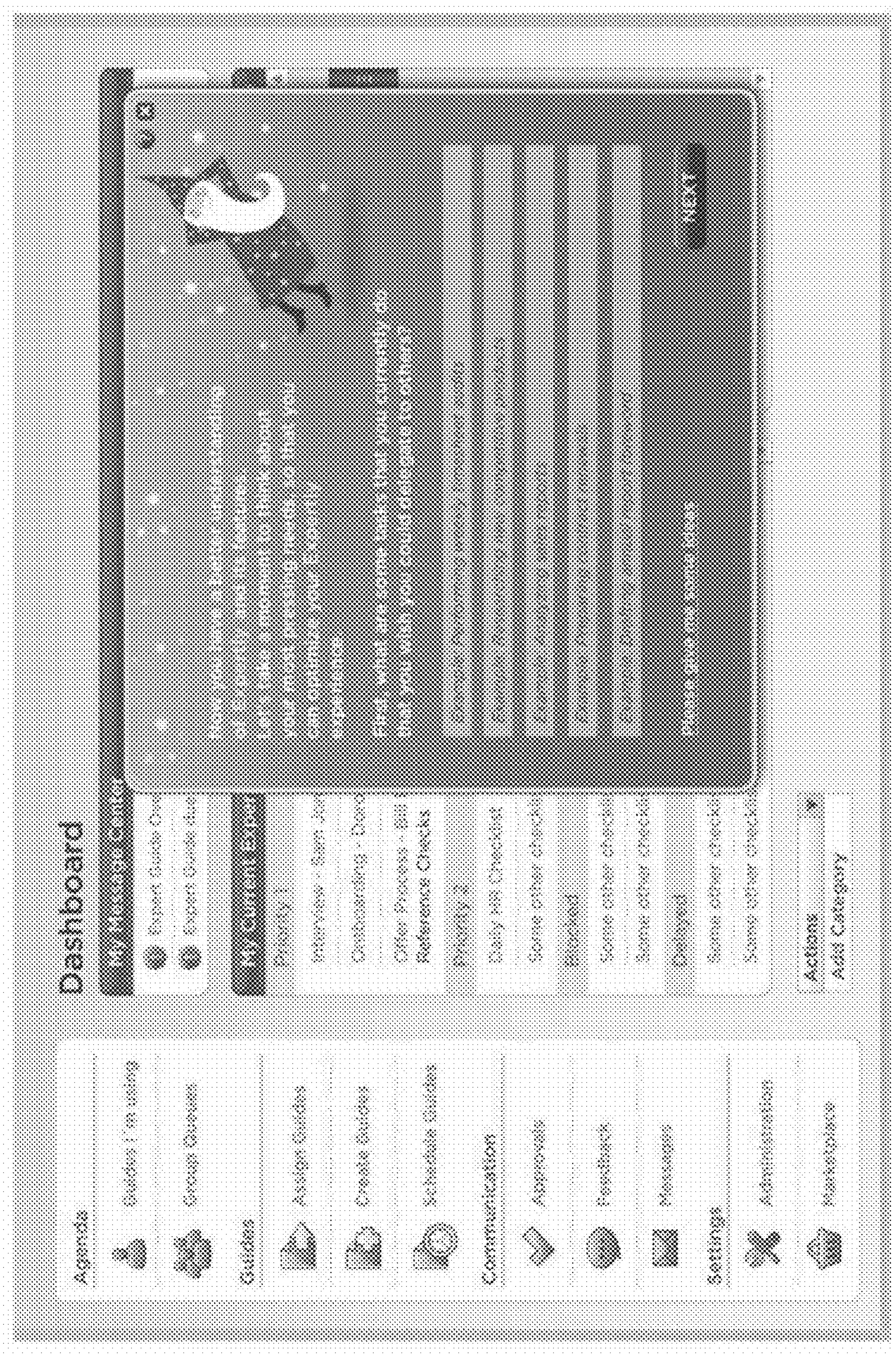
Figure 137:
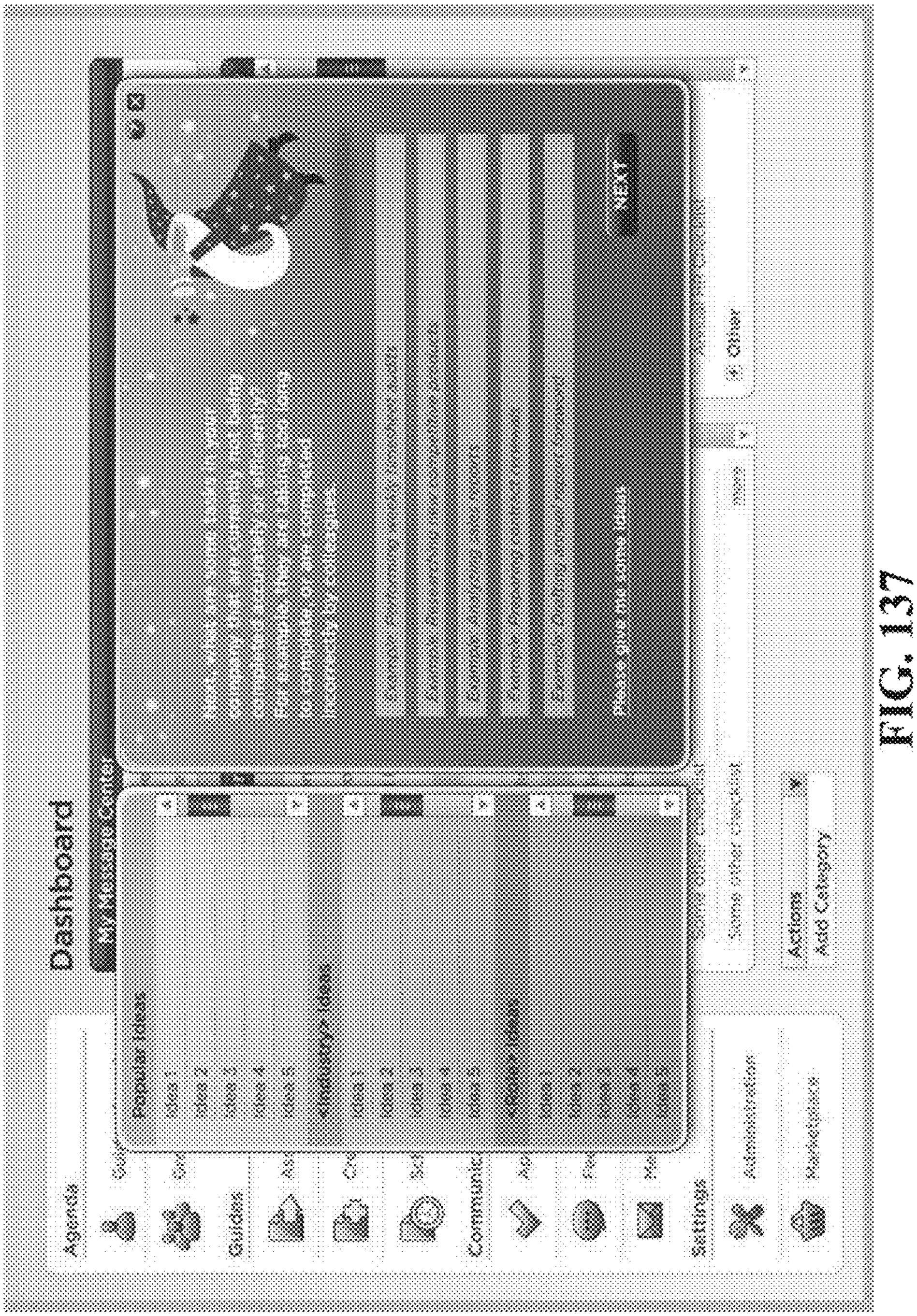
Figure 138:
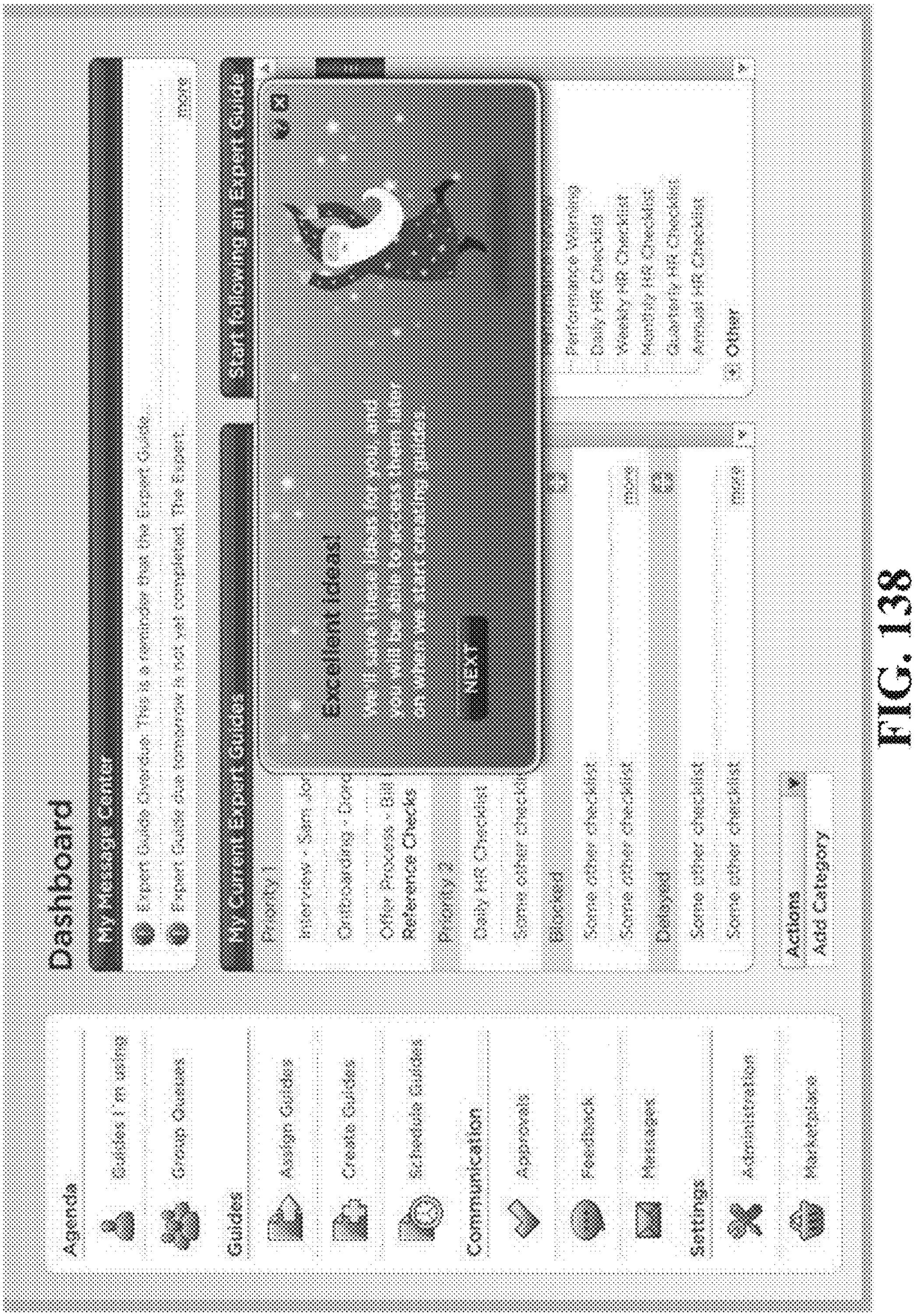
Figure 139:
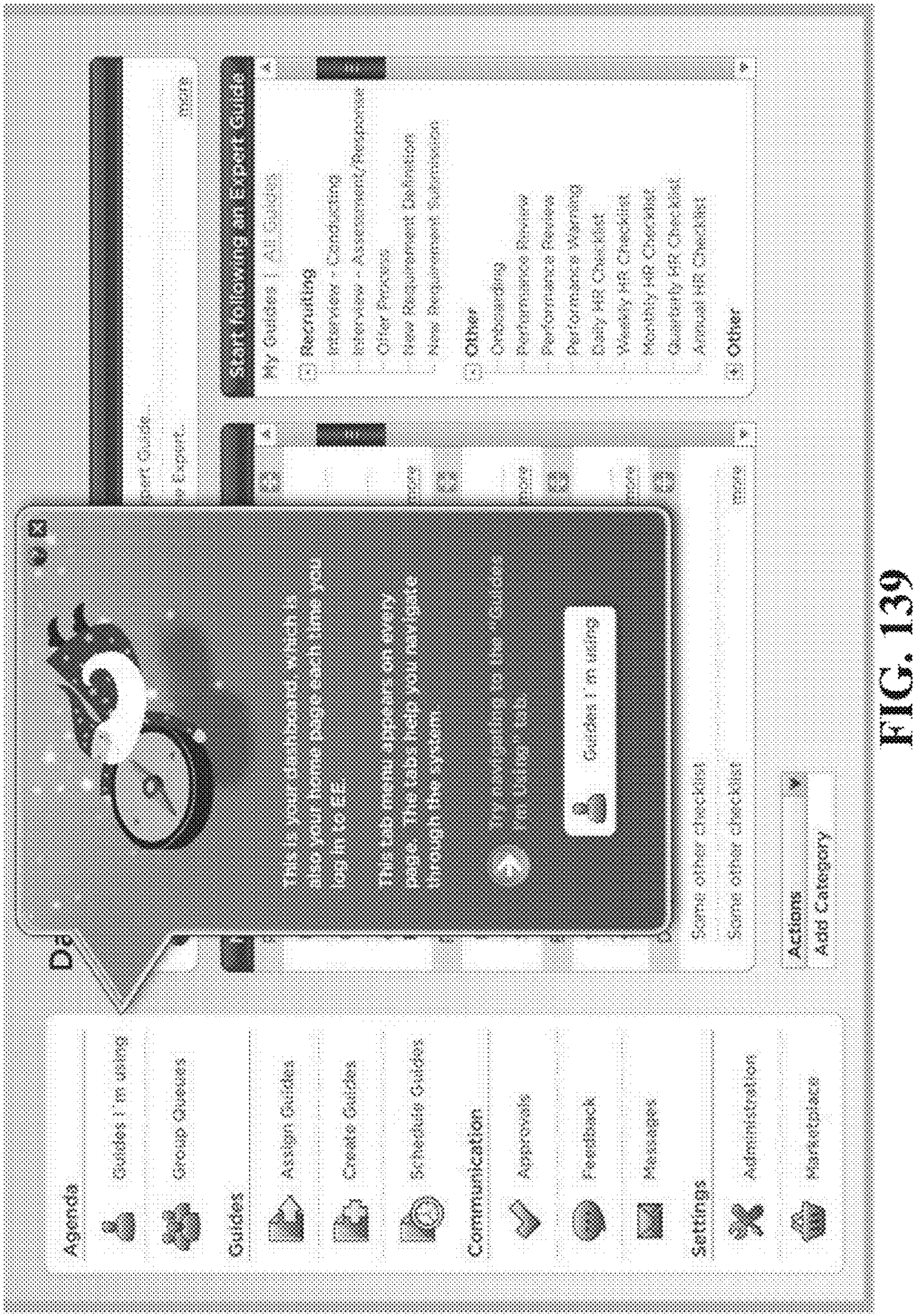
Figure 140:
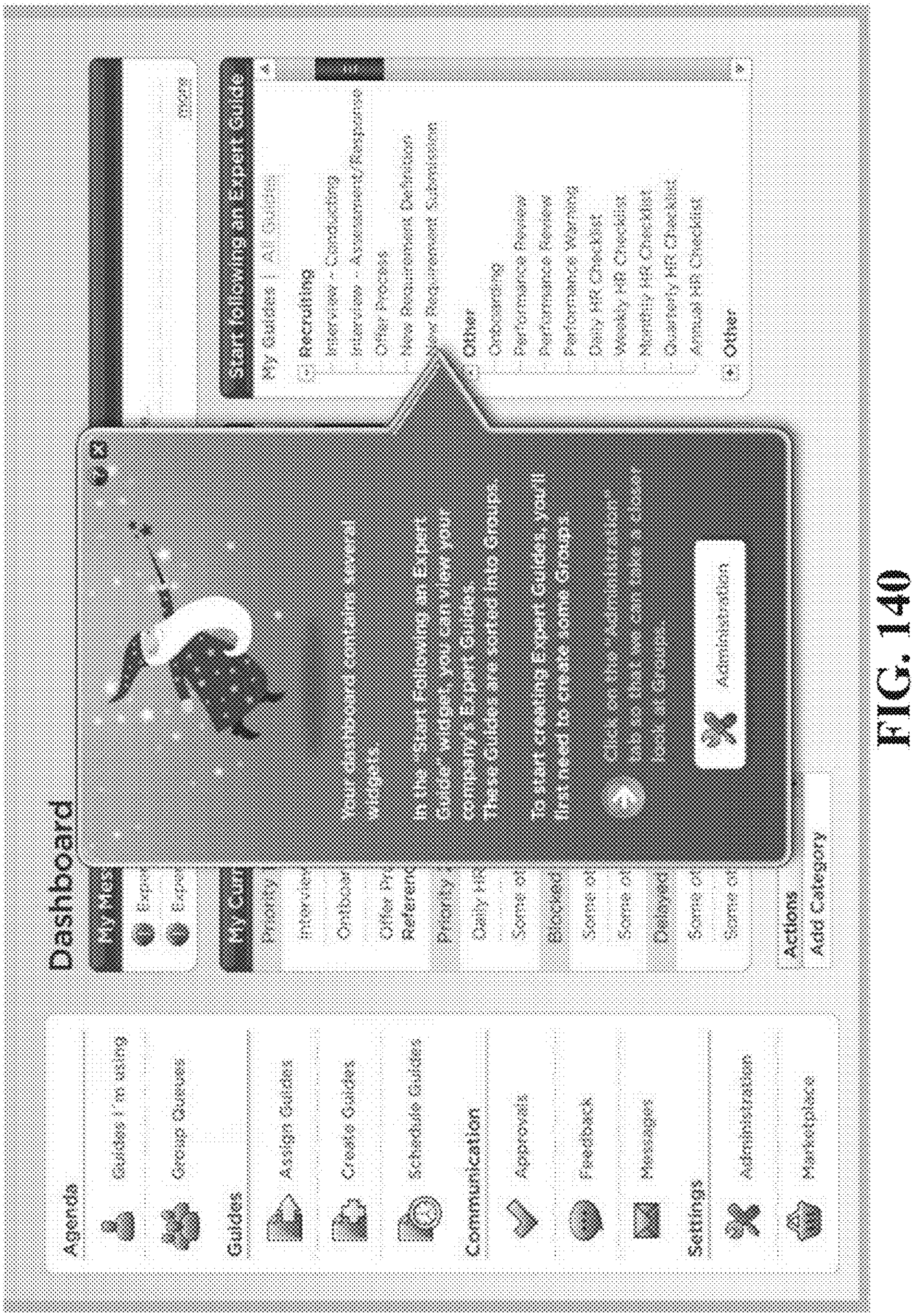
Figure 141:
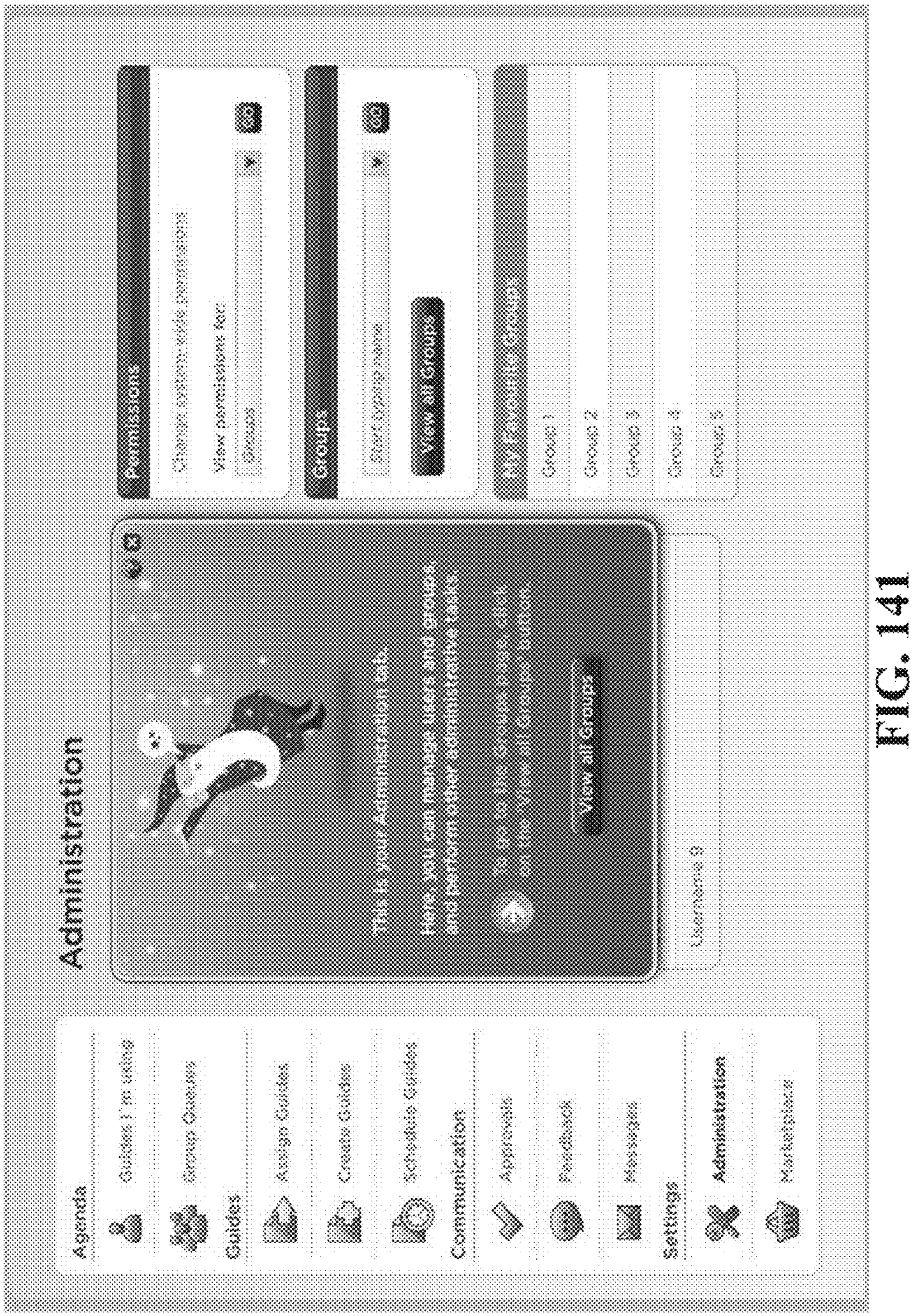
Figure 142:
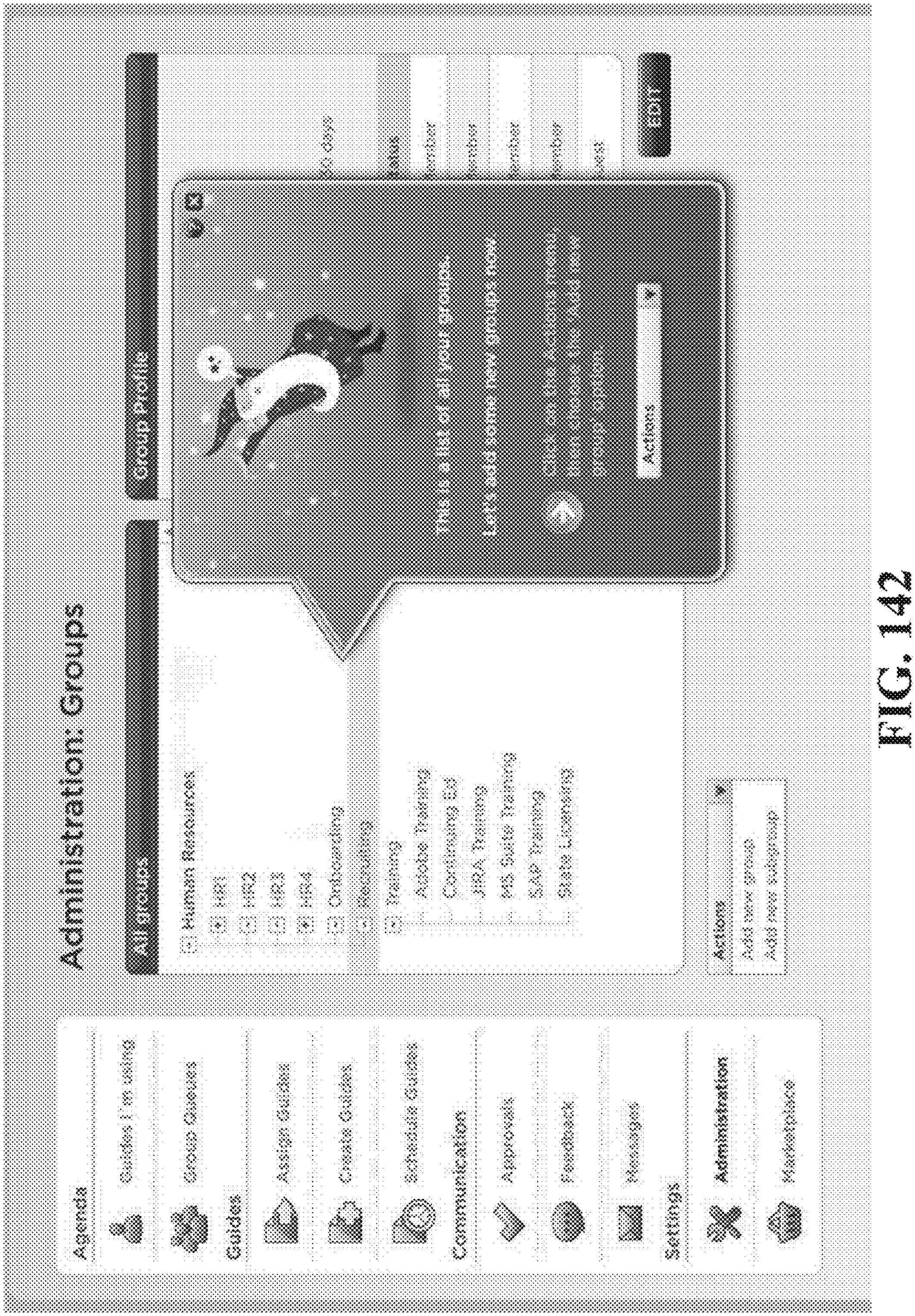
Figure 143:
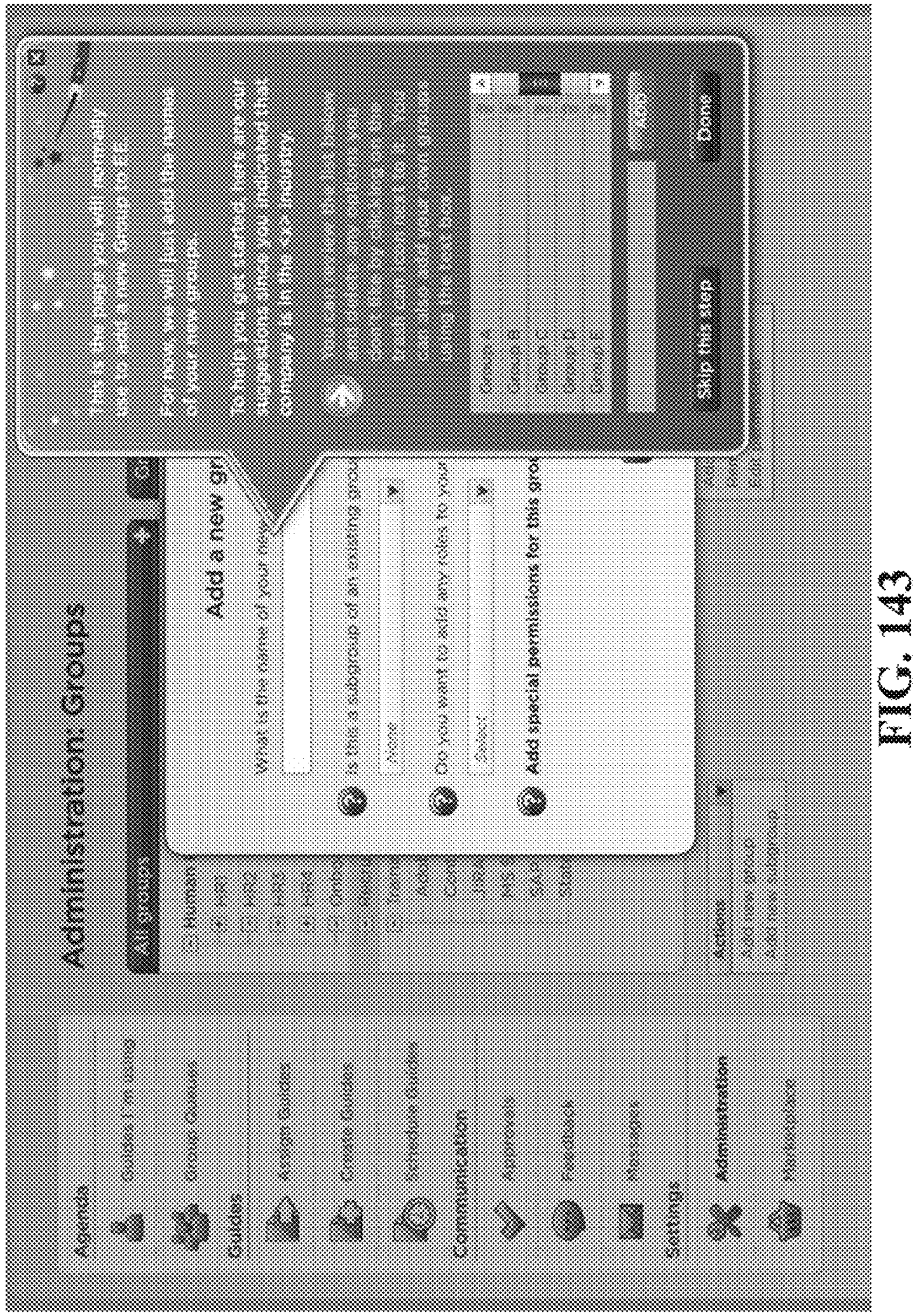
Figure 144:
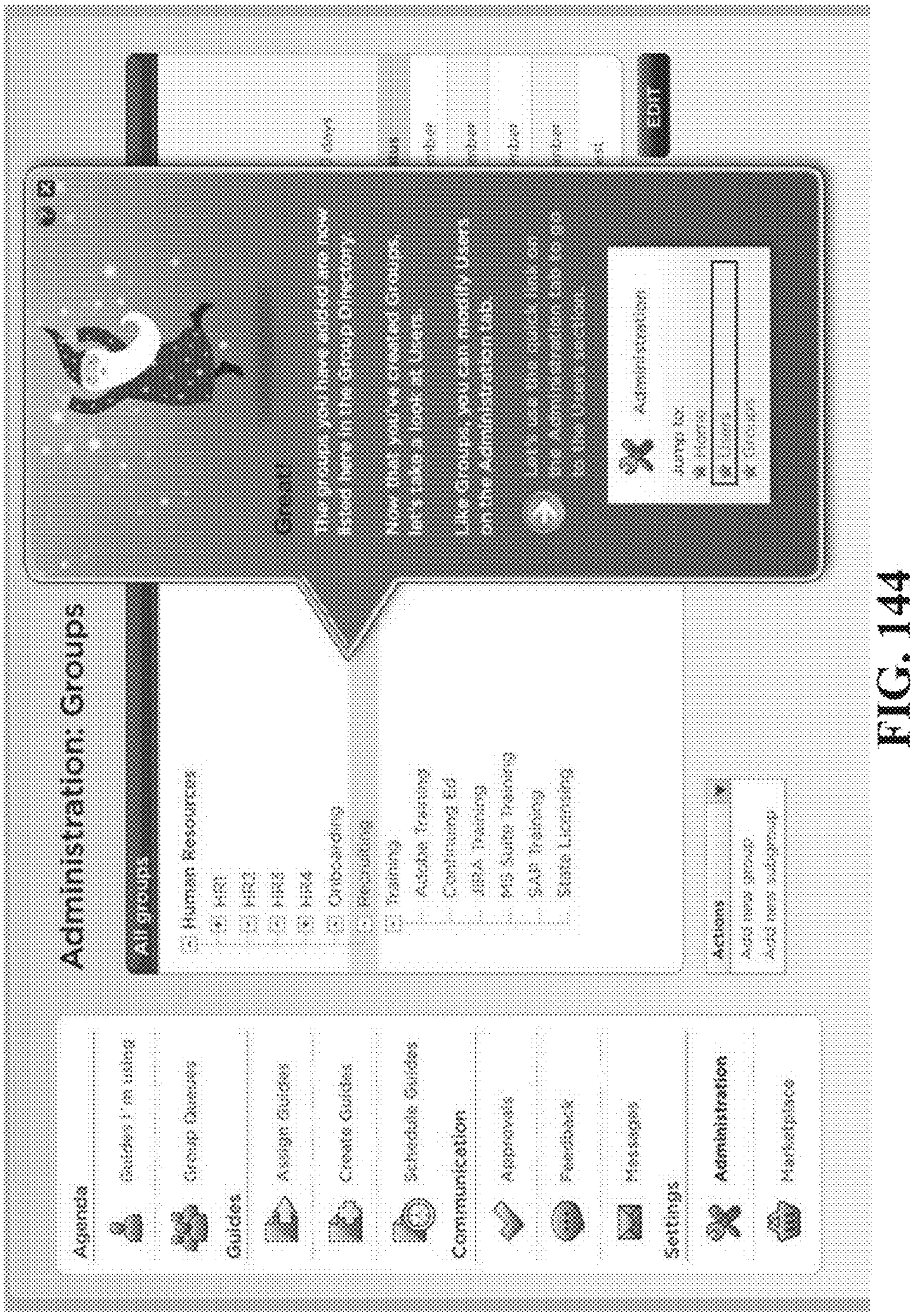
Figure 145:
Figure 146:
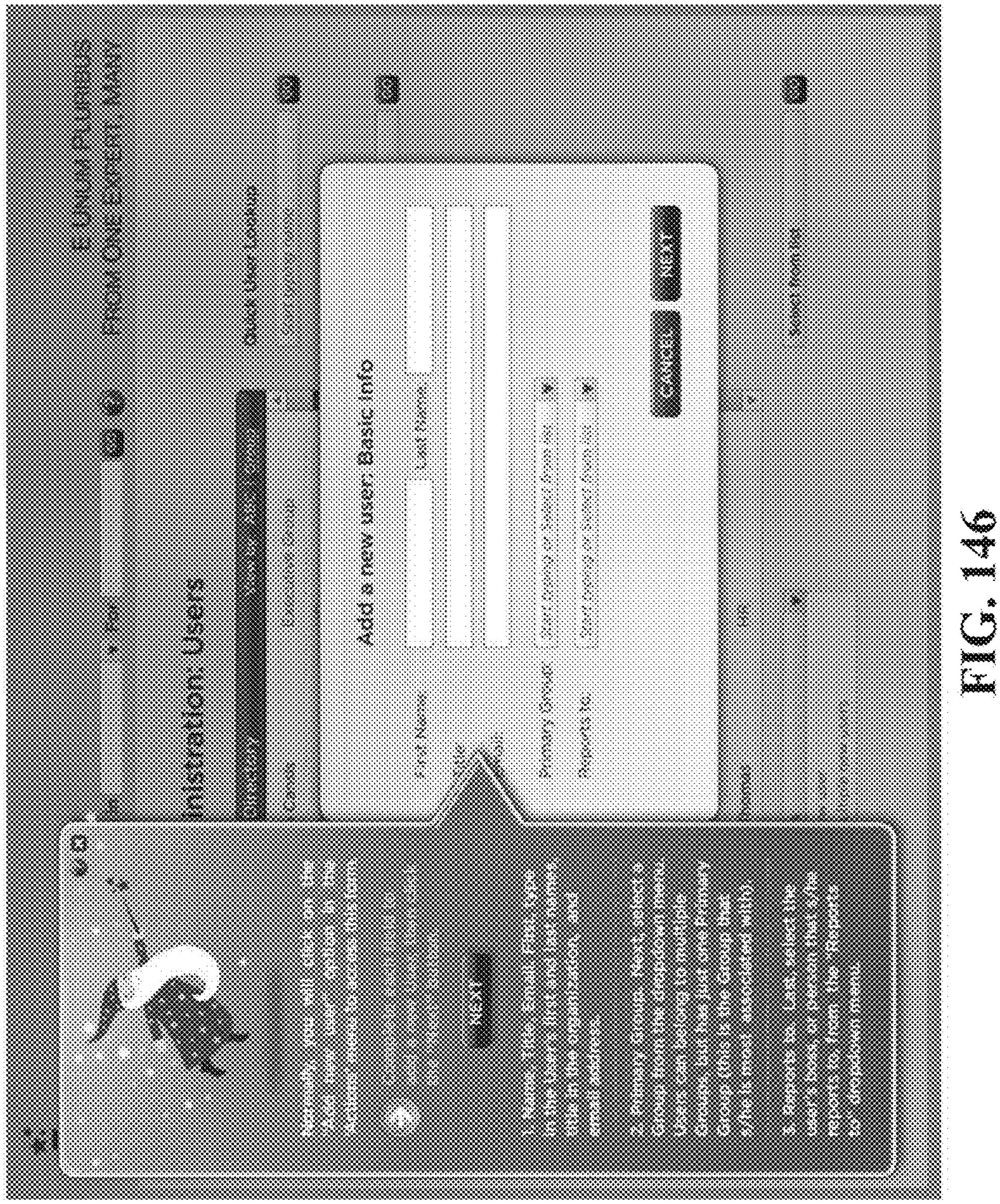
Figure 147:
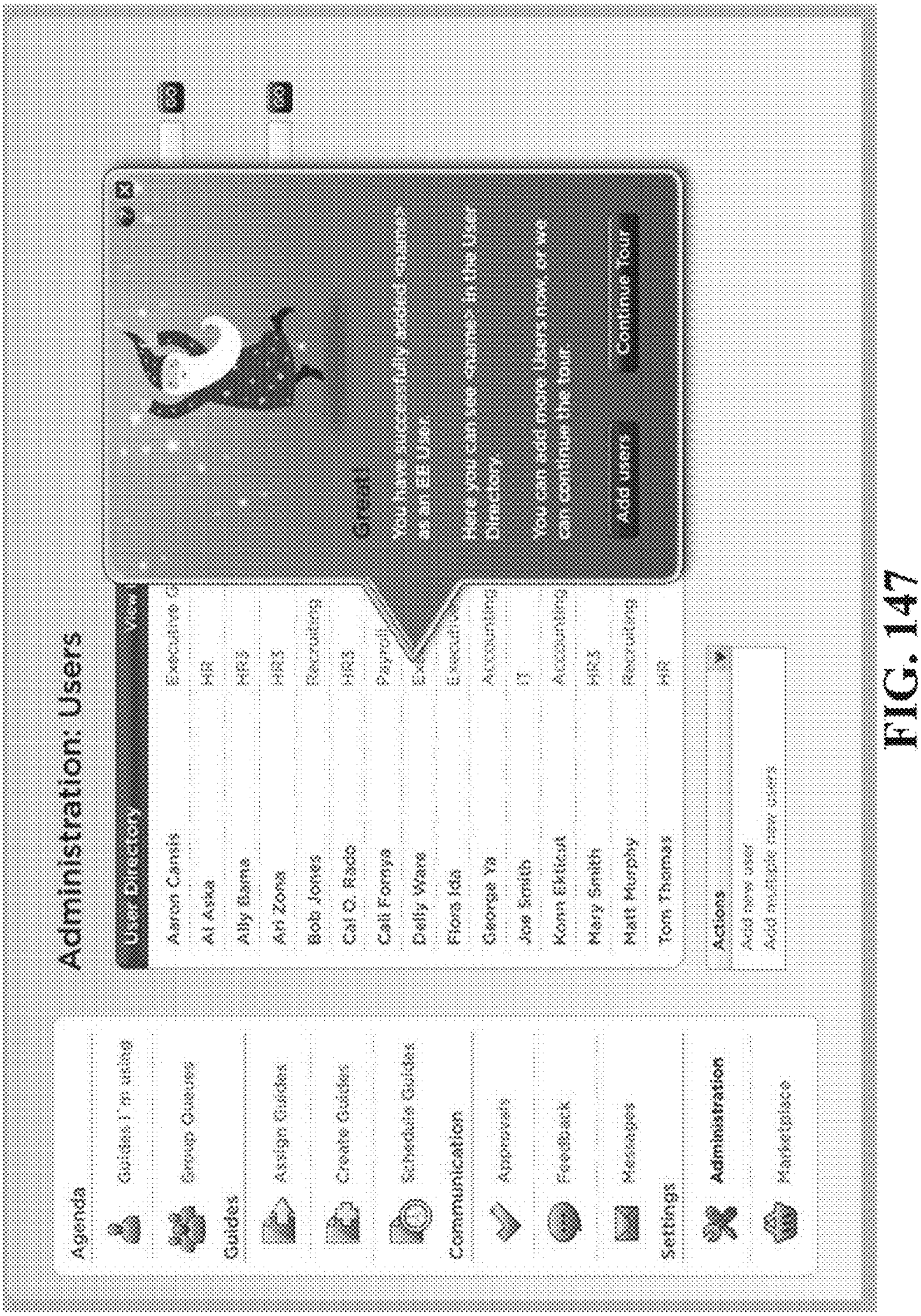
Figure 148:
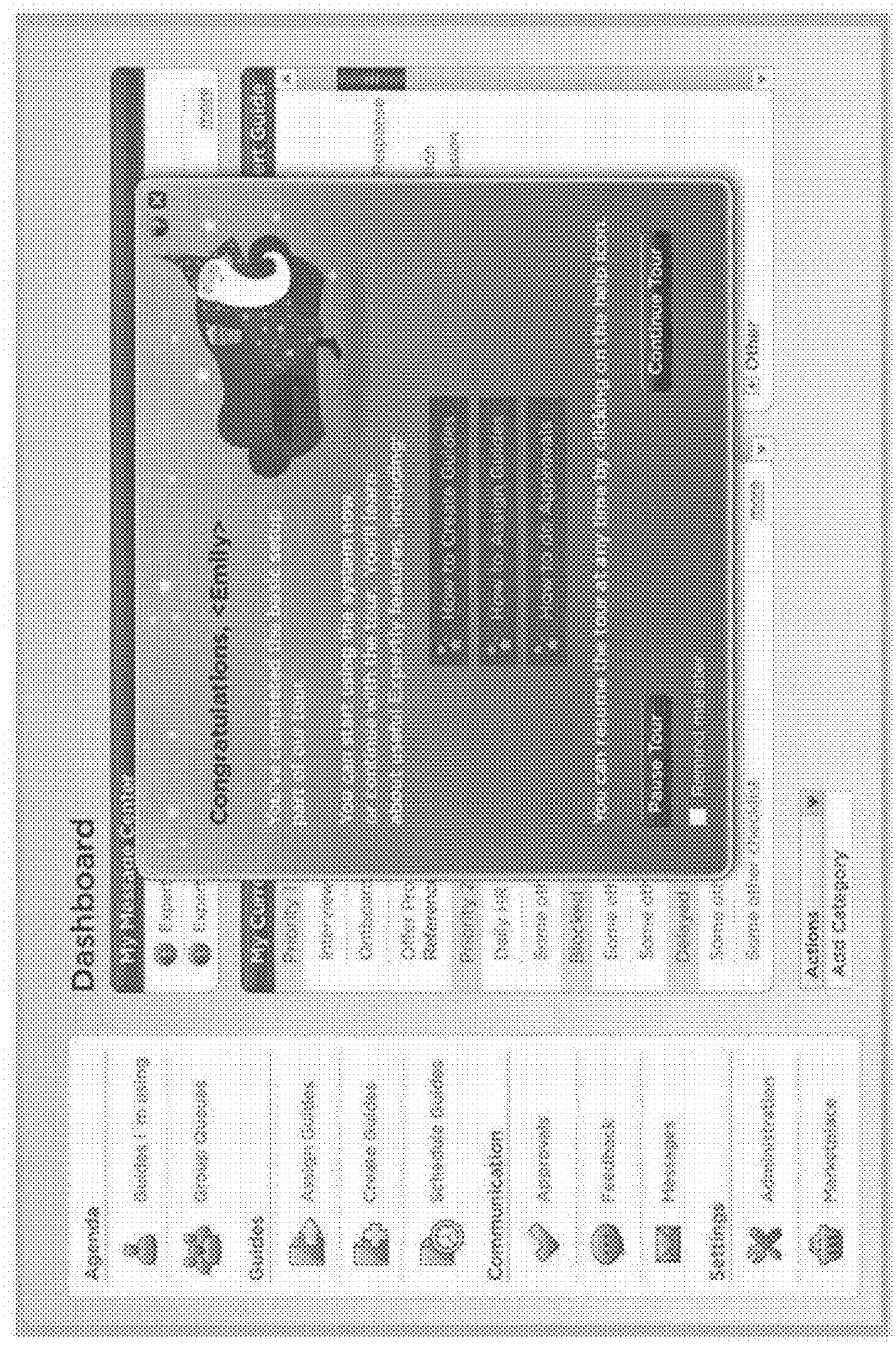
Figure 149:
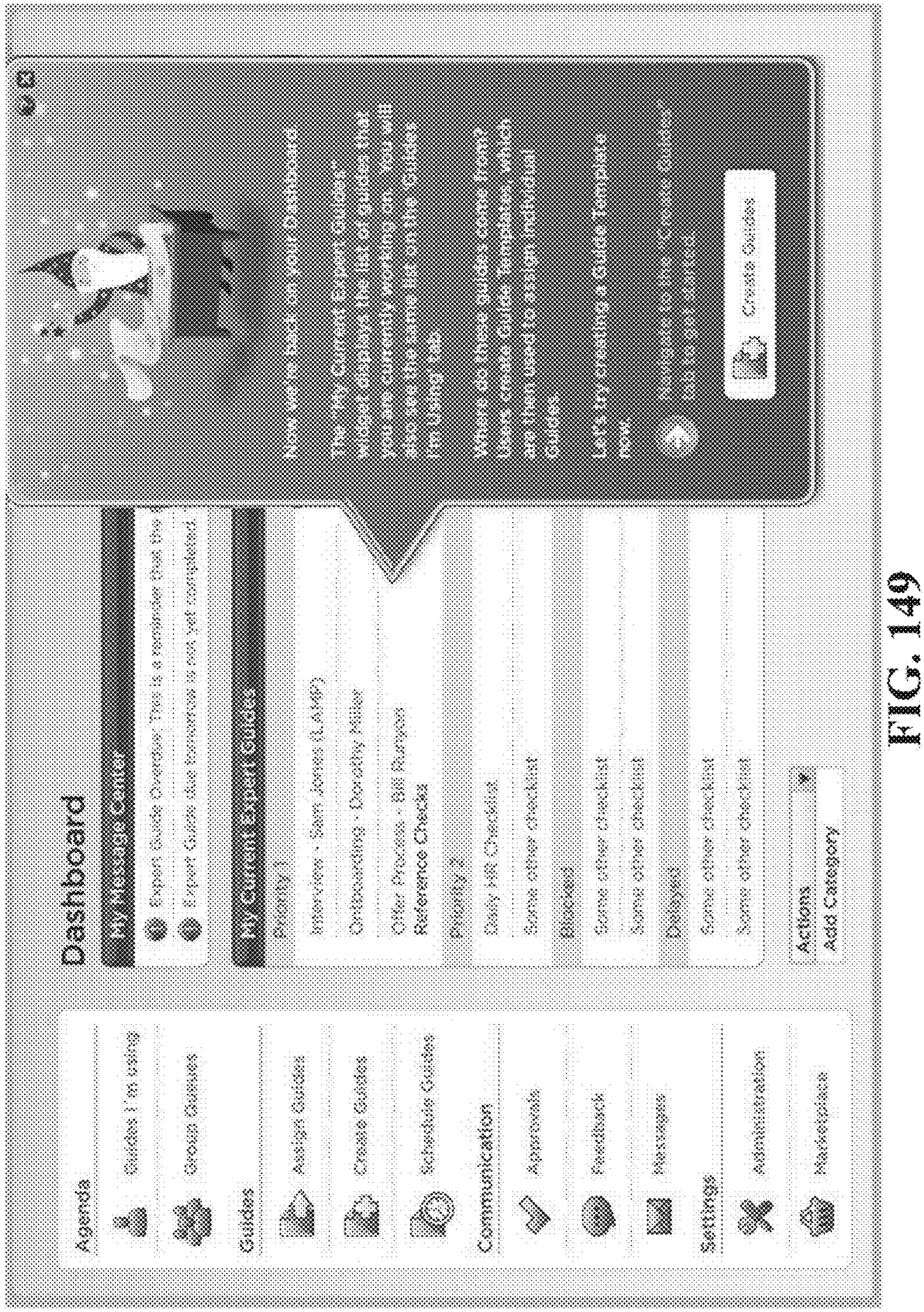
Figure 150:
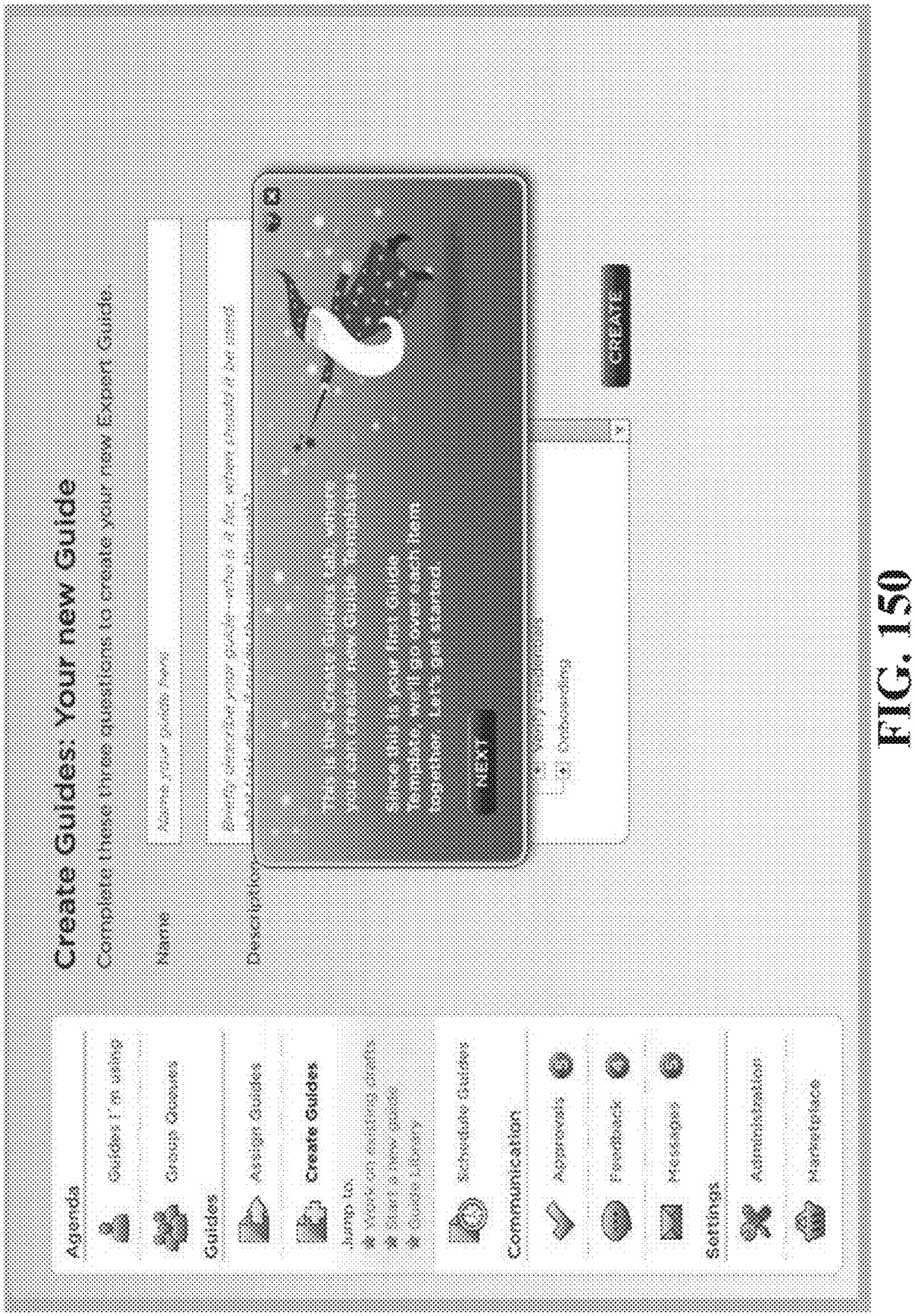
Figure 151:
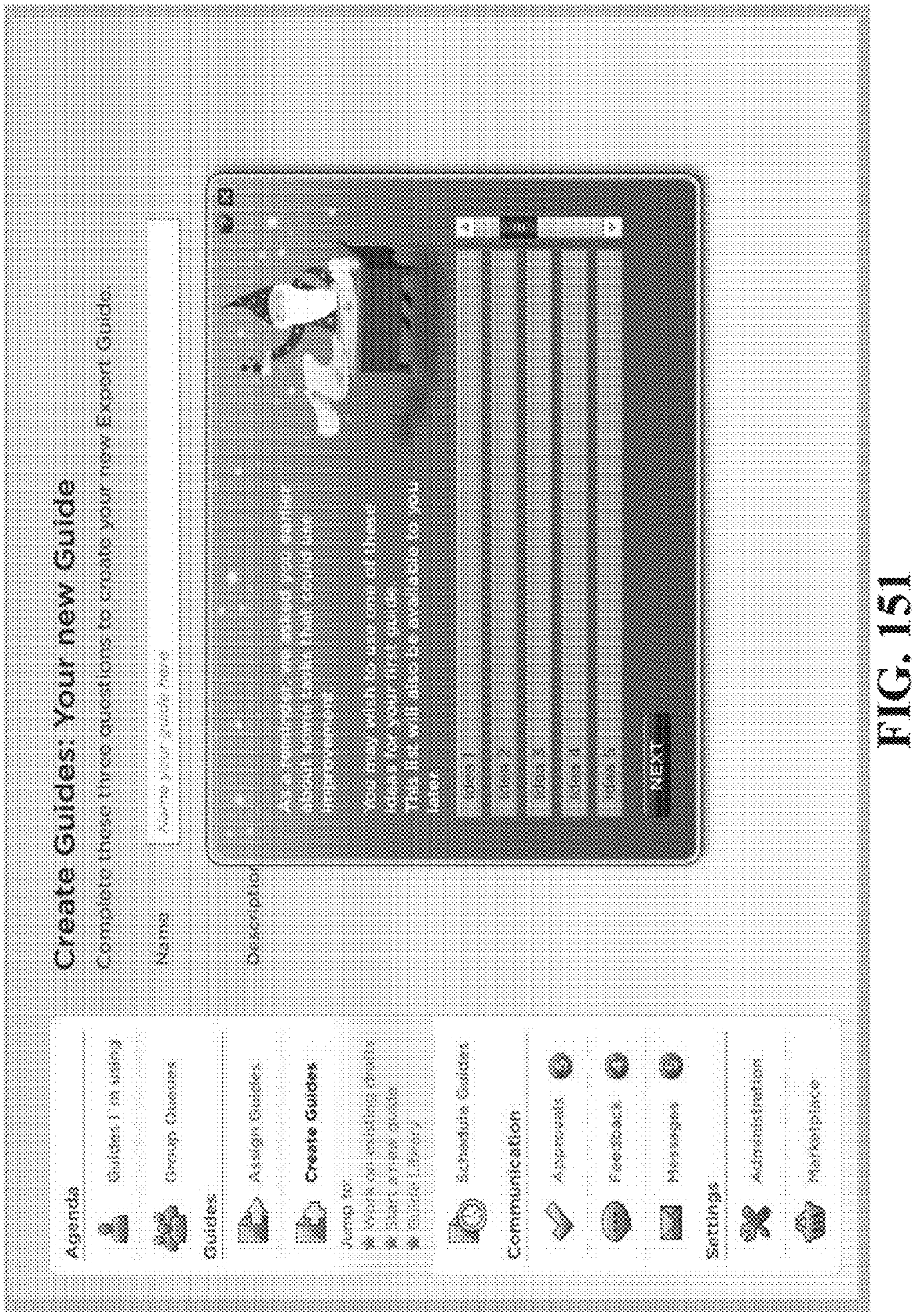
Figure 152:
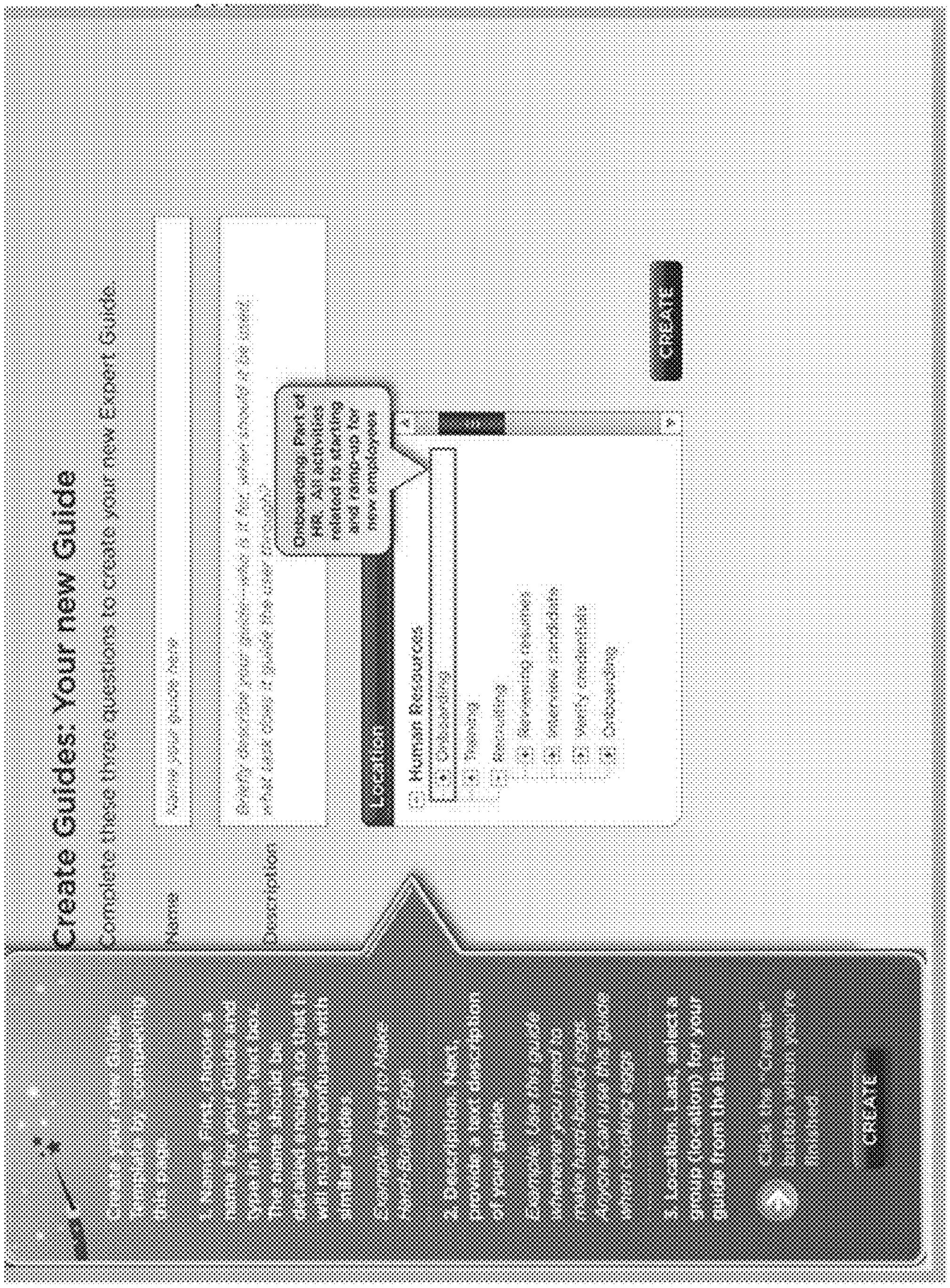
Figure 153:
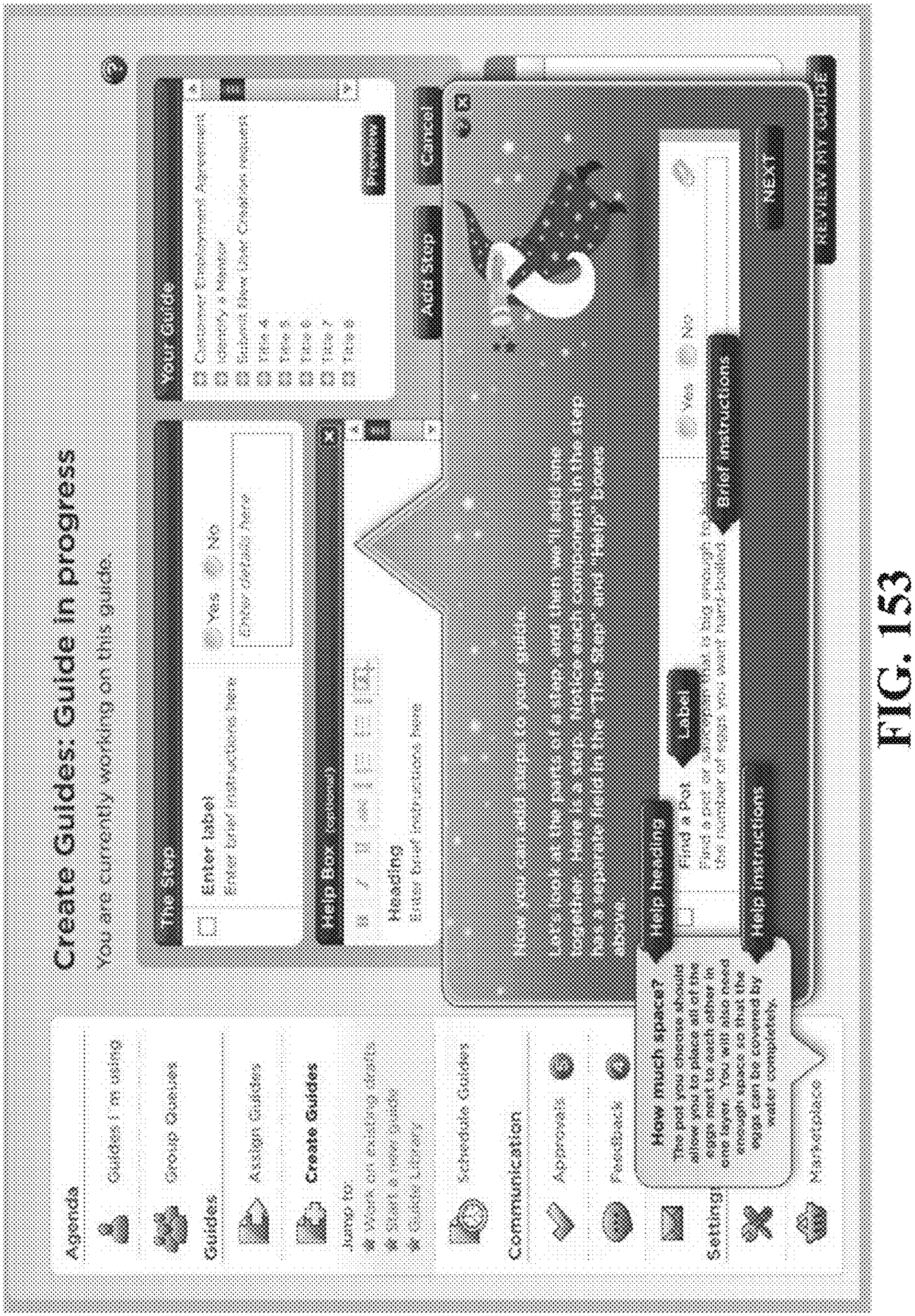
Figure 154:
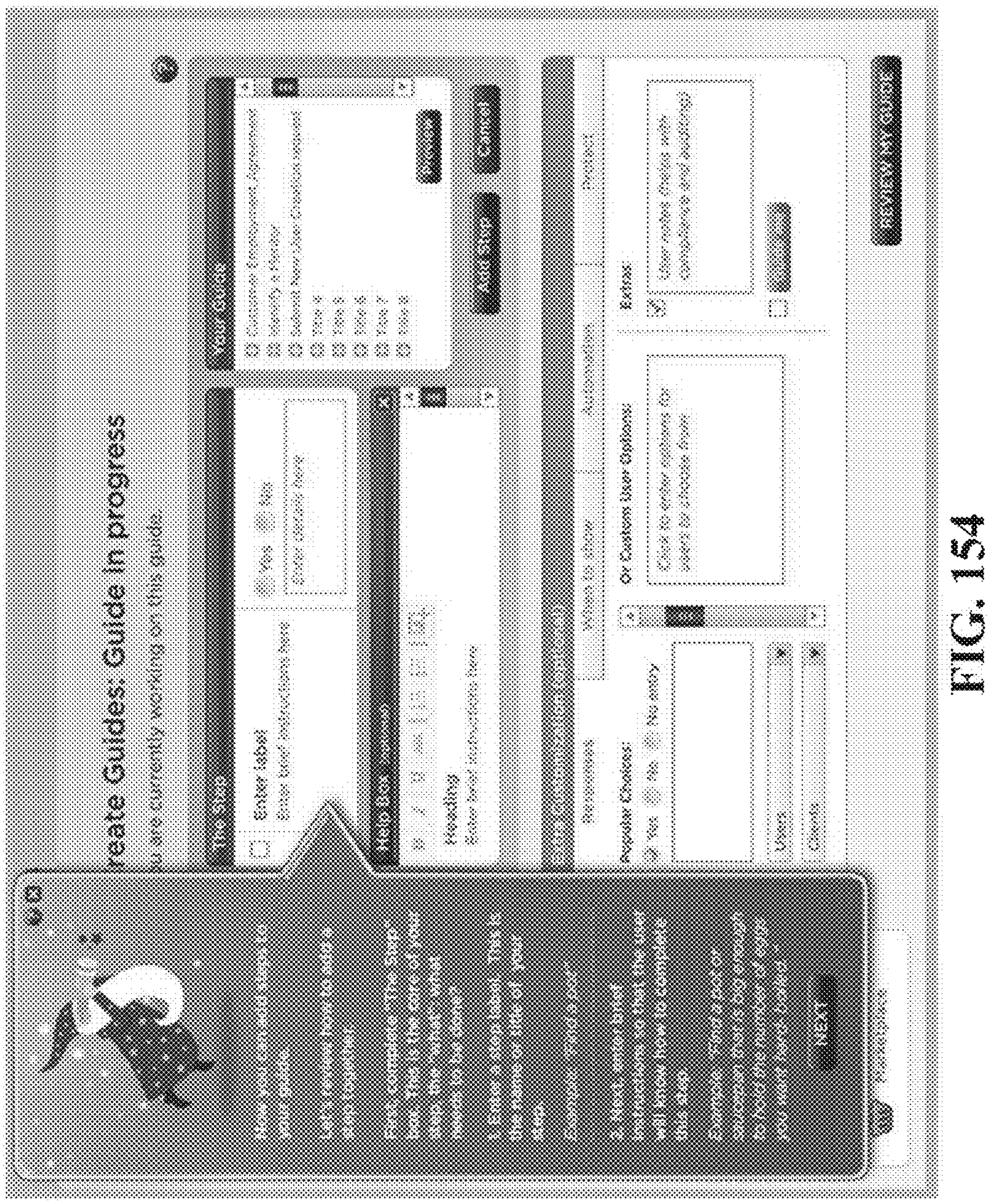
Figure 155:
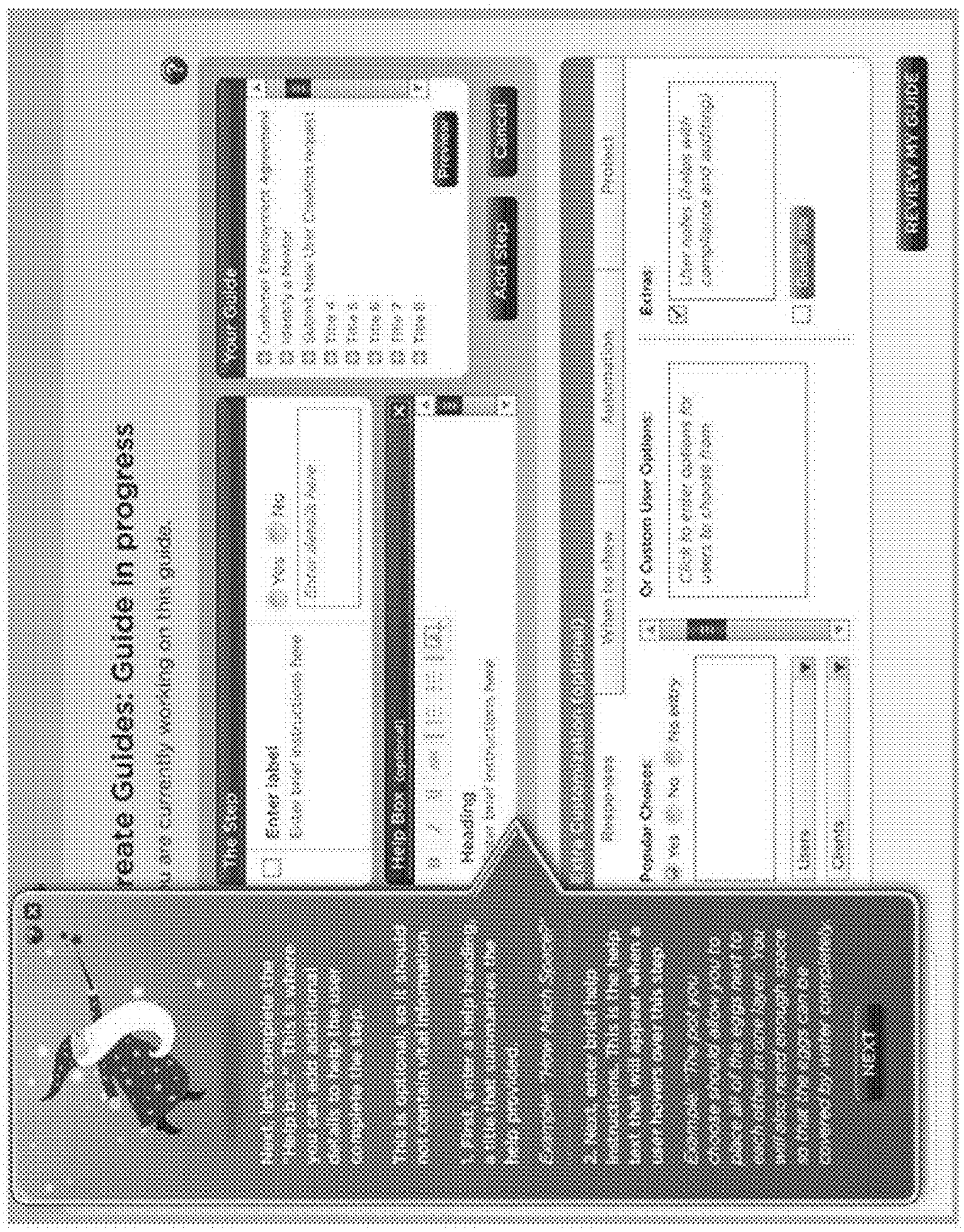
Figure 156:
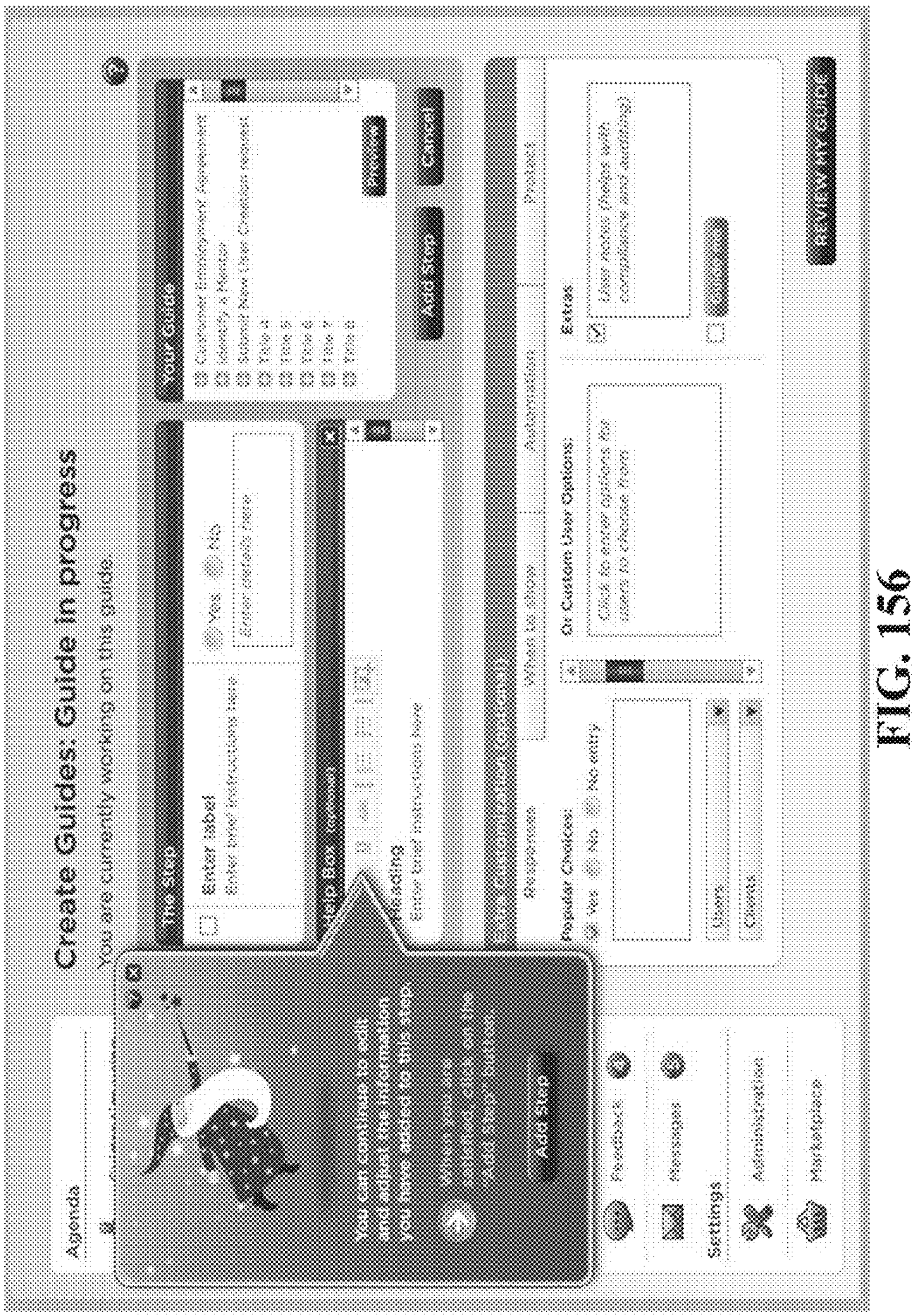
Figure 157:
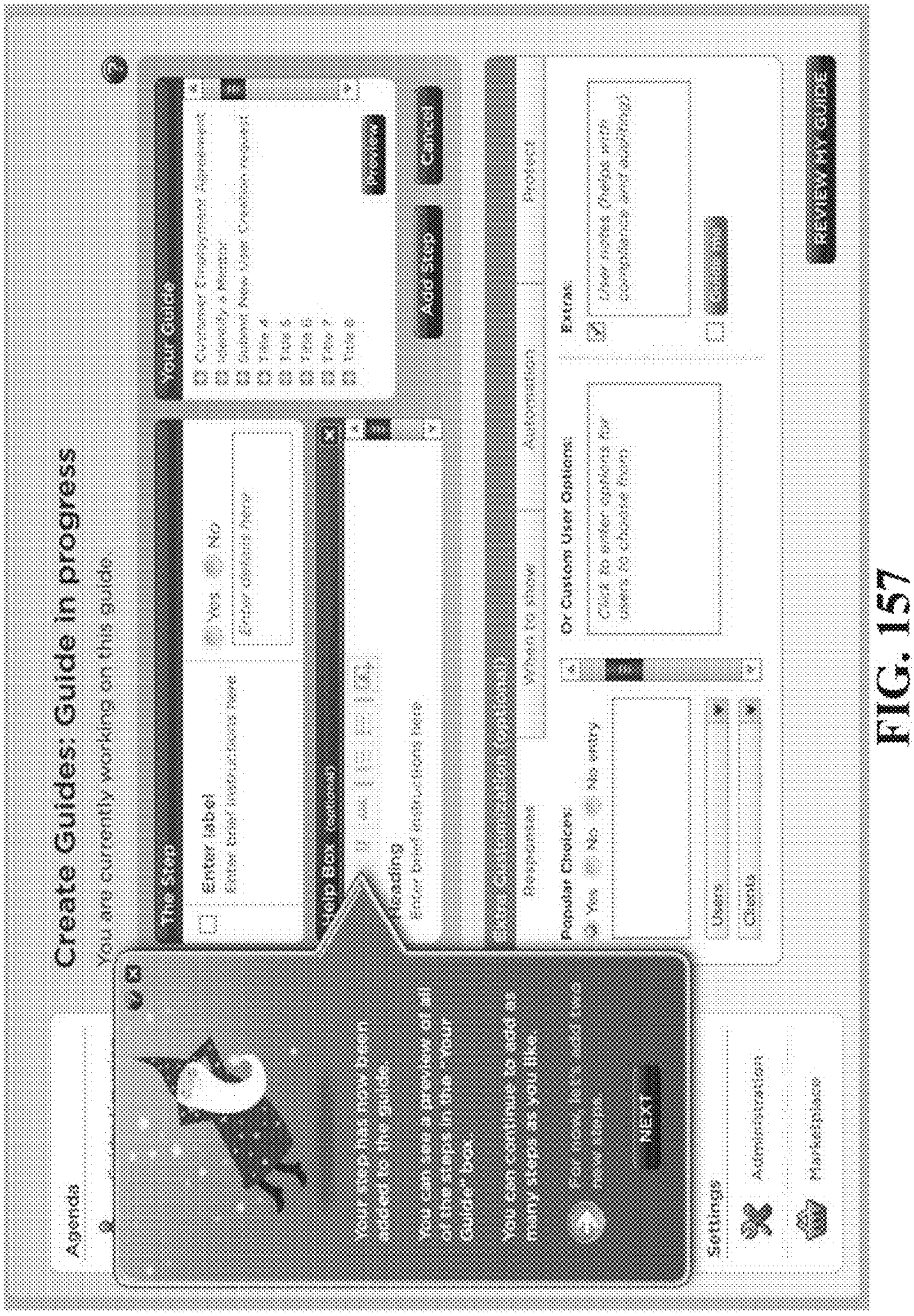
Figure 158:
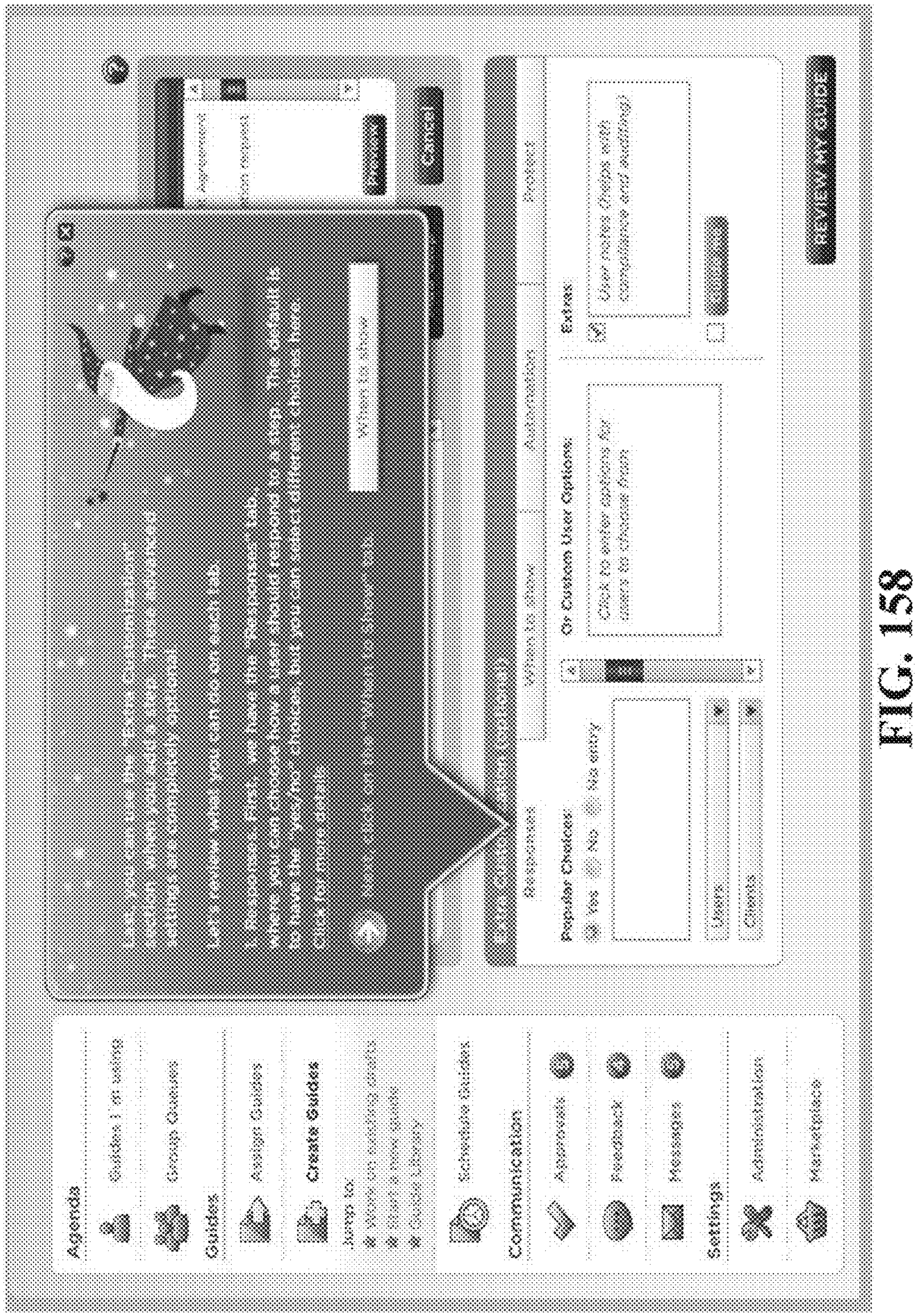
Figure 159:
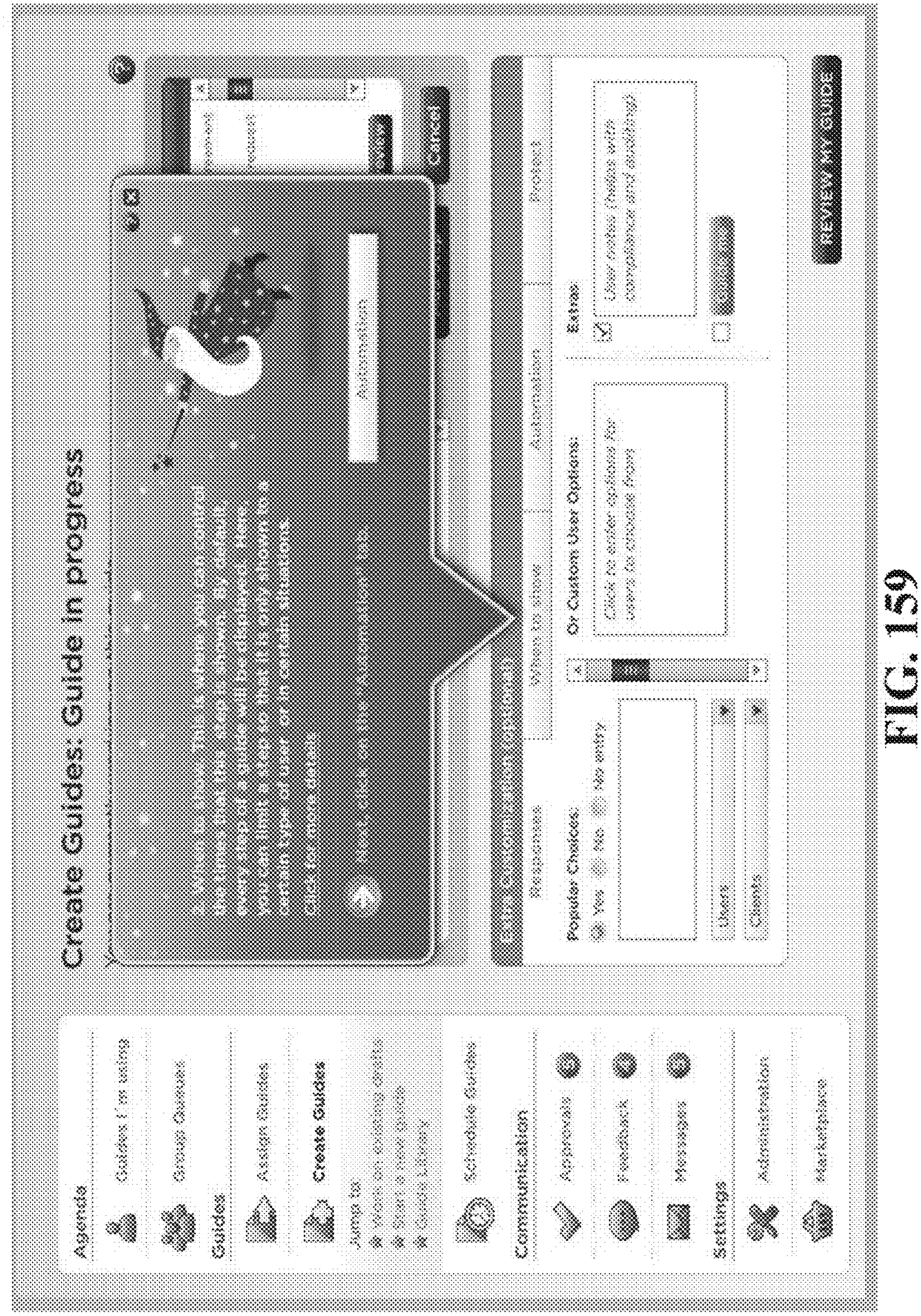
Figure 160:
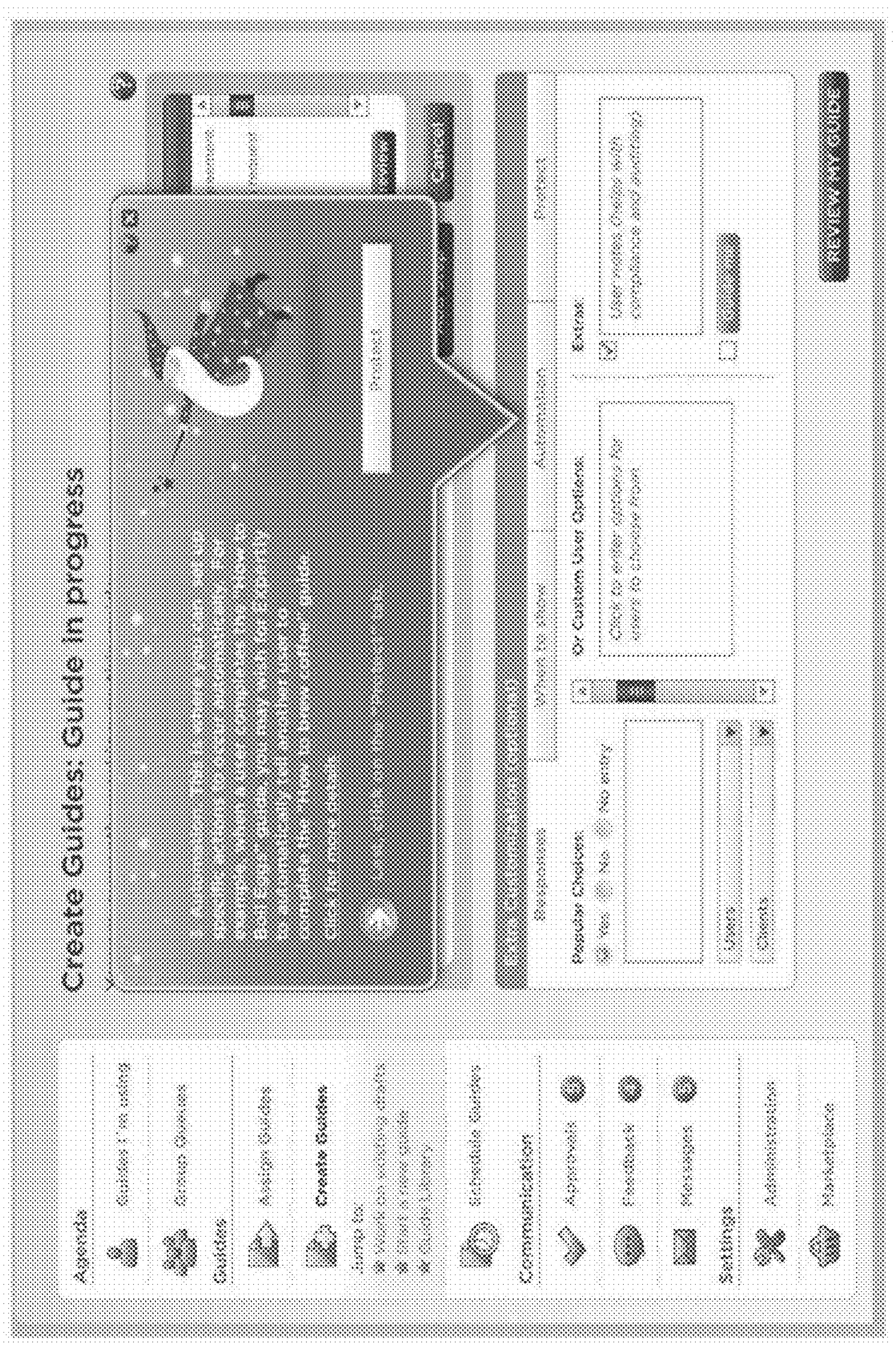
Figure 161:
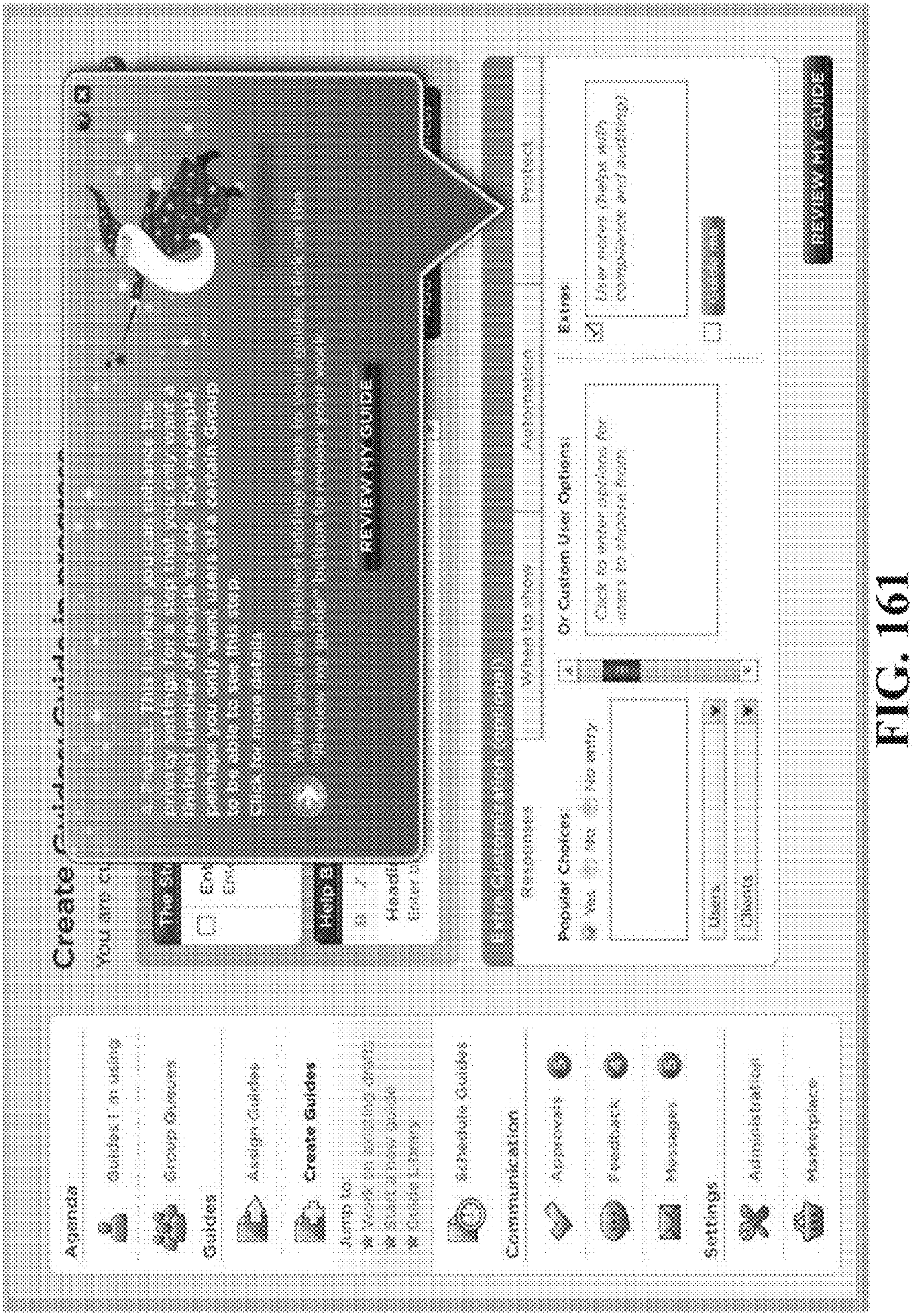
Figure 162:
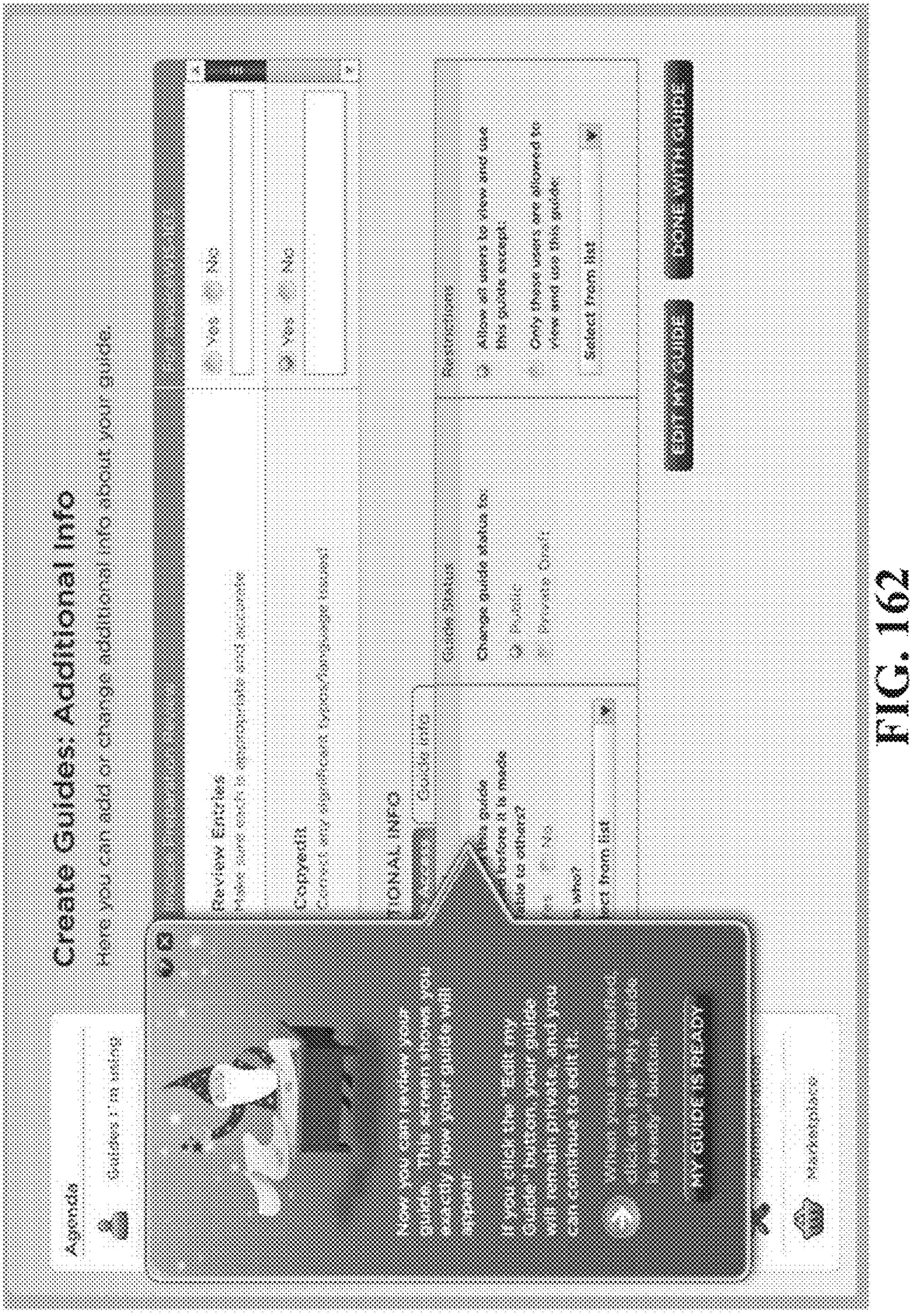
Figure 163:
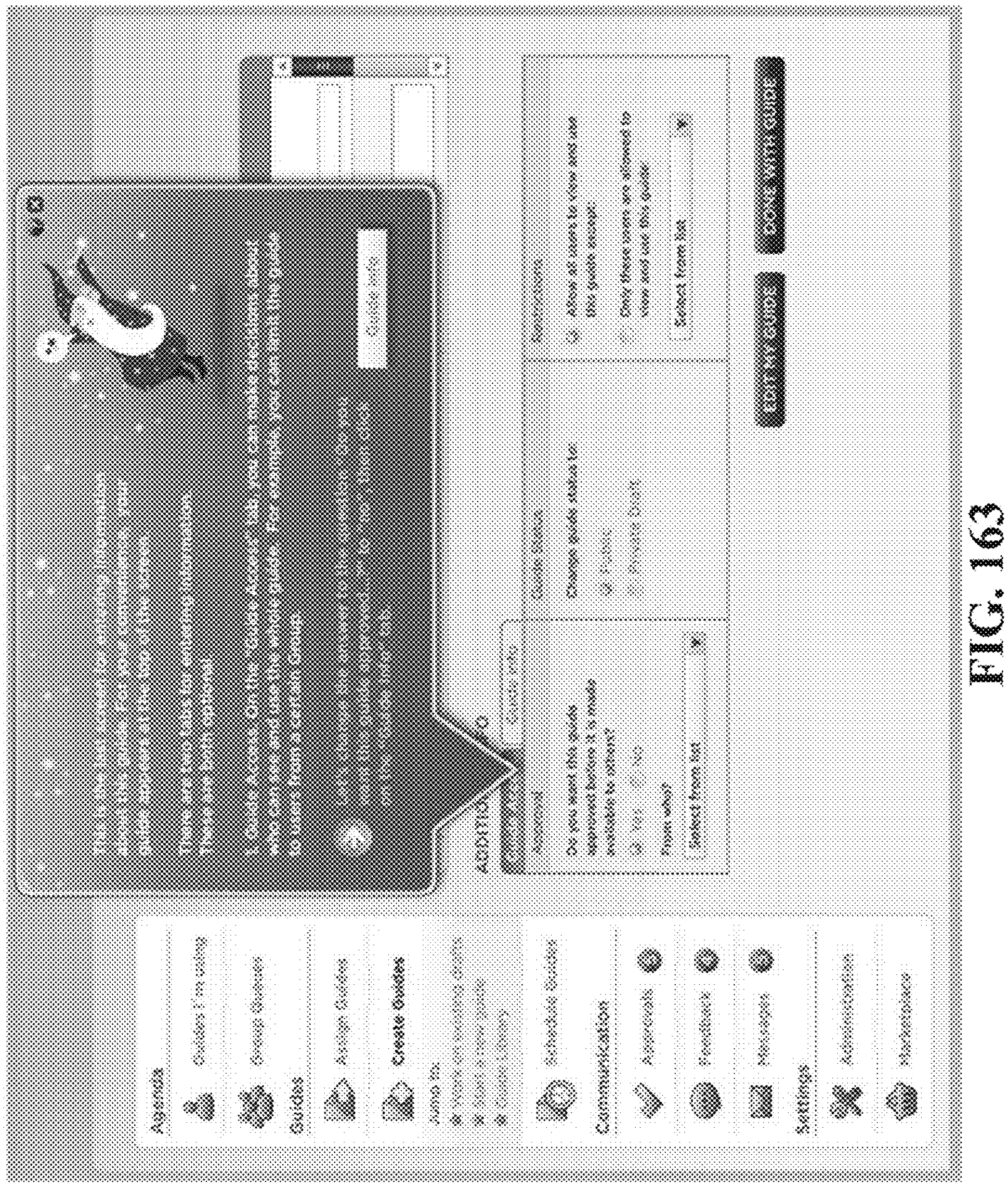
Figure 164:
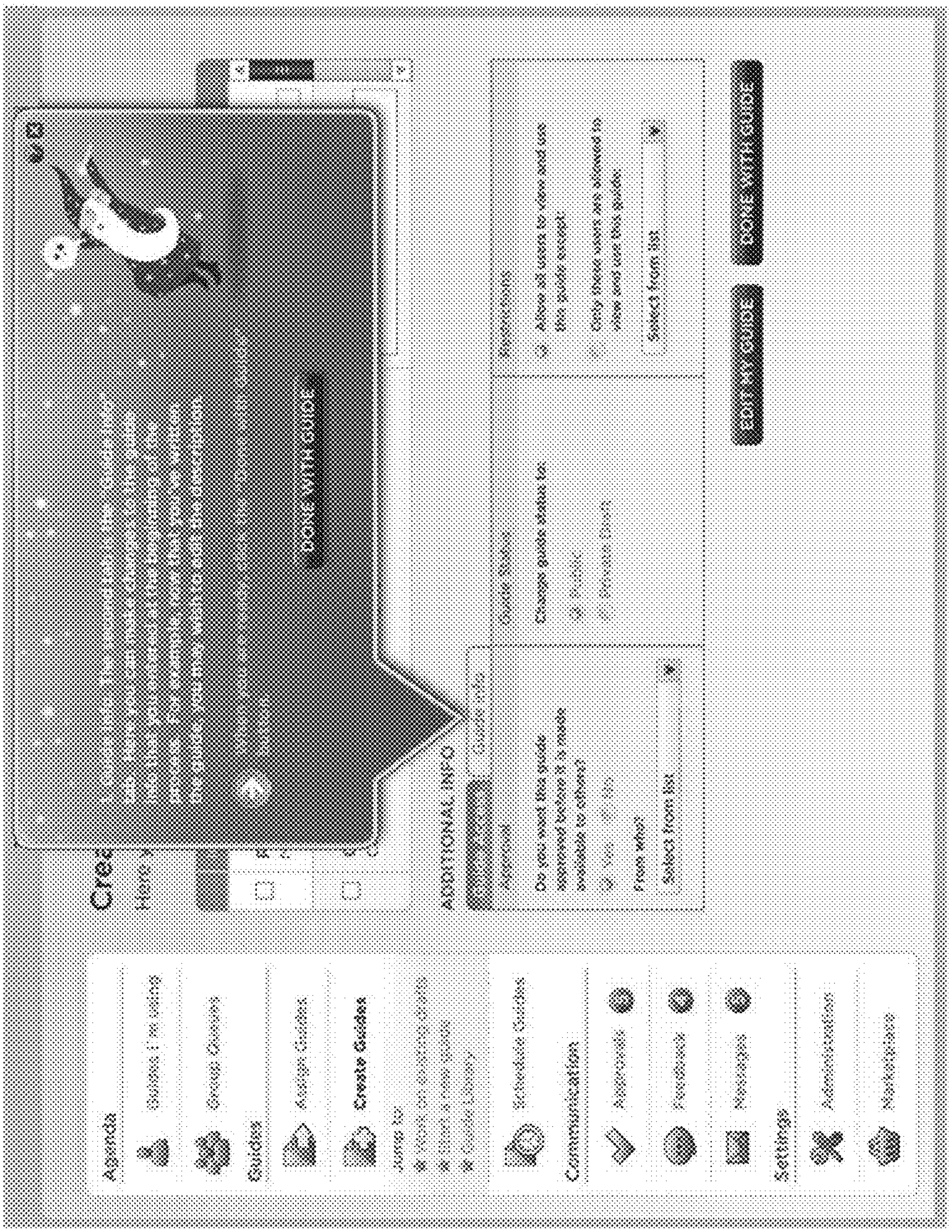
Figure 165:
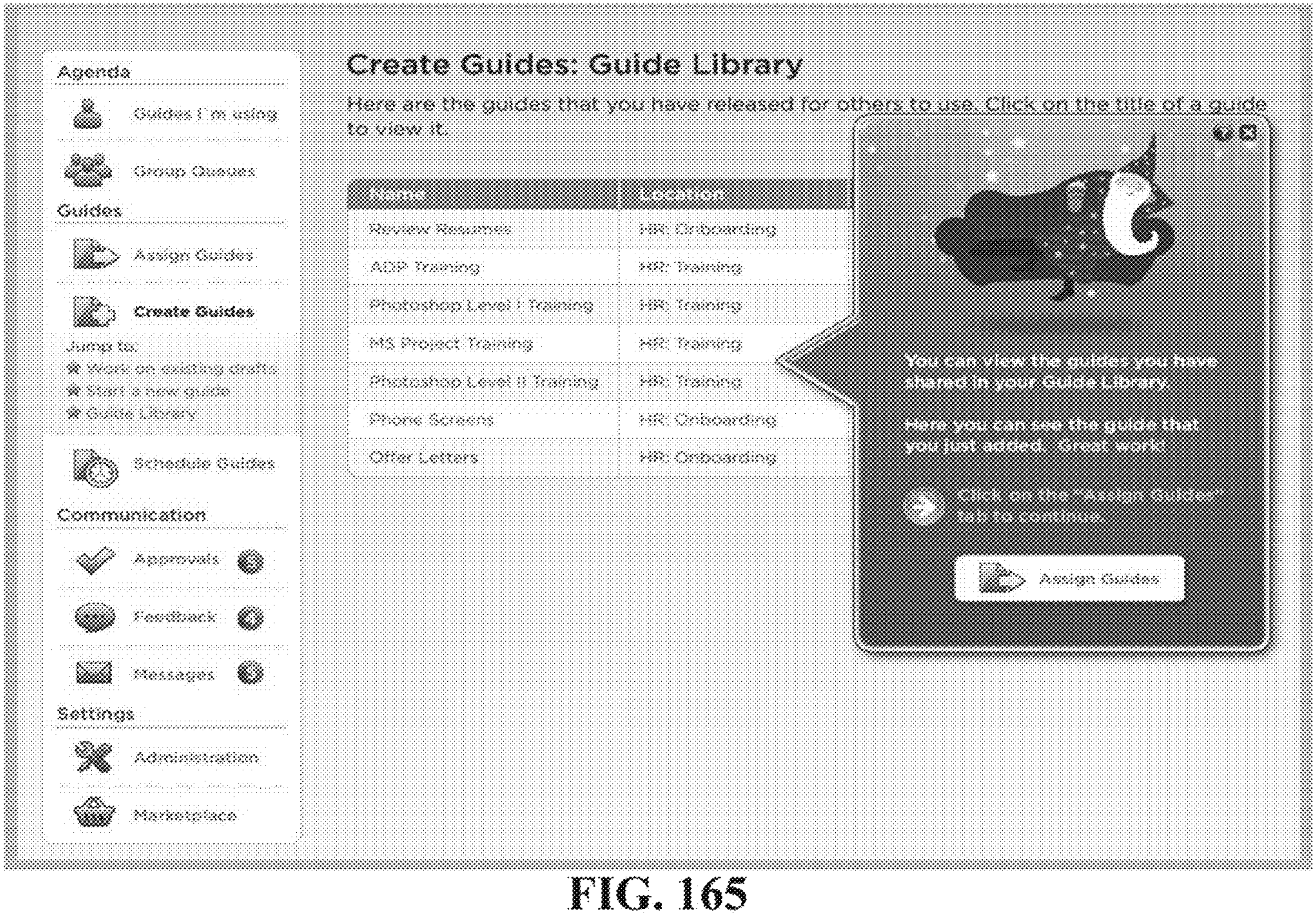
Figure 166:
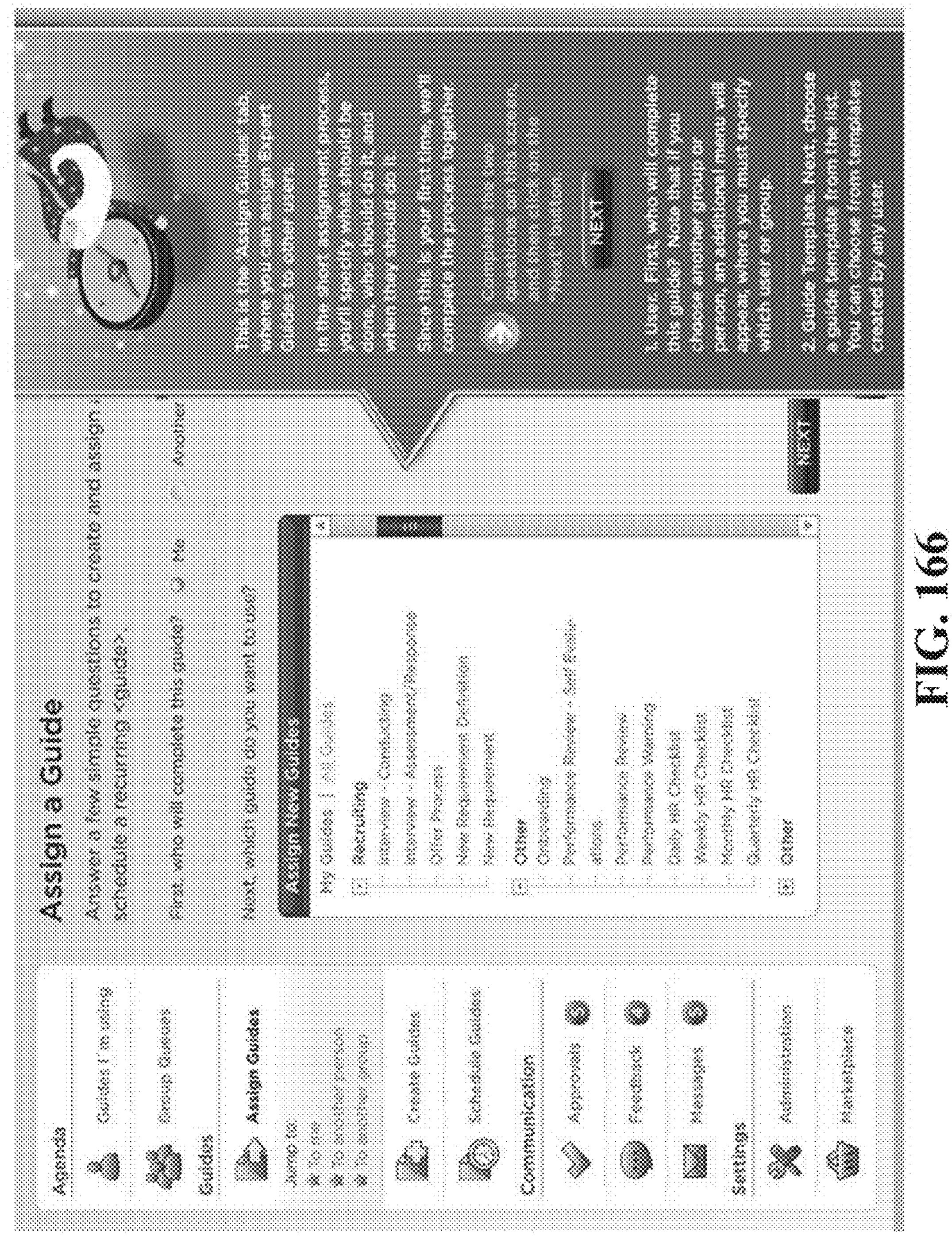
Figure 167:
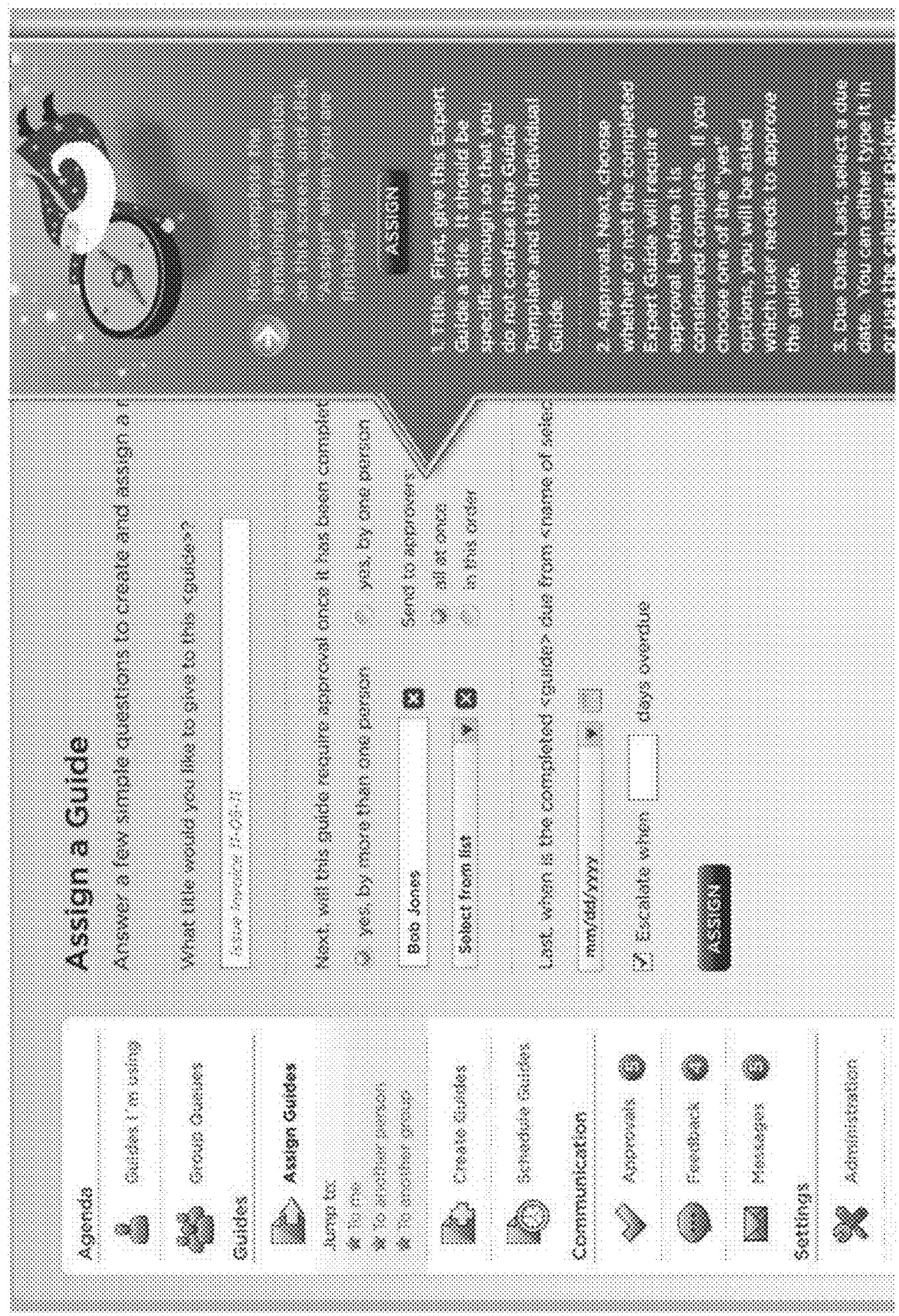
Figure 168:
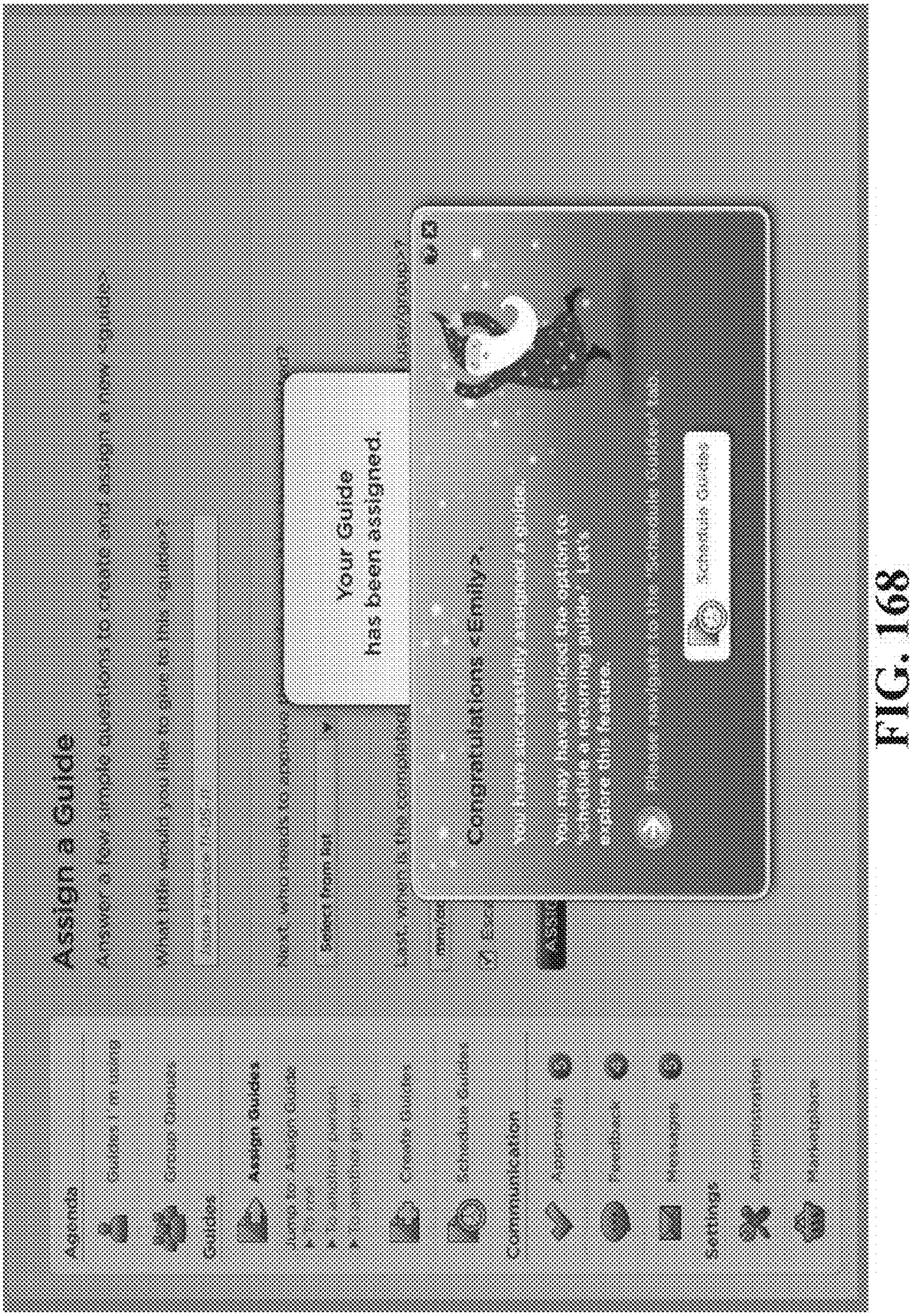
Figure 169:
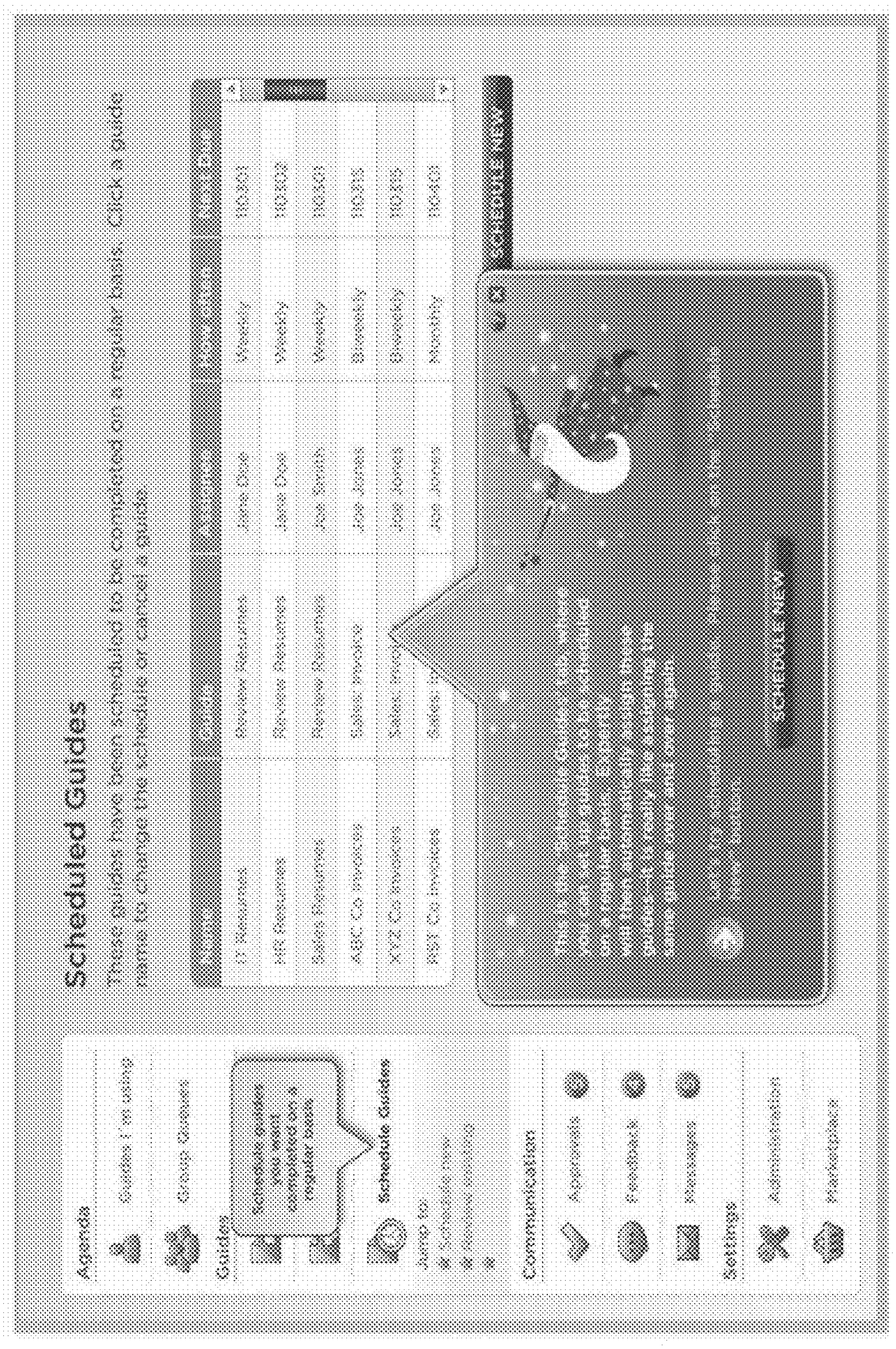
Figure 170:
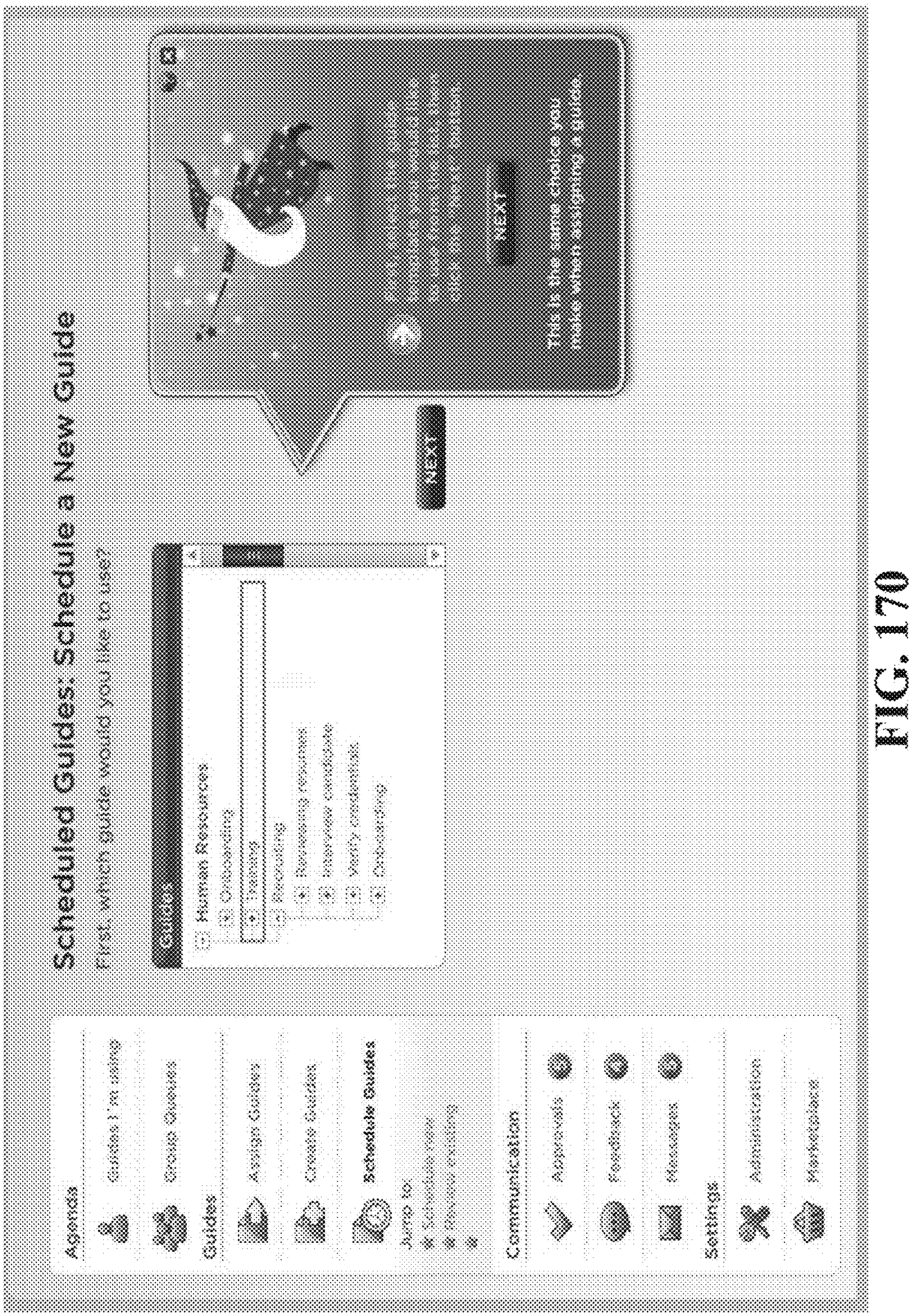
Figure 171:
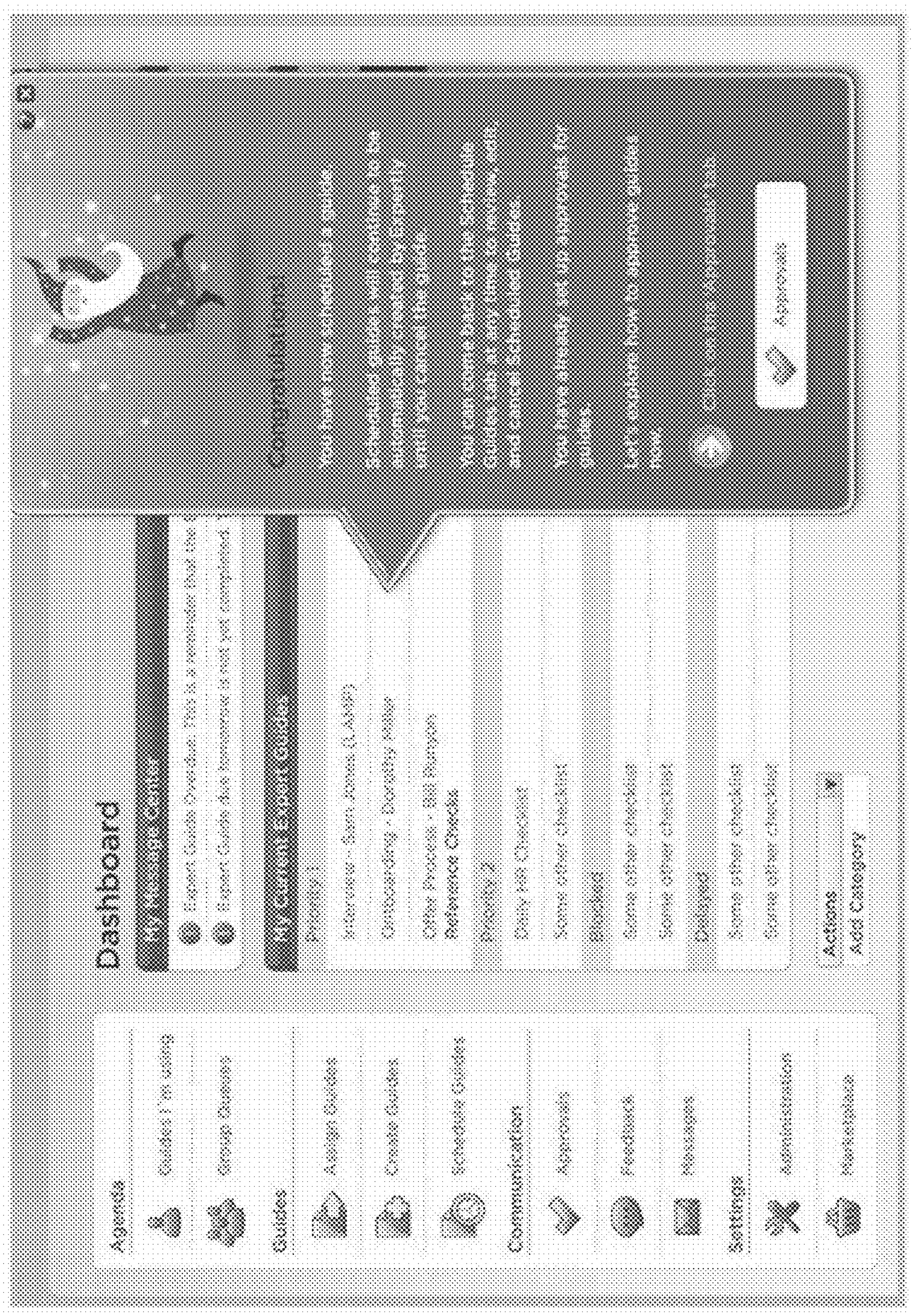
Figure 172:
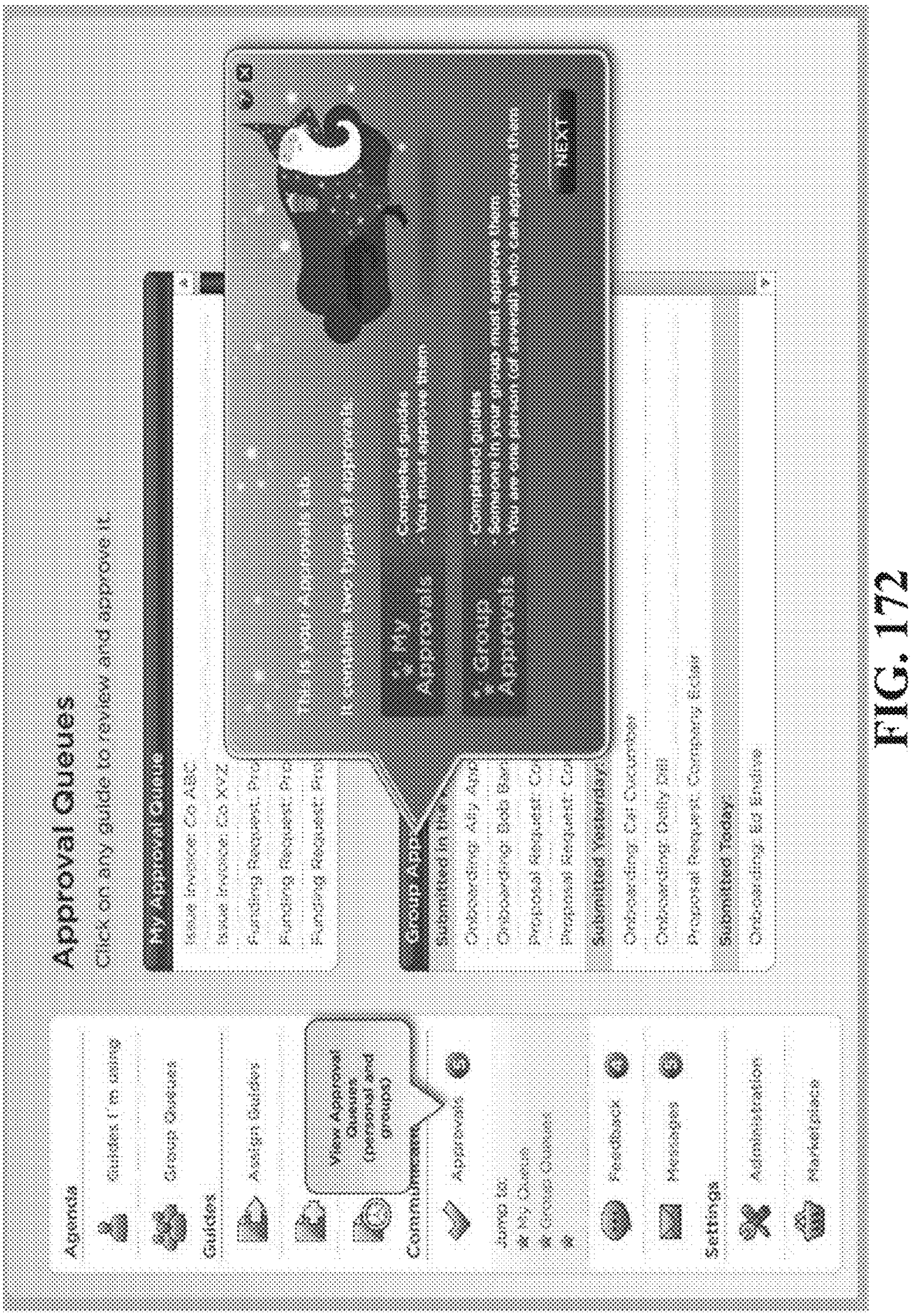
Figure 173:
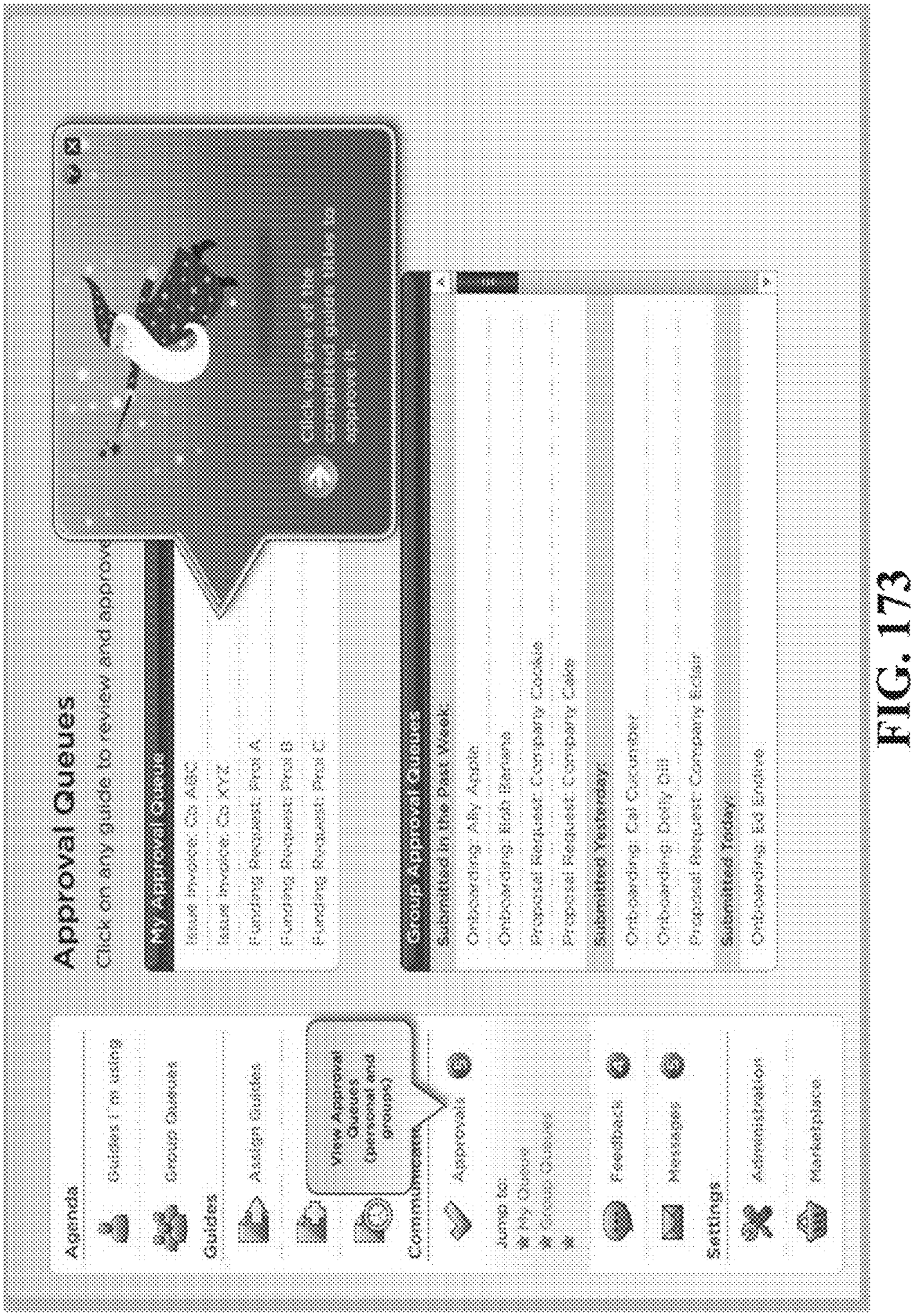
Figure 174:
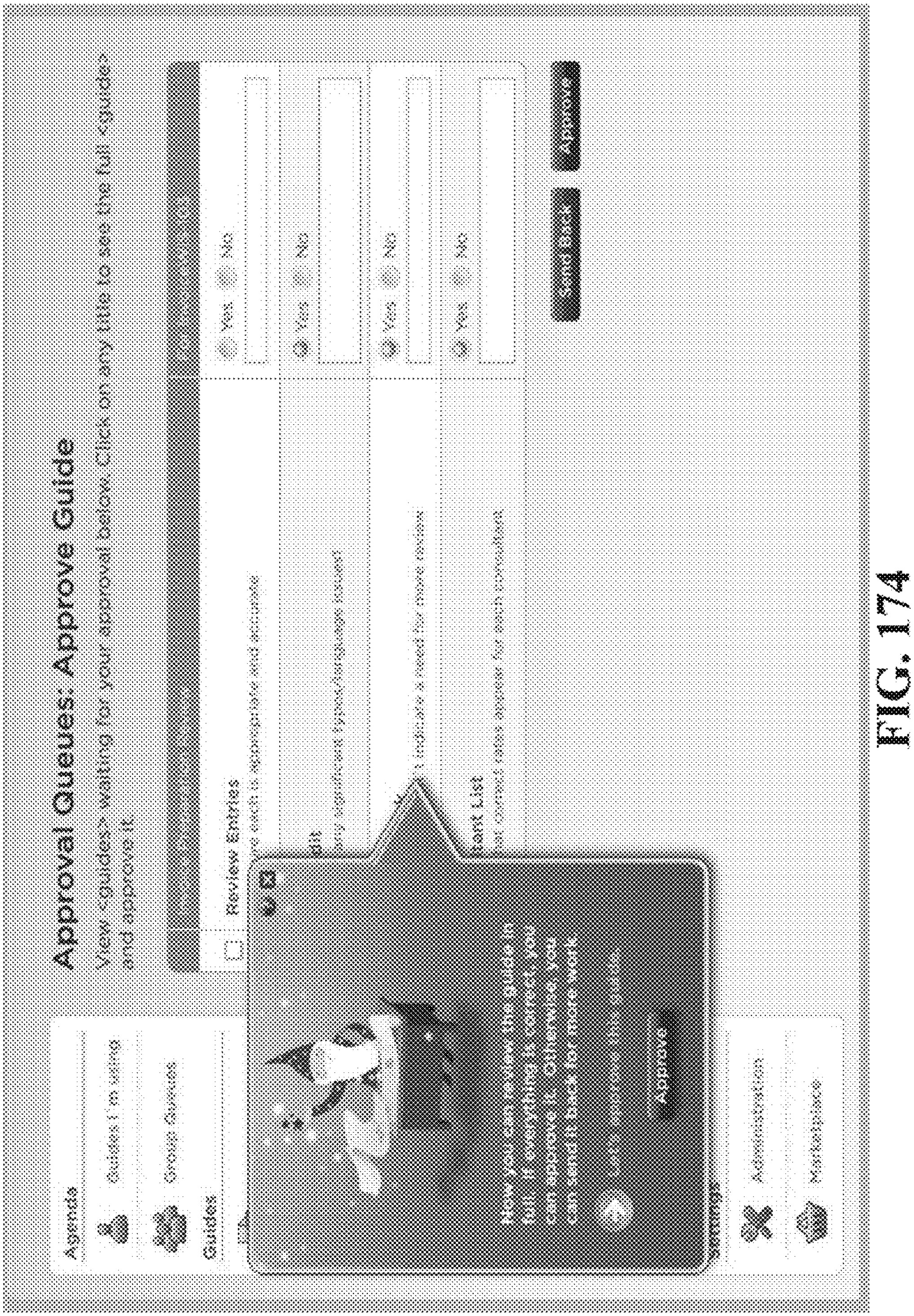
Figure 175:
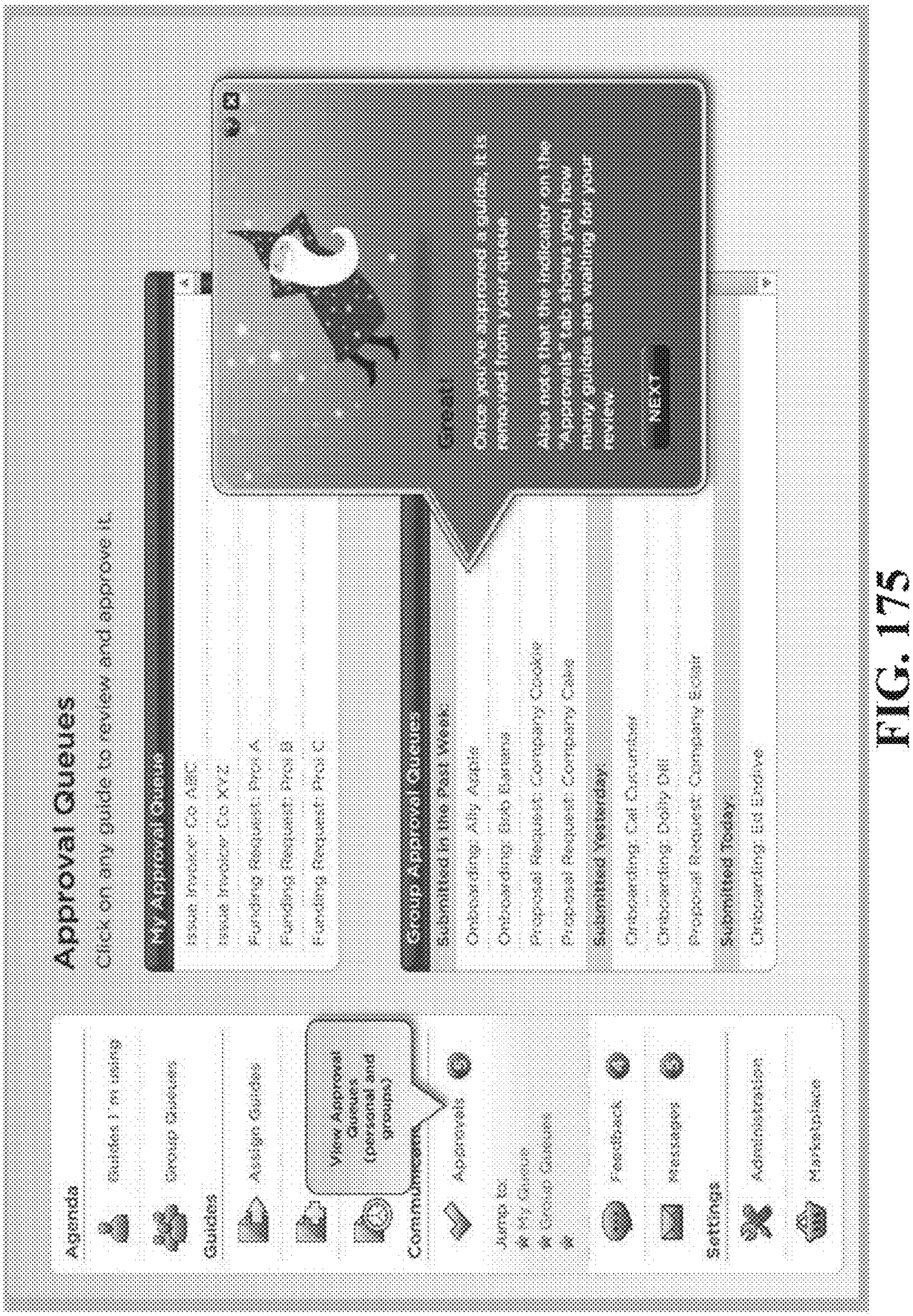
Figure 176:
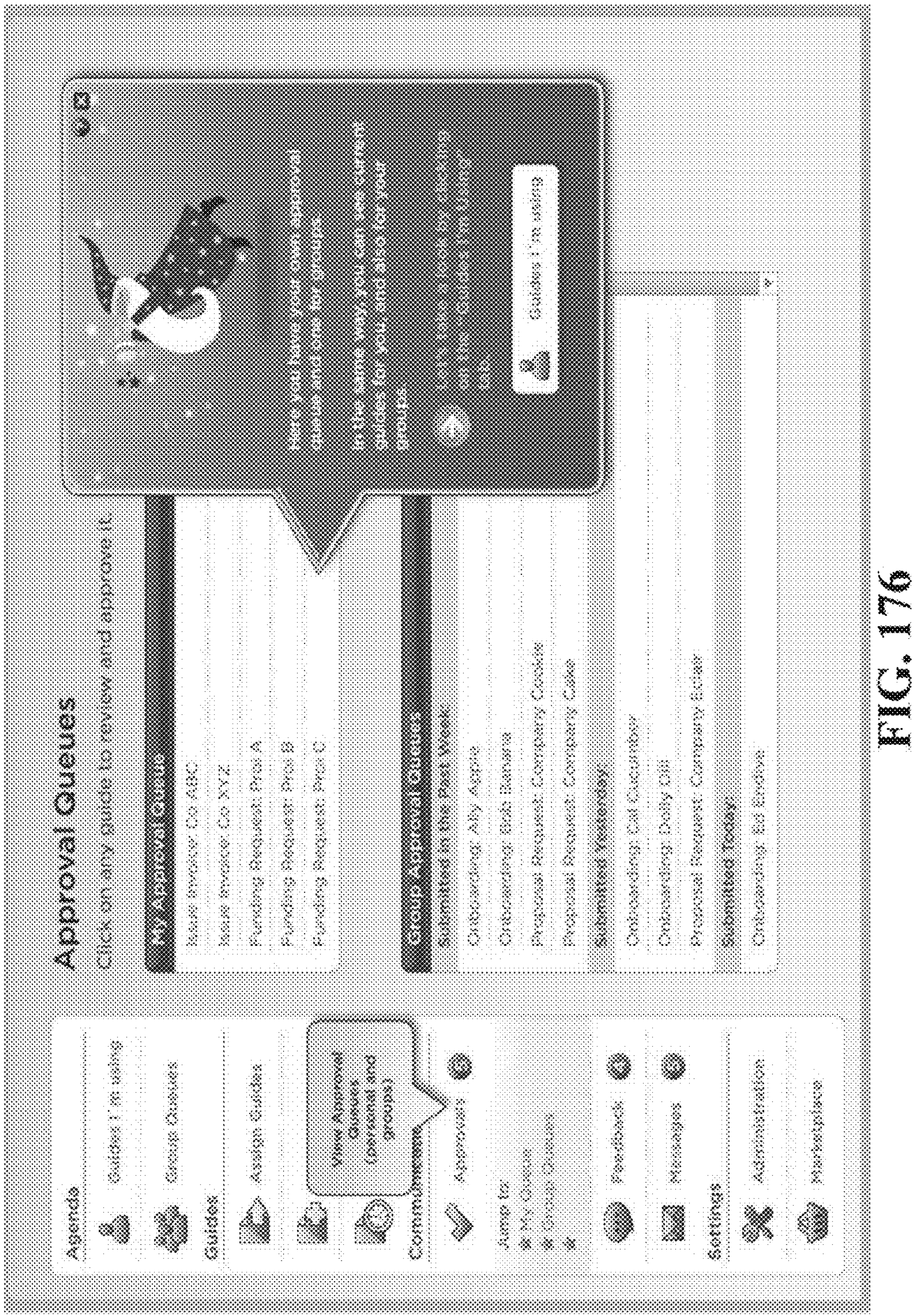
Figure 177:
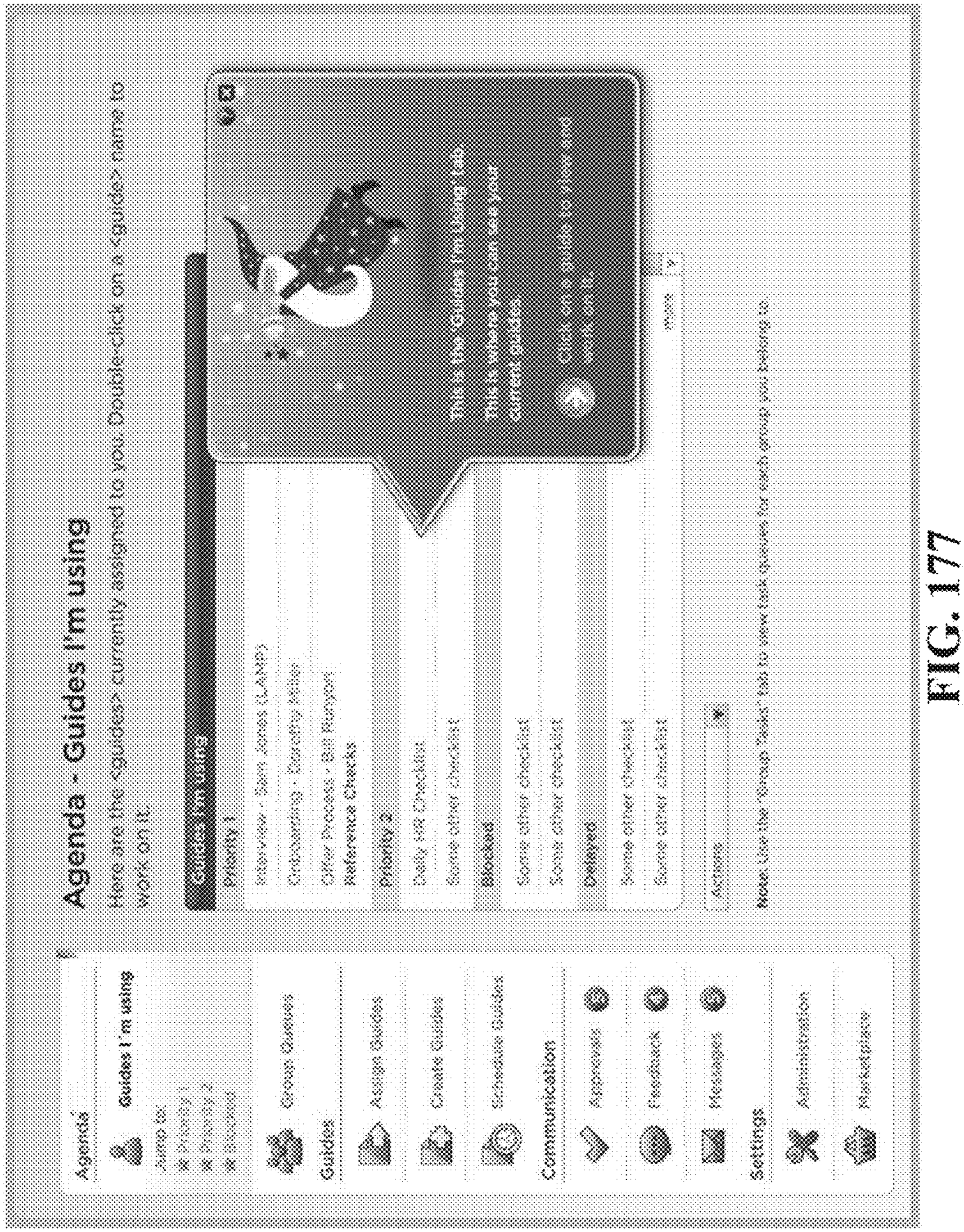
Figure 178:
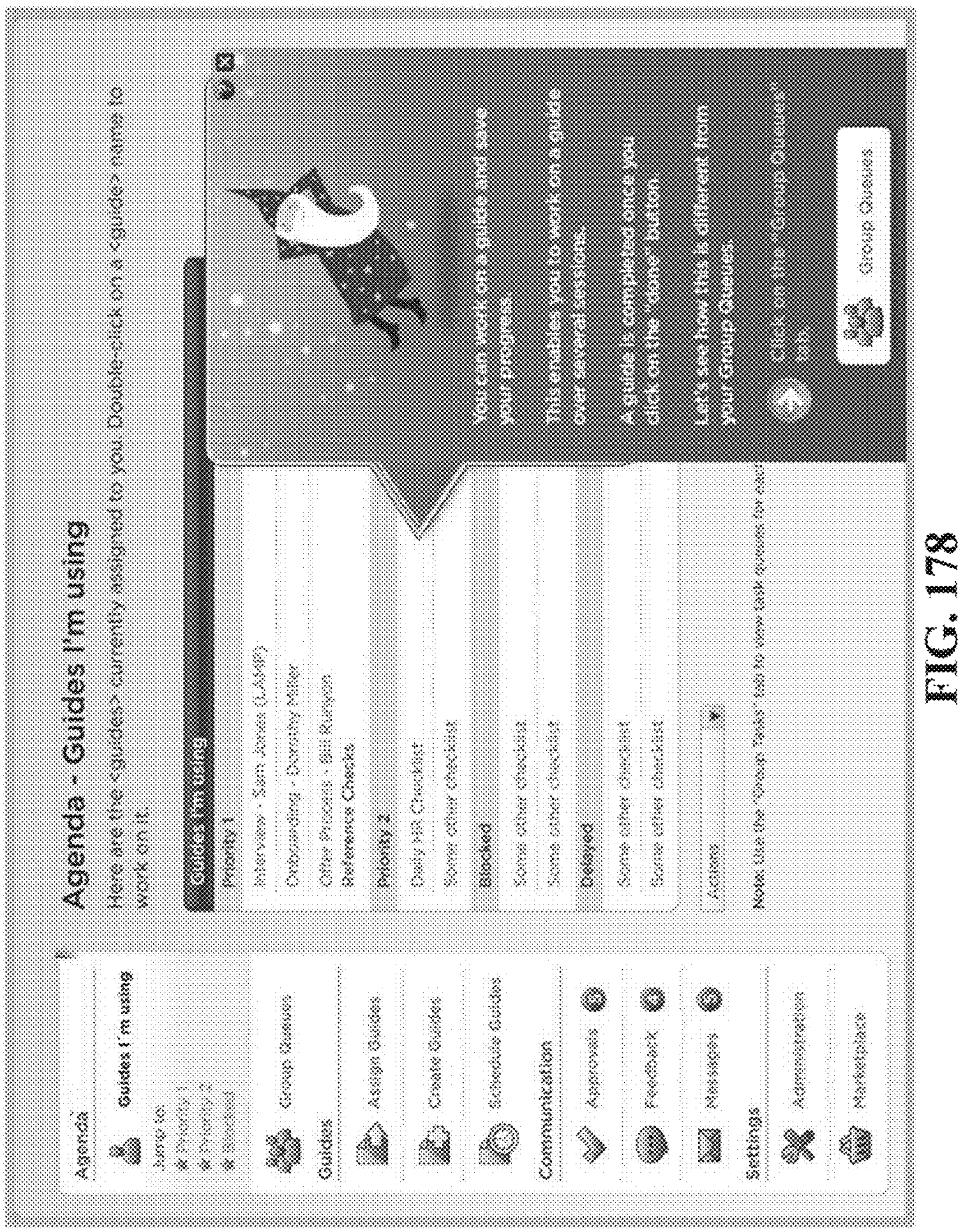
Figure 179:
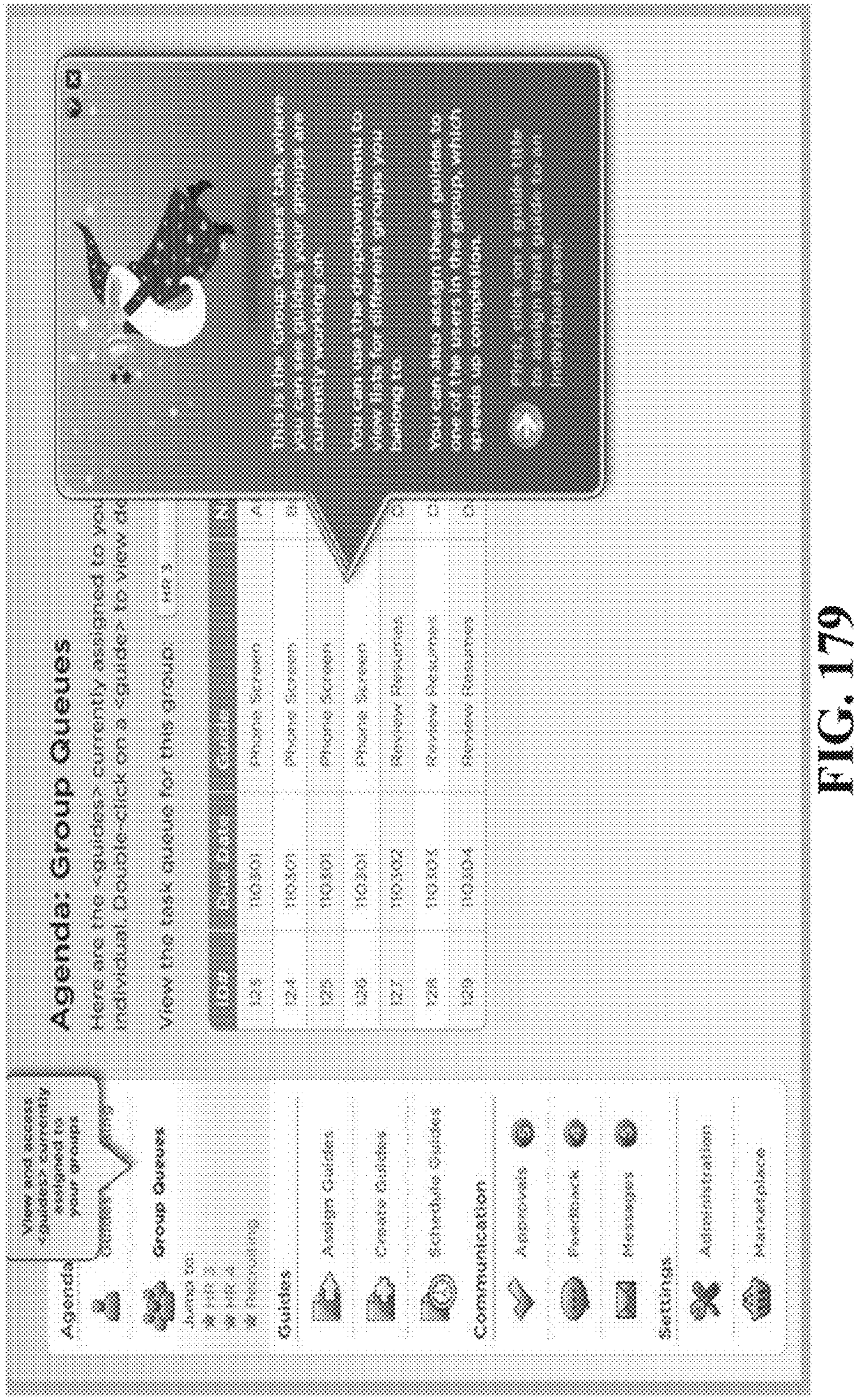
Figure 180:
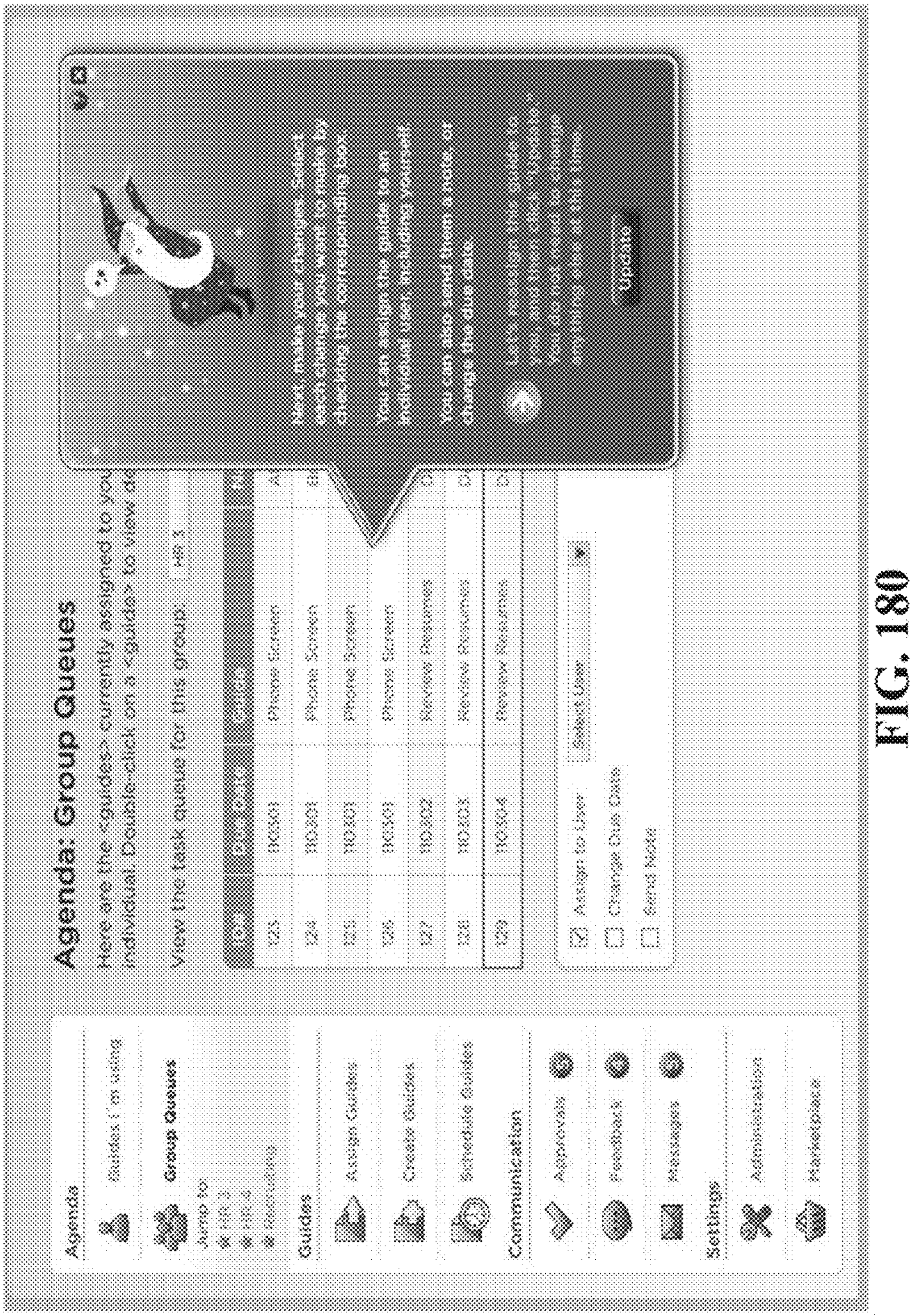
Figure 181:
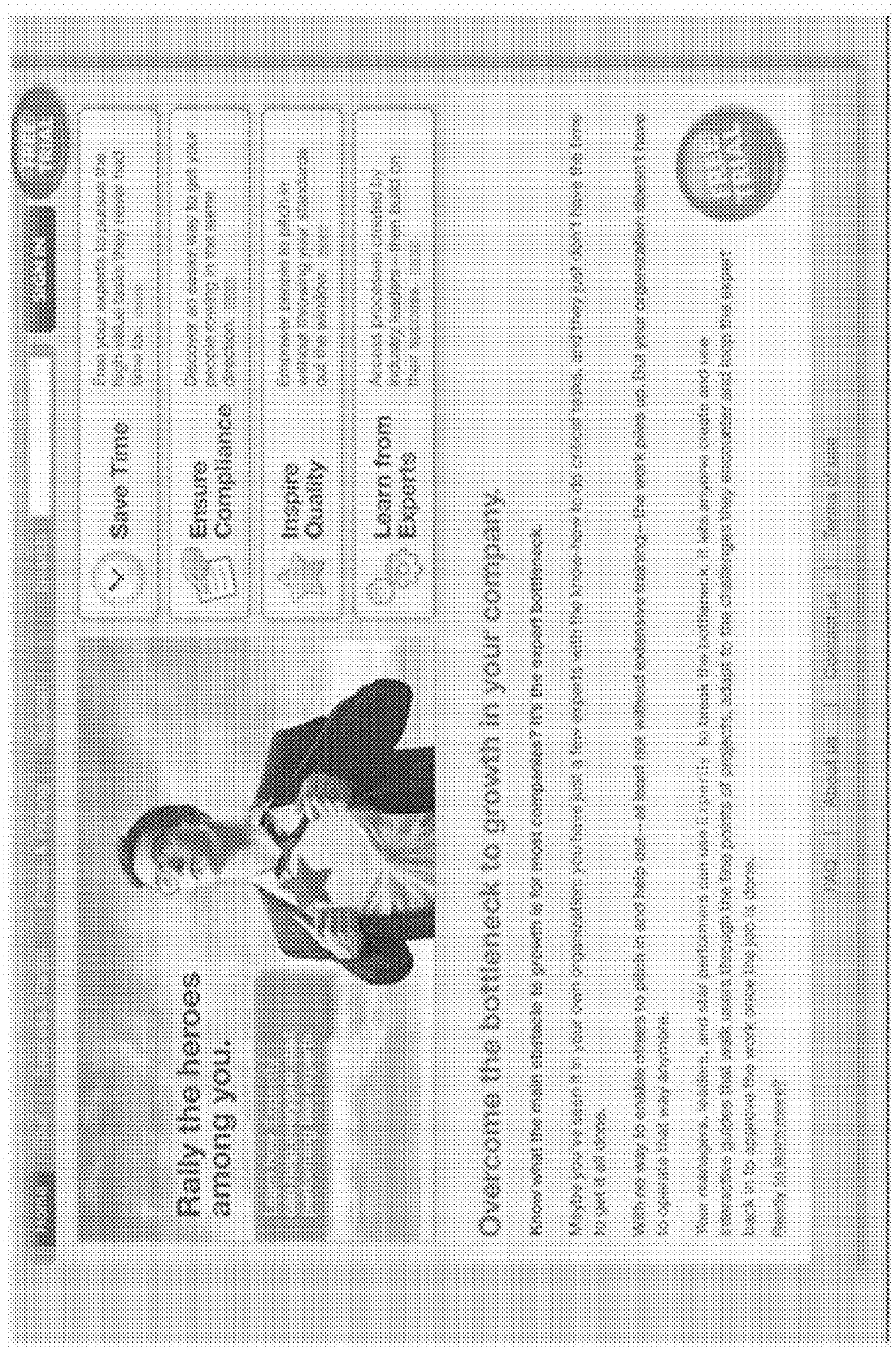
FIGS. 181, 182A, 182B, 183, 184, 185, 186, 187, 188, 189, 190, 191, and 192 show examples of a public website for an interactive checklist in accordance with some embodiments of the disclosed subject matter.
Figure 182A:
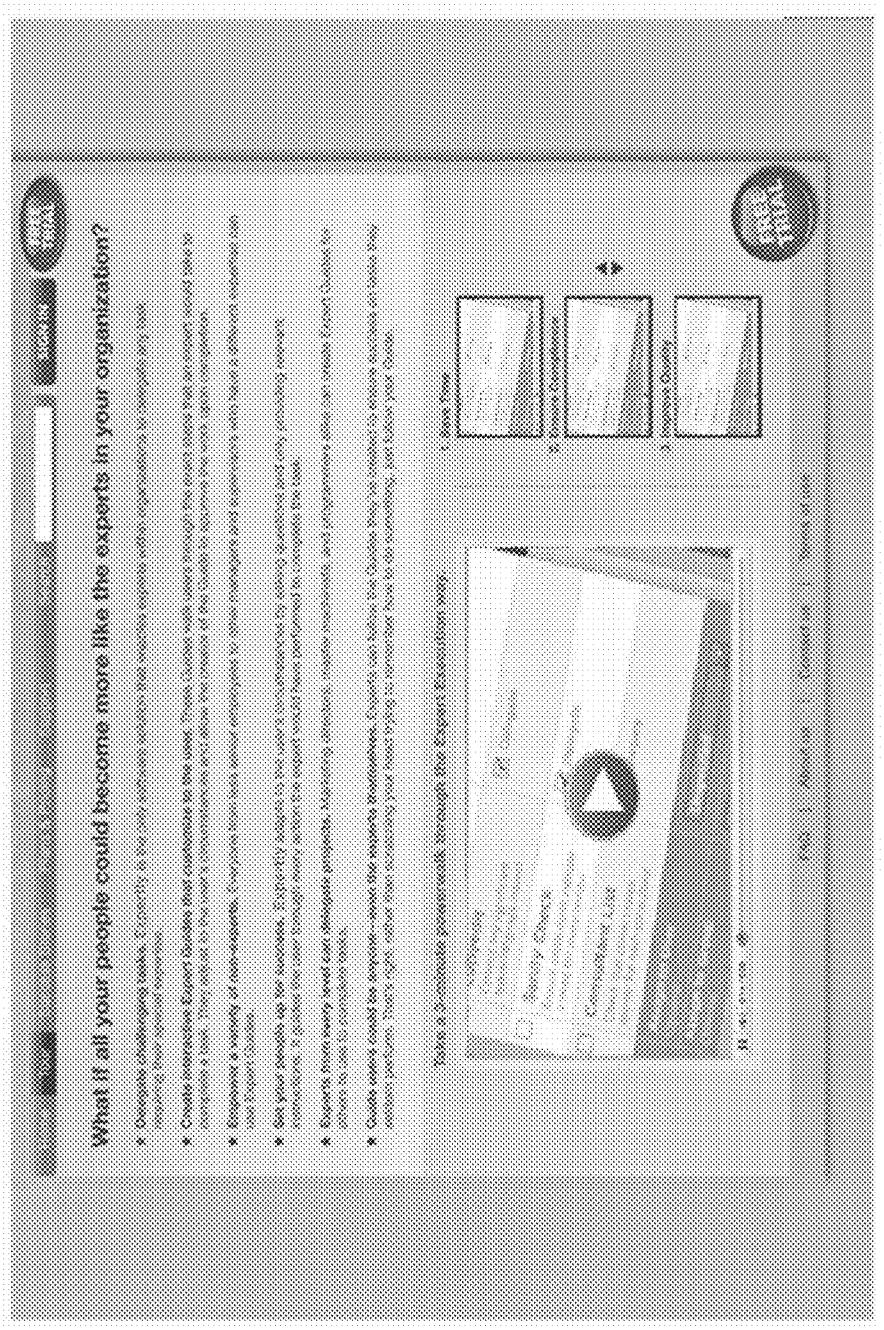
Figure 182B:
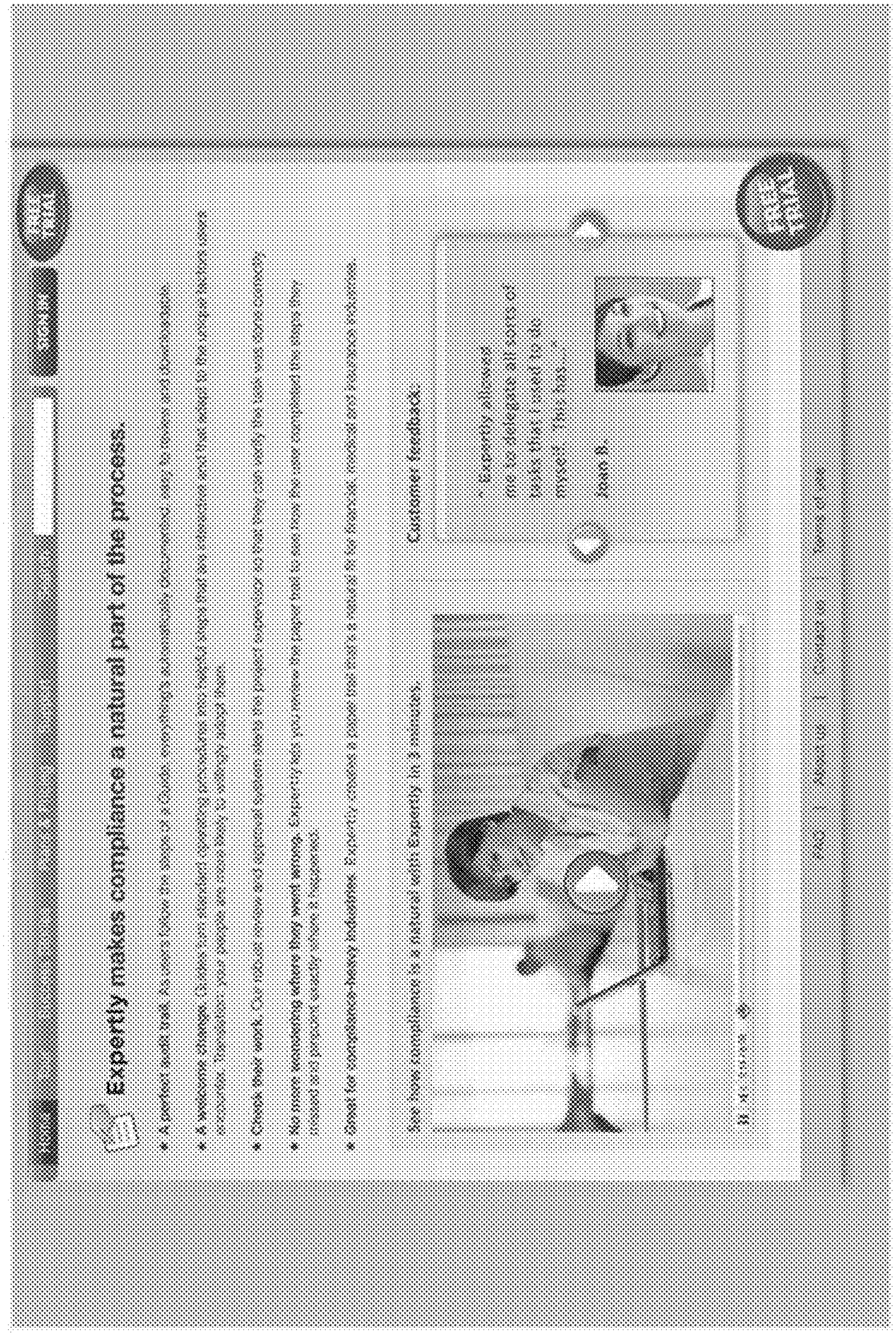
Figure 183:
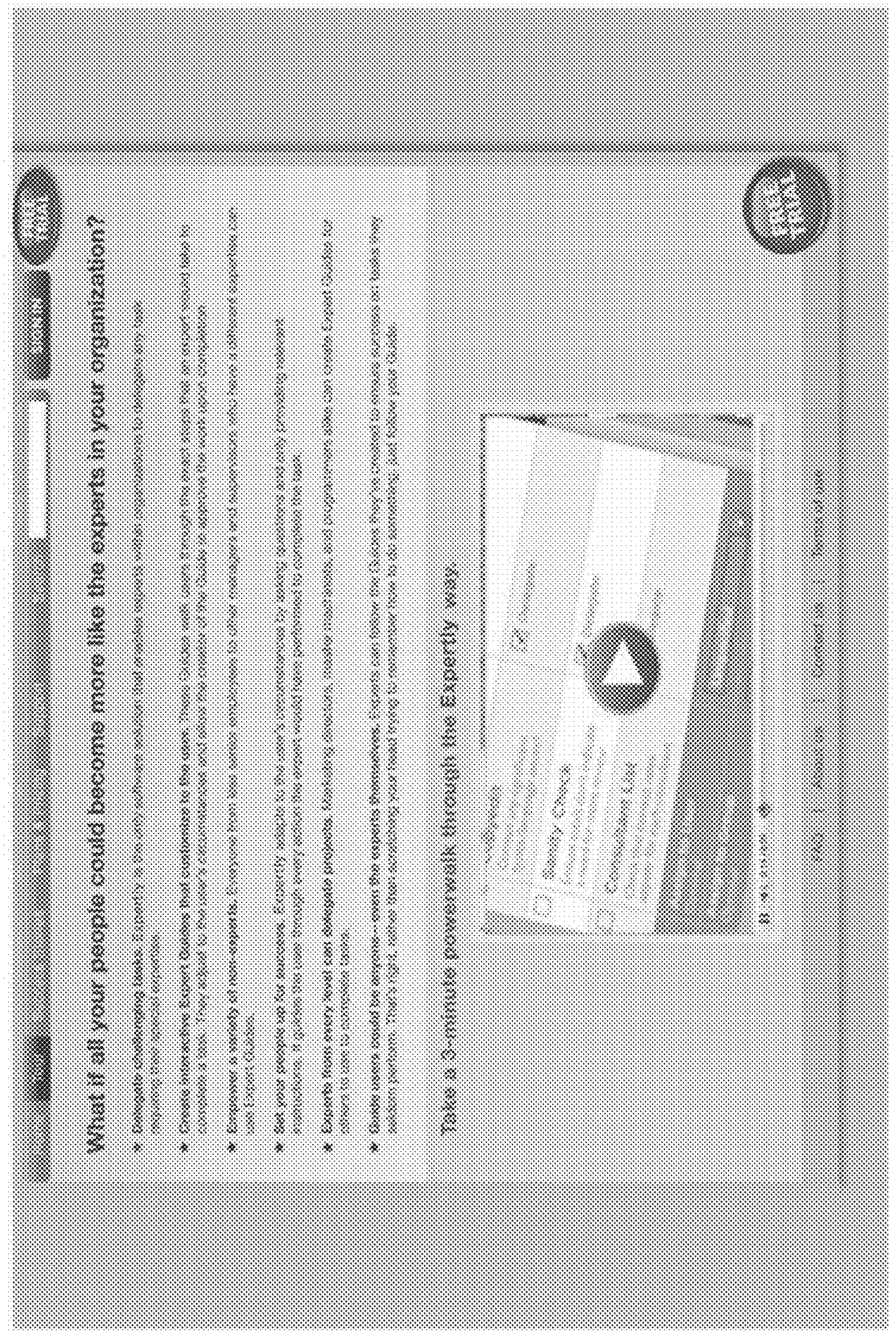
Figure 184:
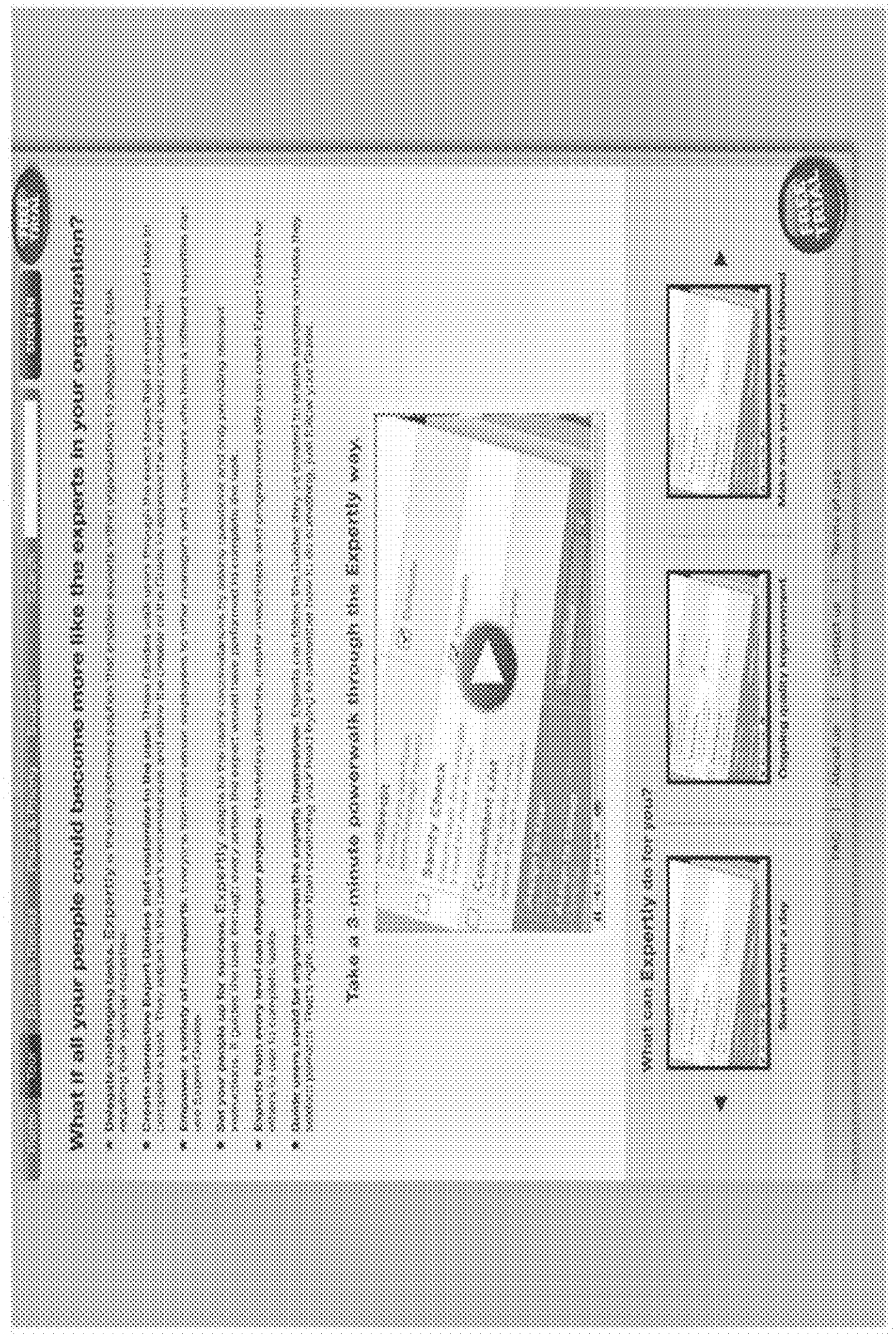
Figure 185:
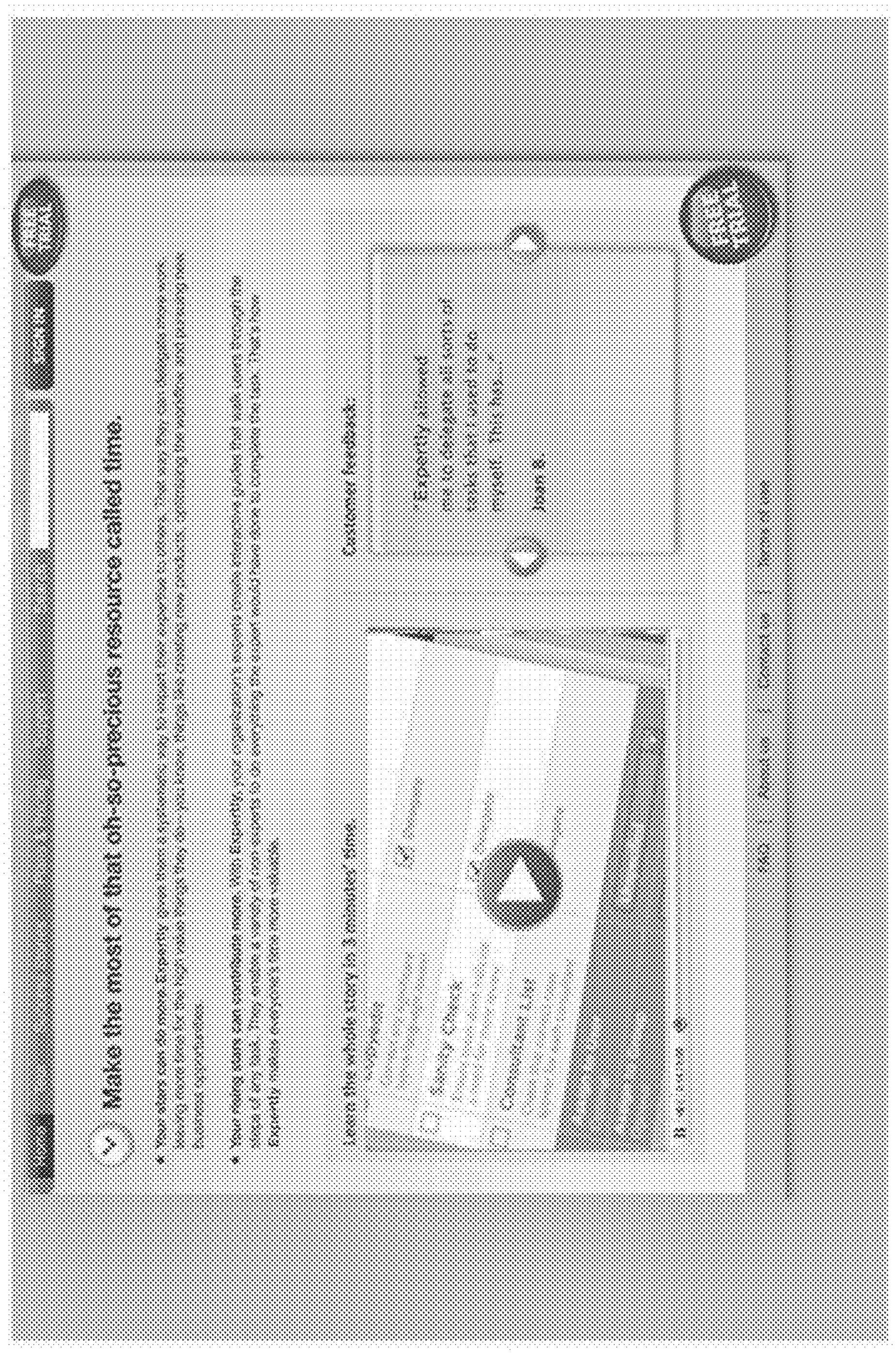
Figure 186:
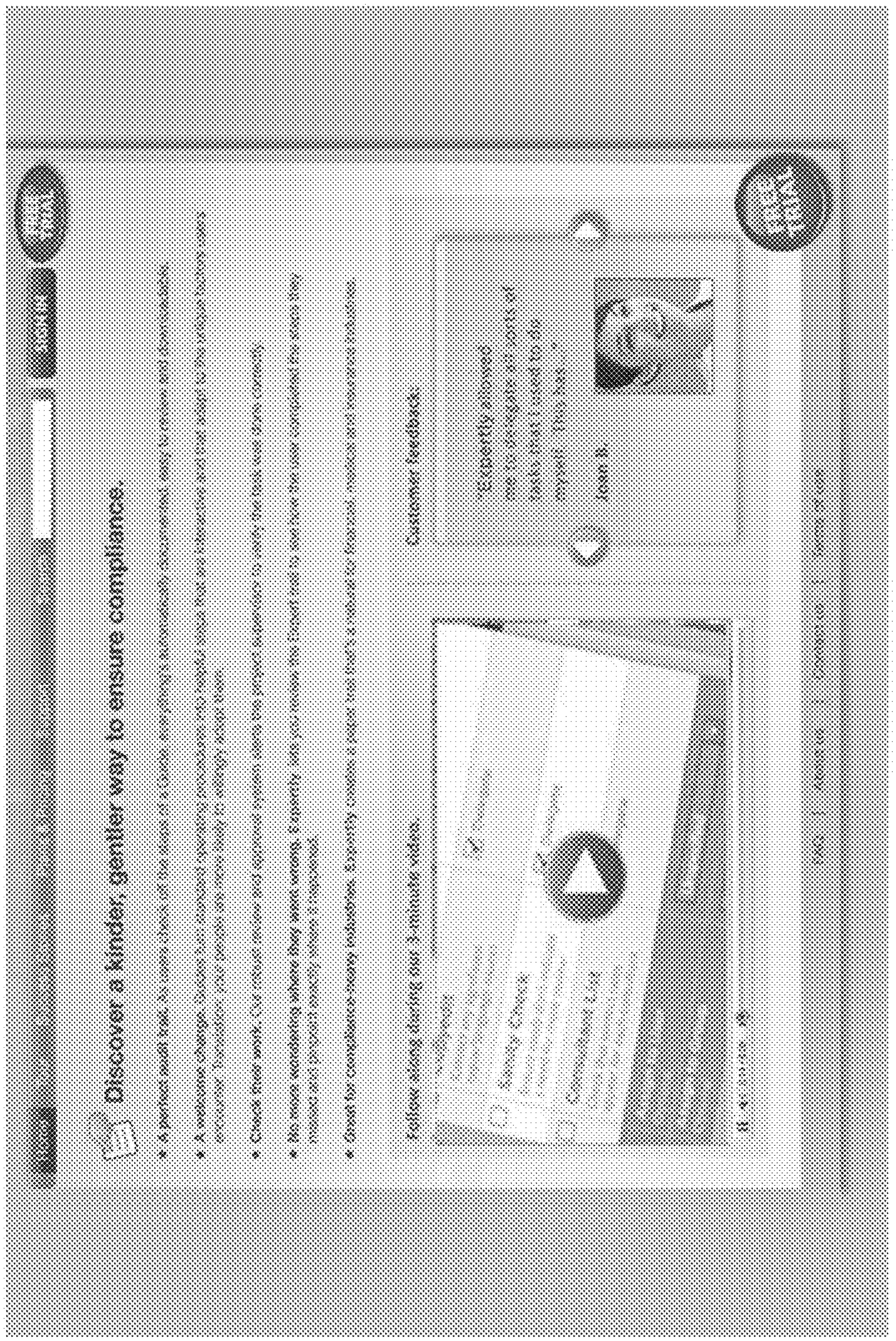
Figure 187:
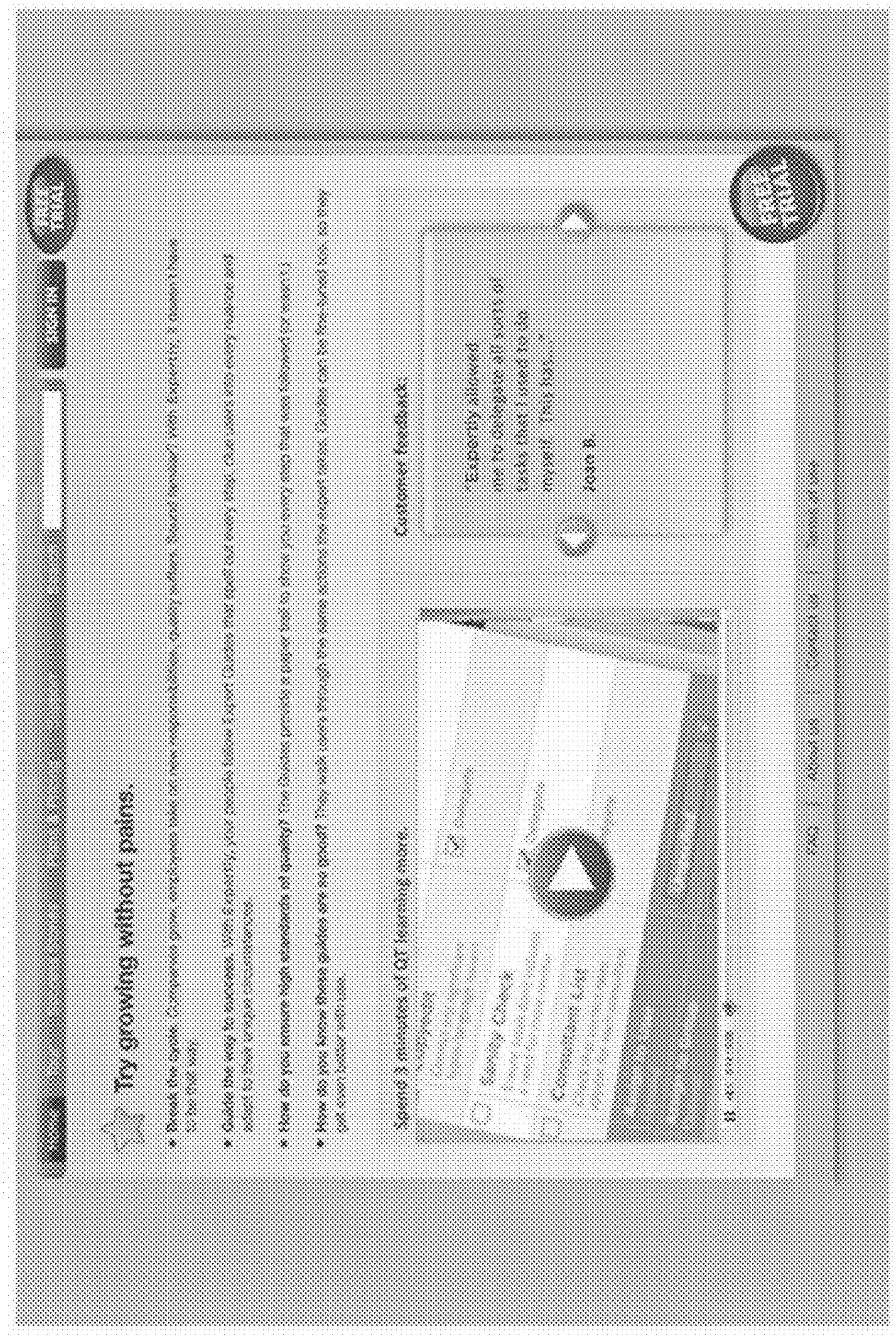
Figure 188:
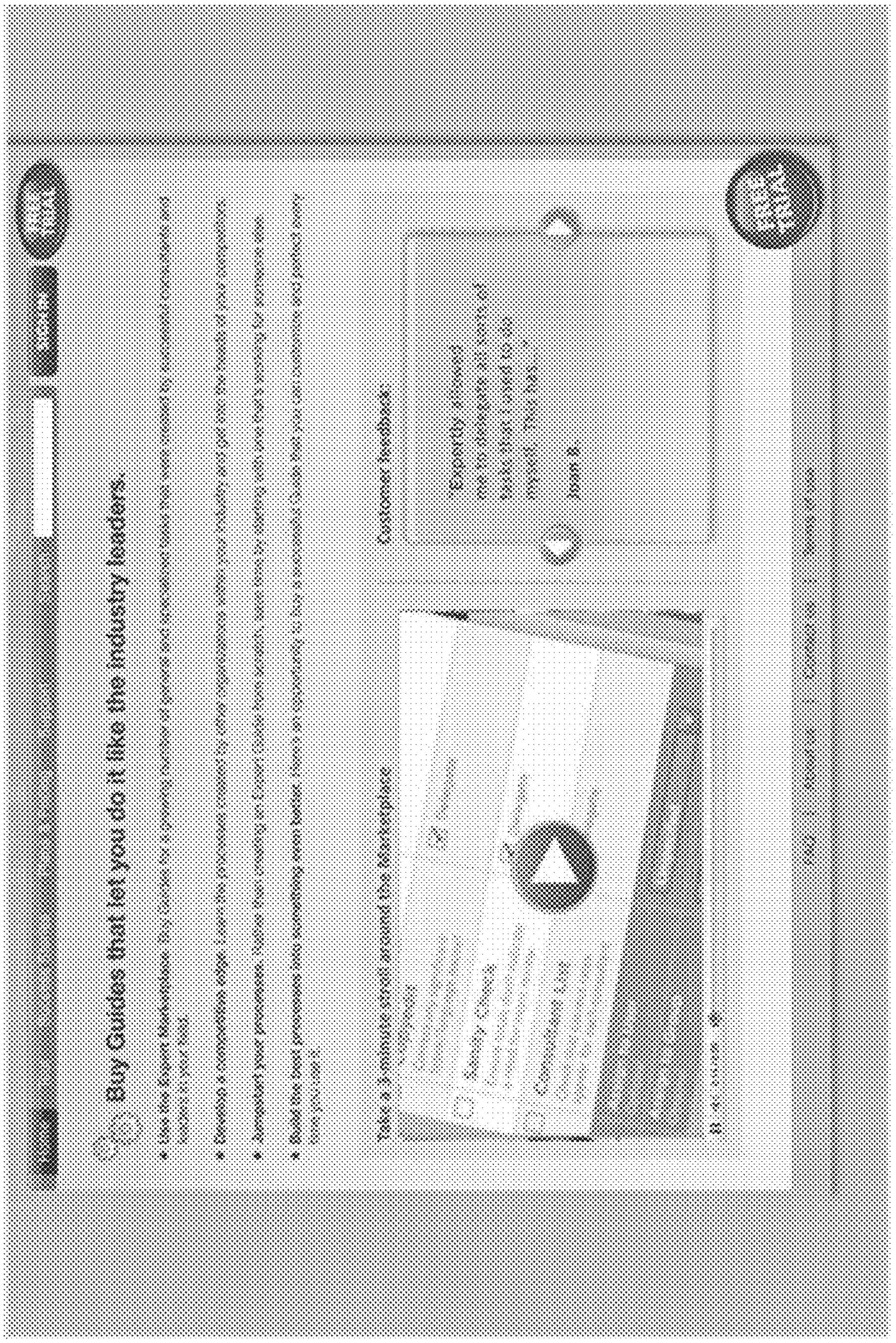
Figure 189:
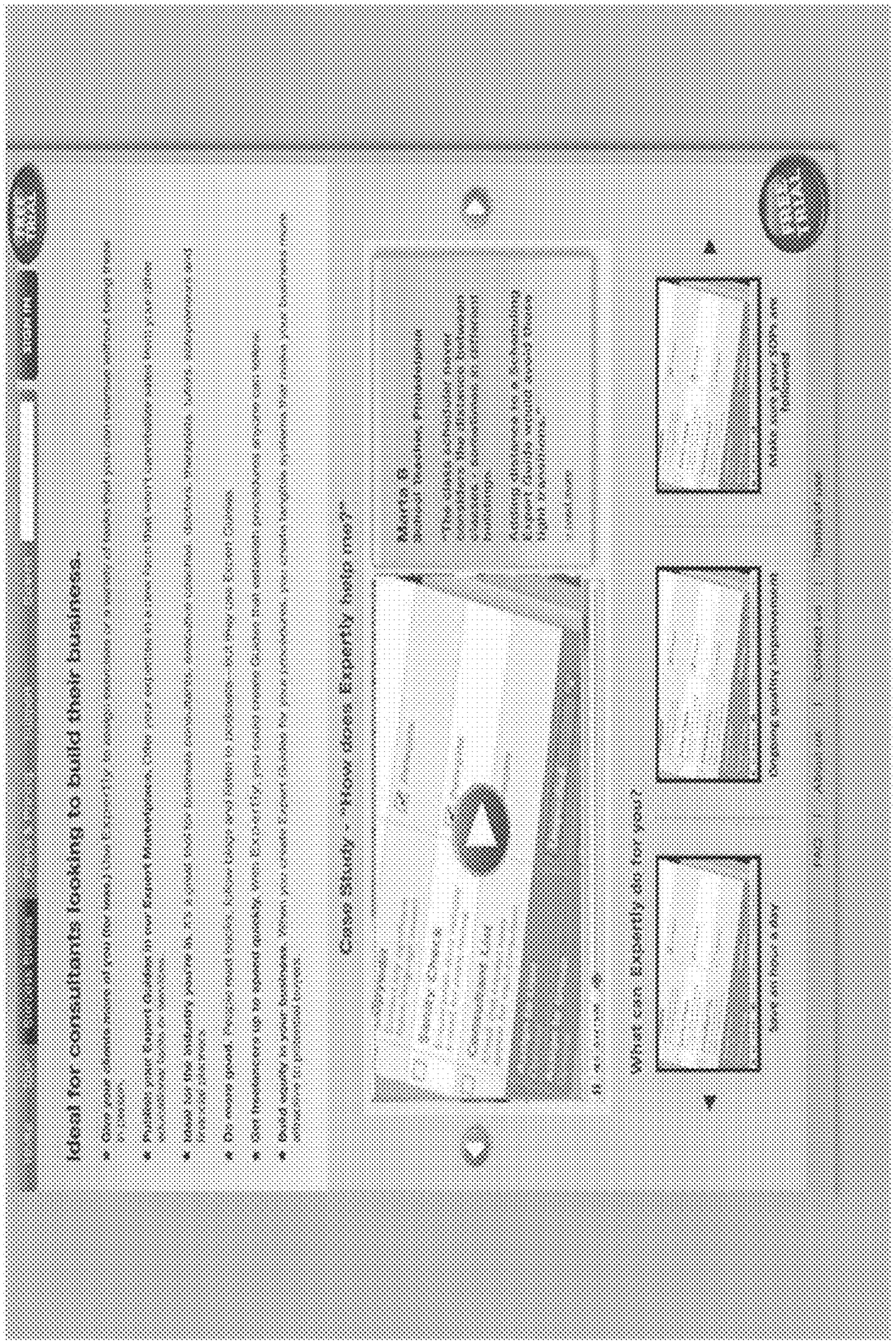
Figure 190:
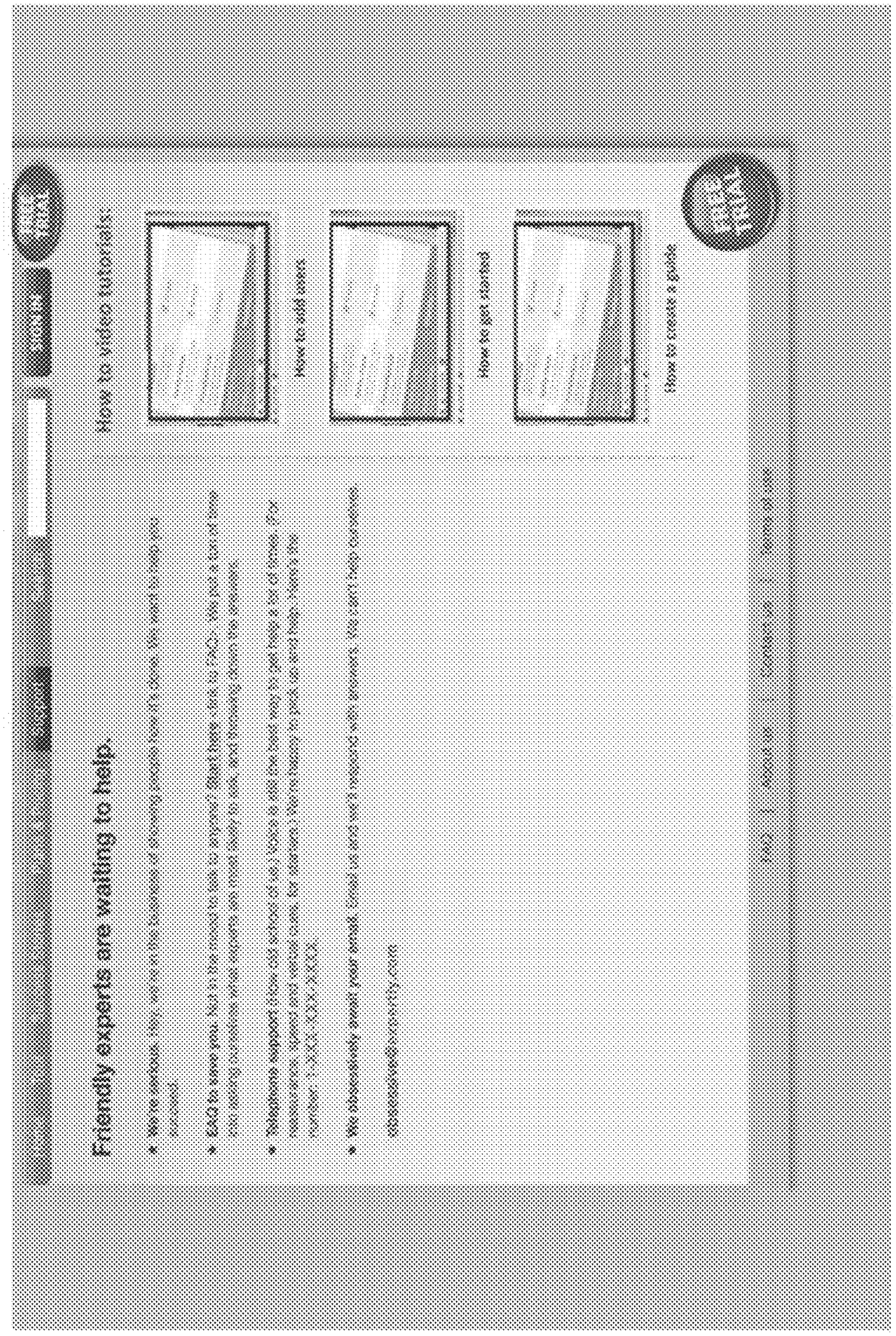
Figure 191:
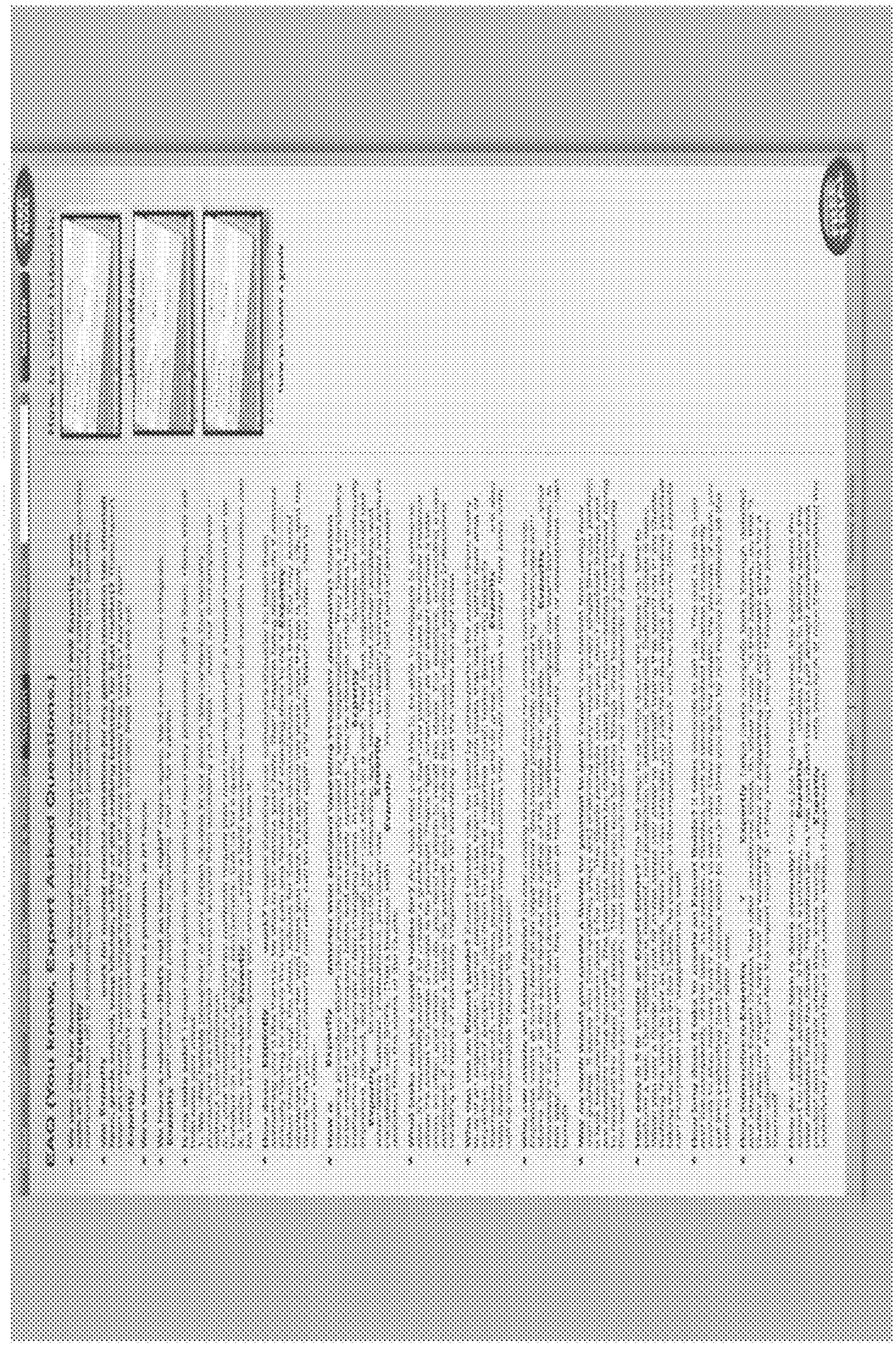
Figure 192:
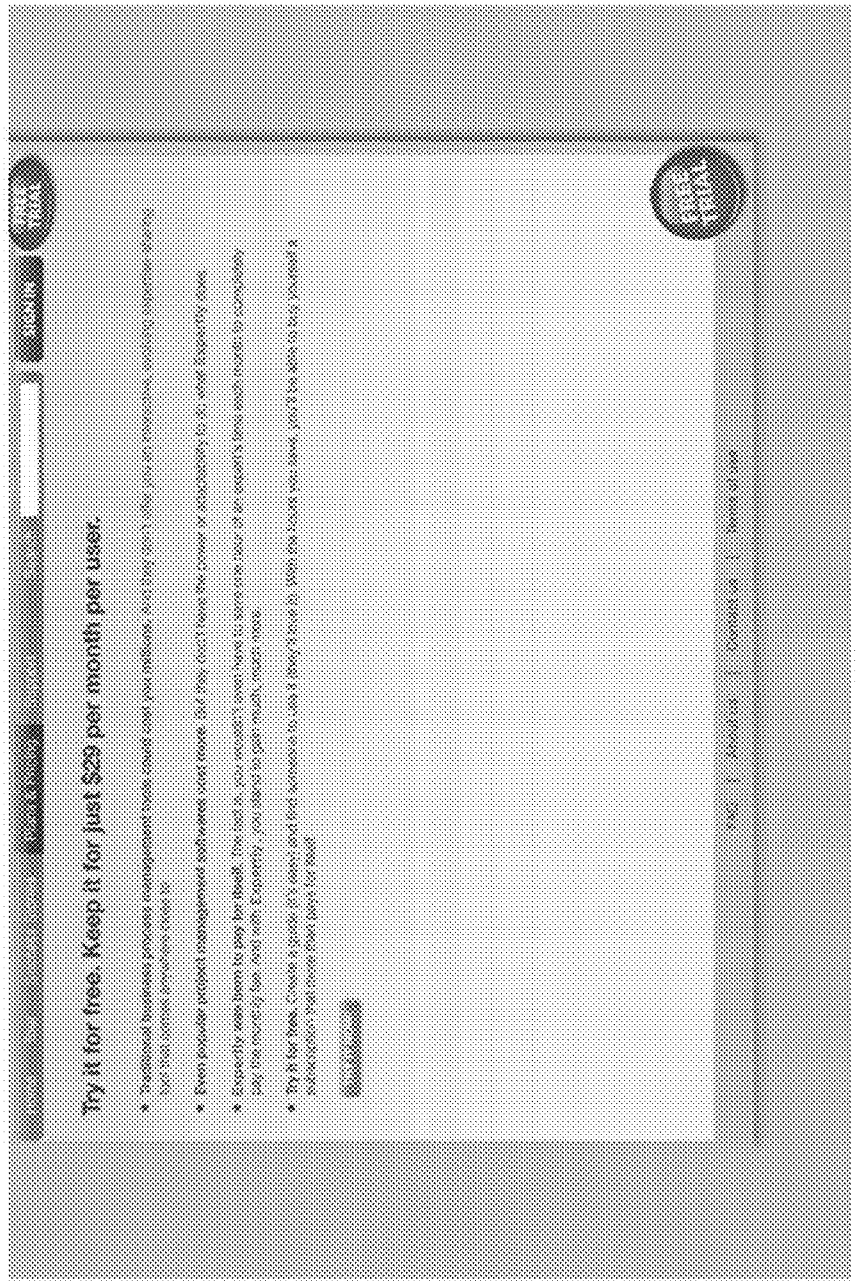

The server and one of the user devices depicted in FIG. 133A are illustrated in more detail in FIG. 133B in accordance with some embodiments. As shown, computing device 13302 may include a hardware processor 13314, a display 14416, an input device 13318, and memory 13320, which may be interconnected.

In some embodiments, memory 13320 can contain a storage device for storing a computer program for controlling processor 13314. In some implementations, processor 13314 can execute the computer program to present on display 13316 user interfaces and data.

Server 13310 may similarly include a hardware processor 13322, a display 13324, an input device 13326, and memory 13328, which may be interconnected. Memory 13328 can contain a storage device for storing data and/or a server program for controlling processor 13322 in some implementations.

In accordance with some embodiments, the interactive checklist may have several additional features. For example, organizations using the interactive checklist can take advantage of a "Remote Installation" option, allowing them to install it on their own infrastructure (in the cloud or on their servers) as an alternative to a SaaS option. It can provide numerous advantages, including ability to accommodate easy upgrades, ability to accommodate a scheduled database backup facility (some sort of intraday backup as well), and/or ability for the interactive checklist staff to troubleshoot. In some embodiments, the system can be used within a SaaS environment with certain particularly confidential interactive checklists and/or interactive checklists components being stored within an internal environment so that the client can be configured to access both environments as needed.

In accordance with some embodiments, a SSL support failover configuration can allow for failover without data loss across Amazon AWS geographies and outside of Amazon and similarly for other cloud providers, as well as database replication and customizable security settings that an administrator can choose from. For example, one may allow or disallow automatic login, or tie the currently logged-in session to the IP address used to log in, to help prevent session hijacking A user can assign a reminder schedule to alert them (or others) when a particular interactive checklist may require review. This feature can allow a user to automatically receive alerts notifying them that it is time to review the interactive checklist and potentially update it so that it remains relevant and useful.

In accordance with some embodiments, for "Event-Capture" integration, the interactive checklist can monitor/capture user actions in other websites and/or applications and if necessary can interfere with a user's actions on a third-party page. For example, before allowing a user's action (e.g., filing a report in an external system), it can check whether the corresponding activity is complete. If not, it can remind the user to complete it before proceeding and possibly preventing submission until completion is done. A user can also record subsequent actions and attach an interactive checklist to a document (rather than a web interface).

In some embodiments, an API can be provided that can allow interactive checklists to be connected to a web service of interactive checklists, allowing custom user forms to interact with interactive checklists. Email client and calendar integration can suggest and create activities from a user's email on demand or on a schedule.

In some embodiments, "Email Queue Addition" can have the ability to add and configure a new activity for an individual or for a group via email, for example, to a general or interactive checklist-specific email address.

In some embodiments, metadata such as due dates and/or time can be interpreted from the email automatically, and assignees, titles, description, document attachments, other data, and subsequent follow-ups can be extracted and including in the activity.

In some embodiments, security limitations may also be configured to restrict entry to the interactive checklist (e.g., only from certain addresses and/or only with certain email headers).

When assigned to a general email queue rather than an interactive checklist-specific interface, an assignee may be initially prompted to select an appropriate interactive checklist type.

In accordance with some embodiments, a service uptime tracker can offer an uptime indicator. Dashboard widgets can include metrics and other progress indicators that can be added to an interactive checklist dashboard or to another dashboard (such as iGoogle™ or an intranet). The interactive checklist can have advanced performance metrics and analysis.

In accordance with some embodiments, the interactive checklist can be available in a number of world languages. Interfaces can be offered in the user's preferred language and interactive checklists may offer translated versions with translations of steps and other elements managed by the software. Individual interactive checklists or sets or types of interactive checklists can be marked for translation management, with configurable language sets. Automated translation tools can enable supervisors who speak one language to assess compliance with procedures, regardless of the language of a particular activity. Activity and approval routing arrangements can consider languages known and preferred by the users involved, and languages needed. In some embodiments, manual translation management interfaces can be provided to offer better translations of certain text than automatic translations.

In accordance with some embodiments, query steps (e.g., a user's manual querying) can be a knowledge management feature that allows the user to perform database queries on steps across activities and interactive checklists. A user can set additional conditions and parameters to refine initial query.

In some embodiments, automatic publication can allow automatic publishing of content of an Activity to a document management system (e.g., a database or a wiki). For example, one document per Activity can be published to provide easily browseable, indexable, and searchable access through an organization's existing systems. Additionally, certain types of Activities can be omitted (e.g., for reasons of confidentiality). In some embodiments, Activities can be stored in a folder structure that mirrors a hierarchy of the Groups in which they are located, except as configured otherwise. Access permissions can be translated to a corresponding access tagging in the document management system. Other metatags, such as author, approver, time created, can also be translated automatically to the format used by the document management system.

In accordance with some embodiments, a solution finder is a feature that can allow a user to indicate a potential outcome in a particular situation, and then for the interactive checklist to review past activities using the same interactive checklist, to indicate which inputs can influence that (or other) outcomes.

In some embodiments, a "Guide Import Tool" can allow users to quickly turn existing checklists and Standard Operating Procedures (SOPs) into interactive checklists based on formatting and language-based heuristics and analysis. For example, bullets may generally indicate separate steps, and text such as "If [XYZ]" or "When [XYZ]" may indicate the basis for "When to Show" criteria.

In accordance with some embodiments, audio prompts for interactive checklists can have "Text to Speech" (TTS) prompts which can read various parts of the interactive checklist.

In some embodiments, "Likely Usefulness" allows for indicators which can show the user how often certain steps and suggestions have been useful to past users of the interactive checklist. Indicators can be nuanced providing the user information such as the conditional probability of helpfulness.

In some embodiments, co-branding or white labeling can enable an organization to use style elements such as their own logo and color scheme to customize the interactive checklist.

In some embodiments, a location-based assignment which can allow for scheduling of recurring activities based on physical location of the user or physical device(s) may also be available.

In some embodiments, keyboard shortcuts for frequent actions within an interactive checklist may be an additional feature, as well as an expansion of internal messaging tool to include social networking and social sharing capabilities (e.g., sharing a completed or not completed interactive checklist with a user that may benefit from it).

In some embodiments, an audit feature can allow for a setup and management of an audit policy. A hardware processor may, for example, monitor usage of particular individuals or groups, or on particular interactive checklists. Individual audit data can be consolidated and analyzed using reporting features.

Attaching an interactive checklist to desktop software or a desktop software item can be provided in some embodiments. For example, the interactive checklist can be attached to a database (e.g., a Microsoft Access database) that handles entry of purchase orders. For example, a submission workflow is included at launching and when needed in creating an interactive checklist.

External database integration which can allow for syncing (e.g., partial or complete) of data into databases and supporting popular database formats can also be provided.

In accordance with some embodiments, organizations, new users (free trial or subscribers, etc.) can start an Interactive Tour when they first log into the interactive checklist. They can pause and resume the tour at any point. The tour can help them set up their organization in the interactive checklist (if first user) and then orient them as to the available features. The tour can feature an interactive checklist wizard. FIGS. 134-180 show some examples of tour interfaces. Additionally, FIGS. 181-192 show examples of a public website for an interactive checklist. In some embodiments, a more detailed Interactive Tour sections can be presented by a hardware processor of computing device only at a particular time. For example, the hardware processor can present the detailed Interactive Tour when a user first visits the Guide Marketplace or when a user first begins to author an Interactive Checklist.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for presenting interactive checklists are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting interactive checklists, the method comprising:

receiving a parameter defining at least part of a condition, which, when met, indicates that a first instance of an interactive checklist is to be created;

when the condition is met, creating the first instance of the interactive checklist;

as part of using the first instance of the interactive checklist:

identifying, using a hardware processor, a plurality of steps to be performed in connection with completing a task, wherein each of the plurality of steps has a description corresponding to the step;

presenting the description for a first of the plurality of steps;

receiving an indication that the first of the plurality of steps has been completed;

in response to receiving the indication that the first of the plurality of steps has been completed, determining, using the hardware processor, whether a second of the plurality of steps is to be presented based at least in part on the indication received;

in response to determining that the second of the plurality of steps is to be presented, presenting the description for the second of the plurality of steps;

receiving, from a first user prior to receiving approval from a second user, at least one of: content describing how to perform the second of the plurality of steps; and a new description for a new step to be added to the plurality of steps, after the presenting of the description of the second of the plurality of steps; and saving the at least one of the content and the new description for the new step, and saving, in response to receiving the approval from the second user, an indicator that the at least one of the content and the new description of the new step is to be available for presentation after the receiving of the at least one of the content and the new description for the new step; and presenting the new description for the new step as part of using a second instance of the interactive checklist.

2. The method of claim 1, further comprising causing a computing device to present the content on a display of the computing device.

3. The method of claim 1, further comprising receiving a photograph corresponding to at least one of the plurality of steps.

4. The method of claim 1, further comprising receiving price information for the interactive checklist indicating that the interactive checklist is for sale.

5. The method of claim 4, wherein the price information includes at least one of a fixed price, a price range, a discount, and a percentage of a price.

6. The method of claim 1, wherein the description corresponding to the plurality of steps includes a title for each step and instructions for how to complete each step.

7. The method of claim 1, wherein the indicator is a progress indicator.

8. The method of claim 1, wherein the parameter is an indicator of a future date and the parameter is met when the future date arrives.

9. A system for presenting interactive checklists comprising:

at least one hardware processor that:

receives a parameter defining at least part of a condition, which, when met, indicates that a first instance of an interactive checklist is to be created;

when the condition is met, creates the first instance of the interactive checklist;

as part of using the first instance of the interactive checklist:

identifies a plurality of steps to be performed in connection with completing a task, wherein each of the plurality of steps and has a description corresponding to the step;

presents the description for a first of the plurality of steps;

receives an indication that the first of the plurality of steps has been completed;

in response to receiving the indication that the first of the plurality of steps has been completed, determines whether a second of the plurality of steps is to be presented based at least in part on the indication received;

in response to determining that the second of the plurality of steps is to be presented, presents the description for the second of the plurality of steps;

receives, from a first user prior to receiving approval from a second user, at least one of: content describing how to perform the second of the plurality of steps; and a new description for a new step to be added to the plurality of steps, after the presenting of the description of the second of the plurality of steps; and saves the at least one of the content and the new description for the new step, and saves, in response to receiving the approval from the second user, an indicator that the at least one of the content and the new description of the new step is to be available for presentation after the receiving of the at least one of the content and the new description for the new step; and presenting the new description for the new step as part of using a second instance of the interactive checklist.

10. The system of claim 9, wherein the hardware processor is further configured to cause a computing device to present the content on a display of the computing device.

11. The system of claim 9, wherein the hardware processor is further configured to receive a photograph corresponding to at least one of the plurality of steps.

12. The system of claim 9, wherein the hardware processor is further configured to receive price information for the interactive checklist indicating that the interactive checklist is for sale.

13. The system of claim 12, wherein the price information includes at least one of a fixed price, a price range, a discount, and a percentage of a price.

14. The system of claim 9, wherein the description corresponding to the plurality of steps includes a title for each step and instructions for how to complete each step.

15. The system of claim 9, wherein the indicator is a progress indicator.

16. The system of claim 9, wherein the parameter is an indicator of a future date and the parameter is met when the future date arrives.

17. A non-transitory computer-readable medium containing computer-executable instructions that, when executed by a processor, cause the processor to perform a method for presenting interactive checklists, the method comprising:

receiving a parameter defining at least part of a condition, which, when met, indicates that a first instance of an interactive checklist is to be created;

when the condition is met, creating the first instance of the interactive checklist;

as part of using the first instance of the interactive checklist:

identifying a plurality of steps to be performed in connection with completing a task, wherein each of the plurality of steps has a description corresponding to the step;

presenting the description for a first of the plurality of steps;

receiving an indication that the first of the plurality of steps has been completed;

in response to receiving the indication that the first of the plurality of steps has been completed, determining whether a second of the plurality of steps is to be presented based at least in part on the indication received;

in response to determining that the second of the plurality of steps is to be presented, presenting the description for the second of the plurality of steps;

receiving, from a first user prior to receiving approval from a second user, at least one of: content describing how to perform the second of the plurality of steps; and a new description for a new step to be added to the plurality of steps, after the presenting of the description of the second of the plurality of steps; and saving the at least one of the content and the new description for the new step, and saving, in response to receiving the approval from the second user, an indicator that the at least one of the content and the new description of the new step is to be available for presentation after the receiving of the at least one of the content and the new description for the new step; and presenting the new description for the new step as part of using a second instance of the interactive checklist.

18. The non-transitory computer-readable medium of claim 17, further comprising causing a computing device to present the content on a display of the computing device.

19. The non-transitory computer-readable medium of claim 17, further comprising receiving a photograph corresponding to at least one of the plurality of steps.

20. The non-transitory computer-readable medium of claim 17, further comprising receiving price information for the interactive checklist indicating that the interactive checklist is for sale.

21. The non-transitory computer-readable medium of claim 20, wherein the price information includes at least one of a fixed price, a price range, a discount, and a percentage of a price.

22. The non-transitory computer-readable medium of claim 17, wherein the description corresponding to the plurality of steps includes a title for each step and instructions for how to complete each step.

23. The non-transitory computer-readable medium of claim 17, wherein the indicator is a progress indicator.

24. The non-transitory computer readable medium of claim 17, wherein the parameter is an indicator of a future date and the parameter is met when the future date arrives.

* * * * *